Sept. 18, 1956 J. E. OSTLINE 2,763,725

TELEPHONE SYSTEMS

Original Filed Feb. 23, 1946

61 Sheets-Sheet 1

*INVENTOR.*
JOHN E. OSTLINE

*BY*
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 2

INVENTOR.
JOHN E OSTLINE
BY
Smith, Olsen & Baird
ATTYS.

INVENTOR.
JOHN E. OSTLINE
BY
Smith, Olsen & Baird
ATTYS.

INVENTOR.
JOHN E OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 5

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 6

INVENTOR.
JOHN E. OSTLINE
BY
Smith, Olsen & Baird
ATTYS

Sept. 18, 1956 J. E. OSTLINE 2,763,725

TELEPHONE SYSTEMS

Original Filed Feb. 23, 1946 61 Sheets-Sheet 7

INVENTOR. (8)

JOHN E OSTLINE

BY

*Smith, Olsen & Baird*

ATTYS.

Sept. 18, 1956 J. E. OSTLINE 2,763,725

TELEPHONE SYSTEMS

Original Filed Feb. 23, 1946 61 Sheets-Sheet 8

TOLL TICKET REPEATER 800

INVENTOR.
JOHN E. OSTLINE

BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 9

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 10

INVENTOR
JOHN E. OSTLINE

BY Smith, Olsen & Baird

ATTYS.

Sept. 18, 1956 J. E. OSTLINE 2,763,725

TELEPHONE SYSTEMS

Original Filed Feb. 23, 1946 61 Sheets-Sheet 11

INVENTOR.
JOHN E. OSTLINE
BY Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 12

*INVENTOR.*
JOHN E. OSTLINE

*BY*
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 13

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 14

INVENTOR.
JOHN E. OSTLINE

BY Smith, Olsen & Baird

ATTYS.

Sept. 18, 1956 J. E. OSTLINE 2,763,725

TELEPHONE SYSTEMS

Original Filed Feb. 23, 1946 61 Sheets-Sheet 15

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 16

PRIMARY REGISTER 1200

FIRST CODE SW. A1500 SECOND CODE SW. B1510 THIRD CODE SW. C1520

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 17

INVENTOR.
JOHN E. OSTLINE
BY
Smith, Olsen & Baird
ATTYS.

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 19

INVENTOR.
JOHN E. OSTLINE
BY
Smith, Olsen & Baird
ATTYS

Sept. 18, 1956

J. E. OSTLINE 2,763,725

TELEPHONE SYSTEMS

Original Filed Feb. 23, 1946

61 Sheets-Sheet 20

INVENTOR.
JOHN E. OSTLINE
BY
Smith, Olsen + Baird
ATTYS.

Sept. 18, 1956 J. E. OSTLINE 2,763,725

TELEPHONE SYSTEMS

Original Filed Feb. 23, 1946 61 Sheets-Sheet 21

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 22

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 23

*INVENTOR.*
JOHN E. OSTLINE
*BY*
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 24

INVENTOR.
JOHN E. OSTLINE
BY
Smith, Olsen & Baird
ATTYS.

INVENTOR.
JOHN E. OSTLINE
BY
Smith, Olsen & Baird
ATTYS.

INVENTOR.
JOHN E. OSTLINE
BY
Smith, Olsen & Baird
ATTYS.

*INVENTOR.*
JOHN E. OSTLINE
*BY*
*Smith, Olsen & Baird*
ATTYS.

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 29

INVENTOR.
JOHN E. OSTLINE
BY
Smith, Olsen & Baird
ATTYS.

Sept. 18, 1956 J. E. OSTLINE 2,763,725
TELEPHONE SYSTEMS
Original Filed Feb. 23, 1946 61 Sheets-Sheet 30

INVENTOR.
JOHN E. OSTLINE
BY
Smith, Olsen & Baird
ATTYS.

INVENTOR.
JOHN E OSTLINE
BY
Smith, Olsen & Baird
ATTYS.

INVENTOR.
JOHN E. OSTLINE
BY
Smith, Olsen & Baird
ATTYS.

Sept. 18, 1956 J. E. OSTLINE 2,763,725
TELEPHONE SYSTEMS
Original Filed Feb. 23, 1946 61 Sheets-Sheet 33

INVENTOR.
JOHN E. OSTLINE
BY
Smith, Olsen + Baird
ATTYS.

Sept. 18, 1956 J. E. OSTLINE 2,763,725

TELEPHONE SYSTEMS

Original Filed Feb. 23, 1946 61 Sheets-Sheet 34

*INVENTOR.*
JOHN E. OSTLINE
*BY* Smith, Olsen & Baird
ATTYS

Sept. 18, 1956 J. E. OSTLINE 2,763,725

TELEPHONE SYSTEMS

Original Filed Feb. 23, 1946

61 Sheets-Sheet 35

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 36

INVENTOR.
JOHN E. OSTLINE

BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 37

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 38

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946

61 Sheets-Sheet 39

INVENTOR.
JOHN E. OSTLINE

BY

Smith, Olsen & Baird

ATTYS.

INVENTOR.
JOHN E. OSTLINE
BY
*Smith, Olsen & Baird*
ATTYS.

Sept. 18, 1956 J. E. OSTLINE 2,763,725

TELEPHONE SYSTEMS

Original Filed Feb. 23, 1946

61 Sheets-Sheet 41

INVENTOR.

JOHN E. OSTLINE

BY

Smith, Olsen & Baird

ATTYS.

Sept. 18, 1956 J. E. OSTLINE 2,763,725

TELEPHONE SYSTEMS

Original Filed Feb. 23, 1946 61 Sheets-Sheet 42

*INVENTOR.*

JOHN E. OSTLINE

*BY*

Smith, Olsen & Baird

ATTYS.

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 44

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946

61 Sheets-Sheet 45

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 46

INVENTOR.
JOHN E. OSTLINE
BY
Smith, Olsen + Baird
ATTYS.

INVENTOR.
JOHN E. OSTLINE
BY
Smith, Olsen & Baird
ATTYS.

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 49

*INVENTOR.*
JOHN E. OSTLINE
*BY*
Smith, Olsen & Baird
ATTYS.

Sept. 18, 1956 J. E. OSTLINE 2,763,725

TELEPHONE SYSTEMS

Original Filed Feb. 23, 1946

61 Sheets-Sheet 50

INVENTOR.
JOHN E. OSTLINE

BY
*Smith, Olsen & Baird*

ATTYS.

Sept. 18, 1956 J. E. OSTLINE 2,763,725

TELEPHONE SYSTEMS

Original Filed Feb. 23, 1946 61 Sheets-Sheet 51

*INVENTOR.*
JOHN E. OSTLINE
*BY*
Smith, Olsen & Baird
ATTYS.

INVENTOR.
JOHN E. OSTLINE
BY
Smith, Olsen + Baird
ATTYS.

Sept. 18, 1956 J. E. OSTLINE 2,763,725

TELEPHONE SYSTEMS

Original Filed Feb. 23, 1946

61 Sheets-Sheet 53

INVENTOR.
JOHN E. OSTLINE
BY
Smith, Olsen & Baird
ATTYS.

Sept. 18, 1956 J. E. OSTLINE 2,763,725

TELEPHONE SYSTEMS

Original Filed Feb. 23, 1946 61 Sheets-Sheet 54

INVENTOR.
JOHN E. OSTLINE
BY
Smith, Olsen + Baird
ATTYS.

INVENTOR.
JOHN E. OSTLINE
BY
Smith, Olsen & Baird
Attys.

*INVENTOR.*
JOHN E. OSTLINE
*BY*
Smith, Olsen & Baird
ATTY'S.

Sept. 18, 1956 J. E. OSTLINE 2,763,725

TELEPHONE SYSTEMS

Original Filed Feb. 23, 1946

61 Sheets-Sheet 57

TOLL SELECTOR REPEATER

INVENTOR.
JOHN E. OSTLINE

BY Smith, Olsen & Baird

ATTYS.

Sept. 18, 1956 J. E. OSTLINE 2,763,725

TELEPHONE SYSTEMS

Original Filed Feb. 23, 1946

61 Sheets-Sheet 58

INVENTOR.
JOHN E. OSTLINE
BY
Smith, Olsen & Baird
ATTYS

Sept. 18, 1956 J. E. OSTLINE 2,763,725

TELEPHONE SYSTEMS

Original Filed Feb. 23, 1946

61 Sheets-Sheet 59

*INVENTOR.*
JOHN E. OSTLINE

BY
Smith, Olsen & Baird

ATTYS.

INVENTOR.
JOHN E. OSTLINE
BY Smith, Olsen & Baird
ATTYS.

*INVENTOR.*
JOHN E. OSTLINE
*BY*
Smith, Olsen & Baird
ATTYS.

United States Patent Office 2,763,725 Patented Sept. 18, 1956

2,763,725

TELEPHONE SYSTEMS

John E. Ostline, Chicago, Ill., assignor to Automatic Electric Laboratories, Inc., Chicago, Ill., a corporation of Delaware Original application February 23, 1946, Serial No. 649,583. Divided and this application May 13, 1950, Serial No. 161,747

21 Claims. (Cl. 179—27)

Figure 1:
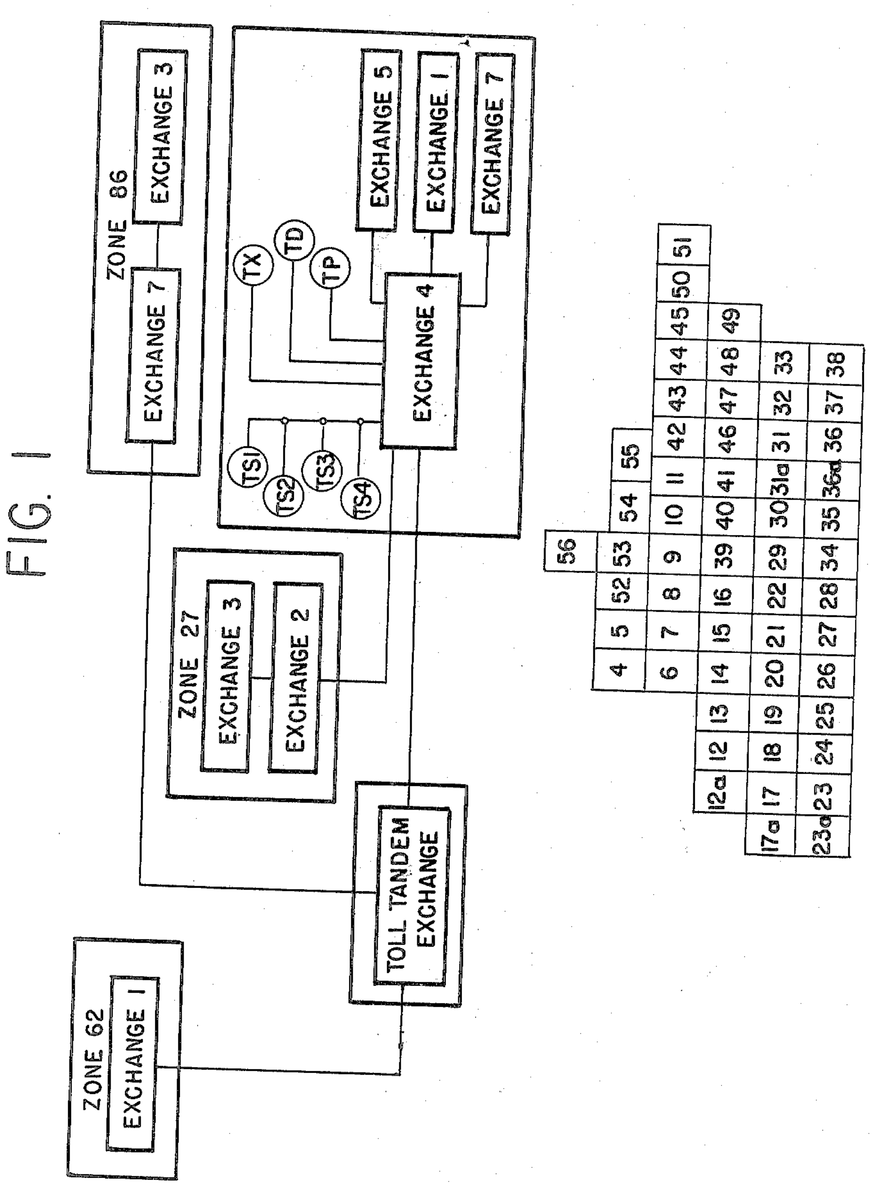

The present invention relates to automatic telephone systems and more particularly to automatic recording apparatus operative to record given particulars of certain calls in the systems. More particularly, the present invention relates to improvements in telephone systems of the character disclosed in the copending application of John E. Ostline, Serial No. 453,799, filed August 6, 1942, now Patent No. 2,586,704, granted February 19, 1952. This application is a division of the copending application of John E. Ostline, Serial No. 649,583, filed February 23, 1946, now Patent No. 2,581,287, granted January 1, 1952.

Accordingly, it is an object of the present invention to provide in an automatic telephone system of the type noted, improved switching apparatus for automatically completing certain calls within the area served by the system and automatically recording given particulars in conjunction with such calls, without the aid of an operator.

Another object of the invention is to provide in an automatic system of the type noted, improved register mechanism for controlling the operation of the switching apparatus to set up various connections and for collecting certain items of information pertaining to the connections to be recorded.

A further object of the invention is to provide in an automatic telephone system including apparatus for calculating the cost of connections in accordance with the time duration thereof, an improved arrangement for preventing any operation of the mechanism for controlling the calculating apparatus in the event the time duration of a connection exceeds the calculating capacity of the calculating apparatus and for registering the time duration of a connection in either event.

A further object of the invention is to provide in an automatic telephone system, improved repeater circuits arranged to be utilized in connections involving either long or short toll lines and which alter the supervisory circuits included therein in accordance with the length of the toll lines over which the connections are completed.

A further object of the invention is to provide in an automatic telephone system including apparatus for setting up a connection from a calling line to a called line, an improved arrangement for forcibly releasing the connection a predetermined elapsed time interval after the called line has released and which becomes effective only in the event the calling line fails to release the connection within said time interval.

A further object of the invention is to provide in an automatic telephone system including apparatus for registering the directory numbers of called subscriber lines transmitted from calling lines, an improved arrangement for automatically intercepting calls initiated over calling lines which are falsely grounded.

A further object of the invention is to provide in an automatic telephone system including facilities for intercepting certain calls, an improved intercepting trunk circuit which is selectively controllable to visually indicate to the intercepting operator the various classes of intercepted calls.

A still further object of the invention is to provide in an automatic telephone system including apparatus for normally causing a record to be made of certain items of record information pertaining to a connection provided an answering signal is received by the apparatus, an improved arrangement for causing a record to be made of certain items of record information pertaining to connections extended to lines included in a predetermined group of lines regardless of the fact that an answering signal is not received by the apparatus.

Further features of the invention pertain to the particular arrangement of the circuit elements of the system, whereby the above-outlined and additional operating features are attained.

Figure 2:
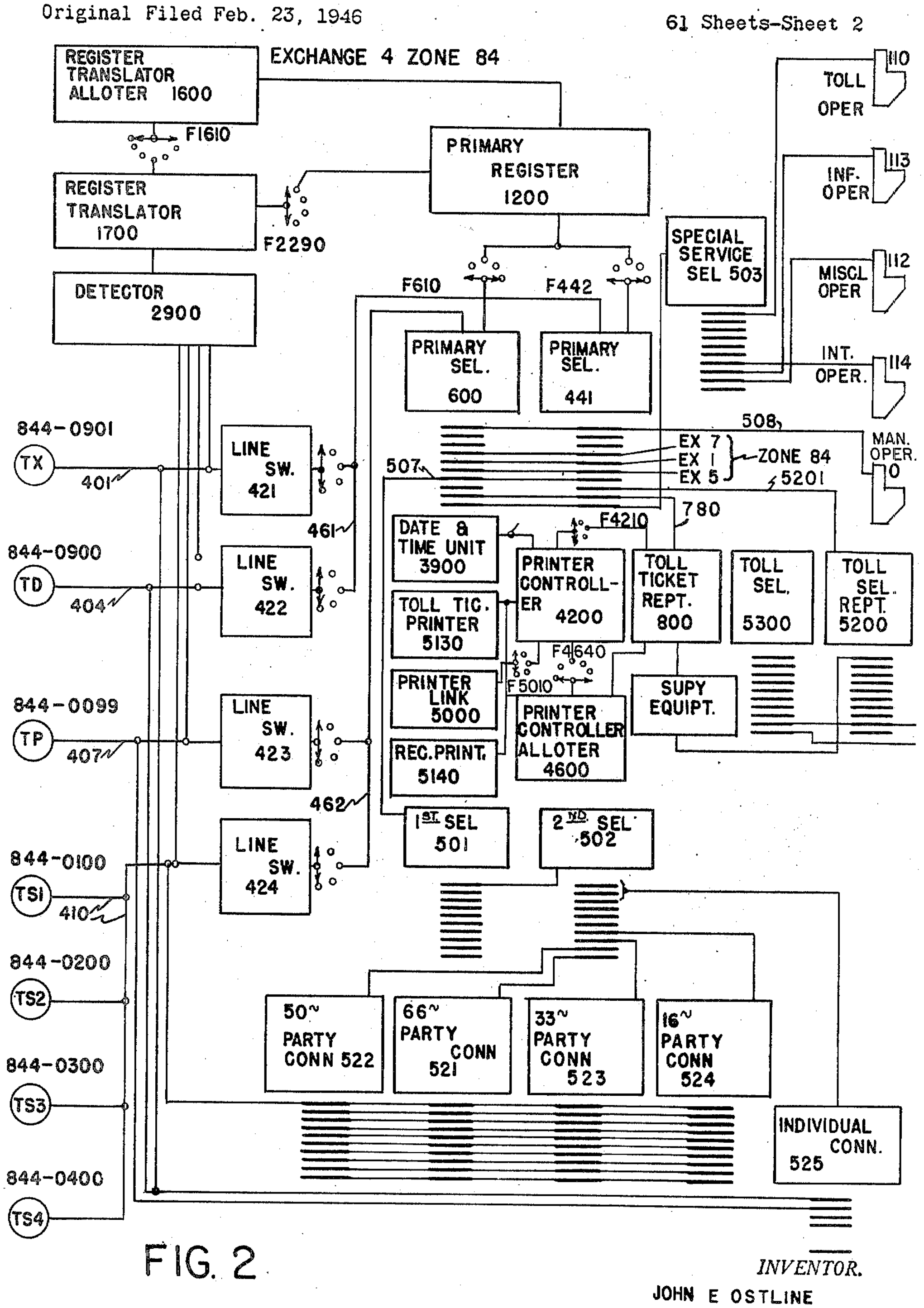
Figure 3:
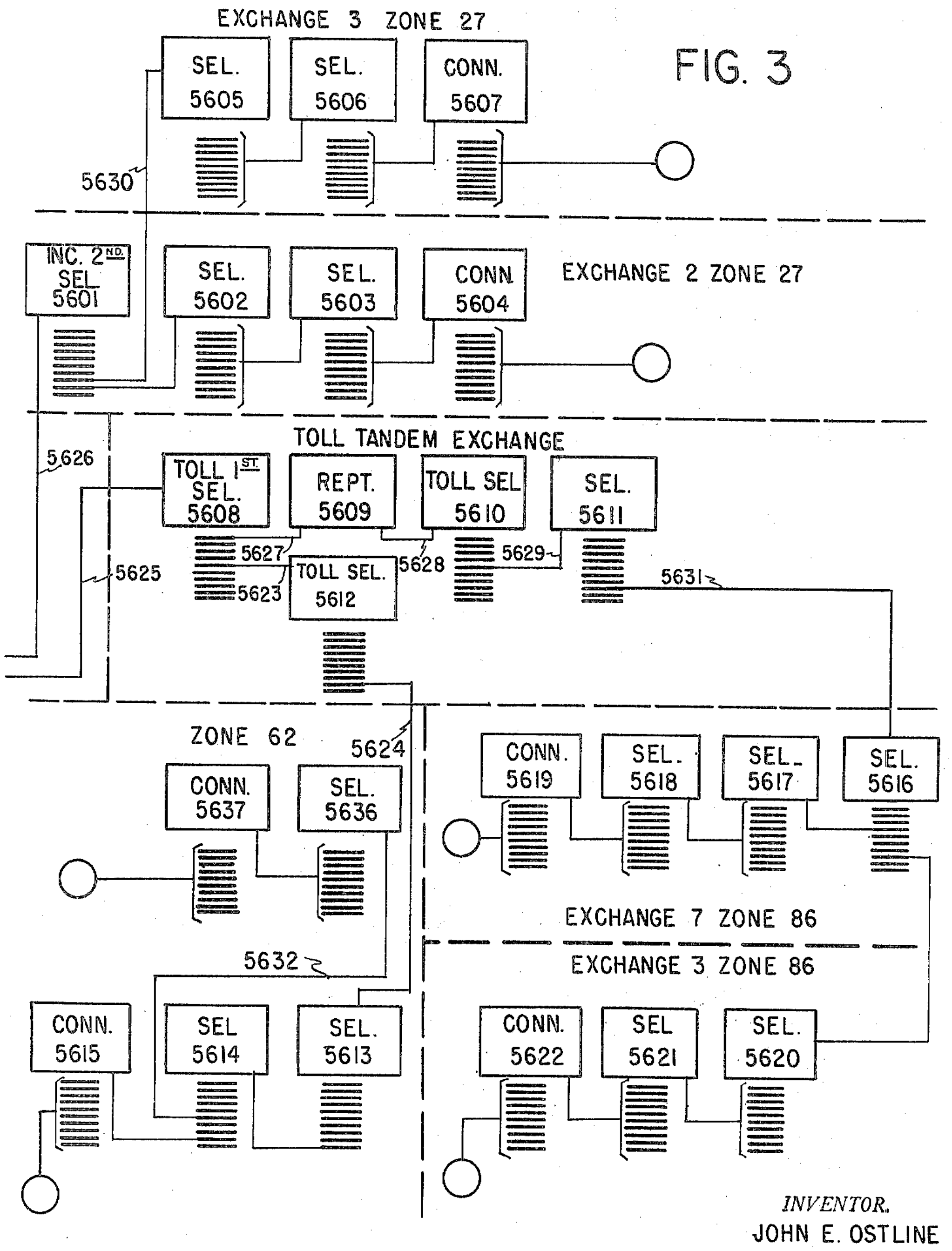
Figure 4:
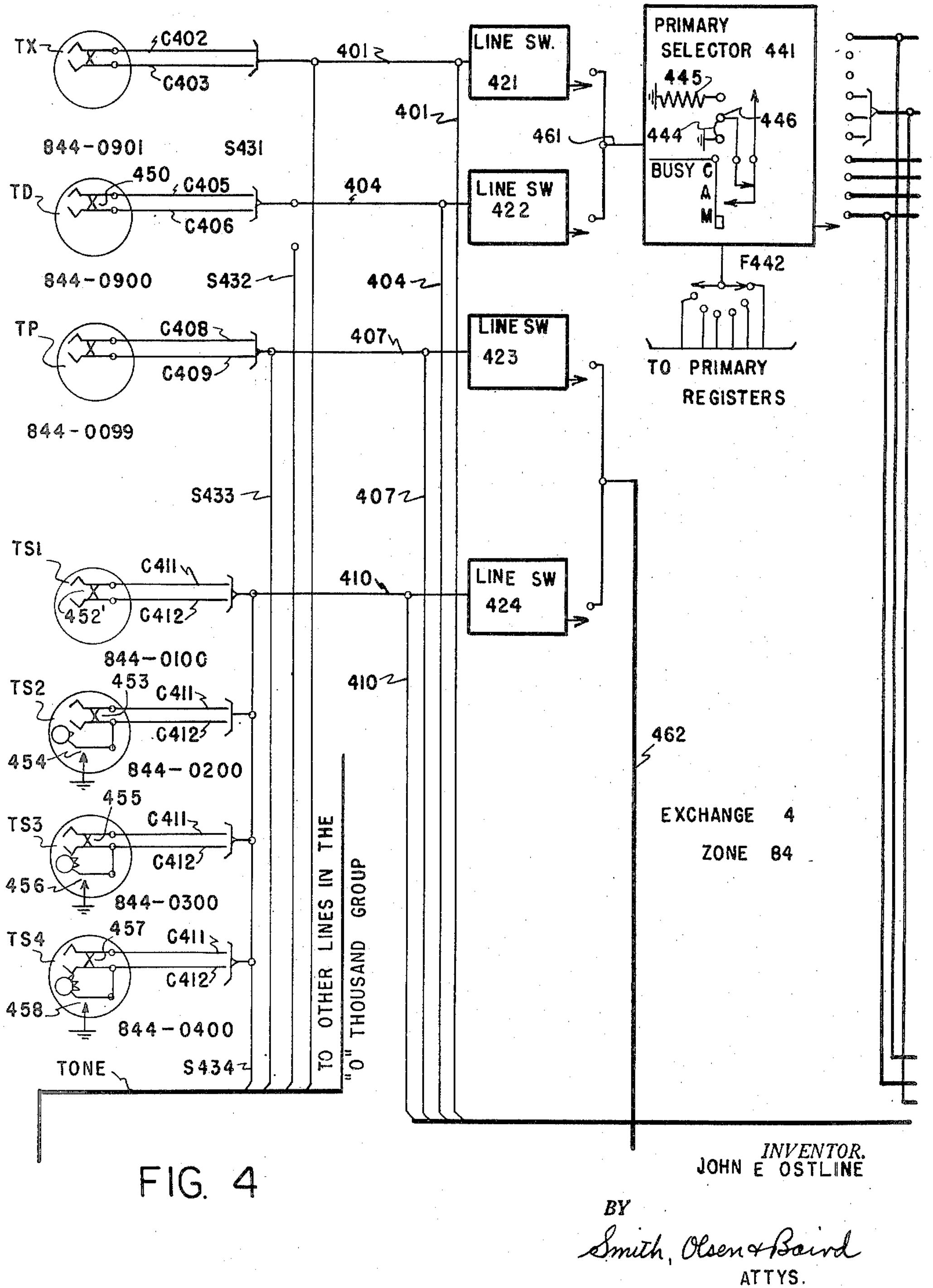
Figure 55:
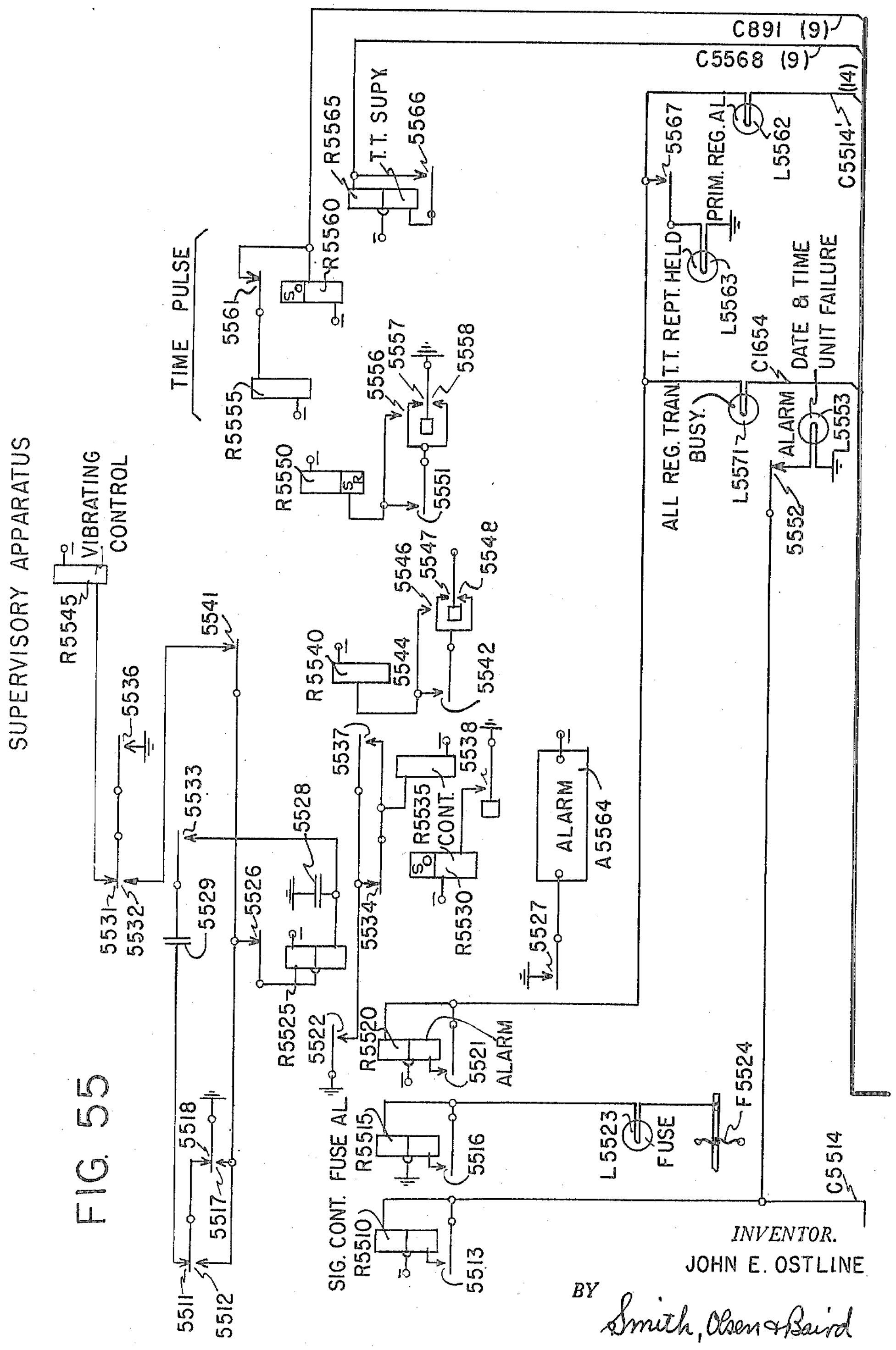
Figure 56:
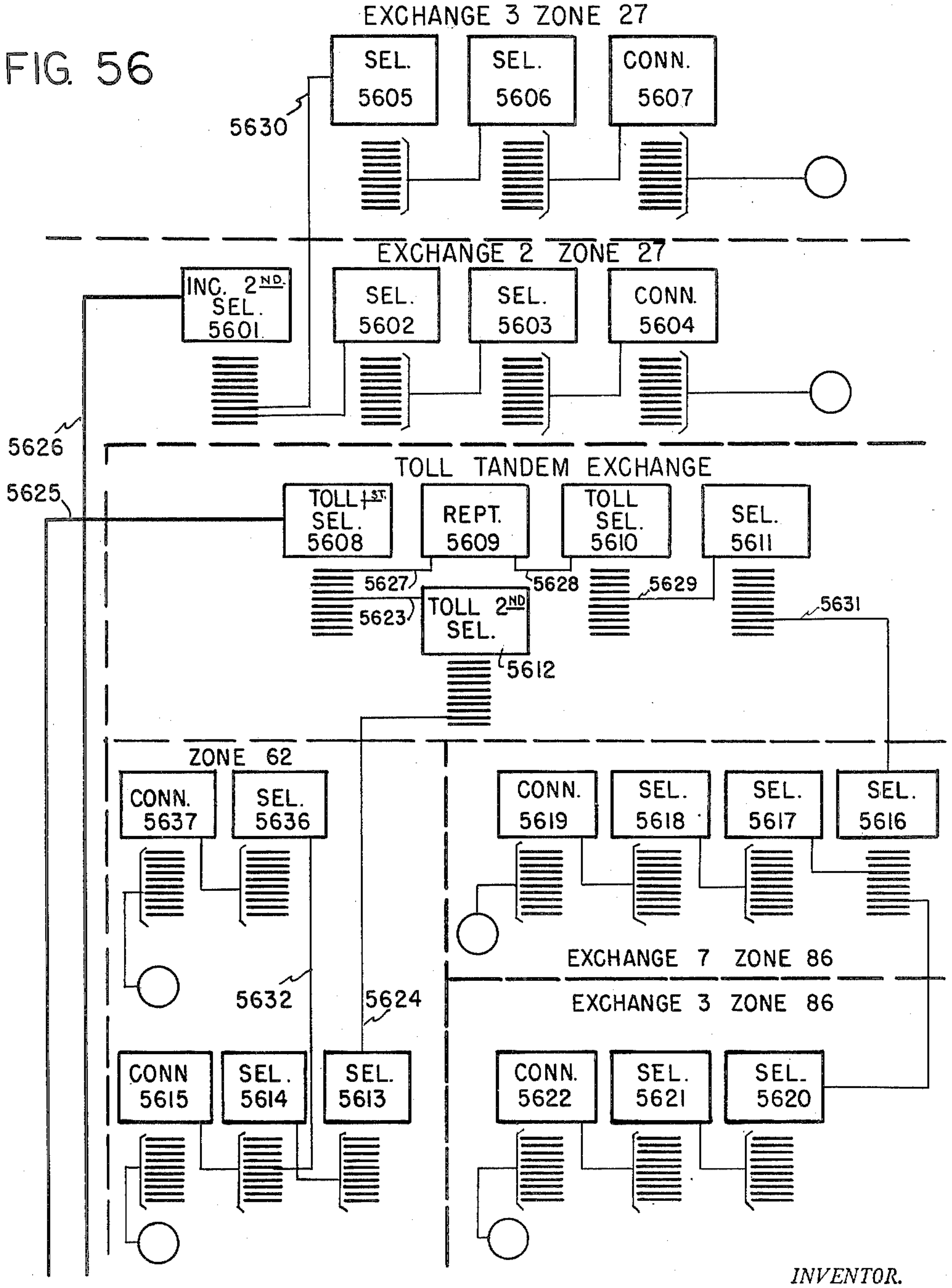

The invention both as to its organization and method of operation, together with further objects and advantages thereof, will best be understood by reference to the following specification taken in connection with the accompanying drawings wherein Figure 1 is a schematic diagram of the area served by a telephone system embodying the present invention; Figs. 2 and 3, taken together, illustrate the general arrangement of the apparatus in corporated in the main exchange 4 in zone 84, the nearby exchanges 2 and 3 in zone 27, the more distant toll tandem exchange, the single exchange in zone 62, and the exchanges 3 and 7 in zone 86 of the telephone systems; Figs. 4 to 55, inclusive, taken together, illustrate the details of the apparatus incorporated in exchange 4 zone 84 of the telephone system, which apparatus has incorporated therein the features of the invention as briefly outlined above; Fig. 56 schematically illustrates the apparatus incorporated in the exchanges included in zones 27, 62 and 86 and the toll tandem exchange; and Fig. 57 illustrates the mode of combining Figs. 4 to 56, inclusive, to form a unified system.

Figure 5:
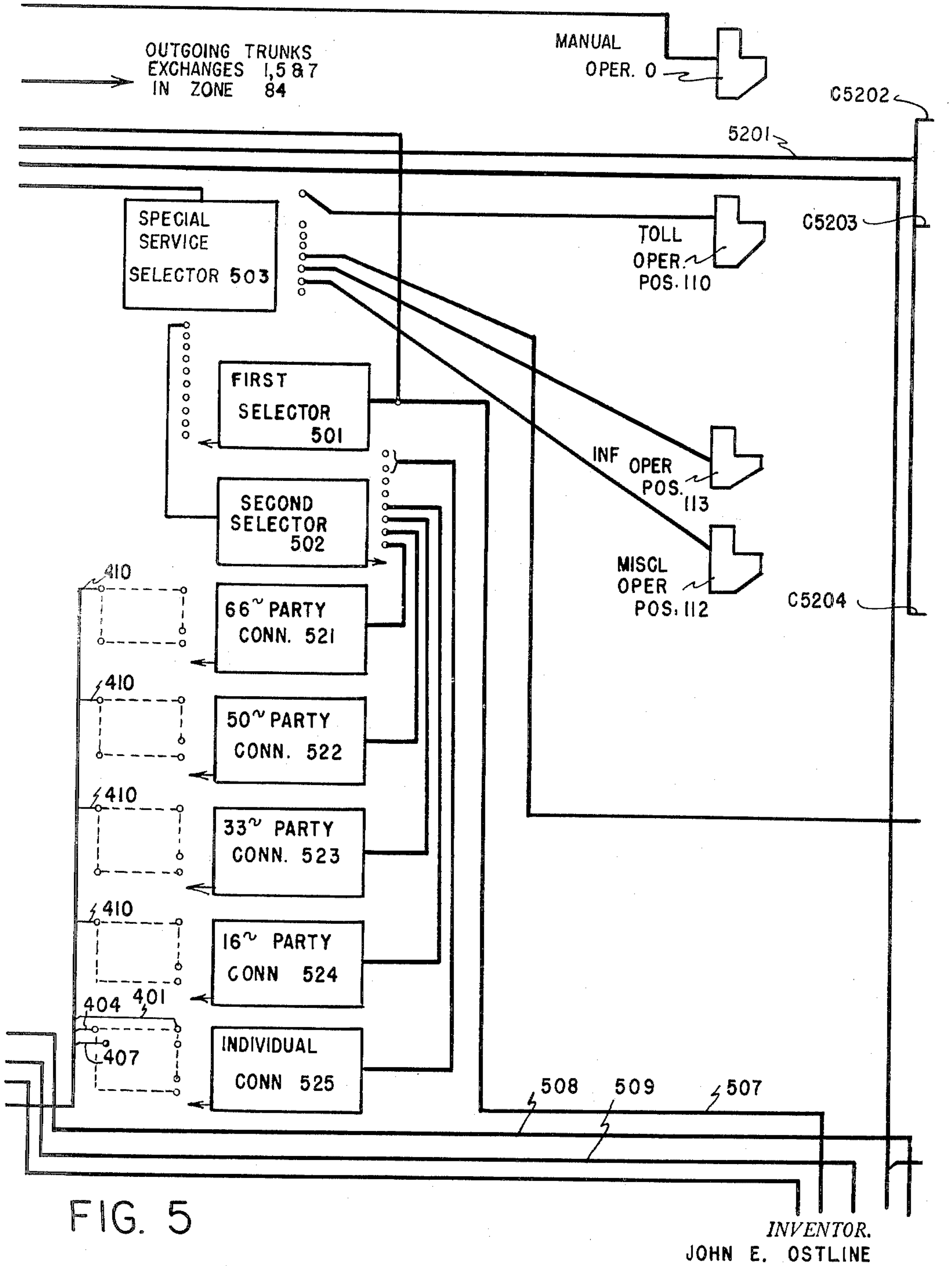
Figure 6:
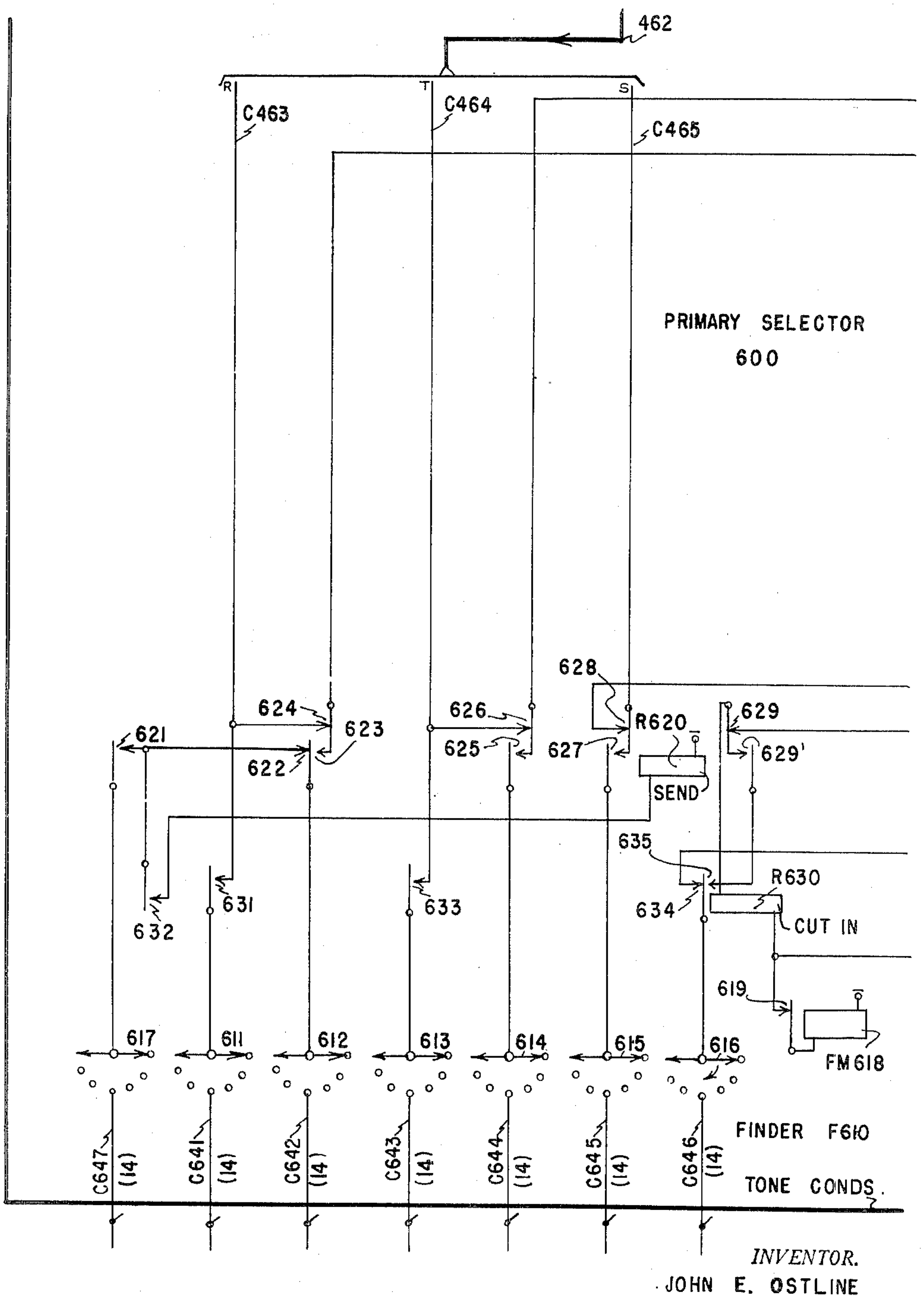
Figure 7:
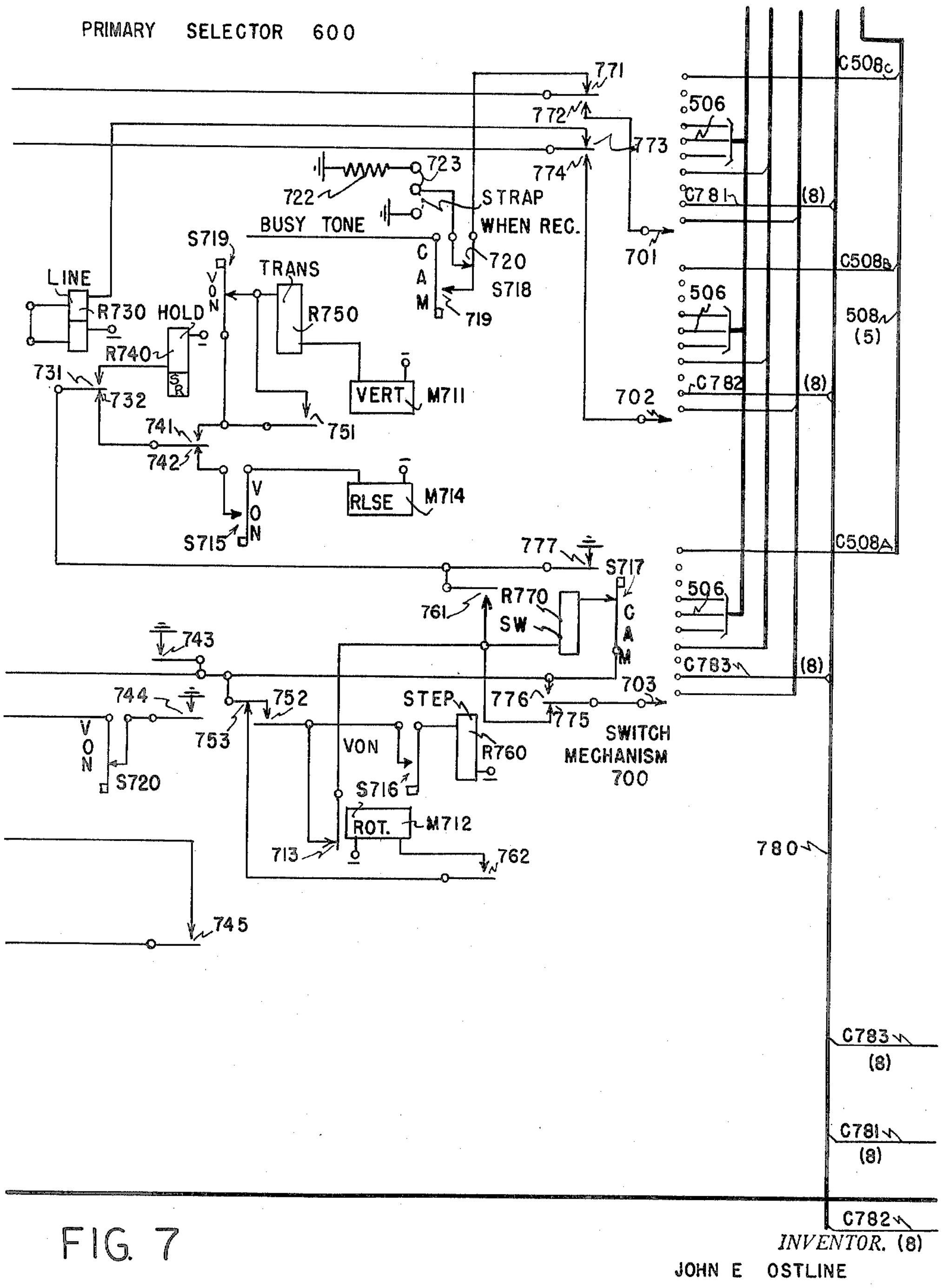
Figure 39:
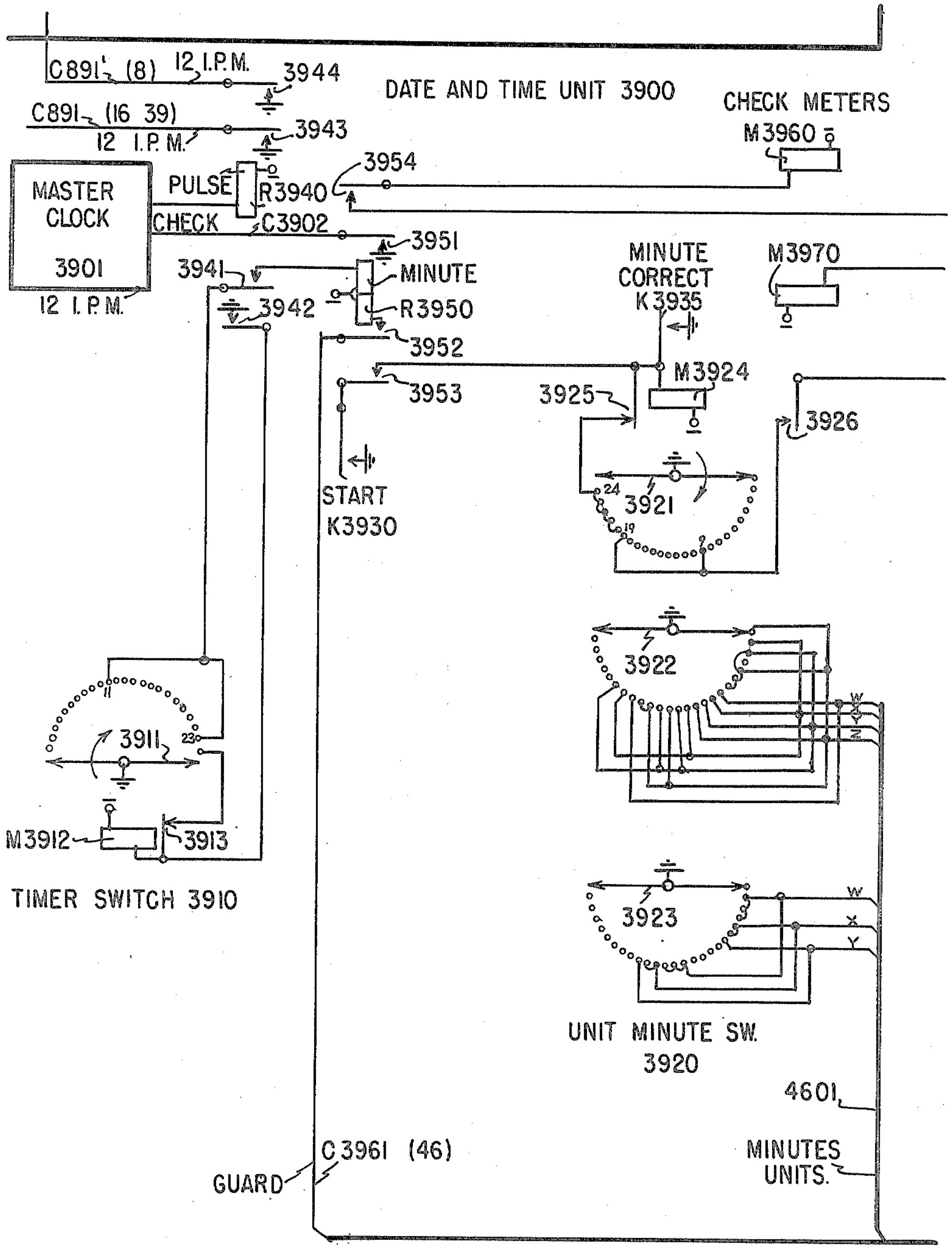
Figure 40:
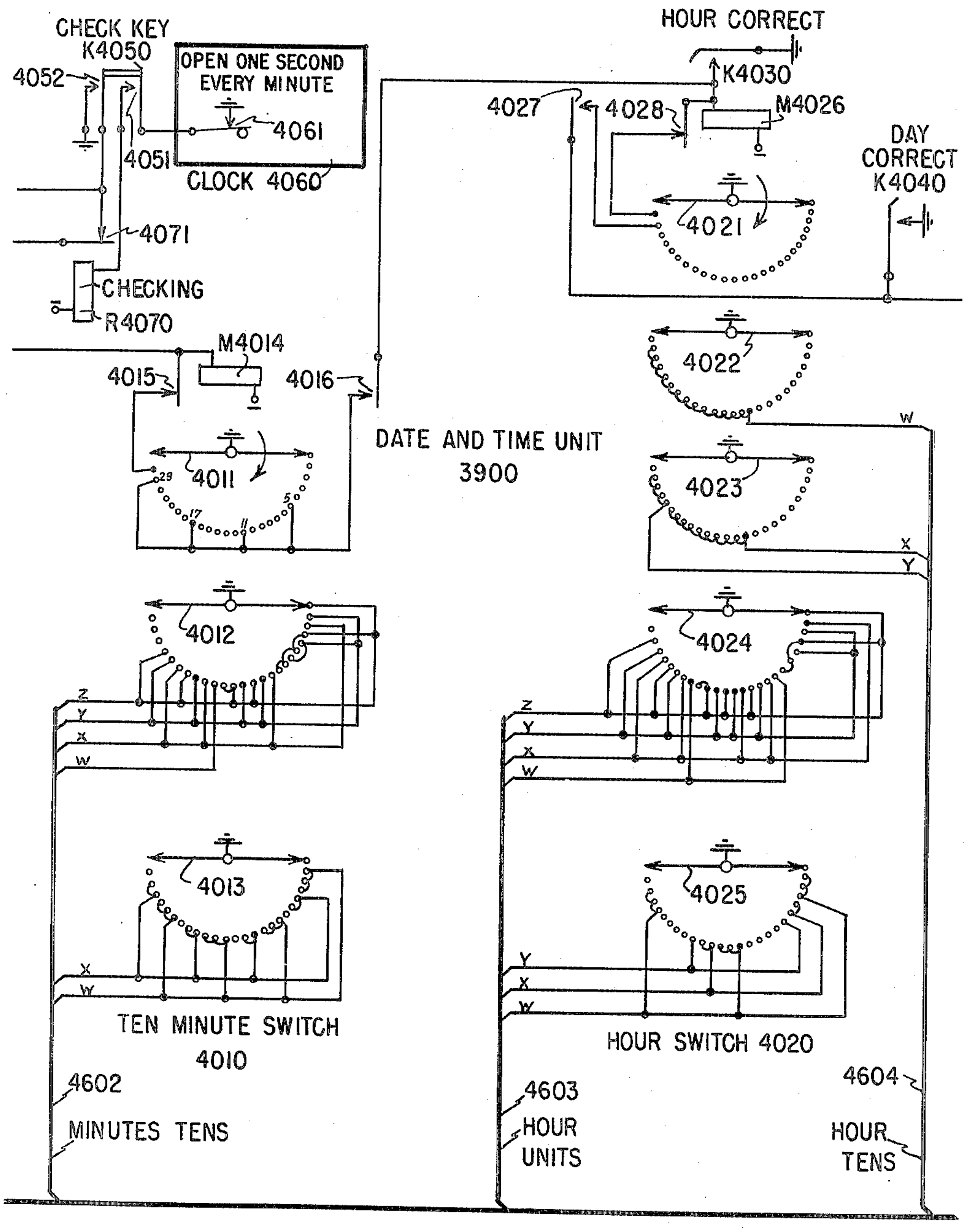
Figure 41:
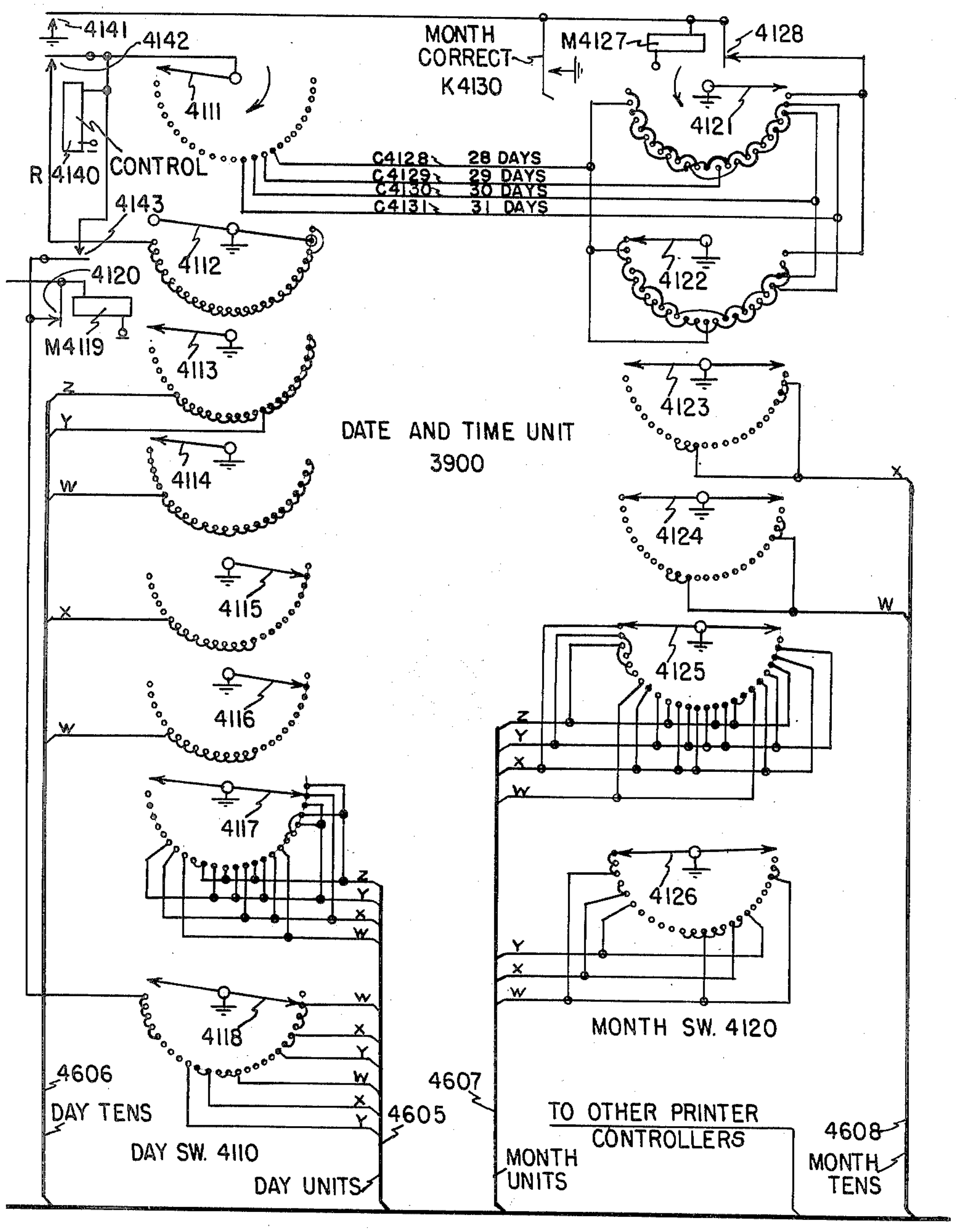
Figure 50:
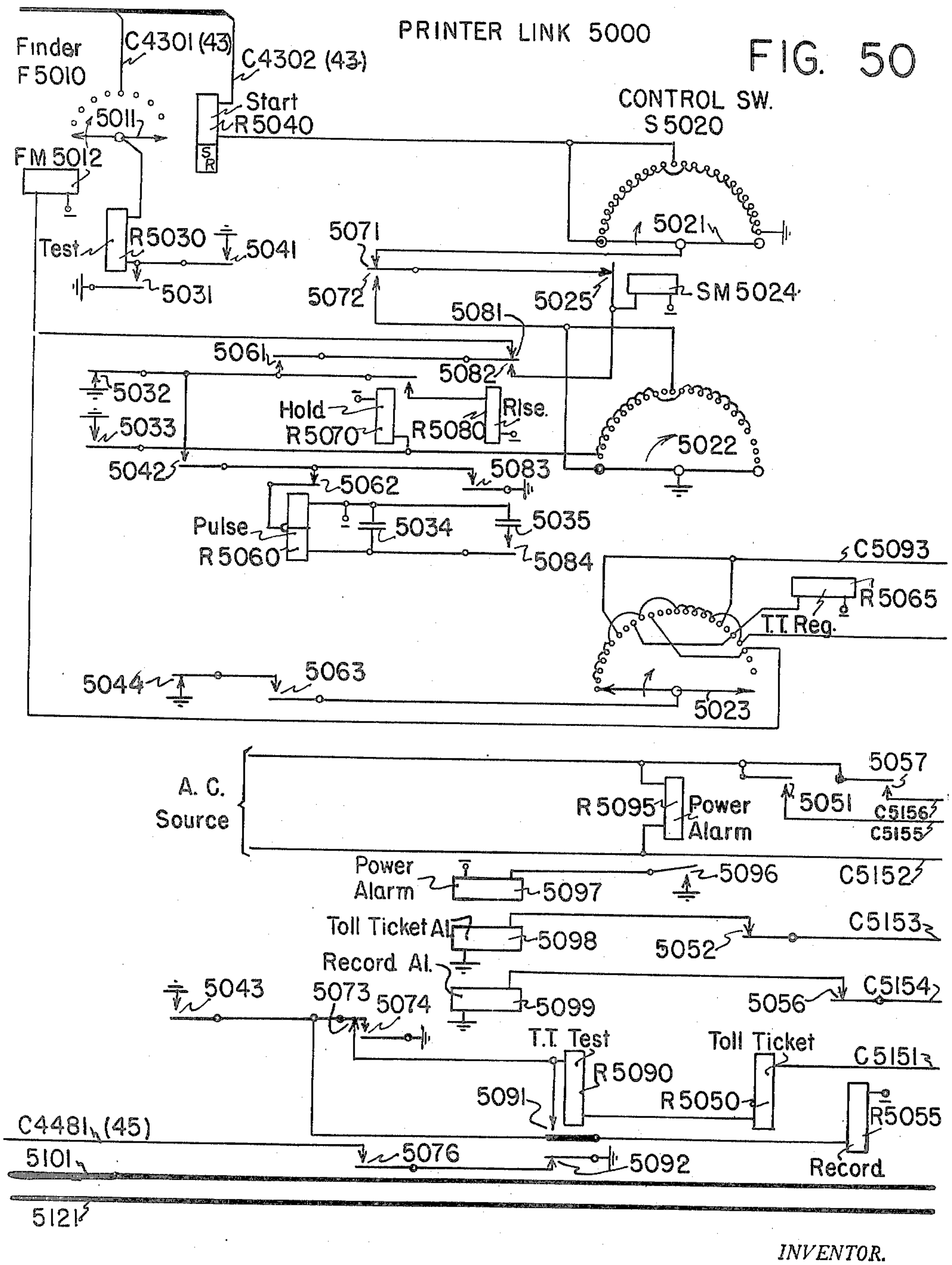
Figure 51:
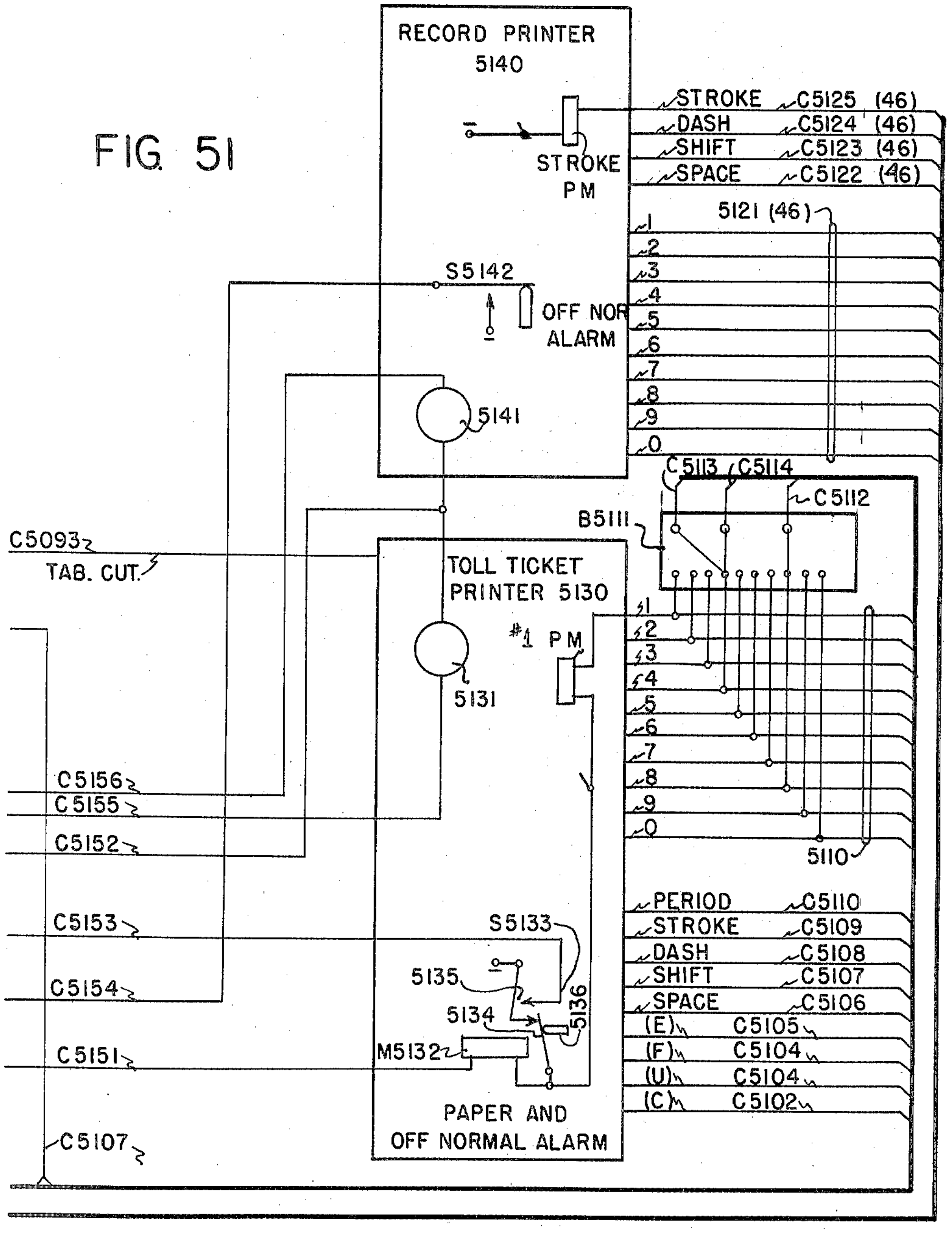
Figure 52:
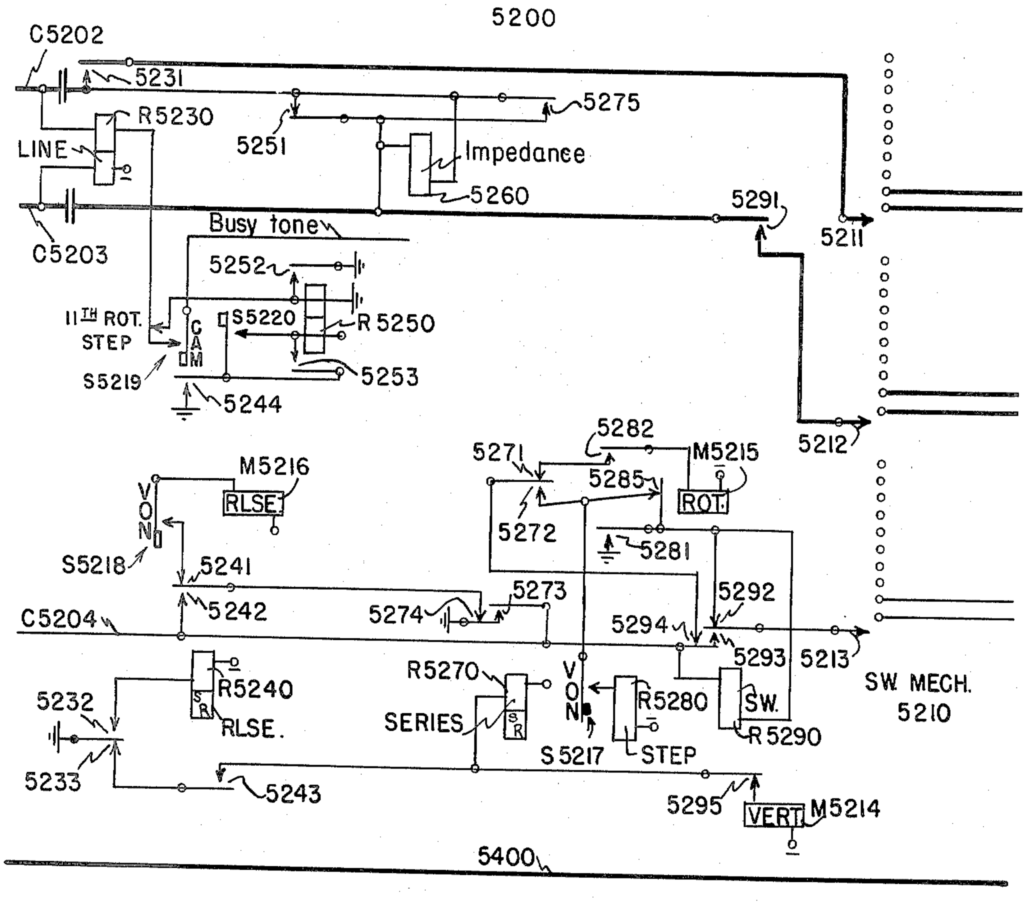
Figure 53:
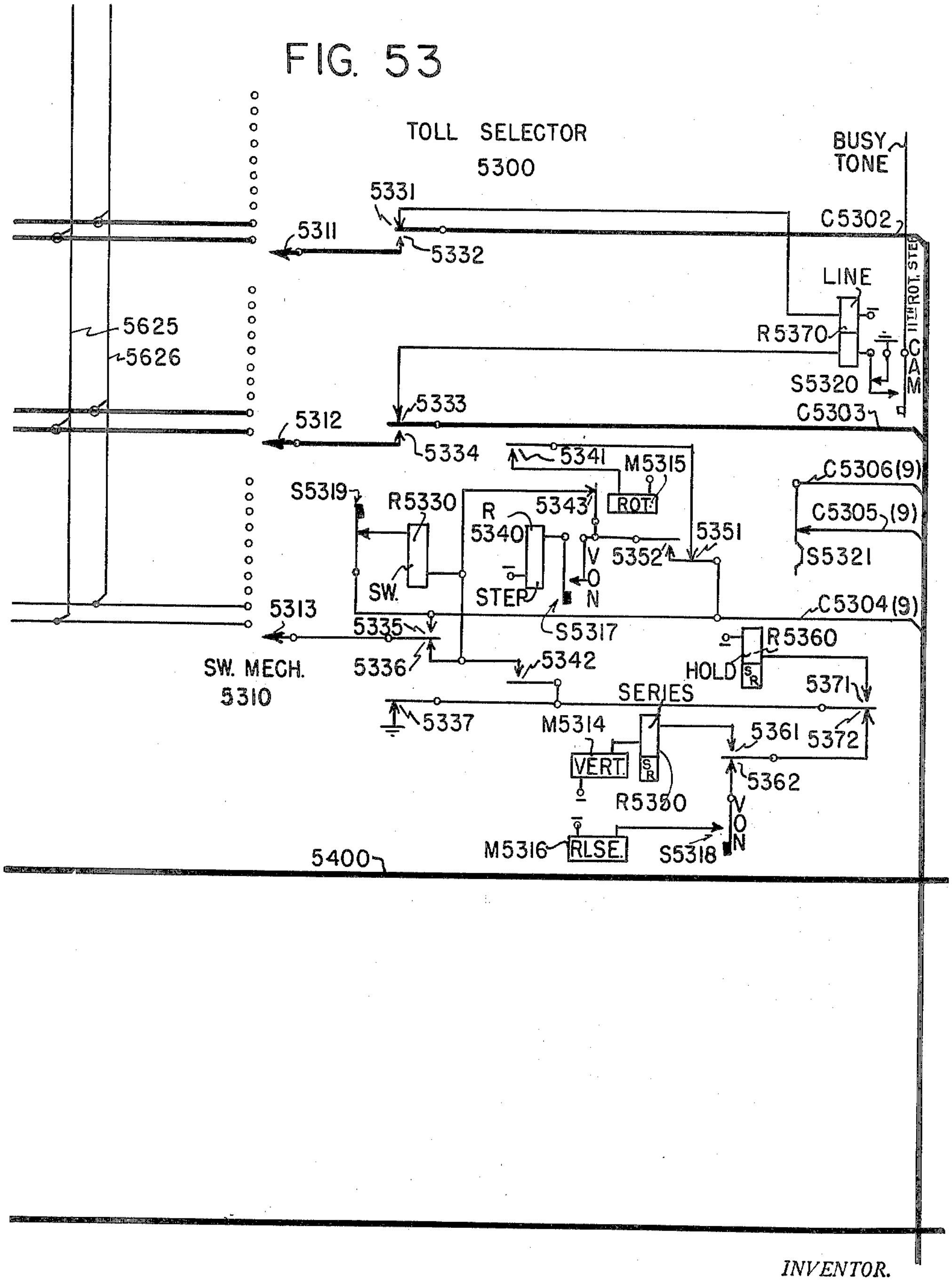
Figure 54:
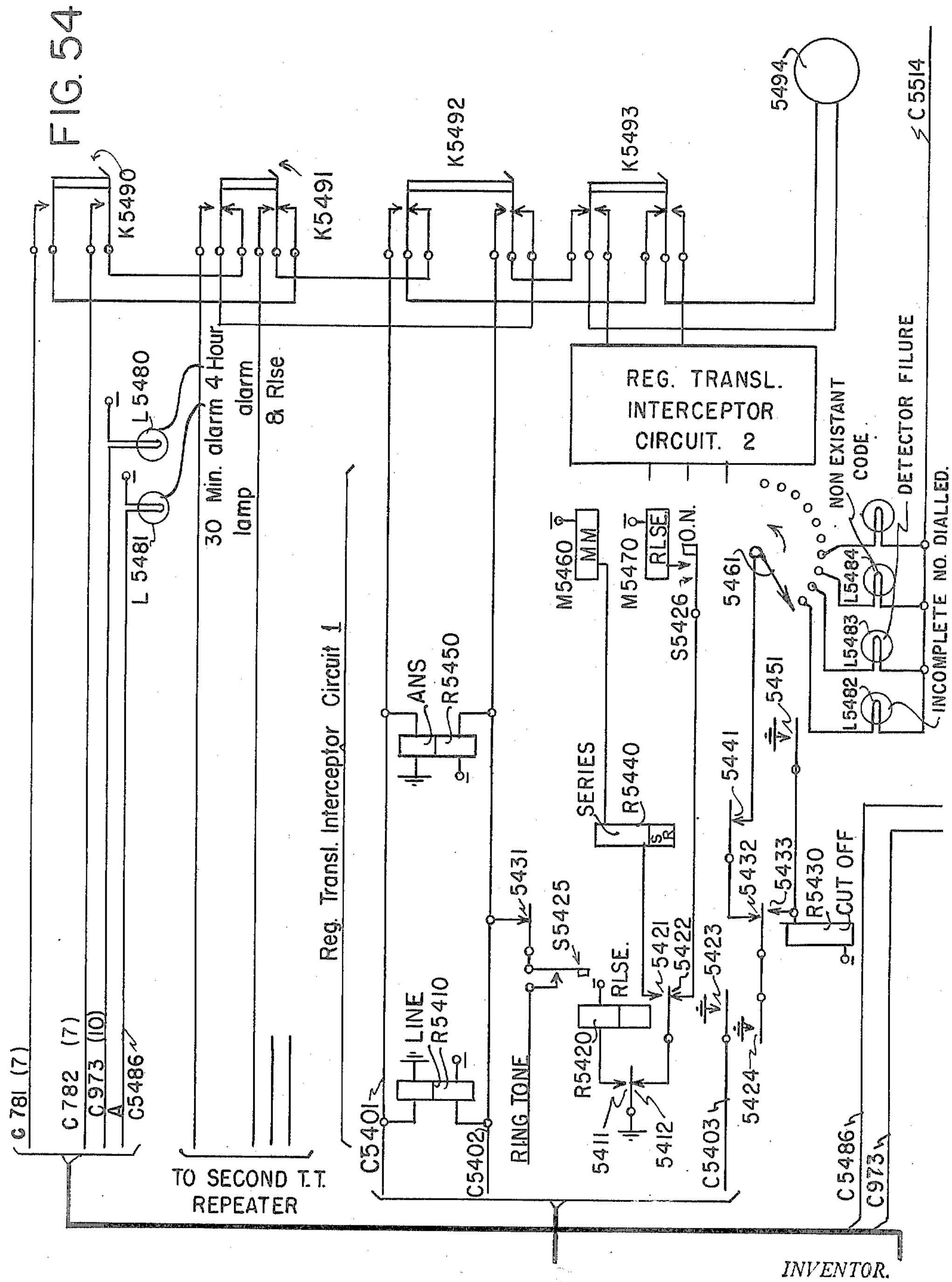

More particularly, the equipment and apparatus comprising the main exchange 4 zone 84 is shown as follows: Figs. 4 and 5 illustrate the switching apparatus and trunking network; Figs. 6 and 7 illustrate the details of one of the primary selectors and one of the primary register finders; Figs. 8 to 11, inclusive, illustrate the details of one of the toll ticket repeaters; Figs. 12A and 12 to 16, inclusive, illustrate the details of one of the primary registers; Figs. 17A, 23A, and 17 to 28, inclusive, illustrate the details of one of the register translators; Figs. 31A, 36A, and 29 to 38, inclusive, illustrate the details of the detector; Figs. 39 to 41, inclusive, illustrate the details of the date and time unit; Figs. 42 to 49, inclusive, illustrate the details of one of the printer controllers; Fig. 50 illustrates the details of the printer link; Fig. 51 illustrates diagrammatically certain details of the toll ticket printer and the record printer; Fig. 52 illustrates the details of the toll selector repeater; Fig. 53 illustrates the details of the toll selector; and Figs. 54 and 55 illustrate the details of the supervisory apparatus.

*General arrangement of the telephone system*

Referring now more particularly to Fig. 1 of the drawings, it will be observed that the automatic telephone system serves a large metropolitan area including a plurality of zones, each of which includes one or more exchange area. Certain of the zones may be located adjacent to the main exchange zone and other zones, being more distant, may be reached only by way of a toll tandem exchange which functions as a toll switching center and provides the necessary amplifying repeaters for connections extended to the more distant zones. More specifically, the area served by the telephone system comprises zones 27, 62, 84 and 86; zone 27 includes the exchanges 2 and 3;

zone 62 includes the single exchange illustrated; zone 84 includes the exchanges 4, 5, 6 and 7; and zone 86 includes the exchanges 3 and 7. Each exchange in each of the zones comprises a 10,000 terminal unit, even though it may not be initially installed to serve its ultimate terminal capacity. The lines terminating at each of the exchanges in the system comprise private subscriber lines, party subscriber lines, denied toll service subscriber lines, and extended service subscriber lines. The party lines in the present system are of the four party type and are arranged on a terminal-per-station basis, thus providing each subscriber substation on a party line with a separate distinct directory number.

The various exchanges in each of the zones are interconnected with the main exchange 4 zone 84 by suitable groups of trunk lines for the purpose of enabling subscribers in the main exchange to extend connections to subscriber lines terminating in any of the exchanges included in the telephone system. Furthermore, the various exchanges in the telephone system are also interconnected by suitable groups of trunk lines, not shown, to enable the subscribers thereat to extend connections to subscriber lines terminating in the main exchange 4 zone 84 and also to extend connections to subscriber lines terminating in other exchanges included in the telephone system.

In the automatic telephone system the various local, trunk, and toll calls are set up by automatic switching apparatus under the control of the subscriber substation equipment, including the usual calling device or dial. In order to facilitate the setting up of various connections, a mixed numbering scheme is utilized in the automatic telephone system, whereby all called subscriber substations in the various exchanges in the various zones of the system are dialed as listed in the directory. Accordingly, the directory number of each subscriber substation in the telephone system comprises a code portion, including either two or three digits, and a numerical portion, including four digits. More particularly, the directory number of certain of the subscriber substations in zone 62 comprises a code portion, including only the digits "6" and "2," in view of the fact that there is only one exchange in this zone, while other subscriber substations in this exchange may also be identified by a code portion comprising three digits; whereas the directory number of each subscriber substation in zones 27, 84 and 86 comprises a code portion including three digits, in view of the fact that there are a plurality of exchanges in each of these zones. Thus, it will be understood that the directory number of each subscriber substation in zone 84, for example, will comprise a code portion, including the digits "8" and "4," and an additional digit identifying the particular exchange in zone 84, including the subscriber substation. Accordingly, the directory number of each subscriber substation in exchange 4 zone 84, for example, will comprise a code portion, including the digits "8," "4" and "4." Further, it is pointed out that in view of the fact that the party subscriber lines are arranged on a terminal-per-station basis, the directory number of each subscriber substation in each exchange in each zone comprises, in addition to the code portion, a numerical portion including only four digits, no suffix digit being necessary. In view of the above, it will be understood that the directory numbers of the various subscriber substations in the telephone system comprise different numbers of digits, the number of digits varying between six and seven, depending upon the particular zone of the exchange including the subscriber substation.

*The apparatus incorporated in exchange 4 zone 84 of the telephone system*

Preferably, each exchange in the telephone system comprises apparatus substantially identical to that provided in exchange 4 zone 84, which apparatus, as best shown in Figs. 2 and 3, includes automatic switching equipment serving a maximum of 10,000 terminals, three of the terminals respectively terminating the private subscriber lines 401, 404 and 407, and four of the terminals commonly terminating the party subscriber line 410. The switching equipment comprises a number of line switches individually associated with the subscriber lines terminating at exchange 4 zone 84, the line switches 421, 422, 423 and 424 being respectively associated with the private subscriber lines 401, 404 and 407 and the party subscriber line 410. At this point it is noted that the private subscriber line 401 has a private subscriber substation TX connected thereto which is rendered extended private subscriber substation service; the private subscriber line 404 has a private subscriber substation TD connected thereto which is rendered denied toll private subscriber substation service; the private subscriber line 407 has a private subscriber substation TP connected thereto which is rendered ordinary private subscriber substation service; while the party subscriber line 410 has four party subscriber substations TS1, TS2, TS3 and TS4 connected thereto which are rendered party subscriber substation service. More particularly, the ordinary private subscriber substation TP and the party subscriber substations TS1, TS2, TS3 and TS4 are rendered free automatic local service, automatic toll service to the exchanges in the various zones in the metropolitan area for which charges are made on a monetary basis, as well as long distance toll service via a manual toll operator position. The extended service private subscriber substation TX is rendered free automatic local service, free automatic toll service to certain exchanges in adjacent zones in the metropolitan area, automatic toll service to other exchanges in the various zones in the metropolitan area for which charges are made on a unit call basis, as well as long distance toll service via a manual toll operator position. Finally, the denied toll service private subscriber substation TD is rendered free automatic local service, toll service to the exchanges in the various zones in the metropolitan area via a manual intercepting operator position, as well as long distance toll service via a manual toll operator position.

Further, it is noted that the line switch 421, terminating the extended service private subscriber line 401, as well as the line switch 422, terminating the denied toll service private subscriber line 404, are arranged in a first group; while the line switch 423 terminating the ordinary private subscriber line 407, as well as the line switch 424, terminating the party subscriber line 410, are arranged in a second group. Also, the switching equipment comprises a first group of primary selectors, including the primary selector 441 which is accessible to the line switches 421 and 422 and other similar line switches in the first group; as well as a second group of primary selectors, including the primary selector 600 which is accessible to the various line switches 423 and 424 and other similar line switches in the second group. Each primary selector is provided with an individually associated finder having access to a group of primary registers, the finders F442 and F610 being respectively associated with the primary selectors 441 and 600.

Further, exchange 4 zone 84 is provided with a group of primary registers, including the primary register 1200 which is accessible to the various finders individually associated with the primary selectors in the two groups. Further, there is also provided a group of register translators, including the register translator 1700, and a register translator allotter 1600. The register translator allotter 1600 comprises a finder F1610 having access to the group of register translators; and each register translator comprises a finder having access to the group of primary registers, the register translator 1700 comprising the finder F2290 having access to the group of primary registers including the primary register 1200. At this point it is noted that the group of primary registers is larger than the group of register translators in order to effect a saving in equipment, in view of the fact that the connection and arrangement of a primary register is much more simplified than the relatively complex connection and arrangement of a register translator.

Also, exchange 4 zone 84 is provided with a local switch train comprising a number of groups of first selectors, one of the groups including the first selector 501; a number of groups of second selectors, one of the groups including the second selector 502; a number of groups of individual connectors, one of the groups including the individual connector 525; a number of special service selectors, including the special service selector 503; and a number of groups of party connectors, four of the groups respectively including the party connectors 521, 522, 523 and 524. A manual switchboard is also provided in exchange 4 zone 84 which includes a manual operator position 0, a toll operator position 110, a miscellaneous operator position 112, an information operator position 113, and an intercepting operator position 114.

In addition to the apparatus described above, exchange 4 zone 84 is provided with toll ticketing apparatus comprising, in addition to the number of register translators, including the register translator 1700, a number of groups of toll ticketing repeaters, one of the groups including the toll ticket repeater 800. The toll ticketing apparatus comprises a detector 2900, a number of printer controllers, including the printer controller 4200, a printer controller allotter 4600, a date and time unit 3900, a printer link 5000, a toll ticket printer 5130, and a record printer 5140. The printer controller allotter 4600 comprises a finder F4640 having access to the printer controllers and each printer controller comprises a finder having access to the toll ticket repeaters. For example, the printer controller 4200 comprises the finder F4210 having access to the toll ticket repeater 800. The printer link 5000 comprises a finder F5010 having access to the printer controllers and is directly connected to the toll ticket printer 5130 and the record printer 5140. The date and time unit 3900 is commonly associated with the printer controllers.

Further, exchange 4 zone 84 comprises a number of groups of toll selector repeaters, one of the groups including the toll selector repeater 5200, and a number of groups of toll selectors, one of the groups including the toll selector 5300, individually associated with the various groups of toll ticket repeaters. For example, the toll selector 5300 is individually associated with the toll ticket repeater 800 and the toll selector repeater 5200 is one of a plurality of toll selector repeaters which terminate in the banks of the primary selector 441. Also, extending from the exchange 4 zone 84 are a number of groups of outgoing trunks to exchanges in other zones. The group of trunks terminating in the first level in the banks of the toll selector 5300 extends to the toll tandem exchange and is utilized in completing connections to the exchanges in zones 62 and 86. The group of trunks terminating in the second level in the banks of the toll selector repeater 5200 and multiplied to the corresponding level in the banks of the toll selector 5300 extends to the exchange 2 in zone 27, which is located in an area adjacent to the area served by the exchange 4 in zone 84. The latter group of trunks is utilized in the completion of connections to exchanges 2 and 3 in zone 27.

In exchange 4 zone 84 the various primary selectors, such as 441 and 600, have access to trunk lines extending to the other exchanges located in zone 84. For example, the fifth, sixth and seventh levels in the banks of the primary selectors 441 and 600 terminate the respective groups of trunks over which connections may be extended to exchanges 5, 1 and 7, respectively, located in zone 84. Furthermore, the primary selectors 441 and 600 have access to the first selector 501 by way of one of the trunks of the group of trunks terminating in the fourth level of the associated bank contacts; they have access to the special service selector 503 by way of one of the trunks of the group of trunks terminating in the first level; they have access to the manual operator position 0 by way of one of the trunks in the group of trunks terminating in the tenth level; they have access to the toll ticket repeater 800 by way of one of the trunks in the group of trunks terminating in the second level; and only the primary selector 441 has access to the toll selector repeater 5200 by way of one of the trunks in the group of trunks terminating in the third level of its associated bank contacts. The special service selector 503, in turn, has access to the toll operator position 110, the miscellaneous operator position 112, the information operator position 113, and the intercepting operator position 114. Also the various first selectors, such as 501, in the local switch train have access to the different groups of second selectors; while the various groups of second selectors have access to a number of groups of individual connectors and to a number of groups of party connectors. For example, the group of second selectors, including the second selector 502, has access to the group of individual connectors, including the individual connector 525, and the four groups of party connectors, respectively including the party connectors 521, 522, 523 and 524. Further, each individual connector has access to an associated group of private subscriber lines and each party connector in each related group of four has access to an associated group of the party subscriber lines. For example, the individual connector 525 has access to a group of 100 private subscriber lines, including the private subscriber lines 401, 404 and 407; while the four party connectors 521, 522, 523 and 524 have access to 100 party subscriber lines, including the party subscriber line 410. At this point it is noted that each of the party connectors 521, 522, 523 and 524 is adapted to seize the party subscriber line 410 and respectively to project ringing current thereover having the respective frequencies in cycles per second of 66, 50, 33 and 16.

Further, it is noted that the detector 2900 has access to each subscriber line terminating at exchange 4 zone 84 and is commonly associated with the various register translators in this exchange. Furthermore, each printer controller in the exchange is accessible to the printer controller allotter 4600 therein and has access to each toll ticket repeater. Finally, each printer controller is accessible to the printer link 5000; while the printer link 5000 is directly connected to the toll ticket printer 5130 and to the record printer 5140. Moreover, the date and time unit 3900 is commonly associated with each printer controller in exchange 4 zone 84.

Each subscriber substation in exchange 4 zone 84 is provided with the usual substation apparatus including a telephone instrument, a ringer, and a calling device or dial. The calling devices disposed at each ordinary private subscriber substation, at each extended service subscriber substation, at each denied toll service private subscriber substation, and at each first party subscriber substation, are of conventional construction and arrangement; while the calling devices disposed at each second, third and fourth party subscriber substation are of special construction. More particularly, the calling device disposed at each second, third and fourth party subscriber substation is of the construction and arrangement of that disclosed in the copending application of John E. Ostline, Serial No. 404,103, filed July 26, 1941, now U. S. Patent No. 2,410,520, granted November 5, 1946.

For example, the calling devices respectively disposed at the second party subscriber substation TS2, at the third party subscriber substation TS3, and at the fourth party subscriber substation TS4 are of the special construction mentioned, each comprising, as best shown in Fig. 4, in addition to a set of impulse springs, a set of cam springs. In each of these calling devices the set of impulse springs is operated in accordance with the pull of the associated finger wheel in order to transmit a corresponding variable series of switch control impulses, while the set of cam springs is operated by an associated cam governed by the associated finger wheel in order to transmit a fixed number of substation identifying ground impulses. More specially, when the finger wheel of the calling device at the second party subscriber substation TS2 is pulled in accordance with a digit constituting two or more impulses, the associated cam operates the set of cam springs to transmit one substation identifying ground impulse over the associated party subscriber line 410. Similarly, when the finger wheel of the calling device at the third party subscriber substation TS3 is pulled in accordance with a digit constituting two or more impulses, the associated cam operates the set of cam springs to transmit two substation identifying ground impulses over the associated party subscriber line 410. Finally, when the finger wheel of the calling device at the fourth party subscriber substation TS4 is pulled in accordance with a digit constituting two or more impulses, the associated cam operates the set of cam springs to transmit three substation identifying ground impulses over the associated party subscriber line 410.

Preferably, in exchange 4 zone 84 the line switches 421, 422, 423, 424, etc., diagrammatically illustrated in Fig. 4, are of conventional construction and arrangement. Although these line switches have been diagrammatically illustrated as rotary type line switches, it will be understood that either plunger type line switches or finder type line switches may be used in place thereof.

Preferably, in exchange 4 zone 84 each of the primary selectors included in the first group is identical to the primary selector 441 schematically shown in Fig. 4, while each of the primary selectors included in the second group is identical to the primary selector 600 shown in Figs. 6 and 7.

The primary selector 600 comprises a switch mechanism 700 of the Strowger type, including a wiper set provided with the wipers 701, 702 and 703, and an associated contact bank. The contact bank includes ten vertically spaced apart rows or levels of contact sets arranged in circumferentially spaced apart relation. Also, the switching mechanism 700 comprises a vertical magnet M711 for driving the wiper set step by step in the vertical direction, a rotary magnet M712 for driving the wiper set step by step in the rotary direction, and a release magnet M714 for releasing the wiper set and for causing it to be returned to its normal vertical and rotary position. Further, there are associated with the switching mechanism 700 four sets of vertical off-normal springs S715, S716, S719 and S720, which are actuated when the wiper set is moved in a vertical direction away from its normal vertical position, and two sets of eleventh rotary step cam springs S717 and S718, which are actuated when the wiper set is moved in a rotary direction eleven steps away from its normal rotary position.

Also, the primary selector 600 comprises a relay group including a sender relay R620, a cut-in relay R630, a line relay R730, a hold relay R740, a transfer relay R750, a step relay R760, and a switch-through relay R770. Also it is noted that the primary selector comprises a circuit network which is connected and arranged in a manner more fully described hereinafter. The primary selector 600 also includes a special control circuit including the cam springs S718, whereby a high resistance ground potential is connected by way of the resistor 722, the strap 723, and the contacts 720 of the cam springs S718 for a purpose more fully explained hereinafter.

The primary selector 441, shown in Fig. 4, is connected and arranged in a manner substantially identical to that of the primary selector 600 except that, in the primary selector 441, the special control circuit is connected to a direct ground potential by way of the strap 444, which completely shunts the resistance ground potential connected by way of the resistor 445 and the strap 446 in a manner to be more fully explained hereinafter.

Preferably, the finders in exchange 4 zone 84 which are individually associated with the primary selectors, are identical. For example, the finder F610 individually associated with the primary selector 600 comprises, as best shown in Fig. 6, a rotary switch including seven wipers 611 to 617, inclusive, provided with individually associated contact banks and a magnet FM618 for driving the wipers noted.

Preferably, each of the primary registers in exchange 4 zone 84 is identical to the primary register 1200 which comprises, as best shown in Figs. 12A and 12 to 16, inclusive, a first code switch A1500 of the rotary type, including three wipers 1501 to 1503, inclusive, provided with individually associated contact banks, and a magnet AM1504 for driving the wipers; a second code switch B1510 of the rotary type, including five wipers 1511 to 1515, inclusive, provided with individually associated contact banks, and a magnet BM1516 for driving the wipers; a third code switch C1520 of the rotary type, including five wipers 1521 to 1525, inclusive, provided with individually associated contact banks, and a magnet CM1526 for driving the wipers; and a first numerical switch D1620 of the rotary type, including four wipers 1621 to 1624, inclusive, provided with individually associated contact banks, and a magnet DM1625 for driving the wipers. Also, the primary register 1200 comprises a sequence switch S1630 of the rotary type, including five wipers 1631 to 1635, inclusive, provided with individually associated contact banks, and a magnet SM1636 for driving the wipers. Also, the primary register 1200 comprises a plurality of controlling relays which are connected and arranged in the manner illustrated in Figs. 12, 13 and 14. Also associated with the primary register 1200 there is provided a grounded line intercepting circuit comprising a finder switch F1201*a* of the rotary type, including four wipers 1202*a* to 1205*a*, inclusive, provided with individually associated contact banks, and a magnet FM1206*a* for driving the wipers. This circuit is provided to intercept a calling line having a false ground connected to one of the line conductors, and connects such a line to the operator's position in a manner to be more fully described hereinafter.

In the primary register 1200 the code switches A1500, B1510 and C1520, are adapted respectively to register the first, second and third code digits of a called subscriber's directory number; and a sequence switch S1630 is arranged to select the code switches A1500,, B1510 and C1520 and the first numerical switch D1620 in sequence for the purpose of registration. Each of the code switches is arranged to determine, as far as possible, in accordance with the code digit registered therein, whether the call may be completed under the direct control of the calling device at the calling subscriber substation or must be translated by a register translator. More specifically, by the time the third code digit is registered in the third code switch C1520, the code switches mentioned have determined whether the call may be completed under the direct control of the calling device at the calling subscriber substation or must be translated by a register translator. In the event the call may be completed under the direct control of the calling device, the code switches mentioned effect the release of the primary register 1200, but if the call must be translated by a register translator the code switches mentioned effect the association of an idle register translator with the primary register.

The pulse relay R1460 is adapted to be controlled by the first code switch A1500 and by the three party relays R1210, R1220 and R1230, to send to the associated register translator the first code digit registered in the first code switch A1500 and the party subscriber substation marking, as determined by the operated position of the three party relays R1210, R1220 and R1230. The pulse relay R1450 is adapted to be controlled by the second code switch B1510, the third code switch C1520 and the first numerical switch D1620 to send to the associated register translator the second and third code digits and the first numerical digit respectively registered in the switches B1510, C1520 and D1620. Finally, the line relay R1370 and the auxiliary line relay R1420 are arranged to send directly to the associated register translator the second, third and fourth numerical digits of the called subscriber directory number received from the calling device at the calling subscriber substation.

Figure 16:
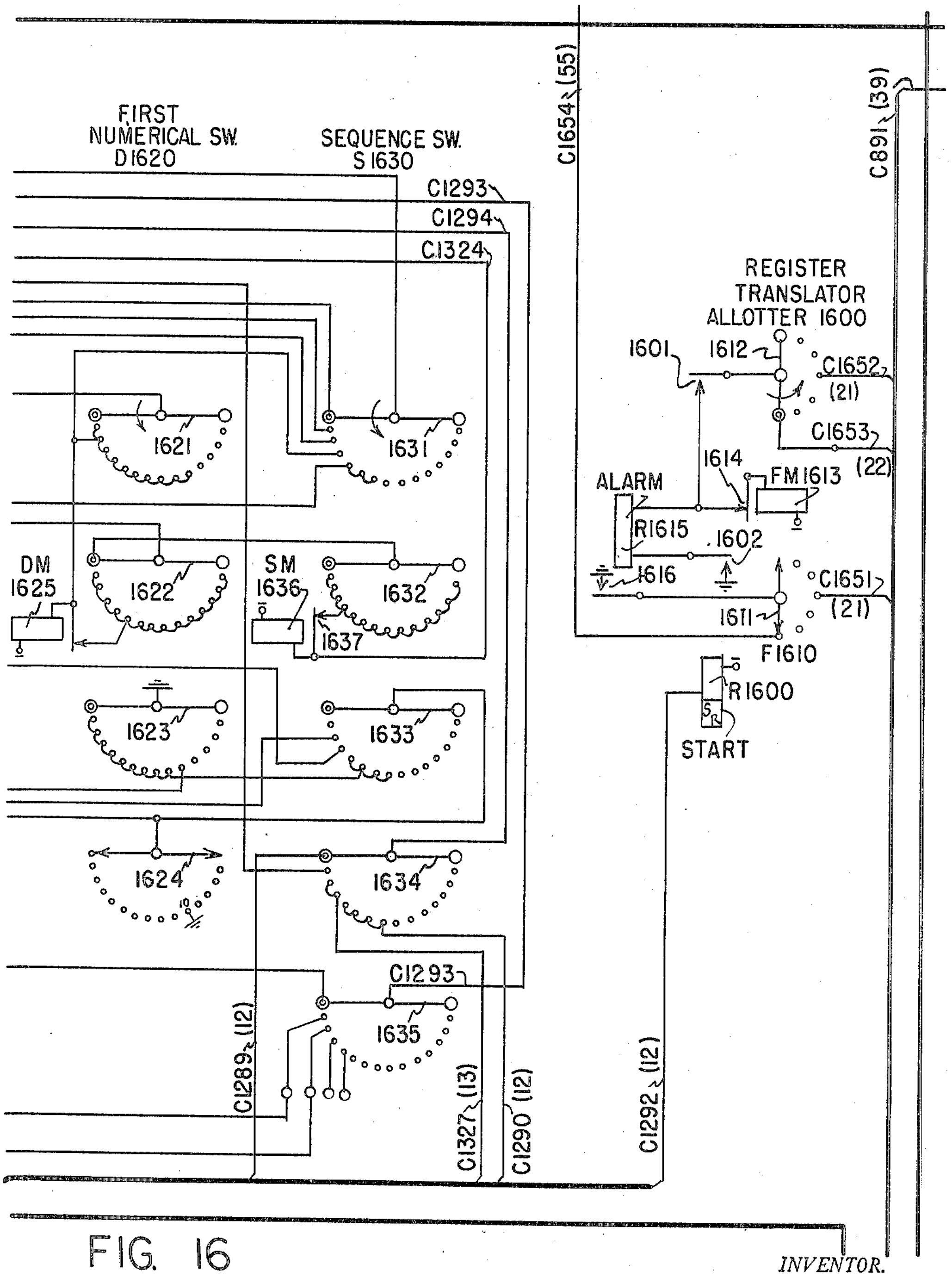

The register translator allotter 1600 provided in exchange 4 zone 84 comprises, as best shown in Fig. 16, a finder F1610 of the rotary switch type, including two wipers 1611 and 1612, provided with individually associated contact banks, and a magnet FM1613 for driving the wipers. Also the register translator allotter 1600 comprises a start relay R1600, an alarm relay R1615, and a control network connected and arranged in a manner to be fully explained hereinafter.

Figure 22:
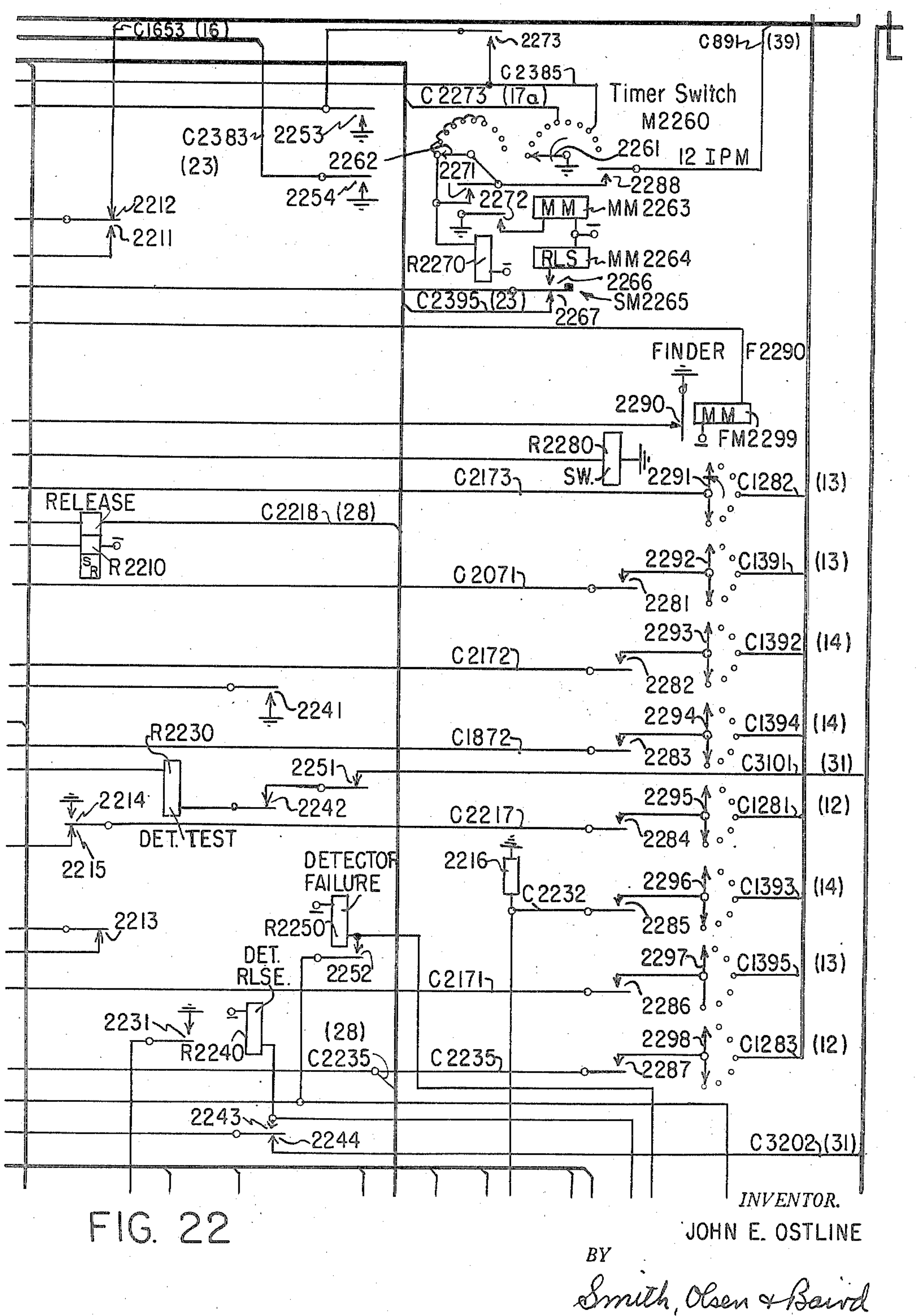

Preferably, the finders in exchange 4 zone 84, which are individually associated with the register translators, are identical. For example, the finder F2290, individually associated with the register translator 1700, is of the rotary switch type and includes, as best shown in Fig. 22, eight wipers 2291 to 2298, inclusive, provided with individually associated contact banks, and a magnet FM2299 for driving the wipers.

Preferably, each of the register translators included in exchange 4 zone 84 is identical to the register translator 1700, which comprises, as best shown in Figs. 17A, 23A and 17 to 28, inclusive, a first code switch A2400 of the rotary type, including five wipers 2401 to 2405, inclusive, provided with individually associated contact banks, and a magnet AM2406 for driving the wipers; a second code switch B2410 of the rotary type, including four wipers 2411 to 2414, inclusive, provided with individually associated contact banks, and a magnet BM2415 for driving the wipers; and a third code switch C2500 of the rotary type, including four wipers 2501 to 2504, inclusive, provided with individually associated contact banks, and a magnet CM2505 for driving the wipers. Also, the register translator 1700 comprises a first numerical switch D2510 of the rotary type, including four wipers 2511 to 2514, inclusive, provided with individually associated contact banks, and a magnet DM2515 for driving the wipers; a second numerical switch E2520 of the rotary type, including four wipers 2521 to 2524, inclusive, provided with individually associated contact banks, and a magnet EM2525 for driving the wipers; third numerical switch F2600 of the rotary type, including four wipers 2601 to 2604, inclusive, provided with individually associated contact banks, and a magnet FM2605 for driving the wipers; and a fourth numerical switch G2610 of the rotary type, including four wipers 2611 to 2614, inclusive, provided with individually associated contact banks, and a magnet GM2615 for driving the wipers.

Further, the register translator 1700 comprises a party switch N2620 of the rotary type, including three wipers 2621 to 2623, inclusive, provided with individually associated contact banks, and a magnet NM2625 for driving the wipers; a storage transfer switch U2820 of the rotary type, including six wipers 2821 to 2826, inclusive, provided with individually associated contact banks, and a magnet UM2827 for driving the wipers, a sender switch S2830 of the rotary type, including four wipers 2831 to 2834, inclusive, provided with individually associated contact banks, and a magnet SM2835 for driving the wipers, a digit sequence switch T2300 of the rotary type, including four wipers 2301 to 2304, inclusive, provided with individually associated contact banks, and a magnet TM2305 for driving the wipers; and a timer switch M2260 of the minor switch type, including two wipers 2261 and 2262, provided with individually associated contact banks, a rotary magnet MM2263 for driving the wipers in a rotary direction away from their home positions, a release magnet MM2264 for releasing the wipers and for causing them to return to their home positions, and a set of off-normal switch springs SM2265 which is actuated when the wipers are moved away from their home positions.

The register translator 1700 also comprises a composite code switch P2330 of the Strowger type provided with a wiper set, including eight wipers 2332 to 2339, inclusive, and an associated contact bank, the associated contact bank comprising ten vertically spaced apart rows or levels of contact sets and each level of contact sets including ten circumferentially spaced apart individual contacts. Also, the Strowger mechanism comprises a vertical magnet PM2340 for driving the wiper set step by step in the vertical direction away from its normal vertical position, a rotary magnet PM2341 for driving the wiper set step by step away from its normal rotary position, and a release magnet PM2342 for releasing the wiper set and for causing it to be returned to its normal vertical and rotary positions. Further, there is associated with the Strowger mechanism a set of vertical off-normal switch springs PS2343 which is actuated when the wiper set is moved in the vertical direction away from its normal vertical position.

Further, the register translator 1700 comprises a rate and route switch R2310 of the Strowger type, including a wiper set provided with eight wipers 2311 to 2318, inclusive, and an associated contact bank, the associated contact bank comprising ten vertically spaced apart rows or levels of contact sets, each level of contact sets including ten circumferentially spaced apart individual contacts. Also, the Strowger mechanism comprises a vertical test wiper 2319, which is moved only in the vertical direction of the wiper set, and an associated vertical test contact bank. The Strowger mechanism also comprises a vertical magnet RM2321 for driving the wiper set step by step in the vertical direction away from its normal vertical position, a rotary magnet RM2320 for driving the wiper set step by step in the rotary direction away from its normal rotary position, and a release magnet RM2322 for releasing the wiper set and for causing it to be returned to its normal vertical and rotary positions. Further, there is associated with the Strowger mechanism a set of vertical off-normal switch springs RS2324 which is actuated when the wiper set is moved in the vertical direction away from its normal vertical position. Also, it is noted that a jumper field is arranged between the contact banks of the composite code switch P2330 and the rate and route switch R2310 for a purpose more fully explained hereinafter.

Further, the register translator 1700 comprises four code storage devices S2801 to S2804, inclusive, each of the code storage devices, including four marking or WXYZ magnets. Finally, the register translator 1700 comprises a relay group for controlling the register translator, in a manner to be more fully explained hereinafter, including a test jack J1870, a busy key K2180, and a terminal block B2770.

In the register translator 1700, the code switches A2400, B2410 and C2500 are adapted, respectively, to register the first, second and third code digits of a called subscriber's directory number, and the numerical switches D2510, D2520, F2600 and G2610 are adapted, respectively, to register the first, second, third and fourth numerical digits of a called subscriber's directory number. Thus, the code switches A2400, B2410 and C2500, taken together, comprise a first code register adapted to register a code comprising N digits, where $N=3$; while the numerical switches D2510, E2520, F2600 and G2610, taken together, comprise a second numerical register adapted to register a number comprising M digits, where $M=4$.

The party switch N2620 is arranged to control the registration in the first code switch A2400 and to mark one of the four party conductors C2641 to C2644, inclusive, to indicate the particular calling station on a calling line. The first set of sequence relays R2710, R2720 and R2730 is adapted to control the setting of the wiper set of the composite code switch P2330 in the vertical and rotary directions, and to select the second code switch B2410, the third code switch C2500, and the first numerical switch D2510, in sequence, for registration purposes. Also, the first code switch A2400 is adapted to control the selection of one of the wipers of the wiper set of the composite code switch P2330 for a purpose more fully explained hereinafter. The second set of sequence relays R2640, R2750 and R2760 is arranged to select the second numerical switch E2520, the third numerical switch F2600, and the fourth numerical switch G2610, in sequence, for the purpose of registration. The composite code switch P2330 governs the setting of the wiper set of the rate and route switch R2310 in the vertical and rotary directions, as will be subsequently explained, while the digit sequence switch T2300 is arranged to control the sequence of transmitting the digits from the register translator 1700, some of these digits being registered in the rate and route switch R2310 and other of these digits being registered in the code switches A2400, B2410 and C2500, and in the numerical switches D2510, E2520, F2600 and G2610. The sender switch S2830 is arranged to control the actual number of impulses transmitted in each numerical digit transmitted from the register translator 1700. The storage transfer switch U2820 is arranged to transmit code digits from the register translator 1700, which code digits are registered in the rate and route switch R2310, the code switches A2400, B2410 and C2500, the numerical switches D2510, E2520, F2600 and G2610, the code send relay R1750, the special service relay R2040, the free call relay R1720', the rate relays R1740', R1750', R1760' and R1770', the terminal block B2770, and the code storage devices S2801 to S2804, inclusive. Finally, the timer switch M2260 is arranged to time the interval during which the register translator 1700 is retained in use and to determine whether the directory number dialed by a calling subscriber will ultimately be a six or a seven digit number.

At this point, it is again noted that each of the code storage devices S2801 to S2804, inclusive, comprises four unit or WXYZ magnets which are operated in accordance with the following combinations in order to register numerical digits in code form, as indicated by the table below:

| Numerical Digit Registered | Operated Magnets in the Code Storage Device |
|---|---|
| 1 | W and X. |
| 2 | W and Y. |
| 3 | W and Z. |
| 4 | X and Y. |
| 5 | X and Z. |
| 6 | Y and Z. |
| 7 | W. |
| 8 | X. |
| 9 | Y. |
| 0 | Z. |

Also, it is noted that an individual number is assigned to each register translator, which number is set up in code form in the terminal block thereof. For example, the individual number "6" is assigned to the register translator 1700 and is set up on the terminal block B2770 in code form by connecting ground potential as indicated to the Y and Z leads in the group of marking leads 2813.

The detector 2900 included in exchange 4 zone 84 has access to 10,000 terminals and comprises, as best shown in Figs. 31A, 36A, and 29 to 38 inclusive, ten groups of A relays, each group of A relays including ten individual A relays. The tenth group of A relays mentioned is illustrated and comprises the individual A relays 00A to 09A, inclusive, and is associated with the 1,000 S leads from the "0" thousand connectors. Each A relay comprises 100 make contacts, whereby a given A relay in the tenth group is operative to connect the corresponding 100 S leads in the "0" thousand group to the detector 2900 for test purposes. The first group of A relays mentioned is also illustrated and comprises the individual A relays 10A to 19A, inclusive, and is associated with the 1,000 S leads from the "1" thousand connectors. Each of the A relays in the "1" thousand group also comprises 100 make contacts, whereby a given A relay in the first group is operative to connect the corresponding 100 S leads in the "1" thousand group to the detector 2900 for test purposes.

At this point, it is noted that the S lead S431 extends to the line switch 421 individually associated with the private subscriber line 401, and is accessible to the 09A relay included in the "0" thousand group of A relays, whereby the first two digits of the numerical portion of the directory number of the private subscriber line 401 are the digits 09, and the four digits of the numerical portion of the directory number of the extended service private subscriber substation TX connected to the private subscriber line 401 may be 0901. Similarly, the S lead S432 extends to the line switch 422 individually associated with the private subscriber line 404, and is accessible to the 09A relay included in the "0" thousand group of A relays whereby the first two digits of the numerical portion of the directory number of the private subscriber line 404 are the digits 09, and the four digits of the numerical portion of the directory number of the denied toll service private subscriber substation TD connected to the private subscriber line 404 may be 0900. In a like manner the S lead S433 extends to the line switch 423 individually associated with the private subscriber line 407, and is accessible to the 00A relay included in the "0" thousand group of A relays, whereby the first two digits of the numerical portion of the directory number of the private subscriber line 407 are the digits 00, and the four digits of the numerical portion of the directory number of the ordinary private subscriber substation TP connected to the private subscriber line 407 may be 0099. Finally, the S lead S434 extends to the line switch 424 individually associated with the party subscriber line 410, and is accessible to the 01A, 02A, 03A and 04A relays included in the "0" thousand group of A relays, whereby the first two digits of the numerical portion of the directory number of the party subscriber line 410 are the digits 01, 02, 03, or 04, depending upon the particular calling party subscriber substation on the party line. The four digits of the numerical portion of the directory numbers of the party subscriber substations TS1, TS2, TS3, and TS4 connected to the party subscriber line 410 may be, respectively, 0100, 0200, 0300, or 0400.

Also, the detector 2900 comprises 1,000 test leads arranged in ten groups of 100 each; each group of 100 test leads is multipled to the corresponding A relay in each group of ten, whereby each A relay in each thousand group of A relays is operative to connect the associated group of 100 S leads to the associated group of 100 test leads. The 100 test leads connected to the contacts of the 00A relay are multipled to the corresponding A relays in all other thousand groups.

Further, the detector 2900 comprises ten B relays 0B to 9B, inclusive, individually associated with the corresponding groups of A relays, the tenth B relay 0B being individually associated with the tenth or "0" thousand group of A relays 00A to 09A, inclusive, and the first B relay 1B being individually associated with the first or "1" thousand group of A relays 10A to 19A, inclusive. Further, the detector 2900 comprises four hold conductors C3401, C3402, C3403 and C3404, which are suitably multipled to make contacts provided on the various B relays. More particularly, the first hold conductor C3401 is multipled via contacts of the appropriate ones of the B relays to the windings of the various ones of the A relays and each group corresponding to the private subscriber substations and to first party subscriber substations; while the second, third and fourth hold conductors C3402, C3403 and C3404 respectively are multipled via the contacts of the appropriate ones of the relays to the windings of the various ones of the A relays in each group, respectively corresponding to the second, third and fourth party subscriber substations. For example, the first hold conductor C3401 is multipled via the contacts 0B0, 0B5 and 0B9 to the windings of the A relays 00A, 05A and 09A, respectively, corresponding to groups of private subscriber substations including the private subscriber substations TP, TX and TD. The first hold conductor C3401 is also multipled via the contacts 0B1 to the winding of the A relay 01A corresponding to a group of first party subscriber substations including the first subscriber substation TS1. Similarly, the second, third and fourth hold conductors C3402, C3403 and C3404 respectively are multipled via the contacts 0B2, 0B3 and 0B4 to the windings of the A relays 02A, 03A and 04A, respectively, corresponding to groups of second, third and fourth party subscriber substations including the party subscriber substations TS2, TS3 and TS4.

Further, the detector 2900 comprises ten C relays 0C to 9C, inclusive, respectively corresponding to the ten groups of 100 test leads, and ten test conductors C3500 to C3509, inclusive. Each C relay is operative to connect its associated group of 100 test leads to the corresponding one of the test conductors. For example, the ninth C relay 9C is operative to connect the ninth group of 100 test leads to the ninth test conductor C3509, and the zero C relay 0C is operative to connect the first group of 100 test leads to the zero test conductor C3500. Also, the detector 2900 comprises ten D relays 0D to 9D, inclusive, respectively corresponding to the ten groups of 100 test leads, and ten E relays 0E to 9E, inclusive. Each D relay is provided with 100 contacts and is operative to connect its associated group of 100 test leads to 100 conductors included in an associated riser cable 3000, the corresponding contacts of each of the D relays being multipled to the corresponding 100 conductors in the riser cable 3000. Each of the E relays is operative to connect a particular group of ten conductors in the riser cable 3000 to the ten corresponding test conductors C3500 to C3509, inclusive. For example, when the ninth D relay 9D and the ninth E relay 9E are operated, the ninth group of 100 test leads is connected to the corresponding 100 conductors in the riser cable 3000, and the ninth group of ten conductors in the riser cable 3000 is respectively connected to the ten test conductors C3500 to C3509, inclusive.

Figure 36:
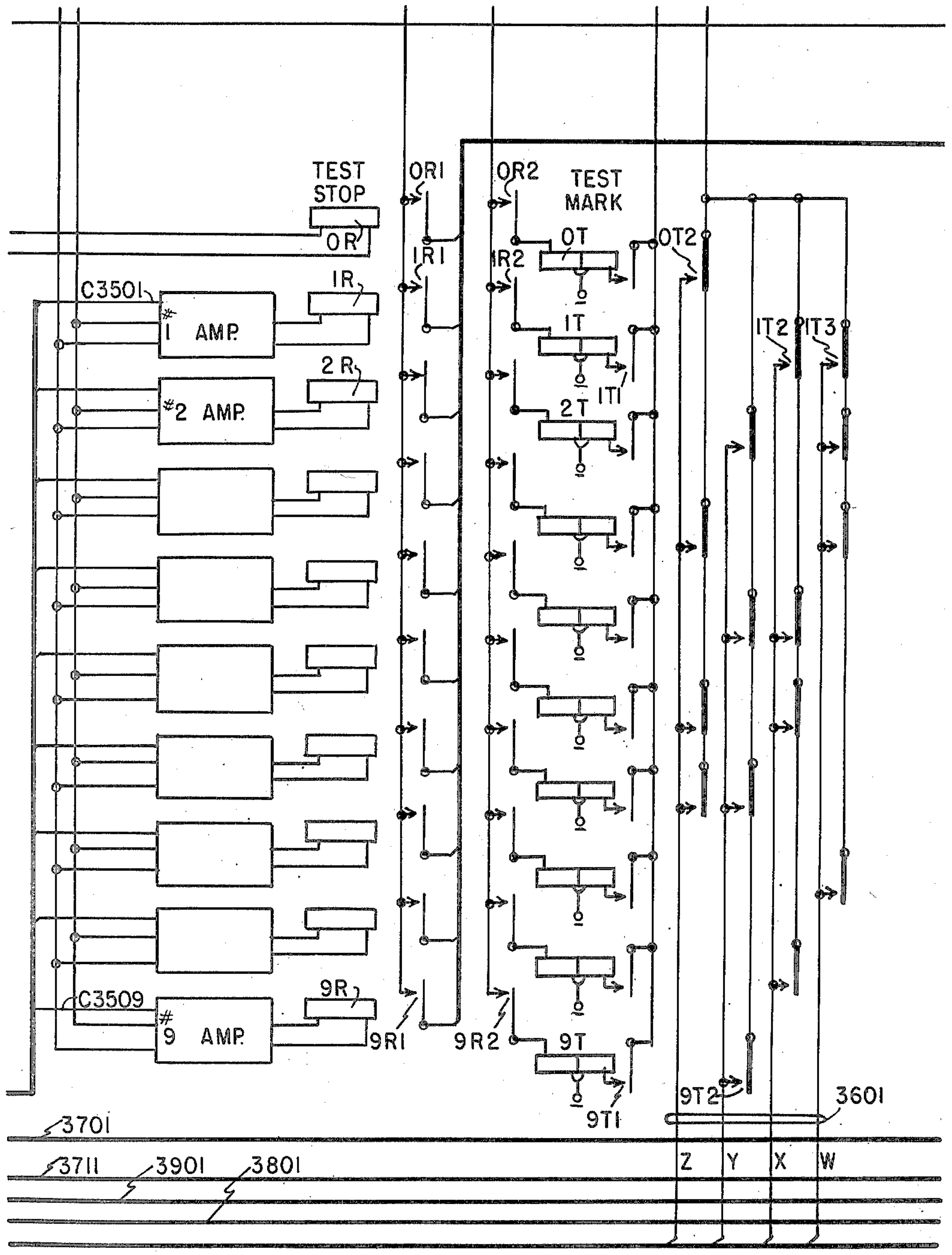

Further, the detector 2900 comprises ten amplifiers 0AMP to 9AMP, inclusive, respectively connected to the ten test conductors C3500 to C3509, inclusive, and ten test stop relays 0R to 9R, inclusive, respectively associated with the ten amplifiers 0AMP to 9AMP, inclusive. The amplifier and detector circuit comprising the amplifier 0AMP is shown in detail in Fig. 36A, and it will be understood that the amplifier and detector circuits comprising the amplifiers 1AMP to 9AMP, inclusive, shown in Fig. 36, are of similar construction. Also, the detector 2900 comprises ten test mark relays 0T to 9T, inclusive, ten test lock relays 0S to 9S, inclusive, ten step relays 0K to 9K, inclusive, and a first set of four cycle relays KA, KB, KC and KD. Further, the detector 2900 comprises a number of finder relays 1F to 6F, inclusive, individually corresponding to the various register translators, the finder relay 6F individually corresponding to the register translator 1700. Further, the detector 2900 comprises a second set of four cycle relays FA, FB, FC, and FD, a testing circuit shown in Fig. 31A for testing the operation of the various amplifiers 0AMP to 9AMP, inclusive, and a plurality of control relays, illustrated in Figs. 32 and 33.

Finally, the detector 2900 comprises four groups of marking leads 3801, 3701, 3802 and 3601 of the WXYZ type, which are respectively utilized for the purpose of marking the first, second, third and fourth digits of a detected directory number. More particularly, the WXYZ conductors in the first and third groups of marking leads 3801 and 3802 are marked by the various step relays 0K to 9K, inclusive, while the WXYZ conductors in the second and fourth groups of marking leads 3701 and 3601 are respectively marked by the various test lock relays 0S to 9S, inclusive, and by the various test mark relays 0T to 9T, inclusive.

More particularly, it is pointed out that the WXYZ conductors in each of the groups of marking leads 3801, 3802, 3701, and 3601 are marked in accordance with a code arrangement. For example, the various step relays 0K to 9K, inclusive, mark the WXYZ conductors in the first group of marking leads 3801 in accordance with the particular thousand digit of the directory number of the calling subscriber line terminating at exchange 4 zone 84 and detected by the detector 2900, in accordance with the following code:

| Particular Thousand Digit | Marked WXYZ Conductors In the First Group of Marking Leads 3801 |
|---|---|
| 1 | W and X. |
| 2 | W and Y. |
| 3 | W and Z. |
| 4 | X and Y. |
| 5 | X and Z. |
| 6 | Y and Z. |
| 7 | W. |
| 8 | X. |
| 9 | Y. |
| 0 | Z. |

Preferably, each of the toll ticket repeaters included in exchange 4 zone 84 is identical to the toll ticket repeater 800 which comprises, as best shown in Figs. 8 to 11, inclusive, a unit time switch U1010 of the rotary type, including four wipers 1011 to 1014, inclusive, provided with individually associated contact banks, and a magnet UM1015 for driving the wipers; a ten and hundred time switch D1020 of the rotary type, including six wipers 1021 to 1026, inclusive, provided with individually associated contact banks, and a magnet DM1027 for driving the wipers; a register and timer switch R1100 of the rotary type, including six wipers 1101 to 1106, inclusive, provided with individually associated contact banks, and a magnet RM1106 for driving the wipers; and a storage transfer switch S1110 of the rotary type, including six wipers 1111 to 1116, inclusive, provided with individually associated contact banks, and a magnet SM1117 for driving the wipers. Further, the toll ticket repeater 800 comprises thirteen code storage devices S1121 to S1129, inclusive, and S1131 to S1134, inclusive, of the WXYZ type, and three code storage devices S1031, S1130 and S1135, each of which comprises a single W magnet. The toll ticket repeater 800 also comprises a plurality of relays and apparatus, as best disclosed in Figs. 8 and 9, which are connected and arranged in a manner more fully explained hereinafter.

At this point it is noted that a two-digit number is assigned to each individual toll ticket repeater in exchange 4 zone 84. The number "01" is assigned to the toll ticket repeater 800, which digits are respectively set up in WXYZ code on the terminal blocks B1136 and B1137 by grounding the Z lead in the group of marking leads 1136 and by grounding the W and X leads in the group of marking leads 1137.

In the toll ticket repeater 800 the register and timer switch R1100 is arranged to time the duration of a completed connection as well as to control the registration in the code storage devices S1121 to S1135, inclusive, of the various items of code information registered in an associated register translator. The unit time switch U1010 and a ten and hundred switch D1020 are respectively arranged to register the unit minute time interval and the ten and hundred minute intervals of the total time duration of a completed connection. The storage transfer switch S1110 is arranged to control the transfer of the various items of code information registered in the code storage devices S1121 to S1135, inclusive, and S1031, in the unit time switch U1010, in the ten and hundred time switch D1020, and in the terminal blocks B1136 and B1137, to the associated printer controller.

The date and time unit 3900 comprises, as best shown in Figs. 39 to 41, inclusive, a timer switch 3910 of the rotary type, including a single wiper 3911 provided with an associated contact bank, and a magnet M3912 for driving the wiper; a unit minute switch 3920 of the rotary type, including three wipers 3921 to 3923, inclusive, provided with individually associated contact banks, and a magnet M3924 for driving the wipers; a ten minute switch 4010, including three wipers 4011 to 4013, inclusive, provided with individually associated contact banks, and a magnet M4014 for driving the wipers; an hour switch 4020, including five wipers 4021 to 4025, inclusive, provided with individually associated contact banks, and a magnet M4026 for driving the wipers; a day switch 4110, including eight wipers 4111 to 4118, inclusive, provided with individually associated contact banks, and a magnet M4119 for driving the wipers; and a month switch 4120, including six wipers, 4121 to 4126, inclusive, provided with individually associated contact banks, and a magnet M4127 for driving the wipers. Further, the date and time unit 3900 comprises a start key K3930, a minute correct key K3935, an hour correct key K4030, a day correct key K4040, a month correct key K4130, and a check key K4050, all connected and arranged in a manner to be more fully explained hereinafter.

In a date and time unit 3900 the master clock 3901 is arranged to transmit twelve ground impulses per minute to the pulse relay R3940, which in turn controls the timer switch 3910 a corresponding number of times. The timer switch 3910 in turn controls the minute relay R3950, thereby to actuate the minute switch 3920. The minute switch 3920 controls the ten minute switch 4010, which in turn controls the hour switch 4020. Finally, the hour switch 4020 controls the day switch 4110, which in turn controls the month switch 4120. There is also provided in the date and time unit 3900 a Telechron clock mechanism which is arranged to transmit one pulse every minute and, with the check key K4050 in its operated position, the meter M3970 is actuated under control of the check relay R4070. With this arrangement a comparison may be made by reading the meter M3970 and the meter M3960 to determine whether or not the timer switch 3910 is accurately operating in accordance with the pulses transmitted by the master clock 3901. At this point it is noted that the unit minute switch 3920 and the ten minute switch 4010 are adapted respectively to register continuously the units and tens digits representing the minute time intervals, the hour switch 4020 is adapted to register both the units and tens digits representing the hour intervals, the day switch 4110 is adapted to register both the units and tens digits representing the day intervals, and the month switch 4120 is adapted to register both the units and the tens digits representing the month intervals.

Figure 42:
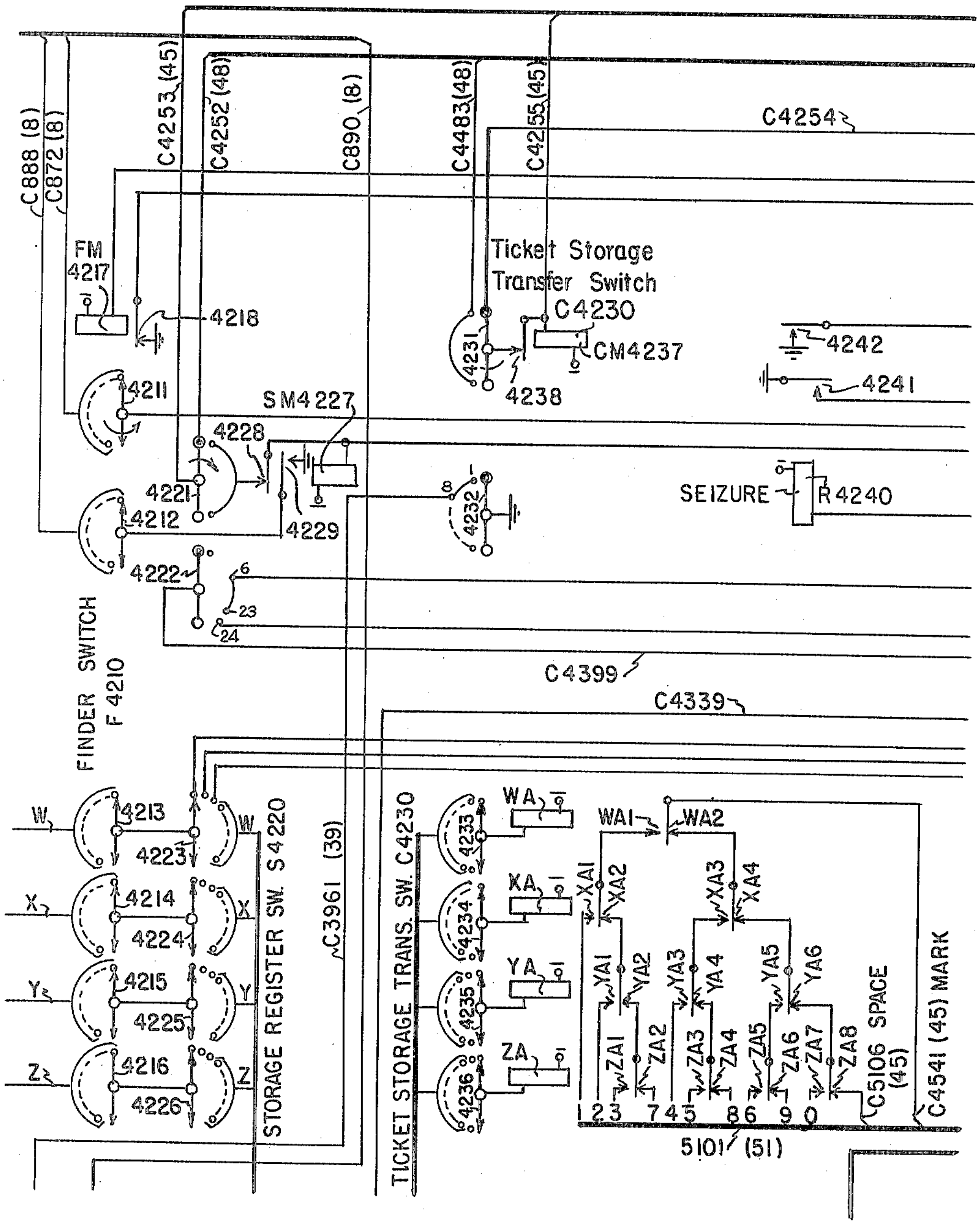
Figure 43:
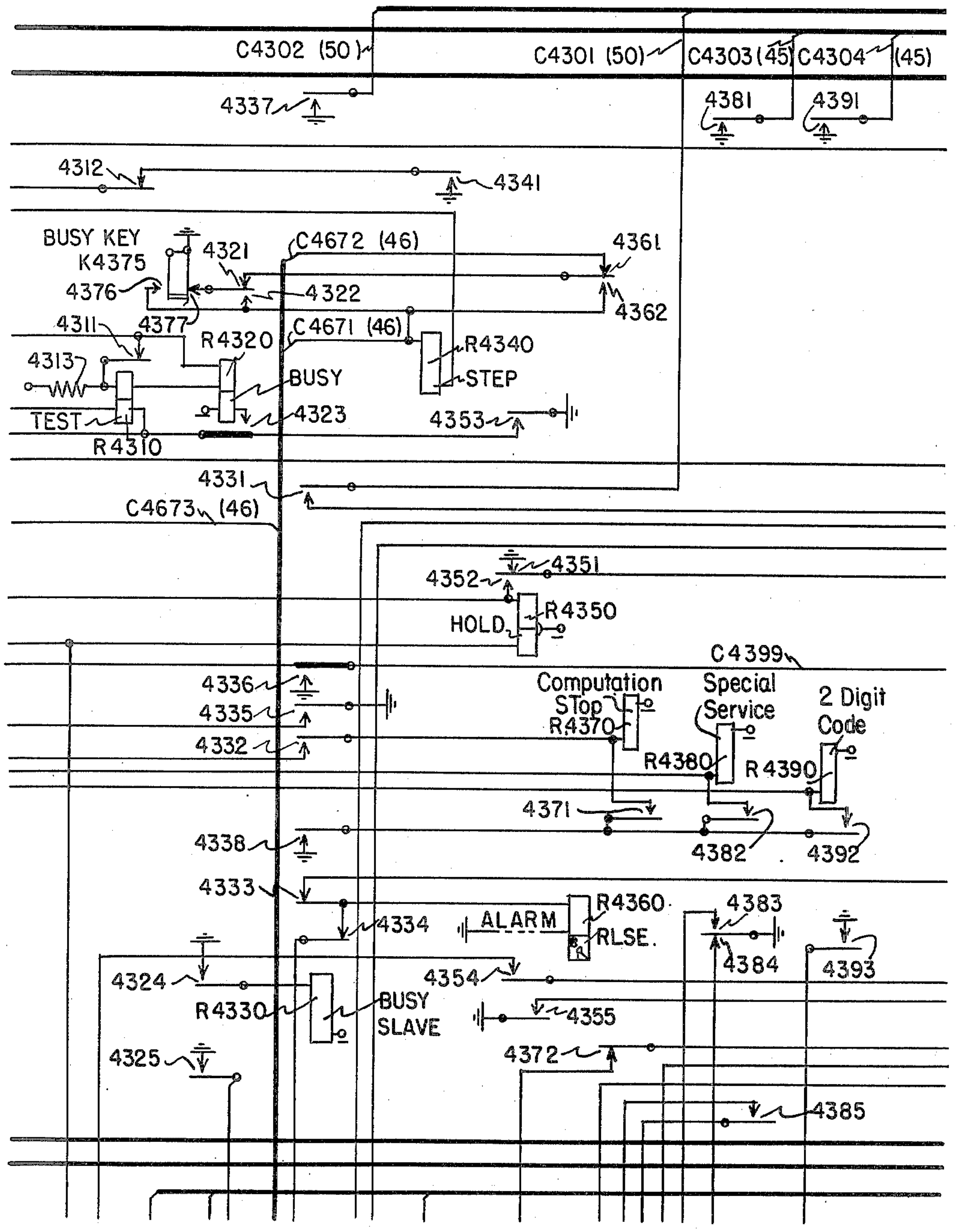
Figure 44:
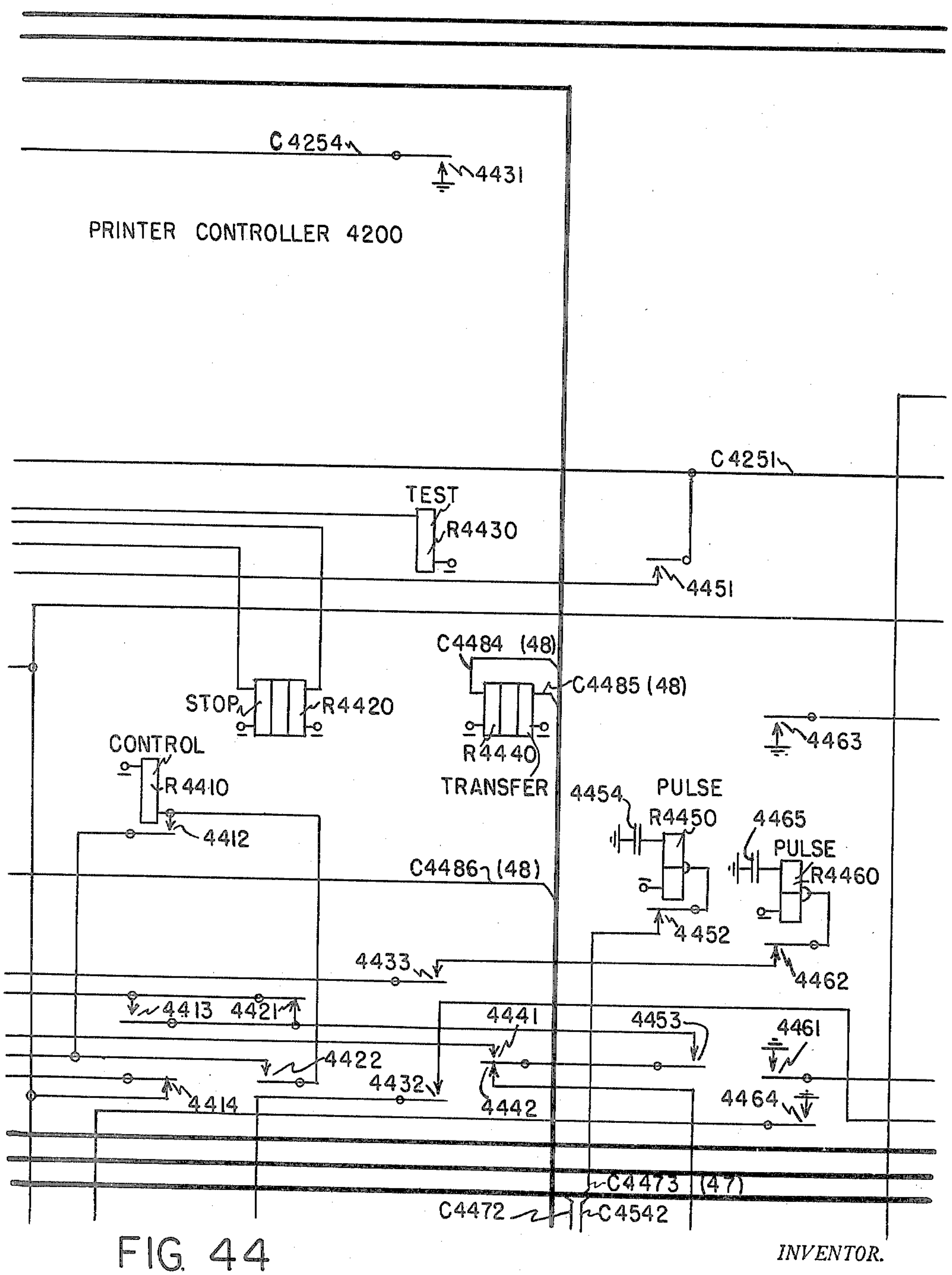

Preferably, the finders in exchange 4 zone 84, which are individually associated with the printer controllers, are identical. For example, the finder switch F4210 individually associated with the printer controller 4200 is of the rotary type and includes, as best shown in Fig. 42, six wipers 4211 to 4216, inclusive, provided with individually associated contact banks, and a magnet FM4217 for driving the wipers.

Preferably, each of the printer controllers included in exchange 4 zone 84 is identical to the printer controller 4200 which comprises, as best shown in Figs. 42 to 49, inclusive, a storage register switch S4220 of the rotary type, including six wipers 4221 to 4226, inclusive, provided with individually associated contact banks, and a magnet SM4227 for driving the wipers; a ticket storage transfer switch C4230 of the rotary type, including six wipers 4231 to 4236, inclusive, provided with individually associated contact banks, and a magnet CM4237 for driving the wipers; a ticket printer control switch P4510 of the rotary type, including six wipers 4511 to 4516, inclusive, provided with individually associated contact banks, and a magnet PM4517 for driving the wipers; a calculator setting switch M4730 of the rotary type, including five wipers 4731 to 4735, inclusive, provided with individually associated contact banks, and a magnet MM4736 for driving the wipers; a record storage transfer switch R4810 of the rotary type, including five wipers 4811 to 4815, inclusive, provided with individually associated contact banks, and a magnet RM4816 for driving the wipers; and a calculator selector switch T4820 of the rotary type, including eight wipers 4821 to 4828, inclusive, provided with individually associated contact banks, and a magnet TM4829 for driving the wipers.

Also, the printer controller 4200 comprises three calculating switches C4900, B4920 and A4940 of the Strowger type. The calculating switch C4900 comprises a wiper set including six wipers 4901 to 4906, inclusive, each of which is provided with an associated contact bank comprising ten vertically spaced apart rows or levels of contact sets, and each level of contact sets includes ten circumferentially spaced apart individual contacts. Also, the calculating switch C4900 comprises a vertical magnet CM4907 for driving the wiper set step by step in the vertical direction away from its normal vertical position, a rotary magnet CM4908 for driving the wiper set step by step in the rotary direction away from its normal rotary position, and a release magnet CM4909 for releasing the wiper set and for causing it to be returned to its normal vertical and rotary position. Further, there is associated with the calculating switch C4900 a set of vertical off-normal switch springs CS4910 which is actuated when the wiper set is moved in the vertical direction away from its normal vertical position. The calculating switch B4920 comprises a wiper set including six wipers 4921 to 4926, inclusive, each wiper being provided with an associated contact bank of the same type and construction as has been described in connection with the calculator switch C4900. The calculating switch B2940 also comprises a vertical magnet BM4927, a rotary magnet BM4928, and a release magnet BM4929, all of which function in the manner described in connection with the calculating switch C4900. Further, there is associated with the calculating switch B4920 a set of vertical off-normal springs BS4930 which is actuated when the wiper set is moved in the vertical direction away from its normal vertical position. The calculating switch A4940 is of the same type and construction as that described in connection with the calculating switches C4900 and B4920, and comprises a wiper set including six wipers 4941 to 4946, inclusive, each of the wipers being provided with an associated contact bank. The calculating switch A4940 also comprises a vertical magnet AM4947, a rotary magnet AM4948, a release magnet AM4949, and a set of vertical off-normal springs AS4950, all of which function in the manner previously described in connection with the calculating switches C4900 and B4920.

Further, the printer controller 4200 comprises a plurality of control relays, an apparatus including a busy key K4375, eighteen code storage devices S4621 to S4638, inclusive, of the WXYZ type previously described, and two terminal blocks B4640 and B4740 of the WXYZ type, all connected and arranged in a manner to be more fully explained hereinafter.

At this point it is noted that a number is assigned to each individual printer controller and is set up on one of the terminal blocks thereof in WXYZ code, while the identification of the zone and the exchange, including the printer controller, is set up on the other terminal block thereof in WXYZ code. More particularly, the number "2" is assigned to the printer controller 4200 and is set up in WXYZ code on the terminal block B4740 by grounding the W and Y leads in the marking leads 4701; while the numbers "8," "4" and "4" identifying the zone and the exchange respectively, including the printer controller 4200, are set up on the terminal block B4640 thereof in WXYZ code by grounding the X lead in the marking leads 4611, the XY leads in the marking leads 4612, and the XY leads in the marking leads 4613. In the printer controller 4200 the storage register switch S4220 is arranged to register in the code storage devices S4621 to S4638, inclusive, in the computation stop relay R4370, the special service relay R4380, and the two digit code relay R4390, the various items of record information previously stored in the toll ticket repeater selected by the finder switch F4210. The ticket storage transfer switch C4230 is arranged to transmit the record items stored in the various ones of the code storage devices S4621 to S4638, inclusive, in the groups of WXYZ leads 4601 to 4608, inclusive, in the terminal blocks B4640 and B4740, and in the calculator selector switch T4820, to the toll ticket printer 5130 in order selectively to control the operation thereof to print a toll ticket. The record storage transfer switch 4810 is arranged to transfer the record items stored in the various ones of the code storage devices S4621 to S4638, inclusive, in the groups of WXYZ leads 4601 to 4608, inclusive, in the terminal blocks B4640 and B4740, and in the calculator selector switch T4820 to the record printer 5140, in order selectively to control the operation thereof to print a record sheet.

The ticket printer controls switch P4510 is arranged to control the operation of the toll ticket printer 5130 in order to cause the record items transferred thereto to be printed in appropriate form upon the toll ticket. The calculator selector switch T4820 is arranged to select one of the calculating switches C4900, B4920 or A4940 in accordance with the established rate factor registered in the code storage device S4621, in a manner to be more fully explained hereinafter; while the calculator setting switch M4730 is adapted selectively to set the selected calculating switch both in accordance with the operated position of the special service relay R4380 and the time duration of the established connection as registered in the code storage devices S4623 and S4624, in a manner to be more fully explained hereinafter.

Figure 46:
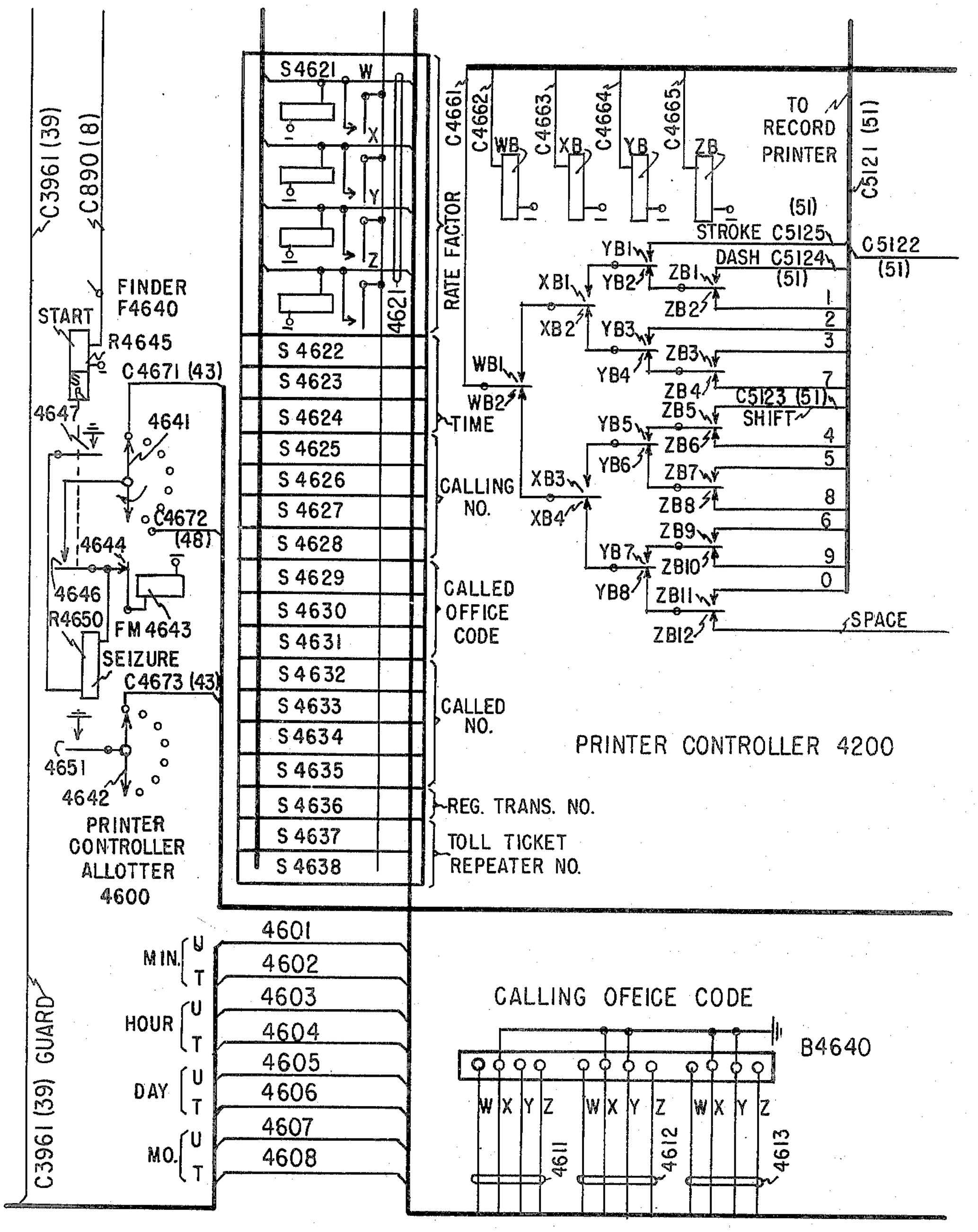

The printer controller allotter 4600 comprises, as best shown in Fig. 46, a finder F4640 of the rotary type, including two wipers 4641 and 4642 provided with individually associated contact banks, and a magnet FM4643 for driving the wipers. Also the printer controller allotter 4600 comprises a start relay R4645 and a seizure relay R4650, connected and arranged in a manner to be more fully explained hereinafter.

The printer link 5000 provided in exchange 4 zone 84 comprises, as best shown in Figs. 50 and 51, a finder F5010 of the rotary type, including a single wiper 5011 provided with an associated contact bank, and a magnet FM5012 for driving the wiper; and a control switch S5020 of the rotary type, including three wipers 5021 to 5023, inclusive, provided with individually associated contact banks, and a magnet SM5024 for driving the wipers. Also, the printer link 5000 comprises a relay group including a test relay R5030, a start relay R5040, a pulse relay R5060, a hold relay R5070, a release relay R5080, a toll ticket test relay R5090, a power alarm relay R5095, a toll ticket relay R5050, and a record relay R5055. Further, the printer link 5000 comprises a toll ticket register R5065, a power alarm A5097, a paper and toll ticket alarm A5098, and a record alarm A5099, all connected and arranged in a manner more fully explained hereinafter.

In the printer link 5000 the control switch S5020 is arranged to control the operation of the toll ticket printer 5130, in order to cause the record information to be printed in proper form on the associated toll ticket and to cause the toll ticket thus produced to be cut off of the roll of paper stock upon which it is printed.

The toll ticket printer 5130 included in exchange 4 zone 84, diagrammatically illustrated in Fig. 51, is of the construction and arrangement of that disclosed in the John E. Ostline Patents No. 2,360,789, granted October 17, 1944, and No. 2,376,268, granted May 15, 1945, and comprises, among other elements, an operating motor 5131, a test magnet M5132, a paper engaging rod 5136, a set of switch springs, S5133, and a number of operating magnets, including the printing magnet #1PM, all connected and arranged in a manner to be more fully explained hereinafter. A terminal block B5111 is associated with the toll ticket printer 5130 and is arranged to convert the control potentials applied to the conductors C5213 and C5214 to numerical controls, whereby the printing magnets, such as the printing magnet #1PM, may be controlled to print the numerical digit corresponding to the particular conductor.

Considering now the general mode of operation of the toll ticket printer 5130 from a mechanical standpoint, which printer is constructed in the manner disclosed in the above-mentioned Ostline patents, the carriage thereof normally occupies its right-hand marginal stop position as vewed from the front of the machine. The printing magnets are selectively energized in order to cause the type levers to strike the section of the ribbon of paper stock carried by the adjacent portion of the platen roll, whereupon the carriage is moved step by step toward the left in a well known manner. After a line of printing has been completed on the ribbon of paper stock, the return and line space operating magnet is energized, whereby the carriage is returned to its right-hand marginal stop position and the ribbon of paper stock is spaced one space in readiness to receive the next line of printing. At the conclusion of a complete printing operation, the carriage occupies a position displaced from the right-hand marginal stop position, as viewed from the front of the machine, whereupon the return and line space operating magnet is energized a plurality of times in order to cause the carriage to return to its normal right-hand stop position and to cause the platen roll to be spaced a corresponding plurality of times. At this time the section of paper stock upon which the printing appears is fed through the paper guiding structure and into the paper chute, and the tabulating operating magnet is energized, as is described in detail in the aforesaid Ostline patents. When the tabulating operating magnet is thus energized, the carriage is automatically moved from its right-hand marginal stop position to its left-hand marginal stop position, whereupon a knife carried upon the machine severs the portion of the paper stock upon which the printing occurs from the paper roll, thus forming a ticket which slides down the paper chute into a suitable receptacle.

During the operation of the toll ticket printer 5130, when the carriage occupies its normal right-hand marginal stop position and there is ample paper stock upon the paper roll, the paper engaging rod 5136 is engaged, thereby to move the armature 5134 toward the core of the magnet M5132 incorporated in the paper positioning testing mechanism. When the toll ticket printer 5130 is seized for use the magnet M5132 is energized, thereby to retain the armature 5134 attracted toward the core of the magnet. Subsequently, after the complete operation of the toll ticket printer 5130, and after the ticket has been printed, the carriage is operated toward its right-hand marginal stop position and the magnet M5132 is deenergized. At this time the armature 5134 remains in its position adjacent the core of the magnet M5132 only in the event that the carriage is moved fully to its right-hand marginal stop position, and in the additional event that there is adequate paper stock upon the roll in order to engage the end of the rod 5136. Hence, it will be understood that, at the conclusion of the operation of the toll ticket printer 5130, in the event the carriage is not returned completely to its right-hand marginal stop position or there is inadequate paper stock upon the roll, the rod 5136 is not engaged and the armature 5134 is moved away from the core of the magnet M5132. When the armature 5134 is moved away from the core, the set of switch springs S5133 is actuated for signal purposes, in a manner to be more fully explained hereinafter, in order to indicate that one of the conditions mentioned above exists and that the toll ticket printer 5130 is accordingly not in readiness of subsequent operation. The record printer 5140 included in exchange 4 zone 84, diagrammatically illustrated in Fig. 51, is of conventional construction and arrangement and may take the form of an automatic typewriter of the general character of that known as the "Electromatic" typewriter. The record printer 5140 comprises, among other elements, an operating motor 5141, a set of off-normal springs S5142, a number of operating magnets, including the stroke magnet PM, and a control network connected and arranged in a manner to be more fully explained hereinafter.

The record printed 5140 is so connected and arranged that it is adapted to be controlled from any one of the printer controllers 4200 etc., to print a record sheet of the character of that shown in Figs. 55 and 61 of the John E. Ostline copending application Serial No. 453,799, filed August 6, 1942, containing all of the necessary record information in conjunction with each metropolitan toll call which is extended from exchange 4 zone 84 and which is to be recorded. It is to be noted by referring to Figs. 55 and 61 of the above-mentioned Ostline application that a record printer 5140 prints one line across the record sheet, for each metropolitan toll call, which includes the following information:

1. The month, the day, the hour, and the minute of the termination of the call.
2. The zone and the exchange code, as well as the numerical line terminal of the directory number of the calling subscriber substation.
3. The zone and the exchange code, as well as the numerical line terminal of the directory number of the called subscriber substation.
4. The time duration of the call in minutes.
5. The rate factor applicable to the call.
6. The class of service rendered the calling subscriber substation.
7. The identification numbers of the register translator, the toll ticket repeater, and the printer controller utilized in setting up the call and in controlling the record printer 5140.

The toll ticket printer 5130 is so connected and arranged that it is adapted to be controlled from any one of the printer controllers 4200 etc. and the printer link 5000 to print and to produce toll tickets of the character of that shown in Figs. 56 to 60, inclusive, and 62 of the above-mentioned Ostline application, containing all of the necessary record information in conjunction with each metropolitan toll call which is extended from exchange 4 zone 84 and which is to be recorded. By referring to Figs. 56 to 60, inclusive, and 62 of the above-mentioned copending Ostline application, it is noted that the toll ticket printer 5130 prints a toll ticket individual to each metropolitan toll call, which includes the following information printed on a corresponding number of lines:

1. The month, the day, the hour, and the minute of the termination of the call.
2. The zone and the exchange code, as well as the numerical line terminal of the directory number of the calling subscriber substation.
3. The zone and the exchange code, as well as the numerical line terminal of the directory number of the called subscriber substation.
4. The time duration of the call in minutes, the rate factor applicable to the call, and the class of service rendered the calling subscriber substation.
5. The cost of the call on the appropriate charge basis (either the monetary basis or the unit call basis).

Preferably, in exchange 4, zone 84, each first selector, such as the first selector 501, each second selector, such as the second selector 502, each special service selector, such as the special service selector 503, each individual connector, such as the individual connector 525, and each party connector, such as the party connectors 521, 522, 523 and 524, diagrammatically illustrated in Fig. 5, are of the well known Strowger type. At this point it is noted that the special service selector 503 is of the well known drop-back Strowger type which is adapter to respond in a vertical direction in response to two separate digits in the event that the first digit dialed thereto is of the particular value which causes the switch to restore to normal. Finally, at the manual switchboard in exchange 4 zone 84, the manual operator position 0, the toll operator position 110, the miscellaneous operator position 112, the information operator position 113, and the intercepting operator position 114, which includes the supervisory apparatus disclosed in Figs. 54 and 55, and as diagrammatically illustrated in Fig. 5, comprises conventional position apparatus for answering, extending, and intercepting calls when such is desirable, in a well known manner.

Preferably, in exchange 4 zone 84, each toll selector repeater, such as the toll selector repeater 5200, and each toll selector, such as the toll selector 5300, is of the well known Strowger type. For example, the toll selector repeater 5200 comprises a switching mechanism 5210, including a wiper set provided with the wipers 5211, 5212 and 5213, and an associated contact bank, the associated contact bank for each wiper comprising ten vertically spaced apart rows or levels of contact sets, each level of contact sets including ten circumferentially spaced apart individual contacts. Also, the switching mechanism 5210 comprises a vertical magnet M5214, a rotary magnet M5215, a release magnet M5216, two sets of vertical off-normal springs S5217 and S5218, and two sets of cam springs S5219 and S5220, which are actuated when the wiper set is moved in the rotary direction eleven steps away from its normal rotary position. The toll selector repeater 5200 also comprises a plurality of control relays, whereby the various switching operations of the selector are performed in a manner to be more fully explained hereinafter. The toll selector 5300 comprises a switching mechanism 5310, including a wiper set provided with the wipers 5311, 5312 and 5313 and an associated contact bank. The associated contact bank for each wiper comprises ten vertically spaced apart rows or levels of contact sets, each level of contact sets including ten circumferentially spaced apart individual contacts. Also, the switching mechanism 5310 comprises a vertical magnet M5314, a rotary magnet M5315, a release magnet M5316, two sets of vertical off-normal springs S5317 and S5318, two sets of cam springs S5319 and S5320, which are actuated when the wiper set is moved in the rotary direction eleven steps away from its normal rotary position, and a set of normal post springs S5321 which is actuated when the wiper set has been moved in a vertical direction to a particular level or levels, as the case may be. In the illustrated example, the normal post springs S5321 are actuated when the wiper set has been raised in a vertical direction to the first level of the associated set of bank contacts, in order to alter the supervisory circuit of the individually associated toll ticket repeater 800 so that it will respond to supervisory signals transmitted over unusually long toll connections extended over the toll lines accessible in this level of the toll selector. The toll selector 5300 also comprises a plurality of control relays, all connected and arranged in a manner to be more fully explained hereinafter.

The toll selector repeater 5200 and the toll selector 5300 have access over the second level of their associated bank contacts to the trunk lines, such as the trunk line 5626 extending to the incoming selector 5601 in exchange 2 zone 27. When a call is set up from an extended service subscriber substation the call is set up from an extended service subscriber substation in exchange 4 zone 84 to a subscriber located in either exchange 2 or 3 in zone 27. The register translator included in the connection causes the call to be routed through a toll selector repeater, such as 5200, and thus by-passes the toll ticketing apparatus. Such calls may be made without charge to subscribers rendered extended service, for the reason that extended service subscribers pay a higher monthly rate for this type of service. However, when a regular subscriber in exchange 4 zone 84 extends a call to a subscriber located in either exchange 2 or 3 in zone 27, the register translator involved in the connection causes the call to be routed by way of a toll ticket repeater and an individually associated toll selector, for example, the toll ticket repeater 800 and the associated toll selector 5300, and the trunk line 5626 terminating in the second selector 5601 located in exchange 2 zone 27. Thus, all subscribers, other than subscribers provided with extended service, are ticketed for all calls set up to subscribers in zone 27 and are thereby assessed a charge for such connections, which is in addition to the normal charge made monthly for telephone service.

The toll selector 5300, it is to be noted, has access over the first level of its associated bank contacts, to toll lines, such as the toll line 5625, extending to the toll tandem exchange. This exchange, as has been previously mentioned, is a toll switching sender and is merely provided for the purpose of further routing calls to the various exchanges located in the various zones and for the additional purpose of including voice amplifying repeaters in connections which involve long toll line. Thus, all calls from exchange 4 zone 84 which are to be extended to subscriber substations located in the single exchange in zone 62 and to the exchanges 3 and 7 located in zone 86, are routed through the switching apparatus provided at the toll tandem exchange. More particularly, all the call extended by subscribers located in exchange 4 zone 84 to subscribers in other exchanges reached by way of the toll tandem exchange, are routed under control of the register translator included in the connection by way of a toll ticket repeater and an individually associated toll selector to the toll tandem exchange. Thus, all calls extended through the toll tandem exchange are ticketed so that a charge may be assessed against the calling subscribers for all such calls. Attention is directed at this time, however, to the fact that the extended service subscriber substations are charged for such calls on a unit basis, while all other subscribers are charged for such calls on a monetary basis.

A better understanding of the connection and arrangement of the apparatus incorporated in the telephone system will be facilitated by a consideration of the details of operation of the switching apparatus incident to the extension of various calls from exchange 4 zone 84, as will appear hereinafter.

*The selection of an idle primary selector and an idle primary register*

In exchange 4 zone 84, when a call is initiated at a subscriber substation associated with one of the subscriber lines terminating thereat, an idle primary selector is automatically associated with the calling subscriber line. For example, when a call is initiated at the ordinary private subscriber substation TP by removing the receiver of the telephone instrument thereat from its associated switchhook, a loop circuit is completed between the line conductors C408 and C409 of the line 407, and operation of the individually associated line switch 423 is initiated. The line switch 423 operates to find an idle primary selector in the second group, including the primary selector 600. Assuming that the primary selector 600 is the first idle primary selector in the second group, the line switch 423 operates to seize the trunk 462 extending thereto, the primary selector being marked as idle by the absence of ground potential upon the control conductor C465 of the trunk 462. Also, the line switch 423 operates to mark the private subscriber line 407 as busy to the connectors having access thereto.

When the primary selector 600 is thus seized, a circuit is completed for energizing the winding of the line relay R730. This circuit extends from ground by way of the resistor 722, the strap 723, the contacts 720 of the cam springs S718, the contacts 771 and 626 to the line conductor C464, and from battery by way of the windings of relay R730, the contacts 773 and 624 to the line conductor C463, the line conductors C464 and C463 of the trunk 462 being connected to the loop circuit, including the line switch 423 and the line conductors C408 and C409 of the line 407 extending to the calling private subscriber substation TP. When thus energized, the relay R730 operates to complete at its contacts 731, a circuit for the hold relay R740 which includes ground at the contacts 777, thereby to cause the latter relay to operate. Upon operating, the hold relay R740, at its contacts 743, completes a circuit for applying ground potential to the control conductor C465 by way of the contacts 628, thereby to mark the trunk 462 as busy to other line switches having access thereto, and to complete a holding circuit for retaining the line switch 423 in its operated position. At its contacts 745, the hold relay R740 also prepares a circuit, including the contacts 634 and 619, between the test wiper 616 and the magnet FM618 of the finder F610. At this time, the wipers 611 to 617, inclusive, of the finder F610 engage the contacts in the associated contact banks terminating the conductors extending to one of the primary registers, which primary register is marked either idle or busy depending, respectively, upon the absence or presence of ground potential upon the test conductor C646 thereof. Assuming that the primary register mentioned is busy, ground potential appears upon the test conductor thereof, which is terminated by the contact engaged by the test wiper 616 of the finder F610, thereby to complete the above-traced circuit for the magnet FM618. The magnet FM618 operates over this circuit and conditions the wipers of the finder F610 to be driven one step in a clockwise direction, and to interrupt, at the contacts 619, the previously traced circuit for energizing the magnet FM618. The magnet FM618 then restores, thereby to drive the wipers one step in the clockwise direction and to reprepare, at the contacts 619, a circuit substantially identical to that previously traced and including the test wiper 616 for testing the idle or busy condition of the next primary register.

Assuming now that the primary register 1200 is the first idle primary register in the associated group, the magnet FM618 is operated intermittently, thereby to drive the wipers of the finder F610 until they engage the contacts in the associated contact banks terminating the conductors C641 to C647, inclusive, extending to the primary register 1200. Since it has been assumed that the primary register 1200 is the first idle primary register, no ground potential appears upon the test conductor C646 individual thereto, whereupon the previously traced circuit for energizing the magnet FM618 is interrupted. At this time a circuit is completed for energizing the winding of the cut-in relay R630 in the primary selector 600 in series with the magnet FM618 of the finder F610, which may be traced from ground by way of the contacts 744, the vertical off-normal springs S720, the contacts 629, the winding of the relay R630, the contacts 619, and the winding of the magnet FM618, to battery. When this series circuit is completed, the cut-in relay R630 operates but the magnet FM618 does not operate due to the high resistance of the winding of the cut-in relay R630. At this time it is noted that as long as the test wiper 616 of the finder F610 engages the contacts in the associated contact bank terminating test conductors having ground potential thereon, a path is completed for short-circuiting the winding of the cut-in relay R630, thereby positively to prevent operation of the latter relay until the finder F610 finds an idle primary register. The path mentioned for short-circuiting the winding of the cut-in relay R630 extends, when completed, from ground by way of the contacts 744, the vertical off-normal springs S720, the contacts 629, the winding of the relay R630, and the contacts 745 and 634, to the grounded test wiper 616 of the finder F610. Accordingly, at this time the finder F610 has operated to seize the idle primary register 1200.

Upon operating, the cut-in relay R630 completes, at its contacts 631 and 633, a series loop circuit for energizing the line relay R1370 in the primary register 1200. This loop circuit extends from ground by way of the resistor 722, the strap 723, the contacts 720 of the cam springs S718, the contacts 771 and 626, the conductor C464 of the trunk 462, the line switch 423, the conductors C408 and C409 included in the loop circuit at the calling subscriber substation, and returning by way of the line switch 423, the conductor C463 of the trunk 462, the contacts 631, the wiper 611 of the finder F610, the conductor C641 extending to Fig. 13, the upper winding of the party line relay R1360, and the winding of the line relay R1370, to battery. It is also to be noted that at the same time the ground is applied over the above-traced circuit to the conductor C464 of the trunk 462, the resistance ground potential is also extended by way of the contacts 633, the wiper 613 of the finder F610, the conductor C643 extending to Fig. 13, and the lower winding of the party line relay R1360 to negative 24 volt battery. In this connection, it is to be noted that unless otherwise specified, the potential of the battery is 48 volts. In this circuit the value of the resistor 722 is such that the party line relay R1360 does not normally operate over the above-traced circuit. However, under some conditions direct ground potential is applied from a primary selector over this circuit and causes the temporary operation of the party line relay R1360 at this time. However, when the send relay R620 operates, at its contacts 626, it interrupts the circuit for applying ground potential to conductor C643 from the selector and thus causes the party relay R1360 to restore. The line relay R1370 upon operating completes, at its contacts 1371, a circuit for operating the auxiliary line relay R1420. Upon operating, the auxiliary line relay R1420, at its contacts 1421, completes an obvious circuit for operating the hold relay R1430, and at its contacts 1422 it completes a circuit for operating the send relay R620 in the primary selector 600. The latter circuit may be traced from ground by way of the contacts 1422, the wiper 1635 of the sequence switch S1630 and the engaged home contact in its associated contact bank, the conductor C1293, the contacts 1271, the conductor C642, the wiper 612 of the finder F610, the contacts 622 and 632, and the winding of the send relay R620, to battery. The send relay R620 operates over the above-traced circuit and, at its associated contacts, performs certain circuit operations and alterations, which will be subsequently explained.

Figure 12:
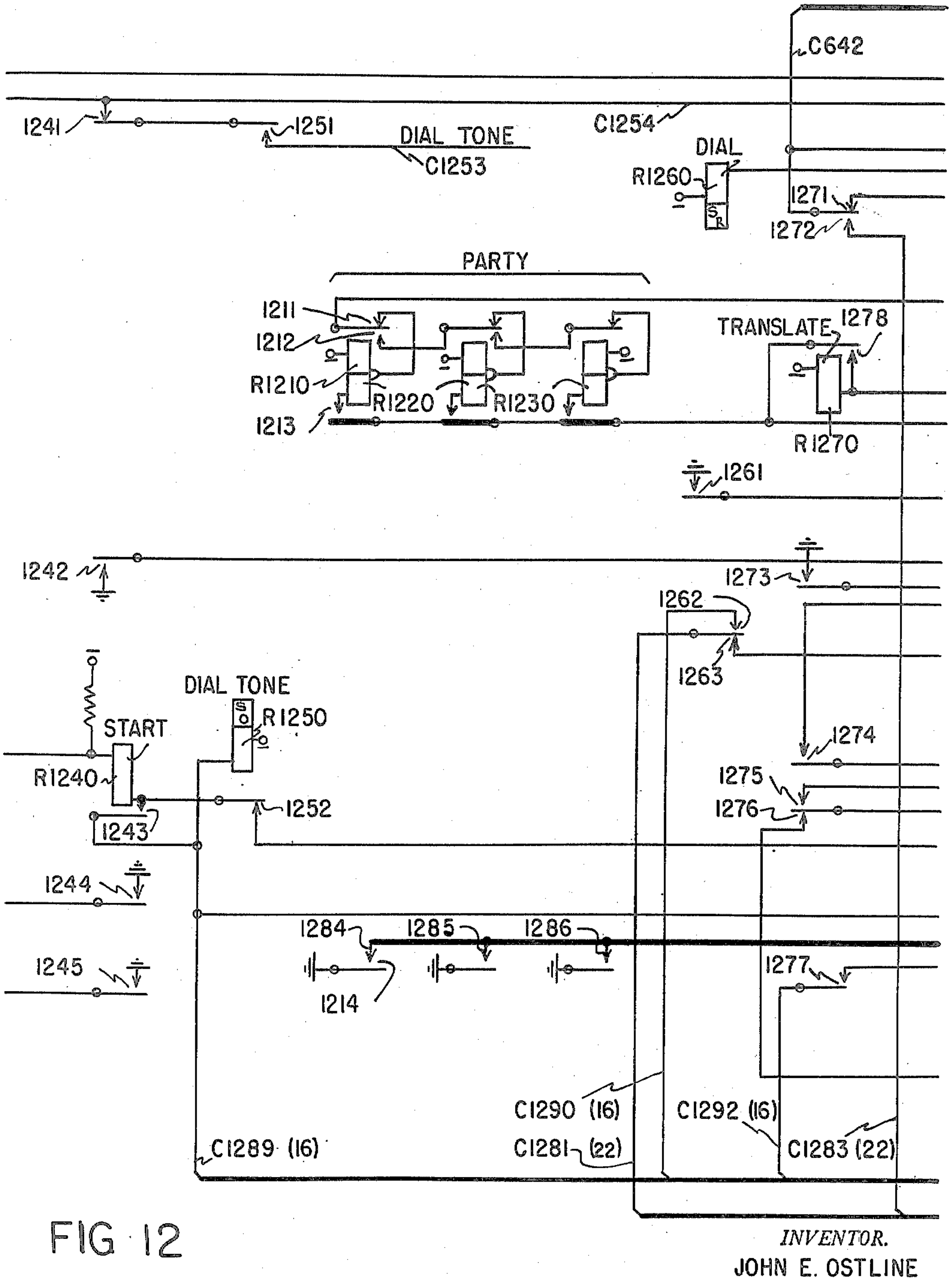
Figure 12A:
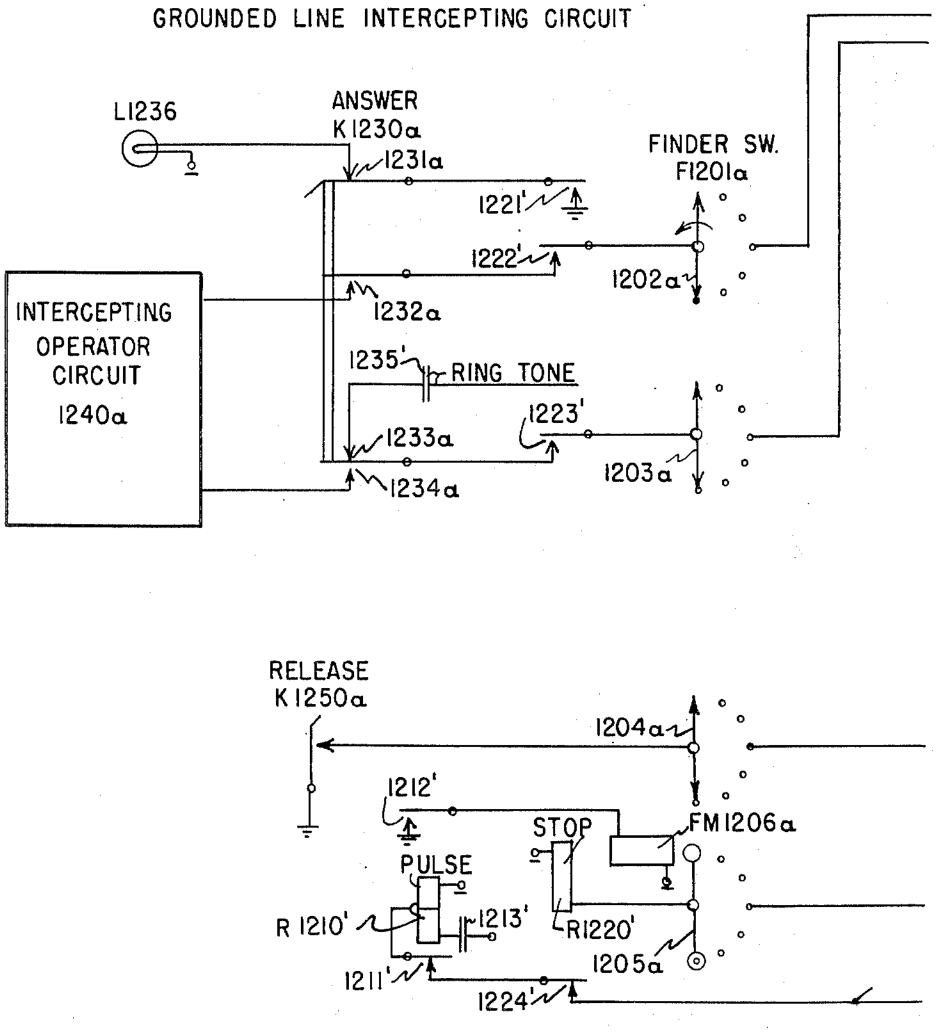

The hold relay R1430, upon operating over the above-mentioned circuit, completes, at its contacts 1434, an obvious circuit for energizing the winding of the lock relay R1410, thereby to cause the latter relay to operate. Upon operating, the lock relay R1410, at its contacts 1411, applies ground potential to the hold conductor C1294 by way of the contacts 1316, whereby a circuit, including the wiper 1634 of the sequence switch S1630 and the engaged home contact in its associated contact bank, and the conductor C1289 extending to Fig. 12, is completed for energizing the winding of the dial tone relay R1250 in order to cause the latter relay to operate. Upon operating, the dial tone relay R1250 completes, at its contacts 1251, a circuit including the dial tone conductor C1253, the contacts 1241, and the conductors C1254 and C643, whereby a dial tone signal is transmitted over the previously traced loop circuit including the finder F610, the trunk 462, the line switch 423, and the private subscriber line 407 extending to the calling private subscriber substation TP, thereby to indicate to the subscriber thereat that he may proceed with the extension of the call by dialing the first digit of the called directory number.

Also, the hold relay R1430, at its contacts 1431, prepares a circuit for operating the dial relay R1260 and also for applying ground potential to the wiper 1631 of the sequence switch S1630, which circuit is only completed upon the restoration of the auxiliary line relay R1420.

The lock relay R1410, upon operating, at its contacts 1412 applies ground potential to the test conductor C646, thereby to mark the primary register 1200 as busy to other finders in the group, including the finder F610, having access thereto. Also, the application of ground potential to the test conductor C646 completes a holding circuit, including the test wiper 616 and the contacts 635 and 629', for energizing, in series, the winding of the cut-in relay R630 and the magnet FM618. The above-traced holding circuit for the cut-in relay R630 is completed in response to the operation of the auxiliary line relay R1420 and is, therefore, in its operated position at the time the lock relay R1410 is energized to complete the above-traced holding circuit for the cut-in relay R630. Further, it is noted that the application of ground potential to the hold conductor C1294 at the contacts 1411, by the operation of the lock relay R1410, completes a circuit including the contacts 1341 and 1322 for energizing the heater 1332 of the thermostatic timer 1330, whereby the bimetallic bar 1331 thereof is heated. When the bimetallic bar 1331 of the thirty second timer 1330 is thus heated, it moves toward closure of the associated contacts 1333, for a purpose to be more fully explained hereinafter.

Figure 13:
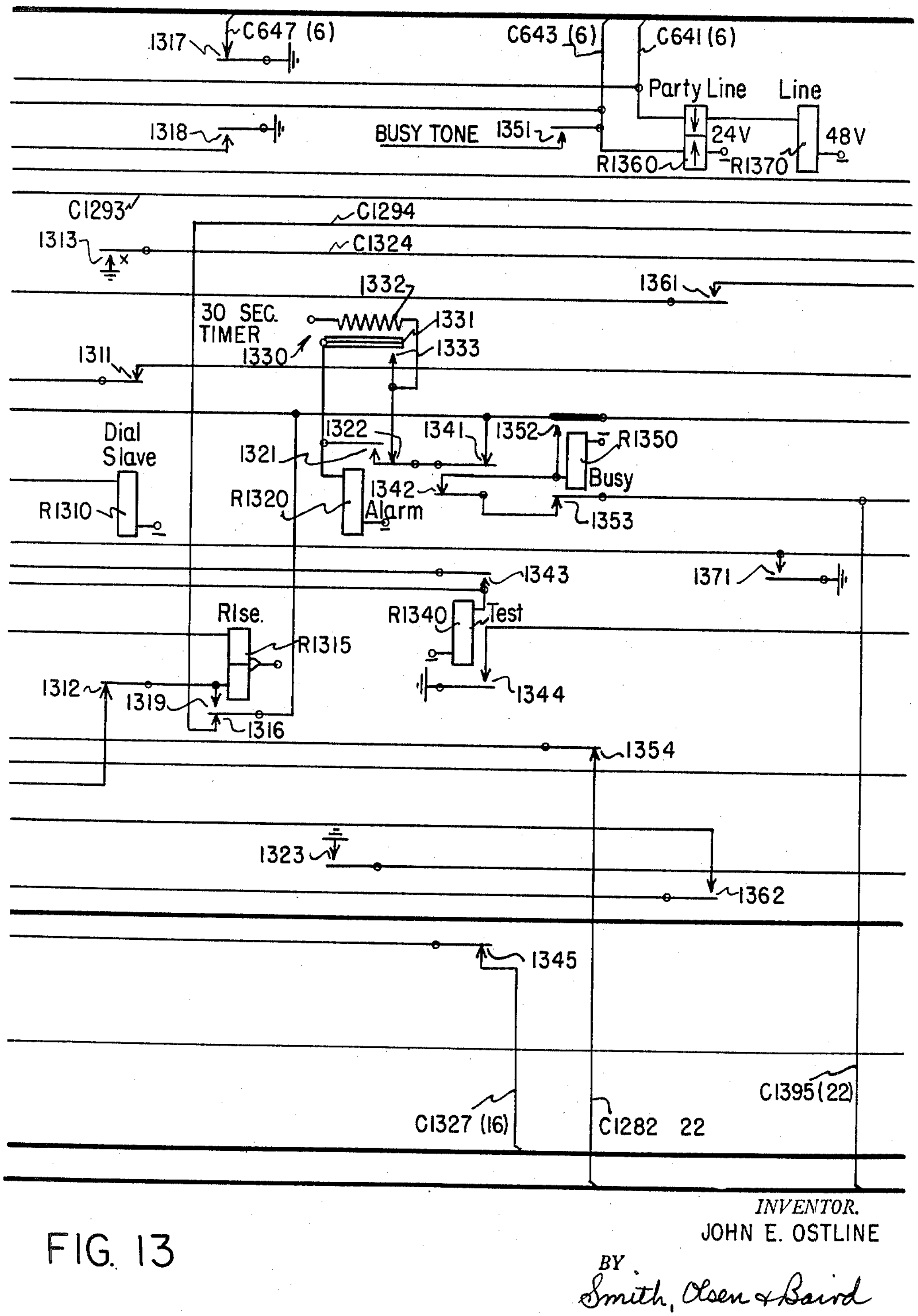

When the send relay R620 in the primary selector 600 operates, it completes, at its contacts 621, a holding circuit for itself which includes the contacts 632, the wiper 617 of the finder F610, the conductor C647 extending to Fig. 13, and ground potential applied to contacts 1317 of the deenergized release relay R1315. At its contacts 622, the send relay R620 opens the previously traced initial energizing circuit for itself, including the wiper 612 of the finder F610. However, this relay remains in its operated position over the holding circuit, including the wiper 617 of the finder F610. At its contacts 623 and 624, the send relay R620, upon operating, transfers the circuit, including the winding of the line relay R730, from the conductor C463 to the wiper 612 of the finder F610; at its contacts 625 and 626, it transfers the circuit, including the resistor 722, from the conductor C464 to the wiper 614 of the finder F610; and, at its contacts 627 and 628, it transfers the control conductor C465 from ground potential, at the contacts 743 of the primary selector 600, to the wiper 615 of the finder F610. As a result of the latter transfer, ground potential is applied to the hold conductor C645 from the contacts 1441 of the deenergized send relay R1440, by way of the conductor C645 extending to Fig. 6, the wiper 615, and the contacts 627. Accordingly, the line switch 423 is now held in its operated position under control of the primary register 1200 instead of under the control of the primary selector 600. As a result of the transfer of the line relay R730 of the primary selector 600 from the conductor C463 to the wiper 612, a circuit is now completed for maintaining the line relay R730 in its operated position, which includes the conductor C642 extending to Fig. 12, the contacts 1271, the wiper 1635 of the sequence switch S1630 and its associated home contact position, and ground potential applied to contacts 1422. Accordingly, the line relay R730 of the primary selector 600 is now under control of the auxiliary line relay R1420 in the primary register 1200. The transfer of ground potential, including the resistor 722, from the conductor C464 to the wiper 614 of the finder F610, permits the party line relay R1360 to be restored in the event it was operated, as has been noted. Finally, the send relay R620 interrupts, at its contacts 629, the previously traced original operating circuit for energizing the winding of the cut-in relay R630, but the relay R630 now remains operated over the previously traced circuit, including the contacts 629' and the winding of the magnet RM618.

As a result of the foregoing description of operation, the line switch 423, individually associated with the private subscriber line 407, has seized the primary selector 600, the finger F610 individually associated with the primary selector has seized the primary register 1200, and the primary register 1200 is in readiness to receive the first digit of the called directory number dialed by the calling private subscriber at substation TP.

*Call to the manual operator position 0*

Assuming that the call extending from the private calling subscriber substation TP to the primary selector 600 and the primary register 1200 is to be completed to the manual operator position 0 in exchange 4 zone 84, the subscriber at the calling private subscriber substation TP, upon hearing the dial tone signal transmitted from the primary register 1200, proceeds to dial the directory number of the manual operator at position 0, the directory number being the single digit "0."

When the subscriber at the calling private subscriber substation TP dials the single digit "0," a corresponding number of impulses is transmitted over the calling private subscriber line 407, in a well-known manner, whereby the line relay R1370 in the primary register 1200 follows the impulses of the digit "0." It should be noted that the loop circuit for controlling the line relay R1370 now includes the upper winding of the party line relay R1360, the conductor C461, the wiper 611 of the finder F610, the contacts 631, and the conductor C463 extending to the calling subscriber and returning by way of the calling subscriber line, the conductor C464, the contacts 633, the wiper 613 of the finder F610, the conductor C643, and the lower winding of the party line relay R1360 to negative 24 volt battery. Accordingly, the line relay R1370 is retained in its operated position but the party line relay, being differentially wound, remains in its unoperated position as a result of the above-traced circuit, including its upper and lower windings. In response to the dialing of the digit "0," the line relay R1370 restores and reoperates intermittently ten times. Each time the line relay R1370 restores and then reoperates, it interrupts and then recompletes, at its contacts 1371, the previously traced circuit for the auxiliary line relay R1420. The auxiliary line relay R1420 therefore restores and reoperates the same number of times as the line relay R1370. Each time the auxilary line relay R1420 restores and then reoperates, it interrupts and then recompletes, at its contacts 1422, the previously traced circuit including the conductor C642 for energizing the winding of the line relay R730 of the primary selector 600, thereby to cause the line relay R730 to follow the auxiliary line relay R1420 in the primary register 1200. Also, each time the line relay R1420 restores and then reoperates, it interrupts and then recompletes, at its contacts 1421, the previously traced circuit for energizing the winding of the hold relay R1420. However, the latter relay does not restore during impulsing as it is of the slow-to-release type. Finally, each time the line relay R1420 restores and then reoperates, it completes and then interrupts, at its contacts 1423, a circuit for energizing the winding of the dial relay R1260 and a multiple circuit for energizing the magnet AM1504 of the first code switch A1500. The above-mentioned circuit extends, when completed, from ground by way of the contacts 1423 and 1431, one branch of the circuit extending to the winding of the dial relay R1260 and the other branch of the circuit extending by way of the wiper 1631 of the sequence switch S1630 and the engaged home contact in the associated bank, and the winding of the magnet AM1504 to battery. When thus energized the dial relay R1260 operates and remains operated during impulsing since it is of the slow-to-release type. Each time the above-traced circuit is completed to the magnet AM1504, the magnet operates, thereby to condition the wipers 1501 to 1503, inclusive, of the first code switch A1500 to be driven one step in the counterclockwise direction, and each time this circuit is interrupted the magnet AM1504 is deenergized and restores in order to drive the wipers of the first code switch A1500 one step in the counterclockwise direction.

Upon operating, the dial relay R1260 completes, at its contacts 1261, a circuit for energizing the winding of the dial slave relay R1310, thereby to cause the latter relay to operate. Upon operating, the dial slave relay R1310 completes, at its contacts 1313, a circuit including the conductor C1324 for energizing the magnet SM1636 of the sequence switch S1630, thereby to cause the magnet SM1636 to operate and condition the wipers 1631 to 1635, inclusive, to be driven one step in the counterclockwise direction. Also, the dial slave relay R1310 interrupts, at its contacts 1311, a point in the circuit for energizing the winding of the translate relay R1270, and interrupts, at its contacts 1312, a point in the circuit for energizing the lower winding of the release relay R1315, thereby positively to prevent operation of either the translate relay R1270 or the release relay R1315 during impulsing.

At the conclusion of the single digit "0" the wipers 1501 to 1503, inclusive, of the first code switch A1500 engage the tenth contacts in the associated contact banks and, shortly thereafter, the slow-to-release dial relay R1260 restores to normal. Upon restoring, the dial relay R1260 interrupts, at its contacts 1261, the previously traced circuit for energizing the dial slave relay R1310, thereby to cause the latter relay to restore. Upon restoring, the dial slave relay R1310 interrupts, at its contacts 1313, the previously traced circuit for energizing the magnet SM1636 of the sequence switch S1630, thereby to cause the magnet mentioned to restore and drive the wipers 1631 to 1635, inclusive, one step in the counterclockwise direction. When the wipers of the sequence switch S1630 are driven one step in the counterclockwise direction away from their home positions, the wiper 1634 disengages the home contact in the associated bank, thereby to interrupt the previously traced circuit for energizing the winding of the dial tone relay R1250 in order to cause the latter relay to restore. Upon restoring, the dial tone relay R1250 interrupts, at its contacts 1251, the previously traced circuit for transmitting dial tone to the calling subscriber at the substation TP. Also, the dial tone relay R1250 prepares, at its contact 1252, a circuit to be traced hereinafter for intercepting a calling subscriber line in the event that the tip conductor thereof has a false permanent ground connected thereto when the above mentioned loop circuit is completed for energizing the relays R1360 and R1370.

Furthermore, when the wiper 1635 of the sequence switch S1630 disengages the home contact in the associated contact bank, it interrupts the previously traced circuit for controlling the line relay R730 in the primary selector 600. However, when the wiper 1635 engages the first contact in the associated bank, it completes an alternative circuit for maintaining the winding of the line relay R730 in the primary selector in its operated position. The above-mentioned alternative circuit for energizing the line relay R730 extends from ground by way of the contacts 1422, the wiper 1503 of the first code switch A1500 and the engaged tenth contact in the associated contact bank, the wiper 1635 of the sequence switch S1630 and the engaged first contact in the associated contact bank, the conductor C1293, the contacts 1271, the conductor C642, the wiper 612 of the finder F610, the contacts 623 and 773, and the windings of the line relay R730, to battery.

Also, upon restoring, the dial slave relay R1310 prepares, at its contacts 1311 and 1312, respectively, the previously mentioned circuits including the windings of the translate relay R1270 and the release relay R1315. In the present example, the circuit for energizing the winding of the translate relay R1270 is not completed in view of the fact that the single digit "0" registered in the first code switch A1500 does not indicate that the first digit "0" is to be translated. If the single digit "0" registered in the first code switch A1500 was one that should have been translated, then the tenth contact in the bank associated with the wiper 1503 would have been connected to the HA terminal instead of to the CO terminal. The circuit for energizing the lower winding of the release relay R1315 is completed in view of the fact that the single digit "0" registered in the code switch A1500 indicates that a register translator is not required for the extension of the connection, and that the call may be extended to its destination directly under the control of the calling device at the calling substation TP. More particularly, the circuit for energizing the lower winding of the release relay R1315 extends from ground by way of the contacts 1422, the wiper 1503 and the engaged tenth contact in its associated contact bank, the terminal CO, the conductor C1291, the contacts 1276 and 1312, and the lower winding of relay R1315 to battery. When thus energized the release relay R1315 operates and, at its contacts 1319, completes a locking circuit for the lower winding thereof, including ground at the contacts 1411. At its contacts 1316, the relay R1315 disconnects ground potential from the conductor C1294 and the wiper 1634 of the sequence switch S1630; at its contacts 1317, it removes ground potential from the conductor C647, whereupon the holding circuit for the send relay R620 is opened and causes the restoration of the latter relay to normal; and, at its contacts 1318, it applies ground potential to the conductor C642 extending to Fig. 6, and to the contacts 1271. The former circuit, including the conductor C642 and the wiper 612 of the finder F610, is of no effect at the present time since the holding circuit for the send relay R620 is opened and for the further reason that the cut-in relay R630 will be restored to normal as will be subsequently explained. In response to the application of ground potential to the contacts 1271, a circuit is completed by way of the conductor C1293, the wiper 1635 of the sequence switch S1630 in engagement with the first contact of its associated bank, the terminal CO, the conductor C1291, the contacts 1276 and 1312, and the lower winding of the release relay R1315, to battery. Thus, the release relay R1315 is held over a locking circuit which includes its own contact 1318 in addition to the locking circuit including its contacts 1319, and ground at the contacts 1411. Further operations which occur as a result of the release relay R1315 will be described after a description is given of the operation of the primary selector 600 which also responded to the first digit "0" dialed by the calling subscriber at substation TP.

Considering now the operation of the primary selector 600 during the dialing of the single digit "0," and prior to the restoration of the send relay R620, it is again pointed out that the auxiliary line relay R1420 in the primary register 1200 repeats the impulses of the single digit "0" to the line relay R730 in the primary selector. This circuit may be traced from ground by way of the contacts 1422, the wiper 1635 of the sequence switch S1630 and the engaged home contact of its associated bank, the contacts 1271, the conductor C642, the wiper 612 of the finder F610, the contacts 623 and 773, and the windings of the line relay R730 to battery. The initial operation of the line relay R730 completes a circuit for the hold relay R740, which may be traced from ground by way of the contacts 777 and 731, and the winding of the hold relay R740, to battery. In response to this circuit, the hold relay R740 operates and, at its contacts 741, prepares a series circuit including the winding of the transfer relay R750 and the vertical magnet M711. Each time the line relay R730 restores and then reoperates, it interrupts and then recompletes, at its contacts 731, the above-traced energizing circuit for the winding of the hold relay R740. However, the latter relay is of the slow-to-release type and does not restore to normal during impulsing. Also, each time the line relay R730 restores and then reoperates, it completes and then interrupts, at its contacts 732, a series circuit for operating the transfer relay R750 and the vertical magnet M711. The first time the line relay R730 restores to normal, a circuit is completed from ground, by way of the contacts 777, 732 and 741, the vertical off-normal springs S719, the winding of the transfer relay R750 and the winding of the vertical magnet M711, to battery. The relay R750 operates over the above-traced circuit and, at its contacts 751, completes a circuit for itself in series with the vertical magnet M711 which is independent of the vertical off-normal springs S719. Each time the vertical magnet M711 is energized, it operates to drive the wiper set of the switch mechanism 700 one step in the vertical direction. When the wiper set of the switch mechanism 700 is driven one step in the vertical direction, the sets of vertical off-normal springs S715 and S716 are actuated into engagement, the set of vertical off-normal springs S719 is actuated to open the initial energizing circuit, including the transfer relay R750 and the vertical magnet M711, and the set of vertical off-normal springs S720 is actuated to open a point in the previously traced circuit for the cut-in relay R630. More particularly, the set of vertical off-normal springs S715 prepares a point in the circuit for energizing the release magnet M714, and the set of vertical off-normal springs S716 completes a circuit for energizing the step relay R760, which may be traced from ground by way of the contacts 743 and 752, the vertical off-normal springs S716, and the winding of the relay R760 to battery. Upon operating, the relay R760, at its contacts 761, completes a locking circuit for itself which may be traced from ground, by way of the contacts 777, 761 and 713, the springs S716, and the winding of the step relay R760 to battery. At its contacts 762, the relay R760 prepares a point in the circuit for controlling the operation of the rotary magnet M712.

At the conclusion of the single digit "0" repeated to the line relay R730, the wiper set of the switch mechanism 700 occupies its tenth vertical step. At this time the send relay R620 in the primary selector 600 restores incident to the operation of the release relay R1315 in the primary register 1200, as previously explained. Upon restoring, the send relay R620 interrupts, at the contacts 629', the previously traced circuit for maintaining the cut-in relay R630 in its operated position, whereupon the latter relay also restores to normal. In this connection it is to be noted that the initial operating circuit for the cut-in relay R630 included the vertical off-normal springs S720 and, since these springs have been actuated, the circuit for relay R630 including the contacts 744 and 729 cannot be completed at the present time. Upon restoring, the cut-in relay F630, at its contacts 631 and 633, interrupts the previously traced loop circuit for energizing the line relay R1370 in series with the upper and lower windings of the party line relay R1360, thereby to cause the line relay R1370 to restore to normal. Attention is directed to the fact that the party line relay R1360 has not been operated, due to the fact that the windings thereof are differentially wound and the energizing circuit in series with the upper and lower windings prevents the relay from operating. Also, the cut-in relay R630 interrupts, at its contacts 632, a point in the previously traced holding circuit for the send relay R620; at its contacts 635, it opens a further point in the holding circuit for the cut-in relay R630; and, at its contacts 634, it again prepares a point in the circuit for operating the magnet FM618. When the latter circuit is completed, ground potential applied to the conductor C646, by way of the contacts 1412 of the operated lock relay R1410, causes the energization of the magnet FM618, whereupon the wipers of the finder F610 are automatically advanced to search for an idle primary register.

As a further result of the restoration of the send relay R620, at its contacts 624 and 626 it recompletes the previously traced loop circuit, including the calling subscriber line 407, for maintaining the line raly R730 of the primary selector 600 energized. At this point, it is to be noted that at the termination of the transmission of impulses to the line relay R730 by the auxiliary line relay R1420 in the primary register 1200, the line relay R730 remains in its energized position and, at its contacts 732, opens the previously traced impulsing circuit for the transfer relay R750 and the vertical magnet M711. The transfer relay R750 thereupon restores to normal and, at its contacts 753, completes a circuit, including the contacts 743 and 762, for energizing the rotary magnet M712. When thus energized, the rotary magnet M712 operates to drive the wiper set of the switch mechanism 700 one step in the rotary direction and to interrupt, at the contacts 713, the previously traced holding circuit for energizing the winding of the step relay R760. The step relay R760 now restores to normal and, at its contacts 762, interrupts the previously traced circuit for energizing the rotary magnet M712. The rotary magnet now restores and, at its contacts 713, completes a connection between the test wiper 703 of the wiper set of the switch mechanism 700 and the winding of the step relay R760, to battery. Also, the wiper set of the switch mechanism 700 engages the first contact set in the tenth level of the associated contact bank. Further operation of the primary selector 600 is continued in the event the first contact set terminating the first trunk extending to the manual operator position 0 is busy at this time. More particularly, ground potential appearing upon the contact engaged by the wiper 703 indicates that the trunk is busy and the absence of ground potential indicates that the trunk is idle. Assuming that the trunk mentioned is busy at this time, ground potential applied to the control conductor thereof is connected by way of the test wiper 703 to complete the above-traced circuit for energizing the winding of the step relay R760, thereby to cause the latter relay to reoperate. As a result of the reoperation of the step relay R760, at its contacts 762, it again completes the energizing circuit for the rotary magnet M712 in order to drive the wiper set of the switch mechanism 700 an additional step in the rotary direction, whereupon the wiper set engages the next trunk extending to the manual operator position 0. It should be noted that switch-through relay R770 is shunted by the ground potential applied to the test wiper 703 over a circuit including the contacts 775, the winding of the relay R770, the eleventh rotary step cam springs S717, and ground at the contacts 743. Consequently, the switch-through relay R770 cannot operate so long as the wiper 703 engages a contact in its associated contact bank terminating a busy trunk line.

Assuming that the trunk 508 is the first idle trunk in the group extending to the manual operator position 0, when the wiper set of the switch mechanism 700 engages the contact set terminating the trunk 508, the control conductor C508 is ungrounded and thus the shunt is removed from the winding of the switch-through relay R770. When this occurs the switch-through relay R770 is operated over a circuit which may be traced from ground, by way of the contacts 743, the cam springs S717, the winding of the switch-through relay R770, the contacts 713, the vertical off-normal springs S716, and the winding of the stepping relay R760 to battery. When this circuit is completed, the switch-through relay R770 operates in series with the step relay R760, but the resistance of the switch-through relay R770 prevents the step relay R760 from operating at this time. At its contacts 771 and 773, the relay R770, upon operating, disconnects the loop circuit, including the conductors C463 and C464, from the winding of the line relay R730 and ground, including the resistor 722, and connects the conductors C463 and C464, by way of the contacts 772 and 774, to the wipers 701 and 702 which are now connected by way of the associated bank contacts to the line conductors C508C and C508B of the trunk 508 extending to the manual operator position 0. Accordingly, a trunk circuit, not shown, associated with the seized trunk 508, is controlled to return ground potential over the control conductor C508A, whereupon a locking circuit is completed for maintaining the switch-through relay R770 in its operated position after the line relay R730 and the hold relay R740 have restored to normal, as will be subsequently explained. The ground potential applied to the control conductor C508A is extended by way of the wiper 703, the contacts 776, the cam springs S717, the switch-through relay R770, the contacts 713, the vertical off-normal springs S716, and the winding of the step relay R760 to battery. As a further result of the operation of relay R770, at its contacts 777, it opens the circuit for maintaining the hold relay R740 in its operated position, and when the contacts 773 were opened the circuit for the line relay R730 was interrupted, whereupon these two relays now restore to normal. Also, the application of ground potential to the test wiper 703 in addition to maintaining the switch-through relay R770 in its operated position, is also extended by way of the contacts 628 to the control conductor C465 of the trunk 462, thereby to retain the line switch 423 in its operated position subsequent to the restoration of the hold relay R740 in the primary selector 600. A connection is now completed between the calling private subscriber substation TP and the manual operator position 0, and when the operator answers the call, the calling subscriber may communicate with the manual operator.

The release of the established connection between the calling private subscriber substation TP and the manual operator position is primarily under the control of the calling subscriber and is effected when the subscriber replaces the receiver of the telephone instrument upon the associated switchhook. When the calling subscriber replaces the receiver the loop circuit, including the conductors C463 and C464 and the conductors C506B and C508C extending to the trunk circuit associated with the trunk line 508, is interrupted, thereby to cause the release of the trunk circuit. When this occurs, and assuming that the operator at the manual operator position 0 has also disconnected from this trunk at this time, the ground potential applied to the control conductor C508A is removed from the test wiper 703. When ground potential is removed from the test wiper 703, the previously traced circuit, including the winding of the switch-through relay R770, in series with the winding of the step relay R760, is interrupted. The switch-through relay R770 now restores to normal and, at its contacts 776, it interrupts a further point in the previously traced circuit for applying ground potential to the control conductor C465 of the trunk 462. At its contacts 777, the relay R770 completes a circuit, including the contacts 732 and 742 and the vertical off-normal springs S715 for energizing the winding of the release magnet M714. The release magnet M714 operates over this circuit and causes the wiper set of the switch mechanism 700 to restore to its normal rotary and vertical positions, whereupon the sets of switch springs S715 and S716 are opened, and the sets of switch springs S719 and S720 are closed. More particularly, the set of switch springs S715 is disengaged thereby to interrupt the previously traced circuit for energizing the release magnet M714 in order to cause the latter magnet to restore when the wiper set has been restored to its normal resting position. At this time the primary selector 600 is completely released and is available for further use.

When the ground potential is removed from the control conductor C465 of the trunk 462 in the manner described above, the line switch 423 is released and the private subscriber line 407 is marked as idle to all connectors having access thereto. At this time the established connection between the calling private subscriber substation TP and the called manual operator position 0 is completely released.

In the foregoing explanation of the mode of operation of the primary selector 600, it was assumed that there was an idle trunk in the group of trunks, including the trunk 508, extending to the manual position 0. However, it may occur that there is not an idle trunk available at this time in the ten trunks of the group terminated in the tenth level of the bank contacts. In this event the step relay R760 and the rotary magnet M712 interact in the manner previously explained, whereby the wiper set of the switch mechanism 700 is driven in the rotary direction eleven steps away from its normal rotary position, and causes the actuation of the sets of eleventh step cam springs S717 and S718. More particularly, the set of cam springs S717 disengage, thereby positively to prevent operation of the switch-through relay R770, while the set of cam springs S718 upon being actuated disengages the contacts 720 and engages the contacts 719. When the contacts 720 and 719 are controlled in the above-described manner, an alternative circuit including the busy tone conductor C721 is substituted for the circuit including the resistor 722, whereby an energizing circuit is completed for the winding of the line relay R730 in series with the previously described loop circuit extending between the primary selector 600 and the calling subscriber substation TP. When this circuit is completed the busy tone current is transmitted to the calling private subscriber substation TP in order to indicate to the subscriber thereat that an all-trunks-busy condition is encountered by the primary selector 600. The subscriber at the calling private subscriber substation TP then effects the release of the primary selector 600 by replacing his receiver upon the telephone switchhook, in the same manner as has been previously described.

Returning now to the subsequent operation of the primary register 1200, it will be recalled that as a result of the operation of the release relay R1315 the primary selector 600 was controlled to disconnect the primary selector from the primary register 1200. More particularly, when the relay R620 in the primary selector 600 was restored to normal, the previously described loop circuit, including the relays R1360 and R1370 in the primary register 1200, was interrupted, at the contacts 631 and 633, in response to the restoration of the cut-in relay R630 under control of the send relay R620. The line relay R1370, upon restoring to normal, at its contacts 1371, interrupts the circuit for the auxiliary line relay R1420 thereby causing the latter relay to restore. At its contacts 1423, the relay R1420, upon restoring, again completes the circuit for the dial relay R1260; at its contacts 1421 it opens the energizing circuit for the hold relay R1430, whereupon the latter relay slowly restores to normal; and, at its contacts 1422, it opens a point in the circuit for applying ground potential by way of the wiper 1503 and it engaged tenth bank contact to the CO terminal extending to the lower winding of the release relay R1315. The relay R1430, upon restoring to normal, at its contacts 1434 opens the circuit for the lock relay R1410, thereby causing the latter relay to slowly restore; and, at its contacts 1431, it interrupts the above-mentioned circuit for energizing the dial relay R1260. Upon restoring, the lock relay R1410 interrupts, at its contacts 1411, the previously traced holding circuit, including the lower winding of the release relay R1315. At this time it may be well to mention that the momentary operation of the dial relay R1260, as a result of the restoration of the auxiliary line relay R1420, at its contacts 1261, momentarily operates the dial slave relay R1310. As a result of the restoration of the dial slave relay R1310, at its contacts 1312, it opens a further point in the locking circuit for the lower winding of the release relay R1315, which may be traced from ground by way of the contacts 1318 and 1271, the conductor C1293, the wiper 1635 and its engaged first contact in the associated bank, the terminal CO, the conductor C1291, the contacts 1276 and 1312, and the lower winding of the release relay R1315, to battery. The release relay R1315 now restores to normal, thereby to interrupt, at its contacts 1318, the above-traced holding circuit for its lower winding, and to complete, at its contacts 1317, a point in the circuit for rendering the primary register 1200 available for further use. As a further result of the restoration of the lock relay R1410, at its contacts 1412 it removes the busy marking ground potential from the conductor C646, thereby to mark the primary register 1200 as idle to finders, such as the finder F610, having access thereto.

Referring again to the restoration of the hold relay R1430, it will be noted that, at its contacts 1432 and 1435, it completes circuits for causing any one or all of the operated switches A1500, B1510, C1520, D1620 and S1630, to be restored to their normal home positions. More specifically, at its contacts 1435, the relay R1430, upon restoring, completes a circuit from ground by way of the winding of busy relay R1470, the wiper 1501 of the first code switch A1500 and the engaged tenth contact in its associated bank, the contacts 1435 and 1505, and the winding of the rotary magnet AM1504 of the first code switch A1500, to battery, thereby to complete a self-interrupting circuit for the magnet AM1504 for driving the wipers 1051 to 1503, inclusive, to their normal or home positions. Each time the magnet AM1504 is energized over the above-traced circuit, at its contacts 1505 it interrupts its own circuit, thereby to cause the associated wipers 1501 to 1503, inclusive, to be advanced an additional step. Each time the wipers are advanced an additional step the above-traced circuit is again completed, in view of the fact that the contacts 1 to 13 are strapped together. When the wiper 1501 is advanced from the thirteenth bank contact to the fourteenth bank contact, the above-traced stepping circuit includes the contacts 1432 and 1435 in series, whereupon the wipers 1501 to 1503, inclusive, are driven an additional step into engagement with their home contact positions. When the wiper 1501 of the first code switch A1500 engages its home contact position, the circuit for the busy relay R1470 is transferred to the wiper 1512 of the second code switch B1510. Since the wipers of the second code switch B1510 have not been advanced from their home positions, the circuit is further extended by way of the home contact engaged by the wiper 1512 to the wiper 1522 of the third code switch C1520. If, however, the wipers 1511 to 1515, inclusive, of the code switch B1510 has been advanced away from the home contacts, the self-interrupting circuit would have been completed for the rotary magnet BM1516 in order to restore the wipers 1511 to 1515, inclusive, step by step to the normal home position. The above-traced circuit, including the busy relay R1470, is further extended by way of the wiper 1522 and its engaged home contact to the wiper 1622 of the first numerical switch D1620 and its engaged home contact, and is further extended to the wiper 1632 of the sequence switch S1630. It will be recalled that neither the third code switch C1520 nor the first numerical switch D1620 has been operated to advance its wipers and, consequently, the self-interrupting circuits, including the magnet CM1526 and the magnet DM1625 for restoring the associated wipers to the home positions are not controlled at this time. The sequence switch S1630, however, has advanced its wipers 1631 to 1635, inclusive, into engagement with the first contacts in the associated contact banks. Accordingly, when the above-traced circuit, including the busy relay R1470, is extended to the wiper 1632, a self-interrupting circuit, including the contacts 1637, is completed for the magnet SM1636 of the sequence switch S1630. The magnet SM1636 under control of the circuit including the self-interrupting contact 1637 and the wiper 1631, causes the wipers 1631 to 1635, inclusive, of the sequence switch S1630 to be advanced step by step until the wiper 1632 again engages its home contact position. Attention is directed to the fact that the busy relay R1470 is maintained in its operated position as long as any one of the switches A1500, B1510, C1520, D1620 and S1630 has not restored their associated wipers to their normal home positions; and, at its contacts 1471, the relay R1470 applies ground potential to the conductor C646, thereby to prevent the primary register 1200 from being seized by a finder, such as the finder F610, during the period of time the above-mentioned switches are restoring to their normal home contact positions. When the switches are all restored to normal, the busy relay R1470 also restores to normal and, at its contacts 1471, removes the ground potential from the conductor C646 thereby to mark the primary register 1200 idle to the finders having access thereto.

In view of the foregoing explanation of the mode of operation of the primary selector 600 and the primary register 1200 to effect the extension of a call from the calling ordinary private subscriber substation TP to the called manual operator position, it will be understood that this equipment is operative in a substantially identical manner to effect the extension of a call from any one of the calling subscriber substations TS1, TS2, TS3 and TS4 to the called manual operator position 0. Also, the primary selector 441 and the primary register 1200 are operative in a substantially identical manner to effect the extension of a call from the calling extended service private subscriber substation TX or from the calling denied toll service private subscriber substation TD to the called operator position 0.

*Special service calls*

Assuming that the call extending from the calling private subscriber substation TP to the primary selector 600 and the primary register 1200, in the manner previously explained, is to be extended to a special service operator position, such, for example, as the information operator position 113 in exchange 4 zone 84, the subscriber at the calling private subscriber substation TP proceeds to dial the directory number 113 of the information operator position. The directory number of each special service operator position comprises three digits, the first two digits of which are "1" and "1" and the final digit of the directory number determining the particular special service operator position to which the associated trunk is to be connected.

Accordingly, when the dial tone signal is transmitted from the connected primary register 1200 to the calling subscriber, the subscriber may proceed to dial the first digit "1," thereby to cause a corresponding number of impulses to be transmitted over the private subscriber line 407, in the manner previously explained. The operations of the primary register 1200 and the primary selector 600 in response to the impulse constituting the first digit "1" are substantially identical to those previously explained. More particularly, at the conclusion of the first digit "1," the wipers 1501 to 1503, inclusive, of the first code switch A1500, engage the first contacts in the associated contact banks and shortly thereafter the dial relay R1260 restores to normal in order to effect the restoration of the dial slave relay R1310. Upon restoring, the dial slave relay R1310 prepares, at its contacts 1311 and 1312, respectively, the previously mentioned circuits for the translate relay R1270 and the lower winding of the release relay R1315. In the present connection the circuit for energizing the winding of the translate relay R1270 is not completed in view of the fact that the first digit "1" registered in the first code switch A1500 does not indicate that the first digit received from the calling private subscriber substation TP is to be translated; while the circuit for energizing the lower winding of the release relay R1315 is completed in view of the fact that the wiper 1503 of the first code switch A1500 is in engagement with the first contact and indicates that no register translator is to be utilized and that the call may be extended to its destination directly under the control of the calling device at the calling subscriber substation. The circuit for energizing the lower winding of the release relay R1315 is identical with the circuit previously traced therefor, but instead of including the wiper 1503 and its associated tenth bank contact, it now includes the wiper 1503 and its engaged first bank contact. When the release relay R1315 is operated, it effects the restoration of the send relay R620 and the cut-in relay R630 of the primary selector 600, in the manner previously explained, thereby initiating the automatic restoration of the primary register 1200 to normal, in the same manner as has been described hereinbefore.

Considering now the operation of the primary selector 600, during the dialing of the first digit "1," and prior to the release of the send relay R620 and the cut-in relay R630, it is again pointed out that the auxiliary line relay R1420 in the primary register 1200 repeats the impulse of the first digit "1" to the line relay R730 of the primary selector 600. The line relay R730 follows the first digit "1," thereby to control the vertical magnet M711 to drive the wiper set of the switch mechanism 700 one step in the vertical direction. When the wiper set of the switch mechanism 700 is driven one step in the vertical direction, the vertical off-normal switch springs S715 and S716 are closed and the vertical off-normal springs S719 and S720 are opened, in the manner previously explained. Subsequent to the restoration of the send relay R620 and the cut-in relay R630, under control of the primary register 1200, the previously traced loop circuit extending from the calling private subscriber substation TP is directly connected to the primary selector, whereby the line relay R730 is retained in its operated position, in the same manner as has been previously explained. Upon the termination of the operation of the line relay R730 in response to the first digit "1," the transfer relay R750 restores to normal to effect the previously explained interaction between the step relay R760 and the rotary magnet M712, whereby the wipers of the switch mechanism 700 are automatically driven step by step in the rotary direction in order to test the idle or busy condition of the group of trunks terminating in the first level of the associated bank contacts, including the trunk 509 extending to the group of special service selectors. Subsequent operation of the primary selector 600 depends upon the idle or busy condition of the selected trunk, whereby the switch mechanism 700 is operative to seize an idle trunk extending to an idle special service selector.

Assuming that the trunk 509 extending to the special service selector 503 is the first idle trunk in the selected group, the switch mechanism 700 is controlled to seize the trunk mentioned and the switch-through relay R770 operates in the manner previously explained to effect the restoration of the line relay R730 and the hold relay R740. At this time an obvious loop circuit is completed from the calling private subscriber substation TP through the primary selector 600 to the special service selector 503. When the special service selector 503 is seized in the above-described manner, ground potential is returned over the seized trunk 509 to the test wiper 703 of the switch mechanism 700, thereby to complete the previously traced holding circuit for maintaining the switch-through relay R770 in its operated position in order to retain the primary selector 600 in its operated position. Also, the ground potential returned from the special service selector 503 to the test wiper 703 is applied to the control coductor C465 of the trunk 462, thereby to retain the line switch 423 in its operated position. Accordingly, at this time the connection has been extended from the calling private subscriber substation TP to the special service selector 503.

The subscriber at the calling private subscriber substation TP then proceeds to dial the second digit "1" and the third digit "3" into the special service selector 503. It is again noted that the special service selector 503 is of the drop-back type, whereby the wiper set of the Strowger mechanism therein is operated to the first vertical level of its associated bank contacts in response to the dialing of the second digit "1," and then automatically restored back to its normal vertical position. In response to the dialing of the third digit "3" the wiper set of the Strowger mechanism in the special service selector 503 is then operated to the third level of its associated bank contacts, and then operates automatically in a rotary direction to seize an idle trunk in the group of trunks extending to the information operator position 113. In this connection it is to be noted that as many as ten trunks may be included in the group of trunks extending to the information operator position 113, any idle one of which may be automatically selected during the rotary step by step action of the wiper set in the special service selector 503. When an idle trunk extending to the information operator position 113 is selected, a communication connection is completed, in the well known manner, between the calling private subscriber substation TP and the information operator position 113, when the operator at the last-mentioned position answers the call.

The release of the apparatus involved in the established connection between the calling private subscriber substation TP and the information operator position 113 is effected when the subscriber at the calling private subscriber substation TP replaces the receiver of the telephone instrument thereat upon the associated switchhook in the manner previously explained.

In view of the above description of the operation of the apparatus in extending a call from the calling private subscriber substation TP and the information operator position 113, it will readily be appreciated that a call may be extended in a substantially identical manner to the toll operator position 110 or to the miscellaneous operator position 112, the operations of the primary selector 600 and the primary register 1200 being identical in each case. In this connection, it is pointed out, however, that the directory number of the toll operator position is 110 while the directory number of the miscellaneous operator position is 112, and, consequently, in response to the final digit of these directory numbers the wiper set of the special service selector 503 is advanced to the tenth level of its associated bank contacts when the call is to be extend to the toll operator position, and is advanced to the second level of its associated bank contacts when the call is to be extended to the miscellaneous operator position.

In view of the foregoing explanation of the mode of operation of the primary selector 600 and the primary register 1200 to effect the extension of a call from the calling private subscriber substation TP, to the called information operator position 113, to the toll operator position 110, or to the miscellaneous operator position 112, it will be understood that this equipment is operative in a substantially identical manner to effect the extension of a call from any one of the calling party subscriber substations TS1, TX2, TS3 and TS4 to any called one of the operator positions mentioned above.

Also, the primary selector 441 and the primary register 1200 are operative in a substantially identical manner to effect the extension of a call from the calling extended service private subscriber substation TX or from the calling denied toll service private subscriber substation TD to any one of the called operator positions mentioned above.

*Local calls*

Assuming that the call extending from the calling private subscriber substation TP to the primary selector 600 and the primary register 1200 is to be extended to the local private subscriber substation TX in exchange 4 zone 84, the subscriber at the calling private subscriber substation TP proceeds to dial the directory number of the called substation TX. The directory number of the calling extended service private subscriber substation TX comprises a code portion, including the digits "8," "4," and "4," identifying the called zone 84 and the exchange 4, and a numerical portion including the digits 0901, identifying the line terminal of the private subscriber line 401 extending to the called private subscriber substation TX. Thus the directory number of the called private subscriber substation TX is 844–0901.

Accordingly, the subscriber at the calling substation TP proceeds to dial the first digit "8," thereby to cause a corresponding number of impulses to be transmitted over the line 407, in a well known manner. The line relay R1370 in the primary register 1200 follows the impulses transmitted over the calling line 407, in view of the fact that the circuit for energizing the winding thereof includes the previously traced loop circuit extending to the calling subscriber substation TP. Accordingly, the line relay R1370 and the auxiliary line relay R1420 restore and reoperate intermittently in accordance with the impulses indicative of the digit "8." At its contacts 1423, the auxiliary line relay R1420 repeats the impulses of the first digit "8" to the dial relay R1260, by way of the wiper 1631 of the sequence switch S1630 and the engaged home contact in its associated contact bank, to the magnet AM1504 of the first code switch A1500; and at its contacts 1422 it repeats the impulses of the first digit "8" by way of the wiper 1635 of the sequence switch S1630 and the engaged home contact in its associated bank, the conductor C1293, the contacts 1271, and the conductor C642 to the line relay R730 in the primary selector 600, in the manner previously explained. Thus, the line relay R730 follows the impulses of the first digit "8" and drives the wiper set of the switch mechanism 700 eight steps in the vertical direction. At the conclusion of the first digit "8" the wipers 1501 to 1503, inclusive, of the first code switch A1500 engage the eighth contacts in their associated contact banks. Shortly following the conclusion of the first digit "8" the dial relay R1260 restores in order to effect the restoration of the previously energized dial slave relay R1310, in the manner previously explained. Upon restoring, the dial slave relay R1310 interrupts, at its contacts 1313, the previously traced circuit for energizing the magnet SM1636 of the sequence switch S1630, thereby to cause the latter magnet to drive the wipers 1631 to 1635, inclusive, one step in the counterclockwise direction.

Also, upon restoring, the dial slave relay R1310 prepares, at its contacts 1311 and 1312, the previously mentioned circuits, including the winding of the translate relay R1270 and the lower winding of the release relay R1315. In the present example, the circuit for energizing the winding of the translate relay R1270 is not completed in view of the fact that the first digit "8" registered in the first code switch A1500 does not complete a circuit via wiper 1503 and its associated eighth bank contact for applying ground potential to the terminal HA, and therefor does not indicate that the digit "8" received from the calling private subscriber substation is to be translated. Also, the circuit for energizing the lower winding of the release relay R1315 is not completed in view of the fact that the digit "8" registered in the first code switch A1500 does not complete a circuit via wiper 1503 for grounding the terminal CO, and consequently, at the present time does not indicate whether a register translator will or will not be ultimately utilized. In view of the fact that the release relay R1315 remains in its restored position, the previously traced path for applying ground potential to the cutoff conductor C647 is retained completed, thereby to retain the locking circuit for the send relay R620 in the primary selector 600 and preventing the latter relay from restoring to disconnect the primary selector 600 from the primary register 1200.

When the wipers 1631 to 1635, inclusive, of the sequence switch S1630 are driven one step in the counterclockwise direction, the wiper 1635 thereof disengages the home contact in the associated contact bank, thereby to interrupt the previously traced path for holding ground potential to the conductor C642. When ground potential is removed from the conductor C642, the previously traced circuit for energizing the winding of the line relay R730 in the primary selector 600 is interrupted, thereby to cause the latter relay to restore. In this connection it is to be noted that, in the previous description of operation of the sequence switch S1630 and the line relay R730, the advancement of the wiper 1635 into engagement with the first contact of its associated bank completed a holding circuit for the line relay R730 by way of the wiper 1503 of the first code switch A1500 and its engaged tenth contact of its associated bank. However, at the present time the wiper 1503 is in engagement with the eighth contact of its associated bank and, consequently, the holding circuit for the line relay R730 is not completed by way of the wiper 1635 and its engaged first contact of the associated bank. Upon restoring, the line relay R730 interrupts, at its contacts 731, the previously traced holding circuit for the winding of the hold relay R740, thereby causing the latter relay to restore shortly thereafter. When the hold relay R740 restores to normal, at its contacts 742, it completes the previously traced circuit for energizing the release magnet M714, thereby to cause the latter magnet to operate and restore, whereupon the wiper set of the switch mechanism 700 is returned to its normal vertical position. Restoration of the wiper set to its normal vertical position causes the vertical off-normal springs S715 and S716 to be opened, the former set of springs interrupting the previously traced circuit for the release magnet M714. The primary selector 600 has now caused the switch mechanism 700 to be restored to normal and may again be operated under control of the primary register 1200, in the manner to be described hereinafter.

Also, when the wipers of the sequence switch S1630 are driven one step in the counterclockwise direction, the wiper 1634 disengages the home contact in the associated contact bank, thereby to interrupt the previously traced circuit for energizing the winding of the dial tone relay R1250. Upon restoring, the dial tone relay R1250, at its contacts 1251, interrupts the previously traced circuit including the dial tone conductor C1253, and prepares, at its contacts 1252, a point in the circuit of the start relay R1240. The latter circuit operation will be traced in connection with the description of operation of the grounded line intercepting circuit disclosed in Fig. 12A.

Also, when the wiper 1634 of the sequence switch S1630 engages the first contact in its associated contact bank, a circuit is prepared, including the grounded conductor C1294, for controlling the operations of the party relays R1210, R1220 and R1230, in the event that the party line relay R1360 is controlled in response to the dialing of the second digit of the called subscriber number. However, since the call in the present example is extended from the calling private subscriber substation TP, the party line relay R1360 cannot be controlled in response to the dialing of any digit.

As a further result of the advancement of the wipers 1631 to 1635, inclusive, from their normal home contact position into engagement with the first contacts of their associated banks, the wiper 1631 thereof interrupts a point in the previously traced circuit for controlling the magnet AM1504 of the first code switch A1500, and when the wiper 1631 engages the first contact in its associated contact bank, it prepares a circuit traced hereinafter for controlling the operation of the magnet BM1516 of the second code switch B1510.

The subscriber at the calling private subscriber substation TP proceeds to dial the second digit "4" at this time, whereupon the line relay R1370 in the primary register 1200 follows the impulses transmitted over the previously traced loop circuit. The second digit "4" is repeated by the line relay R1370 to the auxiliary line relay R1420 and the latter relay, at its contacts 1423, completes, each time the auxiliary line relay is restored to normal, a circuit for the dial relay R1260 and an impulsing circuit, including the wiper 1631 and its engaged first contact position, and the magnet BM1516 of the second code switch B1510. When thus energized, the dial relay R1260 operates in order to effect the operation of the dial slave relay R1310, whereupon the previously mentioned circuits for controlling the translate relay R1270 and the release relay R1315 are again disconnected at the contacts 1311 and 1312, respectively. Also, the dial slave relay R1310, at its contacts 1313, completes the previously traced circuit for energizing the magnet SM1636 of the sequence switch S1630, thereby to condition the wipers 1631 to 1635, inclusive, of the sequence switch S1630, to be driven an additional step in the counterclockwise direction. Attention is directed to the fact that the second digit "4" is not repeated to the primary selector 600 because the circuit including the contact 1422 is opened by the advancement of wiper 1635 of the sequence switch S1630 and by the advancement of the wiper 1503 of the code switch A1500 to its eighth bank contact.

Each time the magnet BM1516 of the second code switch B1510 is thus energized and subsequently deenergized under control of the auxiliary line relay R1420, the wipers 1511 to 1515, inclusive, are driven step by step in a counterclockwise direction and, at the conclusion of the impulses constituting the digit "4," the wipers thereof are positioned into engagement with the fourth contacts in the associated contact banks. Shortly after the wipers of the second code switch B1510 have been positioned in the above-described manner, the dial relay R1260 restores to effect the restoration of the dial slave relay R1310. Upon restoring, the dial slave relay R1310 interrupts, at its contacts 1313, the previously traced circuit for energizing the magnet SM1636 of the sequence switch S1630, whereupon the wipers thereof are driven into engagement with the second contacts in the associated contact banks. Also, the dial slave relay R1310, at its contacts 1311 and 1312, again prepares the previously mentioned circuits for energizing the translate relay R1270 and the lower winding of the release relay R1315, respectively. In the present example, the circuit for energizing the winding of the translate relay R1270 is not completed in view of the fact that the first digit "8" registered in the first code switch A1500, in combination with the second digit "4" registered in the second code switch B1510, does not indicate that the digits mentioned are to be translated. Furthermore, the circuit for energizing the lower winding of the release relay R1315 is not completed, in view of the fact that the first digit "8" registered in the first code switch A1500, in combination with the second digit "4" registered in the second code switch B1510, does not determine at the present time whether a register translator will or will not be utimately utilized in the connection.

When the wiper 1634 of the sequence switch S1630 disengages the first contact in the associated contact bank, the above-mentioned circuit prepared for the purpose of controlling the party relays R1210, R1220 and R1230 is interrupted, thereby to prevent any control over the party relays mentioned in response to any further digits dialed by the calling subscriber. When the wiper 1634 of the sequence switch S1630 engages the second contact in the associated contact bank a circuit, traced hereinafter, is prepared for energizing the start relay R1600 of the register translator allotter 1600.

When the wiper 1635 of the sequence switch S1630 is advanced into engagement with the second contact in the associated contact bank, an alternative circuit for energizing the winding of the line relay R730 in the primary selector 600 is completed from ground, by way of the contacts 1422, the wiper 1503 of the first code switch A1500 and the engaged eighth contact of the associated contact bank, the terminal B, the wiper 1515 of the second code switch B1510 and the engaged fourth contact in the associated contact bank, the wiper 1635 of the sequence switch S1630 and the engaged second contact in the associated contact bank, the conductor C1293, the contacts 1271, the conductor C642, the wiper 612 of the finder F610, the contacts 623 and 773, and the windings of the line relay R730, to battery. When thus energized the line relay R730 reoperates in order to recomplete, at its contacts 731, the previously traced circuit for energizing the winding of the hold relay R740, thereby to cause the latter relay to reoperate.

The subscriber at the calling private subscriber substation TP then proceeds to dial the third digit "4" at this time, whereupon the line relay R1370 in the primary register 1200 again follows the impulses transmitted over the subscriber line 407. The line relay R1370 controls the auxiliary line relay R1420, in the previously described manner, and the latter relay repeats, at its contacts 1422, the impulses of the third digit "4" over the previously traced alternative circuit to the line relay R730 in the primary selector 600, whereby the line relay R730 controls the vertical magnet M711 to drive the wiper set of the switch mechanism 700 four steps in the vertical direction, in the same manner as has been explained hereinbefore. Also, at its contacts 1423, the auxiliary line relay R1420 repeats the impulses of the third digit "4" to the dial relay R1260 and to the magnet CM1526 of the third code switch C1520, by way of the wiper 1631 of the sequence switch S1630, now in engagement with the second contact of its associated contact bank. At its contacts 1421, the auxiliary line relay R1420 repeats the impulses to the hold relay R1430, thereby to retain the latter relay in its operated position during impulsing. The dial relay R1260 operates and remains operated during impulsing, in order to effect the operation of the dial slave relay R1310, as has been explained. Upon operating, the dial slave relay R1310 recompletes, at its contacts 1313, the previously traced circuit for energizing the magnet SM1636 of the sequence switch S1630, thereby to cause the latter magnet to operate and condition the wipers of the sequence switch to be driven an additional step in the counterclockwise direction. Further, the dial slave relay R1310, at its contacts 1311 and 1312, respectively, interrupts the previously mentioned circuits for the translate relay R1270 and the release relay R1315.

At the conclusion of the third digit "4," the wipers 1521 to 1525, inclusive, of the third code switch C1520 engage the fourth contacts in the associated contact banks and shortly thereafter the dial relay R1260 restores in order to effect the restoration of the dial slave relay R1310. The dial slave relay R1310, upon restoring, at its contacts 1313 interrupts the previously traced circuit for the magnet SM1636 of the sequence switch S1630, thereby to cause the latter magnet to restore and drive the wipers an additional step in the counterclockwise direction.

Further, the dial slave relay R1310 prepares, at its contacts 1311 and 1312, respectively, the previously mentioned circuits for the windings of the translate relay R1270 and the release relay R1315. In the present example, the circuit for energizing the winding of the translate relay R1270 is not completed in view of the fact that the combination of the first digit "8" registered in the first code switch A1500, the second digit "4" registered in the second code switch B1510, and the third digit "4" registered in the third code switch C1520, does not indicate that the digits "8," "4" and "4" received from the calling private subscriber substation TP are to be translated. The circuit for energizing the lower winding of the release relay R1315 is completed in view of that fact that the combination of registered digits indicates that no register translator is to be utilized and that the call may be extended to its destination directly under control of the calling device at the calling private subscriber substation TP. More particularly, the circuit for energizing the lower winding of the release relay R1315 is under the sole control of the wiper 1525 of the third code switch C1520 in engagement with the fourth contact of its associated contact bank, and extends from the grounded wiper 1525 and the engaged fourth contact in its associated contact bank, the terminal CO, the conductor C1291, the contacts 1276 and 1312, and the lower winding of the release relay R1315, to battery. When thus energized, the release relay R1315, operates to complete, at its contacts 1319, the previously traced holding circuit for the lower winding, including ground at the contacts 1411. At its contacts 1317, the relay R1315, removes ground potential from the cutoff conductor C647, thereby to cause the restoration of the send relay R620 in the primary selector 600. Restoration of the said relay R620 in the primary selector 600 causes the restoration of the cut-in relay R630 in the previously described manner, whereupon the primary register 1200 is disconnected from the primary selector 600, in the previously described manner. Accordingly, the wipers of the code switches A1500, B1510, and C1520 and the sequence switch S1630 are automatically restored to their normal or home contact position, under control of the self-interrupting circuits for the stepping magnets of the respective switches, including the busy relay R1470.

Upon the restoration of the send relay R620, the line relay R730 of the primary selector 600 is transferred from the primary register 1200 to the calling subscriber line in the same manner as has been described hereinbefore. It will be recalled, however, that, prior to the time the transfer takes place, the first digit "8" dialed by the calling subscriber caused the primary register 1200 to repeat the impulses constituting the digit "8" to the line relay R730 of the primary selector 600. As a result thereof, the wiper set of the switch mechanism 700 was raised in a vertical direction to the eighth level of its associated bank contacts, and thereafter restored to normal under control of the primary register 1200. The second digit "4" dialed by the calling subscriber was not repeated by the primary register 1200 to the selector 600 because the circuit for controlling the line relay R730 of the selector 600 was interrupted by the advancement of the wiper 1635 of the sequence switch S1630 from its home contact position to the first contact position of its associated bank, and also because the wiper 1503 of the first code switch A1500 was advanced from its home contact position to its associated eighth contact position. However, as a result of the dialing of the third digit "4" by the calling subscriber, the impulses constituting the digit "4" were repeated by the primary register 1200 to the line relay R730 of the primary selector 600, and as a result thereof, the wipers 701, 702 and 703 of the switch mechanism 700 were raised in a vertical direction to the fourth level of the associated contact bank. At this time the wipers of the switch mechanism 700 are automatically rotated over the contacts of the fourth level of the associated bank in order to search for an idle trunk line in the selected level. The detailed operations of the selector 600 in automatically driving the wipers in a rotary direction over the contacts of the fourth level are exactly the same as have been described hereinbefore when the selector 600 was controlled to search for an idle trunk in the tenth level of its associated bank contacts.

More particularly, the primary selector 600 operates in order to seize an idle one of the trunks in the group, including the trunk 507, extending to the group of first selectors, including the first selector 501. Assuming that the trunk 507 is the first idle trunk in the group mentioned, the primary selector 600 operates to seize the trunk 507, whereupon the switch-through relay R770 operates to switch the calling subscriber line through to the selector 501, and to effect the restoration of the line relay R730 and the hold relay R740, in the manner previously explained.

When the trunk 507 extending to the first selector 501 is thus seized, the first selector 501 operates in order to return ground potential over the seized trunk 507 to the test wiper 703 of the switch mechanism 700. When ground potential is returned over the test wiper 703 the previously traced holding circuit is completed for maintaining the switch-through relay R770 of the selector 600 in its operated position and for retaining the line switch 423 in its operated position. At this time the loop circuit extending from the calling private subscriber substation TP is extended by way of the line switch 423 and the primary selector 600 to the first selector 501, and the first selector 501 is now in condition to respond to a digit dialed thereto by the calling subscriber.

The subscriber at the calling private subscriber substation TP now proceeds to dial the fourth digit "0," the fifth digit "9," the sixth digit "0," and the seventh digit "1" successively, in the usual manner. The first selector 501, in response to the fourth dialed digit "0," operates in a conventional manner to select an idle trunk line extending to a second selector, such as, for example, the second selector 502. The second selector 502, in response to the fifth dialed digit "9," operates in a conventional manner to select an individual connector, such as, for example, the individual connector 525. The individual selector 525 responds to the sixth dialed digit "0" and the seventh dialed digit "1" in a conventional manner, thereby to cause the connection to be forwarded to the private subscriber line 401 extending to the called private subscriber substation TX. The individual connector 525 also causes ringing current to be projected over the selected private subscriber line 401 to signal the subscriber at the substation TX, and when the call is answered a communication connection is completed between the calling private subscriber station TP and the called private subscriber substation TX, in a well known manner. Furthermore, when the individual connector 525 seizes the called subscriber line 401, it marks the private subscriber line 401 busy to the other individual connectors having access thereto.

The individual connector 525 included in the connection may be arranged for either calling party or last party release. However, assuming that the connector is arranged for calling party release, the replacement of the receiver of the telephone instrument upon the associated switchhook by the calling subscriber at substation TP interrupts the previously traced loop circuit which has now been extended to the individual connector 525, thereby to cause the individual connector 525 to be released. When the connector 525 is thus released the called subscriber line 401 extending to the subscriber at substation TX is again marked as idle to the individual connectors having access thereto, assuming that the called subscriber has replaced the receiver of his telephone instrument upon its associated switchhook. Further, the release of the individual connector 525 effects the restoration of the second selector 502 and the first selector 501 to normal, in a well known manner. In response to the restoration of the first selector 501, ground potential is removed from the control conductor of the trunk 507 and the test wiper 703 of the switch mechanism 700. Removal of ground potential from the test wiper 703 interrupts the previously traced holding circuit for maintaining the switch-through relay R770 in its operated position and for maintaining the line switch 423 in its operated position. The switch-through relay R770 now restores and causes the release of the primary selector 600 and the subsequent release of the line switch 423 in the same manner as has been explained hereinbefore. The line 407, of the calling private subscriber substation TP, is again marked as idle to the individual connectors having access thereto. Accordingly, at this time all of the apparatus utilized in establishing the connection between the calling private subscriber substation TP to the called private subscriber substation TX is completely restored to normal and is available for further use.

In view of the foregoing explanation of the mode of operation of the primary selector 600 and the primary register 1200 to effect the extension of a call from the calling ordinary private subscriber substation TP to the called extended service private subscriber substation TX, it will be understood that this equipment is operative in a substantially identical manner to effect the extension of a call from the calling ordinary private subscriber substation TP to the denied toll service private subscriber substation TD or to any one of the called party subscriber substations TS1, TS2, TS3 and TS4; or from any one of the calling party subscriber substations TS1, TS2, TS3 and TS4 to the called ordinary private subscriber substation TP, to the called extended service private subscriber substation TX, or to the called denied toll service private subscriber substation TD. Further, it will be understood that the primary selector 441 and the primary register 1200 are operative in a substantially identical manner to effect the extension of a call from the calling extended service private subscriber substation TX to the called ordinary private subscriber substation TP, to the called denied toll service private subscriber substation TD, or to any one of the called party subscriber substations TS1, TS2, TS3 and TS4; or from the calling denied toll service private subscriber substation TD to the called ordinary private subscriber substation TP, to the called extended service private subscriber substation TX, or to any one of the called party subscriber substations TS1, TS2, TS3 and TS4.

*Call to other exchanges in zone 84*

Assuming that the call extending from the calling ordinary private subscriber substation TP to the primary selector 600 and the primary register 1200 is to be extended to a called subscriber substation in exchange 1 zone 84, the subscriber at substation TP proceeds to dial the directory number of the called subscriber substation in the noted exchange. The directory number of the called subscriber substation comprises a code portion, including the digits 841 identifying the called zone and exchange, and a numerical portion, including four digits, such, for example, as the digits 1234 identifying the line terminal of the subscriber line extending thereto.

Accordingly, the subscriber at substation TP proceeds to dial the first digit "8," the second digit "4" and the third digit "1," in the manner previously explained. The auxiliary line relay R1420 of the primary register 1200 follows the impulses constituting the digits 841, thereby to cause the respective digits to be registered in the first code switch A1500, the second code switch B1510, and the third code switch C1520, all in the manner previously explained. The auxiliary line relay R1420, at its contacts 1422, also repeats the impulses constituting the first digit "8" and the impulses constituting the third digit "1" to the line relay R730 in the primary selector 600, in the manner previously explained. In response to the first digit "8" the primary selector 600 causes the wiper set of the switch mechanism 700 to be driven eight steps in a vertical direction, and at the conclusion of the first digit "8" the wiper 1635 of the sequence switch S1630 disengages the home contact in the associated contact bank, thereby to interrupt the circuit for controlling the line relay R730. When the above circuit is interrupted, the relay R730 restores to normal and effects the release of the wiper set of the switch mechanism 700 in the previously described manner. The auxiliary line relay R1420 does not repeat the impulses constituting the second digit "4" to the line relay R730 since the circuit for controlling the line relay R730 is opened by the advancement of the wiper 1635 from its home contact position into engagement with its associated first contact bank, and the circuit is also opened in view of the fact that the wiper 1503 of the first code switch A1500 is now in engagement with the eighth contact of its associated bank. Finally, the auxiliary line relay R1420 repeats the impulses constituting the third digit "1" to the line relay R730 in the primary selector 600 over a circuit including the contacts 1422, the wiper 1503 and its associated eighth bank contact, the terminal B, the wiper 1515 and its associated fourth bank contact, the wiper 1635 and its associated second bank contact, and the conductor C1293 extending to the line relay R730 of the primary selector 600.

At the conclusion of the third digit "1" the wipers of the sequence switch S1630 are driven an additional step in the counterclockwise direction into engagement with the third contacts in the associated contact banks, whereupon the wiper 1635 thereof disengages the second contact in the associated contact bank in order to interrupt the previously traced circuit for energizing the line relay R730 of the primary selector 600, whereupon the latter relay restores in order to effect the restoration of the hold relay R740 and the release of the wiper set of the switch mechanism 700 in the manner previously explained. In other words, the line relay R730 of the selector has responded to advance its wipers to the eighth level of its associated bank contacts and has restored the wiper set to normal in response to the dialing of the first digit "8," it was not controlled in response to the dialing of the second digit "4"; and, in response to the dialing of the third digit "1," the wipers of the switch mechanism 700 were advanced to the first level of its associated contact bank and automatically restored to normal when the circuit for the line relay was opened by the wiper 1635 of the sequence switch S1630. Also, shortly following the conclusion of the third digit "1," the dial relay R1260 and the dial slave relay R1310 restore to normal in the manner previously explained. Upon restoring, the dial slave relay R1310 prepares, at its contacts 1311 and 1312, respectively, the previously mentioned circuits for energizing the translate relay R1270 and the lower winding of the release relay R1315. In the call being described, the circuit for energizing the lower winding of the release relay R1315 is not completed in view of the fact that the combination of the first digit "8" registered in the code switch A1500, the second digit "4" registered in the code switch B1510, and the third digit "1" registered in the code switch C1520 does not indicate that the call may be extended to its destination directly under control of the calling device at the private subscriber substation TP. The circuit for energizing the winding of the translate relay R1270 is completed, however, in view of the fact that the combination of the digits 841 registered respectively in the code switches A1500, B1510 and C1520 indicates that a register translator is to be utilized in extending the call to its destination and that the call may not be extended to its destination directly under control of the calling device at substation TP. The circuit for energizing the winding of the translate relay R1270 extends from the grounded wiper 1525 of the third code switch C1520 and the engaged first contact in its associated contact bank, by way of the terminal HA, the conductor C1325, the contact 1311, and the winding of relay R1270, to battery. When thus energized the translate relay R1270 operates to complete, at its contacts 1278, a locking circuit for itself including ground at the contacts 1411. Also, the translate relay R1270 interrupts, at its contacts 1276, a further point in the incomplete circuit for the lower winding of the release relay R1315, thereby positively to prevent operation of the latter relay at this time. Also, the translate relay R1270 completes, at its contacts 1277, a circuit for energizing the winding of the start relay R1600 in the register translator allotter 1600, which may be traced from ground at the contacts 1411, by way of the contacts 1316 of the release relay R1315, the conductor C1294, the wiper 1634 of the sequence switch S1630 and the engaged third contact in its associated contact bank, the conductor C1327 extending to Fig. 13, the contacts 1345 and 1277, the conductor C1292 extending to Fig. 16, and the winding of the start relay R1600, to battery. When thus energized the start relay R1600 operates to complete circuits described hereinafter for controlling the register translator allotter 1600. Further, the translate relay R1270 prepares, at its contacts 1275, a circuit for the lower winding of the release relay R1315. This circuit, however, is not completed until the hold relay R1430 is restored to normal. Further, the translate relay R1270 completes, at its contacts 1274, a path for applying battery potential by way of the winding of the test relay R1340 to the test conductor C1282 accessible to the finders F2290, etc., individually associated with the various register translators 1700, etc.

Further, the translate relay R1270 interrupts, at its contacts 1271, a further point in the previously traced circuit for energizing the winding of the line relay R730 in the primary selector 600, and it prepares, at its contacts 1272, an alternative circuit traced hereinafter for subsequently controlling the operation of the line relay R730. Finally, at its contacts 1273, the relay R1270 prepares a circuit for locking the test relay R1340 in its operated position, after it has been energized in response to the association of an idle register translator with the primary register 1200.

In response to the above described energizing circuit for the winding of the start relay R1600 in the register translator allotter 1600, the relay operates and, at its contacts 1602, completes a circuit which may be traced from ground, by way of the contacts 1602, the winding of the alarm relay R1615, the self-interrupting contacts 1614 of the rotary magnet FM1613, and the winding of the magnet FM1613, to battery. At its contacts 1601, the relay R1600 prepares a circuit for connecting the winding of the rotary magnet FM1613 by way of the wiper 1612 to the conductors, such as the conductor C1562, extending to the associated group of register translators, such as the register translator 1700. In this connection it is to be noted that the wiper 1612 of the allotter 1600, as illustrated in the drawing, is normally engaging the contact of its associated bank terminating the conductor C1653. This conductor is connected to all of the register translators of the group of register translators accessible thereto by way of its associated bank. As long as ground potential is applied to this conductor from at least one of the associated register translators, a circuit is completed by way of the wiper 1612, the contact 1601, the self-interrupting contact 1614, and the winding of the rotary magnet FM1613, to battery, whereupon the rotary magnet advances the associated wipers of the translator allotter 1600 to search for the particular register translator which is marked as being idle and available for use. When the above described circuit is completed for operating the magnet FM1613, the alarm relay R1615 is shunted over a circuit including ground potential applied to conductor C1653 and ground at the contacts 1602, thereby to prevent the operation of the alarm relay R1615 at this time. When all of the associated register translators are busy, ground potential is removed from the conductor C1653 and thereby prevents the allotter 1600 from operating the associated wipers to search for an idle register translator. Assuming that the latter condition exists and that no ground potential is applied to the conductor C1653, the above traced circuit including the winding of the alarm relay R1615 and the winding of the magnet FM1613 is completed, thereby to cause the operation of the alarm relay R1615. Due to the high resistance of the winding of relay R1615, the rotary magnet FM1613 does not operate at this time. Accordingly, the wipers 1611 and 1612 remain in the normal position illustrated in the drawings and, at its contacts 1616, the relay R1615, upon operating, applies ground potential to the conductor C1654 extending to the supervisory apparatus disclosed in Fig. 55, whereupon the all-register-translator-busy lamp L5571 is illuminated to indicate that the group of register translators accessible to the register translator allotter 1600 is busy.

On the other hand, in the event any one of the register translators in the associated group is idle at this time, ground potential is applied to the conductor C1653 thereby to effect the above-described operation of the magnet FM1613. Each time the magnet FM1613 energizes, at its contacts 1614 it interrupts its own circuit, thereby to cause the magnet to advance the wipers 1611 and 1612 step by step over the contacts of the associated bank. Assuming that the register translator 1700 is idle at this time, ground potential therein is applied by way of the contacts 2181 of the busy key 2180, the contacts 2141 and 2212, and the conductor C1653 extending to Fig. 16, thereby to initiate the above-described searching operation of the finder F1610. As has been described above, when the magnet FM1613 operates, it conditions the wipers 1611 and 1612 to be driven one step in the counterclockwise direction and it interrupts, at its contacts 1614, its initial energizing circuit. The magnet now restores, thereby to drive the wipers noted one step in the counterclockwise direction.

When the wiper 1611 disengages the home contact in its associated contact bank, a point in the previously traced circuit for illuminating the all-register-translator-busy lamp is interrupted, and the wiper 1612 engages the first contact in its associated contact bank terminating a test conductor extending to one of the register translators in the associated group. In the event the last-mentioned register translator is busy, direct ground potential appears on the test conductor thereof and again completes a circuit for the magnet FM1613 in order to drive the wipers an additional step in the counterclockwise direction. Accordingly, the wipers of the finder F1610 are driven step by step in a counterclockwise direction until the first available register translator in the associated group is selected.

Assuming that the register translator 1700 is the first available register translator in the associated group, and that the wipers 1611 and 1612 of the finder F1610 engage the contacts in the associated contact bank terminating the test conductors C1651 and C1652 extending to the register translator 1700. More particularly, when the wiper 1612 engages the contact in the associated contact bank terminating the test conductor C1652, a circuit is completed for energizing the start relay R2160 in the register translator 1700 in series with the magnet FM1613 of the finder F1610. The last-mentioned circuit extends from ground, by way of the contacts 2290, the winding of the start relay R2160, the test conductor C1652 extending to Fig. 16, the wiper 1612 of the finder F1610 and the engaged contact in the associated contact bank, the contacts 1601 and 1614, and the winding of the magnet FM1613, to battery. When this series circuit is completed the start relay R2160 operates, but due to the high resistance of the winding of the start relay R2160 the magnet FM1613 does not operate at this time. Accordingly, further operation of the finder F1610 is arrested at this time. Furthermore, it is to be noted that when the high resistance winding of the start relay R2160 is substituted in the circuit for applying ground potential to the winding of the magnet FM1613, it removes the shunting ground potential from around the winding of the alarm relay R1615, whereupon the alarm relay R1615 operates in parallel with the start relay R2160 and in series with the winding of the magnet FM1613. When the alarm relay R1615 operates in the above-described manner, at its contacts 1616 it applies ground potential by way of the wiper 1611 to the conductor C1651 extending to Fig. 21, thereby to complete an energizing circuit for the winding of the control relay R2115.

When the start relay R2160 in the register translator 1700 operates, it completes, at its contacts 2161, a circuit, including ground at the contact 2151, for energizing the winding of the magnet FM2299. When the latter circuit is completed the magnet FM2299 operates and conditions the wipers 2291 to 2298, inclusive, of the finger F2290 to be driven one step in the counterclockwise direction and to interrupt, at the contacts 2290, the previously traced circuit for energizing the winding of the start relay R2160, thereby to cause the latter relay to restore to normal. When the start relay R2160 restores to normal, at its contacts 2161, it interrupts the previously traced circuit for energizing the magnet FM2299, thereby to cause the latter magnet to restore and drive the wipers noted one step in the counterclockwise direction and to recomplete, at the contacts 2290, the previously traced circuit for energizing the winding of the start relay R2160, whereupon the latter relay reoperates. The start relay R2160 and the magnet FM2299 interact in the manner described above to drive the wipers noted of the finder F2299 step by step in the counterclockwise direction until they engage the contacts in the associated contact banks terminating the conductors C1282, etc. extending to the primary register 1200, whereby a circuit is completed for energizing in series the upper winding of the test relay R2150 in the register translator 1700 and the winding of the test relay R1340 in the primary register 1200. Before describing the circuit for the test relay R2150 and the test relay R1340, attention is directed to the fact that when the control relay R2115 operated, at its contacts 2117 it applied ground potential by way of the upper winding of the test relay R2150 to the conductor C2173 and the wiper 2291 of the finder F2290. Furthermore, at its contacts 2116, it applied ground potential over a parallel circuit, one branch of which included the upper winding of the cut-in relay R2140, the lower winding of the test relay R2150, and the resistance 2153, to battery, and the other branch including the contacts 2152 and the resistance 2153, to battery. In view of the branch of the circuit including the contacts 2152, the upper winding of the relay R2140 and the lower winding of the relay R2150 are shunted to prevent energization of the respective windings at the present time.

Referring again to the above-mentioned series circuit for the upper winding of the test relay R2150 and the winding of the test relay R1340, it is noted that this circuit extends from ground by way of the contacts 2117, the upper winding of the test relay R2150, the conductor C2173, the wiper 2291 of the finder F2290 and the engaged contact in the associated bank, the conductor C1282 extending to Fig. 13, the contacts 1354 and 1274, and the winding of the test relay R1340, to battery, whereupon the relays mentioned operate. Upon operating, the test relay R2150 interrupts, at its contacts 2151, a point in the previously traced circuit for energizing the magnet FM2299 and, at its contacts 2152, it interrupts the previously traced path for short-circuiting the lower winding of the relay R2150 and the upper winding of the cut-in relay R2140, whereupon the previously traced series circuit for the upper winding of relay R2140 and the lower winding of relay R2150 is completed. When this series circuit is completed the cut-in relay R2140 operates and the test relay R2150, being in its operated position as a result of the previously traced circuit including its upper winding, remains in its operated position. Upon operating, the cut-in relay R2140 completes, at its contacts 2142, a holding circuit for energizing in series the upper winding of the test relay R2150 and the lower winding of the relay R2140. However, it is to be noted that the upper winding of the test relay R2150 will subsequently be shunted when ground potential is applied to the conductor C1282 and the relay R2140 will remain in its energized position over the locking circuit, including its lower winding, the contacts 2142, and the grounded conductor C1282. At this point it is noted ground potential is applied to the test conductor C1282 at this time due to the operation of the test relay R1340 in the primary register 1200. More particularly, when the test relay R1340 operated in series circuit with the upper winding of the test relay R2150, at its contacts 1343 it completed a locking circuit for itself from ground at contacts 1273, and at the contacts 1343 the ground potential was further extended by way of the contacts 1274 and 1354 to the conductor C1282. Accordingly, the test relay R2150 is first energized over its upper winding in series with the test relay R1340, and as soon as the test relay R1340 operates, it returns ground potential over the conductor C1282 in order to shunt the upper winding of the test relay R2150 and to complete a locking circuit for the lower winding of the cut-in relay R2140.

As a further result of the operation of the test relay R1340 in the primary register 1200, at its contacts 1345 it interrupts the previously traced circuit for energizing the winding of the start relay R1600 in the register translator allotter 1600, whereupon the latter relay restores to interrupt, at its contacts 1601 and 1602, the circuit for the alarm relay R1615 and the circuit for initially operating the start relay R2160. When the alarm relay R1615 restores to normal, at its contacts 1616 it removes ground potential from the conductor C1651, whereupon the control relay R2115 in the register translator 1700 restores to normal. As a result of the restoration of the control relay R2115, at its contacts 2116 it opens the series circuit including the upper winding of relay R2140, the lower winding of relay R2150, and the resistance 2153, and, at its contacts 2117, it opens the previously traced shunting circuit for the upper winding of the relay R2150. The relay R2150 now restores to normal and, at its contacts 2151, again prepares a point in the now interrupted circuit for the magnet FM2299 and, at its contacts 2152, it again prepares a point in the circuit for shunting the upper winding of relay R2140 and the lower winding of relay R2150. At this time it is to be noted that the relay R2140 remains in its operated position over the locking circuit including its lower winding and the grounded conductor C1282.

As a further result of the previously described operation of the cut-in relay R2140, at its contacts 2143 it applies ground potential to the conductor C1652, extending to Fig. 16, in order to restore the alarm relay R1615 to normal if it has not already been restored under control of the restoration of the start relay R1600, and also to mark the register translator 1700 as busy. At this point it is noted that ordinarily direct ground potential is applied to the test conductor C1652 prior to the restoration of the start relay R1600, whereby the magnet FM1613 operates in order to drive the wipers noted of the finder F1610 an additional step in the counterclockwise direction so that the finder F1610 does not occupy a position selecting the now busy register translator 1700. Consequently, the register translator allotter 1600 automatically advances its wipers 1611 and 1612 into engagement with the next idle register translator when the register translator allotter 1600 is completely released, as explained above. Furthermore, the cut-in relay R2140 completes, at its contacts 2144, a series circuit for energizing the windings of the switching relay R2280 and the hold relay R2130, thereby to cause the relays mentioned to operate, for a purpose to be more fully explained hereinafter.

Referring again to the test relay R1340 in the primary register 1200, it will be noted that upon operating it interrupts, at its contacts 1341, the previously traced circuit for energizing the heating element 1332 of the thermostatic timer 1330 and, at its contacts 1342, it interrupts a point in the circuit, to be traced hereinafter, for energizing the winding of the busy relay R1350. As a further result of the operation of the test relay R1340, at its contacts 1344 it completes an obvious circuit for energizing the winding of the slow-to-operate send relay R1440, thereby to cause the latter relay to operate shortly thereafter. At this point it is again noted that when the primary register 1200 is initially seized, the locking relay R1410 operates in order to apply ground potential for energizing the heating element 1332 of the timer 1330. In the event the primary register 1200 is not released or a register translator is not associated therewith, in order to cause the above-described operation of the test relay R1340 within a relatively short time interval, for example thirty seconds, the heating element 1332 of the timer 1330 heats the bimetallic bar 1331 sufficiently to cause it to close the contacts 1333. In the event the contacts 1333 are thus closed by the bimetallic bar 1331, a circuit is completed from ground by way of the contacts 1411, 1341, 1322, 1333 and 1331, and the winding of the alarm relay R1320, to battery. The alarm relay R1320 operates over this circuit and completes, at its contacts 1321, an obvious holding circuit for itself and, at its contacts 1322, it interrupts the initial operating circuit for itself and the energizing circuit for the heating element 1332 of the thermostatic timer 1330, whereupon the bimetallic bar 1331 begins to cool and subsequently opens the contact 1333. Also, the alarm relay R1320 completes, at its contacts 1323, a circuit for applying ground potential to the conductor C5514′ extending to Fig. 55. Referring to Fig. 55, it will be noted that when the ground potential is applied to conductor C5514′, the alarm lamp connected thereto is illuminated to indicate that either one of the two previously mentioned conditions exists in the primary register 1200. It is again pointed out that the above-described operation of the thermostatic timer 1330 may be due either to the failure of the subscriber at the calling private subscriber substation TP to dial promptly a full complement of digits into the primary register 1200 or to the fact that there is no idle register translator in the associated group to be allotted by the register translator allotter 1600 at this time.

The subscriber at the calling private subscriber substation TP next proceeds to dial the fourth digit "1," i. e., the first numerical digit of the called subscriber number, whereby the auxiliary line relay R1420 follows the single impulse constituting this digit, in the manner previously explained. More particularly, the auxiliary line relay R1420, at its contacts 1423, repeats the fourth digit "1" to the dial relay R1260 and to the magnet DM1625 of the first numerical switch D1620, in the manner previously explained, whereby the dial relay R1260 operates in order to effect the operation of the dial slave relay R1310. The circuit for energizing the magnet DM1625 extends from ground, by way of the contacts 1423 and 1431, the wiper 1631 of the sequence switch S1630 and the engaged third contact in the associated bank, and the magnet DM1625, to battery. The fourth digit "1" is not repeated to the line relay R730 of the primary selector 600 due to the fact that the wiper 1635 of the sequence switch S1630 disengaged the second contact in the associated contact bank at the conclusion of the third digit "1" and is in engagement with the third contact in the associated contact bank during the time the fourth digit "1" is received by the primary register 1200. Hence the switch mechanism 700 in the primary selector 600 is not operated during the fourth digit "1."

At the conclusion of the fourth digit "1" the wipers 1621 to 1624, inclusive, of the first numerical switch D1620 engage the first contacts in the associated contact banks, whereby the fourth digit "1" is registered in the first numerical switch D1620. Shortly thereafter the dial relay R1260 restores in order to effect the restoration of the dial slave relay R1310, in the previously described manner. Upon restoring, the dial slave relay R1310 interrupts, at its contacts 1313, the previously traced circuit for energizing the magnet SM1636 of the sequence switch S1630, whereupon the latter magnet restores in order to drive the wipers of the sequence switch S1630 into engagement with the fourth contacts in the associated contact banks. It may be well to mention at this time that the contacts 1311 of the dial slave relay R1310 do not influence the translate relay R1270 since it is maintained in its operated position over a self-locking circuit. Furthermore, the contacts 1312 of the dial slave relay R1310 do not influence the circuit for the lower winding of the release relay R1315 because of the operated condition of the translate relay R1270. When the wiper 1631 of the sequence switch S1630 engages the fourth contact in the associated contact bank, a point in a path to be traced hereinafter is prepared for repeating the fifth digit "2" over the impulse conductor C1395 extending to the register translator 1700. Furthermore, when the wiper 1634 of the sequence switch S1630 engages the fourth contact in its associated contact bank, a point in a path to be traced hereinafter is prepared for connecting ground potential to the conductor C1281 extending to the register translator 1700.

It will be recalled that in response to the association of the register translator 1700 with the primary register 1200, the test relay R1340 in the primary register 1200 operated and completed an operating circuit for the send relay R1440. Upon operating, the send relay R1440, at its contacts 1441 and 1442, disconnects ground potential from the conductor C645 extending to the primary selector 600, and connects the conductor C645 to the conductor C1393 extending to Fig. 22 of the register translator 1700. At its contacts 1443, the relay R1440 connects the conductor C644, which has a resistance ground connected thereto in the primary selector 600, to the conductor C1394 extending to Fig. 22 of the register translator 1700. Furthermore, at its contacts 1444, the send relay R1440 completes a circuit for energizing in multiple the upper and lower windings of the pulse relay R1460, this circuit extending from ground by way of the winding of the busy relay R1470, the wiper 1501 of the first code switch A1500 and the engaged eighth contact in the associated contact bank, the contacts 1436, 1444 and 1462, and the upper and lower windings of the relay R1460, to battery. When thus energized the pulse relay R1460 operates in series with the busy relay R1470, and, at its contacts 1462, interrupts the previously traced circuit for energizing in multiple the upper and lower windings thereof, whereupon the upper and lower windings of the pulse relay R1460 are effectively short-circuited through the associated condenser 1464, causing the latter relay to restore shortly thereafter. The busy relay R1470, due to its slow-to-release characteristic, remains in its operated position during the period of time the series circuit therefor, including the windings of the pulse relay R1460, is interrupted. Accordingly, the pulse relay R1460 operates and restores intermittently at a fixed rate, depending upon the characteristic of the condenser 1464, in an obvious manner. Finally, the send relay R1440, at its contacts 1445, completes a circuit for energizing in multiple the upper and lower windings of the pulse relay R1450. The latter circuit extends from the grounded wiper 1513 of the second code switch B1510 and the engaged fourth contact in the associated contact bank, the wiper 1633 and the engaged second contact of its associated bank, the contacts 1445 and 1452, and the upper and lower windings of the pulse relay R1450, to battery. The above-traced circuit is completed in the event that the wiper 1633 of the sequence switch S1630 is in engagement with the second contact of its associated contact bank when the send relay R1440 is operated. However, if the wiper 1633 of the sequence switch S1630 is in engagement with the third contact of its associated bank at the time the send relay R1440 is energized, the circuit for operating the pulse relay R1450 will then include ground potential, applied by way of the wiper 1523 of the third code switch C1520 and the engaged first contact of its associated bank, and the wiper 1633 in engagement with the third contact of its associated bank. Also, if the send relay R1440 is operated when the wiper 1633 of the sequence switch S1630 is in engagement with the fourth contact of its associated bank, the circuit for controlling the pulse relay R1450 will be completed by way of the ground potential applied by way of the wiper 1623 of the first numerical switch D1620 and the engaged first contact of its associated bank, and the wiper 1633 and the engaged fourth contact of its associated bank. When the pulse relay R1450 is operated in the above described manner, at its contacts 1452 it interrupts the previously traced circuit for energizing in multiple the upper and lower windings thereof, whereupon the upper and lower windings of the pulse relay R1450 are effectively short-circuited through the associated condenser 1454, causing the latter relay to restore shortly thereafter. Accordingly, the pulse relay R1450 operates and restores intermittently at a fixed rate, depending upon the characteristic of the condenser 1454, in an obvious manner.

Each time the pulse relay R1460 operates and then restores, it completes and then interrupts, at its contacts 1461, an obvious circuit for energizing the magnet AM1504 of the first code switch A1500, thereby to cause the latter magnet to operate and restore to drive the wipers 1501 to 1503, inclusive, an additional step in the counterclockwise direction. Also, each time the pulse relay R1460 operates and then restores, it completes and then interrupts, at its contacts 1463, a path for applying either light ground potential, that is resistance ground potential, or heavy ground potential, that is a direct ground potential, to the conductor C1391 extending to the register translator 1700, as will be explained more fully hereinafter. More particularly, upon the first three operations of the pulse relay R1460, the wiper 1502 of the first code switch A1500 is successively engaged with the eighth, ninth and tenth contacts in the associated contact bank, whereby a light ground potential pulse is applied twice by way of the resistor 5106 to the conductor C1391, and a heavy ground potential pulse is applied once by way of the grounded tenth contact in the associated contact bank engaged by the wiper 1502, to the conductor C1391 extending to the register translator 1700. At this point it is noted that the two light ground pulses are transmitted over the impulse conductor C1391 in view of the fact that the wipers of the first code switch A1500 engaged the eighth contact in the associated contact bank when the operation of the pulse relay R1460 was initiated, the number two being the complement of the digit "8" registered in the first code switch A1500. Accordingly, it will be understood that the pulse relay R1460 transmits a number of light ground impulses corresponding to the complement of the digit registered in the first code switch A1500 and then a heavy ground impulse. On the next three operations of the pulse relay R1460 the wiper 1502 of the first code switch A1500 successively engages the eleventh, twelfth and thirteenth contacts in the associated contact bank respectively terminating the marking conductors C1284, C1285 and C1286 which are adapted to be marked with direct ground potential by the respective party relays R1210, R1220 and R1230. In the present example, the calling subscriber substation TP, being of the private type as contrasted with a calling subscriber substation of the party type, does not effect operation of any one of the party relays R1210, R1220 or R1230, and consequently no ground potential appears at this time upon the marking conductors C1284, C1285 and C1286. Accordingly, upon the last three operations of the pulse relay R1460, three light ground impulses were transmitted over the impulse conductor C1391 to the register translator 1700. Upon the last-mentioned restoration of the pulse relay R1460, the wiper 1501 of the first code switch A1500 disengages the thirteenth contact in the associated contact bank, whereby the previously traced circuit for energizing the pulse relay R1460 is interrupted in order to cause the latter relay to restore, and consequently arrests further operation of the pulse relay R1460 at this time.

As the pulse relay R1450 operates and restores intermittently, it successively advances the wipers of the second code switch B1510, the third code switch C1520, and the first numerical switch D1620. More particularly upon the first seven operations of the pulse relay R1450 an obvious circuit is completed at the contacts 1451 for energizing the magnet BM1516 of the second code switch B1510, whereupon the wipers thereof are advanced into engagement with the eleventh contact in the associated contact banks, and at wiper 1511 the pulsing circuit is transferred from the magnet BM1516 to the magnet CM1526 of the third code switch C1520. The number seven, that is the seven pulses required to advance the wipers of the second code switch B1510 from the position four to position eleven, plus the second digit "4" registered in the second code switch B1510, is equal to eleven.

Upon the next ten operations of the pulse relay R1450 an obvious circuit is completed at the contacts 1451 for energizing the magnet CM1526, whereupon the operating circuit for the magnet CM1526 is transferred by way of its associated wiper 1521 and the engaged eleventh contact in its associated bank to the magnet DM1625 of the first numerical switch D1620. The number ten, that is the ten impulses transmitted to the third code switch C1520, plus the third digit "1" registered in the third code switch C1520, is equal to eleven.

Upon the next ten operations of the pulse relay R1450 a circuit is completed at the contacts 1451 for energizing the magnet DM1625 of the first numerical switch D1620, whereupon the operating circuit for the magnet DM1625 is interrupted when the wiper 1621 is advanced into engagement with the eleventh contact of its associated bank. The number ten, that is the ten impulses required to advance the wipers of the first numerical switch D1620 into engagement with the eleventh contacts of the associated contact bank, plus the fourth digit "1" registered in the first numerical switch, is equal to eleven.

Also, each time the pulse relay R1450 operates and then restores it completes and then interrupts, at its contacts 1453, a path for applying either light ground potential or heavy ground potential to the impulse conductor C1392 extending to the register translator 1700, as will be explained more fully below. More particularly, upon the first seven operations of the pulse relay R1450, the wiper 1513 of the second code switch B1510 successively engages the fourth to the tenth bank contacts, inclusive, in the associated contact bank, whereby light ground potential is applied six times by way of the resistor 1454 and a heavy ground potential is applied once by way of the tenth contact in the contact bank associated with the grounded wiper 1513 to the impulse conductor C1392. At this time it is noted that the six light ground impulses are transmitted over the impulse conductor C1392 in view of the fact that the wipers of the second code switch B1510 engage the fourth contacts in the associated contact banks when operation of the pulse relay R1450 is initiated, the number six being the complement of the digit "4" registered in the second code switch B1510. Accordingly, it will be understood that the pulse relay R1450 transmits a number of light ground impulses corresponding to the complement of the digit registered in the second code switch B1510, and then an additional heavy ground impulse.

Upon the next ten operations of the pulse relay R1450 the wipers of the third code switch C1520 successively engage the first to the tenth bank contacts, inclusive, in the associated contact bank, whereby light ground potential is applied nine times by way of the resistor 1454 and then a heavy ground potential is applied once by way of the wiper 1523 and the tenth contact in the associated contact bank to the impulse conductor C1392 extending to the register translator 1700. At this point it is noted that the nine light ground impulses are transmitted over the impulse conductor C1392 in view of the fact that the wipers of the third code switch C1520 engaged the first contacts in the associated contact banks when operation of the pulse relay R1450 was initiated to control the third code switch C1520, the number nine being the complement of the digit "1" registered therein. Accordingly, it will be understood that the pulse relay R1450 transmits a number of light ground impulses corresponding to the complement of the digit registered in the third code switch C1520 and then a heavy ground impulse.

Upon the next ten operations of the pulse relay R1450 the wipers of the first numerical switch D1620 successively engage the first to the tenth bank contacts, inclusive, in the associated contact banks, whereby light ground potential is applied nine times by way of the resistor 1454 and a heavy ground is applied once by way of the tenth contact in the contact bank associated with the grounded wiper 1623 of the first numerical switch D1620 to the impulse conductor C1392 extending to the register translator 1700. At this point it is noted that the nine light ground impulses are transmitted over the impulse conductor C1392 in view of the fact that the wipers of the first numerical switch D1620 engaged the first contacts in the associated contact banks when operation of the pulse relay R1450 was initiated to control the first numerical switch D1620, the number nine being the complement of the digit "1" registered therein. Accordingly, it will be understood that the pulse relay R1450 transmits a number of light ground impulses corresponding to the complement of the digit registered in the first numerical switch D1620, and then a heavy ground impulse.

During the transmission of the complement of the digit "4" registered in the second code switch B1510 by the pulse relay R1450, when the grounded wiper 1513 disengages the ninth contact in the associated contact bank, the previously traced circuit for energizing in multiple the upper and lower windings of the pulse relay R1450 is interrupted and an obvious alternative circuit, including the grounded tenth contact in the contact bank associated with the wiper 1514 of the second code switch B1510, is completed for energizing in multiple the upper and lower windings of the pulse relay R1450. At this time the wipers of the second code switch B1510 are driven to engage the eleventh contact in the associated contact banks, whereby the above-mentioned alternative circuit for energizing in multiple the upper and lower windings of the pulse relay R1450 is interrupted. When the wiper 1511 of the second code switch B1510 engages the eleventh contact in the associated contact banks, the previously described circuit is completed for controlling the magnet CM1526 of the third code switch C1520 only if the wipers of the third code switch have been operated to register the third digit dialed by the calling subscriber. As has been pointed out above, if the third digit is registered in the third code switch C1520, the sequence switch S1630 has advanced its wipers into engagement with the third contacts of its associated contact bank. A circuit will then be completed by way of the grounded wiper 1523 and the wiper 1633 in order to continue the operation of the pulse relay R1450. On the other hand, if the fourth digit has been dialed by the calling subscriber, the first numerical switch D1620 will have positioned its associated wipers to register the fourth dialed digit and the sequence switch S1630 will have advanced its wipers into engagement with the fourth contacts of its associated contact bank. In the latter event, ground potential applied by way of the wiper 1623 and the wiper 1633 will control the pulse relay R1450 to continue operation thereof.

During the transmission of the complement of the third digit "1" registered in the third code switch C1520 by the pulse relay R1450, when the grounded wiper 1524 engages the tenth contact in the associated contact bank, a circuit is completed for energizing in multiple the upper and lower windings of the pulse relay R1450 in order to cause the latter relay to transmit an additional pulse to the magnet CM1526 and cause the latter magnet to advance the wipers of the third code switch C1520 into engagement with the eleventh contacts in the associated contact bank. It is to be noted that if a digit has not been registered in the first numerical switch D1620, the wipers thereof will be in engagement with the home contacts in the associated contact bank and, consequently, the circuit for controlling the pulse relay R1450 will be interrupted. However, if a digit is registered in the first numerical switch D1620, the ground potential applied to the wiper 1623 completes the circuit for continuing the self-interrupting operation of the pulse relay R1450.

During the transmission of the complement of the fourth digit "1" registered in the first numerical switch D1620, when the grounded wiper 1623 of the first numerical switch disengages the ninth contact in the associated contact bank, the previously traced circuit for energizing in multiple the upper and lower windings of the pulse relay R1450 is interrupted, and when the wiper 1624 engages the grounded tenth contact in the associated contact bank, a circuit is completed for energizing the pulse relay R1450. At this time the wipers of the first numerical switch D1620 are advanced into engagement with the eleventh contacts in the associated contact bank, whereby the above-mentioned circuit for energizing the pulse relay R1450 is interrupted when the wiper 1624 disengages the tenth contact in its associated contact bank. Further operation of the pulse relay R1450 is positively arrested at this time.

The arrangement of the circuits traced above for continuing the operation of the pulse relay R1450 positively insures that as soon as the second digit "4" is registered in the second code switch B1510, the third digit "1" is registered in the third code switch C1520 and the fourth digit "1" is registered in the first numerical switch D1620, the complements of the respective registered digits are transmitted to the register translator. However, it should be understood that the complements of the digits registered in the register switches A1500, B1510, C1520 and D1620 are not transmitted by the primary register 1200 to the register translator, such as 1700, until one of the digits registered in the primary register 1200 has caused the operation of the translate relay R1270, and the test relay R1340 has operated to indicate that an idle register translator has been associated with the primary register 1200 and is conditioned to receive and register the complementary digits transmitted by the primary register. It should also be noted that the translate relay R1270 may be operated as a result of the registration of a certain digit or combination of digits in the three code switches A1500, B1510 and C1520. In any event, as soon as a register translator is associated with the primary register 1200 the complements of the digits registered will be transmitted in succession to the register translator. When the complements of a digit registered in one of the code switches has been transmitted and the next succeeding code switch has not as yet been operated to register a digit, the operation of the pulse relay R1450 will be arrested until the next succeeding digit is registered. When the next digit is registered in the next code switch, the pulse relay R1450 will again start operation to transmit the complement of the digit registered in the said next code switch. With this arrangement, the pulse relays R1450 and R1460 will start transmission of the complements of the digit registered in the primary register 1200 as soon as a register translator is associated therewith. Furthermore, if a register translator is associated with the primary register as a result of the registration of a digit in the first code switch A1500, or as the result of the registration of a combination of digits in the first and second code switches A1500 and B1510, the complement of this digit or digits will be transmitted to the register translator, and if there is a delay in the registration of the next digit or digits the primary register will wait until the said next digit is registered and will then immediately transmit the complement of the registered digit to the register translator.

The subscriber at the calling private subscriber substation TP may now proceed to dial the fifth digit "2" in the manner previously explained. The auxiliary line relay R1420 follows the fifth digit "2" and repeats the impulses thereof at its contacts 1423, over the impulse conductor C1395 extending to the register translator 1700. The path for repeating the impulses of the fifth digit "2" extends from ground by way of the contacts 1423 and 1431, the wiper 1631 and the engaged fourth contact in the associated contact bank to the impulse conductor C1395 extending to Fig. 22. Also, the auxiliary line relay R1420, at its contacts 1423, repeats the impulses of the fifth digit "2" to the dial relay R1260, thereby to cause the latter relay to operate and effect the operation of the dial slave relay R1310, in the manner previously explained. Upon operating, the dial relay R1260, at its contacts 1262, completes a circuit path for applying ground potential to the conductor C1281, which may be traced from ground by way of the contacts 1411 and 1316, the conductor C1294, the wiper 1634 and the engaged fourth contact in its associated contact bank, the conductor C1290 extending to Fig. 12, the contacts 1262, and conductor C1281 extending to the register translator 1700. Also, at its contacts 1263, the relay R1260 disconnects the upper winding of the release relay R1315 from the conductor C1281. The dial slave relay R1310, upon operating, at its contacts 1313, completes the previously traced circuit for energizing the magnet SM1636 of the sequence switch S1630, thereby to cause the latter magnet to operate and condition the wipers to be driven an additional step in the counterclockwise direction. Shortly following the conclusion of the fifth digit "2," the dial relay R1260 restores in order to interrupt, at its contacts 1262, the previously traced path for applying ground potential to the conductor C1281 to reconnect, at its contacts 1263, the winding of the release relay R1315 to conductor C1281 and to effect, at its contacts 1261, the restoration of the dial slave relay R1310. The dial slave relay R1310, upon restoring, at its contacts 1313, interrupts the previously traced circuit for the magnet SM1636, whereupon the latter magnet restores and drives the wipers of the sequence switch S1630 an additional step in the counterclockwise direction.

At this point it is noted that when the auxiliary line relay R1420 repeats, at its contacts 1423, the impulses of the fifth digit "2" over the impulse conductor C1395, a circuit, traced hereinafter, is prepared for energizing the winding of the busy relay R1350 in the event the test relay R1340 has not been energized, and thus indicates that an idle register translator has been associated with the primary register 1200. More particularly, in the event an idle register translator, such as the register translator 1700, is not connected to the primary register 1200 at this time, the test relay R1340 occupies its restored position; therefore when the auxiliary line relay R1420 repeats the impulses of the fifth digit "2" over the conductor C1395, the first ground pulse transmitted over the conductor C1395 is also extended by way of a branch circuit, including the contacts 1353 and 1342, and the winding of the busy relay R1350 to battery. The busy relay R1350 operates over this circuit and, at its contacts 1352, completes a locking circuit for itself from ground at the contacts 1411; at its contacts 1353 it interrupts its original energizing circuit; at its contacts 1354 it interrupts the previously described testing circuit for the test relay R1340; and, at its contacts 1351, it completes a circuit for transmitting busy tone over the conductor C643, which is now connected to the loop circuit, including the calling subscriber's line. A busy tone signal is thus transmitted to the private subscriber at the substation TP in order to indicate to the subscriber thereat that the desired connection may not be completed at the present time due to the fact that the register translator is not available to extend the connection to the desired called subscriber substation. The subscriber at the calling substation TP, by replacing the receiver of the telephone instrument thereat upon its associated switchhook, causes the release of the line switch 423, the primary selector 600, and the primary register 1200, in the manner previously explained. From the foregoing description of operation it will be understood that in the event no register translator is in readiness to receive the fifth digit dialed by a calling subscriber, the busy relay R1350 operates thereby to transmit a busy signal to the calling subscriber.

Continuing now with the operation of the primary register 1200, and assuming that the fifth digit "2" has been repeated to the register translator 1700 over the conductor C1395, the subscriber at the substation TP now proceeds to dial the sixth digit "3" and the seventh digit "4," in the manner previously explained, whereby the auxiliary line relay R1420 repeats the impulses of the sixth digit "3" and the seventh digit "4" over the impulse conductor C1395 to the register translator 1700, and the dial relay R1260 connects ground potential two additional times to the conductor C1281 extending to the register translator 1700, all in the manner previously explained. Furthermore, the dial slave relay R1310 connects ground potential two additional times to the conductor C1324 extending to the magnet SM1636, thereby to cause the latter magnet to drive the wipers of the sequence switch S1630 two additional steps in the counterclockwise direction.

Continuing now with the operation of the register translator 1700, it is again noted that the test relay R2150 operates in order to effect the operation of the cut-in relay R2140 when the finder F2290 seizes the conductors C1282, etc., extending to the primary register 1200, whereby the hold relay R2130 and the switch relay R2280 operate in series, all in the manner previously explained. Upon operating, the hold relay R2130 completes, at its contacts 2136, an obvious path for applying ground potential to the hold conductor C2772. Other operations controlled by the contacts of the hold relay R2130 will be explained hereinafter. The switch relay R2280, upon operating, at its contacts 2281, prepares a circuit, including the impulse conductor C1391 extending to Fig. 13 of the primary register 1200, the wiper 2292 of the finder F2290, and the conductor C2071, for energizing in series the windings of the light code relay R2050 and the heavy code marginal relay R2060; it prepares, at its contacts 2282, a circuit, including the conductor C1392 extending to Fig. 14 of the primary register 1200, the wiper 2293, and the conductor C2172, for energizing in series the windings of the light code relay R2110 and the heavy code marginal relay R2120; and it prepares, at its contacts 2286, a circuit, including the conductor C1395 extending to Fig. 13 of the primary register 1200, the wiper 2297, the conductor C2171, the contacts 2746, and the conductor C2536 extending to Fig. 25, for energizing the magnet FM2525 of the second numerical switch E2520.

The switch relay R2280 also completes, at its contacts 2283, a circuit for energizing the upper winding of the special service relay R2040 in the register translator 1700. This circuit extends from ground by way of the resistor 722 in the primary selector 600, the strap 723, the contacts 720 of the cam springs S718, the contacts 771 and 625, the wiper 614 of the finder F610, the conductor C644, the contacts 1443, the conductor C1394, the wiper 2294 of the finder F2290, the contacts 2283, the conductor C1872, the contacts 1811 and 1713, and the upper winding of the special service relay R2040, to battery. When this circuit is completed, however, the special service relay R2040 does not operate due to the high resistance 722 included in the circuit. It may be well to mention at this time that in the event a primary selector, such as the primary selector 441, had been included in the connection instead of the primary selector 600, a direct ground potential would have been applied by way of the corresponding contacts of the cam springs S718 in order to operate the special service marginal relay R2040. However, in the present connection the resistance is included in this circuit and the special service relay R2040 is not operated.

Further, the switch relay R2280 prepares, at its contacts 2284, a circuit, including the conductor C1281 extending to Fig. 12 of the primary register 1200, the wiper 2295, the contacts 2284, the conductor C2217, and the contacts 2215 and 2743, for energizing the left-hand winding of the sequence relay R2740. Further, the switch relay R2280 completes, at its contacts 2285, a circuit path, including the conductor C1393 extending to Fig. 14 of the primary register 1200, for applying ground potential by way of the impedance 2216, the conductor C2232, the contacts 2285, the wiper 2296, the conductor C1393 extending to Fig. 14, the contacts 1442, the conductor C645 extending to Fig. 6, the wiper 615 of the finder F610, and the contacts 627 to the control conductor C465 of the trunk 462, thereby to retain the line switch 423 in its operated position. Also, the switch relay R2280 prepares, at its contacts 2288, a circuit, including the impulse conductor C891 extending to Fig. 39, the wiper 2262 of the timer switch M2260 and the engaged home contact in the associated contact bank, for energizing the winding of the timer relay R2270. At this point it is to be noted that the pulse relay R3940 of the date and time unit 3900 is operated twelve times per minute under control of the master clock 3901, whereby, at its contacts 3943, twelve ground impulses per minute are applied to the impulse conductor C891. Finally, the switch relay R2280 prepares, at its contacts 2287, a circuit to be traced hereinafter, and including the wiper 2298 of the finder F2290, the conductor C1283 extending to Fig. 12 of the primary register 1200, the contacts 1272, the conductor C642 extending to Fig. 6, the wiper 612 of the finder F610, and the contacts 623 and 773, for energizing the windings of the line relay R730 in the primary selector 600.

Figure 28:
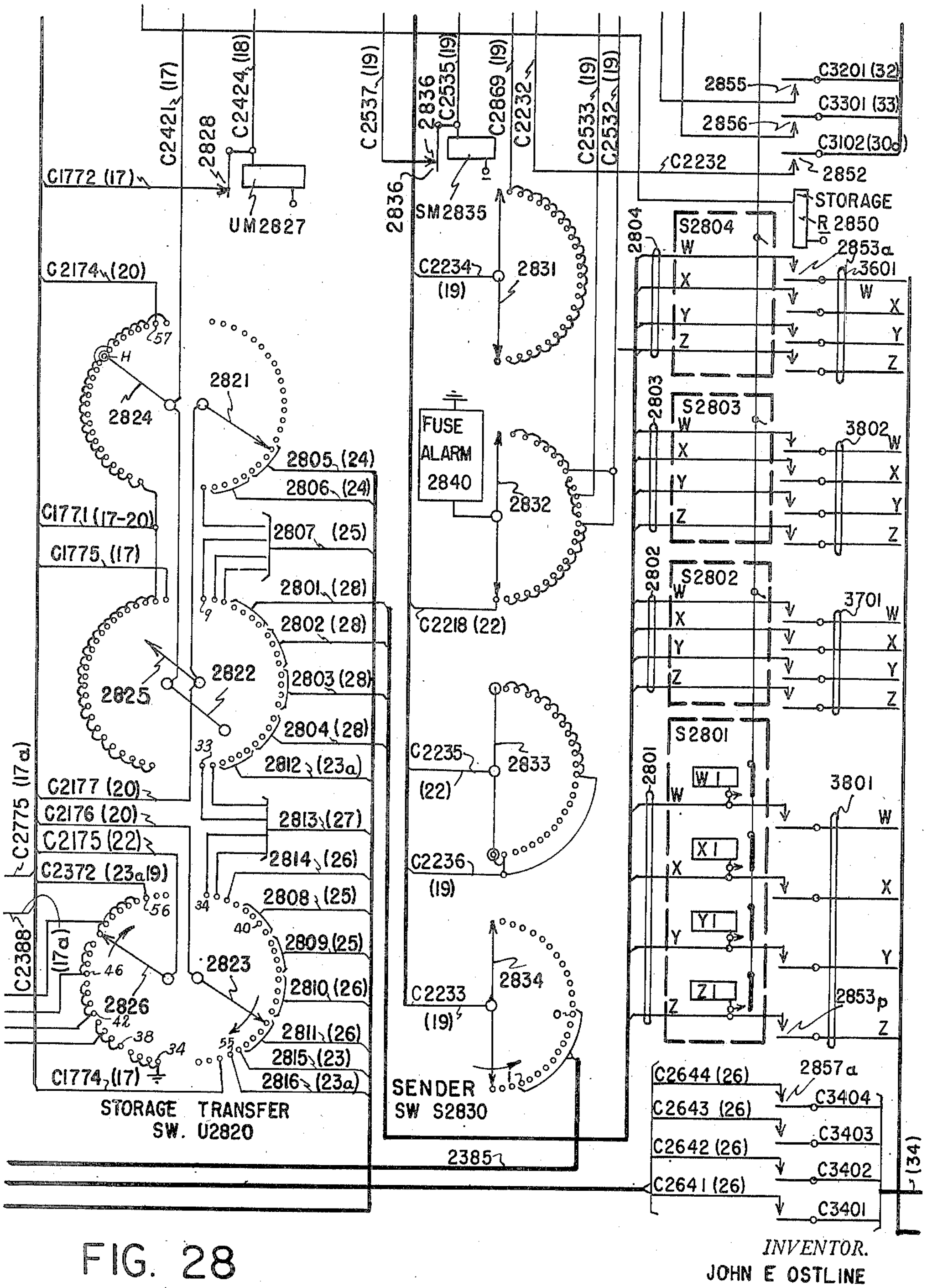
Figure 29:
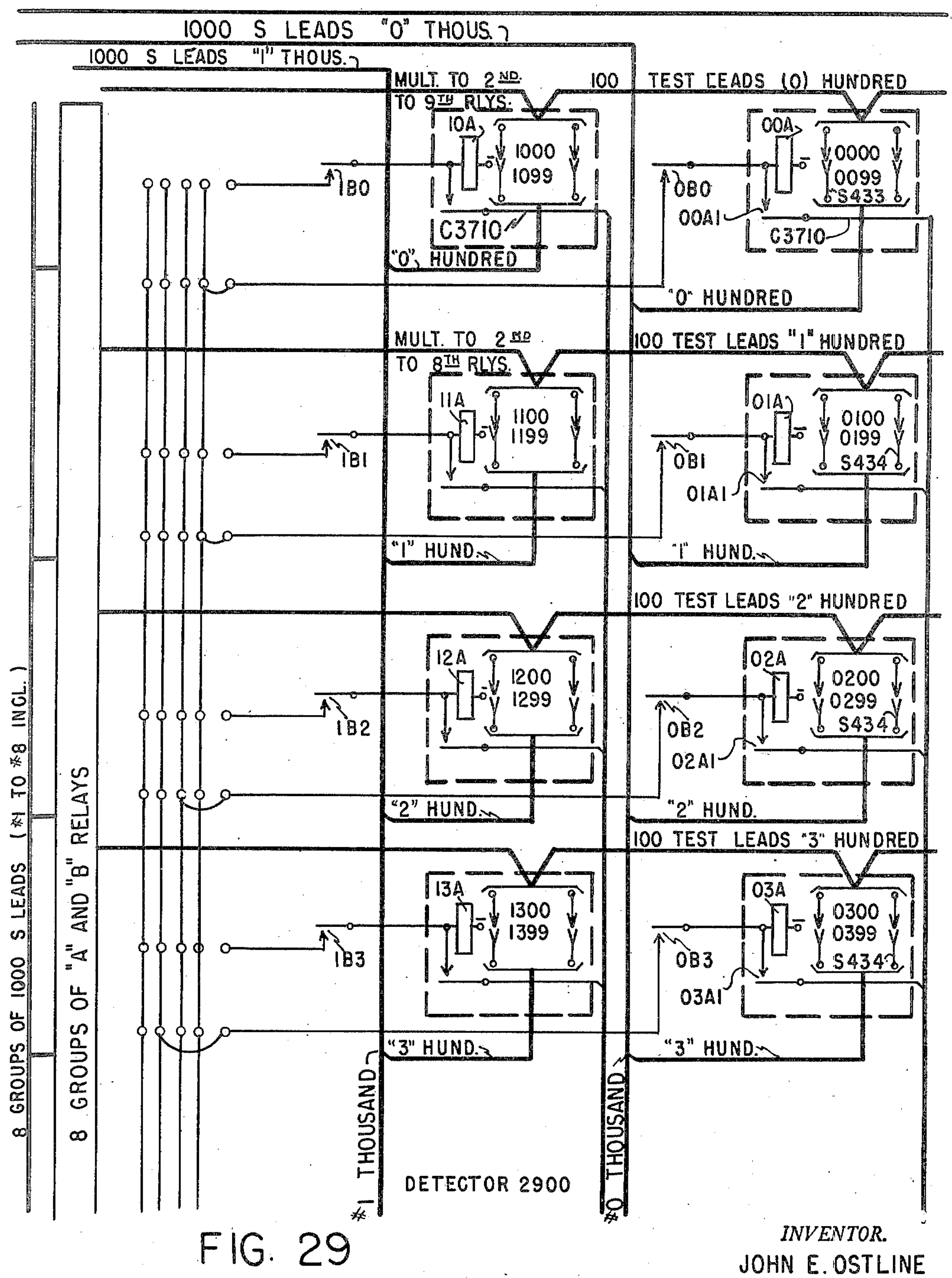
Figure 30:
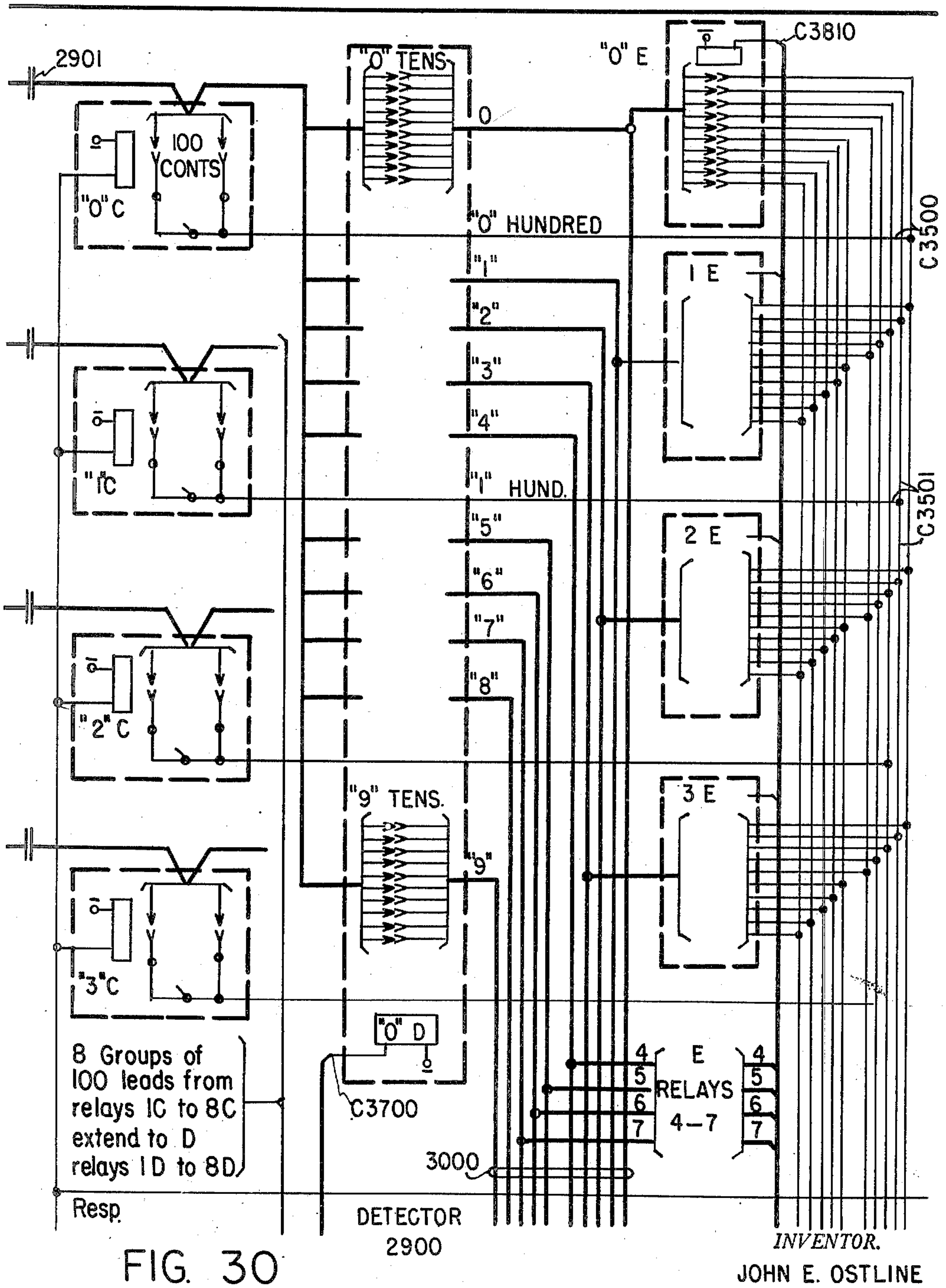

Referring again to the operation of the hold relay R2130, it will be noted that, at its contacts 2131, it prepares a holding circuit for the upper winding of the detector cut-out relay R1950; at its contacts 2133 and 2134, it opens a point in the circuit for releasing the timer switch M2260; at its contacts 2135, it prepares a point in the circuit for restoring certain of the register switches of the register translator 1700; at its contacts 2132, it opens a point in the circuit for restoring certain of the register switches to normal; and, at its contacts 2137, it prepares a holding circuit for the detector failure relay R2250 and the code register relays shown in Fig. 28.

As previously pointed out in connection with the operation of the primary register 1200, the pulse relay R1460 therein first operates to transmit two light ground impulses, which are the complement of the first digit "8" registered in the first code switch A1500, and then a single heavy ground impulse over the impulse conductor C1391 extending to the register translator 1700. As a result, the light code relay R2050 operates three times and the heavy code relay R2060, being of the marginal type, operates once. Each time the light code relay R2050 operates and then restores it completes and then interrupts, at the contacts 2051, a circuit extending from ground by way of the wiper 2623 of the party switch N2620 and the engaged home contact in the associated contact bank, the conductor C2635, the contacts 2051, and the conductor C2422 extending to Fig. 24, for energizing the magnet AM2406 of the first code switch A2400 in the register translator, whereby the latter magnet operates and restores, thereby to drive the wipers 2401 to 2405, inclusive, one step in the clockwise direction. Accordingly, at this time the magnet AM2406 is operated and restored three times, whereby the wipers noted of the first code switch A2400 are driven into engagement with the third contacts in the associated contact bank. When the first code switch A2400 is thus operated the wipers 2402 and 2403 thereof set up the code "8" in the group of WXYZ marking leads 2805 extending to the storage transfer switch U2820 of Fig. 28, for a purpose more fully explained hereinafter. More particularly, the wiper 2402 engages the third contact in its associated contact bank terminating the X conductor in the group of WXYZ marking leads 2805 corresponding in code to the digit "8." The wiper 2403, however, when it engages the third contact in its associated bank, has no effect because none of the WXYZ marking leads 2805 is connected to this contact. Also, when the first code switch A2400 is thus operated, the wiper 2404 thereof engages the third contact in its associated contact bank terminating the eighth marking conductor in the marking cable 2385, for a purpose more fully explained hereinafter; while the grounded wiper 2405 thereof engages the third contact in its associated contact bank terminating the conductor extending to the wiper 2338 of the composite code switch P2330. Accordingly, the first code switch A2400 is responsive to the complement of the first digit "8" registered in the primary register 1200 to select and to cause ground potential to be applied to the corresponding wiper 2338 of the composite code switch P2330.

When the heavy code relay R2060 operates and then restores it completes and then interrupts, at its contacts 2061, an obvious circuit for energizing the magnet NM2625 of the party switch N2620, thereby to cause the latter magnet to operate and restore, whereby the wipers 2621 to 2623, inclusive, are driven one step in the counterclockwise direction away from their home position. When the party switch N2620 is thus operated, the wiper 2622 engages the first contact in the associated contact bank, thereby to prepare a circuit, traced hereinafter, for energizing the upper winding of the pulse relay R1830; while the wiper 2623 thereof disengages the home contact in the associated contact bank, thereby to interrupt a further point in the previously traced circuit for energizing the magnet AM2406 of the first code switch A2400 in order positively to arrest operation of the latter switch at this time. Also, when the party switch N2620 is thus operated the grounded wiper 2623 thereof engages the first contact in the associated contact bank terminating the first marking conductor C2641 which, in turn, is adapted to be connected to the first marking conductor C3401 extending to Fig. 34 of the detector 2900, for a purpose more fully explained hereinafter.

The pulse relay R1460 in the primary register 1200 then transmits three additional light ground impulses over the conductor C1391 in conjunction with the test of whether the calling subscriber substation TP is of the party type, in the manner previously explained, whereby the light code relay R2050 in the register translator 1700 operates three additional times. This operation of the light code relay R2050 is without effect due to the fact that the wiper 2623 of the party switch N2620 has disengaged the home contact in the associated contact bank at this time, and thus further operation of the first switch A2400 is prevented. In view of the fact that no further operation of the heavy code relay R2060 occurs at this time, the wipers of the party switch N2620 remain in engagement with the first contact in the associated contact banks.

As previously pointed out in connection with the operation of the primary register 1200, the pulse relay R1450 therein first operates to transmit six light ground impulses which are the complement of the second digit "4" registered in the second code switch B1510, and then a single heavy ground impulse over the impulse conductor C1392, whereby the light code relay R2110 operates seven times and the heavy code relay R2120 operates once, due to the fact that the latter relay is of the marginal type. Each time the light code relay R2110 operates and then restores it completes and then interrupts, at its contacts 2111, a circuit, including the contacts 2715 and the conductor C2323 extending to Fig. 24, for energizing the magnet BM2415 of the second code switch B2410 in the register translator 1700, whereby the latter magnet operates and restores thereby to drive the wipers 2411 to 2414, inclusive, one step in the clockwise direction. Accordingly, at this time the magnet BM2415 is operated and restored seven times, whereby the wipers noted are driven into engagement with the seventh contacts in the associated contact banks. When the second code switch B2410 is thus operated, the wipers 2412 and 2413 thereof set up the code "4" in the group of WXYZ marking leads 2806 extending to the storage transfer switch U2820 in Fig. 28, for a purpose more fully explained hereinafter. More particularly, the wipers 2412 and 2413 respectively engage the seventh contacts in the associated contact banks respectively terminating the X and Y conductors in the group of WXYZ marking leads 2806 corresponding in code to the digit "4," as previously explained. Also, when the second code switch B2410 is thus operated, the wiper 2414 thereof engages the seventh contact in the associated contact bank terminating the fourth marking conductor in the marking cable 2385, for a purpose more fully explained hereinafter.

Figure 23:
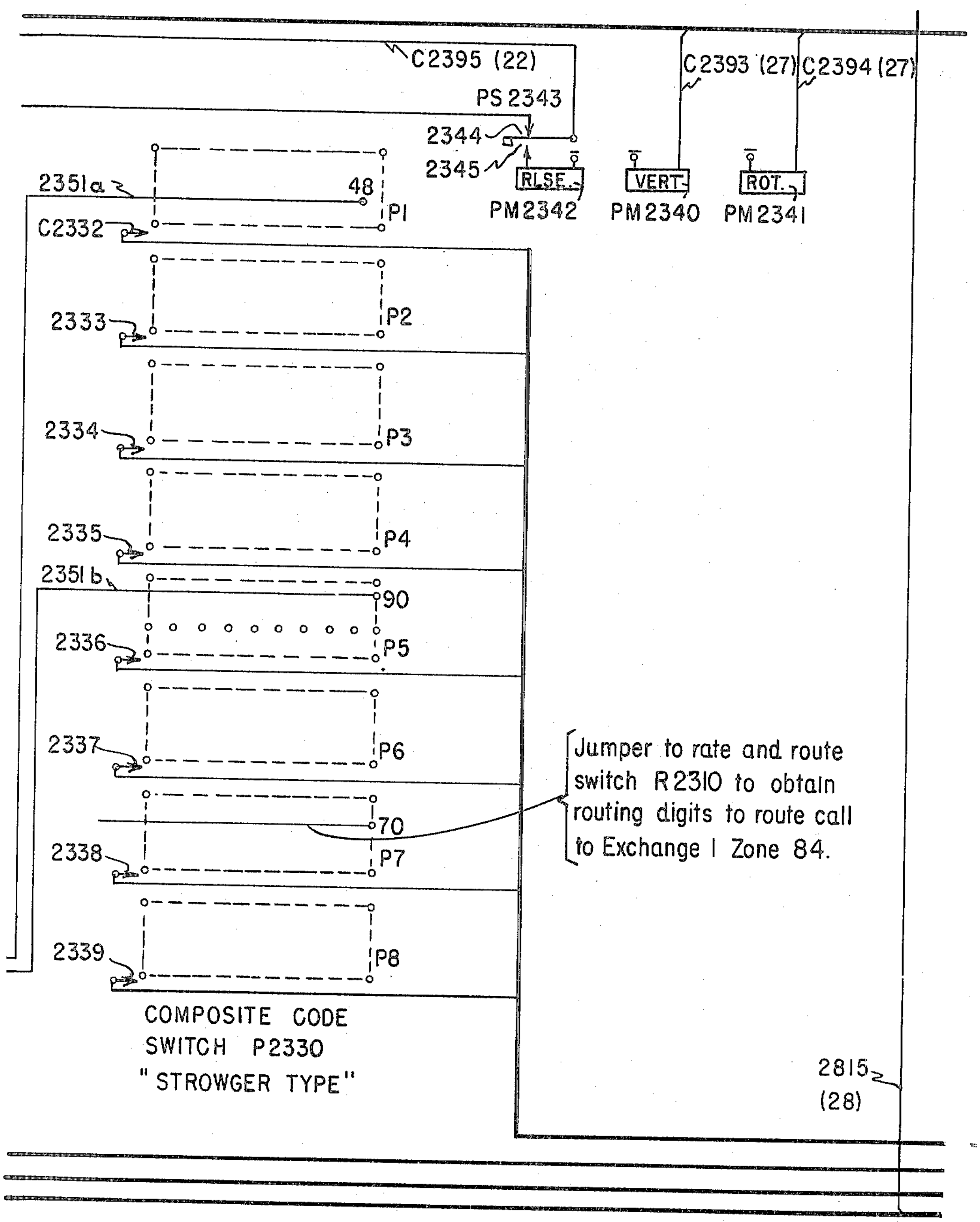

Also, each time the light code relay R2110 operates and then restores it completes and then interrupts, at its contacts 2112, a circuit, including the contacts 2717 and the conductor C2393 extending to Fig. 23, for energizing the vertical magnet PM2340 of the composite code switch P2330 in the register translator 1700, whereby the latter magnet operates in order to drive the wiper set of the composite code switch P2330 one step in the vertical direction away from its normal vertical position. When the wiper set of the composite code switch P2330 is driven one step in the vertical direction, the set of vertical off-normal springs PS2343 is actuated in order to prepare a circuit for the release magnet PM2342, for a purpose more fully explained hereinafter. Accordingly, at this time, the vertical magnet PM2340 is operated and restored seven times, whereby the wiper set, including the wipers 2332 to 2339, inclusive, is driven seven steps in the vertical direction away from its normal vertical position.

When the heavy code relay R2120 operates and then restores it completes and then interrupts, at its contacts 2121, a circuit, including the contacts 2713, for energizing the left-hand winding of the sequence relay R2710, thereby to cause the latter relay to operate partially to close the contacts 2711. When the ground pulse is removed at the contacts 2121, by the restoration of the heavy code relay R2120, an obvious holding circuit is completed for energizing in series the left-hand and right-hand windings of the sequence relay R2710 over a circuit including the contacts 2711 and the grounded conductor C2772. When the latter circuit is completed the relay is fully operated, thereby to actuate the remaining contacts thereof. Also, upon fully operating, the sequence relay R2710, at its contacts 2713, interrupts a further point in the previously traced original circuit for energizing the left-hand winding thereof; and it prepares, at its contacts 2712, a circuit, traced hereinafter, for energizing the left-hand winding of the sequence relay R2720. Further, the sequence relay R2710 interrupts, at its contacts 2715, a further point in the previously traced circuit for energizing the magnet RM2415, thereby positively to prevent further operation of the second code switch B2410; at its contacts 2714, it prepares a circuit, traced hereinafter, for energizing the magnet CM2505 of the third code switch C2500; and, at its contacts 2717, it interrupts a further point in the previously traced circuit for energizing the vertical magnet PM2340, thereby positively to prevent further operation of the composite code switch P2330 in the vertical direction. Finally, at its contacts 2716, the sequence relay R2710 prepares a circuit, traced hereinafter, for energizing the rotary magnet PM2341 of the composite code switch P2330.

The pulse relay R1450 in the primary register 1200 then operates to transmit nine light ground impulses which are the complement of the third digit "1" registered in the third code switch C1520, and then a single heavy ground impulse over the impulse conductor C1392, whereby the light code relay R2110 operates ten times and the heavy code relay R2120 operates once. Each time the light code relay R2110 operates and then restores it completes and then interrupts, at its contacts 2111, the previously mentioned circuit, including the contacts 2714 and 2725, and the conductor C2531 extending to Fig. 25, for energizing the magnet CM2505 of the third code switch C2500 in the register translator 1700, whereby the latter magnet operates and restores thereby to drive the wipers 2501 to 2504, inclusive, one step in the clockwise direction. Accordingly, at this time the magnet CM2505 is operated and restored ten times, whereby the wipers noted are driven into engagement with the tenth contacts in the associated contact banks. When the third code switch C2500 is thus operated, the wipers 2502 and 2503 thereof set up the code "1" in the group of WXYZ marking leads 2807 extending to the storage transfer switch U2820 in Fig. 28, for a purpose more fully explained hereinafter. More particularly, the wipers 2502 and 2503 respectively engage the tenth contacts in the associated contact banks respectively terminating the W and X conductors in the group of WXYZ marking leads 2807 corresponding in code to the digit "1," as previously explained. Also, when the third code switch C2500 is thus operated the wiper 2504 engages the tenth contact in the associated contact bank terminating the first marking conductor in the marking cable 2385 extending to Fig. 28, for a purpose more fully explained hereinafter.

Also, each time the light code relay R2110 operates and then restores it completes and then interrupts, at its contacts 2112, the previously mentioned circuit, including the contacts 2716 and 2726, and the conductor C2394 extending to Fig. 23, for energizing the rotary magnet PM2341 of the composite code switch P2330, whereby the latter magnet operates in order to drive the wiper set of the composite code switch P2330 one step in the rotary direction away from its normal rotary position. Accordingly, at this time the rotary magnet PM2341 is operated and restored ten times, whereby the wiper set of the composite code switch P2330 is driven ten steps in the rotary direction away from its normal rotary position.

When the heavy code relay R2120 operates and then restores it completes and then interrupts, at its contacts 2121, the previously mentioned circuit, including the contacts 2712 and 2723, for energizing the left-hand winding of the sequence relay R2720, thereby to cause the latter relay to operate partially to close its contacts 2721 whereby an obvious holding circuit, including the grounded hold conductor C2772, is completed for energizing in series the right-hand and left-hand windings of the relay R2720, when the original circuit for the left-hand winding is interrupted at the contacts 2121. When the two windings of the sequence relay R2720 are energized in series, the relay fully energizes to operate the remaining contacts of the relay. Also, upon operating, the relay R2720 interrupts, at its contacts 2723, a further point in the previously traced original circuit for energizing the left-hand winding thereof and, at its contacts 2722, it prepares a circuit, traced hereinafter, for energizing the left-hand winding of the sequence relay R2730. Further, the sequence relay R2720 interrupts, at its contacts 2725, a further point in the previously traced circuit for energizing the magnet CM2505, thereby positively to prevent further operation of the third code switch C2500. Also, the relay R2720 prepares, at its contacts 2724, a circuit, traced hereinafter, for energizing the magnet DM2515 of the first numerical switch D2510; at its contacts 2726, it interrupts a further point in the previously traced circuit for energizing the rotary magnet PM2341, thereby positively to prevent further operation of the wiper set of the composite code switch P2330 in a rotary direction; and finally, at its contacts 2727, it prepares a further point in the previously mentioned circuit for energizing the upper winding of the switch pulse relay R1830. The latter circuit is completed at this time due to the fact that the wipers 2621 to 2623, inclusive, of the party switch N2620 engage the first contacts in the associated contact banks. This circuit extends from the grounded wiper 2303 (Fig. 23A) of the sequence switch T2300 and the engaged home contact in the associated contact bank, by way of the conductor C1776 extending to Fig. 17, the contacts 1764 and 1822, the conductor C1871 extending to Fig. 21, the contacts 2727, the wiper 2622 of the party switch N2620 and the engaged first contact in the associated contact bank, the conductor C2634, the contacts 1833, and the upper winding of the switch pulse relay R1830 to battery. Also, the application of ground potential, by way of the above-traced circuit, to the contacts 1833 completes an obvious path for short-circuiting the condenser 1835 through the lower winding of the switch pulse relay R1830. Upon operating, the switch pulse relay R1830 interrupts, at its contacts 1833, the previously traced circuit for energizing the upper winding thereof and the previously traced multiple path for short-circuiting the condenser 1835 through the winding thereof, whereupon the condenser 1835 is charged over a series circuit including the upper and lower windings of the switch pulse relay R1830 in order to cause the latter relay to restore shortly thereafter. Hence, the switch pulse relay R1830 operates and restores intermittently at a predetermined rate, depending upon the characteristic of the associated condenser 1835, for a purpose more fully explained hereinafter.

At this time the first digit "8" is registered in the first code switch A2400 and the last-mentioned switch has selected the corresponding wiper 2338 of the composite code switch P2330; the second digit "4" and the third digit "1" are respectively registered in the second code switch B2410 and in the third code switch C2500; and the wiper set of the composite code switch P2330 occupies its corresponding seventh vertical and tenth rotary positions, in the manner previously explained.

The pulse relay R1450 in the primary register 1200 then operates to transmit nine light ground impulses which are the complement of the fourth digit "1," and then a heavy ground impulse over the impulse conductor C1392 extending to the register translator 1700, whereby the light code relay R2110 operates ten times and the heavy code relay R2120 operates once. Each time the light code relay R2110 operates and then restores it completes and then interrupts, at its contacts 2111, the previously mentioned circuit including the contacts 2714, 2724 and 2734, and the conductor C2534 extending to Fig. 25, for energizing the magnet DM2515 of the first numerical switch D2510, whereby the latter magnet operates and restores thereby to drive the wipers 2511 to 2514, inclusive, one step in the clockwise direction. Accordingly, at this time the magnet DM2515 is operated and restores ten times, whereby the wipers noted of the first numerical switch D2510 are driven into engagement with the tenth contacts in the associated contact banks. When the first numerical switch D2510 is thus operated, the wipers 2512 and 2513 thereof set up the code "1" in the group of WXYZ marking leads 2808 extending to the storage transfer switch U2820 in Fig. 28, for a purpose more fully explained hereinafter. More particularly, the wipers 2512 and 2513 respectively engage the tenth contacts in the associated contact banks respectively terminating the W and X conductors in the groups of WXYZ marking leads 2808 corresponding in code to the digit "1," as previously explained. Also, when the first numerical switch D2510 is thus operated, the wiper 2514 thereof engages the tenth contact in the associated contact bank terminating the first marking conductor in the marking cable 2385 extending to Fig. 28, for a purpose more fully explained hereinafter.

When the heavy code relay R2120 operates and then restores it completes and then interrupts, at its contacts 2121, the previously mentioned circuit, including the contacts 2712, 2722 and 2732, for energizing the left-hand winding of the sequence relay R2730, thereby to cause the latter relay to operate partially and close its contacts 2731 to complete an obvious holding circuit, including the grounded hold conductor C2772 for energizing in series the right-hand and left-hand windings of the relay as soon as the original circuit for the left-hand winding thereof is interrupted. When the series circuit, including the left-hand and right-hand windings of the relay R2730 is completed, it fully operates in order to actuate the remaining contacts of the relay. Also, upon operating, the sequence relay R2730 interrupts, at its contacts 2732, a further point in the original circuit for energizing the left-hand winding thereof; it interrupts, at its contacts 2734, a further point in the previously traced circuit for energizing the magnet DM2515, thereby positively to prevent further operation of the first numerical switch D2510; and it prepares, at its contacts 2733, a circuit, traced hereinafter, for energizing the winding of the digit spacer relay R1920.

In view of the foregoing description of the mode of operation of the primary register 1200 and the register translator 1700, it will be understood that the first digit "8" registered in the first code switch A1500 of the primary register, the second digit "4" registered in the second code switch B1510, the third digit "1" registered in the third code switch C1520, and the fourth digit "1" registered in the first numerical switch D1620, are transferred respectively by means of the complementary impulses and registered by the register translator 1700 in the first code switch A2400, the second code switch B2410, the third code switch C2500, and the first numerical switch D2510, respectively.

Figure 25:
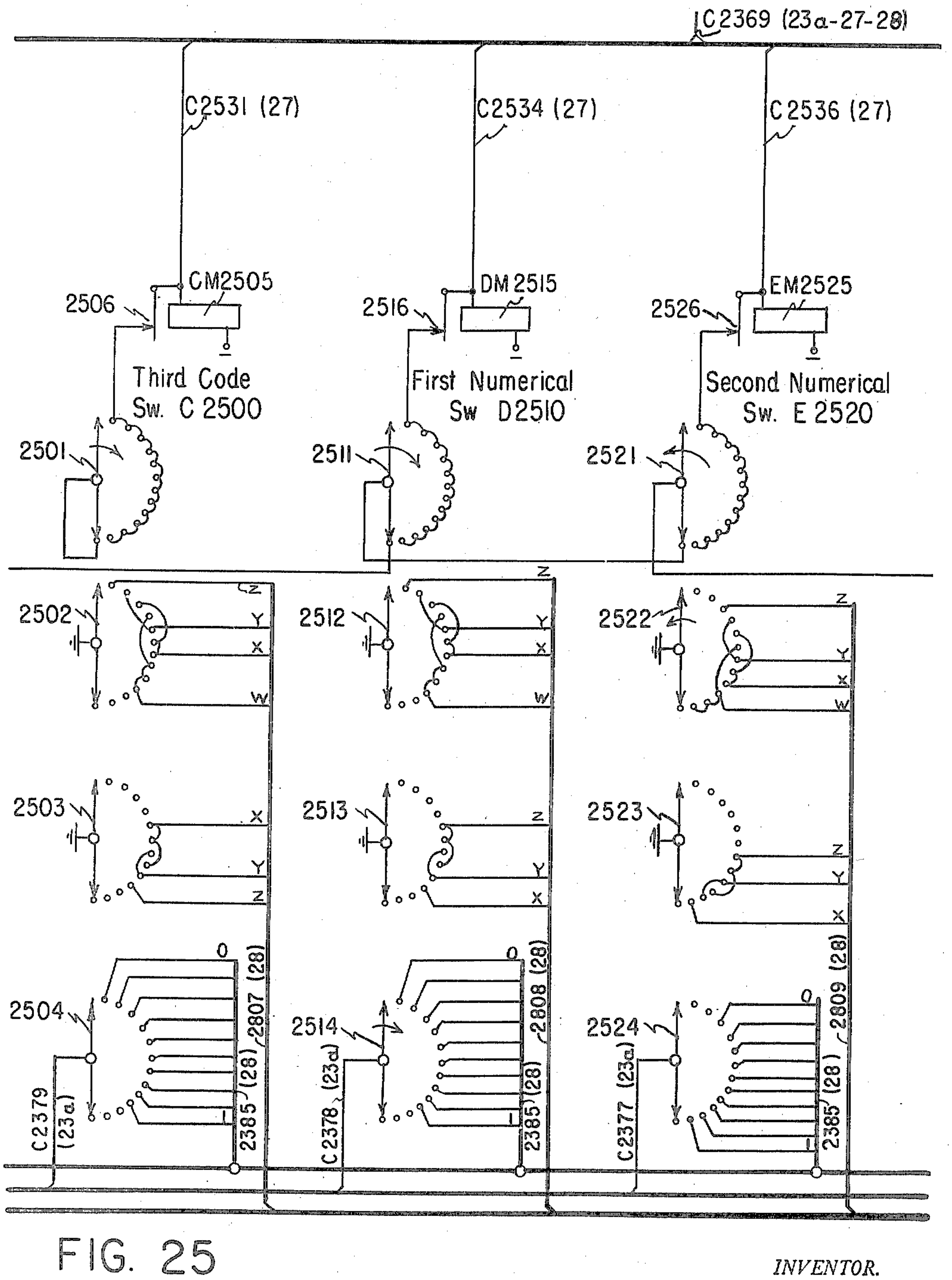

As previously pointed out in connection with the operation of the primary register 1200, the dial relay R1260 therein operates to apply ground potential to the conductor C1281 at the beginning of the fifth digit "2," and then to remove the application of ground potential from the conductor C1281 shortly following the conclusion of the fifth digit "2" dialed by the calling subscriber; while the auxiliary line relay R1420 therein operates to transmit the impulses of the fifth digit "2" over the impulse conductor C1395. When the impulses of the fifth digit "2" are transmitted over the impulse conductor C1395, a circuit, including the wiper 2297 of the finder F2290, the contacts 2286, the conductor C2171, the contacts 2746, and the conductor C2536 extending to Fig. 25, is completed for energizing the magnet FM2525 of the second numerical switch E2520, whereby the latter magnet operates and restores twice in order to drive the wipers 2521 to 2524, inclusive, in a counterclockwise direction into engagement with the second contacts in the associated contact banks. When the second numerical switch E2520 is thus operated the wipers 2522 and 2523 thereof set up the code "2" in the group of WXYZ marking leads 2809 extending to the storage transfer switch U2820 in Fig. 28, for a purpose more fully explained hereinafter. More particularly, the wipers 2522 and 2523 respectively engage the second contacts in the associated contact banks respectively terminating the W and Y conductors in the group of WXYZ marking leads 2809 corresponding in code to the digit "2," as previously explained. Also, when the second numerical switch E2520 is thus operated the wiper 2524 thereof engages the second contact in the associated contact bank terminating the second marking conductor in the marking cable 2385, for a purpose more fully explained hereinafter.

The application of ground potential to the conductor C1281 at the beginning of the fifth digit "2" completes a circuit, including the wiper 2295 of the finder F2290, the contacts 2284, the conductor C2217, and the contacts 2215 and 2743, for energizing the left-hand winding of the sequence relay R2740. When thus energized the sequence relay R2740 operates partially to close only its contacts 2741 to complete an obvious circuit, including the grounded hold conductor C2772, for short-circuiting the right-hand winding thereof. At the conclusion of the fifth digit "2," ground potential is removed from the conductor C1281 as previously noted, thereby to interrupt the original circuit for energizing the left-hand winding of the sequence relay R2740, whereupon a circuit, including the contacts 2741 and the grounded conductor C2772, is completed for energizing in series the right-hand and left-hand windings of the sequence relay R2740. When thus energized the sequence relay R2740 operates fully, thereby to actuate all of the remaining contacts of the relay and, at its contacts 2743, it interrupts a further point in the previously traced circuit for energizing the left-hand winding thereof. Also, the sequence relay R2740, upon fully operating, at its contacts 2742 prepares a circuit, traced hereinafter, for energizing the left-hand winding of the sequence relay R2750; at its contacts 2746 it interrupts a further point in the previously traced circuit for energizing the magnet EM2525 of the second numerical switch E2520; at its contacts 2745, it prepares a circuit, traced hereinafter, for energizing the magnet FM2605 of the third numerical switch F2600; and finally, at its contacts 2744, it prepares an alternative circuit, traced hereinafter, for energizing the winding of the digit spacer relay R1920.

Figure 26:
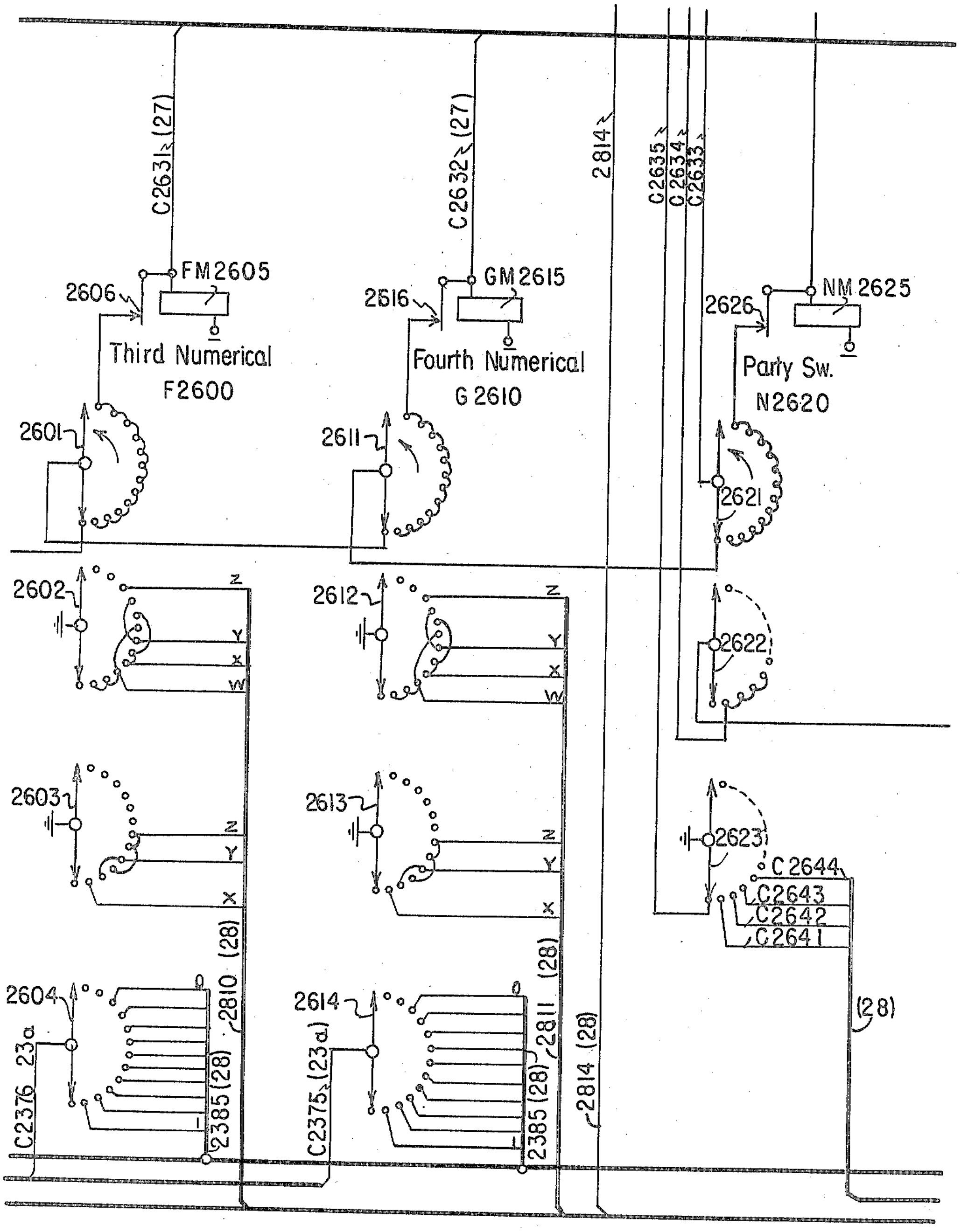

In the primary register 1200 the dial relay R1260 operates to apply ground potential to the conductor C1281 at the beginning of the sixth digit "3" and then to remove the application of ground potential from the conductor C1281 shortly following the conclusion of the sixth digit "3"; while the auxiliary line relay R1420 operates to transmit the impulses of the sixth digit "3" over the impulse conductor C1395. When the impulses of the sixth digit "3" are transmitted over the impulse conductor C1395 a circuit, including the wiper 2297 of the finder F2290, the contacts 2286, the conductor C2171, the contacts 2745 and 2756, and the conductor C2631 extending to Fig. 26, is completed for energizing the magnet FM2605 of the third numerical switch F2600, whereby the latter magnet operates and restores three times in order to drive the wipers 2601 to 2604, inclusive, in the counterclockwise direction into engagement with the third contacts in the associated contact banks. When the third numerical switch F2600 is thus operated the wipers 2602 and 2603 thereof set up the code "3" in the group of WXYZ marking leads 2810 extending to the storage transfer switch U2820 in Fig. 28, for a purpose more fully explained hereinafter. More particularly, the wipers 2602 and 2603 respectively engage the third contacts in the associated contact banks respectively terminating the W and Z conductors in the group of marking leads 2810 corresponding in code to the digit "3," as previously explained. Also, when the third numerical switch F2600 is thus operated the wiper 2604 thereof engages the third contact in the associated contact bank terminating the third marking conductor in the marking cable 2385, for a purpose more fully explained hereinafter.

The application of ground potential to the conductor C1281 at the beginning of the sixth digit "3" completes a circuit, including the wiper 2295 of the finder F2290, the contacts 2284, the conductor C2217, the contacts 2215, 2742 and 2753, for energizing the left-hand winding of the sequence relay R2750. When thus energized the sequence relay R2750 operates partially, thereby to close only its contacts 2751 to complete an obvious path, including the grounded hold conductor C2772, for short-circuiting the right-hand winding thereof. At the conclusion of the sixth digit "3" ground potential is removed from the conductor C1281, as previously noted, thereby to interrupt the original circuit for energizing the left-hand winding of the relay R2750, whereupon the circuit, including the grounded conductor C2772 and the contacts 2751, is completed for energizing in series the right-hand and left-hand windings of the sequence relay R2750. When thus energized the sequence relay R2750 operates fully to actuate all of the contacts of the relay, thereby to interrupt, at its contacts 2753, a further point in the previously traced circuit for energizing the left-hand winding thereof and to prepare, at its contacts 2752, a circuit, traced thereinafter, for energizing the left-hand winding of the sequence relay R2760. Also, the sequence relay R2750 interrupts, at its contacts 2756, a further point in the previously traced circuit for energizing the magnet FM2605; it prepares, at its contacts 2755, a circuit, traced hereinafter, for energizing the magnet GM2615 of the fourth numerical switch G2610; and it prepares, at its contacts 2754, an alternative circuit traced hereinafter for energizing the winding of the digit spacer relay R1920.

In the primary register 1200 the dial relay R1260 operates to apply ground potential to the conductor C1281 at the beginning of the seventh digit "4" dialed by the calling subscriber and then to remove the application of ground potential from the conductor C1281 shortly following the conclusion of the seventh digit "4"; while the auxiliary line relay R1420 operates to transmit the impulses of the seventh digit "4" over the impulse conductor C1395. When the impulses of the seventh digit "4" are transmitted over the impulse conductor C1395, a circuit, including the wiper 2297 of the finder F2290, the contacts 2286, the conductor C2171, the contacts 2745 and 2755, and the conductor C2632, is completed for energizing the magnet GM2615, whereby the latter magnet operates and restores four times in order to drive the wipers 2611 to 2614, inclusive of the fourth numerical switch G2610 in the counterclockwise direction into engagement with the fourth contacts in the associated contact banks. When the fourth numerical switch G2610 is thus operated the wipers 2612 and 2613 thereof set up the code "4" in the group of WXYZ marking leads 2811 extending to the storage transfer switch U2820 in Fig. 28, for a purpose more fully explained hereinafter. More particularly, the wipers 2612 and 2613 respectively engage the fourth contacts in the associated contact banks respectively terminating the X and Y conductors in the group of WXYZ marking leads 2811 corresponding in code to the digit "4," as previously explained. Also, when the fourth numerical switch G2610 is thus operated the wiper 2614 thereof engages the fourth contact in the associated contact bank terminating the fourth marking conductor in the marking cable 2385, for a purpose more fully explained hereinafter.

The application of ground potential to the conductor C1281 at the beginning of the seventh digit "4" completes a circuit, including the wiper 2295 of the finder F2290, the contacts 2284, the conductor C2217, the contacts 2215, 2742, 2752 and 2762, for energizing the left-hand winding of the sequence relay R2760. When thus energized the sequence relay R2760 operates partially, thereby to close only its contacts 2761 to complete a circuit, including the grounded hold conductor C2772, for short-circuiting the right-hand winding thereof. At the conclusion of the seventh digit "4" ground potential is removed from the conductor C1281, as previously noted, thereby to interrupt the original circuit for energizing the left-hand winding of the sequence relay R2760, whereupon an obvious circuit, including the contacts 2761 and the grounded hold conductor C2772, is completed for energizing in series the right-hand and left-hand windings of the sequence relay R2760. When thus energized the sequence relay R2760 operates fully, thereby to actuate all of the remaining contacts of the relay and, at its contacts 2762, it interrupts a further point in the previously traced circuit for energizing the left-hand winding thereof. Also, the sequence relay R2760, at its contacts 2763, prepares an alternative circuit, traced hereinafter, for energizing the winding of the digit spacer relay R1920.

At this time the primary register 1200 has operated to transmit the first four digits registered therein and to repeat the next three digits received from the calling private subscriber substation TP over the finder R2290 to the register translater 1700, and the seven digits mentioned have been registered in the register translator, all in the manner previously described. The register translator 1700 then operates to translate the first three registered digits constituting the code portion of the called directory number; to transmit the translated digits; to transmit the last four registered digits constituting the numerical portion of the called directory number; and to transmit certain code information, constituting certain items of information which may be recorded, back over the primary register 1200 to the primary selector 600, in a manner more fully explained hereinafter. The primary selector 600 operates in response to the first translated digit transmitted thereto, first to select the group of outgoing trunks extending to exchange 1 zone 84 and then to select an idle outgoing trunk in the group mentioned, such, for example, as the outgoing trunk 506. The remainder of the translated digits, the last four of the registered numerical digits as well as the code information, is transmitted over the selected trunk 506. At this point it is noted that a special charge may be made for the present call from exchange 4 zone 84 to exchange 1 zone 84, in which case the outgoing trunk 506 will include a toll ticket repeater, of the character of the toll ticket repeater 800, wherein the code information will be utilized in order to cause a toll ticket to be prepared, in a manner more fully explained hereinafter. On the other hand, no special charge may be made for the present call from exchange 4 zone 84 to exchange 1 zone 84, in which case the outgoing trunk 506 will include an ordinary repeater of well known type and code information will not be utilized, and no toll ticket will be prepared. The various digits transmitted over the outgoing trunk 506 effects operation of the automatic switching apparatus in exchange 1 zone 84, whereby a connection is completed between the calling private subscriber substation TP in exchange 4 zone 84 and the particular called subscriber substation in exchange 1 zone 84.

The release of this established connection is under the control of the subscriber at the calling private subscriber substation TP in exchange 4 zone 84 or under control of the called subscriber and is effected when either subscriber replaces the receiver of the telephone instrument upon its associated switchhook. The detailed operation of the apparatus incident to the release of an established connection is described more fully hereinafter.

In view of the foregoing explanation of the mode of operation of the primary register 1200, it will be understood that in order to extend a call from any calling subscriber substation in exchange 4 zone 84 to any called subscriber substation in exchange 1 zone 84, it is necessary to translate the first three digits and to utilize a register translator in setting up the connection; on the other hand, in order to extend a call from any calling subscriber substation in exchange 4 zone 84 to any called subscriber substation in exchanges 5 and 7 zone 84, it is not necessary to translate the first three digits or to utilize a register translator in setting up the connection, as the connection may be set up directly under the control of the calling device at the calling subscriber substation.

Also, at this point it is noted that the operation of the primary register 1200 to set up a call from exchange 4 zone 84 to exchanges 5 and 7 zone 84, is substantially identical to that previously described in connection with the setting up of a local call in exchange 4 zone 84; in no case will a toll ticket repeater be required or will a special charge be made for calls extended from exchange 4 zone 84 to exchanges 5 and 7 zone 84.

In view of the foregoing explanation of the mode of operation of the primary selector 600, the primary register 1200 and the register translator 1700 to extend a call which requires translation from the calling ordinary private subscriber substation TP to another exchange in zone 84, it will be understood that this apparatus is operative in a substantially identical manner to extend a call which requires translation from any calling one of the party subscriber substations TS1, TS2, TS3 and TS4 to another exchange in zone 84. Also, the primary selector 441, the primary register 1200, and the register translator 1700 are operative in a substantially identical manner to extend a call which requires translation from the calling extended service private subscriber substation TX to another exchange in zone 84. However, the primary selector 441, the primary register 1200, and the register translator 1700 are operative to effect the interception of a call which is initiated at the denied toll service private subscriber substation TD and which requires translation, in a manner more fully explained hereinafter.

Finally, the primary selector 600, the primary register 1200, and the register translator 1700 are operative in a manner substantially identical to that explained in conjunction with local calls to extend a call which requires no translation from the calling ordinary private subscriber substation TP or from any calling one of the party subscriber substations TS1, TS2, TS3 and TS4 in exchange 4 zone 84 to another exchange in zone 84; while the primary selector 441, the primary register 1200, and the register translator 1700 are operative in a manner substantially identical to that explained in conjunction with local calls to extend a call which requires no translation from the calling extended service private subscriber substation TX or from the denied toll service private subscriber substation TD in exchange 4 zone 84 to another exchange in zone 84.

*Toll calls from exchange 4 zone 84 exchange 3 zone 27*

Assuming that the call extending from the calling private subscriber substation TP to the primary selector 600 and the primary register 1200 is to be extended to a called subscriber substation in exchange 3 zone 27, the subscriber at the calling private subscriber substation TP proceeds to dial the directory number of the called subscriber substation. The directory number of the called subscriber substation comprises a code portion, including the digits 273, identifying the called zone and exchange, and a numerical portion, including the four digits, such, from example, as the digits 1234, identifying the line terminal of the subscriber line extending to the called subscriber substation.

Accordingly, the subscriber at substation TP proceeds to dial the first digit "2," thereby to cause the digit mentioned to be registered in the first code switch A1500 in the primary register 1200 and to cause the wiper set of the switch mechanism 700 in the primary selector 600 to be operated to its second vertical level, in the manner previously described. In the primary register 1200, shortly following the conclusion of the first digit "2," the dial relay R1260 restores in order to effect the restoration of the dial slave relay R1310, whereupon the dial slave relay R1310, at its contacts 1311, completes a circuit substantially identical to that previously traced for effecting the operation of the translate relay R1270. Accordingly, the operation of the translate relay R1270, as a result of the registration of the first digit "2" in the first code switch A1500, determines immediately that it is necessary to associate an idle register translator with the primary register 1200 in order to translate the digits constituting the code portion of the called subscriber's directory number, in order to extend the desired connection.

The subscriber at the calling private subscriber substation TP then dials the second digit "7," thereby to cause the digit mentioned to be registered in the second code switch B1510 in the primary register 1200. Shortly following the conclusion of the second digit "7" the dial relay R1260 restores in order to effect the restoration of the dial slave relay R1310, whereupon the wipers of the sequence switch S1630 are driven into engagement with the second contacts in the associated contact banks. Attention is directed to the fact that shortly following the conclusion of the first digit "2," and when the dial slave relay R1310 restores, the sequence switch S1630 was actuated to advance its wipers from the home contacts of its associated contact banks into engagement with the first contacts in the associated contact bank. When the wipers of the sequence switch S1630 are driven into engagement with the second contacts in the associated contact banks, shortly following the conclusion of the second digit "7," a circuit is completed by way of the wiper 1634 thereof and the engaged second contact, for initiating the operation of the register translator allotter 1600, whereby an idle register translator, such, for example, as the register translator 1700, is connected to the primary register 1200, in the manner previously explained.

The subscriber at the calling private subscriber substation TP then successively dials the third digit "3," The fourth digit "1," the fifth digit "2," the sixth digit "3," and the seventh digit "4;" whereby the third digit "3" and the fourth digit "1" are registered in the third code switch C1520 and the first numerical switch D1620, respectively, in the primary register 1200; the fifth digit "2," the sixth digit "3" and the seventh digit "4" being repeated directly to the second numerical switch F2520, the third numerical switch F2600 and the fourth numerical switch G2610 in the register translator 1700, in the manner previously explained. Also, the primary register 1200 transmits the complements of the first digit "2," the second digit "7," the third digit "3," and the fourth digit "1" registered therein to the first code switch A2400, the second code switch B2410, the third code switch C2500, and the first numerical switch D2510 in the register translator 1700, in the manner previously explained. Also, in the register translator 1700 the wiper 2332 of the wiper set of the composite code switch P2330 is selected corresponding to the first digit "2" registered in the first code switch A2400, and the wiper set of the composite code switch P2330 occupies its fourth vertical position and its eighth rotary position, respectively, corresponding to the second digit "7" registered in the second code switch B2410 and to the third digit "3" registered in the third code switch C2500, as previously explained.

Considering now the operation of the register translator 1700 in greater detail, it is again pointed out that the previously traced circuit for energizing the upper and lower windings of the switch pulse relay R1830 is completed in response to the operation of the sequence relay R2720 at the conclusion of the registration of the third digit "3" in the third code switch C2500, whereupon the switch pulse relay R1830 operates intermittently, in the manner previously explained. Also, at this time ground potential is applied, by way of the wiper 2405 of the first code switch A2400 and the engaged ninth contact in the associated contact bank, to the corresponding wiper 2332 of the wiper set in the composite code switch P2330; while the wiper 2332 engages the eighth contact in the fourth level in the associated contact bank, which contact is connected to a predetermined contact in the contact bank associated with the wiper 2318 of the wiper set in the rate and route switch R2310 by way of the jumper 2351*a*. More specifically, for the purpose of illustration, the eighth contact in the fourth level in the contact bank associated with the wiper 2332 is connected to the sixth contact in the fifth level in the contact bank associated with the wiper 2318 of the wiper set in the rate and route switch R2310. The sixth contact in the fifth level in the contact bank associated with the wiper 2318 corresponds to a routing for the present call via the exchange 2 zone 27 to exchange 3 zone 27, which route comprises three routing digits. The particular three routing digits required are designated in conformity with the trunking plan utilized, which is assumed to be via the route specified above. More specifically, the routing digits required in order to route the call via the route specified comprises the three digits 223. Hence, the first, second and third digits "2," "7" and "3" dialed by the calling subscriber at substation TP must be translated into the three digits "2," "2" and "3," respectively, to be transmitted in order to produce the routing digits corresponding to the route specified in conformity with the established trunking plan.

Accordingly, the rate and route switch R2310 is operated to its fifth vertical position and sixth rotary position in order to cause the wipers 2311 to 2318, inclusive, of the wiper set to seize the respective sixth contact in the fifth level in the associated contact banks. In order to accomplish this end the contacts in each level of the contact bank associated with the wiper 2318 of the rate and route switch R2310 are connected by way of individual resistors, each having a high resistance, to the numerically corresponding control contact in the vertical control contact bank associated with the vertical control wiper 2319. For example, each contact in the first level of the contact bank associated with the wiper 2318 is connected by way of an individual resistor 2396 to the first contact in the vertical control contact bank associated with the vertical control wiper 2319.

As previously explained, when the sequence relay R2720 operates the switch pulse relay R1830 is set into operation. Each time the switch pulse relay R1830 operates and then restores it completes and then interrupts, at its contacts 1831, a circuit, including the contacts 1931 and the conductor C2362 extending to Fig. 23A, for energizing the vertical magnet RM2321, thereby to cause the latter magnet to operate and restore in order to drive the wiper set of the rate and route switch R2310 one step in the vertical direction away from its normal vertical position. As soon as the wiper set is raised one step in the vertical direction, the vertical off-normal springs RS2324 are operated, for a purpose more fully explained hereinafter. The wiper set of the rate and route switch R2310 is driven step by step in the vertical direction and when the vertical control wiper 2319 engages the fifth contact in the associated vertical control contact bank, resistance ground potential is applied thereto by way of the previously traced path, including the jumper 2351*a* from the grounded wiper 2405 of the first code switch A2400. This application of ground potential to the vertical control wiper 2319 completes a circuit for energizing the upper winding of the transfer relay R1930 in series with the vertical magnet RM2321. This circuit extends from the grounded vertical control wiper 2319 by way of the conductor C2374 extending to Fig. 19, the upper winding of the transfer relay R1930, the conductor C2362 extending to Fig. 23A, and the winding of the vertical magnet RM2321, to battery. At this point it is noted that the above-traced circuit for energizing the upper winding of the transfer relay R1930 is completed when the switch pulse relay R1830 restores following the fifth impulse, due to the fact that ground potential is applied by way of the contacts 1831 and 1931 to the terminal of the upper winding of the transfer relay R1930 and effectively short-circuits the upper winding thereof prior to the restoration of the switch pulse relay R1830.

When thus energized the transfer relay R1930 operates to interrupt, at its contacts 1931, a further point in the previously traced original circuit for energizing the vertical magnet RM2321 of the rate and route switch R2310, and to prepare, at its contacts 1933, a circuit, traced hereinafter, for energizing the rotary magnet RM2320 of the rate and route switch R2310. Also, the transfer relay R1930 completes, at its contacts 1934, a holding circuit, including the conductor C2361 extending to Fig. 23 and ground potential applied thereto by way of the contacts 2325 of the vertical off-normal springs RS2324 for energizing the lower winding of the relay R1930. Attention is directed to the fact that ground potential is applied to the conductor C2361 as soon as the wiper set of the rate and route switch R2310 has been advanced one step in the vertical direction, and also it is to be noted that the contacts 1934 of the transfer relay R1930 are closed to complete the holding circuit for its lower winding before the circuit for energizing the upper winding is opened.

Figure 23A:
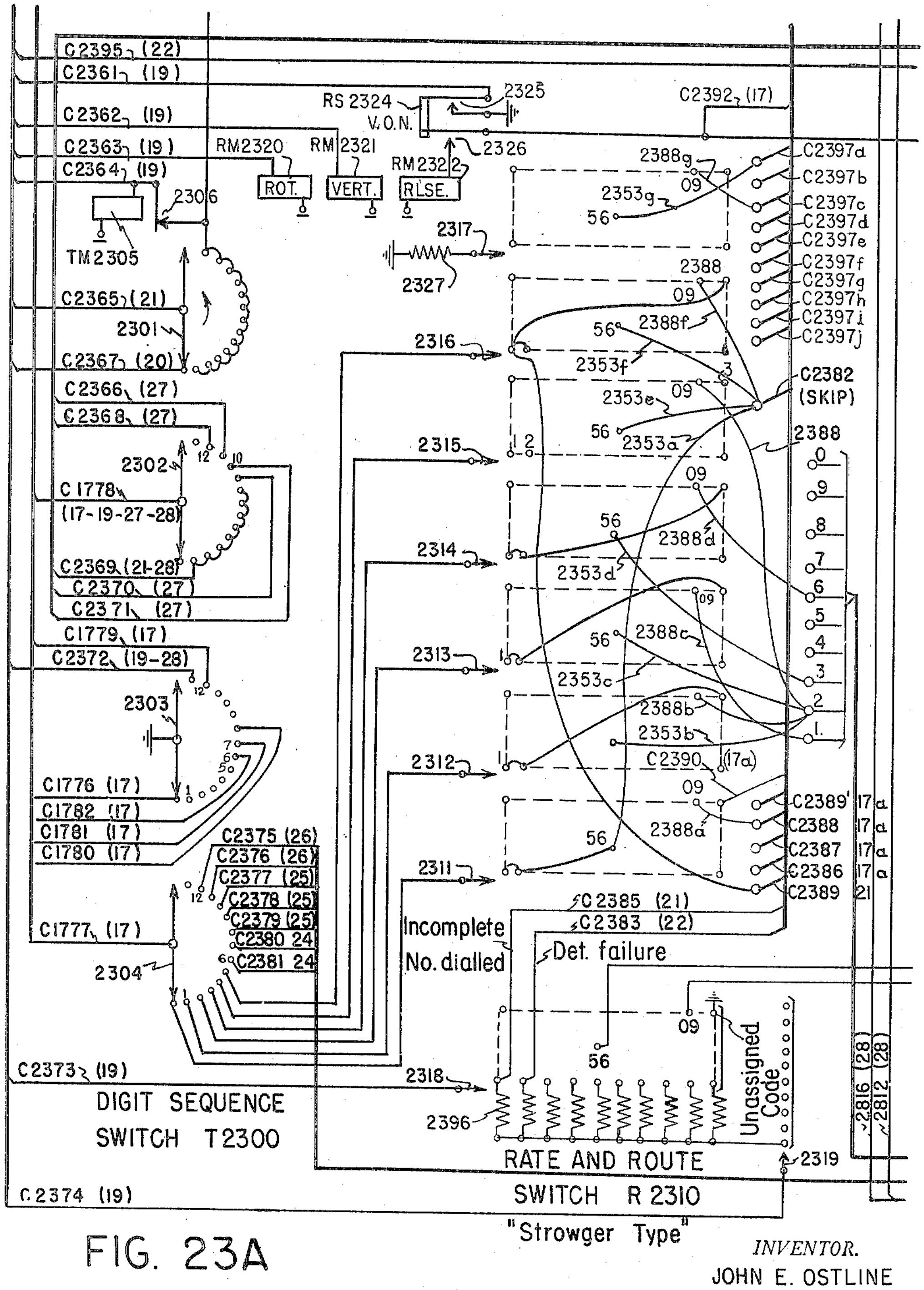
Figure 24:
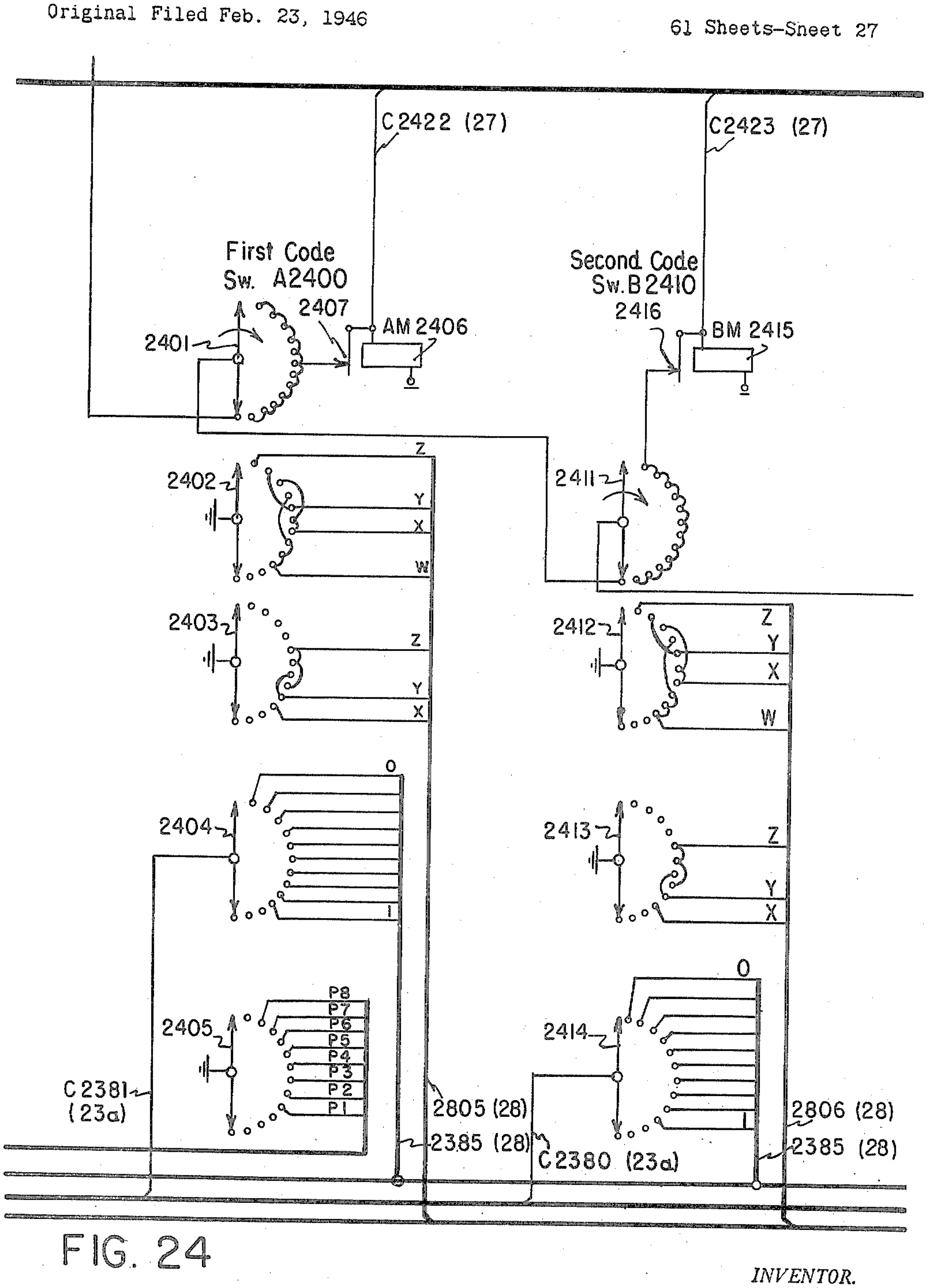

Each time the switch pulse relay R1830 operates and then restores after the operation of the transfer relay R1930, at its contacts 1831 it completes and then interrupts the previously mentioned circuit, including the contacts 1933 and the conductor C2363 extending to Fig. 23A, for energizing the rotary magnet RM2320, thereby to cause the latter magnet to operate and restore in order to drive the wiper set of the rate and route switch R2310 one step in the rotary direction away from its normal rotary position.

The wiper set of the rate and route switch R2310 is driven step by step in the rotary direction until the wiper 2318 thereof engages the sixth contact in the fifth level in the associated contact bank, whereupon direct ground potential is applied thereto by way of the jumper 2351*a* from the grounded wiper 2405 of the first code switch A2400. This application of ground potential to the wiper 2318 completes a circuit for energizing the upper winding of the stop relay R1940 in series with the rotary magnet RM2320. This circuit extends from the grounded wiper 2318 by way of the conductor C2373 extending to Fig. 19, the contacts 1941, the upper winding of relay R1940, the conductor C2363 extending to Fig. 23A, and the winding of the rotary magnet RM2320, to battery. It is noted that the above-traced circuit for energizing the upper winding of the stop relay R1940 is completed when the switch pulse relay R1830 restores following the sixth impulse, since ground potential applied by way of the contacts 1831 and 1933 effectively short-circuits the upper winding of the stop relay R1940 until the switch pulse relay R1830 restores to normal after the transmission of the sixth impulse. Further, it is noted that the stop relay R1940 is of the marginal type and will operate only when direct ground potential is encountered by the wiper 2318 of the rate and route switch R2310. When thus energized the stop relay R1940 operates sufficiently to close its contacts 1942, thereby to complete an energizing circuit for its lower winding by way of the grounded conductor C2361. When the energizing circuit for the lower winding of the stop relay R1940 is thus completed, the relay fully operates to actuate the remaining contacts thereof, whereupon, at its contacts 1941, the initial energizing circuit for the upper winding is interrupted and, at its contacts 1943, a circuit is completed by way of the winding of the switch cut off relay R1820 and the resistor 1823 for energizing the latter relay. The switch cutoff relay R1820 operates over the above-traced circuit and, at its contacts 1822, interrupts the previously traced circuit for energizing the upper winding of the switch pulse relay R1830, thereby to arrest further operation of the wiper set of the rate and route switch R2310 in the rotary direction. Also, the switch cutoff relay R1820 completes, at its contacts 1821, an obvious circuit for energizing the winding of the digit pulse start relay R1710, thereby to cause the latter relay to operate.

Upon operating, the digit pulse start relay R1710 interrupts, at its contacts 1713, the previously traced circuit for energizing the upper winding of the special service relay R2040 in the register translator 1700, in the event a direct ground potential has been applied by way of the conductor C1872 and the cam springs S718 of the primary selector 600. However, in the call being described a resistance ground potential has been applied to the conductor C1872 and, consequently, the special service relay has not been operated and is in its restored position at this time. Also, the digit pulse start relay B1710 prepares, at its contacts 1714, a point in a circuit traced hereinafter for energizing the upper winding of the detector cutoff relay R1950. This circuit, however, is not completed in the connection being described, as will be more fully explained hereinafter. Further, the digit pulse start relay R1710 completes, at its contacts 1715, an obvious circuit, including the contacts 1842, for energizing the upper winding of the digit pulse relay R1840 and an obvious multiple path for short-circuiting the condenser 1844 through the lower winding of the digit pulse relay R1840, whereupon the latter relay operates. Upon operating, the digit pulse relay R1840 interrupts, at its contacts 1842, the previously traced circuit for energizing the upper winding thereof and the circuit path for short-circuiting the condenser 1844 through the lower winding thereof, whereupon the condenser 1844 is charged through the upper and lower windings of the digit pulse relay R1840 in series in order to cause the latter relay to restore shortly thereafter. Hence, the digit pulse relay R1840 operates and restores intermittently at a predetermined rate, depending upon the characteristic of the associated condenser 1844.

As a further result of the operation of the digit pulse start relay R1710, at its contacts 1716 it completes a path, including the conductor C1777 extending to Fig. 23A and the wiper 2304 of the digit sequence switch T2300 and the engaged home contact in the associated contact bank, for applying ground potential to the wiper 2311 of the wiper set of the rate and route switch R2310, for a purpose more fully explained hereinafter.

Further, the digit pulse start relay F1710 prepares, at its contacts 1717, a circuit, traced hereinafter, for energizing the winding of the digit spacer relay R1920; and it completes, at its contacts 1718, an alternative circuit for energizing the winding of the line relay R730 in the primary selector 600, thereby to cause the latter relay to reoperate in order to effect the reoperation of the hold relay R740, in the manner previously explained. The above-mentioned circuit for energizing the winding of the line relay R730 in the primary selector 600 extends from ground at the contacts 1718 and the conductor C2236 by way of the two multiple branches to the conductor C2235 and then by way of the contacts 2287, the wiper 2298 of the finder F2290, the conductor C1283 extending to Fig. 12, the contacts 1272, the conductor C642 extending to Fig. 6, the wiper 612 of the finder F610, the contacts 623 and 773, and the windings of the line relay R730 to battery. In the above-traced circuit one of the multiple branches between the conductor C2236 and the conductor C2235 includes the contacts 1843 and the contacts 2183 of the busy key K2180, while the other multiple branch between the conductors C2236 and C2235 includes the conductor C2236 extending to Fig. 28, the wiper 2833 of the sender switch S2830 and the engaged home contact in the associated contact bank, and the conductor C2235 extending to Fig. 22. Further, the digit pulse start relay R1710 prepares, at its contacts 1719, a circuit, traced hereinafter, for energizing the winding of the detector start relay R1760.

Considering now the jumper arrangement of the contacts in the contact banks of the rate and route switch R2310, it is noted that the sixth contact in the fifth level of the contact banks associated with the wipers 2312 and 2313 are respectively connected by way of the jumpers 2353*b* and 2353*c* to the second marking conductor in the marking cable 2385. The corresponding contact in the contact bank associated with the wiper 2311 is connected by way of the jumper 2353*a* to the skip conductor C2382, thereby to complete a circuit, traced hereinafter, for energizing the magnet TM2305 of the digit sequence switch T2300. The corresponding contact in the contact bank associated with the wiper 2314 is connected by way of the jumper 2353*d* to the third marking conductor in the marking cable 2385; while the corresponding contacts in the contact banks associated with the wipers 2315 and 2316 are connected by way of the jumpers 2353*e* and 2353*f*, respectively, to the skip conductor C2382, for a purpose more fully explained hereinafter. Finally, the corresponding contact in the contact bank associated with the wiper 2317 is connected by way of the jumper 2353*g* to the conductor C2397*a*, thereby to prepare a circuit, traced hereinafter, for energizing the lower winding of the rate relay R1740'.

The operations of the rate and route switch R2310 described above in response to the operation of the code switch P2330 take place in an extremely short interval of time at the conclusion of the third digit "3" registered in the third code switch C2500. It should also be understood that during the interval of time the digits registered in the primary register 1200 are being transferred to the register translator 1700, the subscriber at the calling substation TP continues to dial the fourth digit "1," the fifth digit "2," the sixth digit "3" and the seventh digit "4" in order to cause the digits mentioned to be registered in the register translator 1700, in the manner previously explained.

Continuing now with the operation of the register translator 1700, the operation of the digit pulse start relay R1710 to apply ground potential by way of the previously traced path to the wiper 2311 of the rate and route switch R2310, is effected to complete the previously mentioned circuit for energizing the magnet TM2305 of the sequence switch T2300. The last-mentioned circuit extends from ground potential applied to the wiper 2304 of the digit sequence switch T2300 and the engaged home contact in the associated contact bank, the wiper 2311, the engaged sixth contact in the fifth level of the associated contact bank, the jumper 2353*a* connected to the skip conductor C2882, the contacts 2306, and the winding of the magnet TM2305, to battery. When thus energized the magnet TM2305 operates, thereby to condition the wipers 2301 to 2304, inclusive, of the digit sequence switch T2300 to be driven one step in the counterclockwise direction and to interrupt, at the contacts 2306, the previously traced circuit for energizing the magnet TM2305. The latter magnet then restores in order to drive the wipers noted one step in the counterclockwise direction away from their home positions. When the wiper 2304 disengages the home contacts in the associated contact bank, the above traced circuit for energizing the magnet TM2305 is interrupted.

Figure 17:
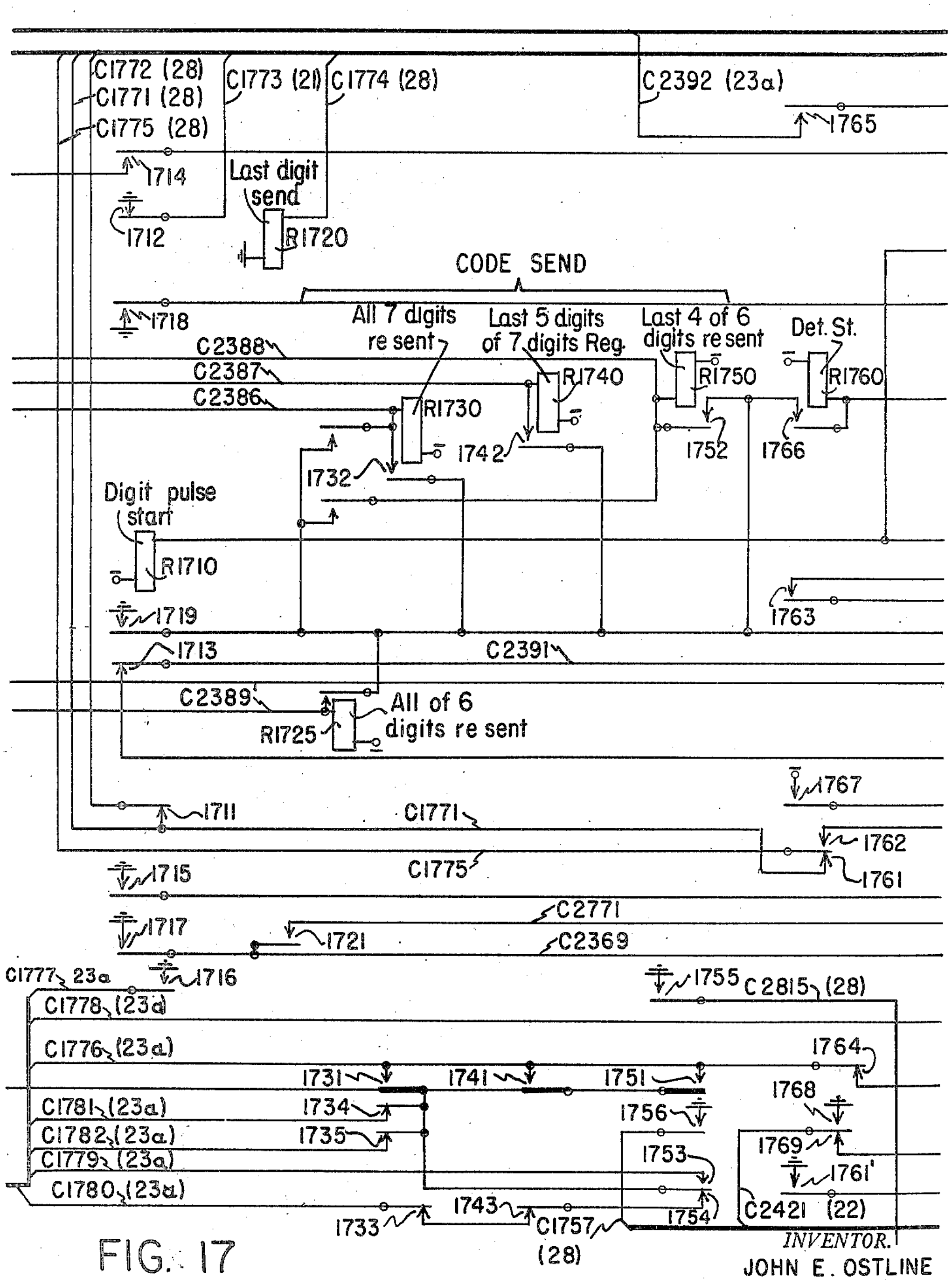

When the wiper 2302 of the digit sequence switch T2300 engages the first contact in the associated contact bank, a circuit is completed for energizing the winding of the digit spacer relay R1920, which may be traced from ground by way of the contacts 1717, the conductor C2369 extending to Fig. 23A, the wiper 2302 of the digit sequence switch T2300 and the engaged first contact in the associated contact bank, the conductor C1778 extending to Fig. 17, the contacts 1914 and 2213, the winding of relay R1920, and the resistor 1925, to battery. At this point it is noted that the above-traced circuit for energizing the winding of the digit spacer relay R1920 must be initially completed when the digit pulse relay R1840 occupies its restored position, in view of the fact that a path is completed by way of the contacts 1841 and 1922 for short-circuiting the winding of the digit spacer relay R1920 while the digit pulse relay R1840 occupies its operated position.

When thus operated the digit spacer relay R1920 interrupts, at its contacts 1922, a point in the previously mentioned circuit for short-circuiting the winding thereof and it completes, at its contacts 1921, a circuit including the contacts 1911 and conductor C2364 extending to Fig. 23A for energizing the magnet TM 2305, thereby to cause the latter magnet to operate and condition the wipers noted of the digit sequence switch T2300 to be driven an additional step in the counterclockwise direction. Also, the digit spacer relay R1920 prepares, at its contacts 1923, a point in a circuit for energizing the magnet SM2835 of the sender switch S2830. This circuit is completed at the contacts 1841 upon the next operation of the digit pulse relay R1840, and extends, when completed, from ground by way of the contacts 1717, the conductor C2369 extending to Fig. 23A, the wiper 2302 of the digit sequence switch T2300 and the engaged first contact in the associated contact bank, the conductor C1778 extending to Fig. 17, the contacts 1914, 2213, 1841 and 1923, the conductor C2535 extending to Fig. 22, and the winding of the magnet SM2835, to battery. As a further result of the operation of the digit spacer relay R1920, at its contacts 1924, it interrupts a point in the self-interrupting circuit for the magnet SM2835, for a purpose more fully explained hereinafter. When the magnet SM2835 is energized over the above-mentioned circuit, it operates to condition the wipers 2831 to 2834, inclusive, of the sender switch S2830 to be driven one step in the counterclockwise direction. When the digit pulse relay R1840 again restores, it interrupts, at its contacts 1841, the above-traced circuit for energizing the magnet SM2835, thereby to cause the latter magnet to restore and drive the wipers of the sender switch S2830 one step in the counterclockwise direction. Thus, each time the digit pulse relay R1840 operates and restores it causes the wipers noted of the sender switch S2830 to be driven one step in the counterclockwise direction.

Also, upon operating, the digit pulse relay R1840 interrupts, at its contacts 1843, the first branch in the previously traced circuit for energizing the winding of the line relay R730 in the primary selector 600. However, the circuit for the winding of the line relay R730 is not interrupted at this time due to the fact that the second branch circuit, including the wiper 2833 of the sender switch S2830 and the multiply connected home and first contacts in the associated contact bank, is completed. Hence, when the wiper 2833 of the sender switch S2830 is driven two steps in the counterclockwise direction under control of the digit pulse relay R1840, it disengages the first contact in the associated contact bank, thereby to interrupt the above-mentioned second branch circuit for energizing the winding of the line relay R730 in the primary selector 600. Accordingly, after the wipers of the sender switch S2830 engage the second contacts in the associated contact banks, further operation of the digit pulse relay R1840 is effected intermittently to interrupt, at the contacts 1843, the first branch circuit for energizing the line relay R730, whereby the line relay R730 follows subsequent impulsing of the digit pulse relay R1840. More particularly, the line relay R730 in the primary selector 600, operates intermittently in order to cause the wiper set of the switch mechanism 700 to be driven step by step in the vertical direction in the manner previously explained.

The operation of the digit pulse relay R1840 continues until the wiper 2834 of the sender switch S2830 engages a contact in the associated contact bank which is marked with ground potential applied thereto by way of the wiper 2312 of the rate and route switch R2310 and the jumper **2353*b*. When the wiper 2834 engages the marked contact in its associated contact bank, a circuit is completed which extends from ground by way of the contacts 1716, the conductor C1777 extending to Fig. 23A, the wiper 2304 and the engaged first contact in its associated contact bank, the wiper 2312 of the rate and route switch R2310 and the engaged sixth contact in the fifth level of its associated contact bank, the jumper 2353*b*, the second marking conductor in the marking cable 2385 extending to Fig. 28, the wiper 2834 of the sender switch S2830 and the engaged fourth contact in the associated contact bank, the conductor C2233 extending to Fig. 19, and the winding of the digit stop relay R1910, to battery. When thus energized the digit stop relay R1910 operates to interrupt, at the contacts 1911, the previously mentioned energizing circuit for the magnet TM2305, whereupon the latter magnet restores in order to drive the wipers of the digit sequence switch T2300 into engagement with the second contacts in the associated contact banks. Also, at the contacts 1912, the digit stop relay H1910 completes a holding circuit for itself, which includes the conductor C2234 extending to Fig. 28, the wiper 2831 of the sender switch S2830 and the engaged fourth contact in its associated contact bank, the conductor C2869 extending to Fig. 19, and ground at the contacts 1719. Further, the digit stop relay R1910 completes, at its contacts 1913, an obvious path in parallel with the circuit including the contacts 1843 controlled by the digit pulse relay R1840, and consequently a holding circuit, substantially identical to that previously traced, for energizing the winding of the line relay R730 in the primary selector 600. Hence, further operation of the line relay R730 in the primary selector 600 is arrested at this time, thereby positively to arrest further movement of the wiper set of the switch mechanism 700 in the vertical direction. Accordingly, two impulses have been transmitted to the line relay R730 and the wiper set of the switch mechanism 700 is therefore arrested in the second vertical position corresponding to the first routing digit "2." Also, the digit stop relay R1910 interrupts, at its contacts 1914, the previously traced circuit for energizing the winding of the digit spacer relay R1920, thereby to cause the latter relay to restore. Upon restoring, the digit spacer relay R1920 completes, at its contacts 1924, an alternative circuit for energizing the magnet SM2835. The latter circuit extends from ground by way of the fuse alarm 2840, the wiper 2832 and the engaged fourth contact of its associated contact bank, the conductor C2532 extending to Fig. 19, the contacts 1924, the conductor C2537 extending to Fig. 22, the contacts 2836, and the winding of the magnet SM2835, to battery. Accordingly, the magnet SM2835 operates intermittently under control of the self-interrupting contacts 2836 in order to drive the wipers of the sender switch S2830 step by step in the counterclockwise direction until the wiper 2832 thereof disengages the twelfth contact in its associated contact bank and engages the thirteenth contact thereof, whereupon the above-traced self-interrupting circuit for the magnet SM2835 is interrupted and an alternative circuit is completed for energizing the winding of the digit spacer relay R1920. The last-mentioned circuit extends from ground by way of the fuse alarm 2840, the wiper 2832 and the engaged thirteenth contact of its associated contact bank, the conductor C2533 extending to Fig. 19, the contacts 1917, the winding of the relay R1920, and the resistor 1925**, to battery.

Figure 19:
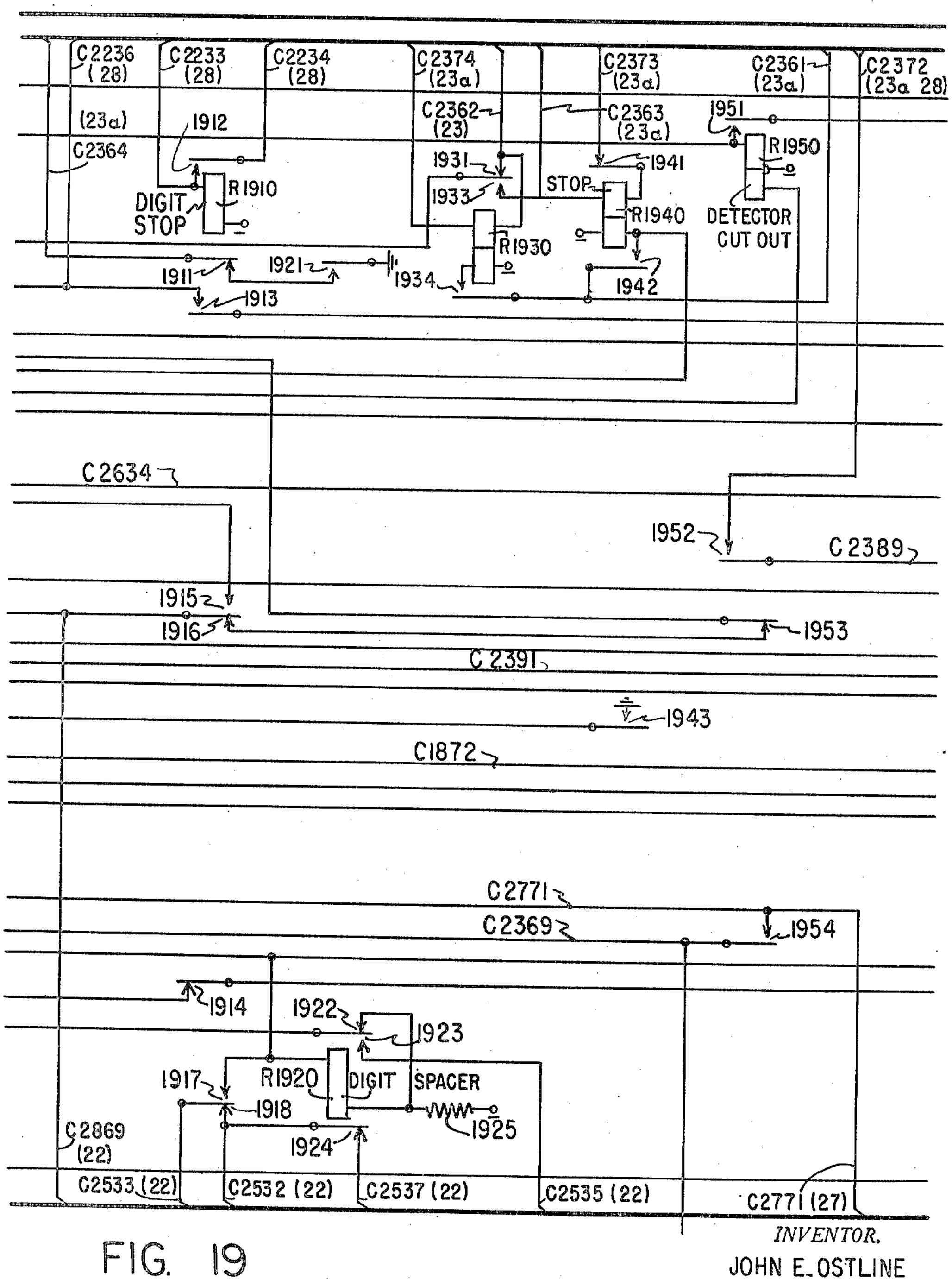

When thus energized the digit spacer relay R1920 operates, thereby to recomplete, at the contacts 1923, an alternative circuit for energizing the magnet SM2835 of the sender switch S2830, which extends from ground by way of the fuse alarm 2840, the wiper 2832 and the engaged thirteenth contact in the associated contact bank, the conductor C2533 extending to Fig. 19, the contacts 1917 and 1841, assuming that the digit pulse relay S1840 is operated at this time, the contacts 1923, the conductor C2535 extending to Fig. 22, and the winding of magnet SM2835, to battery. When the magnet SM2835 is energized it operates to condition the wipers noted of the sender switch S2830 to be driven an additional step in the counterclockwise direction. Accordingly, at this time the digit pulse relay R1840 completes, at the contacts 1841, the above-traced circuit for intermittently operating the magnet SM2835, thereby to cause the magnet to drive the wipers step by step in the counterclockwise direction until the wiper 2832 thereof disengages the seventeenth contact of its associated contact bank. When the wiper 2832 disengages the seventeenth contact of its associated contact bank, it interrupts the circuit for energizing the winding of the digit spacer relay R1920 and the circuit for intermittently energizing the magnet SM2835. The digit spacer relay R1920 restores and, at its contacts 1924, recompletes the previously traced circuit including the self-interrupting contacts 2836 for intermittently energizing the magnet SM2835, whereupon the wipers of the sender switch S2830 are driven step by step in the counterclockwise direction until the wiper 2832 thereof disengages the twenty-fourth contact in the associated contact bank and reengages the home contact therein, thereby to interrupt the above-traced circuit for intermittently operating the magnet SM2835.

Further, upon operating, the digit stop relay R1910, at its contacts 1915, completes an obvious circuit, including the contacts 1719 for energizing the winding of the special service cutoff relay R1810, thereby to cause the latter relay to operate. Upon operating, the special service cutoff relay R1810 completes, at its contacts 1813, an obvious holding circuit for itself and, at its contacts 1811, it interrupts a further point in the previously traced circuit for the upper winding of the special service relay R2040. Also, the relay R1810, at its contacts 1812, prepares a point in the circuit traced hereinafter for energizing the detector start relay R1760.

When the wipers of the sender switch S2830 are returned to their home positions, the wiper 2831, upon disengaging the twenty-fourth contact in the associated contact bank, interrupts the previously traced holding circuit for energizing the winding of the digit stop relay R1910, whereupon the latter relay now restores to normal in order to complete the cycle of operation of the sender switch S2830. It is pointed out that the wipers of the sender switch S2830 are first driven step by step in the counterclockwise direction away from their home positions at a relatively low rate of speed, thereby to insure that the impulses transmitted to the line relay R730 in the primary selector 600 are at the proper impulsing rate to control the selector 600. Upon the operation of the digit stop relay R1910 the wipers of the sender switch S2830 are driven at a relatively high rate of speed into engagement with the thirteenth contacts in the associated contact banks, and thereafter the wipers are driven at a relatively low rate of speed until they engage the eighteenth contacts in the associated contact banks, thereby to insure a proper time interval or space between successive digits transmitted to the primary selector 600. Finally, the wipers of the sender switch S2830 are driven at a relatively high rate of speed, after they engage the eighteenth contacts in the associated contact banks, back to their normal home positions.

Accordingly, at this time the first routing digit "2" registered in the rate and route switch R2310 has been transmitted by the sender switch S2830 to the primary selector 600; the wipers of the sender switch S2830 then return to their home position in readiness to transmit the second routing digit "2"; and the wipers of the digit sequence switch T2300 engage the second contacts in the associated contact banks, thereby to render the control of the sender switch S2830 in accordance with the second routing digit "2" registered in the rate and route switch R2310. Also upon the restoration of the digit stop relay R1910, at its contacts 1914, it recompletes the previously traced circuit for energizing the winding of the digit spacer relay R1920, thereby to cause the latter relay to reoperate whereupon the second routing digit "2" registered in the rate and route switch R2310 is transmitted by the sender switch S2830, in the manner explained above.

Also, upon restoring, the digit stop relay R1910, interrupts, at its contacts 1913, the previously mentioned path between the conductors C2236 and C2235 shunting the contacts 1843 of the digit pulse relay R1840 and, at its contacts 1915, in interrupts the previously traced initial energizing circuit for the special service cutoff relay R1810. However, the latter relay remains in its operated position over a locking circuit including its contacts 1813. Further, the digit stop relay R1910, at its contacts 1916, completes a circuit from ground by way of the contacts 1719, 1916, 1953 and 1812, and the winding of the detector start relay R1760, to battery. When thus energized the detector start relay R1760 operates to complete, at its contacts 1766, an obvious holding circuit including the contacts 1719 for maintaining the relay in its operated position.

In view of the foregoing explanation of the cycle of operation of the sender switch S2830 to transmit the first routing digit "2" to the primary selector 600, it will be readily understood that the second routing digit "2" and the third routing digit "3" will be subsequently transmitted to the primary selector 600 in an identical manner, the second routing digit "2" being registered in the contact bank associated with the wiper 2313 of the rate and route switch R2310 by way of the jumper 2353*c* and the third routing digit "3" being registered in the contact bank associated with the wiper 2314 of the switch R2310 by way of the jumper 2353*d*.

At this point it is noted that the rate and route switch R2310 is adapted to register as many as five routing digits, the actual number of routing digits required for a given call being determined by the trunking plan of the system. In the present example, three routing digits registered in the rate and route switch R2310 are required in conjunction with the numerical digits registered in the first numerical switch D2510, the second numerical switch E2520, the third numerical switch F2600 and the fourth numerical switch G2610, in order to route the call to the desired called subscriber substation. In the event all five routing digits adapted to be registered in the rate and route switch R2310 are not utilized, the contacts in the associated contact banks engaged by corresponding ones of the wipers 2312 to 2316, inclusive, which are not connected by way of the jumper wires to the contacts terminating the ten conductors of the marking cable 2385, are connected by way of the corresponding jumper wires to the skip conductor C2382. Accordingly, in the present example the sixth contact in the fifth level of the contact banks respectively associated with the wipers 2315 and 2316 are connected respectively by way of the jumpers 2353*e* and 2353*f* to the skip conductor C2382. Hence, at the conclusion of the transmission of the third routing digit "3," when the wiper 2304 of the digit sequence switch T2300 engages the fourth contact in the associated contact bank, an alternative circuit is completed for energizing the magnet TM2305. This circuit extends from ground by way of the contacts 1716, the conductor C1777 extending to Fig. 23A, the wiper 2304 and the engaged fourth contact in its associated contact bank, the wiper 2315 and the engaged sixth contact in the fifth level of its associated contact bank, the jumper 2353*e*, the skip conductor C2382, the contacts 2306 and the winding of the magnet TM2305, to battery. When thus energized the magnet TM2305 operates and immediately interrupts, at its contacts 2306, the initial energizing circuit for itself, thereby to drive the wipers of the digit sequence switch T2300 an additional step in the counterclockwise direction into engagement with the fifth contacts in the associated contact banks. When the wiper 2304 engages the fifth contact in the associated contact bank it immediately re-completes the above-traced alternative circuit for energizing the magnet TM2305 over a circuit which now includes the wiper 2316 and the engaged sixth contact in the fifth level of its associated contact bank and the jumper 2353*f*. Accordingly, the magnet TM2305 is again operated to drive the wipers of the digit sequence switch T2300 an additional step in the counterclockwise direction and into engagement with the sixth contact in the associated contact banks.

It will be recalled that the called office code digits 273 have been registered respectively in the code switches A2400, B2410 and C2500 and, as a result thereof, the rate and route switch R2310, in conjunction with the digit sequence switch T2300, has translated the code digits mentioned into the routing digits 223, respectively. In the present example, it is only necessary, in order to complete the connection to the desired called subscriber, to transmit the abovementioned translated routing digits and the four numerical digits of the called subscriber directory number. More specifically, the three called office code digits 273 registered in the code switches A2400, B2410 and C2500 must not be transmitted to extend the call being described. It should be understood, however, that in certain calls it may be necessary not only to transmit the routing digits translated from the particular called office code digits registered in the three code switches enumerated but also the three digits registered in the code switches and the four numerical digits of the called subscriber directory number. In the latter event a total of twelve digits are transmitted to complete the connection. It should also be understood that various combinations of digits may be translated under control of the digits registered in the three code switches enumerated, which may constitute any number of routing digits from one to five in view of the fact that the wipers 2312 to 2316, inclusive, of the rate and route switch R2310 may be jumpered in any desired manner to the ten marking conductors 2385 and the unused wipers in the group, that is, those which are not jumpered to the ten marking conductors 2385, are jumpered to the skip conductor C2382, in the manner described above. Provisions have also been made for transmitting, in addition to the routing digits registered by the rate and route switch R2310, all seven digits registered in the three code switches and the four numerical switches enumerated or to transmit only the last five or the last four digits of the seven digits registered in the code and numerical switches. The foregoing applies to connections extended to called subscriber numbers constituting seven pull numbers. Also, provisions are made for registering digits of a called subscriber number constituting only a six pull number. In the latter event, as will be explained more in detail hereinafter, the six digits of a six pull number are registered respectively on the code and numerical switches A2400, B2410, C2500, D2510, E2520 and F2600. When a six pull number is thus registered the three digits registered respectively on the three code switches A2400, B2410 and C2500 may be translated, in the manner described hereinbefore, under control of the composite code switch P2330 and the rate and route switch R2310, into one, two, three, four or five routing digits. Furthermore, the digits registered in the code and numerical switches enumerated may, in addition to the translated digits transmitted under control of the rate and route switch R2310, be also transmitted to set up the connection to the desired called subscriber line. Provisions are also made in the case of six pull numbers for omitting the transmission of the code digits registered in the first and second code switches A2400 and B2410 and to transmit only the last four digits constituting the numerical portion of the called subscriber number which are registered respectively on the third code switch C2500, the first numerical switch D2510, the second numerical switch E2520 and the third numerical switch F2600. In order to distinguish between the various combinations recited above, relays R1725, R1730, R1740 and R1750 have been provided, any one of which may be energized by connecting the contact in the bank of the rate and route switch R2310 associated with the wiper 2311 to the conductor C2386, C2387, C2388 or C2389'. In the event that the code send relay R1730 is operated, all seven digits of a seven digit directory number registered in the code and numerical switches are re-sent to set up a connection in addition to the translated routing digits determined by whatever jumpering arrangement is provided between the contacts of the rate and route switch R2310 engaged by the wipers 2312 to 2316, inclusive, and the ten marking conductors 2385. In the event that the code send relay R1740 is operated, only the last five digits of a seven pull number registered in the code and numerical switches are re-sent in addition to the translated routing digits; in the event the code send relay R1750 is energized, only the last four digits of a six digit directory number registered in the code and numerical switches are re-sent in addition to whatever translated routing digits are required; and, finally, in the event the code send relay R1725 is energized, all six digits of a six digit directory number registered in the code and numerical switches are re-sent in addition to whatever translated routing digits are required to extend the connection of a desired called subscriber substation. In the event that all of the foregoing code send relays R1725, R1730, R1740 and R1750 remain in their deenergized positions, only the last four numerical digits of a seven digit directory number registered in the numerical switches are re-sent in addition to whatever translated routing digits are required to complete the connection.

In the present example, the latter arrangement is utilized to extend the connection to the desired called subscriber. More particularly, when the wipers of the digit sequence switch T2300 are advanced into engagement with the sixth contacts in the associated contact banks, a circuit is completed from ground by way of the wiper 2303 and the engaged sixth contact in its associated contact bank, the conductor C1782 extending to Fig. 17, the contacts 1735, the skip conductor C2382, the contacts 2306, and the winding of the magnet TM2305, to battery. The magnet TM2305 energizes over the above-traced circuit and interrupts its own circuit, whereupon the magnet TM2305 restores to normal and drives the wipers of the digit sequence switch T2300 an additional step in the counterclockwise direction into engagement with the seventh contacts in the associated contact banks. When the wiper 2303 engages the seventh contact in its associated contact bank, an alternative circuit is completed for the magnet TM2305, which circuit now includes the conductor C1781 extending to Fig. 17, the contacts 1734, and the skip conductor C2382. Accordingly, the magnet TM2305 is again momentarily operated to advance the wipers of the digit sequence switch T2300 an additional step into engagement with the eighth contacts in the associated contact banks. When the wiper 2303 engages the eighth contacts in its associated contact bank, a further circuit is completed by way of the conductor C1780 extending the Fig. 17, the contacts 1733, 1743 and 1754, and the skip conductor C2382 whereupon the magnet TM2305 is again momentarily energized to advance the wipers of the digit sequence switch T2300 into engagement with the ninth contacts in the associated contact banks.

In view of the foregoing description of operation of the digit sequence switch T2300, it is noted that the wipers thereof are rapidly advanced from the sixth to the ninth bank contacts of the associated contact bank in order to prevent the completion of a marking circuit by way of the conductors C2381, C2380 and C2379, respectively, as the wiper 2304 successively engages the sixth to the eighth bank contacts of its associated contact bank. These marking conductors C2381, C2380 and C2379 extend respectively to the wiper 2404 of the first code switch A2400, to wiper 2414 of the second code switch B2410, and to wiper 2504 of the third code switch C2500. Accordingly, the digits registered in the respective first, second and third code switches are not transmitted in the present example in view of the fact that the wiper 2304 of the sequence switch T2300 is rapidly advanced over the sxith to the eighth contacts in its associated bank during the automatic stepping of the switch T2300 controlled by the circuits including the wiper 2303 and the conductors C1782, C1781 and C1780.

It may be well to mention at this time, however, that if it had been necessary in the present example to transmit the digits registered in the three code switches A2400, B2410, and C2500, the jumper 2353*a* would have been connected to the conductor C2386 to cause the operation of the code send relay R1730 thereby to open, at its contacts 1735, 1734 and 1733, the above-traced self-interrupting circuit for the magnet TM2305 which includes, respectively, the conductors C1782, C1781 and C1780. If the above traced self-interrupting circuit for the magnet TM2305 is opened at the above-mentioned contacts of the code send relay R1730, the conductors C2381, C2380 and C2379, terminating in the bank contacts associated with the wiper 2304, would be sequentially grounded in order to mark, in the bank of the sender switch S2830, the digits registered by the wipers 2404, 2414 and 2504 of the first, second and third code switches A2400, B2410 and C2500. Consequently, the sender switch S2830 would have been cyclically operated in the manner previously described in connection with the transmission of digits registered by the wipers of the rate and route switch R2310, in order to sequentially transmit the digits registered in the above-mentioned first, second and third code switches. Similar variations in the control of the digit sequence switch T2300 are provided in the event that any one of the code send relays R1725, R1740 or R1750 is operated.

Referring again to the operation of the digit sequence switch T2300, it will be noted that when the wiper 2302 thereof disengages the eighth contact on its associated contact bank the previously traced circuit, including the conductors C2369 and C1778 for controlling the digit spacer relay R1920, is interrupted, and when the wiper 2302 engages the ninth contact in its associated contact bank a circuit, including the conductors C1778 and C2370, is prepared for reoperating the digit spacer relay R1920 depending upon whether or not the sequence relay R2730 has been operated, thus indicating that the first numerical digit of the called subscriber number has been registered in the first numerical switch D2510.

In the event the first numerical digit "1" has been registered in the first numerical switch D2510 at this time, the sequence relay R2730 occupies its operated position, whereupon an alternative circuit for energizing the digit spacer relay R1920 is completed. This circuit extends from ground by way of the contacts 1717, the conductor C2369 extending to Fig. 27, the contacts 2733, the conductor C2370 extending to Fig. 23A, the wiper 2302 and the engaged ninth contact in its associated contact bank, the conductor C1778 extending to Fig. 17, the contacts 1914 and 2213, the winding of the digit spacer relay R1920, and the resistor 1925, to battery. Upon reoperating, the digit spacer relay R1920 recycles the sender switch S2830 thereby to cause the latter switch to transmit directly the first numerical digit "1" of the called subscriber number registered in the first numerical switch D2510. The circuit for marking the bank contact of the sender switch S2830 so that the digit "1" is transmitted during the operating cycle of the switch may be traced from ground by way of the contacts 1716, the conductor C1777 extending to Fig. 23A, the wiper 2304 of the digit sequence switch T2300 and the engaged ninth contact in its associated conductor C2378 extending to Fig. 25, the wiper 2514 of the first numerical switch D2510 and the engaged tenth contact in its associated contact bank terminating the first marking conductor in the cable 2385 extending to Fig. 28 and terminating in the third contact in the contact bank engaged by the wiper 2834 of the sender switch S2830, the conductor C2233 extending to Fig. 19, and the winding of the digit stop relay R1910, to battery.

In view of the above description of the operation of the sequence relay R2730 to cause the reoperation of the digit spacer relay R1920 when the wiper 2302 of the digit sequence switch T2300 engages the ninth contact in its associated contact bank, and the consequent reoperation of the sender switch S2830 to transmit the digit "1" registered in the first numerical switch D2510 to the primary selector 600, it will be understood that the sequence relay R2740 is operative in a similar manner to effect reoperation of the digit spacer relay R1920 and the consequent reoperation of the sender switch S2830 to transmit the digit "2" registered in the second numerical switch E2520 to the primary selector 600. In this case the alternative circuit for energizing the winding of the digit spacer relay R1920 is substantially identical to that previously traced and includes the contacts 2744 of the sequence relay R2740, the conductor C2371 extending to Fig. 23A, and the wiper 2302 of the digit sequence switch T2300 and the engaged tenth contact in its associated contact bank. Furthermore, the alternative circuit for energizing the winding of the digit stop relay R1910 is substantially identical to that previously traced and includes the wiper 2304 of the digit sequence switch T2300 and the engaged tenth contact in its associated contact bank, the conductor C2377 extending to Fig. 25, the wiper 2524 of the second numerical switch E2510 and the engaged second contact in its associated contact bank, the second marking conductor in the marking cable 2385 extending to Fig. 28, and the wiper 2834 of the sender switch S2830 and the engaged fourth contact in the associated contact bank.

Similarly, the operation of the sequence relay R2750 effects the reoperation of the digit spacer relay R1920 and the consequent reoperation of the sender switch S2830 to transmit the digit "3" stored in the third numerical switch F2600 to the primary selector 600. In this case the alternative circuit for energizing the winding of the digit spacer relay R1920 is substantially identical to that previously traced and includes the contacts 1717, the conductor C2369, the contacts 1721, the conductor C2771 extending to Fig. 27, the contacts 2754, the conductor C2366 extending to Fig. 23A, and the wiper 2302 of the digit sequence switch T2300 and the engaged eleventh contact in its associated contact bank. The alternative circuit for energizing the winding of the digit stop relay R1910 is substantially identical to that previously traced and includes the wiper 2304 of the digit sequence switch T2300 and the engaged eleventh contact in its associated contact bank, the conductor C2376 extending to Fig. 26, the wiper 2604 of the third numerical switch F2600 and the engaged third contact in its associated contact bank, the third marking conductor in the marking cable 2385 extending to Fig. 28, and the wiper 2834 of the sender switch S2830 and the engaged fifth contact in its associated contact bank. At this point it is noted that the last digit send relay R1720 must be operated at this time in order to prepare, at its contacts 1721, the above-traced alternative circuit for energizing the winding of the digit spacer relay R1920 before the digit spacer relay R1920 may be reoperated to cause the sender switch S2830 to transmit the digit "3" registered in the third numerical switch F2600 to the primary selector 600, in the manner explained above. The last digit send relay R1720 is operated under control of the storage transfer switch U2820, in a manner more fully explained hereinafter, but it will be assumed for the present example that the storage transfer switch U2820 has operated satisfactorily to transfer certain information pertaining to the telephone connection and has caused the operation of the last digit send relay R1720 at the time that the above-traced circuit is completed for energizing the winding of the digit spacer relay R1920.

Finally, the operation of the sequence relay R2760 effects the reoperation of the digit spacer relay R1920 and the consequent reoperation of the sender switch S2830 to transmit the digit "4" registered in the fourth numerical switch G2610 to the primary selector 600. In this case the alternative circuit for energizing the winding of the digit spacer relay R1920 is substantially identical to that previously traced and includes the contacts 1717, the conductor C2369, the contacts 1721, the conductor C2771 extending to Fig. 27, the contacts 2763, the conductor C2368 extending to Fig. 23A, and the wiper 2302 of the digit sequence switch T2300 and the engaged twelfth contact in its associated contact bank. The alternative circuit for energizing the winding of the digit stop relay R1910 is substantially identical to that previously traced and includes the wiper 2304 of the digit sequence switch T2300 and the engaged twelfth contact in its associated contact bank, the conductor C2375 extending to Fig. 26, the wiper 2614 of the fourth numerical switch G2610 and the engaged fourth contact in its associated contact bank, the fourth marking conductor in the marking cable 2385 extending to Fig. 28, and the wiper 2834 of the sender switch S2830 and the engaged sixth contact in its associated contact bank.

Prior to considering further operation of the register translator 1700 and the operation of the primary selector 600 in response to the various digits transmitted thereto, the operation of the detector 2900 to detect the line terminal of the calling private subscriber line 407, and consequently the numerical portion of the directory number of the calling private subscriber substation TP, will now be described below.

*Operation of the detector*

As previously explained in conjunction with the operation of the register translator 1700, after the first routing digit "2" has been transmitted therefrom to the primary selector 600, the digit stop relay R1910 operates and subsequently restores. Upon operating, the digit stop relay R1910 effects the operation of the special service cut off relay R1810 and, upon restoring, the digit stop relay R1910 effects the operation of the detector start relay R1760. Upon operating, the detector start relay R1760 completes, at its contacts 1761′, a circuit including the contacts 2244 for applying ground potential to the start conductor C3202 extending to Fig. 31 of the detector 2900 and, at its contacts 1767, it completes a circuit including the winding of the detector test relay R2230, and the contacts 2242 and 2251, for applying battery potential to the test conductor C3101 extending to Fig. 31 of the detector 2900.

Figure 31:
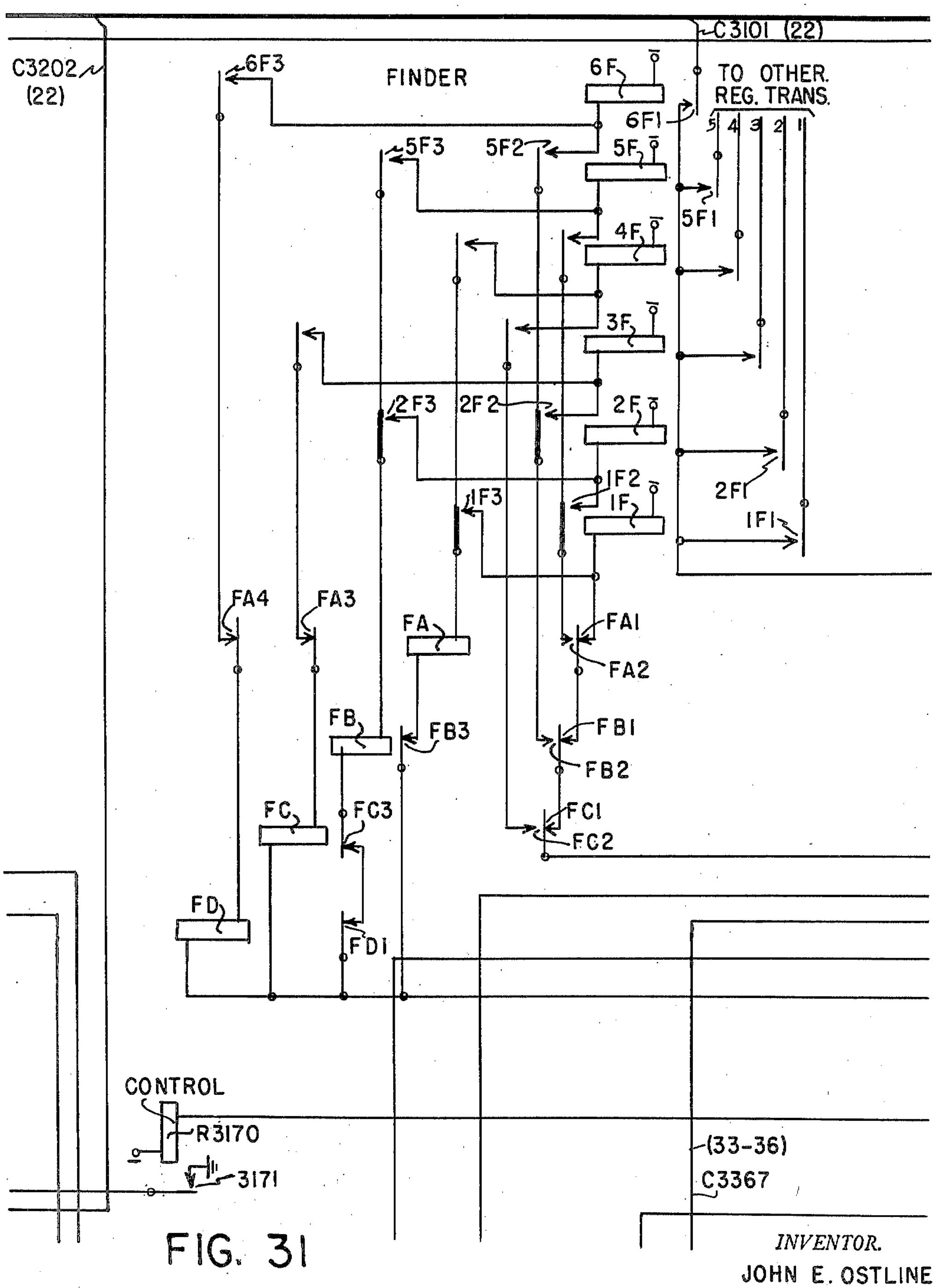

Referring to Fig. 31 of the detector 2900, it will be seen that the ground potential applied to the conductor C3202 is extended by way of the contacts 3638*a*, and the winding of the start relay R3210 to battery, thereby to cause the latter relay to operate. Also, referring to Fig. 31, it will be noted that the battery potential applied to conductor C3101 marks the register translator 1700 as a calling register translator.

Upon operating, the start relay R3210 completes, at its contacts 3211, a circuit for energizing in multiple the upper and lower windings of the pulse relay R3315, which may be traced from ground at the contacts 3252 and 3272 by way of contacts 3352, 3211 and 3316, and the upper and lower windings of the relay R3315, to battery. The pulse relay R3315 operates over this circuit, thereby to interrupt, at its contacts 3316, the above-traced multiple circuit for energizing the upper and lower windings thereof, whereupon the windings of the relay are effectively short-circuited in series through the condenser 3318 in order to cause the latter relay to restore shortly thereafter. Accordingly, the pulse relay R3315 operates intermittently at a predetermined rate, depending upon the characteristic of the associated condenser 3318.

The first time the pulse relay R3315 operates and restores it completes and then interrupts, at its contacts 3317, a circuit including the contacts 3224, FC1, FB1 and FA1, for energizing the winding of the finder relay 1F. When thus energized the finder relay 1F operates to complete, at its contacts 1F3, a holding circuit for energizing the winding thereof in series with the cycle relay FA. This holding circuit extends from ground by way of the contacts 3212 and FB3, the winding of relay FA, the contacts 1F3, and the winding of relay 1F, to battery. Attention is directed to the fact that the holding circuit for relay 1F, which includes in series therewith the winding of the cycle relay FA, is not completed until the pulse relay R3315 restores to normal and removes the shunting ground from across the winding of the cycle relay FA. When this holding circuit is completed upon the restoration of the pulse relay R3315, the finder relay 1F is retained in its operated position and the cycle relay FA operates in series therewith. Also, upon operating, the finder relay 1F prepares, at its contacts 1F2, a point in a circuit, traced hereinafter, for energizing the winding of the finder relay 2F responsive to the next energization of the pulse relay R3315. Also, upon operating, the finder relay 1F prepares, at its contacts 1F1, a circuit including the contacts 3231 and the test conductor extending to the first register translator, not shown, for energizing the winding of the stop relay R3220 in the event the first register translator is a calling register translator.

Assuming that the register translator 1700, which constitutes the sixth register translator in the group, is the first translator marked as calling, the above-mentioned circuit for energizing the winding of the stop relay R3220 is not completed and further operation of the finder relays 1F, 2F, 3F, etc., takes place at this time. When the cycle relay FA operates, as described above, at its contacts FA1, it interrupts the previously traced initial circuit for energizing the winding of the finder relay 1F; at its contacts FA2 it prepares a further point in the previously mentioned circuit for energizing the winding of the finder relay 2F; and, at its contacts FA3 and FA4 it interrupts points in the circuits, traced hereinafter for respectively energizing the windings of the cycle relays FC and FD. Upon the second operation and restoration of the pulse relay R3315, at its contacts 3317 it completes and interrupts a circuit substantially identical to that previously traced for the relay 1F, which now includes the contacts 3224, FC1, FB1, FA2, and 1F2, and the winding of the finder relay 2F, whereupon the latter relay operates and when the original energizing circuit therefor is opened, at the contacts 3317, it locks in series with the cycle relay FB over a circuit which now includes the contacts 2F3, the winding of the cycle relay FB, the contacts FC3, FD1 and 3212. Relay FB operates over this circuit and relay 2F remains in its operated position. Also, the finder relay 2F prepares, at its contacts 2F1, a test circuit for energizing the winding of the stop relay R3220 and it prepares, at its contacts 2F2, a circuit, traced hereinafter, for energizing the winding of the finder relay 3F. When the cycle relay FB operates in series with the finder relay 2F, at its contacts FB1 it opens a further point in the previously traced initial circuit for energizing the winding of the finder relay 2F; at its contacts FB2 it prepares a further point in the previously mentioned circuit for energizing the winding of the finder relay 3F; and, at its contacts FB3 it interrupts the previously traced holding circuit for energizing the winding of the finder relay 1F in series with the cycle relay FA, thereby to cause the latter relays to restore. Upon restoring, the cycle relay FA, at its contacts FA3 and FA4, again prepares further points in the previously mentioned circuits for respectively energizing the windings of the cycle relays FC and FD; at its contacts FA1, it prepares a further point in the previously traced initial circuit for the finder relay 1F; and, at its contacts FA2, it interrupts a further point in the previously traced initial circuit for the finder relay 2F. When the finder relay 1F restores, at its contacts 1F3 it interrupts a further point in the previously traced holding circuit for itself and the cycle relay FA; at its contacts 1F2 it interrupts a further point in the previously traced initial circuit for the finder relay 2F; and, at its contacts 1F1, it interrupts the previously traced test circuit including the step relay R3220 and the first register translator, not shown.

In view of the foregoing explanation of the mode of operation of the finder relays 1F and 2F, in conjunction with the cycle relays FA and FB, it will be understood that the finder relays 1F to 6F, inclusive, are operated sequentially to test the respective register translators in order to detect the calling register translator in the group. Further, it is pointed out that the finder relays 1F to 6F, inclusive, are operative continuously through repeated cycles until the calling register translator is detected thereby. At this point it is noted that the finder relays 1F and 4F lock in series with the cycle relay FA; the finder relays 2F and 5F lock in series with the cycle relay FB; the finder relay 3F locks in series with the cycle relay FC; and the finder relay 6F locks in series with the cycle relay FD, in substantially the same manner as has been explained above in connection with the locking circuits for the finder relays 1F and 2F.

In the present example, when the finder relay 6F operates it completes, at its contacts 6F3, a holding circuit substantially identical to that previously traced, which includes the contacts 3212, the winding of the cycle relay FD, the contacts FA4 and 6F3, and the winding of the finder relay 6F, whereupon the finder relay 6F is retained in its operated position and the cycle relay FD operates. Upon operating, the cycle relay FD, at its contacts FD1, interrupts the previously mentioned holding circuit for energizing in series the winding of the finder relay 5F and the winding of the cycle relay FD, thereby to cause the latter two relays to restore to normal. Also the finder relay 6F, upon operating, at its contacts 6F1, completes a test circuit including the winding of the stop relay R3220 and the test conductor C3201 extending to Fig. 22 of the calling register translator 1700. It will be recalled that the conductor C3101 has battery potential applied thereto by the calling register translator 1700, and at this time the circuit is completed for energizing the winding of the stop relay R3220 in the detector 2900. This circuit may be traced from ground, at the contacts 3231, the winding of the stop relay R3220, the contacts 6F1, the conductor C3101 extending to Fig. 22, the contacts 2215 and 2242, the winding of the detector test relay R2230, and the contacts 1767, to battery. When this series circuit is completed the stop relay R3220 in the detector 2900 and the detector test relay R2230 in the register translator 1700 operate.

Referring again to the register translator 1700, it will be noted that upon operating, the detector test relay R2230, at its contacts 2231, completes a circuit for energizing the storage relay R2850, thereby to cause the latter relay to operate. Upon operating, the storage relay R2850 prepares, at its contacts 2855, a circuit, traced hereinafter, for energizing the winding of the detector release relay R2240; at its contacts 2856 it prepares a circuit, traced hereinafter, for energizing the winding of the detector failure relay R2250; at its contacts 2853*a* to 2853*p*, inclusive, it prepares circuits for energizing the various WXYZ magnets in the code storage devices S2801 to S2804, inclusive; and, at its contacts 2857*a* to 2857*d*, inclusive, it prepares obvious connections between the marking conductors C2641 to C2644, inclusive, extending to the party switch N2620 in the register translator 1700 and the marking conductors C3401 to C3404, inclusive, extending to Fig. 34 of the detector 2900, for a purpose more fully explained hereinafter. Finally, the storage relay R2850, at its contacts 2852, completes a connection between the conductor C3102 extending to Fig. 31A of the detector 2900 and the conductor C2232 of the register translator 1700, whereupon a connection is completed between the S lead S433, individually associated with the private subscriber line 407, and the detector 2900. This connection extends from the S lead S433 individual to the calling subscriber line 407 by way of the line switch 423, the control conductor C465, the contacts 627, the wiper 615 of the finder F610, the conductor C645 extending to Fig. 14, the contacts 1442, the conductor C1393 extending to Fig. 22, the wiper 2296 of the finder F2290, the contacts 2285, the conductor C2232, the contacts 2852, the conductor C3102 extending to Fig. 31A of the detector 2900, and the winding 3154*a* of the transformer 3150*a* to ground. In the present example the grounded wiper 2623 of the party switch N2620 in the register translator 1700 engages the first contact in the associated contact bank, whereby ground potential is applied by way of the conductor C2641 and the contacts 2857*d* to the first hold conductor C3401 extending to Fig. 34 of the detector 2900. Furthermore, in the present example, no ground potential is applied to the hold conductors C3402, C3403 and C3404 extending to the detector 2900. Also, it is noted that the S lead S433, extending to the line switch 423 individually associated with the private subscriber line 407, extends directly to Fig. 29 of the detector 2900 and terminates in a contact of the tenth relay 00A in the "0" thousand group of A relays.

Returning to the operation of the detector, it is to be noted that the stop relay R3220, upon operating, at its contacts 3221, completes a holding circuit for itself in series with the detector test relay R2230 in the register translator 1700; at its contacts 3222, it completes an obvious circuit for energizing the winding of the hold relay R3230, thereby to cause the latter relay to operate; at its contacts 3224 it opens a point in the previously traced circuit for respectively energizing the finder relays 1F to 6F, inclusive, thereby to prevent further operation of these relays at this time; at its contacts 3225 it prepares a point in the circuit, traced hereinafter, for controlling the test relays R3240 and R3250; and, at its contacts 3223, it prepares a point in the circuit, traced hereinafter, for controlling the step relays 1K to 9K, inclusive, and 0K.

The hold relay R3230, upon operating, at its contacts 3231, interrupts the previously traced original circuit for energizing in series the winding of the stop relay R3220 in the detector 2900 and the winding of the detector test relay R2230 in the register translator 1700; at its contacts 3232 it completes a path for applying ground potential to the hold conductor C3364; at its contacts 3233 it prepares circuits, traced hereinafter, for respectively energizing the windings of the test relays R3240 and R3250; and, at its contacts 3234, it completes an obvious circuit including the contacts 3244 for energizing the winding of the control relay R3170. When thus energized the control relay R3170 operates and, at its contacts 3171, completes an obvious multiple circuit for energizing the windings of the ten C relays 1C to 9C, inclusive, and 0C, thereby to cause the latter relays to operate, for a purpose more fully explained hereinafter.

It will be recalled that, when the detector 2900 was initially seized, the start relay R3210 operated and caused the intermittent operation of the pulse relay R3315 and the latter relay, in turn, controlled the cyclic operation of the finder relays 1F to 6F, inclusive, in order to test for the calling register translator 1700. When the called register translator 1700 was encountered, the stop relay R3220 operated and prepared, at its contacts 3223, a circuit including the conductor C3363 for controlling the operation of the step relays 1K to 9K, inclusive, and 0K. The next time the pulse relay R3315 operates and then restores it completes and then interrupts, at its contacts 3317, a circuit for applying ground potential by way of the contacts 3317, 3223 and 3292 to the pulse conductor C3363. Consequently, each time the pulse relay R3315 operates and then restores, it applies a ground pulse to the pulse conductor C3363. The first time ground potential is applied to the pulse conductor C3363 a circuit is completed, by way of the contacts KC1, KB1 and KA1, for energizing the winding of the first step relay 1K. When thus energized the first step relay 1K operates to complete, at its contacts 1K3, a circuit, including the winding of the cycle relay KA, the contacts KB3, and the grounded conductor C3364, for short-circuiting the cycle relay KA until the ground pulse is removed from the pulse conductor C3363. Subsequently, when ground potential is removed from the pulse conductor C3363, the short circuit is removed from around the winding of the cycle relay KA and it energizes in series with the winding of the first step relay 1K. This circuit extends from the grounded conductor C3364 by way of the contacts KB3, the winding of the cycle relay KA, the contacts 1K3, and the winding of the first step relay 1K to battery. When this series holding circuit is completed the first step relay 1K is retained in its operated position and the cycle relay KA operates. Upon operating, the cycle relay KA interrupts, at its contacts KA3 and KA4, points in the holding circuits, traced hereinafter, for respectively energizing the windings of the cycle relays KC and KD; at its contacts KA1 it interrupts a further point in the previously traced initial circuit for energizing the winding of the first step relay 1K; and, at its contacts KA2, it prepares a circuit, traced hereinafter, for energizing the winding of the second step relay 2K.

The next time ground potential is applied to the pulse conductor C3363, the previously mentioned circuit for energizing the winding of the second step relay 2K is completed, by way of the grounded pulse conductor C3363, the contacts KC1, KB1, KA2 and 1K4, and the winding of relay 2K to battery. When thus energized the relay 2K operates to complete, at its contacts 2K3, a path substantially identical to that previously traced, for short-circuiting the winding of the cycle relay KB. Subsequently when ground potential is removed from the pulse conductor C3363, a holding circuit is completed for energizing in series the winding of the second step relay 2K and the winding of the cycle relay KB. This circuit extends from the grounded hold conductor C3364 by way of the contacts KC3, the winding of the cycle relay KB, the contacts 2K3, and the winding of the second step relay 2K, to battery. When this holding circuit is completed, the second step relay 2K is retained in its operated position and the cycle relay KB operates. Upon operating, the cycle relay KB interrupts, at its contacts KB3, the previously traced holding circuit, including the windings of the cycle relay KA and the first step relay 1K, thereby to cause the latter relays to restore. Also, the cycle relay KB, at its contacts KB1, interrupts a further point in the previously traced initial circuit for energizing the winding of the second step relay 2K; at its contacts KB2 it prepares a point in a circuit, substantially identical to that previously traced, for energizing the winding of the third step relay 3K. When the cycle relay KA restores to normal, at its contacts KA3 and KA4, it prepares points in the previously mentioned holding circuits respectively for energizing the windings of the cycle relays KC and KD; and, at its contacts KA1, it again prepares a point in a circuit for energizing the winding of the first step relay 1K.

In view of the above description of the cycle of operation of the step relays 1K, 2K, etc., it will be understood that the step relays 1K to 9K, inclusive, and 0K, and the cycle relays KA, KB, KC and KD, are operated in the following order:

| Number of Operations and Restorations of the Pulse Relay R3315 | Operated Step and Cycle Relays |
|---|---|
| 1 | 1K and KA. |
| 2 | 2K and KB. |
| 3 | 3K and KC. |
| 4 | 4K and KA. |
| 5 | 5K and KB. |
| 6 | 6K and KC. |
| 7 | 7K and KA. |
| 8 | 8K and KB. |
| 9 | 9K and KC. |
| 10 | 0K and KD. |

Also, it is pointed out that the step relays 1K to 9K, inclusive, and 0K, and the cycle relays KA, KB, KC and KD are operative continuously through a plurality of cycles of the character noted above, until the operation thereof is arrested, in a manner more fully explained hereinafter.

Also, as a further result of the operation of the first step relay 1K, at its contacts 1K2, it prepares a path, including the contacts KA5 and 3717, for applying ground potential to the first marking conductor C3801 in the cable 3801, thereby to complete a circuit for energizing the first B relay 1B in order to cause the latter relay to operate, whereby the first thousand group of 1,000 S leads is tested, in a manner more fully explained hereinafter. Similarly, the second step relay 2K completes, at its contacts 2K2, a circuit, including the contacts KB5 and 3714, for applying ground potential to the second marking conductor in the cable 3801, thereby to complete a circuit for energizing the winding of the second B relay 2B, not shown, in order to cause the latter relay to operate, whereby the second thousand group of 1,000 S leads is tested. Finally, the tenth step relay 0K completes, at its contacts 0K2, a path, including the contacts KD5 and 3719, for applying ground potential to the tenth marking conductor C3800 in the cable 3801, thereby to complete an energizing circuit for the winding of the tenth B relay 0B in order to cause the latter relay to operate, whereby the tenth thousand group of 1,000 S leads is tested. From the foregoing description of the mode of operation of the step relays 1K to 9K, inclusive, and 0K, it will be understood that the relays are operated successively in order respectively to operate successively the relays 1B to 9B, inclusive, and 0B, whereby the latter relays successively connect and successively test the 1,000 S leads from each thousand group, in the 10,000 line system, corresponding to the operated B relay.

More particularly, when the tenth B relay 0B operates, it prepares, at its contacts 0B0 to 0B9, inclusive, circuits for energizing the windings of the ten A relays 00A to 09A, inclusive, in the associated "0" thousand group. At this point it is again noted that only the ones of the A relays 00A to 09A, inclusive, which are connected to the first hold conductor C3401 are operated at this time, in view of the fact that only the first hold conductor C3401 has ground potential applied thereto by the register translator 1700. Accordingly, at this time the A relays 00A, 01A, 05A and 09A are operated when the associated 0B relay is operated. The remaining A relays in the "0" thousand group are not operated in the present example, since they are shown connected to the hold conductors C3402, C3403 and C3404, which are not grounded at the present time. Accordingly, when the 0B relay is energized, it completes, at its contacts 0B0, 0B1, 0B5, and 0B9, circuits for simultaneously energizing the A relays 00A, 01A, 05A and 09A, from the grounded hold conductor C3401.

When the tenth A relay 00A is thus energized it operates to connect the tenth group ("0" hundred) of 100 S leads in the "0" thousand group of S leads to the corresponding tenth group ("0" hundred) of 100 test leads. The first A relay 01A operates to connect the first group ("1" hundred) of 100 S leads in the "0" thousand group of S leads to the corresponding first group ("1" hundred) of 100 test leads; the fifth A relay 05A operates to connect the fifth group ("5" hundred) of 100 S leads in the "0" thousand group of S leads to the corresponding fifth group ("5" hundred) of 100 test leads; and, finally, the ninth A relay 09A operates to connect the ninth group ("9" hundred) of 100 S leads in the "0" thousand group of S leads to the corresponding ninth group ("9" hundred) of 100 test leads. Accordingly, at this time the tenth group ("0" hundred) of 100 S leads in the "0" thousand group of S leads is connected by way of the tenth A relay 00A to the tenth group ("0" hundred) of 100 test leads, and therefrom by way of the tenth C relay 0C, which is in its operated position as a result of the operation of the control relay R3170, to the tenth ("0" hundred) test conductor C3500; the first group ("1" hundred) of 100 S leads in the "0" thousand group of S leads is connected by way of the first A relay 01A to the first group ("1" hundred) of 100 test leads, and therefrom by way of the first C relay 1C, which is in its operated position as a result of the operation of the control relay R3170, to the first ("1" hundred) test conductor C3501; the fifth group ("5" hundred) of 100 S leads in the "0" thousand group of S leads is connected by way of the fifth A relay 05A to the fifth group ("5" hundred) of 100 test leads, and therefrom by way of the fifth C relay 5C, which is operated at this time, to the fifth ("5" hundred) test conductor C3505; and the ninth group ("9" hundred) of 100 S leads in the "0" thousand group of S leads is connected by way of the ninth A relay 09A to the ninth group ("9" hundred) of 100 test leads, and therefrom by way of the ninth C relay 9C, which is operated, to the ninth ("9" hundred) test conductor C3509. The tenth test conductor C3500 is individual to the tenth amplifier 0AMP and is connected to ground by way of the left-hand winding 3602*b* of the transformer 3602*a* and the parallel connected resistor; the first test conductor C3501 is individual to the schematically illustrated first amplifier 1AMP and is connected to ground (not shown) by way of a winding of a similar transformer included in the first amplifier 1AMP; and the fifth marking conductor C3505 and the ninth marking conductor C3509 are respectively connected to ground (not shown) through transformers respectively associated with the amplifiers 5AMP and 9AMP. At this time the S lead S433, individually associated with the private subscriber line 407, is also connected by way of the previously traced path, including the marking conductor C3500, to the tenth amplifier 0AMP, thereby to complete a circuit therethrough. It should be noted, however, that the other circuits, including the S leads connected to the marking conductors respectively associated with the other nine amplifiers 1AMP to 9AMP, inclusive, are not completed at this time due to the fact that the numerical portion of the directory number of the private subscriber line 407 is 0099, as previously noted, and no circuit is completed for the last-mentioned marking conductors.

Figure 14:
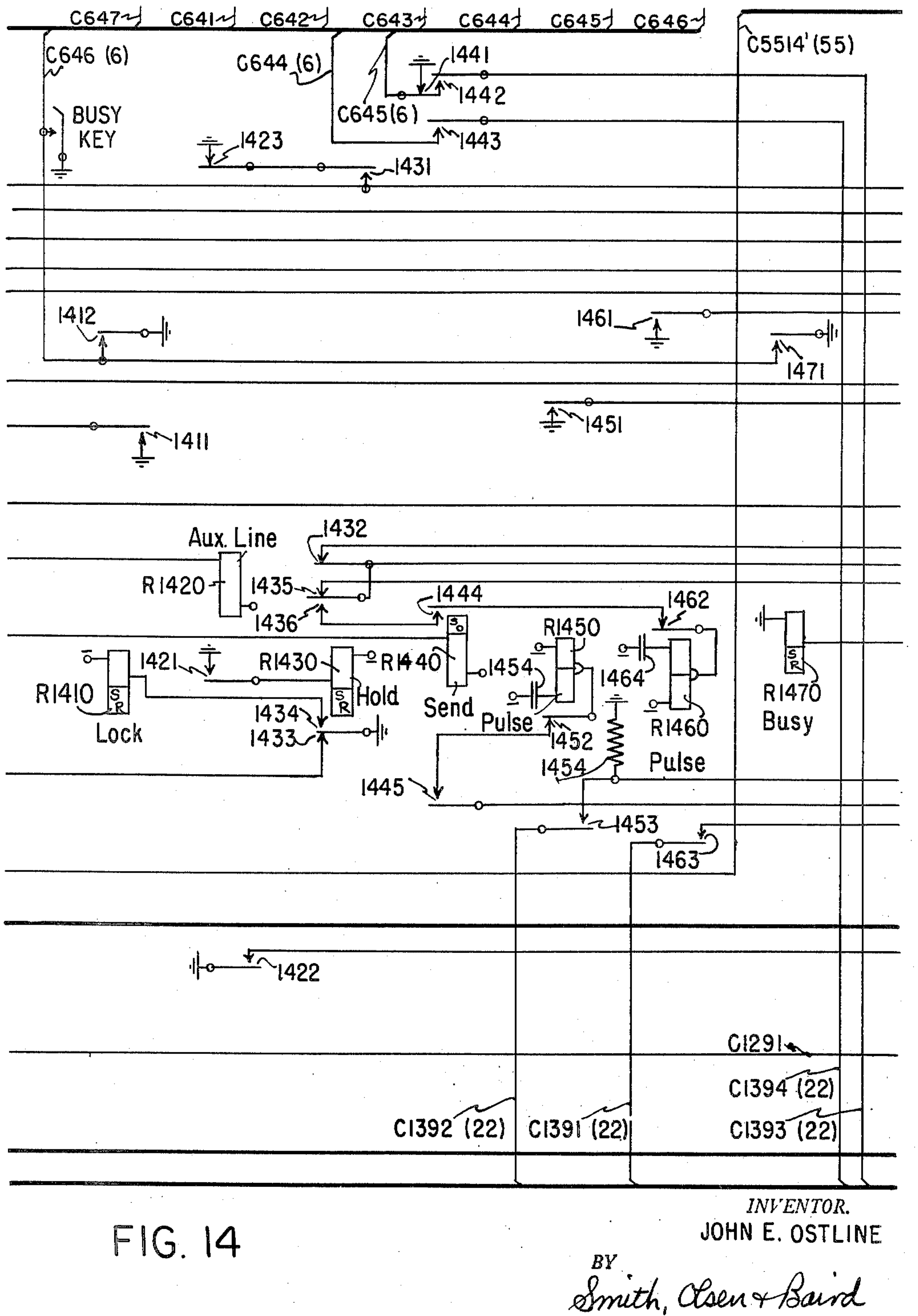
Figure 15:
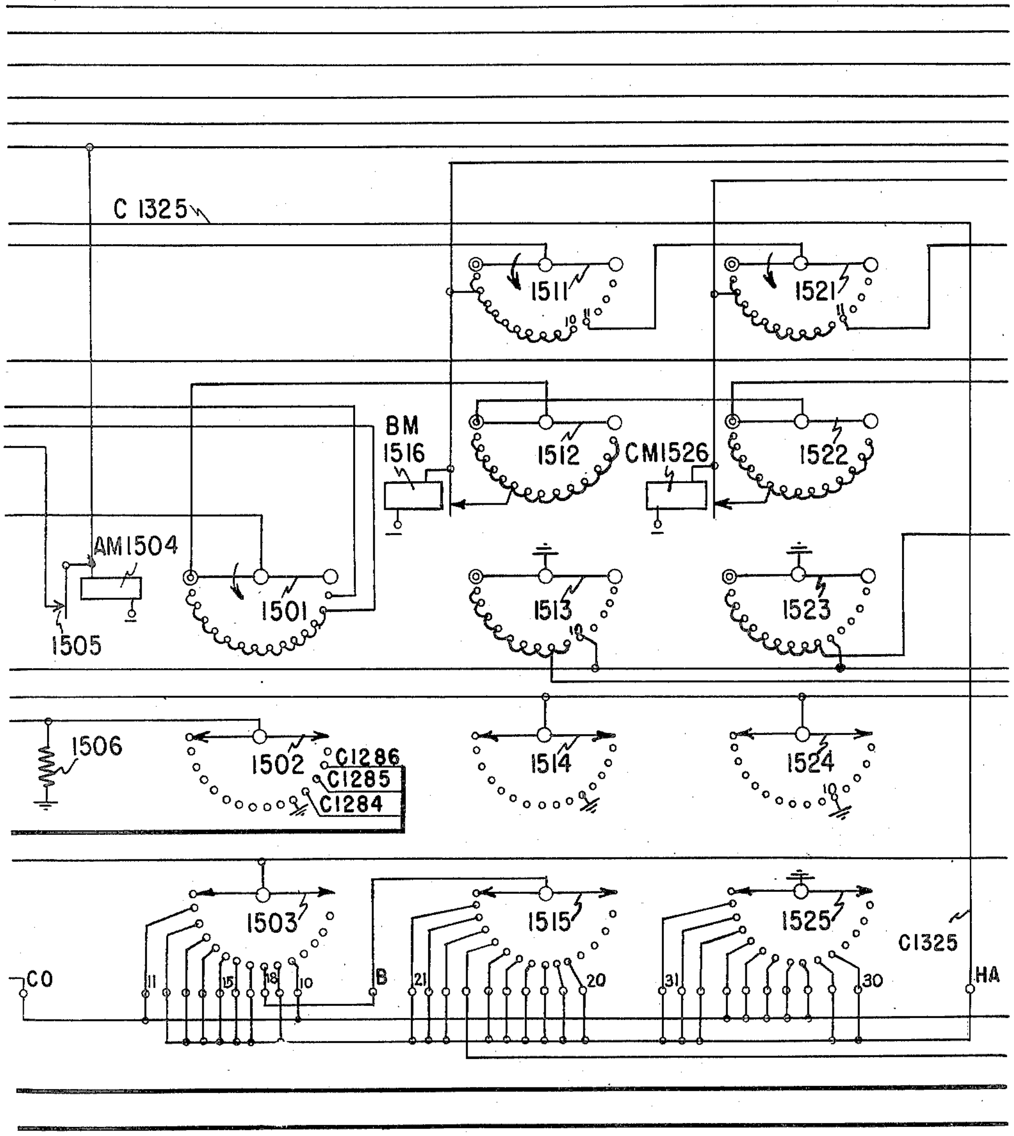

A tone signal generated by the oscillator 3650 is transmitted, in a manner to be described hereinafter, over the conductor C3102 extending to Fig. 28, the contacts 2852, the conductor C2232, the contacts 2285, the wiper 2296, the conductor C1393 extending to Fig. 14, the contacts 1442, the conductor C645 extending to Fig. 6, the wiper 615, the contacts 627, the conductor C465 of the trunk 462, and the line switch 423 to which the line 407 of the calling subscriber is connected. This tone signal is further extended by way of the S lead S433 connected to the line switch 423 over the previously traced circuit including the various relays of the detector 2900, the test conductor C3500, and the left-hand winding of the transformer 3602*a* of the tenth amplifier 0AMP. When a tone signal is transmitted over the above-traced circuit to the tenth amplifier 0AMP, it operates in a manner to be described hereinafter, to cause the energization of the tenth test stop relay 0R. When thus energized, the stop relay 0R operates to complete, at its contacts 0R1, an energizing circuit for the test lock relay 0S, which may be traced from ground by way of the contacts 3242, the contacts 0R1, and the left-hand winding of the test lock relay 0S, to battery. Relay 0S operates over this circuit and, at its contacts 0S1, completes a holding circuit for itself and an energizing circuit for the test relay R3240. This circuit may be traced from ground at the contacts 3233 by way of the winding of the test relay R3240, the contacts 0S1, and the right-hand winding of the test lock relay 0S, to battery. When this series circuit is completed the tenth test lock relay 0S is retained in its operated position and the test relay R3240 operates. The test relay R3240, upon operating, at its contacts 3242, interrupts the previously traced circuit for energizing the left-hand winding of the test lock relay 0S; at its contacts 3241 it completes a multiple circuit for energizing the winding of the mark relay R3290 and the winding of the switch relay R3710, thereby to cause the latter relays to operate. Also, upon operating, the relay R3240, at its contacts 3244, interrupts the previously traced circuit for energizing the winding of the control relay R3170, thereby to cause the latter relay to restore and interrupt, at its contacts 3171, the previously traced multiple circuits for energizing the windings of the ten C relays 0C to 9C, inclusive, whereupon the latter relays restore. As a result of the restoration of the tenth C relay 0C, at its associated contacts it interrupts the previously traced tone signal circuit, including the tenth test conductor C3500, for operating the tenth amplifier 0AMP, thereby to cause the latter amplifier to restore in order to effect the restoration of the tenth stop relay 0R. As a further result of the operation of the tenth test lock relay 0S, at its contacts 0S5 it completes a holding circuit by way of the tenth hold conductor C3710 in the cable 3711, the contacts 00A1, and the winding of relay 00A, to battery, thereby to retain the latter relay in its operated position over a circuit which is independent of its initial energizing circuit. Attention is directed to the fact that the above mentioned holding circuit is completed for the relay 00A before the circuit for the tenth B relay 0B is interrupted at contacts KD5 in response to the operation of the cycle relay KD.

As a result of the operation of the mark relay R3290, at its contacts 3292 it interrupts a point in the previously traced path for applying ground pulses to the conductor C3363, thereby positively to arrest further operation of the ten step relays 0K to 9K, inclusive, at this time; and, at its contacts 3291, it prepares a circuit including the contacts 3274 for subsequently energizing the control relay R3260. Also, the mark relay R3290, at its contacts 3293, completes an obvious path for applying ground potential to the marking conductor C3365 and an obvious multiple path including the contacts 3315 for applying ground potential to the marking conductor C3366. The application of ground potential to the marking conductor C3365 is effective to complete a path for applying ground potential to certain of the WXYZ conductors in the first group of marking leads 3801, depending upon the particular operated one of the step relays 0K to 9K, inclusive, at this time. In the present example, the tenth step relay 0K occupies its operated position, in view of the fact one of the ten amplifiers 0AMP to 9AMP, inclusive, was operated incident to the operation of the tenth B relay 0B, in the manner previously explained. Hence, in the present example, the ground potential appearing upon the marking conductor C3365 is applied by way of the contacts 0K5 and 3812 to the Z conductor in the first group of marking leads 3801. The application of ground potential to the Z conductor in the first group of marking leads 3801 completes a circuit for operating the Z relay in the first code storage device in the register translator 1700. The marking of the Z conductor in the group of marking leads 3801 corresponds to the digit "0," whereby the digit "0" is registered in the first code storage device S2801 in the register translator 1700.

The application of ground potential to the marking conductor C3366 is effective to complete a path for applying ground potential to certain of the WXYZ conductors in the second group of marking conductors 3701, depending upon the particular operated one of the test lock relays 0S to 9S, inclusive. At this time the particular operated test lock relay is controlled by the particular one of the ten amplifiers 0AMP to 9AMP, inclusive, which was operated by the tone signal previously described. In the present example the tenth test lock relay 0S is locked in its operated position over a holding circuit including its right-hand winding and the winding of the test relay R3240. Accordingly, the ground potential appearing upon the marking conductor C3366 is applied by way of the contacts 0S2 to the Z conductor in the second group of marking conductors 3701. The application of ground potential to the Z conductor of the marking conductors 3701 corresponds to the digit "0" and is effective to cause the digit "0" to be registered in the second code storage device S2802 in the register translator 1700, in the manner described above.

It will be recalled that the mark relay R3290, upon operating, prepared a circuit at its contacts 3291 for energizing the winding of the control relay R3260. Upon the next operation of the pulse relay R3315, at its contacts 3317, it completes the above-mentioned circuit for energizing the control relay R3260, thereby to cause the latter relay to operate. Upon operating, the control relay R3260 completes, at its contacts 3261, a holding circuit for itself in series with the control relay R3270. The control relay R3270, however, is not energized at this time since the initial operating ground potential applied to the winding of the relay R3260 shunts the winding of the relay R3270. Upon the subsequent restoration of the pulse relay R3315, at its contacts 3317, it removes ground potential from the previously traced initial circuit for energizing the winding of the control relay R3260, whereupon a circuit including the contacts 3232 and 3281, the winding of the control relay R3270, the contacts 3261, and the winding of the relay R3260, is completed for energizing the control relay R3270 and for maintaining the control relay R3260 in its operated position. When the above-described series circuit is completed, the control relay R3270 operates. Upon operating, the control relay R3270, at its contacts 3274, interrupts a point in the previously traced initial energizing circuit for the control relay R3260; and, at its contacts 3273, it prepares a point in a circuit, to be traced hereinafter, for energizing the winding of the control relay R3310. Also, upon operating, the control relay R3270, at its contacts 3275, interrupts a point in the path, traced hereinbefore, for applying ground potential to the hold conductor C3364, thereby to interrupt the previously traced series holding circuit for the tenth stop relay 0K and the cycle relay KD, whereupon the latter relays restore. As a further result of the operation of the control relay R3270, at its contacts 3271, it prepares a point in a circuit, to be traced hereinafter, for energizing the detector release relay R2240 in the register translator 1700; and, at its contacts 3272, it removes ground potential from the circuit for controlling the pulse relay R3315, but this is without effect at this time since the circuit for controlling the latter relay is maintained at the contacts 3252.

In response to the next operation of the pulse relay R3315 a circuit is completed, at its contacts 3317, for energizing the winding of the control relay R3310. This circuit may be traced from ground, by way of the contacts 3317, 3223, 3291 and 3273, and the winding of the control relay R3310, to battery. The relay R3310 operates over this circuit and, at its contacts 3311, completes a circuit including the winding of the control relay R3280, but the winding of the latter is short-circuited until ground potential is removed at the contacts 3317 upon the restoration of the pulse relay R3315.

Upon the next restoration of the pulse relay R3315, at its contacts 3317 it interrupts the previously traced circuit for energizing the winding of the control relay R3310, whereupon the short circuit is removed from the winding of the control relay R3280, and the previously mentioned circuit for energizing the winding of the control relay R3310 in series with the winding of the control relay R3280 is completed. When this series circuit is completed the control relay R3310 is retained in its operated position and the control relay R3280 operates. Upon operating, the control relay R3280, at its contacts 3281, interrupts the previously traced holding circuit for energizing in series the windings of the control relays R3260 and R3270, thereby the cause the latter relays to restore; and, at its contacts 3282, it completes a circuit for energizing the winding of the switch relay R3810, thereby to cause the latter relay to operate. Also, the relay R3280, upon operating, at its contacts 3284, interrupts the previously traced circuit for energizing the winding of the mark relay R3290, thereby to cause the latter relay to restore; and, at its contacts 3283, it prepares an alternative circuit, traced hereinafter, for subsequently energizing the winding of the mark relay R3290. Also, upon operating, the control relay R3280, at its contacts 3286, interrupts a further point in the path including the contacts 3318, 3225 and 3243 which was previously completed for short-circuiting the winding of the test relay R3240 prior to the restoration of the pulse relay R3315 after the tenth test lock relay 0S has been operated. The latter arrangement positively prevents the operation of the test relay R3240 prior to the tenth restoration of the pulse relay R3315 during the first test of the detector 2900. Furthermore, the control relay R3280, upon operating, at its contacts 3285, prepares a similar path, including the contacts 3318, 3225, 3285 and 3255, for short-circuiting the winding of the test relay R3250 each time the pulse relay R3315 is in its operated position. This arrangement positively prevents the test relay R3250 from operating while the pulse relay R3315 is in its energized position during the second test by the detector 2900.

As a result of the previously described operation of the switch relay R3710, under control of the contacts 3241 of the test relay R3240, at its contacts 3712, 3714, 3717 and 3719, it interrupts points in the previously traced paths for applying ground potential to the various conductors in the cable 3801, and it prepares, at its contacts 3711, 3713, 3716 and 3718, points in paths, traced hereinafter, for applying ground potential to the various conductors in the cable 3901. Particular attention is directed to the fact that the ground potential applied to the various ones of the marking conductors in the cables 3801 and 3901 is applied to these conductors only momentarily since the cycle relays operate in series with their respective step relays immediately after the energizing ground pulse for operating the step relay is removed by the pulse relay R3315.

As a result of the above-described operation of the switch relay R3810, under control of the contacts 3282 of the control relay R3280, at its contacts 3812, 3814, 3816 and 3818, it interrupts the connections between the first group of WXYZ marking conductors 3801 and the marking contacts of the step relays 0K to 9K, inclusive; and, at its contacts 3811, 3813, 3815 and 3817, it completes obvious connections between the third group of WXYZ marking conductors 3802 and the marking contacts of the step relays 0K to 9K, inclusive.

As a result of the above-described restoration of the mark relay R3290, under control of the contacts 3284 of the control relay R3280, at its contacts 3291 it interrupts a point in the previously traced initial energizing circuit for the winding of the control relay R3310 or R3260, depending upon whether the control relay R3270 is operated or restored. Also, upon restoring, relay R3290 interrupts, at its contacts 3293, the previously traced paths for applying ground potential to the marking conductors C3365 and C3366; and, at its contacts 3292 it reprepares the previously traced path for applying ground potential to the pulse conductor C3363.

As a result of the above-described operation of the control relay R3310, at its contacts 3313, it prepares a point in a path, traced hereinafter, for applying ground potential to the marking conductors C3365 and C3367; and, at its contacts 3314, it applies ground potential to the conductor C3368, thereby to complete an energizing circuit for the winding of one of the ten D relays 0D to 9D, inclusive, depending upon the particular operated one of the ten test lock relays 0S to 9S, inclusive. In the present example the tenth test lock relay 0S occupies its operated position and, accordingly, the application of ground potential to the conductor C3368 is extended by way of the contacts 0S4, the conductor C3700 of the cable 3701, and the winding of the tenth D relay 0D, to battery. When thus energized the tenth D relay 0D operates to connect the tenth group of 100 test leads to the riser cable 3000, for a purpose more fully explained hereinafter.

Each time the pulse relay R3315 now operates and restores it completes and then interrupts, at its contacts 3317, the previously traced path for applying ground potential to the pulse conductor C3363, whereby the step relays 1K, 2K, etc., are operated sequentially and locked in series with the associated cycle relays KA, KB, KC or KD, in the manner previously explained. At this time the first step relay 1K upon operating, at its contacts 1K1, completes a circuit, including the contacts KA5 and 3716, for applying ground potential to the first conductor in the marking cable 3901, thereby to complete an energizing circuit for the first E relay 1E in the associated group of ten E relays. As a result of the operation of the first E relay in the group, the first group of ten conductors in the riser cable 3000 is tested. The group mentioned comprises one of ten groups of ten conductors in the riser cable 3000 which is connected, by way of the operated tenth D relay 0D, to the tenth group of 100 test leads which is connected by way of the operated tenth A relay 00A to the "0" hundred group of S leads in the "0" thousand group. This group of S leads includes the S lead S433 extending to the line switch 423 individually associated with the calling private subscriber line 407, as previously noted.

Similarly, upon operating, the second step relay 2K completes, at its contacts 2K1, a circuit including the contacts KB5 and 3713 for applying ground potential to the second conductor in the marking cable 3901, thereby to complete a circuit for energizing the winding of the second E relay 2E in the associated group of ten E relays, in order to cause the latter relay to operate, whereby the second group of ten conductors in the riser cable 3000 is tested, in the manner explained above. Finally, the ninth step relay 9K completes, at its contacts 9K1, a circuit including the contacts KC5 and 3711 for applying ground potential to the ninth marking conductor C3819 in the marking cable 3901, thereby to complete a circuit for energizing the winding of the ninth E relay 9E in the associated group of ten E relays, in order to cause the latter relay to operate, whereby the ninth group of ten conductors in the riser cable 3000 is tested.

More particularly, when the ninth E relay 9E operates, at its associated contacts it completes connections between the ten conductors in the ninth group of ten conductors in the riser cable 3000 and the respective ten test conductors C3500 to C3509, inclusive. At this time the tenth group ("0" hundred) of S leads in the "0" thousand group is connected, by way of the operated tenth A relay 00A, to the corresponding tenth group of 100 test leads; the ten groups of ten test conductors in the tenth group of 100 test conductors are connected by the operated tenth D relay 0D to the ten groups of ten conductors in the riser cable 3000; and the ten conductors in the ninth group of conductors in the riser cable 3000 are respectively connected by the ninth E relay 9E to the respective ten test conductors C3500 to C3509, inclusive. Hence, at this time a circuit is completed for operating the ninth amplifier 9AMP in view of the fact that the S lead S433 extending to the line switch 423, individually associated with the private subscriber line 407, has a tone signal applied thereto, the last two digits of the numerical portion of the directory number of the private subscriber line 407 being "99."

The ninth amplifier 9AMP operates, in response to the tone signal transmitted over the conductor C3509, and causes the operation of the ninth test stop relay 9R. Upon operating, the relay 9R, at its contacts 9R2, completes a circuit, including the contacts 3312, for energizing the left-hand winding of the test mark relay 9T. When thus energized the test mark relay 9T operates to complete, at its contacts 9T1, a circuit, including the contacts 3233, for energizing the right-hand winding thereof in series with the test relay R3250. When this series circuit is completed the test mark relay 9T is retained in its operated position and the test relay R3250 operates. At this point it is noted that the test relay R3250 is short-circuited from ground at the contacts 3233 by way of the winding of the test relay R3250, and the contacts 3255, 3285, 3225 and 3318, each time the pulse relay R3315 is operated, and the short-circuit is removed therefrom each time the pulse relay R3315 restores. Consequently, the test relay R3250 is not operated in the manner described above until after the ninth restoration of the pulse relay R3315. When the test relay R3250 operates, at its contacts 3255 it interrupts a further point in the above-mentioned circuit for short-circuiting the winding thereof; and, at its contacts 3254, it completes a circuit, including the contacts 3283, for energizing the winding of the mark relay R3290, thereby to cause the latter relay to operate.

When the mark relay R3290 is thus operated, at its contacts 3292 it interrupts a further point in the previously mentioned path for applying ground potential to the pulse conductor C3363, thereby positively to arrest further operation of the step relays 0K to 9K, inclusive, at this time. Also, at its contacts 3291, the mark relay R3290 prepares a further point in the previously mentioned circuit for energizing the winding of the control relay R3260; and, at its contacts 3293, it completes the previously mentioned path for applying ground potential to the marking conductors C3365 and C3367. The application of ground potential to the marking conductor C3365 is effective to complete a path for applying ground potential to certain of the WXYZ conductors in the third group of marking leads 3802, depending upon the particular operated one of the step relays 0K to 9K, inclusive, at this time. In the present example the ninth step relay 9K occupies its operated position over a holding circuit including the winding of the cycle relay KC. Accordingly, the ground potential appearing upon the marking conductor C3365 is applied by way of the contacts 9K5 and 3813 to the Y conductor in the third group of marking leads 3802. The application of ground potential to the Y conductor in the third group of marking leads 3802 corresponds to the digit "9" and causes the digit "9" to be registered in the third code storage device S2803 in the register translator 1700, in the manner previously explained. The application of ground potential to the conductor C3367 is effective to complete a path for applying ground potential to certain of the WXYZ conductors in the fourth group of marking leads 3601, depending upon the particular operated ones of the test mark relay 0T to 9T, inclusive, at this time. The particular one of the test mark relays which is operated at the present time is the test mark relay 9T which was operated under control of the ninth amplifier 9AMP during the above-described test operation of the detector 2900. Consequently, the ninth test mark relay 9T occupies its operated position over a series holding circuit which includes its right-hand winding and the winding of the test relay R3250. Hence, in the present example, the ground potential appearing upon the marking conductor C3367 is applied by way of the contacts 9T2 to the Y conductor in the fourth group of marking leads 3601. The application of ground potential to the Y conductor in the fourth group of marking leads 3601 corresponds to the digit "9" and is effective to cause the digit "9" to be registered in the fourth code storage device S2804 in the register translator 1700.

Upon the next operation of the pulse relay R3315, at its contacts 3317, it completes the previously mentioned circuit, including the contacts 3223, 3291 and 3274, for energizing the winding of the control relay R3260, thereby to cause the latter relay to operate and complete, at its contacts 3261, a circuit path, including the winding of the control relay R3270, the contacts 3253 and ground at the contacts 3232, for short-circuiting the winding of the control relay R3270. Upon the next restoration of the pulse relay R3315, at its contacts 3317, the previously traced original operating circuit for energizing the winding of the control relay R3260 is interrupted, whereupon the short-circuit is removed from the control relay R3270, and the latter relay energizes in series with the winding of the control relay R3260. When this circuit is completed the control relay R3260 is retained in its operated position and the control relay R3270 operates.

The control relay R3270, upon operating, at its contacts 3275, interrupts the previously mentioned path for applying ground potential to the hold conductor C3364, thereby to interrupt the series holding circuit, including the winding of the ninth step relay 9K and the winding of the cycle relay KC, whereupon the latter relays restore to normal. Also, the control relay R3270, at its contacts 3272, interrupts a further point in the path for energizing the pulse relay R3315, the multiple operating ground for the pulse relay R3315 having been removed at the contacts 3252 in response to the operation of the test relay R3250. Consequently, the operation of the test relay R3250 and the control relay R3270 interrupts, at the contacts 3252 and 3272, respectively, the circuit for the pulse relay R3315, thereby positively to arrest further operation of the latter relay at this time. The relay R3270, at its contacts 3273, prepares a point in the circuit for the control relay R3310, but this circuit is without effect at this time due to the fact that the operation of the pulse relay R3315 has been arrested; and, finally, at its contacts 3271 the relay R3270 completes a path, including the contacts 3251, for applying ground potential to the conductor C3201 extending to Fig. 28 of the register translator 1700, thereby to cause the operation of the detector release relay R2240, in a manner to be described hereinafter.

Referring to Fig. 28, it is noted that the ground potential applied to the conductor C3201 is extended by way of the contacts 2855 to the winding of the detector release relay R2240 in the register translator 1700. The relay R2240 operates over this circuit and, at its contacts 2243, completes a holding circuit for itself from ground at the contacts 1761'; and, at its contacts 2244 it interrupts the previously traced path for applying ground potential to the start conductor C3202 extending to Fig. 31 of the detector 2900. Further, the detector release relay R2240, at its contacts 2242, interrupts the previously traced circuit for energizing in series the winding of the detector test relay R2230 in the register translator 1700 and the winding of the stop relay R3220 in the detector 2900, thereby to cause the relays mentioned to restore. Also, the relay R2240, at its contacts 2241, completes a circuit, including the contacts 2036, 1763 and 1852, for energizing the lower winding of the code pulse relay R1850, and a multiple path for discharging the condenser 1854 through the upper winding of the code pulse relay R1850.

When thus energized the code pulse relay R1850 operates to interrupt, at its contacts 1852, the above-traced circuit for energizing the lower winding thereof and the previously traced multiple path for short-circuiting the condenser 1854 through the upper winding thereof, whereupon the condenser 1854 is charged over a circuit, including the upper and lower windings of the relay R1850 in series, in order to cause the latter relay to restore shortly thereafter. Hence the code pulse relay R1850 operates and restores intermittently at a predetermined rate, depending upon the characteristics of the associated condenser 1854, for a purpose more fully explained hereinafter.

In response to the restoration of the detector test relay R2230, at its contacts 2231 it interrupts the previously traced circuit for energizing the storage relay R2850, whereupon the latter relay restores to normal. Upon restoring, the storage relay R2850, at its contacts 2855, interrupts the previously traced initial circuit for energizing the detector release relay R2240; at its contacts 2856 it interrupts a further point in the previously mentioned circuit for energizing the detector failure relay R2250; and, at its contacts 2852, it interrupts the previously traced test circuit, including the S lead S433 extending to the line switch 423 individually associated with the private subscriber line 407, whereupon the ninth amplifier 9AMP in the detector 2900 is released in order to effect the restoration of its associated test stop relay 9R. Also, the storage relay R2850 interrupts, at its contacts 2853*a* to 2853*p*, inclusive, the previously traced connections between the four groups of WXYZ marking leads 3601, 3802, 3701 and 3801, and the respective code storage devices S2804, S2803, S2802 and S2801. Finally, the storage relay R2850 interrupts, at its contacts 2857*a* to 2857*d*, inclusive, the connections between the conductors C2641 to C2644, inclusive, extending to the party switch N2620 in the register translator 1700, and the hold conductors C3401 to C3404, inclusive, extending to the detector 2900.

Continuing now with the release of the detector 2900, when ground potential is removed from the start conductor C3202 the start relay R3210 restores, thereby to interrupt, at its contacts 3212, the previously traced holding circuit for energizing the winding of the cycle relay FD in series with the winding of the finder relay 6F, thereby to cause the latter relays to restore. Also, the relay R3210, at its contacts 3211, interrupts a further point in the previously traced energizing circuit for the pulse relay R3315. As a result of the restoration of the stop relay R3220, at its contacts 3222, it interrupts the circuit for the hold relay R3230, whereupon the latter relay also restores. Upon restoring, the hold relay R3230, at its contacts 3232, interrupts the previously traced series circuit for the control relays R3260 and R3270 and the previously traced series holding circuit for the control relay R3280 and the control relay R3310, thereby to cause the latter relays to restore to normal. Also, the hold relay R3230, at its contacts 3233, interrupts the previously traced holding circuit for energizing the winding of the test relay R3240 in series with the right-hand winding of the test lock relay 0S, and the previously traced multiple holding circuit for energizing the test relay R3250 in series with the right-hand winding of the ninth test mark relay 9T, thereby to cause the relays mentioned to restore to normal. When the control relay R3270 restores to normal, at its contacts 3271, it interrupts the previously mentioned path for applying ground potential to the conductor C3201 extending to Fig. 28 of the register translator 1700. As a result of the restoration of the test relay R3240, at its contacts 3241, it interrupts the previously traced circuit for energizing the winding of the switch relay R3710, thereby to cause the latter relay to restore. The control relay R3280, upon restoring, at its contacts 3282, interrupts the previously traced circuit for energizing the winding of the switch relay R3810, thereby to cause the latter relay to restore. When the tenth test lock relay 0S restores to normal, at its contacts 0S5, it interrupts the previously traced holding circuit for energizing the winding of the tenth A relay 00A, thereby to cause the latter relay to restore; and, at its contacts 0S4, it interrupts the previously traced holding circuit for energizing the winding of the tenth D relay 0D, thereby to cause the latter relay to restore. Finally, when the ninth step relay 9K restores it interrupts, at its contacts 9K1, a further point in the previously traced circuit for momentarily energizing the winding of the ninth E relay 9E, thereby to cause the latter relay to restore. At this time the detector 2900 is completely released and is available for further use.

In view of the foregoing explanation of the mode of operation of the detector 2900, it will be understood that it operated to detect the numerical portion of the directory number of the private subscriber line 407 extending to the calling private subscriber substation TP, and effected the registration of the detected numerical portion of the directory number mentioned in the code storage devices S2801 to S2804, inclusive, in the register translator 1700. More particularly, at this time the four digits "0099" representing the numerical portion of the directory number of the private subscriber line 407 are respectively registered in the code storage devices S2801 to S2804, inclusive, in the register translator 1700.

In view of the foregoing explanation of the mode of operation of the detector 2900 to detect the numerical portion of the directory number of the calling subscriber line 407, it will be understood that the step relays 0K to 9K inclusive, are operated through a first cycle to detect the thousand digit of the directory number in conjunction with the amplifiers 0AMP to 9AMP, inclusive, which detect the hundred digit in the directory number, and then the step relays 0K to 9K, inclusive, are operated through a second cycle to detect the ten digit of the directory number in conjunction with the amplifiers 0AMP to 9AMP, inclusive, which, during the second cycle, detect the unit digit of the directory number. During either the first test or the second test of the step relays 0K to 9K, inclusive, should these relays operate through a first complete cycle and fail to make a detection, in the manner explained above, a second operation thereof would be initiated.

For example, if at the beginning of the second cycle of the operation of the step relays 0K to 9K, inclusive, a tone signal has not been received by the amplifiers 0AMP to 9AMP, inclusive, the mark relay R3290 is not operated and, consequently, the control relays R3260 and R3270 remain in their restored positions. As a result thereof the ground potential applied, by way of the contacts 3232 and 3275, to the hold conductor C3364 maintains the cycle relay KD in its operated position in series with the tenth step relay 0K. At its contacts KD6 the cycle relay KD prepares a circuit for the first test relay R3340. If the next pulse is received over the conductor C3364 at the beginning of the second cycle of operation of the step relays 0K to 9K, inclusive, the first step relay 1K would operate while the tenth step relay 0K and the cycle relay KD occupy their operated positions. In this event, upon operating, the first step relay 1K completes, at its contacts 1K7, a circuit, including the contacts KD6 and 3346, for energizing the winding of the first test relay R3340, thereby to cause the latter relay to operate. Upon operating, the first test relay R3340 completes, at its contacts 3341, an obvious path, including the grounded hold conductor C3364, for short-circuiting the winding of the lock relay R3345. When ground is removed from the conductor C3363 at the end of the first pulse, the step relay 1K is maintained in its operated position over a circuit which includes the winding of the cycle relay KA. The cycle relay KA is operated over this circuit and, at its contacts KA4, interrupts the series circuit including the windings of the cycle relay KD and the step relay 0K, causing the latter relays to restore to normal. When the cycle relay KD restores it interrupts, at its contacts KD6, the above-traced initial circuit for energizing the winding of the first test relay R3340, whereupon a series circuit, including the grounded hold conductor C3364, the winding of the lock relay R3345, the contacts 3341, and the winding of the first test relay R3340, is completed for energizing the relays mentioned. When this series circuit is completed the first test relay R3340 is retained in its operated position and the lock relay R3345 operates. Upon operating, the lock relay R3345, at its contacts 3346, interrupts a further point in the previously traced initial energizing circuit for the first test relay R3340; and, at its contacts 3347, it prepares a point in a circuit, traced hereinafter, for energizing the winding of the second test relay R3350.

During the second cycle of operation mentioned of the step relays 0K to 9K, inclusive, in the event a detection is made by one of the ten amplifiers 0AMP to 9AMP, inclusive, the mark relay R3290 operates and, in turn, causes the operation of the control relays R3260 and R3270. The control relay R3270, upon operating, at its contacts 3275, interrupts the previously traced path for applying ground potential to the hold conductor C3364, as previously explained, whereby the previously traced holding circuit for energizing the winding of the lock relay R3345 in series with the winding of the first test relay R3340 is interrupted in order to cause the latter relays to restore. Also, incident to the foregoing operation of removing ground potential from the conductor C3364, the operated one of the step relays 0K to 9K, inclusive, and the operated one of the cycle relays KA, KB, KC and KD are restored, all in the manner previously explained. On the other hand, in the event no detection is made by the amplifiers 0AMP to 9AMP, inclusive, during the second cycle of operation of the step relays 0K to 9K, inclusive, a third cycle of operation thereof is initiated. At the beginning of the third cycle of operation of the cycle relays 0K to 9K, inclusive, the first step relay 1K is operated by a ground pulse transmitted over the conductor C3363 while the tenth step relay 0K and the associated cycle relay KD occupy their operated positions. In this event the first step relay 1K, upon operating at the contacts 1K7, completes the previously mentioned circuit, including the contacts KD6 and 3347, for energizing the winding of the second test relay R3350. When thus energized the second test relay R3350 operates to complete, at its contacts 3354, a locking circuit for itself, including the grounded hold conductor C3364. Also, the second test relay R3350 completes, at its contacts 3353, an obvious circuit for energizing the winding of the alarm relay R3360, thereby to cause the latter relay to operate and complete, at its contacts 3361, an obvious locking circuit for itself, including the reset key K3370. Also, the alarm relay R3360, at its contacts 3362, completes an obvious circuit for operating the alarm A3375, thereby to indicate to the exchange attendant that the detector 2900 has operated and failed to detect the directory number of a calling subscriber line. Further, the second test relay R3350, at its contacts 3352, interrupts the previously traced circuit for energizing the pulse relay R3315, thereby to arrest further operation of the latter relay at this time. Finally, the second test relay R3350 completes, at its contacts 3351, a circuit for applying ground potential to the conductor C3301 extending to Fig. 28 of the register translator 1700.

Referring to Fig. 28 of the register translator, it is noted that the ground potential applied to conductor C3301 is extended by way of the contacts 2856 to the winding of the detector failure to relay R2250. The detector failure to relay R2250 operates, thereby to complete, at its contacts 2252, an obvious locking circuit for itself including ground at the contacts 2137 of the hold relay R2130. As a further result of the operation of the detector failure relay R2250, at its contacts 2251, it interrupts the previously traced circuit for energizing the winding of the detector test relay R2230 in the register translator 1700 in series with the stop relay R3220 in the detector 2900, whereby the relays mentioned restore and the detector 2900 is released, in the manner previously explained. Also, the operation of the detector failure relay R2250 in the register translator 1700 effects certain operations of the apparatus therein disclosed, in order to cause the call initiated by the calling private subscriber substation TP to be intercepted, which operation is described in detail hereinafter.

The exchange attendant may replace the detector 2900 in service by momentarily operating the reset key K3370, thereby to interrupt the previously mentioned holding circuit for the alarm relay R3360 in order to cause the latter relay to restore. Upon restoring, the alarm relay R3360, at its contacts 3362, interrupts the previously mentioned circuit for operating the alarm A3375 and, at its contacts 3361, it interrupts a further point in the previously traced holding circuit for itself, including the key K3370. It may be well to mention at this time, however, that the restoration of the stop relay R3220 caused the hold relay R3230 to restore, and the latter relay, at its contacts 3232, removes the holding ground from the conductor C3364 to permit the second test relay R3350, and other relays which may be held in their operated position from ground on this conductor, to restore to normal.

*Detailed operation of the tenth amplifier 0AMP and the oscillator*

Figure 31A:
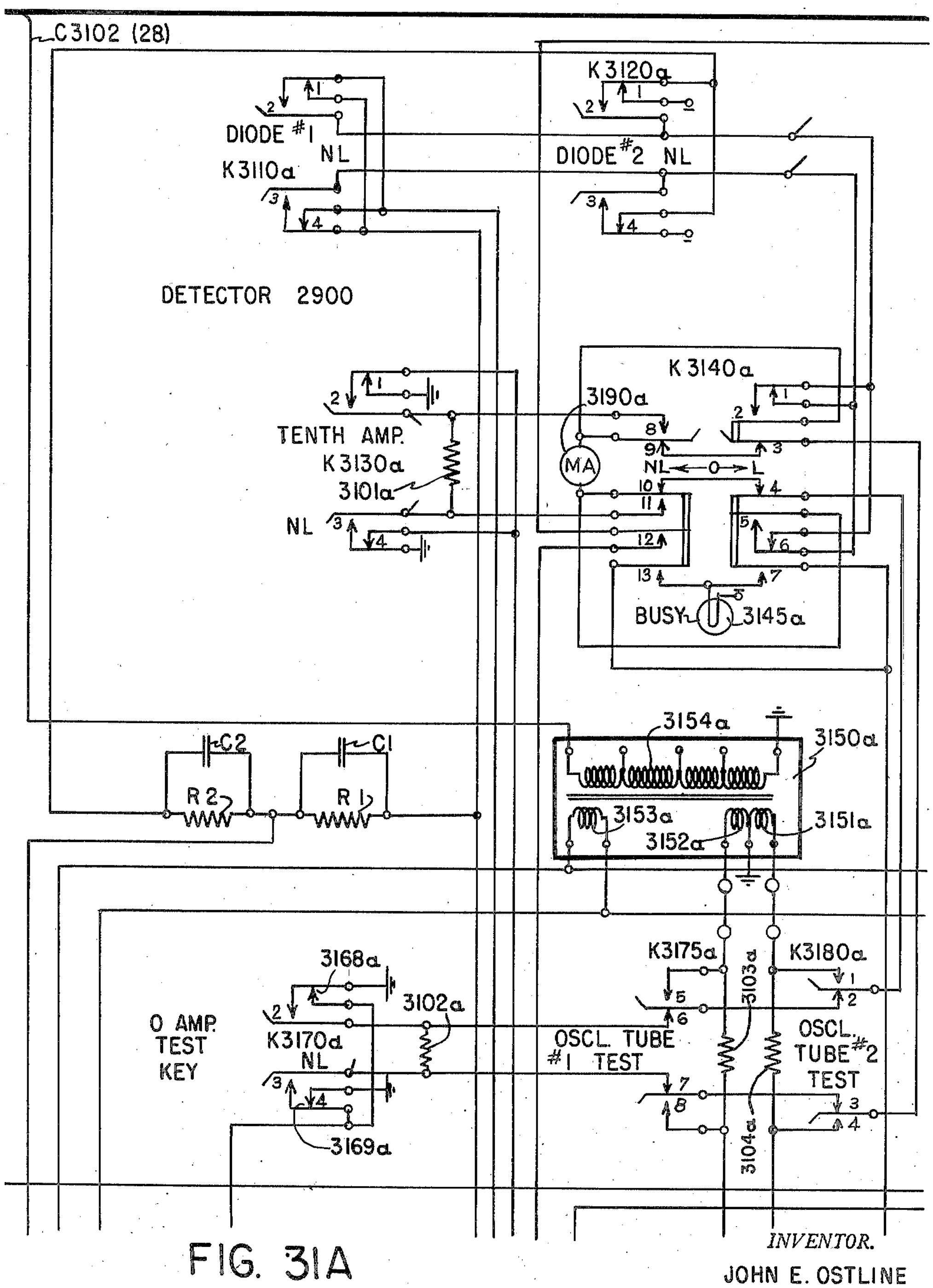
Figure 32:
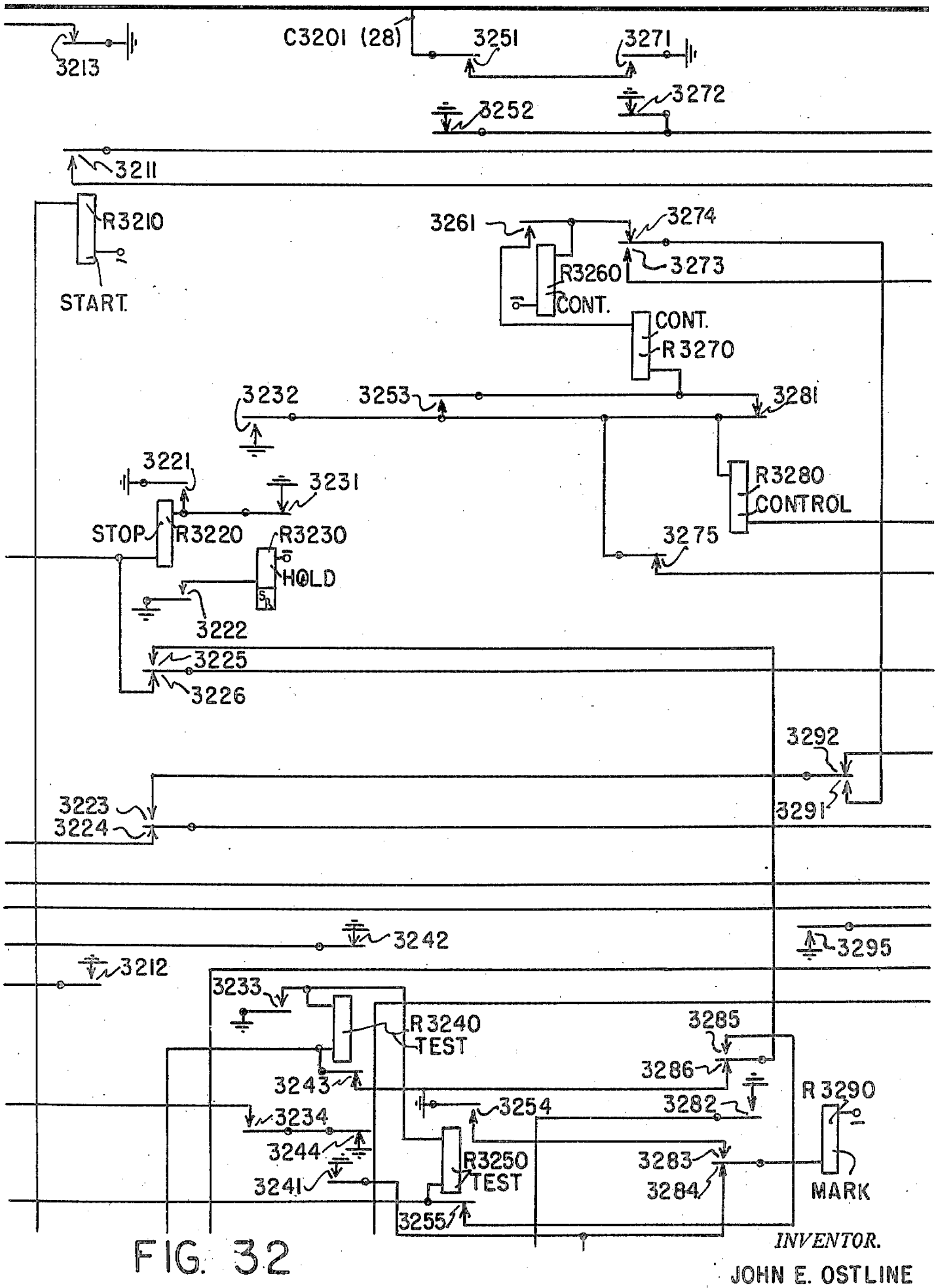
Figure 33:
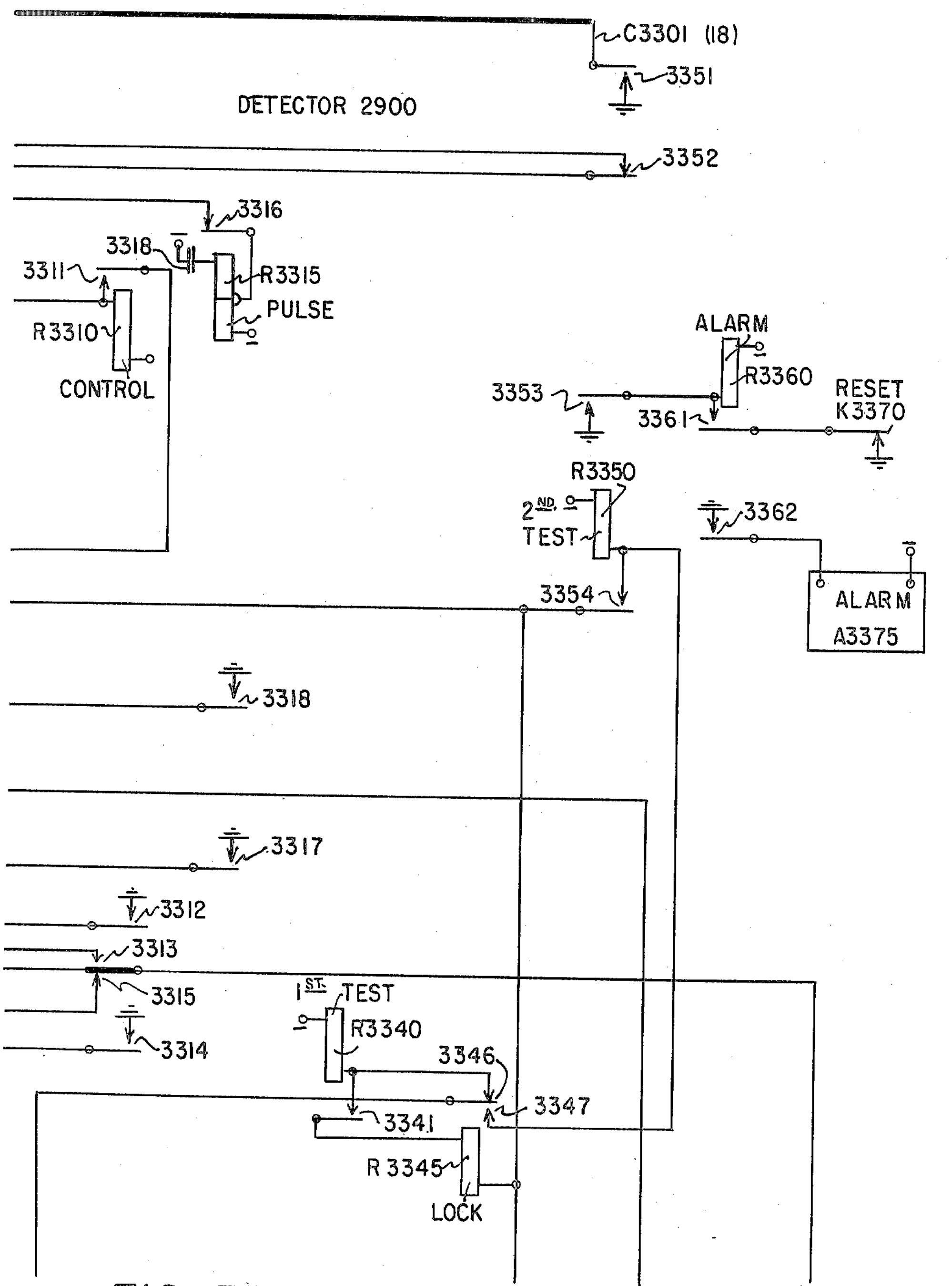
Figure 34:
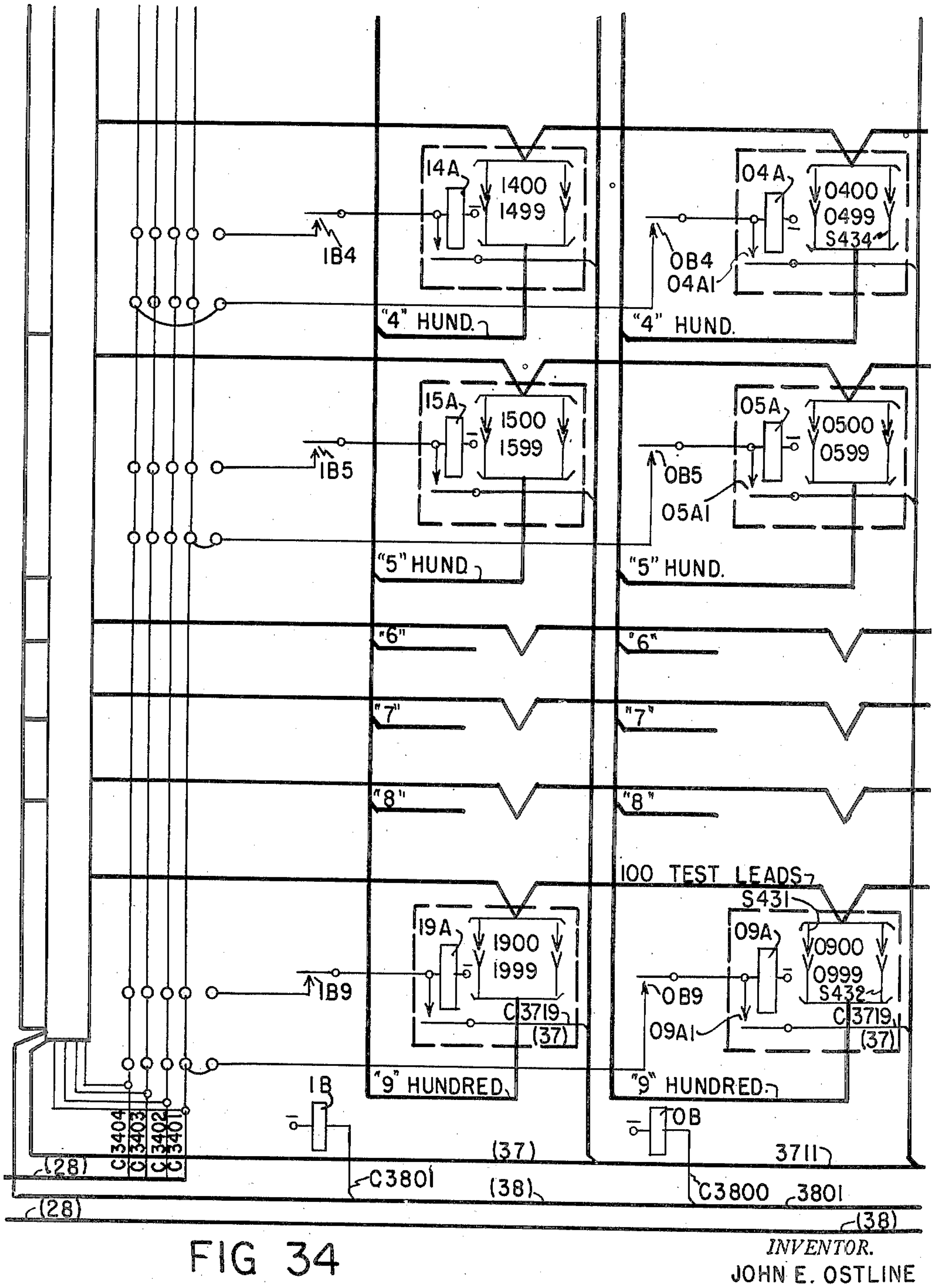
Figure 35:
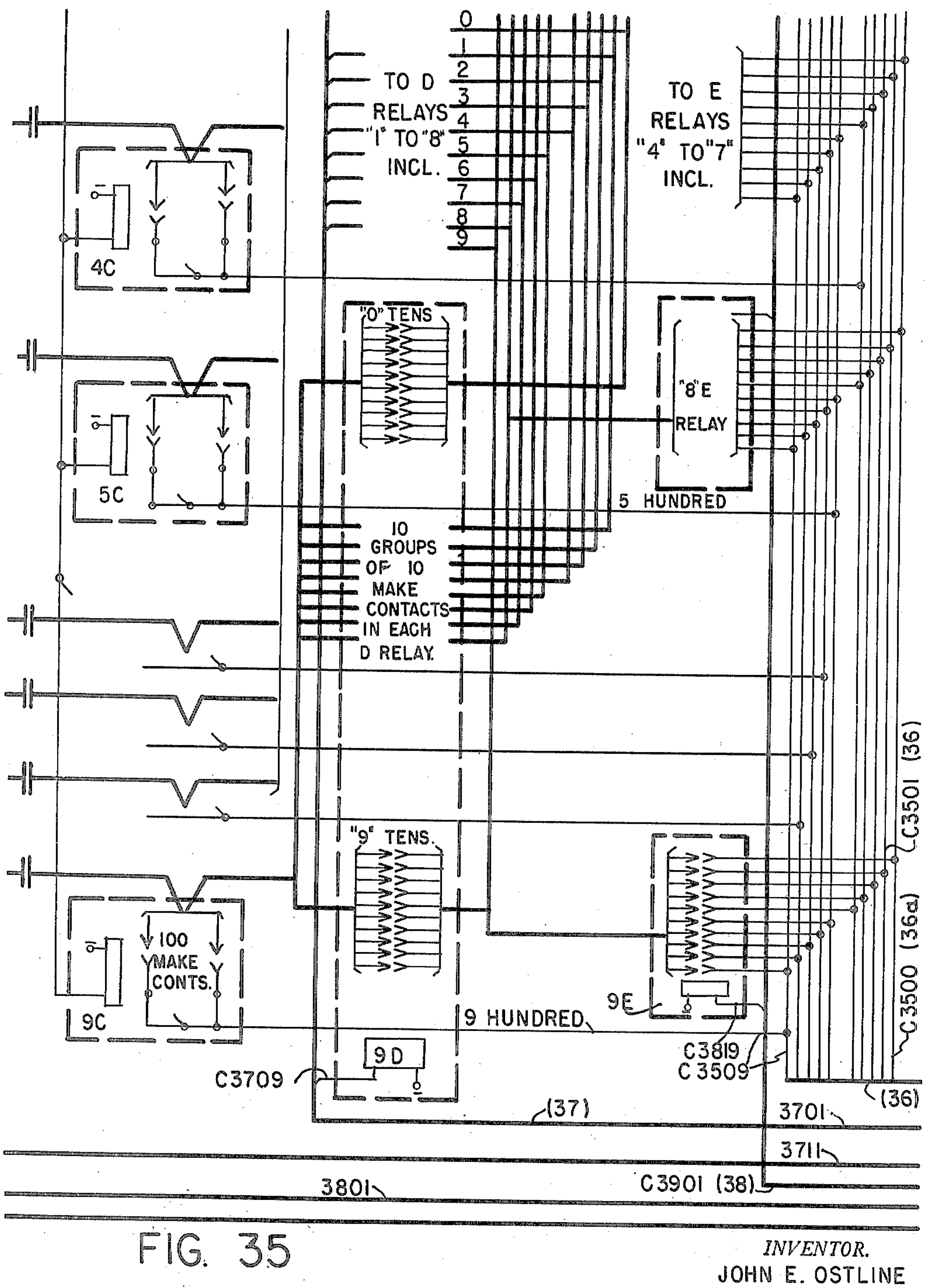
Figure 36A:
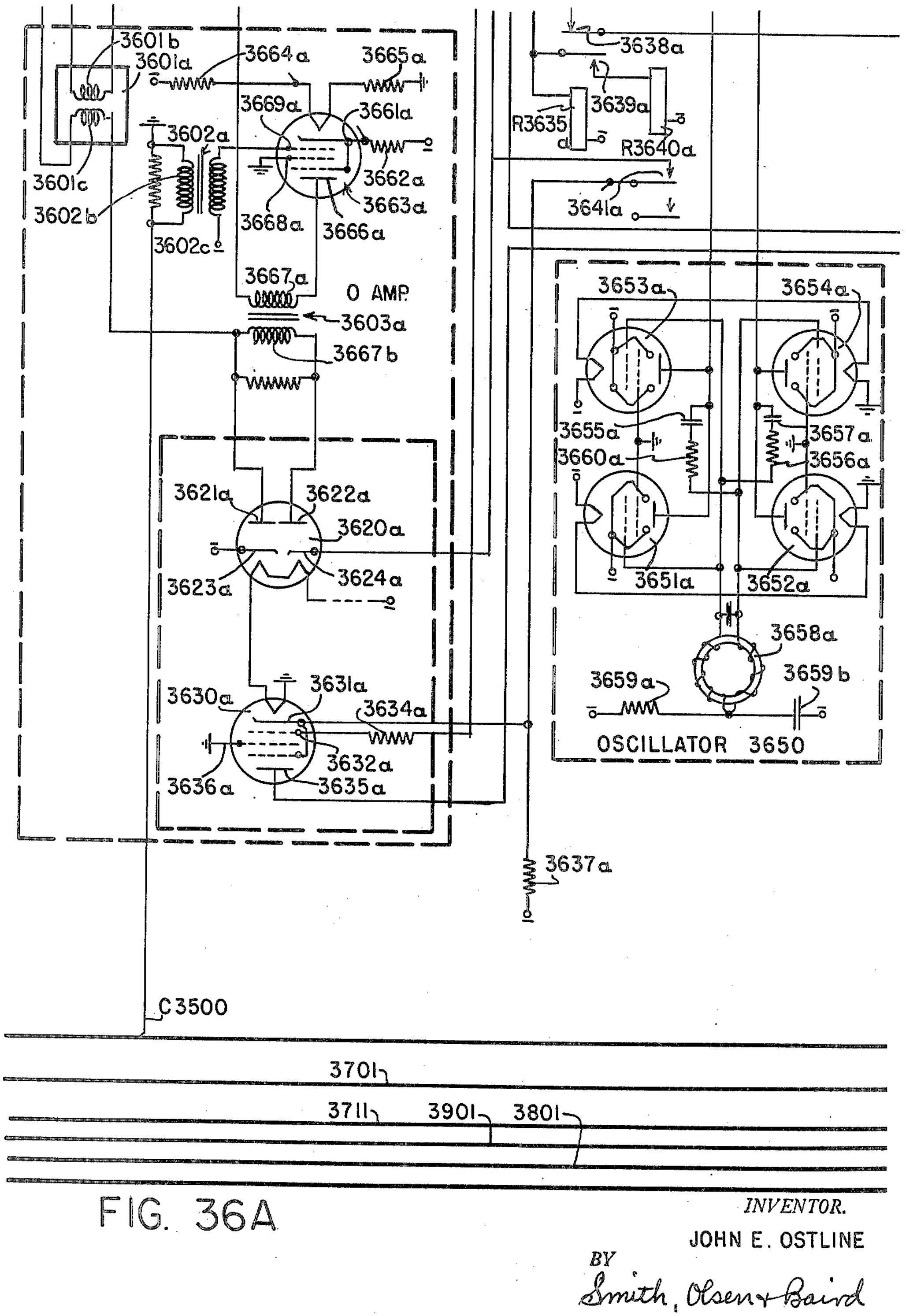
Figure 37:
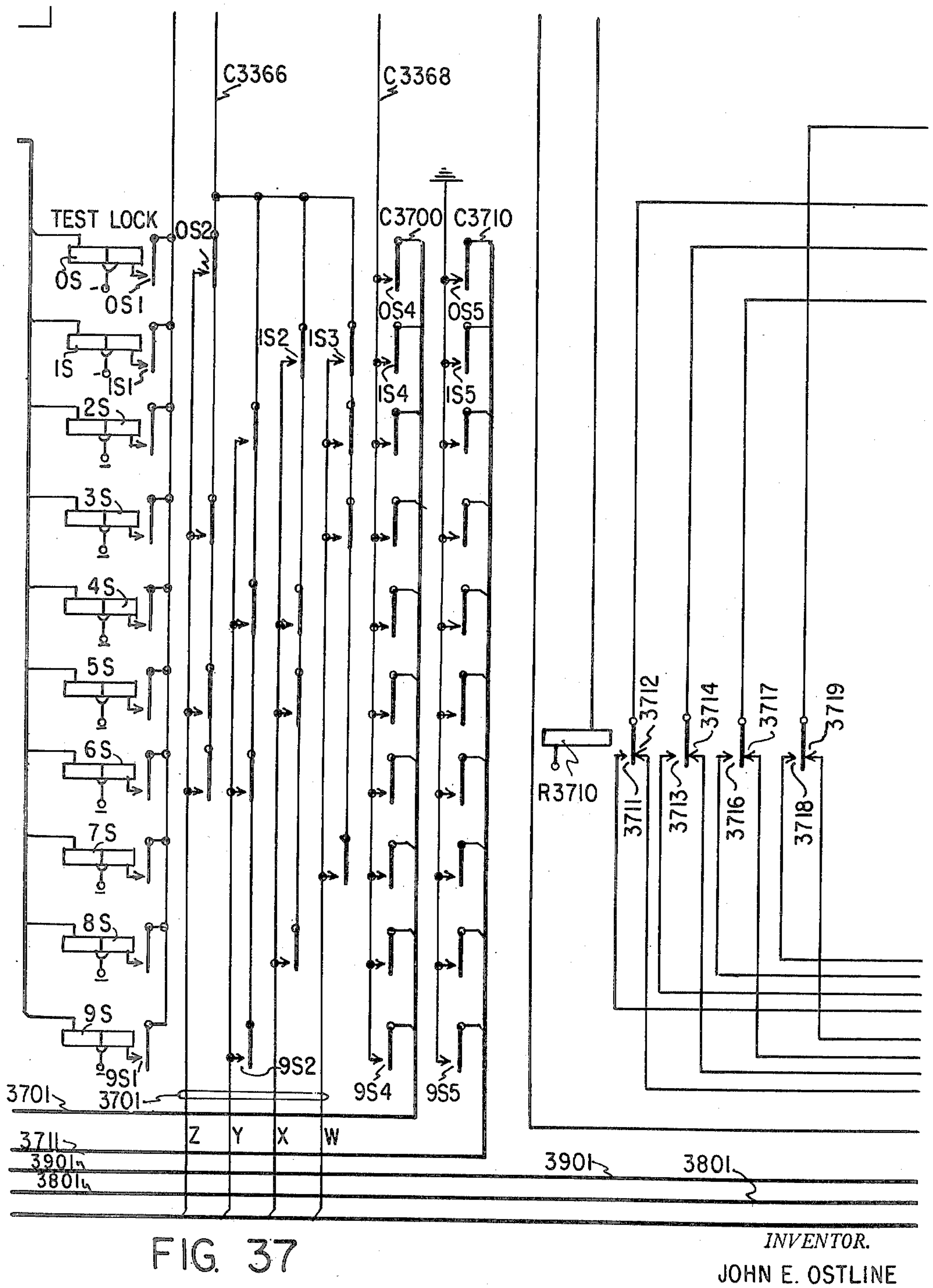
Figure 38:
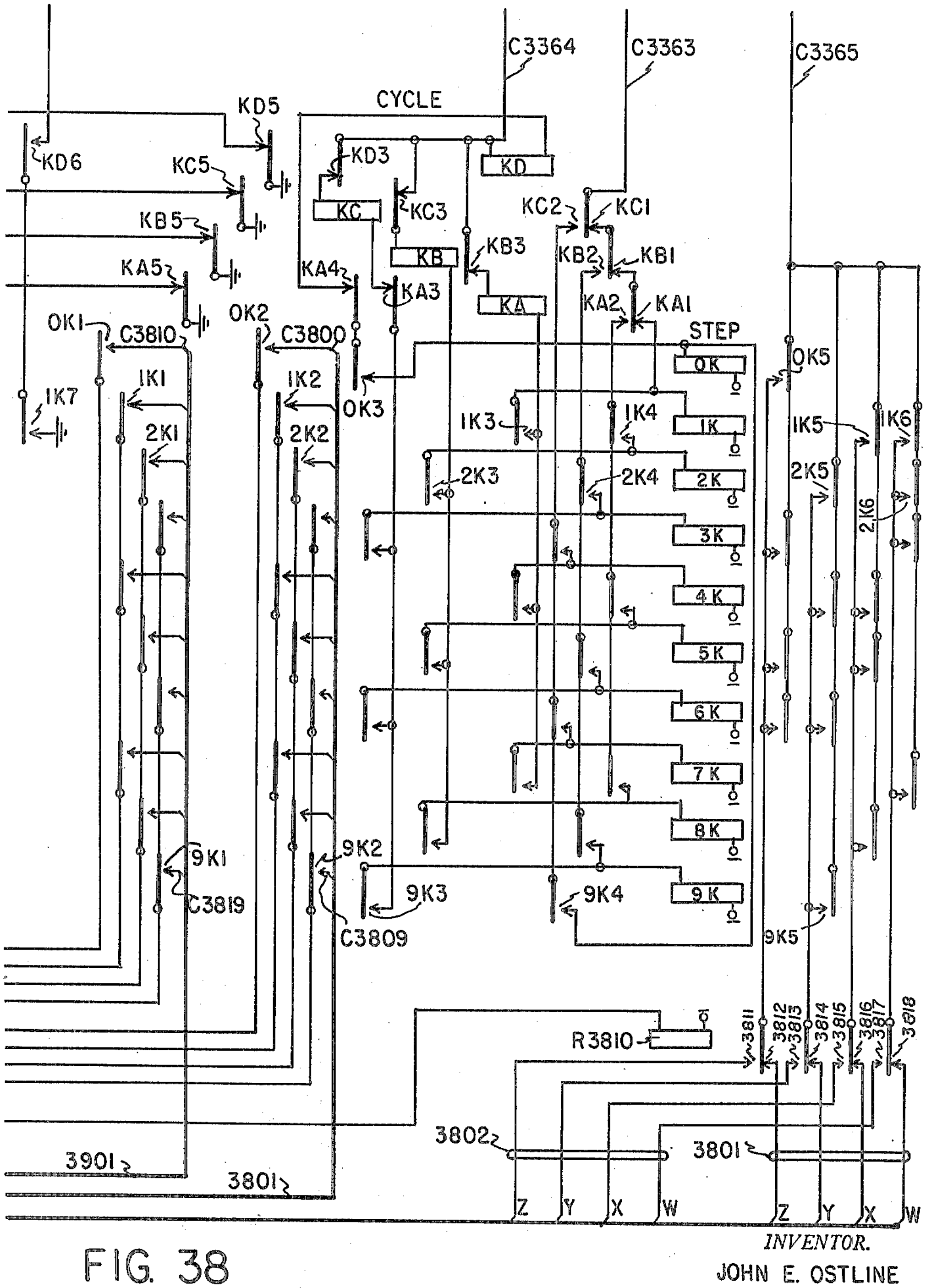

Referring to Figs. 31A and 36A of the detector 2900, it is noted that the push-pull oscillator 3650 comprises a pair of vacuum tubes 3651*a* and 3652*a* which are connected in such a manner that a portion of the output of the tube 3651*a* is fed to the control grid of the tube 3652*a*, and a portion of the output of the tube 3652*a* is in turn fed to the control grid of the tube 3651*a*. Also, it is noted that a pair of auxiliary vacuum tubes 3653*a* and 3654*a* are connected in parallel respectively with the tubes 3651*a* and 3652*a*, in order to provide an auxiliary push-pull oscillator which is connected in multiple with the push-pull oscillator comprising the tubes 3651*a* and 3652*a*. In this circuit the control grids of the tubes 3651*a* to 3654*a*, inclusive are biased negatively over a circuit including negative battery connected in series with the grid leak 3659*a*, which, in turn, is shunted by the grid condenser 3659*b* and the windings of the loading coil 3658*a*. Negative potential is also applied to the cathodes of the various tubes, and the screen grids thereof are respectively connected to ground potential. The filament circuits for the tubes 3651*a* and 3652*a* and the tubes 3653*a* and 3654*a* are respectively connected in series so that in the event the filament of one tube of the pair burns out the associated tube, included in that filament circuit of the burned-out tube, is automatically rendered ineffective. The anode electrodes of the tubes 3652*a* and 3654*a* are multiply connected by way of the resistor 3104*a* and the right-hand windings 3151*a* of the transformer 3150*a* to ground, and the anode electrodes of the tubes 3651*a* and 3653*a* are multiply connected by way of the resistor 3103*a* and the left-hand winding 3152*a* of the transformer 3150*a* to ground. Accordingly, the combined output of the tubes 3651*a* and 3653*a* includes the left-hand winding 3151*a* of the transformer 3150*a*, and the combined output of the tubes 3652*a* and 3654*a* includes the right-hand winding 3151*a* of the transformer 3150*a*. It is to be noted, however, that a portion of the combined output of the tubes 3652*a* and 3654*a* is fed by way of the condenser 3657*a* and the resistor 3656*a* to the control grids of the tubes 3651*a* and 3653*a*. Also, it is noted that a portion of the combined output of the tubes 3651*a* and 3653*a* is fed by way of the condenser 3655*a* and the resistor 3660*a* to the control grids of the tubes 3652*a* and 3654*a*. The principle of operation of a push-pull oscillator of the type described is well known and it is not deemed necessary to describe the detailed operation thereof herein. It may be mentioned, however, that conduction is alternately switched from one set of tubes to the other so that continuous oscillation is maintained at a rather high frequency. In the push-pull oscillator described above, the values of the component parts thereof have been selected so that the frequency derived at the transformer 3150*a* is such that a tone signal in the order of 5,000 cycles per second is obtained. The transformer 3150*a* is so arranged that the 5,000 cycle tone signal generated in the windings 3151*a* and 3152*a* thereof is transmitted by induction through the winding 3154*a* of the transformer 3150*a* over the conductor C3102 extending to Fig. 28 of the register translator 1700. In addition thereto the 5,000 cycle tone signal generated in the windings 3151*a* and 3152*a* of the transformer 3150*a* is transmitted by induction through the winding 3153*a* of the transformer 3150*a* to the multiply connected tone signal transformers of the ten amplifiers 0AMP to 9AMP, inclusive. In the present example the tone signal transformer 3601*a* of the tenth amplifier 0AMP is illustrated in detail and the remaining nine amplifiers 1AMP to 9AMP, inclusive, have been diagrammatically illustrated.

Considering now in greater detail the operation of the tenth amplifier 0AMP illustrated, it is noted that this amplifier constitutes one of the ten amplifiers or detector units. In the amplifier or detector unit 0AMP the cathode 3661*a* of the driver tube 3663*a* is heated by an associated heater provided with a normally completed circuit including the resistors 3664*a* and 3665*a*, whereby the cathode 3661*a* is rendered electron emissive. The plate 3666*a* of the driver tube 3663*a* is connected by way of the primary winding 3667*a* of the coupling transformer 3603*a* to ground potential, by way of the contacts 3168*a* and 3169*a* of the 0AMP test key K3170*a*. The screen grid 3668*a* of the driver tube 3663*a* is connected directly to ground potential, while the control grid 3669*a* of the driver tube 3663*a* is connected by way of the secondary winding 3602*c* of the coupling transformer 3602*a*, to battery potential. Accordingly the control grid 3669*a* is normally biased to a negative potential with respect to the cathode 3661*a* by an amount equal to the voltage drop across the cathode biasing resistor 3662*a*, which is voltage sufficient to bias the driver tube 3663*a* to approximately the midpoint of the linear portion of its operating characteristic.

It will be recalled that the oscillator 3650 operates to supply 5,000 cycle alternating current to the windings 3151*a* and 3152*a* of the coupling transformer 3150*a*, whereby the 5,000 cycle alternating current traverses the winding 3153*a* of the transformer 3150*a* and the winding 3601*b* of the coupling transformer 3601*a* in the amplifier 0AMP. The 5,000 cycle alternating current traversing the primary winding 3601*b* of the coupling transformer 3601*a* induces a corresponding alternating voltage in the secondary winding 3601*c* thereof. One terminal of the secondary winding 3601*c* of the coupling transformer 3601*a* is connected to the midpoint between the resistors R1 and R2 and to the midpoint between the condensers C1 and C2, while the other terminal of the secondary winding 3601*c* of the coupling transformer 3601*a* is connected directly to the plate 3621*a* of the rectifier tube 3620*a*, and via the secondary winding 3667*b* of the coupling transformer 3603*a* to the plate 3622*a* of the rectifier tube 3620*a*. The resistor R1 and the condenser C1 are connected in parallel, and the resistor R2 and the condenser C2 are connected in parallel to form a bridge circuit, one terminal of this bridge circuit being common to the resistor R1 and the condenser C1 and being connected to the cathode 3624*a* of the rectifier tube 3620*a* by way of the normally closed contacts of the diode 1 key K3110*a*; the other terminal of this bridge circuit being common to the resistor R2 and the condenser C2 and being connected to negative battery potential by way of the normally closed contacts of the diode 2 key K3120*a*. Also, the cathode 3623 of the rectifier tube 3620*a* is connected to negative battery potential. The cathode heaters of the respective cathodes 3623*a* and 3624*a* of the rectifier tube 3620*a* and the cathode heater of the ampliger tube 3630*a* are included in a normally completed series circuit, whereby the cathodes of the rectifier tube 3620*a* and the cathode of the amplifier tube 3630*a* are rendered electron emissive.

Accordingly, the rectifier tube 3620*a* is rendered conductive and current flows through both of the space current paths therein. More particularly, on each half-cycle of the alternating voltage induced in the secondary winding 3601*c* of the coupling transformer 3601*a* an induced current flows over the circuit path including the negative battery potential applied to the normally closed contacts of the diode 2 key K3120*a* by way of the resistor R2, the secondary winding 3601*c* of the coupling transformer 3601*a*, the space current path between the plate 3621*a* and the cathode 3623*a* of the rectifier tube 3620*a*, and the negative exchange battery. Also, on each half-cycle of alternating voltage induced in the secondary winding 3601*c* of the coupling transformer 3601*a*, an induced current flows over the circuit including the secondary winding 3667*b* of the coupling transformer 3603*a*, the space current path between the plate 3622*a* and the cathode 3624*a* of the rectifier tube 3620*a*, the normally closed contacts of the diode 1 key K3110*a*, and the resistor R1, and returning by way of the resistor R1 to the secondary winding 3601*c* of the coupling transformer 3601*a*. Accordingly, the alternating voltage induced in the secondary winding 3601*c* of the coupling transformer 3601*a* causes rectified current to traverse the two multiple space current paths, through the rectifier tube 3620*a*, which respectively include the resistors R2 and R1. At this point it is noted that the resistance values of the resistors R1 and R2 are substantially equal and are exceedingly high with respect to the impedance value of the secondary winding 3667*b* of the coupling transformer 3603*a*, whereby the currents traversing the two parallel paths, respectively including the two resistors R2 and R1, are substantially equal. Hence the voltage drop across the resistor R1 is substantially equal to the voltage drop across the resistor R2, these voltage drops being in opposite directions due to the flow of current in the two multiple paths through the respective resistors R1 and R2 to the negative terminal of the secondary winding 3601*c* of the coupling transformer 3601*a*. Accordingly, it will be understood that the condenser C1 bridged across the resistor R1 and the condenser C2 bridged across the resistor R2 are charged to two substantially equal and opposite voltages.

In the amplifier tube 3630*a* the cathode 3631*a* is connected by way of the resistor 3637*a* to battery potential, and the plate 3635*a* is connected by way of the winding of the tenth test stop relay 0R and the normally closed contacts of the tenth amplifier key K3130*a* to ground potential. Also, the screen grid 3636*a* of the amplifier tube 3630*a* is connected directly to ground potential, while the control grid 3632*a* of the amplifier tube 3630*a* is connected by way of the resistor 3634*a*, the condensers C1 and C2 in series, and the normally closed contacts of the diode 2 key K3120*a* to battery potential. Accordingly, the control grid 3632*a* is biased to a negative potential with respect to the cathode 3631*a* due to the provision of the cathode biasing resistor 3637*a*, whereby the amplifier tube 3630*a* is normally rendered substantially non-conductive. More particularly, it is noted that in the amplifier tube 3630*a*, the control grid 3632*a* is normally biased negatively with respect to the cathode 3631*a* due to the provision of the cathode biasing resistor 3637*a* connected between the cathode 3631*a* and battery potential. This bias of the control grid 3632*a* with respect to the cathode 3631*a* of the amplifier tube 3630*a* is normally maintained due to the fact that equal and opposite voltages normally appear across the condensers C1 and C2 when the two parallel paths through the rectifier tube 3620*a* conduct equal currents, as previously noted.

Accordingly, when the operation of the detector 2900 is originally initiated, operation of the various amplifiers, including the tenth amplifier 0AMP, is initiated, whereby in the tenth amplifier 0AMP the rectifier tube 3620*a* and the driver tube 3663*a* are rendered conductive and the amplifier tube 3630*a* is rendered substantially non-conductive. Hence, the tenth test stop relay 0R remains in its restored position. Also, the 5,000 cycle alternating voltage induced in the secondary winding 3154*a* of the coupling transformer 3150*a* is impressed upon the conductor C3102, for the purpose previously noted.

During operation of the detector 2900 when the one of the ten B relays 0B to 9B, inclusive, corresponding to the thousand terminal group including the calling line terminal, operates, one of the ten amplifiers 0AMP to 9AMP, inclusive, corresponding to the hundred line group including the calling line terminal, also operates. For example, assuming that a call is initiated at the calling subscriber substation TP and that the detector 2900 is operating to detect the directory number thereof, in the manner previously explained, when the tenth B relay 0B operates, the tenth A relay 00A in the associated group also operates to complete the previously traced connection between the conductor C3102 and the primary winding 3602*b* of the coupling transformer 3602*a* in the tenth amplifier 0AMP. The above-mentioned circuit extends, when completed, from ground by way of the winding 3154*a* of the coupling transformer 3150*a*, the conductor C3102 extending to Fig. 28, the contacts 2852, the conductor C2232, the contacts 2285, the conductor C1393 extending to Fig. 14, the contacts 1442, the conductor C645 extending to Fig. 6, the contacts 627, the conductor C465 of the trunk 462, the line switch 423, the S lead S433 associated with the subscriber line 407, the left-hand contact of the tenth A relay 00A, a conductor in the "0" hundred group of 100 test leads, a contact of the tenth C relay 0C, the tenth test conductor C3500 extending by way of the primary winding 3602*b* of the coupling transformer 3602*a*, and the connected multiple resistor in the tenth amplifier 0AMP to ground potential. When the above-traced series circuit is completed, 5,000 cycle alternating current is transmitted thereover by induction from the primary winding 3151*a* associated with the oscillator 3650 and traverses the primary winding 3602*b* of the coupling transformer 3602*a* in the amplifier 0AMP. The alternating current traversing the primary winding 3602*b* of the coupling transformer 3602*a* is induced in the secondary winding 3602*c* and is amplified through the driver tube 3663*a*, and appears as an induced voltage in the secondary winding 3667*b* of the coupling transformer 3603*a*. In this regard it is noted that the phase shift produced between the voltage across the secondary winding 3154*a* of the coupling transformer 3150*a* and the voltage across the primary winding 3602*b* of the coupling transformer 3603*a* by the shunt and series impedance of the above-traced signal circuit is substantially negligible. Accordingly, the voltage induced in the secondary winding 3667*b* from the primary winding 3667*a* of the coupling transformer 3602*a* is substantially in phase with the voltage applied to the plate 3622*a* of the rectifier tube 3620*a* from the secondary winding 3601*c* of the coupling transformer 3601*a*. Hence it will be understood that the voltage between the plate 3622*a* and the cathode 3624*a* of the rectifier tube 3620*a* is considerably increased while the voltage between the plate 3621*a* and the cathode 3623*a* of the rectifier tube 3620*a* is not materially affected. Accordingly, the current traversing the first space current path through the rectifier tube 3620*a*, including the resistor R1 in the bridge circuit, is substantially greater than the current traversing the second space current path through the rectifier tube 3620*a*, including the resistor R2 in the bridge circuit. Hence the voltage drops across the resistor R1 will be considerably greater than that across the resistor R2 in the bridge circuit. Thus, the bridge circuit is unbalanced, causing the condenser C1 to be charged to a greater voltage than the condenser C2.

After a predetermined number of cycles of alternating current has been generated by the oscillator 3650 and has been received by the tenth amplifier 0AMP, the charge upon the condenser C1 will be built up considerably more than the charge upon the condenser C2, whereby the voltage across the condenser C1 will considerably predominate over the voltage across the condenser C2. When this occurs the predominant voltage across the condenser C1 renders the control grid 3632*a* less negative with respect to the cathode 3631*a* of the amplifier tube 3630*a*. When the grid 3632*a* becomes less negative than the cathode 3631*a* the amplifier tube 3630*a* is rendered conductive, whereby the winding of the tenth test stop relay 0R is sufficiently energized to cause operation thereof. Upon operating, the tenth test stop relay 0R causes the first cycle of the detector 2900 to be arrested, in the manner previously explained. The circuit for energizing the winding of the tenth test stop relay 0R extends from ground potential by way of the normally closed contacts of the tenth amplifier key K3130*a*, the winding of the test stop relay 0R, the plate 3635*a* and the cathode 3631*a* of the amplifier tube 3630*a*, and the resistor 3637*a* to battery.

At the conclusion of the first cycle of operation of the detector 2900, each of the ten C relays 0C to 9C, inclusive, restores, thereby to interrupt the previously traced circuit for energizing the primary winding 3602*b* of the coupling transformer 3602*a*, with alternating current from the secondary winding 3154*a* of the coupling transformer 3150*a*, as previously explained. When the primary winding 3602*b* of the coupling transformer 3602*a* is thus deenergized, the voltage impressed between the plate 3622*a* and the cathode 3624*a* is rendered substantially equal to that impressed between the plate 3621*a* and the cathode 3623*a*, whereby the current traversing the two space current paths through the rectifier tube 3620*a* is again balanced, causing equal currents to traverse the resistors R1 and R2. At this time substantially equal and opposite voltages again appear across the condensers C1 and C2, whereby the control grid 3632*a* of the coupling tube 3630*a* is again biased sufficiently negative with respect to the cathode 3631*a* to effect the restoration of the tenth test stop relay 0R.

In view of the foregoing explanation of the mode of operation of the tenth amplifier or detector unit 0AMP in the detector 2900, it will be understood that this unit is effective to match the alternating voltage received directly from the oscillator 3650 via the coupling transformers 3150*a* and 3601*a* with the alternating voltage received at the coupling transformer 3602*a* over the S lead associated with the line switch individual to the calling subscriber substation due to the switching operation of the various B relays in the associated group. Hence it will be understood that when the appropriate B relay in the detector 2900 operates to connect the S lead associated with the line switch, individual to the calling subscriber line, to the tenth amplifier 0AMP, which S lead has impressed thereon the 5,000 cycle voltage, via the secondary winding 3154*a* of the coupling transformer 3150*a*, the tenth amplifier 0AMP operates immediately, as described above. However, in the event a stray alternating voltage, which differs even slightly in frequency from 5,000 cycles per second, is impressed upon the associated S lead, the tenth amplifier 0AMP will not operate in the manner described above, due to the fact that the stray alternating voltage impressed upon the connected S lead will fail to match the 5,000 cycle voltage connected to the tenth amplifier 0AMP via the coupling transformers 3150*a* and 3601*a* from the oscillator 3650. In fact, the tenth amplifier 0AMP may be rendered frequency selective within + or — a few cycles of the frequency of the alternating voltage established by the oscillator 3650, by utilizing the arrangement disclosed wherein the resistors R1 and R2 have a resistance of approximately 300,000 ohms and the condensers C1 and C2 have a capacity of approximately 0.1 mf.

This selectivity of the tenth amplifier 0AMP to the frequency of the alternating voltage produced by the oscillator 3650 will be understood when it is considered that any stray surge voltage appearing upon the connected S lead will be of an extremely short time duration. When the voltage impressed between the plate 3622*a* and the cathode 3624*a* is thus increased with respect to the voltage impressed between the plate 3621*a* and the cathode 3623*a* of the rectifier tube 3620*a* of the time duration mentioned, a greater current flows via the current path including the resistor R1 than via the current path including the resistor R2. However, the increased current traversing the resistor R1 with respect to the current traversing the resistor R2 persists only for the short time interval mentioned; and, in view of the relatively large capacitance of the condenser C1, the charge accumulated thereon will not increase the voltage thereacross appreciably during this short time interval. Hence the bias on the control grid 3632*a* with respect to the cathode 3631*a* of the amplifier tube 3630*a* will not be sufficiently affected to render the amplifier tube 3630*a* conductive. Moreover, even though the amplifier tube 3630*a* were rendered conductive for an extremely short interval of time, the winding of the tenth test stop relay 0R would not be sufficiently saturated to cause the latter relay to operate. Furthermore, in order positively to prevent false operation of the tenth amplifier 0AMP, the transformation ratio between the primary and secondary windings of the coupling transformer 3601*a* is selected with reference to the transformation ratio between the primary and secondary windings of the coupling transformer 3603*a* and the amplifying factor of the driver tube 3663*a* with respect to possible external voltage surges impressed upon the primary winding 3602*b* of the coupling transformer 3602*a*, such that the reference voltage impressed between the plate 3622*a* and the cathode 3624*a* of the rectifier tube 3620*a* by the secondary winding 3601*c* of the coupling transformer 3601*a* is relatively high with respect to any possible amplified signal voltage which may be induced in the secondary winding 3667*b* of the coupling transformer 3603*a*.

On the other hand, in the event the S lead connected to the tenth amplifier 0AMP had a sustained alternating voltage thereon of a frequency reasonably different from the 5,000 cycle alternating voltage generated by the oscillator 3650, the amplified signal current traversing the primary winding 3667*a* of the coupling transformer 3603*a* would be of a periodicity considerably different from the alternating voltage applied to the secondary winding 3667*b* of the coupling transformer 3603*a* via the coupling transformer 3601*a* in the associated bridge circuit, whereby the periodicities of the two voltages would beat at a relatively high beat frequency.

In this case, when the amplified signal current induced in the secondary winding 3667*b* beats substantially in phase with the 5,000 cycle reference current traversing this secondary winding of the coupling transformer 3603*a*, the current traversing the path including the resistor R1 would be increased in order to cause the condenser C1 gradually to accumulate a charge greater than that accumulated by the condenser C2. However, before the voltage appearing across the condenser C1 predominates over the voltage appearing across the condenser C2 sufficiently to alter the bias applied to the control grid 3632*a* with respect to the cathode 3631*a* of the amplifier tube 3630*a*, in order to render the amplifier tube 3630*a* appreciably more conductive, the amplified periodic signal voltage and the 5,000 cycle reference voltage will not be beating substantially in phase. Hence at this time the current traversing the current path including the resistor R1 is again decreased to that of the current traversing the current path including the resistor R2, whereby the voltage impressed across the condenser C1 is lowered toward that impressed across the condenser C2 in order again to maintain the negative bias of the control grid 3632*a* with respect to the cathode 3631*a* of the amplifier tube 3630*a* in order to render the amplifier tube 3630*a* less conductive before the tenth test stop relay 0R has operated.

Also, in this case when the amplified signal current induced in the secondary winding 3667*b* beats substantially entirely out of phase with the 5,000 cycle reference current traversing the secondary winding of the coupling transformer 3603*a*, the current traversing the path including the resistor R1 would be decreased in order to cause the condenser C1 gradually to accumulate a charge less than that accumulated by the condenser C2. Accordingly, the voltage impressed across the condenser C2 predominates over the voltage impressed across the condenser C1, whereby the control grid 3632*a* is rendered more negative with respect to the cathode 3631*a* in order to render the amplifier tube 3630*a* even less conductive.

In view of the above explanation of the mode of operation of the tenth amplifier 0AMP, it will be readily appreciated that it is extremely selective to frequency and phase variations in matching the detected signal voltage with the reference voltage received directly from the oscillator 3650. However, it is noted that the frequency of the alternating current produced by the oscillator 3650 may vary throughout a wide range without affecting the selectivity of the tenth amplifier 0AMP in view of the fact that whatever alternating voltage is generated by the oscillator 3650 is applied as a reference voltage directly to the tenth amplifier 0AMP as a standard of comparison which is matched against the detected signal voltage; which detected signal voltage will closely match the reference voltage applied directly to the amplifier 0AMP when the detector 2900 has operated to detect the S lead extending to the line switch individually associated with the calling subscriber line, which S lead has impressed thereon the signal voltage from the oscillator 3650 at this time.

*Testing the amplifiers and the oscillator*

In order to test the output of the various vacuum tubes utilized in the ten amplifiers 0AMP to 9AMP, inclusive, and the oscillator 3650, a single milliammeter 3190*a* has been provided together with a plurality of manually controllable switching keys, whereby the output electrodes of the various tubes may be selectively connected to the milliammeter in order to measure the output of the selected vacuum tubes. Since the oscillator 3650 is common to all of the amplifiers 0AMP to 9AMP, inclusive, a single non-locking key K3175*a* has been provided in order to test the combined output of the tube 3651*a* and the multiply connected auxiliary tube 3653*a*, and a single non-locking key K3180*a* has been provided in order to test the combined output of the tube 3652*a* and the multiply connected auxiliary tube 3654*a*. Also, a single key K3140*a* has been provided which has a locking position and a non-locking position. When the latter key is actuated to its locking position the circuits controlled through the contacts thereof are so arranged that the milliammeter 3190*a* is transferred from the circuit, including the oscillator test keys K3175*a* and K3180*a*, to a circuit which is multiply connected to ten pairs of keys respectively associated with the ten amplifiers 0AMP to 9AMP, inclusive. The pair of keys K3110*a* and K3120*a* individual to the tenth amplifier 0AMP has been illustrated, but it should be understood that each of the remaining nine amplifiers 1AMP to 9AMP, inclusive, is connected to its respective pair of keys in the same manner. The key K3110*a* is provided so that when the common key K3140*a* has been actuated to its locking position a test may be made of the output of the diode 1, i. e., the right-hand electrodes 3622*a* and 3624*a* of the rectifier tube 3620*a*. On the other hand, the key K3120*a* is provided so that a test may be made of the diode 2, i. e., the left-hand electrodes 3621*a* and 3623*a* of the rectifier tube 3620*a*. The actuation of the key K3140*a* to its non-locking position transfers the circuit connections through the contacts thereof so that the milliammeter 3190*a* may be associated with any one of the ten keys, such as the key K3130*a*, individually associated with each of the ten amplifiers 0AMP to 9AMP. The key K3130*a*, which is individual to the amplifier tube 3630*a* of the tenth amplifier 0AMP, has been illustrated, but it should be understood that each of the remaining nine amplifiers 1AMP to 9AMP, inclusive, is connected to an individually associated key corresponding to the key K3130*a*, in the same manner. The key K3130*a* is provided so that it may be actuated at a time when the key K3140*a* is actuated to its non-locking position in order that a test may be made of the output of the amplifier tube 3630*a* of the tenth amplifier 0AMP.

Finally, each of the ten amplifiers 0AMP to 9AMP, inclusive, is provided with an individually associated key, such as the key K3170*a*, which is multiply connected to the milliammeter 3190*a*. These keys are provided in order to test the output of the drive tube, such as the driver tube 3663*a*, individually associated with the corresponding amplifiers. For example, the key K3170*a* is associated with the driver tube 3663*a* of the tenth amplifier 0AMP, and may be actuated in order to determine the output of the latter tube.

It will now be assumed that the attendant in the telephone exchange desires to test the output of the rectifier tube 3620*a* of the tenth amplifier 0AMP included in the detector 2900. In order to prepare the circuits to make this test, and to ascertain whether or not the associated detector 2900 is busy, the attendant actuates the key K3140*a* to its locking position whereupon a circuit is completed, at its contacts 7, in the event the associated detector 2900 is busy, from ground potential applied to the start conductor C3202 by way of the contacts 3638*a*, the contacts 7 of the key K3140*a*, and the busy lamp L3145*a*, to battery. The illumination of the lamp L3145*a* indicates to the attendant that the detector 2900 is being utilized to identify the numerical designation of a calling subscriber directory number and that the test should be postponed until the detector 2900 is idle. In the event the lamp L3145 is not illuminated, the attendant leaves the key K3140*a* in its actuated locking position and momentarily actuates the non-locking key K3110*a* in order to test the diode 1 of the rectifier tube 3620*a* individual to the tenth amplifier 0AMP. With the key K3110*a* held in its actuated position, and the key K3140*a* operated to its locking position, the milliammeter 3190*a* is connected in series with the output circuit of the right-hand electrodes 3622*a* and 3624*a* of the rectifier tube 3620*a*, over a circuit which may be traced from the upper or negative terminal of the milliammeter 3190*a*, the contacts 2 of the key K3140*a*, the contacts 2 of the key K3110*a*, the space current path including the cathode 3624*a* and the plate 3622*a* of the rectifier tube 3620*a*, the secondary winding 3667*b* of the coupling transformer 3603*a*, the secondary winding 3601*c* of the coupling transformer 3601*a*, the resistor R1, the contacts 3 of the key K3110*a*, and the contacts 5 of the key K3140*a*, to the lower or positive terminal of the milliammeter 3190*a*. Since the rectifier tube 3620*a* and the driver tube 3663*a* are normally conductive and are, therefore, responsive to the alternating voltage generated by the oscillator 3650 in the manner previously explained, the milliammeter 3190*a* will indicate the output characteristics of the right-hand electrodes of the rectifier tube 3620*a* and thus enable the attendant to determine whether or not the tube is properly functioning. When this test has been completed the attendant releases the key K3110*a*, which automatically restores to the position illustrated in the drawings, due to its non-locking characteristics, and then restores the key K3140*a* to its normal or neutral position.

If the attendant desires to test the diode 2, i. e., the left-hand electrodes of the rectifier tube 3620*a*, he again actuates the key K3140*a* to its locking position thereby to determine whether or not the detector 2900 is idle or busy, and, if idle, actuates the non-locking key K3120*a*. A circuit is now completed for connecting the milliammeter 3190*a* in the output circuit of the left-hand electrodes 3621*a* and 3623*a* of the rectifier tube 3620*a*, which may be traced from battery by way of the space current path including the cathode 3623*a* and the plate 3621*a* of the rectifier tube 3620*a*, the secondary winding 3601*c* of the coupling transformer 3601*a*, the resistor R2, the contacts 2 of the key K3120*a*, the contacts 2 of the key K3140*a*, the milliammeter 3190*a*, the contacts 5 of the key K3140*a*, the contacts 3 of the key K3120*a*, and negative battery potential. When the above-traced circuit is completed, the milliammeter 3190*a* will indicate the output characteristics of the left-hand electrodes of the rectifier tube 3620*a* and thus enable the attendant to determine whether or not the tube is properly functioning. When this test has been completed, the attendant releases the key K3120*a* which automatically restores to its normal position illustrated in the drawings, due to its non-locking characteristics, and then restores the key K3140*a* to its normal or neutral position.

In the event the attendant desires to test the output of the amplifier tube 3630*a* of the tenth amplifier 0AMP, the key K3140*a* is actuated to its non-locking position, whereupon a circuit is completed, at its contacts 13, to determine whether or not the associated detector 2900 is busy or idle. If the detector 2900 is idle the lamp L3145*a* will not be illuminated and the attendant thereafter actuates the non-locking tenth amplifier test key K3130*a* in order to associate the milliammeter 3190*a* with the output circuit of the amplifier tube 3630*a*. It will be recalled that the amplifier tube 3630*a* is normally rendered non-conductive by the negative potential applied to the control grid thereof by way of the resistors 3634*a*, the resistors R1 and R2 in series, and this negative potential was not altered until a signal current transmitted by the oscillator and received by the driver tube 3663*a* had altered the negative potential applied to the control grid 3632*a* of the amplifier tube 3630*a* to render it conductive. When the above-described test is being made of the amplifier tube 3630*a*, the tone signal is not received by the driver tube 3663*a* inasmuch as the detector 2900 is idle at the time the test is made by the attendant. Accordingly, it is necessary to alter the negative potential applied to the control grid 3632*a* of the amplifier tube 3630*a* when the test is made. Consequently, when the key K3140*a* is actuated to its non-locking position, a circuit is completed, at the contacts 12, which may be traced from ground by way of the contacts 3213 of the deenergized start relay R3210, the contacts 12 of the actuated key K3140*a*, and the winding of the relay R3635*a* to battery. The relay R3635*a* operated over this circuit and, at its contacts 3638*a*, disconnects the start conductor C3202 from the winding of the start relay R3210, in order positively to prevent the detector 2900 from being seized at the present time. Also, the relay R3635*a*, at its contacts 3639*a*, completes an energizing circuit for the winding of the relay R3640*a*. The relay R3640*a* now operates and, at its contacts 3641*a*, completes a circuit from negative battery potential by way of the resistor 3637*a*, the contacts 3641*a*, the multiply connected contacts 1 and 4 of the diode 1 key K3110*a*, and the resistor 3634*a* to the control grid 3632*a* of the amplifier tube 3630*a*. When this circuit is completed, the negative potential applied to the control grid 3632*a* of the amplifier tube 3630*a* is altered to render the amplifier tube conductive and, in effect, is substantially the same as if the negative potential applied to the control grid 3632*a* had been altered as the result of the detection of a signal received at the driver tube 3663*a* during the operation described hereinbefore of the detector 2900. Accordingly, when the tenth amplifier key K3130*a* is actuated, a circuit is completed whereby the milliammeter 3190*a* is included in the output circuit of the amplifier tube 3630*a*. This circuit may be traced from ground potential by way of the contacts 3 of the key K3130*a*, the contacts 11 of the key K3140*a*, the milliammeter 3190*a*, the contacts 8 of the key K3140*a*, the contacts 2 of the key K3130*a*, the winding of the test stop relay 0R, the space current path including the plate 3635*a* and the cathode 3631*a* of the amplifier tube 3630*a*, and the resistor 3637*a* to battery potential. It is noted that an appropriate shunt resistance 3101*a* is placed across the terminals of the milliammeter 3190*a* when the contacts 8 and 11 of the key K3140*a* are closed. This shunt circuit is necessary in order to reduce the current flow through the milliammeter 3190*a* so that a proper reading may be made, since the output current of the amplifier tube 3630*a* is greater than that of the diodes of the rectifier tube 3620*a*. Consequently, when the milliammeter 3190*a* is included in the output circuit of the amplifier tube 3630*a*, it will indicate the output of the electrodes of the amplifier tube 3630*a* and thus enable the attendant to determine whether or not the tube is properly functioning, and also to determine whether or not the output current of the tube is sufficient to actuate the test stop relay 0R. When the above-described test is completed, the attendant releases the keys K3130*a* and K3140*a*, which automatically restore to their neutral position, shown in the drawings, due to their non-locking characteristics.

In the event the attendant desires to test the output characteristics of the driver tube 3663*a*, the attendant merely actuates the key K3170*a* in order to associate the milliammeter 3190*a* with the output circuit of the driver tube 3663*a*. When the key K3170*a* is actuated, a circuit is completed from ground potential by way of the contacts 2 of the key K3170*a*, the contacts 6 of the key K3175*a*, the contacts 2 of the key K3180*a*, the contacts 4 and 10 of the key K3140*a*, the milliammeter 3190*a*, the contacts 9 and 3 of the key K3140*a*, the contacts 3 of the key K3180*a*, the contacts 7 of the key K3175*a*, the contacts 3 of the key K3170*a*, the primary winding 3667*a* of the coupling transformer 3603*a*, the space current path including the plate electrode 3666*a* and the cathode electrode 3661*a* of the driver tube 3663*a*, the resistor 3662*a*, and negative potential. In this circuit it should also be noted that an appropriate shunt resistance 3102*a* is placed across the terminals of the milliammeter 3190*a* so that a proper indication will be given by the meter 3190*a* when the output of the driver tube 3663*a* is included in circuit therewith. When the milliammeter 3190*a* is included in the output circuit of the driver tube 3663*a*, the meter will now indicate the output characteristics of the electrodes of the driver tube 3663*a* and thus enable the attendant to determine whether or not the tube is properly functioning.

In the event the attendant desires to test the combined output characteristics of the oscillator 1 tube 3651*a* and the auxiliary oscillator tube 3653*a*, the non-locking key K3175*a* is actuated to associate the milliammeter 3190*a* with the output circuit of the above-mentioned tubes. When the key K3175*a* is actuated, a circuit is completed from ground potential by way of the left-hand primary winding 3152*a* of the coupling transformer 3150*a*, the contacts 5 of the key K3175*a*, the contacts 2 of the key K3180*a*, the contacts 4 and 10 of the key K3140*a*, the milliammeter 3190*a*, the contacts 9 and 3 of the key K3140*a*, the contacts 3 of the key K3180*a*, the contacts 8 of the key K3175*a*, and the multiply connected space current paths including the plate and cathode of the tubes 3651*a* and 3653*a*, to battery potential. It should be noted that an appropriate shunt resistance 3103*a* is placed across the terminals of the milliammeter 3190*a* when the contacts 5 and 8 of the key K3175*a* are closed, whereby the milliammeter 3190*a* will give a proper indication of the combined output characteristics of the oscillator tubes 3651a and 3653a. Accordingly, when the milliammeter 3190a is included in the above-traced combined output circuit of the oscillator tubes 3651a and 3653a, it will indicate the combined output characteristics of the electrodes of the multiply connected oscillator tubes 3651a and 3653a and thus enable the attendant to determine whether or not these tubes are properly functioning. When the above-described test has been completed the attendant releases the key K3175a, whereupon the contacts thereof are automatically restored to the position illustrated, due to the non-locking characteristics of the key K3175a.

In the event the attendant desires to make a corresponding test of the combined output characteristics of the oscillator 2 tube 3652a and the auxiliary oscillator tube 3654a, the key K3180a is actuated in order to associate the milliammeter 3190a with the combined output circuit of the above-mentioned tubes. When the key K3180a is actuated, a circuit is completed from ground potential by way of the primary winding 3151a of the coupling transformer 3150a, the contacts 1 of the key K3180a, the contacts 4 and 10 of the key K3140a, the milliammeter 3190a, the contacts 9 and 3 of the key K3140a, the contacts 4 of the key K3180a, and the space current paths including the plate and cathode of the multiply connected oscillator tubes 3652a and 3654a, to battery potential. It should also be noted that an appropriate resistance 3104a is placed across the terminal of the milliammeter 3190a when the contacts 1 and 4 are closed by the actuation of the key K3180a, whereby a proper indication will be given by the milliammeter 3190a of the combined output characteristics of the oscillator tubes 3652a and 3654a. When the milliammeter 3190a is included in the output circuit of the oscillator tubes 3652a and 3654a, it will indicate the combined output characteristics of the electrodes of these oscillator tubes, and thus enable the attendant to determine whether or not these tubes are properly functioning. When the above test has been completed by the attendant, the key K3180a is released and, due to its non-locking characteristics, the contacts thereof are restored to their neutral positions illustrated in the drawings.

*Extension of the call by the register translator*

Incident to the setting up of the present call, the register translator 1700 first transmits the first routing digit "2" to the primary selector 600, in the manner previously explained. More particularly, the first routing digit "2" is transmitted from ground by way of the contacts 1718, the contacts 1843 of the digit pulse relay R1840, the contacts 2183 of the busy key K2180, the conductor C2235, the contacts 2287, the wiper 2298 of the finder F2290, the conductor C1283 extending to Fig. 12, the contacts 1272, the conductor C642 extending to Fig. 6, the wiper 612 of the finder F610, the contacts 623 and 773, and the windings of the line relay R730 in the primary selector 600, to battery. The line relay R730 follows the first routing digit "2" in order to cause the wiper set of the switch mechanism 700 to be driven two steps in the vertical direction, in the manner previously explained. When the first routing digit "2" is completely transmitted from the register translator 1700, the digit stop relay R1910 therein operates, as previously explained, and, at its contacts 1913, completes a holding circuit substantially identical to the above-traced impulsing circuit for maintaining the line relay R730 in its operated position, which circuit is independent of the impulsing contacts 1843 of the digit pulse relay R1840, thereby positively to prevent further operation of the line relay R730 and the wiper set of the switch mechanism 700 at the present time. Also, the digit stop relay R1910 effects operation of the special service cut off relay R1810, in the previously described manner, whereupon the latter relay interrupts, at its contacts 1811, the previously traced circuit for energizing the special service relay R2040 in the event the calling subscriber is entitled to this type of service. In this particular case the calling subscriber is not entitled to special service and the relay R2040 is in its deenergized position.

After the switch mechanism 700 has been elevated the wiper set two steps in a vertical direction, the wiper is then automatically driven step by step in a rotary direction to hunt for an idle trunk in the associated group terminated in the second level in the associated contact bank.

Assuming that the trunk 780 comprising the conductors C781, C782 and C783 extending to the toll ticket repeater 800 is the first idle trunk in the group terminated in the second level of the contact bank associated with the switch mechanism 700, the switch-through relay R770 of the primary selector 600 operates in view of the absence of ground potential upon the control conductor C783.

Upon operating, the switch-through relay R770 interrupts, at its contacts 771, a further point in the previously traced circuit for controlling the special service relay R2040 in the register translator 1700, and, at its contacts 772, it prepares a circuit, traced hereinafter, for controlling in series the windings of the step relay R920 and the code relay R910 in the toll ticket repeater 800. Also, the switch-through relay R770 interrupts, at its contacts 773, the previously traced circuit for controlling the line relay R730, thereby to cause the latter relay to restore, and, at its contacts 774, it completes a circuit substantially identical to that previously traced and including the wiper 702 of the wiper set, the line conductor C782 of the trunk 780, and the upper winding of the impulse relay R960 in the toll ticket repeater 800. More particularly, the circuit for controlling the line relay R730, including the contacts 773, is transferred, at its contacts 774, by the operation of the switch-through relay R770, to the impulse relay R960 of the toll ticket repeater 800, thereby to cause the latter relay to operate. Upon operating, the impulse relay R960 completes, at its contacts 962, a circuit, including the contacts 971, for energizing the hold relay R840, thereby to cause the latter relay to operate. Upon operating, the hold relay R840 completes, at its contacts 841, an obvious path for applying ground potential to the control conductor C783 of the trunk 780, thereby to mark the toll ticket repeater 800 as busy to other primary selectors 441, 600, etc., having access thereto. The application of ground potential to the control conductor C783 also completes a previously traced holding circuit, including the wiper 703 and the contacts 776, for maintaining the switch-through relay R770 in its operated position. The line relay R730 in the primary selector 600 then restores in order to effect the restoration of the hold relay R740 shortly thereafter, in the previously described manner, in order to prepare a circuit for the release magnet M714.

As a further result of the operation of the impulse relay R960 in the toll ticket repeater 800, it completes, at its contacts 961, an impulsing bridge, including the contacts 952, between the line conductors C5302 and C5305 of the trunk 5301 extending to the toll selector 5300 individually associated with the toll ticket repeater 800, whereby the toll selector 5300 is conditioned to be responsive to a routing digit transmitted thereto. The circuit for conditioning the toll selector 5300 may be traced from ground by way of the normally closed contacts of the 11th rotary step cam springs S5320, the lower winding of the line relay R5370, the contacts 5333, the conductor C5303 of the trunk 5301, the contacts 952 and 961 in the toll ticket repeater 800, the conductor C5302, the contacts 5331, and the upper winding of the line relay R5370 to battery. The line relay R5370 operates over the above-described circuit and, at its contacts 5371, completes a circuit including ground at the contacts 5337 for energizing the hold relay R5360, whereupon the latter relay operates. At its contacts 5361, the relay R5360 prepares a circuit including the series relay R5350 and the vertical magnet M5314. Accordingly, it is to be noted that the operation of the impulse relay R960 in the toll ticket repeater 800 conditions the toll selector 5300, individually associated therewith, to respond to the next routing digit transmitted by the register translator 1700.

Also, upon operating, at its contacts 842, the hold relay R840 in the toll ticket repeater 800 opens a point in a circuit, to be described hereinafter, for controlling the busy relay R810; at its contacts 844 it applies ground potential to the control conductor C5304 in order subsequently to control the rotary magnet M5315 in the toll selector 5300; and, at its contact 845, it prepares a point in a circuit, to be described hereinafter, for preventing accidental operation of the calling subscriber's switchhook from interfering with the telephone connection, including the toll ticket repeater 800. Finally, the hold relay R840, at its contacts 843, completes an energizing circuit for the winding of the control relay R830, thereby to cause the latter relay to operate. Upon operating, the control relay R830, completes, at its contacts 832′, an obvious path for applying ground potential to the hold conductor C889, and, at its contacts 831′, it completes an energizing circuit for the upper polarizing winding of the answer relay R945.

In view of the above description of the primary selector 600 and the toll ticket repeater 800, it will be understood that the first routing digit "2" is transmitted from the register translator 1700 to the line relay R730 in the primary selector 600, whereas the second and third routing digits "2" and "3" are transmitted from the register translator 1700, over the primary selector 600 and the line conductor C782 of the trunk 780, to the upper winding of the impulse relay R960 in the toll ticket repeater 800.

Accordingly, the impulse relay R960 repeats the second and third routing digits "2" and "3," at its contacts 961, over the line conductors C5302 and C5303 of the trunk 5301 extending to the toll selector 5300. The hold relay R840 and the control relay R830 remain in their operation positions during impulsing, since the hold relay R840 is of the slow-to-release type. The toll selector 5300 responds to the second routing digit "2" to advance the wiper set of the switch mechanism 5310 two steps in a vertical direction to select a corresponding group of toll lines extending to exchange 2 zone 27, and then operates automatically in a rotary direction to select an idle toll line, such, for example, as the toll line 5626 in the selected group.

Considering the operation of the toll selector 5300, it is again pointed out that the operation of the impulse relay R960 in the toll ticket repeater 800 repeats impulses constituting the digit "2" to the line relay R5370 in the toll selector 5300. Each time the line relay R5370 restores and then reoperates it interrupts and recompletes, at its contacts 5371, the previously traced circuit for energizing the winding of the hold relay R5360. The latter relay, however, does not restore during impulsing as it is of the slow-to-release type. Also, each time the line relay R5370 restores and then reoperates it completes and then interrupts, at its contacts 5372, a circuit which may be traced from ground by way of contacts 5337, 5372 and 5361, and the windings of the series relay R5350 and the vertical magnet M5314, to battery. Each time the vertical magnet M5314 is energized it operates to drive the wiper set of the switch mechanism 5310 one step in the vertical direction. When the wiper set has been driven one step in the vertical direction the sets of vertical off-normal springs S5317 and S5318 are actuated into engagement. The set of springs S5317 prepares a circuit, traced hereinafter, for energizing the winding of the step relay R5340, while the set of springs S5318 prepares a circuit, traced hereinafter, for energizing the release magnet M5316. When the series relay R5350 is energized over the above-traced circuit, including the winding of the vertical magnet M5314, it completes, at its contacts 5352, a circuit, including the grounded control conductor C5304, the vertical off-normal springs S5317 and the winding of the step relay R5340, thereby to cause the latter relay to operate.

At the conclusion of the transmission of the second routing digit "2," repeated to the line relay R5370 by the impulse relay R960 in the toll ticket repeater 800, the wiper set of the switch mechanism 5310 occupies its second vertical position. At this time the line relay R5370 occupies its operated position and, at its contacts 5372, has interrupted the previously traced series circut including the winding of the series relay R5350 and the vertical magnet M5314. The series relay R5350, being of the slow-to-release type, remains in its operated position during the transmission of impulses to the vertical magnet M5314 and subsequently restores to normal when the line relay R5370 is retained in its operated position. Upon restoring to normal, the series relay R5350, at its contacts 5352, opens the previously traced initial energizing circuit for the step relay R5340. However, the latter relay is now retained in its operated position over a holding circuit, which may be traced from ground by way of the contacts 5337, 5342 and 5343, the vertical off-normal springs S5317, and the winding of the relay R5340, to battery. Also, upon restoring, the relay R5350, at its contacts 5351, completes an energizing circuit for the rotary magnet M5315 which may be traced from the grounded conductor C5304 and the contacts 5351 and 5341.

When thus energized the rotary magnet M5315 operates to drive the wiper set of the switch mechanism 5310 one step in the rotary direction and to interrupt, at the contacts 5343, the previously traced holding circuit for energizing the winding of the step relay R5340, thereby to cause the latter relay to restore. Upon restoring, the step relay R5340 interrupts, at its contacts 5341, the previously traced circuit for energizing the rotary magnet M5315, thereby to cause the latter magnet to restore. Upon restoring, the rotary magnet M5315 completes, at the contacts 5343, a circuit path including the test wiper 5313 of the wiper set of the switch mechanism 5310, the contacts 5336 and 5343, the vertical off-normal springs S5317, and the winding of the step relay R5340. Also the wiper set of the switch mechanism 5310 engages the first set of contacts in the second level of the associated contact bank.

Further operation of the toll selector 5300 to advance the wiper set of the switch mechanism 5310 in a rotary direction is continued in the event the first contact set terminating the first trunk in the trunk group 5626, extending to the exchange 2 zone 27, is busy. More particularly, ground potential is applied to the control conductor of the last-mentioned trunk in the event the trunk is busy, and there is no potential applied to the conductor in the event the associated trunk is idle. Assuming that the trunk mentioned is busy at this time, ground potential appears upon the control conductor thereof and is applied to the test wiper 5313 of the wiper set in order to complete, by way of the contacts 5336, the previously traced circuit for energizing the winding of the step relay R5340, thereby to cause the latter relay to operate. When the step relay R5340 is thus reoperated, the rotary magnet M5315 is reoperated in order to drive the wiper set of the switch mechanism 5310 an additional step in the rotary direction, whereupon the wiper set engages the next trunk extending to exchange 2 zone 27.

Assuming that the trunk 5626 is the first idle trunk in the group extending to exchange 2 zone 27, when the wiper set of the switch mechanism 5310 engages the contact set terminating the trunk 5626, ground potential will not be encountered by the test wiper 5313 and the winding of the switch-through relay R5330 is not short-circuited as is the case when the test wiper 5313 encounters ground potential on the control conductor of the associated trunk line. Consequently, a circuit may not be traced from the grounded conductor C5304 by way of the 11th rotary step cam springs S5319, the winding of the switch-through relay R5330, the contacts 5343, the vertical off-normal springs S5317, and the winding of the step relay R5340. When this series circuit is completed, the switch-through relay R5330 operates but, due to the resistance of the latter relay, the step relay R5340 is not operated. When thus energized the switch-through relay R5330 operates to complete, at its contacts 5355, a path for applying direct ground potential from the grounded conductor C5304 to the test wiper 5313, thereby to cause the incoming second selector 5601 in exchange 2 zone 27 to be marked as busy to all other selectors, such as 5200, 5300, etc. having access thereto.

Also, upon operating, the switch-through relay R5330 interrupts, at its contacts 5331 and 5333, the previously traced circuit for energizing in series the upper and lower windings of the line relay R5370, thereby to cause the line relay R5370 to restore. Further, the switch-through relay R5330 interrupts, at its contacts 5337, the previously traced circuit for energizing the winding of the hold relay R5360, thereby to cause the latter relay to restore to normal shortly thereafter. Finally, the switch-through relay R5330, at its contacts 5332 and 5334, extends the loop circuit, including the line conductor C5302 and C5303 of the trunk 5301, by way of the wipers 5311 and 5312 and the line conductors of the trunk 5626, to the incoming second selector 5601 in exchange 2 zone 27, thereby to seize the selector 5601 and condition the same to respond to subsequent routing digits transmitted under control of the register translator 1700.

More specifically, the incoming second selector 5601 in exchange 2 zone 27 responds to the third and final routing digit "3" in order to select the corresponding group of interoffice trunk lines extending to exchange 3 zone 27, such, for example, as the trunk line 5630 in the selected group. Subsequently, the register translator 1700 operates to transmit the fourth, fifth, sixth and seventh digits "1," "2," "3" and "4," registered therein over the trunk line 780 to the toll ticket repeater 800, which digits are repeated by the impulse relay R960 over the trunk line 5301, the toll line 5626 and the interoffice trunk line 5630 to the switch apparatus in exchange 3 zone 27. The fourth digit "1," corresponding to the first digit in the numerical portion of the directory number of the called subscriber substation in exchange 3 zone 27, is utilized to control the selector 5605, which selector automatically selects an idle trunk in the first level of the associated contact bank extending to a selector, such as selector 5606. The fifth digit "2" corresponding to the second digit in the numerical portion of the directory number of the called subscriber substation in exchange 3 zone 27, is utilized to control the selector 5606, thereby to select an idle connector, such as the connector 5607. The sixth and seventh digits "3" and "4," respectively corresponding to the third and fourth digits of the numerical portion of the directory number of the called subscriber substation, are utilized to control the connector 5607, thereby to select the line terminal of the subscriber line extending to the called subscriber substation in exchange 3 zone 27. The connector 5607 operates in accordance with conventional practice in order to cause ringing current to be projected over the called subscriber line, thereby to operate the ringer and signal the called subscriber.

Returning now to the operation of the register translator 1700, when the detector 2900 operates to detect the directory number of the private subscriber line 407 extending to the calling private subscriber substation TP and to store the detected directory number in the code storage devices S2801 to S2804, inclusive, in the register translator 1700, the detector release relay R2240 is operated, as previously explained. Upon operating, the detector release relay R2240 completes, at its contacts 2241, the previously traced circuit for energizing the code pulse relay R1850, whereupon the code pulse relay R1850 operates and restores intermittently at a predetermined rate, in the manner previously explained. Each time the code pulse relay R1850 operates and then restores it completes and then interrupts, at its contacts 1853, a circuit, including the conductor C2424 extending to Fig. 22, for energizing the magnet UM2827 of the storage transfer switch U2820. As a result thereof, the latter magnet operates and restores in order to drive the wipers 2821 to 2826, inclusive, of the storage transfer switch U2820 one step in the clockwise direction. Also, each time the code pulse relay R1850 operates and then restores it completes and then interrupts, at its contacts 1851, a path for applying ground potential to the conductor C1872. The ground potential applied to the conductor C1872 is either direct ground potential supplied by way of the contacts 1861 of the mark relay R1860 or resistance ground potential supplied by way of the resistor 1862, depending respectively upon the operated or restored position of the mark relay R1860. The application of direct ground potential by way of the contacts 1861 and 1851 to the conductor C1872 completes a circuit, including the contacts 2283, the wiper 2294 of the finder F2290, the conductor C1394 extending to Fig. 14, the contacts 1443, the conductor C644 extending to Fig. 6, the wiper 614 of the finder F610, the contacts 625 and 772, the wiper 701 of the switch mechanism 700, the line conductor C781 of the trunk 780, and the contacts 954, for energizing in series the windings of the step relay R920 and the code relay R910 in the toll ticket repeater 800, whereby both of the relays mentioned operate. On the other hand, the application of resistance ground potential by way of the resistor 1862 and the contacts 1851, completes the above circuit for energizing in series the windings of the step relay R920 and the code relay R910, whereby only the step relay R920 operates and the code relay R910, being of the marginal type, remains in its restored position due to the high resistance of the resistor 1862.

Figure 20:
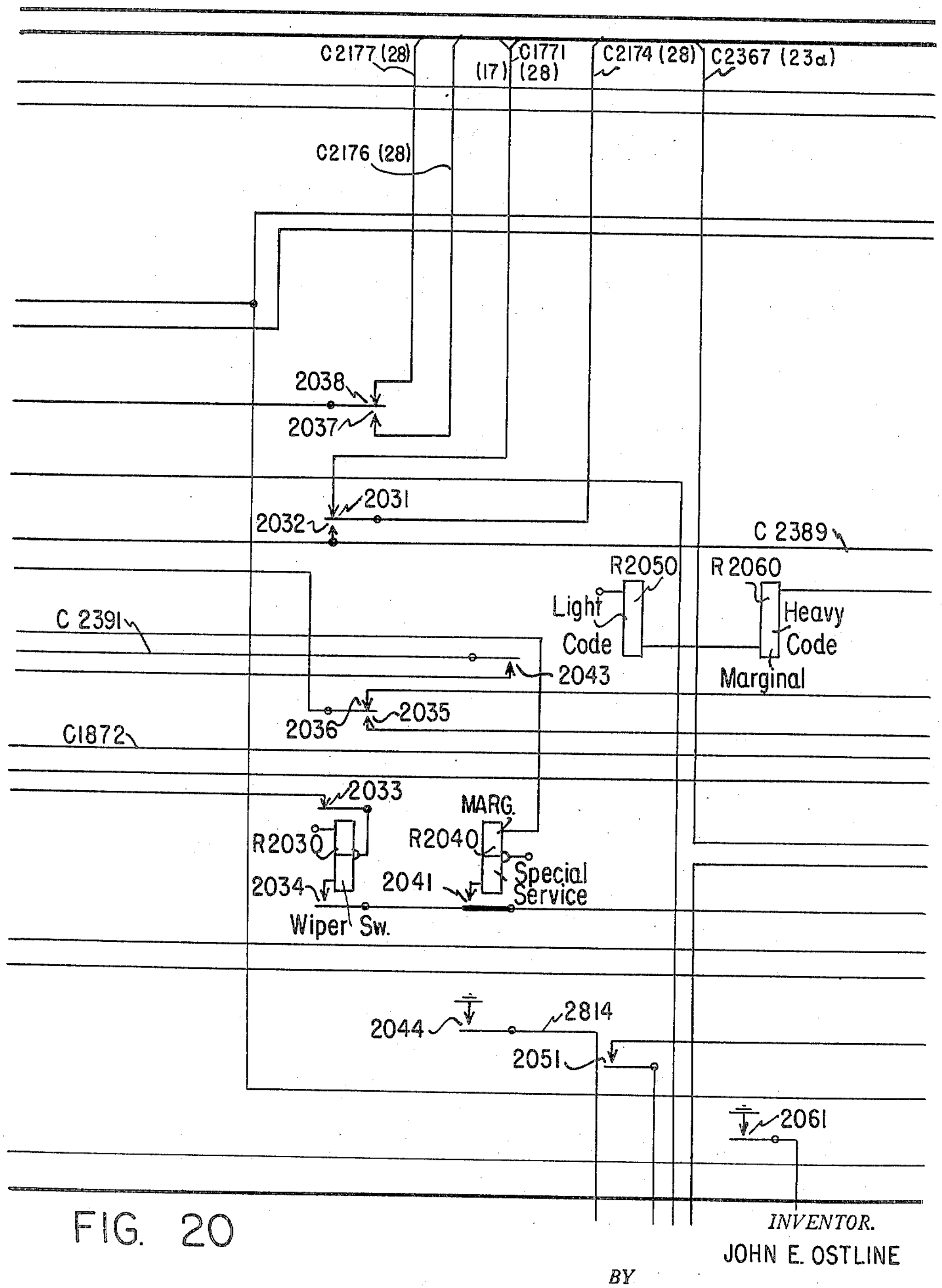
Figure 21:
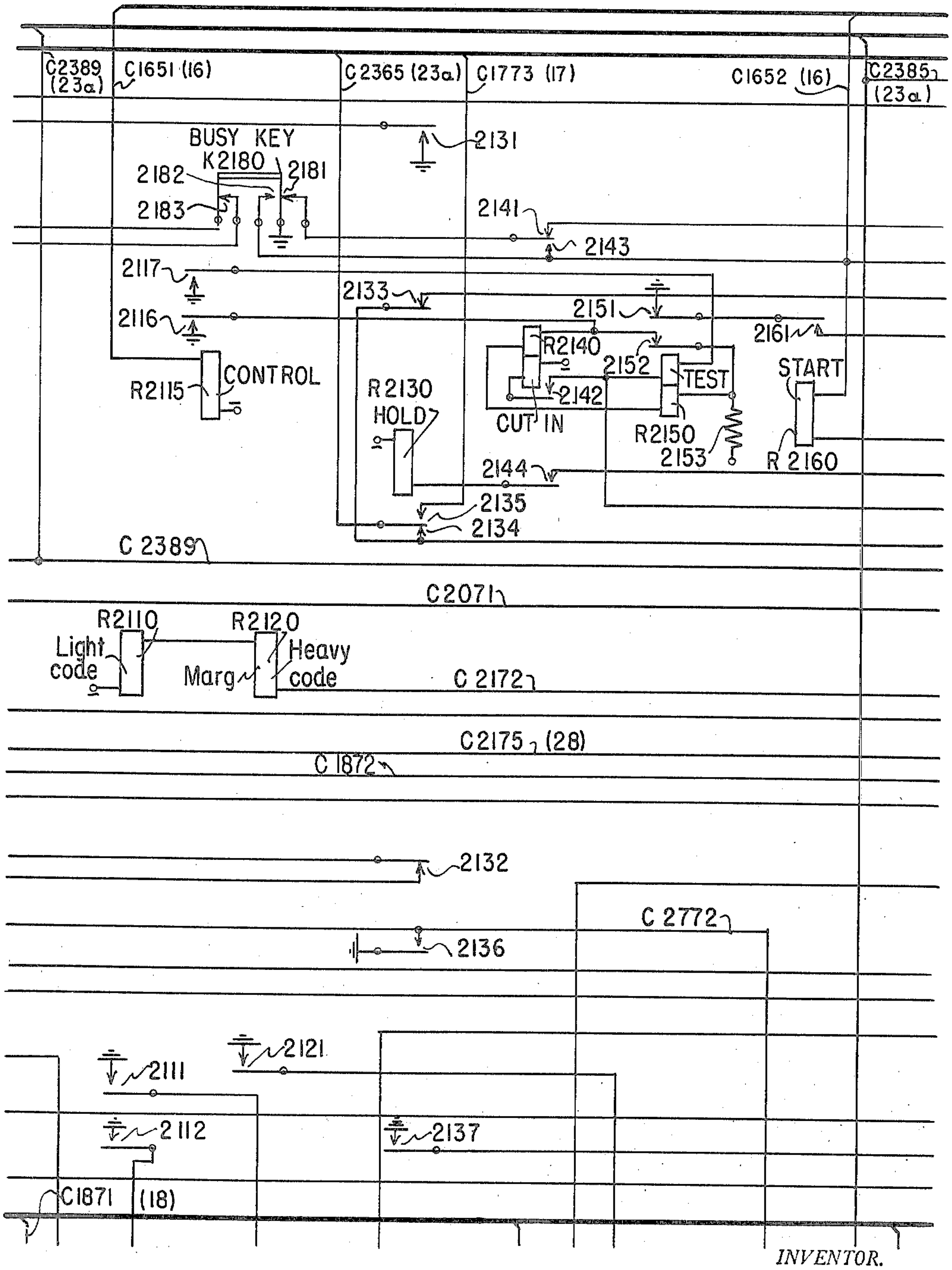

Also, at this time a circuit, including the multiply connected wipers 2821 and 2822 of the storage transfer switch U2820, the conductor C2177 extending to Fig. 20, and the contacts 2138, is prepared for energizing the winding of the mark relay R1860. Also, the wiper 2821 of the storage transfer switch U2820 engages the W conductor in the group of WXYZ marking leads 2805, extending to Fig. 24, to the first code switch A2400. In the present example the first digit "2" of the called office code is registered in the first code switch A2400, whereby ground potential is applied to the W and Y conductors in the group of marking leads 2805, as previously explained.

Accordingly, upon the first operation of the code pulse relay R1850, the mark relay R1860 occupies its operated position and direct ground potential is applied by way of the contacts 1861 and 1851 to the conductor C1872. The circuit for energizing the winding of the mark relay R1860 includes ground potential applied by way of the wiper 2402 and the engaged ninth contact in its associated contact bank, the W conductor in the group of WXYZ marking leads 2805, the wiper 2821 of the storage transfer switch U2820 and the engaged home contact in the associated contact bank terminating the W conductor, the conductor C2177 extending to Fig. 20, the contacts 2038, and the winding of the mark relay R1860, to battery. Upon the first restoration of the code pulse relay R1850, the previously traced path for applying direct ground potential to the conductor C1872 is interrupted at its contacts 1851, and, at its contacts 1853, the previously traced path for applying ground potential to the conductor C2424 extending to Fig. 22 is interrupted, whereupon the magnet UM2827 restores in order to drive the wipers of the storage transfer switch U2820 one step in the clockwise direction.

When the wiper 2821 of the storage transfer switch U2820 disengages the home contact in the associated contact bank, the previously traced circuit for energizing the winding of the mark relay R1860 is interrupted, thereby causing the latter relay to restore. When the wiper 2821 engages the first contact in the associated contact bank terminating the X conductor in the group of marking leads 2805, the above-traced circuit for energizing the winding of the mark relay R1860 is not recompleted due to the fact that no ground potential appears upon the X conductor mentioned, since the wiper 2402 of the first code switch A2400 is not engaged therewith. Accordingly, upon the second operation of the code pulse relay R1850, resistance ground potential is applied by way of the resistor 1862 and the contacts 1851 to the conductor C1872. The step relay R920 in the toll ticket repeater 800 will not operate but the code relay R910 remains in its restored position. In view of the above description of the mode of operation of the storage transfer switch U2820 to transfer the code digit "2" registered in the first code switch A2400, it will be understood that upon the first and third operations of the code pulse relay R1850 the mark relay R1860 occupies its operated position and direct ground potential is applied to the conductor C1872, while upon the second and fourth operations of the code pulse relay R1850 the mark relay R1860 occupies its restored position and resistance ground potential is applied to the conductor C1872. This operation results from the registration of the digit "2" in the first code switch A2400, whereby the W and Y conductors in the associated group of WXYZ leads 2805 are marked with direct ground potential, whereas the X and Z conductors are not so marked.

Upon the fourth restoration of the code pulse relay R1850, the magnet UM2827 restores, thereby to drive the wiper 2821 into engagement with the fifth contact in the associated contact bank terminating the W conductor in the group of WXYZ marking leads 2806 extending to the second code switch B2410. Accordingly, at this time the storage transfer switch U2820 is in readiness to transfer the digit "7," registered in the second code switch B2410, over the conductor C1872 to the toll ticket repeater 800, in the same manner as has been explained above.

At this point it is noted that the groups of WXYZ marking leads 2805 and 2806 are terminated in a clockwise direction in the contact bank associated with the wiper 2821 of the storage transfer switch U2820; the group of WXYZ marking leads 2807 is terminated in both the lower portion of the contact bank associated with the wiper 2821 and the upper portion of the contact bank associated with the wiper 2822 of the storage transfer switch U2820; the groups of WXYZ marking leads 2801, 2802, 2803, 2804, and 2812 are terminated in a clockwise direction in the contact bank associated with the wiper 2822 of the storage transfer switch U2820; the group of WXYZ marking leads 2813 is terminated in both the lower portion of the contact bank associated with the wiper 2822 and the upper portion of the contact bank associated with the wiper 2823 of the storage transfer switch U2820; and the individual marking leads 2814, 2815 and 2816, and the groups of WXYZ marking leads 2808, 2809, 2811 are terminated in the contact bank associated with the wiper 2823 of the storage transfer switch U2820. The groups of WXYZ marking leads 2805, 2806 and 2807 respectively terminate in the contact banks of the first code switch A2400, the second code switch B2410, and the third code switch C2500; the groups of WXYZ marking leads 2801, 2802, 2803 and 2804 respectively terminate in the code storage devices S2801, S2802, S2803 and S2804; the group of WXYZ marking leads 2812 terminates in the contacts controlled by the rate relays R1740′, R1750′, R1760′, and R1770′; the group of WXYZ marking leads 2813 terminates in the terminal block B2770; the Z conductor of the marking lead 2814 terminates in the contacts 2044 of the special service relay R2040; the groups of WXYZ marking leads 2808, 2809, 2810 and 2811 respectively terminate in the first numerical switch D2510, the second numerical switch E2520, the third numerical switch F2600, and the fourth numerical switch G2610; the W conductor of the marking lead 2815 terminates in the contacts 1755 of the code send relay R1750; while the W marking lead 2816 terminates in the contacts 1721′ of the free call relay R1720′.

Figure 17A:
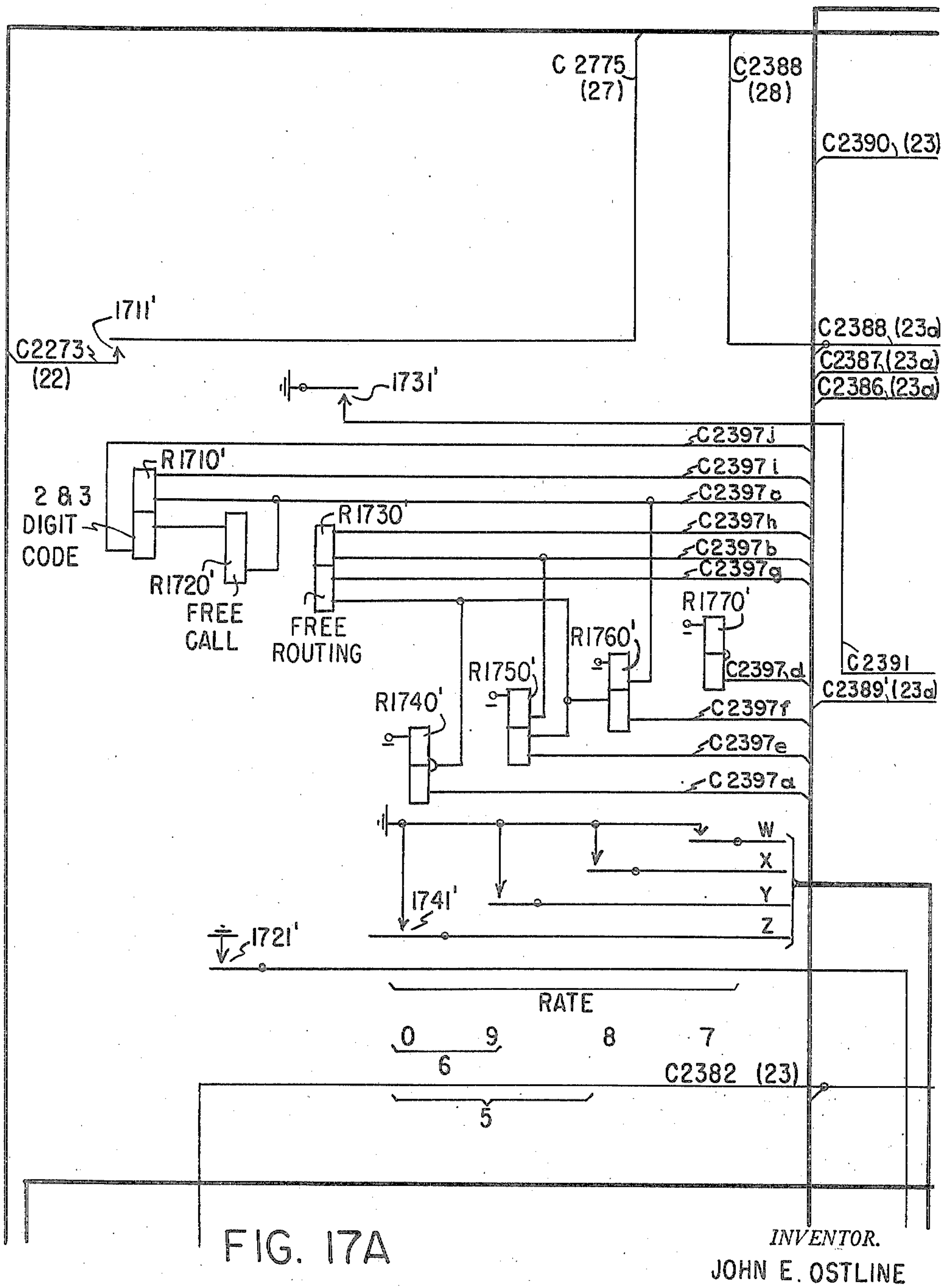
Figure 18:
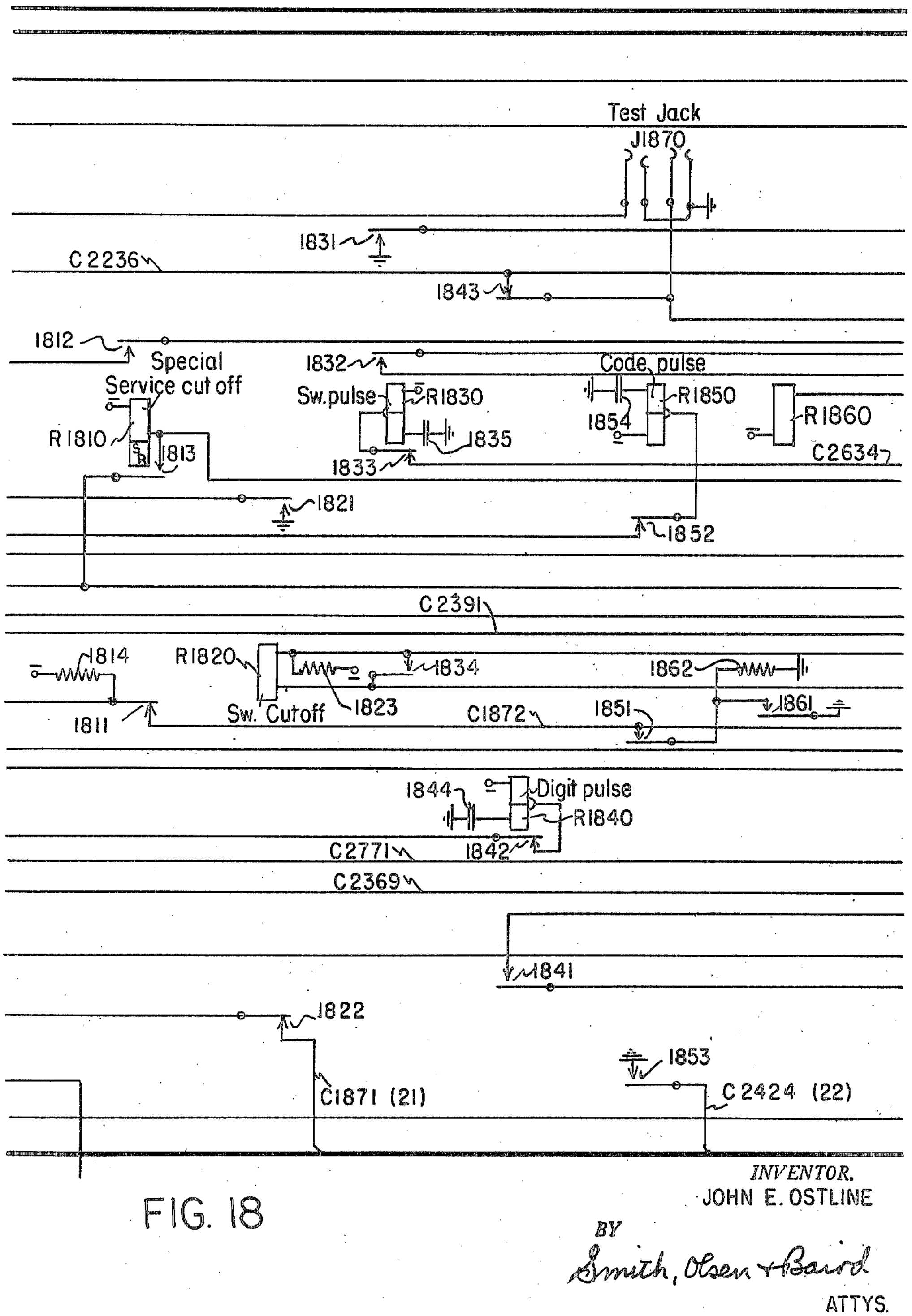

At this time the wiper set of the rate and route switch R2310 is in engagement with the sixth contacts in the fifth levels of the associated contact banks, and the wiper 2317 completes a circuit from ground by way of the resistor 2327, the wiper 2317 and the engaged sixth contact in the fifth level, the jumper **2353*g*** and the conductor C2397*a* extending to Fig. 17A, and the lower and upper windings of the rate relay R1740′ to battery. Consequently, when the wiper 2317 engages the above-mentioned contact in the associated contact bank, the rate relay R1740′ is energized and, at its contacts 1741′, applies ground potential to the Z conductor of the group of WXYZ marking leads 2812. Assuming that the rate factor digit "1" is applicable to the call from exchange 4 zone 84 to exchange 3 zone 27, the complementary digit "0" thereof is selected when the rate relay R1740′ is energized. It should be understood, however, that the jumper **2353*g*** may be connected in any other manner in order to energize individually the relay R1740′, R1750′, R1760′ or R1770′; or this jumper may be connected so that the relays R1740′ and R1750′ are energized simultaneously, or so that the relays R1740′ and R1760′ may be energized simultaneously.

More particularly, in the present call the wiper 2317 of the wiper set of the rate and route switch R2310 operates only the rate relay R1740′, which relay, in turn, at its contacts 1741′, marks the Z conductor in the group of WXYZ marking leads 2812 in accordance with the complementary digit "0." At this point it is noted that the rate relays R1740′, R1750′, R1760′ and R1770′ may be controlled by the circuit including the wiper 2317 of the rate and route switch R2310, in order to set up the complementary digit of the charging rate for any particular call, whereby the sum of the complementary digit and the rate factor digit is equal to eleven. Accordingly, the complementary digits "0," "9," "8," "7," "6" and "5" respectively corresponding to the rate factor digits "1," "2," "3," "4," "5" and "6," may be set up by respectively marking the Z, Y, X, W, YZ, and XZ conductors in the associated group of marking leads 2812.

As noted above, the application of ground potential to the conductor C2397*a* by way of the wiper as 17 and the jumper **2353*g*, causes the operation of the rate relay R1740′, thereby to mark only the Z conductor in accordance with the complementary digit "0." If the jumper 2353*g*** is connected to the conductor C2397*b* instead of to the conductor C2397*a*, then a circuit is completed for operating the rate relay R1750′, thereby to mark only the Y conductor in accordance with the complementary digit "9." If ground potential is applied, however, instead to the conductor C2397*c*, the rate relay R1760′ is operated in order to mark only the X conductor in accordance with the complementary digit "8." If ground potential is applied, however, instead to the conductor **C2397*d*, the rate relay R1770′ is operated in order to mark only the W conductor in accordance with the complementary digit "7." If ground potential is applied, however, to the conductor C2397*e*, a circuit is completed for energizing the lower winding of the rate relay R1750′ in series with the lower winding of the rate relay R1740′, whereupon relays are operated in order to mark only the Z and Y conductors in accordance with the complementary digit "6." Finally if ground potential is applied to the conductor C2397*f***, a circuit is completed for energizing the lower winding of the rate relay R1760′ in series with the upper winding of the rate relay R1740′, whereupon the relays mentioned operate in order to mark only the Z and X conductors in accordance with the complementary digit "5." In view of the foregoing it is noted that six different charge rates may be selected and therefore the charge rate to be applied to a particular call may be predetermined in accordance with the destination of the call.

In addition to the complementary digit "0" marked by the operation of the rate relay R1740' in the present connection, the first, second and third code digits "2," "7" and "3" are respectively registered in the first code switch A2400, the second code switch B2410, and the third code switch C2500, whereby the respective groups of WXYZ marking leads 2805, 2806 and 2807 are respectively marked in accordance with the digits "2," "7" and "3"; while the first, second, third and fourth numerical digits "1," "2," "3" and "4" are respectively registered in the first numerical switch D2510, the second numerical switch E2520, the third numerical switch F2600, and the fourth numerical switch G2610, whereby the respective groups of WXYZ marking leads 2808, 2809, 2810 and 2811 are respectively marked in accordance with the digits "1," "2," "3," and "4." Further, the terminal block B2770 marks the associated group of WXYZ marking leads 2813 in accordance with the digit "6" corresponding to the number of the register translator 1700, it being understood that each register translator in the system has its individual identifying digit. The individual marking leads 2814, 2815 and 2816 are not marked on the present call, in view of the fact that the special service relay R2040, the code send relay R1750, and the free call relay R1720' occupy their restored positions at the present time. Finally, the code storage devices S2801, S2802, S2803 and S2804, respectively, register the digits "0," "0," "9" and "9" corresponding to the directory number of the line terminal of the private subscriber line 407 extending to the calling private subscriber substation TP whereby the respectively associated groups of WXYZ marking leads 2801, 2802, 2803 and 2804 are respectively marked in accordance with the digits "0," "0," "9," and "9."

In the storage transfer switch U2820 the wiper 2821 first successively engages the contacts in its associated contact bank; then the wiper 2822 successively engages the contacts in its associated contact bank; and finally the wiper 2823 successively engages the contacts in its associated contact bank. When the wipers noted of the storage transfer switch U2820 are driven thirty-three steps in the clockwise direction away from their home positions the wiper 2825 thereof engages the thirty-third contact in its associated contact bank terminating the conductor C1775, whereby a circuit is completed for energizing the upper winding of the wiper switching relay R2030. The last-mentioned circuit extends from ground by way of the contacts 1768, the conductor C2421 extending to Fig. 22, the wiper 2825 of the storage transfer switch U2820 and the engaged thirty-third contact in its associated contact bank, the conductor C1775 extending to Fig. 17, the contacts 1762 and 2033, the upper winding of the relay R2030, to battery. When thus energized the wiper switching relay R2030 operates partially to close its contacts 2034, thereby to complete a circuit, including the grounded hold conductor C2772, for short-circuiting the lower winding thereof. When the wiper 2825 of the storage transfer switch U2820 is driven an additional step in the clockwise direction, it disengages the thirty-third contact in its associated contact bank, thereby to interrupt the above-traced original circuit for energizing the upper winding of the wiper switching relay R2030, whereupon the above-described holding circuit, including the contacts 2034 and the grounded hold conductor C2772, is completed for energizing in series the upper and lower windings of the wiper switching relay R2030. When this circuit is completed the wiper switching relay R2030 operates completely, thereby to interrupt, at its contacts 2033, a further point in the previously traced original circuit for energizing the upper winding thereof and to interrupt, at its contacts 2036, the previously traced original circuit for energizing the code pulse relay R1850. Also, the wiper switching relay R2030 completes, at its contacts 2035, an alternative circuit for energizing the code pulse relay R1850 over a circuit which extends from the wiper 2826 of the storage transfer switch U2820 and the engaged grounded thirty-fourth contact in its associated contact bank, by way of the conductor C2175 extending to Fig. 22, the contacts 2035, 1763, and 1852, and the lower winding of the relay R1850 to battery. Further, the wiper switching relay R2030 interrupts, at its contacts 2038 a further point in the previously traced circuit, including the multiply connected wipers 2821 and 2822 of the storage transfer switch U2820 for energizing the winding of the mark relay R1860, and prepares, at its contacts 2037, a substantially identical alternative circuit, including the conductor C2176 extending to Fig. 28 and the wiper 2823 of the storage transfer switch U2820, for energizing the winding of the mark relay R1860.

The wipers noted of the storage transfer switch U2820 are driven four additional steps in the clockwise direction, whereupon the wiper 2826 thereof disengages the thirty-seventh contact in its associated contact bank and engages the thirty-eighth contact therein, whereby the previously traced alternative circuit for energizing the lower winding of the code pulse relay R1850 is interrupted and an alternative circuit, substantially identical to that previously traced and including the contacts 2735, is completed for energizing the lower winding of the code pulse relay R1850 in the event the sequence relay R2730 occupies its operated position at this time indicating that the first numerical digit "1" has been registered in the first numerical switch D2510. The wipers noted of the storage transfer switch U2820 are driven four additional steps in the clockwise direction, whereupon the wiper 2826 disengages the forty-first contact in its associated contact bank and engages the forty-second contact therein, whereby the previously traced alternative circuit for energizing the code pulse relay R1850, and including the contacts 2735, is interrupted, and an alternative circuit is now completed, including the contacts 2747, for energizing the code pulse relay, in the event the sequence relay R2740 occupies its operated position at this time, indicating that the second numerical digit "2" has been registered in the second numerical switch E2520. The wipers of the storage transfer switch U2820 are driven four additional steps in a clockwise direction, whereupon the wiper 2826 disengages the forty-fifth contact in its associated contact bank and engages the forty-sixth contact therein, whereupon the circuit for energizing the code pulse relay R1850 is transferred from ground potential at the contacts 2747 to ground potential at the contacts 2757 in the event the sequence relay R2750 occupies its operated position indicating that the third numerical digit "3" has been registered in the third numerical switch F2600. The wipers of the storage transfer switch U2820 are again driven four additional steps in the clockwise direction, whereupon the wiper 2826 disengages the forty-ninth contact and engages the fiftieth or home contact in its associated contact bank, whereupon the previously traced circuit for energizing the code pulse relay R1850 is transferred from ground potential at the contacts 2757 to ground potential at the contacts 2764, in the event the sequence relay R2760 occupies its operated position, indicating that the fourth numerical digit "4" has been registered in the fourth numerical switch G2610. The wipers of the storage transfer switch U2820 are now driven six additional steps in the clockwise direction, whereupon the wiper 2826 thereof disengages the fifty-fifth contact in its associated contact bank and engages the fifty-sixth contact therein, whereby the circuit for energizing the code pulse relay R1850, including the contacts 2764, is interrupted.

When the wiper 2823 of the storage transfer switch U2820 engages the fifty-sixth contact in its associated contact bank, a circuit is completed for operating the last digit send relay R1720. More particularly, at this time a circuit is completed for energizing the last digit send relay R1720 in series with the winding of the mark relay R1860 over a circuit which may be traced from ground by way of the winding of the last digit send relay R1720, the conductor C1774 extending to Fig. 28, the wiper 2823 and the engaged fifty-sixth contact in its associated contact bank, the conductor C2176 extending to Fig. 20, the contacts 2037, and the winding of the mark relay R1860, to battery. When this series circuit is completed, both the last digit send relay R1720 and the mark relay R1860 operate. Upon operating, the mark relay R1860 prepares a point in the previously mentioned circuit for applying direct ground potential upon the conductor C1872 upon the next operation of the code pulse relay R1850. In order to provide the additional operation of the code pulse relay R1850, a circuit is prepared when the wiper 2826 of the storage transfer switch U2820 engages the fifty-sixth contact in its associated contact bank, and is completed when the wiper 2303 of the digit sequence switch T2300 engages the thirteenth contact in its associated contact bank, thus indicating that all of the routing and numerical digits have been transmitted by the digit pulse relay R1840 to the impulse relay R960 in the toll ticket repeater 800. The last-mentioned circuit extends from the grounded wiper 2303 of the digit sequence switch T2300 and the engaged thirteenth contact in its associated contact bank, the conductor C2372 extending to Fig. 28, the wiper 2826 of the storage transfer switch U2820 and the engaged fifty-sixth contact in its associated contact bank, the conductor C2175 extending to Fig. 22, the contacts 2035, 1763 and 1852, and the lower winding of the code pulse relay R1850 to battery. When this circuit is completed the code pulse relay R1850 again operates and restores, thereby to cause the wipers of the storage transfer switch U2820 to be driven an additional step in the clockwise direction and to cause direct ground potential to be again applied to the conductor C1872. It is noted that this application of direct ground potential to the conductor C1872 occurs subsequent to the transmission of the last code digit from the storage transfer switch U2820 and is utilized in the toll ticket repeater 800, for a purpose more fully explained hereinafter.

Incident to the operation and subsequent restoration of the code pulse relay R1850, the wipers of the storage transfer switch U2820 are driven an additional step in the clockwise direction, whereupon the wiper 2826 disengages the fifty-sixth contact in its associated contact bank, thereby to interrupt the previously traced circuit for energizing the code pulse relay R1850 in order to arrest further operation of the latter relay at this time. Also, when the wiper 2823 disengages the fifty-sixth contact in its associated contact bank, the previously traced circuit for energizing in series the winding of the last digit send relay R1720 and the winding of the mark relay R1860 is interrupted, thereby to cause the latter relays to restore. Also, the wiper 2824 now engages the fifty-seventh contact in its associated contact bank, thereby to complete a circuit for energizing the lower winding of the release relay R2210. The last-mentioned circuit may be traced from ground by way of the contacts 1768, the conductor C2421 extending to Fig. 22, the wiper 2824 and the engaged fifty-seventh contact in its associated contact bank, the conductor C2174 extending to Fig. 20, the contacts 2032, the conductor C2389, and the lower winding of the release relay R2210, to battery. When thus energized the release relay R2210 operates to effect the release of the register translator 1700 and the primary register 1200, in a manner more fully explained hereinafter.

Referring now to the toll ticket repeater 800, it is noted that the groups of WXYZ marking leads respectively extending to the code storage devices S1121 to S1126, inclusive, are terminated in a clockwise direction in the contact bank associated with the wiper 1101 of the register and timer switch R1100; the group of WXYZ marking leads extending to the code storage device S1127 is terminated both in the last left-hand contact of the contact bank associated with the wiper 1101 and the first three righthand contacts of the contact bank associated with the wiper 1102; the groups of WXYZ marking leads respectively extending to the code storage devices S1128 to S1133, inclusive, are terminated in a clockwise direction in the contact bank associated with the wiper 1102; while the group of WXYZ marking leads extending to the code storage devices S1134 and S1135 are terminated in a clockwise direction in the contact bank associated with the wiper 1103 of the register and timer switch R1100. During the operation of the register and timer switch R1100, the wiper 1101 first sequentially engages the contacts in its associated contact bank; then the wiper 1102 sequentially engages the contacts in its associated contact bank; and, finally, the wiper 1103 sequentially engages the contacts in its associated contact bank.

Figure 11:
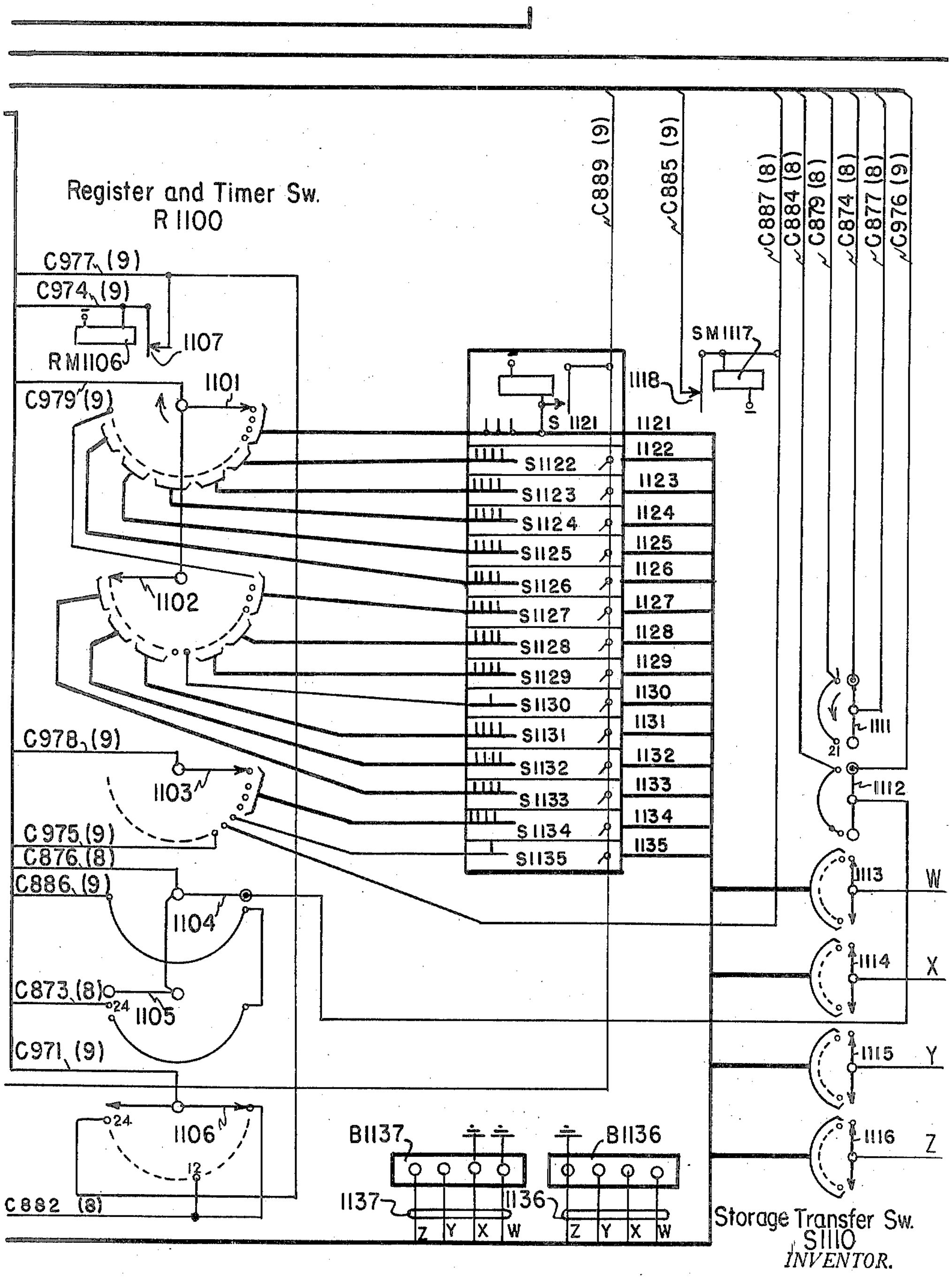

Each time the step relay R920 operates and then restores it completes and then interrupts, at its contacts 921, a circuit, including the conductor C974 extending to Fig. 11, for energizing the winding of the magnet RM1106, thereby to cause the latter magnet to operate and restore. The magnet RM1106 of the register and timer switch R1100 drives the wipers 1101 to 1106, inclusive, one step in the clockwise direction. Each time the code relay R910 operates and restores it completes and then interrupts, at its contacts 911, a path for applying ground potential, by way of the contacts 935 and the conductor C979 extending to Fig. 11, to the multiply connected wipers 1101 and 1102. When the wiper switching relay R930 occupies its restored position, ground potential is applied by way of the above-mentioned circuit to the multiply connected wipers 1101 and 1102. However, when the wiper switching relay R930 occupies its operated position, ground potential is applied, by way of the contacts 911 and 934, and the conductor C978 extending to Fig. 11, to the wiper 1103 of the register and timer switch R1100. When the wipers of the register and timer switch R1100 are driven twenty-four steps in the clockwise direction the wiper 1105 thereof engages the twenty-fourth contact of its associated contact bank, whereupon a circuit is completed for energizing the lower winding of the wiper switching relay R930. This circuit may be traced from ground by way of the contacts 833, the conductor C877 extending to Fig. 11, the wiper 1111 of the storage transfer switch S1110 and the engaged home contact in its associated contact bank, the conductor C874 extending to Fig. 8, the contacts 832, the conductor C876 extending to Fig. 11, the wiper 1105 of the register and timer switch R1100 and the engaged twenty-fourth contact in its associated contact bank, the conductor C873 extending to Fig. 8, the contacts 838 and 933, and the lower winding of the wiper switching relay R930, to battery. When thus energized the wiper switching relay R930 operates partially to close its contacts 931, thereby to complete a circuit, including the contacts 836, for short-circuiting the upper winding thereof. Subsequently, the wipers of the register and timer switch R1100 are advanced an additional step in the clockwise direction, whereupon the wiper 1105 disengages the twenty-fourth contact in its associated contact bank, thereby to interrupt the above-traced original circuit for energizing the lower winding of the wiper switching relay R930 and, consequently, the short circuit across the upper winding thereof, whereupon the holding circuit, including the contacts 836 and 931, is completed for energizing in series the upper and lower windings of the relay R930. When the latter circuit is completed the wiper switching relay R930 operates fully to actuate the remaining contacts thereof and, at its contacts 933, opens a further point in the previously traced original energizing circuit for the lower winding thereof. Also, upon operating, the relay R930 interrupts, at its contacts 935, the above-traced circuit for applying ground potential to the multiply connected wipers 1101 and 1102 and prepares, at its contacts 934, the above-traced circuit for applying ground potential to the wiper 1103.

In view of the foregoing description of the operation of the storage transfer switch U2820 in the register translator 1700 and the register and timer switch R1100 in the toll ticket repeater 800, it will be understood that each time the code pulse relay R1850 of the register translator 1700 operates it completes, at its contacts 1853, the previously traced circuit for controlling the magnet UM2827, and, at its contacts 1851, it completes the previously traced path for applying either resistance or direct ground potential to the conductor C1872, thereby to cause the operation of the step relay R920 in the toll ticket repeater 800. Each time the step relay R920 operates, at its contacts 921 it completes the previously traced circuit for energizing the magnet RM1106. Hence, the magnets UM2827 and RM1106 are energized and deenergized in synchronism, thereby to cause the storage transfer switch U2820 in the register translator 1700 and the register and timer switch R1100 in the toll ticket repeater 800 to be operated in synchronism. Accordingly, it will be understood that the wipers of the storage transfer switch U2820 successively engage the conductors in the various groups of WXYZ marking leads while the wipers of the register and timer switch R1100 successively engage the various conductors in the groups of WXYZ marking leads extending to the code storage devices S1121 to S1135, inclusive. Thus the code markings corresponding to the different digits appearing upon the conductors in the various groups of WXYZ marking leads associated with the storage transfer switch U2820 are transferred to corresponding ones of the code storage devices S1121 to S1135, inclusive, associated with the register and timer switch R1100.

The two direct ground impulses and the two resistance ground impulses cause four complete operations of the step relay R920, thereby to cause the wipers of the register and timer switch R1100 to be driven four steps in the clockwise direction, in the manner previously explained. However, only the first and third of the four impulses, that is the direct ground impulses, cause operation of the code relay R910. Thus, the code relay R910 is operated at times when the wiper 1101 of the switch R1100 engages the home and second contacts in its associated contact ban, thereby to complete circuits for energizing the W and Y relays in the code storage device S1121. The circuit for energizing the W relay in the code storage device S1121 extends from ground, by way of the contacts 911 and 935, the conductor C979 extending Fig. 11, the wiper 1101 of the register and timer switch R1100, and the engaged home contact in the associated contact bank, and the W relay of the code storage device S1121, to battery. The Y relay in the code storage device S1121 is operated over a substantially identical circuit when the wiper 1101 engages the second contact in its associated contact bank. The W and Y relays in the code storage device S1121 operate, thereby to mark with ground potential the W and Y conductors in the associated group of WXYZ marking leads 1121 terminating in the banks of the storage transfer switch S1110 in accordance with the first code digit "2," in the manner previously explained.

At the conclusion of the cycle of operation of the storage transfer switch U2820 in the register translator 1700 and the register and timer switch R1100 in the toll ticket repeater 800, the various items of record information stored in the various registers in the register translator 1700 have been transmitted to the various code storage devices S1121 to S1135, inclusive, in the toll ticket repeater 800 and represent the following information, as indicated below:

| Register in Register Translator 1700 Transferred From— | Code Storage Device In Toll Ticket Repeated 800 Transferred To— | Nature of Record Information |
|---|---|---|
| First code switch A2400 | S1121 | The respective first, second, and third digits of the code portion of the directory number of the called subscriber substation identifying the zone and exchange thereof, the digits "2," "7" and "3." |
| Second code switch B2410 | S1122 | |
| Third code switch C2500 | S1123 | |
| Code storage device S2801 | S1124 | The respective first, second, third, and fourth digits of the numerical portion of the directory number of the calling subscriber substation identifying the line terminal thereof, the digits "0," "0," "9" and "9." |
| Code storage device S2802 | S1125 | |
| Code storage device S2803 | S1126 | |
| Code storage device S2804 | S1127 | |
| The rate relays R1740′, R1750′ R1760′ and R1770′. | S1128 | The complementary digit of the rate factor digit applicable to the toll call between the calling subscriber substation in exchange 4 zone 84 and the called subscriber substation in exchange 3 zone 27, the complementary digit "0" of the rate factor digit "1." |
| Terminal block B2770 | S1129 | The digit identifying the register translator utilized, the digit "6." |
| The special service relay R2040 | S1130 | The digit "0" indicating that the calling subscriber substation is rendered extended service, no digit being registered. |
| First numerical switch D2510 | S1131 | The respective first, second, third, and fourth digits of the numerical portion of the directory number of the called subscriber substation identifying the line terminal thereof, the digits "1," "2," "3" and "4." |
| Second numerical switch E2520 | S1132 | |
| Third numerical switch F2600 | S1133 | |
| Fourth numerical switch G2610 | S1134 | |
| The code send relay R1750 | S1135 | The digit "0" indicating that the code portion of the directory number of the called subscriber substation identifying the zone and the exchange thereof comprises only two digits, no digit being registered. |
| The free call relay R1720′ | | Indicates that a ticket will be printed on busy, don't answer, no party, and abandoned calls, to certain groups of subscribers. |

By way of example, it is pointed out that the W and Y conductors of the group of WXYZ marking leads 2805 are marked with ground potential by the first code switch A2400 in accordance with the first code digit "2." Thus when the wiper 2821 of the storage transfer switch U2820 engages the home and second contacts in its associated contact bank, ground potential is encountered on the W and Y conductors in the group of WXYZ marking leads 2805; on the other hand, when the wiper 2821 engages the first and third contacts in its associated contact bank, no ground potential is encountered on the X and Z conductors in the group of WXYZ marking leads 2805. Accordingly, the register translator 1700 transmits a direct ground impulse, then a resistance ground impulse, and a direct ground impulse and then a resistance ground impulse, over the conductor C1872.

It is noted that the direct ground and resistance ground impulses transmitted by the code pulse relay R1850 to the step relay R920 and the code relay R910 are transmitted simultaneously with the transmission of the impulses by the digit pulse relay R1840 to the impulse relay R960. The pulses transmitted to the step relay R920 and the code relay R910 constitute code digits corresponding to record information digits, while the impulses transmitted to the impulse relay R960 constitute numerical digits corresponding to switch control digits. In view of the connection and arrangement of the register translator 1700, previously described, the code digits are completely transmitted therefrom prior to the transmission of the last numerical digit therefrom.

As previously pointed out, after all the code digits and the numerical digits have been transmitted from the register translator 1700 to the toll ticket repeater 800, the register translator 1700 operates to transmit another direct ground impulse over the conductor C1872, whereby the step relay R920 and the code relay R910 in the toll ticket repeater 800 reoperate. At this time the wiper 1103 of the register and timer switch R1100 engages the sixth contact in its associated contact bank. Hence, when the code relay R910 operates it completes, at its contact 911, a circuit including the contacts 934, the conductor C978 extending to Fig. 11, the wiper 1103 and the engaged sixth contact in its associated contact bank, the conductor C975 extending to Fig. 9, and the winding of the switch-through relay R950, to battery. When thus energized, the switch-through relay R950 operates to complete, at its contacts 956, a holding circuit for itself including the grounded hold conductor C889. Also, when the step relay R920 operates and restores it completes and then interrupts, at its contacts 921, the previously traced circuit for energizing the magnet RM1106 of the register and timer switch R1100, whereby the wipers of the switch are driven an additional step in the clockwise direction, in the manner previously explained.

Also, upon operating, the switch-through relay R950 completes, at its contacts 953 and 955, a connection between the lower winding of the impulse relay R960 and the line conductor C781 of the trunk 780. This connection extends from ground by way of the lower winding of the impulse relay R960, the contacts 955, the winding 901 of the repeating coil 900, and the contacts 953 to the line conductor C781 of the trunk 780. It is again noted that the line conductor C782 of the trunk 780 is connected by way of the winding 902 of the repeating coil 900 and the upper winding of the impulse relay R960, to battery. Further, the switch-through relay R950 interrupts, at its contacts 954, a point in the previously traced circuit for energizing in series the windings of the step relay R920 and the code relay R910 thereby positively to prevent further operation of the latter relays at this time. Further, the switch-through relay R950 interrupts, at its contacts 952, the previously traced impulsing bridge between the conductors C5302 and C5303 of the trunk 5301 extending to the toll selector 5300, whereupon a circuit is completed, including the contacts 961 and the windings 903 and 904 of the repeating coil 900, for energizing the lower winding of the answer relay R945 in series with the circuit completed over the switch train including the trunk line 5301. In order to limit the amount of current flow through the lower winding of the answer relay R945 and thus prevent its operation at the present time if the current flow therethrough is particularly strong, the lower winding is shunted by way of the circuit including the resistor 947, the conductor C5306 extending to Fig. 53, the contacts of the normal post springs S5321, the conductor C5305 extending to Fig. 9, and the lower winding of the answer relay R945, and returning to the resistor 947. The answer relay R945 is of the polar type and the circuit including the upper winding thereof is now completed; however, the current flow through the lower winding thereof is not in such a direction that the relay will operate at the present time.

The switch-through relay R950, at its contacts 958, completes a circuit including the contacts 845 for short-circuiting the contacts 961 which are under control of the impulse relay R960. This shunting circuit is provided as a precautionary measure to prevent an impulse from inadvertently being transmitted over the line conductors C5302 and C5303 of the trunk 5301, should the calling subscriber inadvertently actuate his dialing mechanism or his associated switchhook. Finally, the switch-through relay R950 completes, at its contacts 957, a circuit for energizing the magnet RM1106 of the register and timer switch R1100. This circuit extends from ground by way of the contacts 833, the conductor C877 extending to Fig. 11, the wiper 1111 of the storage transfer switch S1110 and the engaged home contact in its associated contact bank, the conductor C874 extending to Fig. 8, the contacts 832, the conductor C876 extending to Fig. 11, the wiper 1104 of the switch R1100 and the engaged contact in the associated contact bank, the conductor C886 extending to Fig. 9, the contacts 957, the conductor C977 extending to Fig. 11, the self-interrupting contacts 1107, and the winding of the magnet RM1106, to battery. When thus energized the magnet RM1106 operates intermittently, thereby to drive the wipers of the switch R1100 step by step in the clockwise direction back to their home positions. Attention is directed to the fact that when the wiper 1104 of the switch R1100 disengages the last or twenty-fourth contact in its associated contact bank, the self-interrupting circuit for the magnet RM1106 is interrupted at the wiper 1104; however, the multiply connected circuit including the wiper 1105 is recompleted when the latter wiper engages the first contact in its associated contact bank, thereby to recomplete the intermittent operating circuit for the magnet RM1106 until the wiper 1105 disengages the twenty-third contact in its associated contact bank and engages the twenty-fourth contact thereof. When the latter contact is engaged by the wiper 1105 the circuit for energizing the magnet RM1106, in order to advance the wiper 1105 from the twenty-fourth contact into engagement with the home contact of its associated contact bank, is completed from ground by way of the contacts 833, the conductor C877 extending to Fig. 11, the wiper 1111 and the engaged home contact in its associated contact bank, the conductor C874 extending to Fig. 8, the contacts 832, the conductor C876 extending to Fig. 11, the wiper 1105 and the engaged twenty-fourth contact in its associated contact bank, the conductor C873 extending to Fig. 8, the contacts 838 and 932, the conductor C977 extending to Fig. 11, the self-interrupting contacts 1107, and the winding of the magnet RM1106 to battery. When the magnet RM1106 is energized over the above-traced circuit the wipers of the register and timer switch R1100 are advanced an additional step in the clockwise direction into engagement with the home contacts of the associated contact banks. The self-interrupting circuit for the magget RM1106 is now interrupted in order to arrest further operation of the register and timer switch R1100 at this time.

As previously explained, after all of the code digits and all of the numerical digits have been transmitted from the register translator 1700 the release relay R2210 operates. Upon operating, the release relay R2210 completes, at its contacts 2214, a circuit, including the conductor C2217, the contacts 2284, the wiper 2295 of the finder F2290, the conductor C1281 extending to Fig. 12, and the contacts 1263, for energizing the upper winding of the release relay R1315 in the primary register 1200. When thus energized the release relay R1315 operates to complete, at its contacts 1319, the previously traced circuit including ground at the contacts 1411 for energizing the lower winding thereof, and to interrupt, at its contacts 1317, the previously traced circuit for energizing the winding of the send relay R620 in the primary selector 600, whereupon the latter relay restores.

In the primary selector 600 the send relay R620 effects the restoration of the cut-in relay R630, in the manner previously explained; and, at its contacts 624 and 626, it completes a loop circuit extending from the calling private subscriber substation TP for energizing in series the upper and lower windings of the impulse relay R960 in the toll ticket repeater 800, thereby to retain the latter relay in its operated position while the register translator 1700 and the primary register 1200 are being released. The last-mentioned circuit extends from ground by way of the lower winding of the impulse relay R960, the contacts 955, the winding 901 of the repeating coil 900, the contacts 953, the conductor C781 of the trunk 780, the wiper 701 of the wiper set of the switch mechanism 700, the contacts 772 and 626, the conductor C464 of the trunk 462, the line switch 423, and the loop circuit including the line conductors C408 and C409 extending to the calling private subscriber substation TP, and returning by way of the line switch 423, the conductor C463 of the trunk 462, the contacts 624 and 774, the wiper 702 of the wiper set of the switch mechanism 700, the conductor C782 of the trunk 780, the winding 902 of the repeating coil 900, and the upper winding of the impulse relay R960, to battery. Accordingly, at this time an operative connection is completed between the calling private subscriber substation TP and the toll line 5626 extending to exchange 2 zone 27; and extending therefrom by way of the automatic switching apparatus in exchange 2 zone 27 and exchange 3 zone 27 to the subscriber line extending to the called subscriber substation.

*Release of the primary register and the register translator*

In the primary register 1200, the release relay R1315 upon operating, in addition to completing the locking circuit for its lower winding at its contacts 1316, also interrupts, at its contacts 1317, the previously traced holding circuit for energizing the winding of the send relay R620 in the primary selector 600, all in the manner previously explained. Also, the release relay R1315 completes, at its contacts 1318, an alternative circuit for energizing the upper winding of the impulse relay F960 in the toll ticket repeater 800 prior to the release of the send relay R620 in the primary selector 600. The last-mentioned circuit extends from ground by way of the contacts 1318, the conductor C642 extending to Fig. 6, the wiper 612 of the finder F610, the contacts 623 and 774, the wiper 702 of the wiper set of the switch mechanism 700, the conductor C782 of the trunk 780, the winding 902 of the repeating coil 900, and the upper winding of the impulse relay R960, to battery. The latter alternative circuit for the impulse relay R960 is provided to maintain the relay F960 in its energized position while the holding circuit therefor is being transferred from under control of the primary register 1200 and the register translator 1700 to the calling subscriber's line.

It will be recalled that when the send relay R620 restores to normal it caused the cut-in relay R630 also to restore to normal. When the relay R630 in the primary selector 600 restores it interrupts, at its contacts 631 and 633, the previously traced loop circuit for energizing the line relay R1370 in the primary register 1200, thereby to cause the latter relay to restore. The party line relay R1360, included in this series circuit, being of the differential type is not in its operated position at this time. When the line relay R1370 restores, at its contacts 1371 it opens the circuit of the auxiliary line relay R1420, thereby to cause the latter relay to restore. Upon restoring, the auxiliary line relay R1420, at its contacts 1421, opens the circuit of the slow-to-release hold relay R1430, which subsequently restores to normal; at its contacts 1422, it removes the marking ground potential from the wiper 1503; and, at its contact 1423, it completes the previously traced circuit for operating the dial relay R1260. The latter circuit is only maintained until the slow-to-release hold relay R1430 subsequently opens this circuit at its contacts 1431. In response to the momentary operation of the dial relay R1260, a circuit is completed for the dial slave relay R1310. The circuits controlled by the latter two relays during the momentary operation thereof have no function to perform at the present time. When the hold relay R1430 restores to normal, at its contacts 1431, it interrupts the above-mentioned circuit for the dial relay R1260, which relay restores to normal and, at its contacts 1261, causes the dial slave relay R1310 to restore to normal. Also, upon restoring to normal, the relay R1430, at its contacts 1432 and 1435, completes a circuit, traced hereinafter, for controlling the magnet AM1504 of the first code switch A1500; at its contacts 1434 it interrupts the energizing circuit for the slow-to-release lock relay R1410 which subsequently restores to normal; and, at its contacts 1436, it opens a point in the circuit for the pulse relay R1460. When the lock relay R1410 subsequently restores to normal, at its contacts 1412, it removes the ground potential from the conductor C646 but a busy marking ground potential is retained thereon from contacts 1471, and, at its contacts 1411, it removes the locking ground potential from the lower winding of the release relay R1315, the winding of the busy relay R1350, the winding of the translate relay R1270, and from the lower winding of any one of the operated party line relays R1210, R1220 or R1230. In the event any one of these relays occupies its operated position at this time it will now restore to normal. The release relay R1315, upon restoring at its contacts 1317, reapplies ground potential to the conductor C647, and, at its contacts 1318, disconnects ground potential from the conductor C642. As a result of the restoration of the translate relay R1270, at its contacts 1273, it interrupts the previously traced holding circuit for energizing the winding of the test relay R1340 and for applying ground potential to the conductor C1282 extending to Fig. 22. The test relay R1340 now restores to normal and, at its contacts 1344, interrupts the previously traced circuit for energizing the winding of the send relay R1440, thereby to cause the latter relay to restore. When the send relay R1440 restores to normal, at its contacts 1444 and 1445 it interrupts a further point in the previously traced circuits for controlling the pulse relays R1460 and R1450, respectively.

It will be recalled that when the first code switch A1500 transmitted the complement of the first code digit registered therein and the marking identifying the calling subscriber, the wipers 1501 to 1503, inclusive, engaged the fourteenth contact in the associated contact banks. Consequently, when the hold relay R1430 restores to normal, in the manner described above, at its contacts 1432 and 1435, it completes a circuit for energizing the winding of the busy relay R1470 in series with the magnet AM1504 of the first code switch A1500. The last-mentioned circuit extends from ground by way of the winding of the busy relay R1470, the wiper 1501 of the first code switch A1500 and the engaged fourteenth contact in its associated contact bank, the contacts 1432 and 1435, the self-interrupting contacts 1505, and the winding of the magnet AM1504 to battery. When this circuit is completed the busy relay R1470 is operated and it is retained in its operated position during the restoration of the various switches A1500, B1510, C1520, D1620 and S1630, in view of the fact that the relay is of the slow-to-release type.

When the magnet AM1504 energizes in series with the busy relay R1470, it interrupts its initial energizing circuit at its contacts 1505, thereby to drive the wipers of the first code switch A1500 into engagement with the home contact in its associated contact bank. When the wiper 1501 thereof reengages the home contact in its associated contact bank, the previously traced circuit for energizing the winding of the busy relay R1470 is transferred from the magnet AM1504 to the magnet BM1516 of the second code switch B1510, over a circuit now includes the wiper 1501 and the engaged home contact in its associated contact bank, the wiper 1512 and the engaged eleventh contact in its associated contact bank, the self-interrupting contacts of the magnet BM1516, and the winding of the magnet BM1516, to battery.

The magnet BM1516 now operates intermittently in series with the busy relay R1470, thereby to drive the wipers 1511 to 1515, inclusive, of the second code switch B1510 step by step in the counterclockwise direction into engagement with their home contact positions. When the wiper 1512 of the second code switch B1510 reengages the home contact in its associated contact bank, the circuit for energizing the magnet BM1516 is transferred to the magnet CM1526 of the third code switch C1520, over a circuit which now includes the wiper 1512 and its engaged home contact, the wiper 1522 and the engaged eleventh contact in its associated contact bank, the self-interrupting contacts of the magnet CM1526, and the winding of the magnet CM1526, to battery.

The magnet CM1526 now operates intermittently in series with the busy relay R1470, thereby to drive the wipers 1521 to 1525, inclusive, of the third code switch C1520 step by step in the counterclockwise direction into engagement with their home contact positions. When the wiper 1522 engages the home contact in its associated contact bank, the circuit for energizing the magnet CM1526 is transferred to the magnet D1625 of the first numerical switch D1620, over a circuit which now includes the wiper 1522 and the engaged home contact in its associated contact bank, the wiper 1622 and the engaged eleventh contact in its associated contact bank, the self-interrupting contacts of the magnet DM1625 and the winding of the magnet DM1625, to battery.

The magnet DM1625 now operates intermittently in series with the busy relay R1470, thereby to drive the wipers 1621 to 1624, inclusive, of the first numerical switch D1620 step by step in the counterclockwise direction into engagement with their home contact positions. When the wiper 1622 engages the home contact in its associated contact bank, the circuit for the magnet DM1625 is transferred to the magnet SM1636 by way of the wiper 1622 and the engaged home contact in its associated contact bank, the wiper 1632 and the engaged contact in its associated contact bank, the self-interrupting contact 1637, and the winding of the magnet SM1636, to battery.

The magnet SM1636 of the sequence switch S1630 operates intermittently in series with the busy relay R1470, thereby to drive the wipers 1631 to 1635, inclusive, step by step in the counterclockwise direction into engagement with their home contact positions. When the wiper 1632 reengages the home contact in its associated bank, the previously traced circuit for energizing the winding of the busy relay R1470 in series with the magnet SM1636, is interrupted. Shortly thereafter the busy relay R1470 restores in view of the fact that the relay is of the slow-to-release type. Upon restoring, the busy relay R1470, at its contacts 1471, disconnects the busy marking ground potential from the conductor C646, in order to mark the primary register 1200 as idle and accessible to the various finders F610, etc. At this time the primary register 1200 is completely released and available for further use.

It will be recalled that during the release of the primary register 1200 the translate relay R1270, upon restoring to normal, at its contacts 1273, removes ground potential from the conductor C1282 extending to Fig. 22, whereupon the previously traced circuit for energizing the lowering winding of the cut-in relay R2140 in the register translator 1700 is interrupted. The cut-in relay R2140 now restores to normal and, at its contacts 2143, disconnects the busy marking ground potential from the conductor C1652. Also upon restoring, at its contacts 2141, the relay R2140 immediately reapplies ground potential, by way of the contacts 2211 of the operated release relay R2210, to the conductor C1652 in order to mark the register translator busy during the release of the register translator 1700; at its contacts 2142, it interrupts a further point in the circuit for its lower winding; and, at its contacts 2144, it interrupts the series circuit for energizing the windings of the switch relay R2280 and the hold relay R2130. When the latter circuit is interrupted the hold relay R2130 and the switch relay R2280 restore to normal.

When the switch relay R2280 restores, at its contacts 2288 it interrupts a further point in the previously traced circuit for energizing the winding of the timer relay R2270, thereby positively to arrest further operation of the latter relay at this time. When the hold relay R2130 restores, at its contacts 2137, it interrupts the previously traced holding circuit for the operated ones of the various WXYZ magnets in the code storage devices S2801 to S2804, inclusive, whereby the operated code storage devices are released. Also, the hold relay R2130 interrupts, at its contacts 2136, the previously mentioned path for applying ground potential to hold conductor C2772, thereby to interrupt the previously traced holding circuit for energizing in series the upper and lower windings of the wiper switching relay R2030, the lower winding of the special service relay R2040 in the event the latter relay has been operated, and the right-hand and left-hand windings of the various sequence relays R2710, R2720, R2730, R2740, R2750 and R2760, whereby the relays mentioned restore to normal. Further, the hold relay R2130 completes, at its contacts 2133, a circuit for energizing the upper winding of the release relay R2210 in series with the release magnet MM2264 of the timer switch M2260. The last-mentioned circuit extends from ground by way of the fuse alarm 2840, the wiper 2832 of the sender switch S2830 and the engaged home contact in its associated contact bank, the conductor C2218 extending to Fig. 22, the upper winding of the release relay R2210, the contacts 2133, the contacts 2266 of the off-normal springs SM2265, and the release magnet MM2264, to battery. When thus energized the release magnet MM2264 operates in order to restore the wipers 2261 and 2262 of the timer switch M2260 to their home contact positions. When the wipers of the timer switch M2260 are thus restored to normal, the set of off-normal switch springs SM2265 is actuated, whereby the above-mentioned circuit for energizing the release magnet MM2264 is interrupted at the contacts 2266, and, at the contacts 2267 the above-traced circuit, including the upper winding of the release relay R2210, is transferred to the conductor C2395 extending to Fig. 23, whereup the upper winding of the release relay R2210 is energized in series with the release magnet PM2342 of the composite code switch P2330. The last-mentioned circuit extends from ground by way of the previously traced path including the upper winding of the release relay R2210, the contacts 2133, the contacts 2267 of the off-normal springs SM2265, the conductor C2395 extending to Fig. 23, the contacts 2345 of the vertical off-normal spring PS2343, and the winding of the release magnet PM2342, to battery.

When thus energized the release magnet PM2342 operates to release the wiper set of the composite code switch P2330 thereby to cause it to be returned to its normal rotary and vertical positions. When the composite code switch P2330 is thus released the vertical off-normal switch springs PS2343 are actuated, thereby to interrupt, at the contacts 2345 thereof, the above-traced circuit for energizing the upper winding of the release relay R2210 in series with the release magnet PM2342, and to complete, at the contacts 2344 thereof, an alternative circuit for energizing the upper winding of the release relay R2210 in series with the release magnet RM2322 of the rate and route switch R2310. The last-mentioned circuit extends from ground by way of the previously traced path including the upper winding of the release relay R2210, the contacts 2344 of the vertical off-normal springs RS2324, and the winding of the release magnet normal spring RS2324, and the winding of the release magnet RM2322, to battery. When thus energized the release magnet RM2322 operates, thereby to release the wiper set of the rate and route switch R2310, whereupon the wiper set is restored to its normal rotary and vertical positions. When the rate and route switch R2310 is thus released, the vertical off-normal springs RS2324 are actuated, thereby to interrupt, at the contacts 2326 thereof, the previously traced circuit for energizing the upper winding of the release relay R2210 in series with the release magnet RM2322 of the rate and route switch R2310. Also, at the contacts 2325 the vertical off-normal springs R2324 interrupt the previously traced multiple holding circuits for the lower windings of the transfer relay R1930 and the stop relay R1940, whereupon the relays mentioned restore.

When the stop relay R1940 restores, at its contacts 1943 it interrupts the previously traced circuit for energizing the winding of the switch cut off relay R1820, thereby to cause the latter relay to restore. Upon restoring, the switch cut off relay R1820, at its contacts 1821, interrupts the previously traced circuit for energizing the winding of the digit pulse start relay R1710, thereby to cause the latter relay to restore. When the digit pulse start relay R1710 restores, at its contacts 1715 it interrupts the previously traced self-interrupting circuit for energizing the digit pulse relay R1840, thereby positively to arrest further operation of the latter relay at this time. Further, the digit pulse start relay R1710, at its contacts 1719, interrupts the previously traced holding circuits for energizing the windings of the code send relay R1730, the detector start relay R1760, and the special service cut off relay R1810, thereby to cause the relays mentioned to restore. When the detector start relay R1760 restores, at its contacts 1761' it interrupts the previously traced holding circuit for energizing the winding of the detector release relay R2240, thereby to cause the latter relay to restore.

Furthermore, as a result of the above-mentioned restoration of the hold relay R2130, at its contacts 2134, a multiple circuit is completed for energizing the upper winding of the release relay R2210 in series with the magnet TM2305 of the digit sequence switch T2300. The last-mentioned circuit extends from ground by way of the fuse alarm 2840, the wiper 2832 of the sender switch S2830 and the engaged home contact in its associated contact bank, the conductor C2218 extending to Fig. 22, the upper winding of the release relay R2210, the contacts 2134, the conductor C2365 extending to Fig. 23, the wiper 2301 of the digit sequence switch T2300 and the engaged contact in its associated contact bank, the contacts 2306, and the winding of the magnet TM2305, to battery. When thus energized the magnet TM2305 operates intermittently, thereby to drive the wipers 2301 to 2304, inclusive, of the digit sequence switch T2300 step by step in a counterclockwise direction into engagement with their home contact positions. When the wiper 2301 reengages the home contact in its associated contact bank, the previously traced circuit for intermittently operating the magnet TM2305 is interrupted and an alternative circuit is completed by way of the wiper 2301 and the engaged home contact in its associated contact bank, the conductor C2367 extending to Fig. 20, the contacts 2132, the conductor C2633, the wiper 2621 of the party switch N2620 and the engaged contact in its associated contact bank, the self-interrupting contacts of the magnet NM2625, and the winding of the magnet NM2625, to battery.

When the above-traced circuit is completed the magnet NM2625 of the party switch N2620 operates intermittently in series with the upper winding of the release relay R2210, thereby to drive the wipers 2621 to 2623, inclusive, of the party switch N2620 step by step in the counterclockwise direction into engagement with their home contact positions. When the wiper 2621 of the party switch reengages the home contact in its associated contact bank, it interrupts the previously traced circuit for intermittently energizing the magnet NM2625 is series with the release relay R2210, and it completes an obvious alternative circuit for energizing the upper winding of the release relay R2210 in series with the magnet GM2615 of the fourth numerical switch G2610. This circuit is the same as the previously traced circuit for energizing the magnet NM 2625 except that it now includes the wiper 2621 and the engaged home contact in its associated contact bank, and the wiper 2611 and the engaged contact in its associated contact bank.

When the above-traced circuit is completed for energizing the winding of the magnet GM2615, it operates intermittently thereby to drive the wipers 2611 to 2614, inclusive, of the fourth numerical switch G2610 step by step in the counterclockwise direction into engagement with their home contact positions. When the wiper 2611 reengages the home contact in its associated contact bank, it interrupts the previously traced circuit for intermittently operating the magnet GM2615 is series with the relay R2210 and transfers the circuit by way of the wiper 2601 of the third numerical switch F2600 and the engaged contact in its associated contact bank to the winding of the magnet FM2605 of the third numerical switch F2600, whereupon the latter magnet is intermittently operated in series with the upper winding of the release relay R2210.

The intermittent operation of the magnet FM2605 drives the wipers 2601 to 2604, inclusive, of the third numerical switch F2600 step by step in the counterclockwise direction into engagement with their home contact positions. When the wiper 2601 engages the home contact in its associated contact bank, the circuit of the release relay R2210 is transferred from the magnet FM2605 of the third numerical switch F2600 to the winding of the magnet EM2525 of the second numerical switch E2520, over a circuit which now includes the wiper 2521 and the engaged contact in its associated contact bank.

The magnet EM2525 operates intermittently, thereby to drive the wipers 2521 to 2524, inclusive, step by step in the counterclockwise direction into engagement with their home contact positions. When the wiper 2521 reengages the home contact in its associated contact bank, the circuit for energizing the upper winding of the release relay R2210 is transferred from the winding of the magnet EM2525 of the second numerical switch E2520 to the winding of the magnet DM2515 of the first numerical switch D2510 by way of the wiper 2511 and the engaged contact in its associated contact bank.

The magnet DM2515 operates intermittently, thereby to drive the wipers 2511 to 2514, inclusive, of the first numerical switch D2510 step by step in the clockwise direction into engagement with their home contacts. When the wiper 2511 reengages the home contact in its associated contact bank the circuit for energizing the upper winding of the release relay R2210 is transferred from the magnet DM2515 of the first numerical switch D2510 to the winding of the magnet CM2505 of the third code switch C2500 by way of the wiper 2501 and the engaged contact in its associated contact bank.

The magnet CM2505 operates intermittently, thereby to drive the wipers 2501 to 2504, inclusive, step by step in the clockwise direction into engagement with their home contact positions. When the wiper 2501 reengages the home contact in its associated contact bank, it transfers the circuit for energizing the upper winding of the release relay R2210 from the magnet CM2505 of the third code switch C2500 to the winding of the magnet BM2415 of the second code switch B2410 by way of the wiper 2411 and the engaged contact in its associated contact bank.

The magnet BM2415 operates intermittently, thereby to drive the wipers 2411 to 2414, inclusive, step by step in the clockwise direction into engagement with their home contact positions. When the wiper 2411 reengages the home contact in its associated contact bank, the circuit for energizing the upper winding of the release relay R2210 is transferred from the magnet BM2415 of the second code switch B2410 to the winding of the magnet AM2406 of the first code switch A2400 by way of the wiper 2401 and the engaged contact in its associated contact bank.

The magnet AM2406 operates intermittently, thereby to drive the wipers 2401 to 2405, inclusive, of the first code switch A2400 step by step in the clockwise direction into engagement with their home contact positions. When the wiper 2401 reengages the home contact in its associated contact bank, the circuit for energizing the upper winding of the release relay R2210 is transferred from the magnet AM2406 of the first code switch A2400 to the winding of the magnet UM2827 of the storage transfer switch U2820. The last-mentioned circuit extends from ground by way of the previously traced path including the upper winding of the release relay R2210, the wipers 2621, 2611, 2601, 2521, 2511, 2501, 2411 and 2401 and the respective home contacts in their associated contact banks, the contacts 1769, the conductor C2421 extending to Fig. 22, the wiper 2824 of the storage transfer switch U2820 and the engaged contact in its associated contact bank, the conductor C1771 extending to Fig. 17, the contacts 1711, the conductor C1772 extending to Fig. 28, the self-interrupting contacts 2828, and the winding of the magnet UM2827, to battery.

At this point it is noted that the grounded conductor C2421 is multiply connected to the wipers 2824 and 2825 of the storage transfer switch U2820 and that the majority of the contacts in the contact banks associated with these wipers are multiply connected to the conductor C1771 in order to complete the self-interrupting circuit for the magnet UM2827. In the event the wiper 2825 is in engagement with the thirty-third contact terminating the conductor C1775, the ground potential applied to the wiper 2825 is extended by way of the conductor C1775 extending to Fig. 17, the contacts 1761 and 1711, and the conductor C1772 extending to Fig. 17 to complete the self-interrupting circuit for the magnet UM2827. In the event the wiper 2824 of the storage transfer switch U2820 is in engagement with the fifty-seventh contact in its associated contact bank terminating the conductor C2174, ground potential connected to the wiper 2824 is extended by way of the conductor C2174 extending to Fig. 20, the contacts 2031, the conductor C1771 extending to Fig. 17, the contacts 1711, the conductor C1772 extending to Fig. 28, and the winding of the magnet UM2827, to battery. From the foregoing it is noted that the self-interrupting circuit for the magnet UM2827 is completed when the wipers 2824 and 2825 engage any contact in their associated contact banks except the home contact. Thus the magnet UM2827 operates intermittently, thereby to drive the wipers 2821 to 2826, inclusive, of the storage transfer switch U2820 step by step in the clockwise direction into engagement with their home contact positions. When the wiper 2824 reengages the home contact in its associated contact bank, the previously traced circuit for energizing the upper winding of the release relay R2210 in series with the magnet UM2827, is interrupted. At this point it is noted that the release relay R2210 remains operated until the storage transfer switch U2820 is released, as described above, and then restores shortly thereafter.

Upon restoring, the release relay R2210 interrupts, at its contacts 2211, the previously traced path for applying the busy marking ground potential to the test conductor C1652 extending to Fig. 16, thereby to mark the register translator 1700 as idle to the register translator allotter 1600. Also, the release relay R2210 completes, at its contacts 2212, the previously traced path including the contacts 2141 and the contacts 2181 of the busy key K2180 for applying ground potential to the conductor C1653 extending to Fig. 16, thereby to indicate to the register translator allotter 1600 that an idle register translator is available in the associated group of register translators, in the manner previously explained. At this time the register translator 1700 is completely released and available for further use.

At this point it is noted that the register translator 1700 may be marked as busy to the register translator allotter 1600 merely by operating the busy key K2180. For example, it may be necessary under certain conditions to busy the register translator 1700 in order to readjust the operation of the various relays and switches contained therein or in order to test the rate at which impulses are transmitted by the digit pulse relay R1840. When the busy key K2180 is actuated, the contacts 2181 and 2183 thereof are open and the contacts 2182 are closed. When the contacts 2182 are closed, ground potential is applied to the test conductor C1652 extending to the register translator allotter 1600 in order to mark the register translator 1700 as busy. Also when the busy key K2180 is thus actuated, at the contacts 2181 thereof the previously traced path for applying ground potential to the conductor C1653 extending to the register translator allotter 1600 is interrupted, thus removing ground protential from the conductor C1653 unless one of the other register translators in the associated group is idle, as previously explained. Finally, at the contact 2183 thereof, the busy key K2180 interrupts the circuit over which the digit pulse relay R1840, at its contacts 1843, normally transmits impulses for controlling the switching apparatus involved in a connection. Accordingly, when the key K2180 is actuated, the register translator 1700 may be removed from service without interferring with the normal operation of the system.

If it is necessary to test the rate of impulsing of the digit pulse relay R1840 of the register translator 1700, the plug of a suitable test set may be inserted into the jack J1870 whereupon a circuit is completed through the left-hand pair of test springs for energizing the winding of the digit pulse start relay R1710. Upon operating, the digit pulse start relay R1710, at its contacts 1715, completes the previously traced circuit for energizing the upper winding of the digit pulse relay R1840, whereupon the latter relay operates and restores intermittently, in the manner previously explained. Each time the digit pulse relay R1840 operates and restores, it interrupts and then completes, at its contacts 1843, an impulsing circuit including the contacts 1718, the conductor C2236, the contacts 1843, and the spring of the test jack J1870, whereby the impulses are transmitted to the test set. Accordingly, the test set may be calibrated to measure both the speed and the make-to-break ratio of the impulses transmitted by the digit pulse relay R1840 from the register translator 1700, in a well known manner.

After the register translator 1700 has been satisfactorily readjusted and the above-described test of the impulsing rate of the digit pulse relay R1840 has been completed, the test plug of the associated test set is removed from the test jack J1870, thereby to cause the digit pulse start relay R1710, and consequently the digit pulse relay R1840, to restore to normal. The busy key K2180 may now be restored to normal, whereupon the busy condition maintained upon the conductor C1652 is removed and the idle marking condition, accomplished by applying ground potential to the conductor C1653, is reestablished. The register translator 1700 is again available for the completion of further connections.

*Additional operation of the toll ticket repeater*

Again considering the operation of the toll ticket repeater 800, a connection has been established between the calling private subscriber substation TP in exchange 4 zone 84 and the called subscriber substation in exchange 3 zone 27, which connection includes the line switch 423, the truck 462, the primary selector 600, the trunk 780, the toll ticket repeater 800, the trunk 5301, the toll selector 5300, the trunk 5626, the incoming second selector 5600 in exchange 2 zone 27, the trunk 5630, the selector 5605, the selector 5606 and the connector 5607 in exchange 3 zone 27. Also at this time a loop circuit is completed between the calling private subscriber substation TP and the upper and lower windings of the impulses relay R960 in the toll ticket repeater 800. Furthermore, a loop circuit is completed to the line relay, not shown, in the connector 5607 in exchange 3 zone 27, which circuit includes the lower winding of the answer relay R945 in the toll ticket repeater 800, the windings 903 and 904 of the repeating coil 900, the line conductors C5302 and C5304 of the trunk 5301, and the switching apparatus mentioned above involved in the connection. When the above-traced circuit including the lower winding of the answer relay R945 and the line relay of the connector 5607 is completed, an energizing circuit is established for the lower winding of the answer relay R945, but due to the fact that the current flow over the loop circuit is not in the proper direction, the polarized relay R945 does not operate at this time.

In the event the called subscriber substation in exchange 3 zone 27 is busy when the connection is explained, busy tone is returned from the connector 5607 over the previously traced connection by way of the windings 903 and 904 of the repeating coil 900. The busy tone traversing these windings of the repeating coil 900 induces a busy tone signal in the windings 901 and 902 thereof, whereby the tone signal is returned to the calling private subscriber substation TP, thereby to indicate to the subscriber thereat that the called subscriber substation is busy. On the other hand, in the event that the called subscriber in exchange 3 zone 27 is idle at this time, ringing current is transmitted by the connector over the called subscriber line thereby to operate the ringer at the called subscriber substation and a ring-back tone is transmitted to the calling line in order to indicate to the subscriber at the calling substation TP that the called subscriber is being signaled.

When the subscriber at the called subscriber substation in exchange 3 zone 27 answers the call, the connector 5607 is controlled to disconnect the ringing signal and to cause ground and battery potentials, connected to the loop circuit including the line relay of the connector and the answer relay R945 of the toll ticket repeater 800, to be reversed, whereupon the reversal of current flow through the lower winding of the answer relay R945 causes the latter relay to operate. Upon operating, the answer relay R945, at its contact 946, completes an energizing circuit for the answer slave relay R940, whereupon the latter relay operates. Upon operating, the relay R940, at its contacts 943, completes a circuit for energizing the magnet SM1117 of the storage transfer switch S1110 over a circuit which may be traced from ground by way of the contacts 833, the conductor C877, extending to Fig. 11, the wiper 1111 of the storage transfer switch S1110 and the engaged home contact in its associated contact bank, the conductor C874 extending to Fig. 8, the contacts 832, the conductor C876 extending to Fig. 11, the wiper 1104 of the register and timer switch R1100 and the engaged home contact in its associated contact bank, the wiper 1112 of the storage transfer switch S1110 and the engaged home contact in its associated contact bank, the conductor C976 extending to Fig. 9, the contacts 943, the conductor C885 extending to Fig. 11, the self-interrupting contacts 1118, and the winding of the magnet SM1117, to battery. When thus energized the magnet SM1117 operates and restores, thereby to drive the wipers 1111 to 1116, inclusive, of the storage transfer switch S1110 one step in the counterclockwise direction, whereby the wipers 1111 and 1112 thereof disengage the home contacts in their associated contact banks, whereupon the above-traced circuit for energizing the magnet SM1117 is interrupted and further operation of the storage transfer switch S1110 is arrested at this time.

Figure 8:
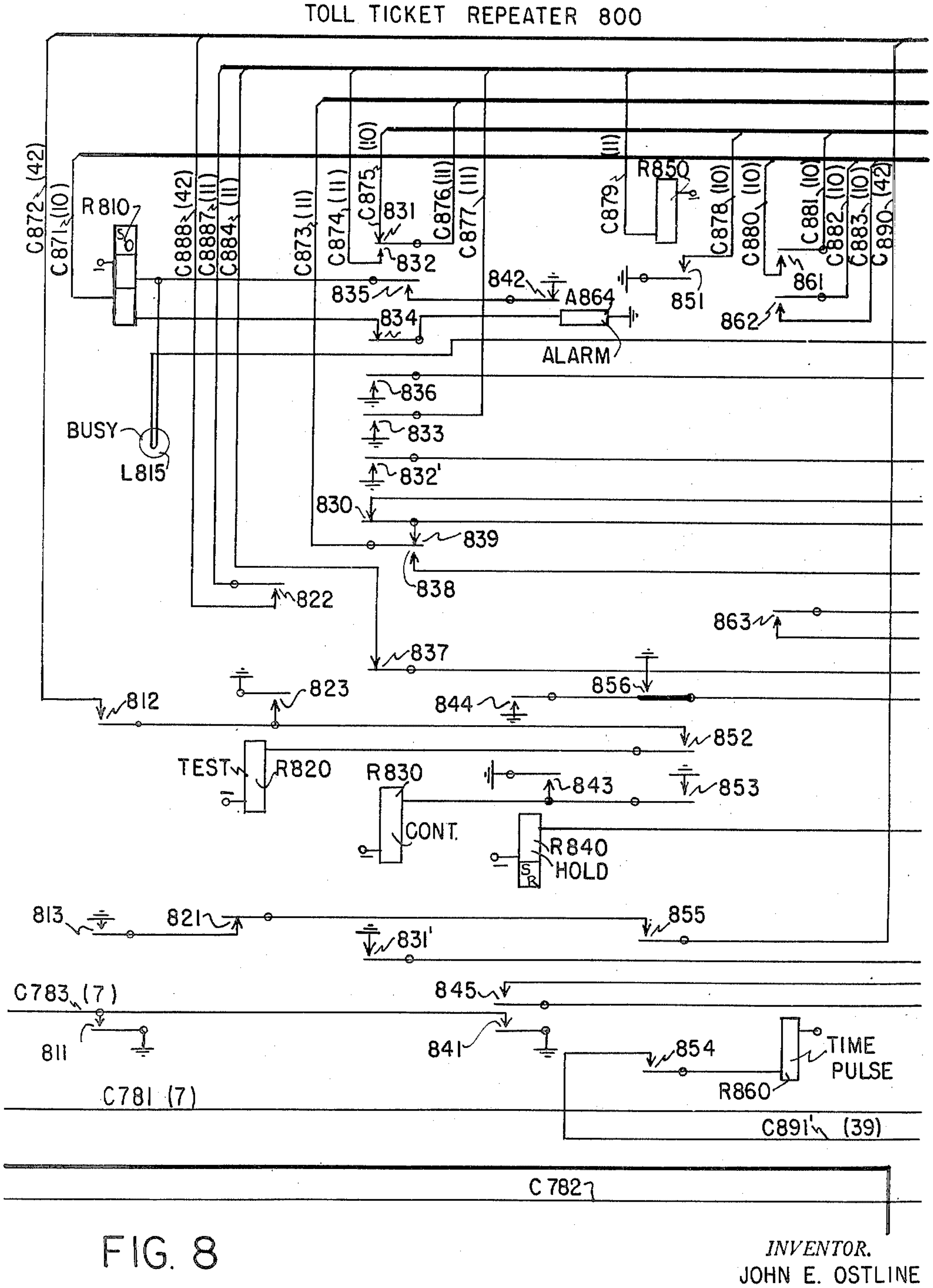

When the wiper 1111 engages the first contact in its associated contact bank, the winding of the control relay R850 is energized over a circuit which may be traced from ground by way of the contacts 833, the conductor C877 extending to Fig. 11, the wiper 1111 and the engaged first contact in its associated contact bank, the conductor C879 extending to Fig. 8, and the winding of the control relay R850, to battery. When thus energized the relay R850 operates and, at its contacts 853, completes a multiple holding circuit for retaining the control relay R830 in its operated position. Also, the relay R850 prepares, at its contacts 854, a circuit, including the time pulse conductor C891′ extending to Fig. 39, for energizing the time pulse relay R860 each time ground potential is applied to the conductor C891′ at the contacts 3944 of the pulse relay R3940 in the date and time unit 3900. The pulse relay R3940 is momentarily energized twelve times per minute by the master clock 3901 and, consequently, a ground pulse is applied to the conductor C891′ every five seconds. Accordingly, the time pulse relay R860 momentarily operates and then restores every five seconds or twelve times per minute in an obvious manner. Each time the time pulse relay R860 operates and then restores it completes and then interrupts, at its contacts 863, a circuit for energizing the magnet RM1106, thereby to cause the latter magnet to operate and then restore, whereby the wipers 1101 to 1106, inclusive, of the register and timer switch R1100 are driven one step in the clockwise direction away from their home contact positions. The above-mentioned circuit for controlling the magnet RM1106 extends from ground by way of the contacts 851, the conductor C878 extending to Fig. 10, the wiper 1021 of the ten and hundred time switch D1020 and the engaged home contact in its associated contact bank, the conductor C972 extending to Fig. 9, the contacts 941 and 863, the conductor C974 extending to Fig. 11, and the winding of the magnet RM1106, to battery. Accordingly, the wipers of the register and timer switch R1100 are driven twelve steps per minute in the clockwise direction in accordance with the rate of operation of the time pulse relay R860.

It is noted that when the time pulse relay R860 operates while the wiper 1106 of the register and timer switch R1100 engages either the home or the twelfth contact in its associated contact bank, a multiple circuit is completed for energizing the magnet UM1015 of the unit time switch U1010. The last-mentioned circuit extends, when completed, from ground by way of the contacts 851, the conductor C878 extending to Fig. 10, the wiper 1021 of the ten and hundred time switch D1020 and the engaged contact in its associated contact bank, the conductor C972 extending to Fig. 9, the contacts 941, the conductor C971 extending to Fig. 11, the wiper 1106 of the register and timer switch R1100 and the engaged home or twelfth contact in its associated contact bank, the conductor C882 extending to Fig. 8, the contacts 862 of the time pulse relay R860, the conductor C883 extending to Fig. 10, and the winding of the magnet UM1015, to battery. Accordingly, the magnet UM1015 operates and restores once each minute, whereby the wipers 1011 to 1014, inclusive, of the unit time switch U1010 are driven one step in the clockwise direction each minute. At this point it is noted that when the time pulse relay R860 operates while the wiper 1106 of the register and timer switch R1100 engages the twenty-fourth contact in its associated contact bank, a self-interrupting alternative stepping circuit is completed for energizing the magnet RM1106, thereby to cause the latter magnet to operate and restore independently of the operation of the time pulse relay R860, in order to drive the wipers an additional step in the clockwise direction back into engagement with their home contact positions. The above-mentioned alternative circuit extends, when completed, from the grounded wiper 1106 and the engaged twenty-fourth contact in its associated contact bank, by way of the self-interrupting contacts 1107 and the winding of the magnet RM1106, to battery.

It is noted that when the time pulse relay R860 operates while the wiper 1011 engages either the ninth or twenty-fourth contact in its associated contact bank, a multiple circuit is completed for energizing the magnet DM1027 of the ten and hundred time switch D1020. The last-mentioned circuit extends, when completed, from ground by way of the contacts 851, the conductor C878 extending to Fig. 10, the wiper 1021 of the ten and hundred time switch D1020 and the engaged contact in its associated contact bank, the conductor C972 extending to Fig. 9, the contacts 941, the conductor C971 extending to Fig. 11, the wiper 1106 and the engaged home or twelfth contact in its associated bank, the wiper 1011 of the unit time switch U1010 and the engaged ninth or twenty-fourth contact in its associated contact bank, the conductor C880 extending to Fig. 8, the contacts 861 of the time pulse relay R860, the conductor C881 extending to Fig. 10, and the winding of the magnet DM1027, to battery. Accordingly, the magnet DM1027 operates and restores once each ten minutes, whereby the wipers of the ten and hundred switch D1020 are driven one step in the clockwise direction each ten minutes. It is also noted that when the wiper 1013 of the unit time switch U1010 engages the eleventh contact in its associated contact bank an obvious circuit, including the self-interrupting contacts 1016, is completed for intermittently energizing the magnet DM1015, whereby the latter magnet drives the wipers of the unit time switch U1010 into engagement with the sixteenth contacts in their associated contact banks. When the wiper 1013 engages the sixteenth contact in its associated contact bank the above-traced circuit for intermittently energizing the magnet UM1015 is interrupted, thereby to arrest further automatic operation of the magnet UM1015 under control of ground at the wiper 1013.

In view of the foregoing explanation of the mode of operation of the time pulse relay R860 to control the operation of the register and timer switch R1100, the operation of the time pulse relay R860 and the register and timer switch R1100 to control the unit time switch U1010, and the operation of the time pulse relay R860, the register and timer switch R1100, and the unit time switch U1010 to control the operation of the ten and hundred time switch D1020, it will be understood that the unit time switch U1010 and the ten and hundred time switch D1020 are respectively operative to register the unit and the ten and hundred time intervals of the total time duration of the established connection between the calling private subscriber substation TP in exchange 4 zone 84 and the called subscriber substation in exchange 3 zone 27. More particularly, the wipers 1013 and 1014 of the unit time switch U1010 register the unit time interval of the total time duration of the established connection in the respectively associated contact banks terminating the WXYZ conductors in the group of WXYZ marking leads 1033, in the manner previously explained. Similarly, the wipers 1023 and 1024 of the ten and hundred time switch D1020 register the ten time interval of the total time duration of the established connection in the respectively associated contact banks terminating the WXYZ conductors in the group of WXYZ marking leads 1032, in the manner previously explained. Finally, the wipers 1025 and 1026 of the ten and hundred time switch D1020 register the hundred time interval of the total time duration of the established connection in the respectively associated contact banks terminating the WXYZ conductors in the group of WXYZ marking leads 1034, in the manner previously explained.

In the event the established connection persists for thirty minutes, the wiper 1026 of the ten and hundred time switch D1020 engages the third contact in its associated contact bank, whereupon a circuit is completed for illuminating the thirty minute alarm lamp L5481 in order to indicate to the supervisory operator that the call mentioned has persisted for this time duration. Similarly, in the event the established connection persists for fifty minutes, the wiper 1025 of the ten and hundred time switch D1020 engages the fifth contact in its associated contact bank, whereupon an obvious circuit is completed for energizing the winding of the W relay comprising the only relay in the code storage device S1031. When thus energized the W relay operates to complete, at the associated contacts, an obvious holding circuit including the grounded hold conductor C889 for energizing the winding thereof and for applying ground potential to the W conductor comprising the group of WXYZ marking leads 1031. When this conductor is grounded the digit "7" is stored in the code storage device S1031 and marked in the associated group of WXYZ marking leads 1031. The storage of the digit "7" in the code storage device S1031 indicates that the connection has persisted for fifty minutes, which is beyond the calculating capacity of the printer controller 4200, as will be explained more fully. Finally, in the event the established connection persists for four hours, the wiper 1021 of the ten and huundred time switch D1020 engages the twenty-fourth contact in its associated contact bank, whereupon ground potential is applied to the conductor C973 for illuminating the four hour alarm lamp L5480 and a multiple circuit is completed, by way of the conductor C973 extending to Fig. 9, for energizing the winding of the thermostatic alarm relay R980. The illumination of the four hour alarm lamp L5480 indicates to the exchange attendant that the established connection has persisted for the time interval indicated.

In any event when the toll ticket repeater 800 is retained in its operated position for four hours, and the thermostatic relay R980 is energized and two minutes thereafter the associated contacts are closed to complete an energizing circuit for the winding of the cut off relay R970. When this circuit is completed the cut off relay R970 operates and, at its contacts 971, interrupts a point in the previously traced loop circuit for retaining the impulse relay R960 of the toll ticket repeater 800 in its operated position. The impulse relay R960 will now restore to normal and cause the release of the toll ticket repeater 800 and the switching apparatus involved in the connection in the same manner as will be explained hereinafter when the calling subscriber disconnects by replacing his receiver upon the associated switchhook.

Referring now to the supervisory apparatus disclosed in Fig. 54, it is noted that when the thirty minute alarm lamp L5481 is illuminated to indicate that the connection has been retained for this period of time, the supervisory operator may associate her telephone instrument 5494 with the established connection by actuating the key K5490. When the key K5490 is actuated the telephone instrument 5494 is bridged across the conductors C781 and C782 extending to Fig. 7 where they are multipled to the corresponding conductors of the trunk 780. Thus the supervisory operator's telephone instrument is bridged across the talking connection completed between the calling subscriber and the called subscriber and she may ascertain whether or not the subscribers are still conversing. Also, when the connection has been retained for four hours the lamp L5480 is illuminated and the supervisory operator may associate her telephone instrument 5494 with the talking connection by actuating the key K5490, and inform the subscriber, if he is still conversing over the retained connection, that the connection will be automatically released in two minutes. The automatic release, it will be recalled, is under control of the thermostatic relay R980 and occurs two minutes after the thermostatic relay R980 is first energized.

At this point it is noted that the release of the established connection between the calling private subscriber substation TP in exchange 4 zone 84 and the called subscriber substation in exchange 3 zone 27 is under the control of the calling subscriber at substation TP. However, when the subscriber at the called subscriber substation replaces the receiver of the telephone instrument thereat upon its associated switchhook, the connector 5607 in exchange 3 zone 27 operates in order to cause a reversal of the current flow over the previously traced loop circuit, including the lower winding of the answer relay R945 in the toll ticket repeater 800. When the current flow through the lower winding of the answer relay R945 is reversed, the winding is energized in the opposite direction whereupon the latter relay restores to normal. Upon restoring the relay R945 interrupts, at the contacts 946, the previously traced circuit for energizing the answer slave relay R940, whereupon the latter relay restores to normal. When the answer slave relay R940 restores, at its contacts 941 it interrupts the previously traced circuit for energizing the magnet RM1106 thereby positively to arrest further operation of the register and timer switch R1100 at this time, and the consequent timing of the total time duration of the established connection by the unit time switch U1010 and the ten and hundred time switch D1020. Also the answer slave relay R940, at its contacts 942, completes a circuit, including the contacts 851, the conductor C878 extending to Fig. 10, the wiper 1021 and the engaged contact in its associated contact bank, the conductor C972 extending to Fig. 9, and the contacts 942, one branch extending to the winding of the two minute thermostatic relay R980 and the other branch extending, by way of the conductor C973 extending to Fig. 10 and the four hour alarm lamp L5480, to battery. The illumination of the four hour alarm lamp L5480 indicates to the supervisory operator that the established connection has persisted for four hours or that the subscriber at the called subscriber substation in exchange 3 zone 27 has disconnected but the subscriber at the calling substation has not replaced his receiver upon its associated switchhook in order to effect the complete release of the connection. The energization of the two minute thermostatic relay R980 automatically causes the restoration of the cut off relay R970 after an elapse of two minutes and consequently, the release of the switching apparatus involved in the connection, in the event the calling subscriber at substation TP fails to release within the elapsed time interval of two minutes. Accordingly the toll ticket apparatus cannot be retained by a calling subscriber after the called subscriber in the connection has replaced his receiver.

Referring again to the operation of the answer relay R945 when the called subscriber answered the connection, it will be recalled that the latter relay caused the operation of the answer slave relay R940, and that the answer slave relay effected the operation of the control relay R850 and the latter relay completed the circuit for the time pulse relay R860. Accordingly it is possible for the connection between the calling and called subscribers to persist for almost five seconds before the time pulse relay R860 operates, in order to cause the wipers of the unit time switch U1010 to be driven one step in the clockwise direction away from their home positions.

When the wiper 1014 of the unit time switch U1010 engages the home contact in its associated contact bank, an obvious circuit is completed for applying ground potential to the Z conductor in the group of WXYZ marking leads 1033 corresponding to the digit "0"; and when the wipers 1013 and 1014 engage the first contacts in their associated contact banks, ground potential is applied to the W and X conductors in the group of WXYZ marking leads 1033 corresponding to the digit "1." Accordingly, the digit "0" is normally registered by the unit time switch U1010 but this digit registration is changed to the digit "1" as soon as the time pulse relay R860 operates after the connection has been answered. This short time interval of approximately five seconds permits the call to be answered by the called subscriber and the immediate release of the established connection by the calling subscriber, without the registration of any time in the unit time switch U1010 in the event a wrong number was dialed by the calling subscriber at substation TP.

*Initial operation of the printer controller*

In the present example, assume that the established connection between the calling subscriber at substation TP and the called subscriber in exchange 3 zone 27 is maintained for four minutes, and that after the elapse of the time interval mentioned the calling subscriber at substation TP replaces the receiver of the telephone instrument thereat upon its associated switchhook. When this is done the previously traced loop circuit for energizing in series the upper and lower windings of the impulse relay R960 in the toll ticket repeater 800 is interrupted, thereby to cause the latter relay to restore. Upon restoring, the impulse relay R960, at its contacts 961, interrupts a point in the loop circuit including the lower winding of the answer relay R945, but this does not effect restoration of the latter relay at this time since the contacts 961 are short-circuited by contacts 845 and 958. Also upon restoring, the impulse relay R960 interrupts, at its contacts 962, the circuit for energizing the winding of the slow-to-release hold relay R840, whereupon the latter relay restores shortly thereafter. Upon restoring, the hold relay R840, at its contacts 845, interrupts the previously traced loop circuit between the lower winding of the answer relay R945 and the line relay (not shown) in the connector 5607. Assuming also that the called subscriber in exchange 3 zone 27 has also replaced his receiver upon the associated switchhook, the restoration of the line relay in the connector effects the release of the connector 5607 and the automatic switching apparatus included in the connection between the connector 5607 and the toll ticket repeater 800.

Referring to the toll selector 5300, attention is directed to the fact that when the connector 5607, the selector 5606, the selector 5605, and the incoming second selector 5601 all restore to normal, ground potential is removed from the test wiper 5313 of the switch mechanism 5310, but the toll selector 5300 is not restored to normal until ground potential is removed from the conductor C5304 by the toll ticket repeater 800. When the answer relay R945 restores to normal, at its contacts 946 it interrupts the circuit of the answer slave relay R940 which also restores. The relay R940, at its contacts 941, arrests further operation of the unit time switch U1010 and, consequently, the ten and hundred time switch D-1020 in the manner previously explained. Also, at its contacts 942 the answer slave relay R940 completes the previously traced circuit for illuminating the alarm lamp L5480 and for energizing the winding of the two minute thermostatic relay R980, in the manner previously explained.

Also, upon restoring the hold relay R840 interrupts, at its contacts 841, the previously traced path for applying ground potential to the control conductor C783 of the trunk 780, thereby to interrupt the holding circuit for energizing the winding of the switch-through relay R770 in series with the winding of the step relay R769 in the primary selector 600, whereupon the switch-through relay R770 restores. Upon restoring, the switch-through relay R770 effects the release of the primary selector 600 and the line switch 423 in the manner previously explained, whereupon the trunk 462 is marked as idle to the line switches 423, 424, etc. having access thereto, and the private subscriber line 407 extending to the calling subscriber substation TP is marked as idle to the connectors having access thereto, all in the manner previously explained.

Further, the hold relay R840 completes, at its contacts 842, a circuit including the contacts 835 for energizing the upper winding of the busy relay R810, thereby to cause the slow-to-operate busy relay R810 to operate shortly thereafter. Also upon restoring, the hold relay R840, at its contacts 842, completes a circuit for illuminating the busy lamp L815 in series with the toll ticket supervisory relay R5565 over a circuit which may be traced from ground by way of the contacts 842 and 835, the busy lamp, L815, the conductor C5568 extending to Fig. 55, and the upper winding of the toll ticket supervisory relay R5565, to battery. The busy lamp L815 individual to the toll ticket repeater 800 indicates to the attendant that the toll ticket repeater 800 has been released from the connection between the calling and called subscriber lines, but that the information stored therein has not been transferred to the printer controller. Further operations which take place as a result of the energization of the toll ticket supervisory relay R5565 will be explained hereinafter in connection with the description of the operation of the supervisory apparatus disclosed in Fig. 55. Upon operating, the busy relay R810, at its contacts 811, reapplies ground potential to the control conductor C783 of the trunk 780, thereby to mark the trunk 780 as busy to the primary selectors having access thereto. Also, at its contacts 813, the relay R810 applies ground potential by way of the contacts 821 and 855 to the start conductor C890 extending to Fig. 42, in order to control the printer controller allotter 4600. Finally, at its contacts 812, the busy relay R810 prepares a point in the circuit for connecting the test relay R820 to the test conductor C872 extending to Fig. 42.

Referring now to Fig. 42, it is noted that when ground potential is applied to the conductor C890 upon the operation fo the busy relay R810 in the toll ticket repeater 800, the winding of the start relay R4645 of the printer controller allotter 4600 is energized. Upon operating, the start relay R4645, at its contacts 4646, prepares a circuit, including the contacts 4644, the wiper 4641 of the finder F4640 and the engaged home contact in its associated contact bank, and the test conductor C4671 extending to Fig. 43 of the printer controller 4200, for energizing the magnet FM4643. In the event that the printer controller 4200 is busy, direct ground potential is applied to the test conductor C4671 by way of the contacts 4377 of the busy key K4375, the contacts 4322 of the busy relay R4320 which is in its operated position when the printer controller 4200 is busy, and the conductor C4671 extending to Fig. 46, and completes an energizing circuit for the magnet FM4643, whereupon the latter magnet operates and restores to drive the wipers 4641 and 4642 of the finder F4640 one step in the clockwise direction in order to test the idle or busy condition of the next printer controller in the associated group.

Assuming that the printer controller 4200 is idle at this time, no direct ground potential appears upon the test conductor C4671 but resistance ground potential is applied thereto by way of the contacts 4218, the winding of the step relay R4340, and the conductor C4671, and the magnet FM4643 is not energized due to the high resistance of the step relay R4340 which is, however, operated over this circuit. Thus the printer controller 4200 is selected at this time by the wipers 4641 and 4642 of the finder F4640. Also, the start relay R4645, at its contacts 4647, completes a circuit for energizing the seizure relay R4650 in series with the winding of the magnet FM4643. It is noted that the circuit for the seizure relay R4650 is short-circuited in the event the test conductor C4671 has direct ground applied thereto by a busy printer controller. When the above-mentioned series circuit, including the winding of the seizure relay R4650 and the winding of the magnet FM4643, is completed, the seizure relay R4650 operates but the magnet FM4643 does not operates in view of the high resistance of the winding of the seizure relay R4650. Upon operating, the seizure relay R4650, at its contacts 4651, completes a circuit by way of the wiper 4642 of the finder F4640, the conductor C4673 extending to Fig. 43, and the winding of the seizure relay R4240 in the printer controller 4200. When the step relay R4340 operated, at its contacts 4341 it completed a circuit by way of the contacts 4312 for energizing the winding of the magnet FM4217 of the finder switch F4210. When thus energized the magnet FM4217 operates, thereby to condition the wipers 4211 to 4216, inclusive, of the finder F4210 to be driven one step in the counter-clockwise direction and to interrupt, at the contacts 4218, the previously traced series circuit for energizing the winding of the step relay R4340 and the magnet FM4643 of the finder F4640, whereupon the step relay R4340 restores. Upon restoring, the step relay interrupts, at its contacts 4341, the previously traced circuit for energizing the magnet FM4217, thereby to cause the latter magnet to restore and drive the wipers of the finder F4210 one step in the counterclockwise direction, and to recomplete, at the contacts 4218, the previously traced circuit for energizing the winding of the step relay R4340 in series with the magnet FM4643. Accordingly, the step relay R4340 and the magnet FM4217 interact, in the manner described above, in order to drive the wipers of the finder R4210 step by step in the counterclockwise direction until the first calling toll ticket repeater in the associated group is found.

Assuming that the calling toll ticket repeater 800 is the first in the associated group, when the finder F4210 selects the conductor C872, C888, etc. extending thereto, a series circuit is completed for energizing the winding of the test relay R820 in the toll ticket repeater 800 and the lower winding of the test relay R4310 in the printer controller 4200. The above-mentioned circuit extends from ground by way of the contacts 4241 of the operated seizure relay R4240, the lower winding of the test relay R4310, the wiper 4211 of the finder F4210 and the engaged contact in its associated contact bank, the conductor C872 extending to Fig. 8 of the toll ticket repeater 800, the contacts 812 and 852, and the winding of the test relay R820, to battery. When this series circuit is completed the relays mentioned operate. When the test relay R4310 operates, at its contacts 4311, it interrupts a point in the circuit, including ground at the contacts 4242 of the operated seizure relay R4240, for short-circuiting the upper winding of the test relay R4310 and the upper winding of the busy relay R4320. Also, at its contacts 4312, the test relay R4310 interrupts a point in the previously traced circuit for energizing the magnet FM4217, thereby positively to arrest further operation of the finder F4210 at this time. When the above-mentioned short circuit is removed from across the upper windings of the test relay R4310 and the busy relay R4320, a series circuit, including the contacts 4242, the upper windings of the relays R4320 and R4310, and the resistor 4313, is completed, whereupon the busy relay R4320 operates.

Referring now to the toll ticket repeater 800, it is noted that when the test relay R820 operates over the previously traced circuit, at its contacts 823 it completes a locking circuit for itself which may be traced from ground by way of the contacts 823 and 852. Also, the ground potential connected by way of the contacts 823 is applied by way of the contacts 812 to the conductor C872, whereupon a locking circuit is completed for the lower winding of the busy relay R4320 which includes the contacts 4323 thereof. When this circuit is completed the lower winding of the test relay R4310 is short-circuited, but the relay is retained in its operated position over the circuit including its upper winding. As a further result of the operation of the busy relay R4320, at its contacts 4322 it applies direct ground potential to the conductor C4671 in order to short-circuit the step relay R4340 which also restores to normal, and opens a further point, at its contacts 4341, in the circuit for controlling the magnet FM4217. The application of direct ground potential to the conductor C4671 completes the previously traced circuit for energizing the magnet FM4643 of the finder F4640, whereupon the magnet FM4643 operates to interrupt its own circuit, at the contacts 4644, and advance the wipers 4641 and 4642 one step in the clockwise direction into engagement with the contacts terminating the next printer controller in the associated group. Thus the application of direct ground potential to the conductor C4671 marks the printer controller 4200 as busy to the printer controller allotter 4600 at this time.

It is also to be noted that when the test relay R820 in the toll ticket repeater 800 operated, at its contacts 821 it interrupted the previously traced start circuit including the conductor C890, whereupon the start relay R4645 in the printer controller allotter 4600 restores to normal shortly thereafter. Consequently, it makes no difference whether the start relay R4645 restores to normal substantially simultaneously with the advance of the wipers of the finder F4640 into engagement with the next succeeding set of contacts in the associated contact bank. In any event, ground potential is removed from the conductor C4673 either by the restoration of the seizure relay R4650 or the advancement of the wiper 4642 and additional step in the clockwise direction. When ground potential is removed from the conductor C4573, the seizure relay R4240 restores to normal, interrupting the holding circuit including the upper windings of the test relay R4310 and the busy relay R4320, at its contacts 4242, and, at its contacts 4241, it interrupts the previously traced circuit for energizing the lower winding of the test relay R4310. The test relay R4310 now restores to normal.

Also, upon operating, the busy relay R4320 interrupts, at its contacts 4321, the path for applying ground potential by way of the contacts 4377 of the busy key K4375 and the contacts 4361 to the conductor C4672 extending to Fig. 46 of the printer controller allotter 4600. At this point it is noted that ground potential is applied by way of the path substantially identical to the traced above in each printer controller in the group to the test conductor C4672 when the associated printer controller is idle. Accordingly, when all of the printer controllers in the associated group are busy, ground potential is removed from the test conductor C4672, whereby the finder F4640 operates to engage the last contact in the associated contact bank terminating the conductor C4672 in order to arrest further operation of the finder F4640 until one of the printer controllers in the associated group becomes idle.

Also, at its contacts 4324, the busy relay R4320 completes an obvious energizing circuit for operating the busy slave relay R4330, thereby to cause the latter relay to operate. Finally, at its contacts 4325, the busy relay R4320 completes a circuit, including the contacts 4715, the conductor C4473 extending to Fig. 44, and the contacts 4452, for energizing the lower winding of the pulse relay R4450 and for charging the associated condenser 4454 through the upper winding thereof. When thus energized the pulse relay R4450 operates, thereby to interrupt, at its contacts 4452, the previously traced circuit for energizing the lower winding thereof, whereby a circuit is completed for discharging the associated condenser 4454 in series through the upper and lower windings of the pulse relay R4450 in order to cause the latter relay to restore shortly thereafter. Hence the pulse relay R4450 operates intermittently at a predetermined rate in accordance with the characteristics of the associated condenser 4454, in a well known manner.

When the busy slave relay R4330 operates to complete, at its contacts 4337, a path for applying ground potential to the start conductor C4302 extending to Fig. 50 of the printer link 5000, thereby to complete a circuit including the contacts 5025 and 5071, and the wiper 5021 of the control switch S5020 and the engaged home contact in its associated contact bank, for energizing the winding of the start relay R5040 in series with the magnet SM5024 of the control switch S5020. When this series circuit is completed the start relay R5040 operates, but due to the resistance of the start relay R5040, the magnet SM5024 does not operate at this time. Also, the busy slave relay R4330, at its contacts 4331, completes a circuit for applying battery potential by way of the winding of the test relay R4430 to the test conductor C4301 extending to Fig. 50 of the printer link 5000, in order to mark the printer controller 4200 as the calling printer controller in the contact bank for the finder F5010. Further, the busy slave relay R4330 prepares, at its contacts 4332, a circuit, traced hereinafter, for energizing the winding of the computation stop relay R4370; at its contacts 4338, it prepares multiple holding circuits, traced hereinafter, for locking the computation stop relay R4370, the special service relay R4380, and the two digit code relay R4390 in their operated positions in the event they have been energized over their initial energizing circuits; and it interrupts, at its contacts 4333 and 4334, points in a circuit, traced hereinafter, for energizing the winding of release relay R4360. Also the busy slave relay R4330 completes, at its contacts 4335, an obvious path for applying ground potential to the hold conductor C4339 extending to the code storage devices S4621 to S4638 inclusive. Finally, at its contacts 4336, the busy slave relay R4330 applies ground potential to the conductor C4399, whereby various controls of the circuit may be performed, in a manner to be described more fully hereinafter.

Each time the pulse relay R4450 operates and restores it completes and then interrupts, at its contacts 4451, a circuit, including the conductor C4251, for energizing the magnet SM4227, thereby to cause the latter magnet to operate and restore, whereby the wipers 4221 to 4226, inclusive, of the storage register switch S4220 are driven one step in the clockwise direction. Also, each time the magnet SM4227 operates and restores it completes and then interrupts, at the contacts 4229, a circuit including the wiper 4212 of the finder F4210 and the engaged contact in its associated contact bank, the conductor C888 extending to Fig. 8 of the toll ticket repeater 800, the contacts 822, and the conductor C887 extending to Fig. 11, for energizing the magnet SM1117 of the storage transfer switch S1110. Accordingly, the wipers of the storage register switch S4220 are driven in synchronism with the wipers 1111 to 1116, inclusive, of the storage transfer switch S1110. At the beginning of this cycle of operation the wipers of the storage transfer switch S1110 engage the first contacts in the associated contact banks and the wipers of the storage register switch S4220 engage the home contacts in the associated contact banks, whereby the previously mentioned circuit for energizing the winding of the computation stop relay R4370 is completed, in the event the digit "7" is stored in the code storage device S1031 in the toll ticket repeater at this time. This circuit is completed in view of the fact that the wiper 4223 of the storage register switch S4220 engages the home contact in its associated contact bank terminating the conductor extending to the winding of the computation stop relay R4370, and the wiper 1113 of the storage transfer switch S1110 engages the first contact in its associated contact bank terminating the W conductor of the group of WXYZ marking leads 1031 extending the code storage device S1031. In the present example the circuit mentioned for energizing the computation stop relay R4370 is not completed in view of the fact that the digit "7" is not registered in the code storage device S1031.

In view of the foregoing explanation, it will be understood that the synchronous operation of the storage transfer switch S1110 in the toll ticket repeater 800 and the storage register switch S4220 in the printer controller 4200 is effective to transfer the items of record information stored in the code storage devices S1031, and S1121 to S1135, inclusive, the items of record information stored in the unit time switch U1010 and in the ten and hundred time switch D1020, and the items of record information stored in the terminal blocks B1136 and B1137, all in the toll ticket repeater 800, to the computation stop relay R4370, the special service relay R4380, the two digit code relay R4390, and the code storage devices S4621 to S4638, inclusive, all in the printer controller 4200. At the conclusion of the cycle of operation of the storage transfer switch S1110 and the storage register switch S4220, the various items of record information stored in the various registers in the toll ticket repeater 800 have been transferred to the various registers in the printer controller 4200 and represent the following information as indicated below:

| Register in the Toll Ticket Repeater 800 Transferred From— | Register in the Printer Controller 4200 Transferred To— | Nature of the Record Information |
|---|---|---|
| S1031 via W wiper 1113, contact 1 | Computation stop relay R4370 via W wiper 4223, home contact. | The digit "7" indicating that the time duration of the established connection exceeds the cost calculating capacity of the printer controller 4200, no digit being registered. |
| S1130 via W wiper 1113, contact 2 | Special service relay R4380 vir W wiper 4223, contact 1. | The digit "0" indicating that the calling subscriber substation is rendered extended service, no digit being registered. |
| S1135 via W wiper 1113, contact 3 | Two digit code relay R4390 via W wiper 4223, contact 2. | The digit "0" indicating that the code portion of the directory number ef the called identifying the zone and the exchange thereof comprises only two digits, no digit being registered. |
| S1128 via WXYZ wipers 1113 to 1116, inclusive, contact 4. | S4621 via WXYZ wipers 4223 to 4226, inclusive, contact 3. | The complementary rate factor digit applicable to the toll call between the calling subscriber substation in exchange 4 zone 84 and the called subscriber substation in exchange 3 zone 27, the complementary digit "0" of the rate factor being "1." |
| Ten and hundred time switch D1020 via WXY wipers 1113 to 1115, inclusive, contact 5. | S4622 via WXY wipers 4223 to 4225, inclusive contact 4. | The hundred minute digit of the time duration of the toll call between the calling subscriber substation in exchange 4 zone 34 and the called subscriber substation in exchange 3 zone 27, no digit being registered. |
| Ten and hundred time switch D1020 via WXYZ wipers 1113 to 1116, inclusive, contact 6. | S4623 via WXYZ wipers 4223 to 4226, inclusive contact 5. | The ten minute digit of the time duration of the toll call between the calling subscriber substation in exchange 4 zone 84 and the called subscriber substation in exchange 3 zone 27, no digit being registered. |
| Unit time switch U1010 via WXYZ wipers 1113 to 1116, inclusive, contact 7. | S4624 via WXYZ wipers 4223 to 4226, inclusive, contact 6. | The unit minute digit of the time duration of the toll call between the calling subscriber substation in exchange 4 zone 84 and the called subscriber substation in exchange 3 zone 27, the digit "4." |
| S1124 via WXYZ wipers 1113 to 1116, inclusive, contact 8. | S4625 via WXYZ wipers 4223 to 4226, inclusive contact 7. | The respective first, second, third, and fourth digits of the numerical portion of the directory number of the calling subscriber substation identifying the line terminal thereof, the digits "0," "0," "9" and "9." |
| S1125 via WXYZ wipers 1113 to 1116, inclusive, contact 9. | S4626 via WXYZ wipers 4223 to 4226, inclusive, contact 8. | |
| S1126 via WXYZ wipers 1113 to 1116, inclusive, contact 10. | S4627 via WXYZ wipers 4223 to 4226, inclusive, contact 9. | |
| S1127 via WXYZ wipers 1113 to 1116, inclusive, contact 11. | S4628 via WXYZ wipers 4223 to 4226, inclusive, contact 10. | |
| S1121 via WXYZ wipers 1113 to 1116, inclusive, contact 12. | S4629 via WXYZ wipers 4223 to 4226, inclusive, contact 11. | The respective first, second and third digits of the code portion of the directory number of the called subscriber substation identifying the zone and exchange thereof, the digits "2," "7" and "3." |
| S1122 via WXYZ wipers 1113 to 1116, inclusive, contact 13. | S4630 via WXYZ wipers 4223 to 4226, inclusive, contact 12. | |
| S1123 via WXYZ wipers 1113 to 1116, inclusive, contact 14. | S4631 via WXYZ wipers 4223 to 4226, inclusive contact 13. | |
| S1131 via WXYZ wipers 1113 to 1116, inclusive, contact 15. | S4632 via WXYZ wipers 4223 to 4226, inclusive, contact 14. | The respective first, second, third, and fourth digits of the numerical portion of the directory number of the called subscriber substation identifying the line terminal thereof, the digits "1," "2," "3" and "4." |
| S1132 via WXYZ wipers 1113 to 1116, inclusive, contact 16. | S4633 via WXYZ wipers 4223 to 4226, inclusive, contact 15. | |
| S1133 via WXYZ wipers 1113 to 1116, inclusive, contact 17. | S4634 via WXYZ wipers 4223 to 4226, inclusive, contact 16. | |
| S1134 via WXYZ wipers 1113 to 1116, inclusive, contact 18. | S4635 via WXYZ wipers 4223 to 4226, inclusive contact 17. | |
| S1129 via WXYZ wipers 1113 to 1116, inclusive, contact 19. | S4636 via WXYZ wipers 4223 to 4226, inclusive, contact 18. | The digit identifying the register translater 1700 utilized, the digit "6." |
| Terminal block B1136 via WXYZ wipers 1113 to 1116, inclusive, concontact 20. | S4637 via WXYZ wipers 4223 to 4226, inclusive, contact 19. | The digits identifying the toll ticket rerepeater 800 utilized, the digits "0" and "1." |
| Terminal block B1137 via WXYZ wipers 1113 to 1116, inclusive, contact 21. | S4638 via WXYZ wipers 4223 to 4226, inclusive, contact 20. | |

During the operation of the storage register switch S4220 the wiper 4223 thereof successively engages the second and third contacts in its associated contact bank, whereby the previously mentioned circuits for respectively energizing the windings of the special relay R4380 and the two digit code relay R4390 are prepared. In the present example these circuits are not completed due to the fact that the digits "0" are not registered in the respective code storage devices S1130 and S1135 in the toll ticket repeater 800, as previously explained. Subsequently the wipers 4223 to 4226, inclusive, successively engage the third through the twentieth contacts in their associated contact banks, whereby the record information is registered in the code storage devices S4621 to S4638, inclusive, in the manner set forth above. When the grounded wiper 4222 engages the sixth contact in its associated contact bank, an obvious circuit is completed for energizing the upper winding of the hold relay R4350, thereby to cause the latter relay to operate. Upon operating, the hold relay R4350 completes, at its contacts 4353, a multiple holding circuit for energizing the lower winding of the busy relay R4320, whereby the latter relay may be maintained in its operated position independently of the holding ground potential applied to the conductor C872 by the test relay R820 in the toll ticket repeater 800.

Also, upon operating, the hold relay R4350, at its contacts 4351, interrupts the previously traced original circuit for energizing the magnet SM4227 and completes, at its contacts 4352, an alternative circuit, including the grounded wiper 4222 of the storage register switch S4220 and the engaged sixth contact in its associated contact bank, for energizing the magnet SM4227. Further, the hold relay R4350, prepares, at its contacts 4355, a circuit, traced hereinafter, for energizing the magnet TM4829 of the calculator selector switch T4820. The above-mentioned circuit for controlling the calculator selector switch T4820 is completed and then interrupted, at the contacts 4453, each time the pulse relay R4450 operates and then restores, and extends when completed, from ground by way of the contacts 4355, 4421, 4453 and 4442, and the winding of the magnet TM4820, to battery. Accordingly, after the hold relay R4350 has been operated under control of the wiper 4222, the magnet TM4829 operates and restores intermittently under control of the pulse relay R4450, thereby to drive the wipers 4821 to 4828, inclusive, of the calculator selector switch T4820 step by step in the counterclockwise direction, for a purpose more fully explained below.

More particularly, the wipers of the calculator selector switch T4820 are driven step by step in the counterclockwise direction until they engage the contacts in the associated contact banks terminating the marked WXYZ conductors in the associated group of WXYZ marking leads 4621 extending to the first code storage device S4621 in which the complementary digit of the rate factor digit is stored. In the present example, the complementary digit "0" of the rate factor digit "1" is stored in the code storage device S4621, whereby the Z conductor in the associated group of WXYZ marking leads 4621 is marked with ground potential. Hence the wipers of the calculator selector switch T4820 are driven six steps in the counterclockwise direction, whereupon the wiper 4823 thereof engages the sixth contact in its associated contact bank terminating the Z conductor of the associated group of WXYZ marking leads 4621, and the wiper 4824 thereof engages the sixth contact in its associated contact bank marked with ground potential, whereupon circuits are completed for energizing the left-hand and right-hand windings of the transfer relay R4440. The circuit for energizing the left-hand winding of the transfer relay R4440 extends from the grounded wiper 4823 of the calculator selector switch T4820 by way of the conductor C4484 extending to Fig. 44, and the left-hand winding of the relay R4440, to battery; while the circuit for energizing the right-hand winding of the transfer relay R4440 extends from the grounded wiper 4824 of the calculator selector switch T4820 by way of the conductor C4485 extending to Fig. 44 and the right-hand winding of the relay R4440, to battery. It is noted that the transfer relay R4440 is of the shunt field type and operates only when both the left-hand and the right-hand windings thereof are energized. When thus energized the transfer relay R4440 operates to interrupt, at its contacts 4442, the previously traced circuit for energizing the magnet TM4829 of the calculator selector switch T4820, thereby positively to prevent further operation of the letter switch at this time. Also, the transfer relay R4440, at its contacts 4441, prepares a circuit, traced hereinafter, for energizing the magnet MM4736 of the calculator setting switch M4730.

Accordingly, at this time the wipers of the calculator selector switch T4820 engage the sixth contacts in the associated contact banks, whereby the grounded wipers 4825 and 4826 thereof respectively engage the sixth contacts in their associated contact banks respectively terminating the W and X conductors in the group of WXYZ marking leads 4801, in order to set up in code the rate factor digit "1" in the group of WXYZ leads 4801, for a purpose more fully explained hereinafter. Further, the wipers 4827 and 4828 of the calculator selector switch T4820 respectively engage the sixth contacts in their associated contact banks respectively terminating the vertical magnet AM4947 and the rotary magnet AM4948 of the first calculating switch A4940, whereby the calculator selector switch T4820 has selected the first calculating switch A4940, of the three calculating switches, which will be selectively set, in a manner more fully explained hereinafter.

It is noted at this time that since the grounded wiper 4821 is in engagement with the sixth contact in its associated contact bank, the wiper switching relay R4550 is not operated. Consequently, the contacts 4551, 4553 and 4555 of the wiper switching relay R4550 remain closed, thereby to prepare the circuits between the wipers 4941 to 4943 of the calculating switch A4940 and the bank contacts associated with the wiper 4511 of the ticket printer control switch P4510. If, on the other hand, the wiper 4821 of the calculator selector switch T4820 has been operated to engage the first, third or fifth contact in its associated contact bank, a circuit would have been completed for operating the wiper switching relay R4550. The wiper switch relay R4550, upon operating, interrupts at its contacts 4551, 4553 and 4555, connections between the respective wipers 4941, 4942 and 4943 of the wiper set of the calculating switch A4940 and the control conductors extending to the ticket printer control switch P4510, and completes, at its contacts 4552, 4554 and 4556, connections between the respective wipers 4944, 4945 and 4946 of the wiper set of the calculating switch A4940 and the control conductors extending to the ticket printer control switch P4510. Accordingly, the calculator selector switch T4820 also selects the wiper set comprising the wipers 4944, 4945 and 4946 of the two wiper sets of the calculating switch A4940.

In view of the foregoing explanation of the mode of operation of the calculator selector switch T4820, it will be understood that when the rate factor applicable to the call is "1" or "2" the calculating switch A4940 is selected; when the rate factor applicable to the call is "3" or "4" the calculating switch B4920 is selected; and when the rate factor applicable to the call is "5" or "6" the calculating switch C4900 is selected. Also, when the rate factor applicable to the call is "1," "3" or "5," the lower three wipers of the wiper set of the selected calculating switch A4940, B4920 or C4900 are selected, and when the rate factor applicable to the call is "2," "4" or "6," the upper three wipers of the wiper set of the selected calculating switch A4940, B4920 or C4900 are selected.

Referring again to the pulse relay R4450, each time it operates and restores it completes and then interrupts, at its contacts 4453, the previously mentioned circuit, including the contacts 4355, 4421, 4453, 4441 and 4372, for energizing the magnet MM4736, thereby to cause the latter magnet to operate and restore. Each time the magnet MM4736 operates and restores, the wipers 4731 to 4735 of the calculator setting switch M4730 are driven one step in the clockwise direction. Accordingly, the wipers of the calculator setting switch M4730 are driven step by step until the wipers 4732 and 4733 thereof engage the contacts in their associated contact banks terminating the market WXYZ conductors in the group of WXYZ marking leads 4623 extending to the code storage device S4623 wherein the ten digit of the time duration of the established connection is registered. In the present example, the time duration of the established connection is only four minutes and consequently no ten digit is registered in the code storage device S4623. Accordingly, the wipers of the calculator setting switch M4730 are driven ten steps in the clockwise direction, at which time the wipers 4732 and 4733 engage the grounded tenth contacts in their associated contact banks to complete circuits for respectively energizing the left-hand and right-hand windings of the step relay R4420. It is noted that the stop relay R4420 is of the shunt field type and operates its associated contacts only when both the left-hand and right-hand windings thereof are energized. When thus energized the step relay R4420 operates to interrupt, at its contacts 4421, the above-traced circuits for energizing the magnet MM4736, thereby positively to arrest further operation of the calculator setting switch M4730 at this time.

During the operation of the calculator setting switch M4730, each time the magnet MM4736 operates and restores it completes and then interrupts, at its contacts 4738, a circuit for energizing the vertical magnet AM4947 of the calculating switch A4940, whereby the latter magnet operates and restores. This circuit may be traced from ground by way of the contacts 4336 of the operated busy slave relay R4330, the contacts 4411 and 4738, the wiper 4735 of the calculator setting switch M4730, and the engaged fifth to tenth contacts in its associated contact bank, the conductor C4761 extending to Fig. 48, the wiper 4827 of the calculator selector switch T4820 and the engaged sixth contact in its associated contact bank, and the winding of the vertical magnet AM4947, to battery. When the wiper 4735 is advancing step by step from the home contact to the fourth contact in its associated contact bank, the above circuit is not completed each time the contacts 4738 are closed, but when the wiper 4735 advances over the fifth to the tenth contacts the above-mentioned circuit is completed. Each time the vertical magnet AM4947 operates it drives the wiper set of the calculating switch A4940 one step in the vertical direction away from its normal vertical position, in a well-known manner. In the present example, the magnet MM4736 operates and restores ten times in order to set the wiper of the calculator setting switch M4730 into engagement with the tenth contacts in the associated contact banks in the manner previously explained, whereby the vertical magnet AM4947 operates only five times in order to drive the wiper set of the calculating switch A4940 five steps in the vertical direction away from its normal vertical position. When the wiper set of the calculating switch A4940 is driven one step in the vertical direction away from its normal vertical position, the vertical off-normal switch springs AS4950 are actuated, thereby to prepare a circuit, traced hereinafter, for energizing the release magnet AM4949 of the calculating switch A4940.

Also, upon operating, the step relay R4420 completes, at its contacts 4422, a circuit including the grounded wiper 4734 of the calculator setting switch M4730 and the engaged tenth contact in its associated contact bank for energizing the winding of the control relay R4410, thereby to cause the latter relay to operate. Upon operating the control relay R4410, at its contacts 4412, completes a holding circuit for itself which by-passes the initial energizing circuit including the contacts 4422, and, at its contacts 4411, it interrupts a further point in the previously traced circuit for energizing the vertical magnet AM4947 of the calculating switch A4940. Further, the control relay R4410 prepares, at its contacts 4413, an alternative circuit including the contacts 4355, 4413, 4453, 4441 and 4372 for again energizing the magnet MM4736 of the calculator setting switch M4730.

The pulse relay R4450 then operates and restores one or more times thereby to complete and then interrupt, at its contacts 4453, the above-traced alternative circuit for energizing the magnet MM4736, whereby the latter magnet operates and restores one or more times. The first time the magnet MM4736 operates and restores it drives the wipers of the calculator setting switch M4730 into engagement with the eleventh contacts in the associated contact banks. Thus the wiper 4734 disengages the tenth contact in its associated contact bank in order to interrupt the previously traced holding circuit for energizing the winding of the control relay R4410. The control relay R4410 then restores thereby to interrupt, at its contacts 4413, the previously traced alternative circuit for energizing the magnet MM4736 in order positively to arrest further operation of the calculator setting switch M4730 at this time. Also, upon restoring, the control relay R4410, at its contacts 4411, prepares a circuit, traced hereinafter, for energizing the rotary magnet AM4948 of the calculating switch A4940. When the wipers 4732 and 4733 of the calculator setting switch M4730 disengages the tenth contacts in their associated contact banks, the previously traced circuits for respectively energizing the left-hand and right-hand windings of the stop relay R4420 are interrupted, thereby to cause the latter relay to restore and prepare, at its contacts 4421, the previously traced original circuit for energizing the magnet MM4736.

The pulse relay R4450 then operates and restores intermittently, thereby to complete and then interrupt, at its contacts 4453, the previously traced original circuit for energizing the magnet MM4736, whereby the wipers of the calculator setting switch M4730 are driven additional steps in the clockwise direction. The wipers are driven step by step until the wipers 4732 and 4733 engage contacts in their associated contact bank terminating the marked WXYZ conductors in the associated group of WXYZ marking leads 4624 extending to the code storage device S4624, wherein there is registered the unit time digit of the time duration of the established connection. In the present example the unit time digit "4" is registered in the code storage device S4624, whereby the X and Y conductors in the associated group of markings leads 4624 are marked with ground potential. Thus, when the wipers 4732 and 4733 are driven four additional steps in the clockwise direction into engagement with the fifteenth contacts in their associated contact banks respectively terminating the grounded X and Y conductors in the associated group of WXYZ marking leads 4624, obvious circuits are recompleted for energizing the left-hand and right-hand windings of the stop relay R4420. The stop relay R4420 is thus reoperated and, at its contacts 4421, interrupts the previously traced circuit for energizing the magnet MM4736 in order positively to arrest further operation of the calculator setting switch M4730 at this time.

Since the magnet MM4736 is operated and restored four additional times, at its contacts 4738 it completes and then interrupts four times the previously mentioned circuit for energizing the rotary magnet AM4948 of the calculating switch A4940. The last-mentioned circuit extends, when completed, from ground by way of the contacts 4336, 4411 and 4738, the wiper 4735 and the engaged eleventh to fifteenth contacts in its associated contact bank, the conductor C4762 extending to Fig. 48, the wiper 4828 and the engaged sixth contact in its associated contact bank, and the winding of the rotary magnet AM4948, to battery. Accordingly, the magnet AM4948 is operated and restores four times, thereby to drive the wiper set of the calculating switch A4940 four steps in the rotary direction. Hence, at this time the wiper set of the selected calculating switch A4940 engages the fourth contact in the fifth level in the associated contact banks, and the wipers 4941, 4942 and 4943 are selected. The fourth contact in the fifth level engaged by the above-mentioned wipers are suitably jumpered by way of the jumper 4951 to the group of ten marking conductors 5201 in order to establish a charge for the previously mentioned call calculated on a monetary basis, in a manner more fully explained hereinafter.

Considering now the initial operation of the printer link 5000 in conjunction with the printer controller 4200, it is again noted that when the busy slave relay R4330 in the printer controller 4200 operates, ground potential is applied by way of the contacts 4337 to the start conductor C4302, thereby causing the operation of the start relay R5040 in the printer link 5000. Upon operating, the start relay R5040, at its contacts 5042, completes a circuit including the contacts 5032 and 5062 for energizing in multiple the upper and lower windings of the pulse relay R5060, thereby to cause the latter relay to operate. Upon operating, the pulse relay R5060, at its contacts 5062, interrupts its initial energizing circuit, whereupon a short circuit is completed for the upper and lower windings in series through the condenser 5034 in order to cause the relay to restore shortly thereafter and recomplete, at its contacts 5062, its initial energizing circuit. Hence the pulse relay R5060 operates intermittently at a predetermined rate, depending upon the characteristic of the associated condenser 5034.

Each time the pulse relay R5060 operates and restores it completes and then interrupts, at its contacts 5061, a circuit including the contacts 5032 and 5081 for energizing the magnet FM5012 of the finder F5010 individual to the printer link 5000 and having access to the various test conductors C4301, etc., extending to the printer controller 4200, etc., in the associated group. Also, upon operating, the start relay R5040, at its contacts 5043, completes a circuit for energizing the winding of the record relay R5055, thereby to cause the latter relay to operate. Further, the start relay R5040, at its contacts 5043, prepares a circuit including the contacts 5075, the conductor C5151, and the contacts 5134 of the off-normal springs S5133, for energizing in series the windings of the toll ticket test relay R5090, the toll ticket relay R5050, and the magnet M5132 of the toll ticket printer 5130. This circuit is completed only in the event the paper engaging rod 5136 of the toll ticket printer 5130 has previously engaged the springs S5133 to close the contacts 5134 and to open the contacts 5135 thereof, as illustrated. In this event the carriage of the toll ticket printer 5130 occupies its right-hand marginal stop position and an adequate supply of paper stock is available for the printing of the ticket, as previously noted. A more detailed explanation of the construction and arrangement of the toll ticket printer 5130 will be found in the John E. Ostline Patents No. 2,360,789, granted October 17, 1944, and No. 2,376,268, granted May 15, 1945.

Assuming that the carriage of the toll ticket printer 5130 occupies its right-hand marginal stop position and that an adequate supply of paper stock is available, the above-mentioned circuit will be completed for energizing the toll ticket test relay R5090, the toll ticket relay R5050, and the magnet M5132 in the toll ticket printer 5130. Upon operating the magnet M5132 retains the springs S5133 in their actuated position, whereby the contacts 5134 and 5135 thereof are retained in the position illustrated in the drawings, independently of the paper engaging rod 5136. Accordingly, subsequent movement of the carriage of the toll ticket repeater 5130 away from its right-hand marginal stop position during the printing operation, although removing the paper engaging rod 5136 from engagement with the contacts 5134, does not actuate the switch springs S5133 so long as the magnet M5132 remains operated.

When the toll ticket relay R5050 operates, at its contacts 5051 it completes an operating circuit for the motor 5131 of the toll ticket printer 5130. This circuit extends from one terminal of the 110 volt A. C. source by way of the contacts 5051, the conductor C5155, the motor 5131, and the conductor C5152 to the other terminal of the 110 volt A. C. source. Also, the toll ticket relay R5050, at its contacts 5052, interrupts a point in the circuit for operating the toll ticket alarm A5098.

When the record relay R5055 operates, at its contacts 5057 it completes a circuit for the motor 5141 of the record printer 5140, this circuit extending from one terminal of the 110 volt A. C. source by way of the contacts 5057, the conductor C5156, the motor 5141, and the conductor C5152 to the other terminal of the 110 volt A. C. source. Also, the record relay R5055, at its contacts 5056, interrupts a point in the circuit for energizing the record alarm A5099. When the toll ticket test relay R5090 operates, at its contacts 5091 it completes a multiple holding circuit for energizing the winding thereof in series with the toll ticket relay R5050 and the magnet M5132, which holding circuit is independent of its initial energizing circuit, including the contacts 5075.

At this time the motor 5131 of the toll ticket printer 5130 is operated, rendering the last-mentioned printer controllable to print on a toll ticket, and the motor 5141 of the record printer 5140 is operated, rendering the last-mentioned printer controllable to print on a record sheet. Further, it is noted that the winding of the power alarm relay R5095 bridges the terminals of the 110 volt A. C. source, whereby the latter relay normally occupies its operated position, and restores only in the event of a power failure. The operated power alarm relay R5095 retains interrupted, at its contacts 5096, the circuit for energizing the power alarm A5097. Finally, the toll ticket test relay R5090, upon operating, at its contacts 5092 interrupts a path for applying ground potential to the conductor C4481 extending to Fig. 45, which is common to the printer controllers, 4200, etc., in the associated group.

While the foregoing operations are taking place under control of the start relay R5040, the pulse relay R5060, at its contacts 5061, causes the magnet FM5012 to operate intermittently, thereby to drive the wiper 5011 of the finder F5010 step by step in the clockwise direction until it engages the contact in its associated contact bank terminating the test conductor extending to the first printer controller in the associated group. Assuming that the printer 4200 is the first calling printer controller in the associated group, when the wiper 5011 engages the contact in its associated contact bank terminating the test conductor C4301 extending to Fig. 43, a series circuit is completed for energizing the winding of the test relay R5030 in the printer link 5000 and the test relay R4430 in the printer controller 4200. The last-mentioned circuit extends from ground by way of the contacts 5041, the winding of the test relay R5030, the wiper 5011 of the finder F5010 and the engaged contact in its associated contact bank terminating the conductor C4301 extending to Fig. 43, the contacts 4331, and the winding of the test relay R4430, to battery. The test relays R4430 and R5030 operate when this series circuit is completed.

Upon operating, the test relay R5030, at its contacts 5031, completes a holding circuit for itself which is substantially identical to the previously traced initial energizing circuit therefor but which is independent of the contacts 5031. Also, the test relay R5030 interrupts, at its contacts 5032, the previously traced circuit for controlling the intermittent operation of the pulse relay R5060, thereby to arrest further operation of the latter relay at this time. Further, the test relay R5030 completes, at its contacts 5033, a circuit for energizing the winding of the hold relay R5070, thereby to cause the latter relay to operate.

When the hold relay R5070 is thus operated, at its contacts 5074 it completes an alternative circuit for retaining the toll test relay R5090, the toll ticket relay R5050, the record relay R5055, and the magnet M5132 in their operated positions. Also, the hold relay R5070, at its contacts 5076, prepares a point in the previously mentioned path for applying ground potential to the conductor C4481. Further, the hold relay R5070, at its contacts 5071, interrupts the previously traced circuit for energizing the start relay R5040 in series with magnet SM5024, whereupon the start relay R5040 restores shortly thereafter due to its slow-to-release characteristics. Also, the hold relay R5070, at its contacts 5072, completes a circuit including the contacts 5025 and the grounded wiper 5022 of the control switch S5020 and the engaged home contact in its associated contact bank, for energizing the winding of the magnet SM5024.

The magnet SM5024 operates over this circuit and, at its contacts 5025, interrupts its initial energizing circuit, whereupon the magnet SM5024 restores to drive the wipers 5022 and 5023 of the control switch S5020 one step in the clockwise direction into engagement with the first contacts in the associated contact banks. When the grounded wiper 5022 engages the first contact in its associated contact bank, a multiple holding circuit is completed for retaining the hold relay R5070 in its operated position.

When the start relay R5040 restores to normal, at its contacts 5041 it interrupts the initial energizing circuit for the test relay R5030 but the latter relay remains operated over a circuit including the contacts 5031; at its contacts 5042 it interrupts the energizing circuit for the pulse relay R5060, which now restores to normal; at its contacts 5043 it interrupts the initial energizing circuit for the relays R5090, R5050 and R5055 and the magnet M5132, but they remain in their operated positions under control of the ground potential at the contacts 5074; and finally, at its contacts 5044 it prepares a point in the circuit for applying ground potential to the wiper 5023 of the control switch S5020.

When the test relay R4430 in the printer controller 4200 operates in series with the test relay R5030 in the printer link 5000, at its contacts 4432, it connects the conductor C4481 extending to Fig. 50 of the printer link 5000, to the home contacts engaged by the wipers 4811, 4812 and 4813 of the record storage transfer switch R4810, where by obvious multiple circuits respectively including the conductors C4662, C4663 and C4664 are prepared for energizing the windings of the mark relays WB, XB and YB. In the present example, no ground potential appears upon the conductor C4481 due to the fact that the toll ticket test relay R5090 operated when the printer link 5000 was initially seized. Accordingly, the windings of the mark relays WB, XB and YB are not energized at this time and the relays remain in their restored positions.

If the toll ticket test relay R5090 had failed to operate either due to the fact that the carriage of the toll ticket printer 5130 does not occupy its right-hand normal marginal stop position or due to the fact that there is an inadequate supply of paper stock when the operation of the printer link 5000 is initiated, ground potential is applied to the conductor C4481 in order to energize the mark relays WB, XB and YB. Upon operating, the mark relays WB, XB and YB respectively complete, at the contacts WB1, XB1 and YB1, an obvious connection between the mark conductor C4661 and the stroke conductor C5125 extending to the record printer 5140, for a purpose more fully explained hereinafter.

Also, upon operating, the test relay R4430, at its contacts 4433, completes a circuit including the contacts 4713, 4354, 4433 and 4462 for energizing in multiple the upper and lower windings of the pulse relay R4460, thereby to cause the latter relay to operate. Upon operating, the pulse relay R4460, at its contacts 4462, interrupts the above-traced energizing circuit, whereupon an obvious path including the condenser 4465 is completed for short-circuiting in series the upper and lower windings of the pulse relay R4460 in order to cause the latter relay to restore shortly thereafter. Accordingly, the pulse relay R4460 operates intermittently at a predetermined rate depending upon the characteristic of the associated condenser 4465.

Also, upon operating, the test relay R4430, at its contacts 4431, completes a circuit including the conductor C4254, the wiper 4231 of the ticket storage transfer switch C4230 and the engaged home contact in its associated contact bank, and the contact 4238, for energizing the magnet CM4237, whereby the latter magnet operates and restores in order to drive the wipers 4231 to 4236, inclusive, one step in the counterclockwise direction. When the wiper 4231 disengages the home contact in its associated contact bank, the circuit for the magnet CM4237 is interrupted, thereby positively to arrest further operation of the ticket storage transfer switch C4230 at this time. At this time the wipers 4233, 4234, 4235 and 4236 engage the first contacts in their associated contact banks terminating the WXYZ conductors of the group of WXYZ marking leads 4601 extending to the date and time unit 3900, for a purpose more fully explained hereinafter. Also, the grounded wiper 4232 engages the first contact in its associated contact bank terminating the guard conductor C3961 extending to the date and time unit 3900, whereby a holding circuit, traced hereinafter, is completed for energizing the lower winding of the minute relay R3950 therein the next time the last-mentioned relay operates, as explained more fully hereinafter.

When the test relay R4430 operated, at its contacts 4433 it completed a circuit for intermittently operating the pulse relay R4460. Each time the pulse relay R4460 operates and restores, at its contacts 4461 it completes and then interrupts a path, including the conductor C4482, for applying ground potential to the multiply connected wipers 4515 and 4516 of the ticket printer control switch P4510; at its contacts 4463 it completes and then interrupts a circuit for energizing the magnet PM4517, thereby to cause the latter magnet to operate and restore in order to drive the wipers 4511 to 4516, inclusive, of the ticket printer control switch P4510 one step in the counterclockwise direction; and, at its contact 4464, it completes and then interrupts a circuit, including the conductor C4471, for energizing the magnet RM4816, thereby to cause the latter magnet to operate and restore in order to drive the wipers 4811 to 4815, inclusive, of the record storage transfer switch R4810 one step downwardly, as illustrated. Accordingly, the intermittent operation of the pulse relay R4460 effects the synchronous operation of the magnets PM4517 and RM4816, whereby the respective ticket printer control switch P4510 and the record storage transfer switch R4810 are operated in synchronism. Each time the magnet RM4816 operates it completes, at its contact 4817, a circuit for applying ground potential to the mark conductor C4661, and each time the magnet PM4517 operates it completes, at its contacts 4518, a path for applying ground potential to the multiply connected wipers 4511 and 4512 of the ticket printer control switch P4510. The ticket printer control switch P4510 and the record storage transfer switch R4810 are operative selectively to control respectively the toll ticket printer 5130 and the record printer 5140, in a manner more fully explained hereinafter.

*Release of the toll ticket repeater*

When the wipers of the storage transfer switch S1110 engage the twenty-first contacts in their associated contact banks, the last item of record information registered in the toll ticket repeater 800 is transferred to the printer controller 4200, as previously explained. Subsequently, when the wiper 1111 disengages the twenty-first contact in its associated contact bank, the previously traced circuit for energizing the winding of the control relay R850 is interrupted, thereby to cause the latter relay to restore. Upon restoring, the control relay R850 interrupts, at its contacts 851, the previously traced circuit for illuminating the lamp L5480 and for energizing the two-minute thermostatic relay R980; at its contacts 852, it interrupts the previously traced holding circuit for energizing the winding of the test relay R820, thereby to cause the latter relay to restore; and, at its contacts 853, it interrupts the previously mentioned holding circuit for energizing the winding of the control relay R830, thereby to cause the latter relay to restore. As a further result of the restoration of the control relay R850, at its contacts 854 it interrupts the circuit for the time pulse relay R860, thereby to cause the latter relay to restore; at its contacts 855 it interrupts a further point in the circuit for applying ground potential to the start conductor C890; and, at its contacts 856, it removes ground potential from the conductor C5304 extending to Fig. 53, thereby to initiate the release of the toll selector 5300.

Referring to Fig. 53, it is noted that when ground potential is removed from the conductor C5304, the circuit for energizing the switch-through relay R5330 in series with the step relay R5340 is interrupted, whereupon the switch-through relay R5330 restores to normal. Upon restoring to normal, the switch-through relay R5330, at its contacts 5335, interrupts the previously mentioned circuit for applying the busy marking ground potential to the wiper 5313, thereby to remove the busy marking condition from the trunk 5626. Also, upon restoring, the relay R5330, at its contacts 5337, completes a circuit including the contacts 5372 and 5362, and the vertical off-normal springs S5318 for energizing the release magnet M5316. The release magnet M5316 operates over this circuit, thereby to cause the wipers 5311 and 5313 of the switch mechanism 5310 to be restored to their normal vertical and rotary positions, in a well-known manner. When the switch mechanism 5310 is thus restored to normal, the vertical off-normal springs S5317 and S5318 are actuated, the former to interrupt the previously described circuit including the switch-through relay R5330 and the step relay R5340, and the latter to interrupt the previously traced energizing circuit for the release magnet M5316. Accordingly, the toll selecter 5300 has now been restored to normal and is available for further use with its individually associated toll ticket repeater 800.

When the test relay R820 restores to normal, at its contacts 822, it interrupts the previously traced circuit for controlling the magnet SM1117 of the storage transfer switch S1110 in synchronism with the magnet SM4227 of the storage register switch S4220. When the control relay R830 restores to normal, at its contacts 836, it interrupts the previously traced holding circuit for energizing in series the upper and lower windings of the wiper switching relay R930, thereby to cause the latter relay to restore, and, at its contacts 832′ it interrupts the previously traced holding circuit for energizing the winding of the switch-through relay R950, thereby to cause the latter relay to restore. Also, at the contacts 832′ the relay R830 interrupts the previously mentioned path for applying ground potential to the hold conductor C889 extending to Fig. 11, thereby to effect the restoration of the various operated WXYZ relays in the code storage devices S1121 to S1135, inclusive, and to cause the W relay in the code storage device S1031 to restore in the event the latter relay occupies its operated position. Further, the control relay R830, at its contacts 835, interrupts the previously traced circuit for energizing the upper winding of the busy relay R810 and for illuminating the busy lamp L815, and simultaneously therewith, at its contacts 834, it completes a circuit for energizing the lower winding of the busy relay, thereby to prevent the relay from restoring to normal at this time. This circuit extends from ground by way of the alarm A864, the contacts 834, the lower winding of the busy relay R810, the conductor C871 extending to Fig. 10, the wiper 1012 of the unit time switch U1010 and the engaged contact in its associated contact bank, the contacts 1016, and the winding of the magnet UM1015, to battery. When this series circuit is completed the busy relay R810 is retained in its operated position and the magnet UM1015 operates intermittently, due to the self-interrupting contacts 1016, thereby to drive the wipers of the unit time switch U1010 step by step in the clockwise direction back into engagement with their home contact positions. Attention is directed to the fact that the alarm A864 does not operate immediately since it is of the slow-acting type, and thus no signal is given to the exchange attendant until after the elapse of a predetermined time interval. This predetermined time interval is of sufficient length to permit the toll ticket repeater 800 normally to restore the apparatus thereof to its normal position and thus disconnect the circuit for the alarm A864 before it is operated. However, if there is some delay due to faulty operation of the apparatus, the alarm will be operated to indicate to the exchange attendant that some fault exists in the toll ticket repeater 800. Attention is also directed to the fact that when the circuit, traced hereinbefore, for illuminating the busy lamp L815 in series with the toll ticket supervisory relay R5565 is interrupted, the busy lamp L815 is extinguished to indicate to the exchange attendant that the information stored in the toll ticket repeater 800 has been transferred to the printer controller 4200. Also, at this time the toll ticket supervisory relay R5565 restores to normal to prevent the supervisory apparatus disclosed in Fig. 55 from transmitting an alarm signal to the supervisory operator in the event the information referred to above has been transferred within a predetermined elapsed time interval.

When the unit time switch U1010 is thus released the wiper 1012 disengages the 24th contact in its associated contact bank and reengages the home contact therein, thereby to interrupt the previously traced circuit for energizing the lower winding of the busy relay R810 in series with the magnet UM1015 and to transfer the circuit for the lower winding of the busy relay R810 so that it is retained energized in series with the winding of the magnet DM1027 of the ten and hundred time switch D1020.

The above-mentioned circuit is completed in the event the wipers of the ten and hundred time switch D1020 occupy positions other than their home positions, whereby the wipers thereof are driven step by step in the clockwise direction back into engagement with their home contact positions. The circuit for retaining the busy relay operated in series with the winding of the magnet DM1027 now extends over the previously traced circuit to the wiper 1012 and the engaged home contact in its associated contact bank, the wiper 1022 and any engaged contact in its associated contact bank except the home contact thereof, the contact 1028, and the winding of the magnet DM1027 to battery. The magnet DM1027 operates intermittently, under control of the self-interrupting contacts 1028, in order to drive the wipers of the ten and hundred time switch D1020 step by step in the clockwise direction back into engagement with their home contact positions.

Figure 9:
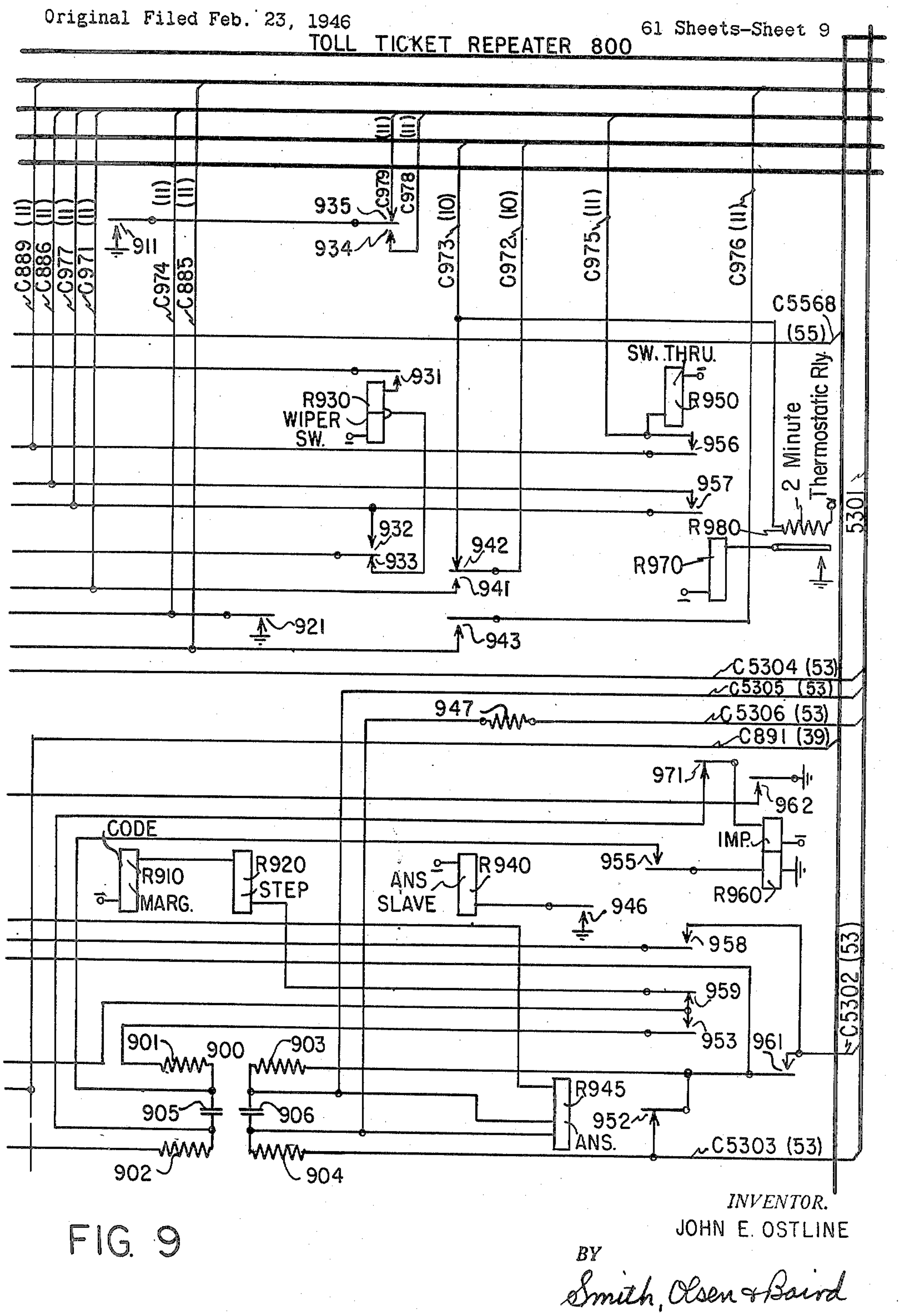
Figure 10:
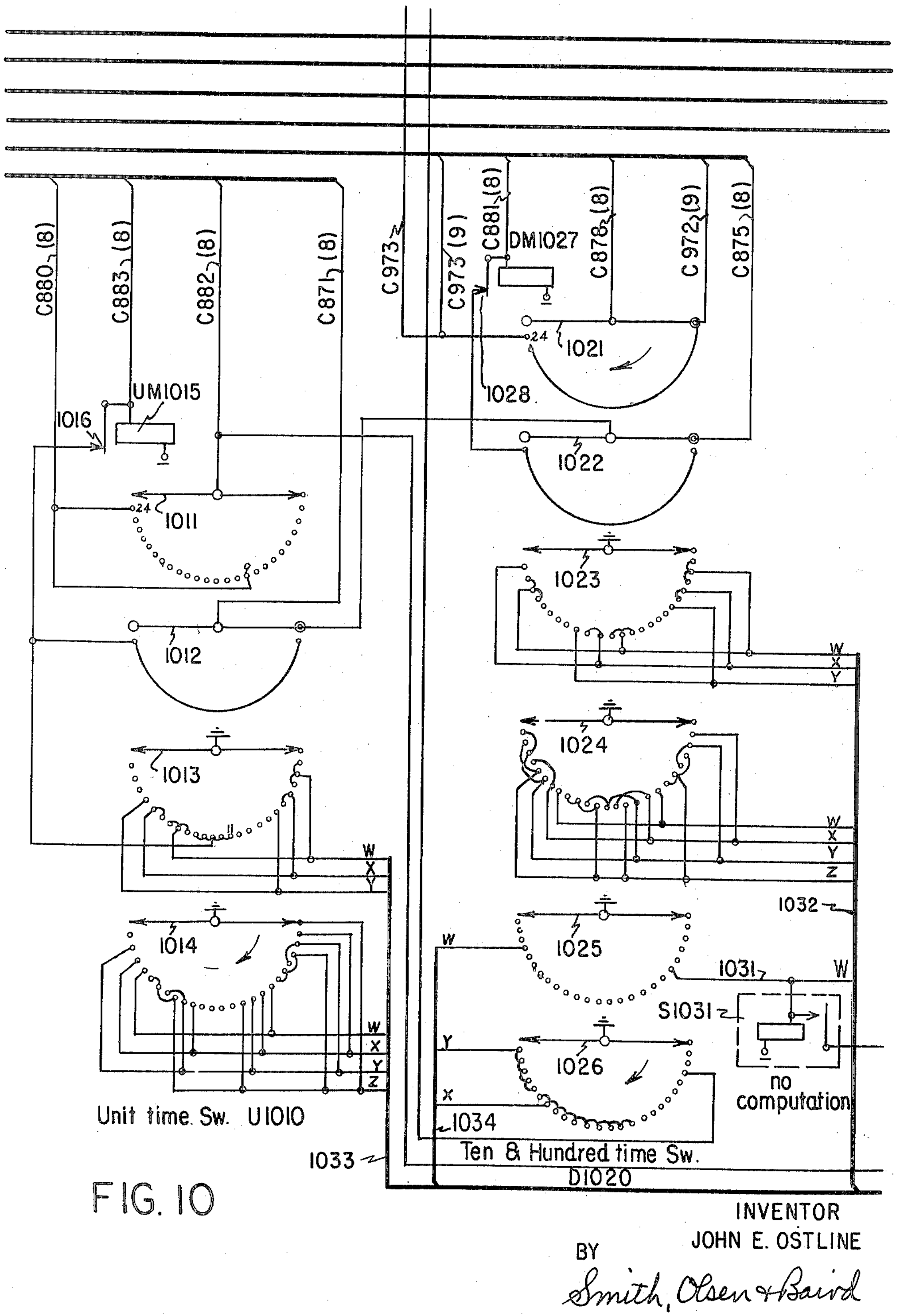

When the wiper 1022 reengages the home contact in its associated contact bank, the previously mentioned circuit for intermittently operating the magnet DM1027 is transferred by way of the conductor C875 extending to Fig. 8, the contacts 831, the conductor C876 extending to Fig. 11, the multiply connected wiper 1104 or 1105 and the engaged contacts in its associated contact bank, the conductor C886 extending to Fig. 9, the contacts 830, the conductor C977 extending to Fig. 11, the contacts 1107, and the winding of the magnet RM1106 to battery. When thus energized the magnet RM1106 operates intermittently, thereby to drive the wipers of the register and timer switch R1100 step by step in the clockwise direction back into engagement with their home contact positions. It should be noted that when the wiper 1105 disengages the twenty-third contact and engages the twenty-fourth contact in its associated contact bank, the above-traced circuit for the magnet RM1106 is interrupted and an alternative circuit for energizing the magnet RM1106 is completed by way of the conductor C873 extending to Fig. 11, the contacts 839 and the conductor C977 extending to Fig. 11, whereby the wipers of the register and timer switch R1100 are advanced an additional step into engagement with their home contact positions.

When the wiper 1104 of the register and timer switch R1100 reengages the home contact in its associated contact bank, the circuit for the lower winding of the busy relay R810 is transferred from the magnet RM1106 to the magnet SM1117 over a circuit which concludes the wiper 1112 of the storage transfer switch S1110 and the engaged twenty-second contact in its associated contact bank, the conductor C884 extending to Fig. 8, the contacts 837, the conductor C885 extending to Fig. 11, the contacts 1118, and the winding of the magnet SM1117, to battery. When this circuit is completed the busy relay R810 is retained in its operated position in series with the winding of the magnet SM1117 and the magnet SM1117 operates intermittently, under control of the self-interrupting contacts 1118, thereby to drive the wipers of the storage transfer switch S1110 step by step in the counter-clockwise direction back into engagement with the home contacts in their associated contact banks. When the wiper 1112 disengages the twenty-fourth contact and reengages the home contact in its associated contact bank, the previously traced circuit for energizing the magnet SM1117 in series with the lower winding of the busy relay R810 is interrupted, thereby causing the magnet SM1117 and the relay R810 to restore to normal. Upon restoring, the busy relay R810, at its contacts 811, interrupts the previously mentioned circuit for applying ground potential to the control conductor C783 of the trunk 780, thereby removing the busy marking potential therefrom and rendering the trunk 780 accessible to the various primary selectors 600, etc., having access thereto. At this time the toll ticket repeater 800 is completely released and is available for further use.

*Operation of the date and time unit*

Considering now the operation of the date and time unit 3900, it is noted that the master clock 3901 operates continuously to complete and to interrupt, each five seconds, an obvious circuit for energizing the winding of the pulse relay R3940, whereby the latter relay operates and restores twelve times per minute. Each time the pulse relay R3940 operates and restores it completes and then interrupts, at its contacts 3943 and 3944, the previously mentioned paths for applying ground potential respectively to the impulse conductors C891 and C891′, as previously explained. Also, each time the pulse relay R3940 operates and restores it completes and then interrupts, at its contacts 3942, a circuit for energizing the magnet M3912, whereby the latter magnet operates and restores in order to drive the wiper 3911 of the timer switch 3910 one step in the clockwise direction. Thus the wiper 3911 is driven step by step in the clockwise direction twelve steps per minute.

Each time the pulse relay R3940 operates while the grounded wiper 3911 of the timer switch 3910 engages either the eleventh or the twenty-third contacts in its associated contact bank, it completes, at its contacts 3941, a circuit for energizing the upper winding of the minute relay R3950, thereby to cause the latter relay to operate. Upon operating, the minute relay R3950 prepares, at its contacts 3952, a holding circuit for itself including the guard conductor C3961 extending to Fig. 46 of the printer controller 4200, and it completes, at its contacts 3951, a path for applying ground potential to the check conductor C3902 extending to the master clock 3901. The application of ground potential to the check conductor C3902 indicates to the master clock 3901 that an impulse has been received by the minute relay R3950 and thus keeps the master clock 3901 in synchronism. Subsequently, when the wiper 3911 disengages either the eleventh of the twenty-third contact in its associated contact bank, the previously traced circuit for energizing the upper winding of the minute relay R3950 is interrupted, thereby to cause the latter relay to restore only in the event the previously mentioned holding circuit including the guard conductor C3961 is not completed at this time. When the grounded wiper 3911 engages the twenty-fourth contact in its associated contact bank, an obvious circuit, including the self-interrupting contacts 3913, is completed for energizing the magnet M3912, whereby the latter magnet operates and restores in order to drive the wiper 3911 back into engagement with the home contact in its associated contact bank. In view of the foregoing explanation of the mode of operation of the master clock 3901 in conjunction with the timer switch 3910, it will be understood that the minute relay R3950 operates and then restores once each minute.

Assuming now that the start key K3930 has been actuated and occupies its operated position, each time the minute relay R3950 operates and restores it completes and then interrupts, at its contacts 3953, a circuit for energizing the magnet M3924, thereby to cause the latter magnet to operate and restore in order to drive the wipers 3921 to 3923, inclusive, of the unit minute switch 3920 one step in the clockwise direction. Thus the wipers of the unit minute switch 3920 are driven one step in the clockwise direction each minute, and while the grounded wiper 3921 thereof engages either the ninth or nineteenth contact in its associated contact bank, a circuit, including the contacts 3926, is completed and then interrupted by the magnet M3924, for energizing the magnet M4014, thereby to cause the latter magnet to operate and restore in order to drive the wipers 4011 to 4013, inclusive, of the ten minute switch 4010 one step in the clockwise direction. When the grounded wiper 3921 of the unit minute switch 3920 engages the twentieth contact in its associated contact bank, a self-interrupting circuit, including the contacts 3925, is completed for energizing the magnet M3924, whereby the latter magnet operates intermittently in order to drive the wipers of the unit minute switch 3920 back into engagement with their home contact positions. The grounded wipers 3922 and 3923 continuously mark the WXYZ marking leads 4601 in accordance with the unit minute digit of the time of day.

Thus the wipers of the ten minute switch 4010 are driven one step in the clockwise direction each ten minutes, and while the grounded wiper 4011 thereof engages and subsequently disengages the fifth, eleventh, seventeenth and twenty-third contacts in its associated contact bank, a circuit including the contacts 4016 is completed and then interrupted by the magnet M4014 for energizing the magnet M4026, thereby to cause the latter magnet to operate and restore in order to drive the wipers 4021 to 4025, inclusive of the hour switch 4020 one step in the clockwise direction. When the grounded wiper 4011 of the ten minute switch 4010 engages the twenty-fourth contact in its associated contact bank, a circuit including the self-interrupting contacts 4015 is completed for energizing the magnet M4014, whereby the latter magnet operates and restores in order to drive the wipers of the ten minute switch 4010 back into engagement with their home contact positions. The grounded wipers 4012 and 4013 continuously mark the WXYZ conductors in the associated group of WXYZ marking leads 4602 in accordance with the ten minute digit of the time of day.

Thus the wipers of the hour switch 4020 are driven one step in the clockwise direction each hour, and while the grounded wiper 4021 thereof engages the twenty-third contact in its associated contact bank, a circuit including the contacts 4027 is completed and then interrupted for energizing the magnet M4119, thereby to cause the latter magnet to operate and restore in order to drive the wipers 4111 to 4118, inclusive, of the day switch 4110 one step in the clockwise direction. When the wiper 4021 of the hour switch 4020 engages the twenty-fourth contact in its associated contact bank, a circuit including the self-interrupting contacts 4028 is completed for energizing the magnet M4026, whereby the latter magnet operates and restores in order to drive the wipers of the hour switch 4020 back into engagement with their home contact positions. The grounded wipers 4024 and 4025 continuously mark the WXYZ conductors in the associated group of WXYZ marking leads 4603 in accordance with the unit hour digit of the time of day, while the grounded wipers 4022 and 4023 continuously mark the WXYZ marking conductors in the associated group of WXYZ marking leads 4604 in accordance with the ten hour digit of the time of day.

Thus the wipers of the day switch 4110 are driven one step in the clockwise direction each day, that is, each twenty-four hours. Assuming that the wipers of the day switch 4110 occupy their first contact positions illustrated, at the conclusion of nineteen days the grounded wiper 4118 thereof engages the twentieth contact in its associated contact bank, whereupon a circuit, including the contacts 4120, is completed for energizing the magnet M4119 of the day switch 4110. The magnet M4119 then operates intermittently under control of the self-interrupting contacts 4120, in order to drive the wipers of the day switch 4110 step by step in the clockwise direction through the twentieth to the twenty-fourth contact, and into engagement with the home contact in their associated contact banks. At the conclusion of eight additional days, a total of twenty-eight days, the wiper 4111 engages the thirty-fourth contact in its associated contact bank, thereby to prepare a circuit for energizing the winding of the control relay R4140. Similarly, at the conclusion of nine, ten and eleven additional days, respectively representing totals of twenty-nine, thirty, and thirty-one days, the wiper 4111 engages the respective thirty-fifth, thirty-sixth and thirty-seventh contacts in its associated contact bank, thereby to prepare corresponding alternative circuits for energizing the winding of the control relay R4140. The above-mentioned circuits for controlling the relay R4140 depend upon the position of the month switch 4120, as will be more fully explained hereinafter.

Considering now the month switch 4120, it is noted that when the grounded wiper 4122 thereof engages the home contact as illustrated, the second, fourth, sixth, seventh, ninth and eleventh contacts in its associated contact bank respectively corresponding to the successive months in a first year comprising thirty-one days, ground potential is applied to the conductor C4131. When the grounded wiper 4122 engages the first contact in its associated contact bank corresponding to the month in the first year comprising twenty-eight days, ground potential is applied to the conductor C4128. When the grounded wiper 4122 engages the third, fifth, eighth and tenth contacts in its associated contact bank respectively corresponding to the successive months in the first year comprising thirty days, ground potential is applied to the conductor C4130.

Similarly, when the grounded wiper 4122 of the month switch 4120 engages the twelfth, fourteenth, sixteenth, eighteenth, nineteenth, twenty-first and twenty-third contacts in its associated contact bank respectively corresponding to the successive months in a second year comprising thirty-one days, ground potential is applied to the conductor C4131. When the grounded wiper 4122 engages the thirteenth contact in its associated contact bank corresponding to the month in the second year comprising twenty-eight days, ground potential is applied to the conductor C4128. When the grounded wiper 4122 engages the fifteenth, seventeenth, twentieth and twenty-second contacts in its associated contact bank respectively corresponding to the successive months in the second year comprising thirty days, ground potential is applied to the conductor C4130.

When the grounded wiper 4122 engages the twenty-fourth contact in its associated contact bank a circuit, including the contacts 4128, is completed for energizing the magnet M4127, thereby to cause the latter magnet to operate and restore under control of the self-interrupting contacts 4128, whereby the wiper 4121 of the month switch 4120 is advanced into engagement with the twenty-fifth contact in its associated contact bank.

When the grounded wiper 4121 engages the twenty-fifth, twenty-seventh, twenty-ninth, thirty-first, thirty-second, thirty-fourth and thirty-sixth contacts in its associated contact bank respectively corresponding to the successive months in a third year comprising thirty-one days, ground potential is applied to the conductor C4131. When the grounded wiper 4121 engages the twenty-sixth contact in its associated contact blank corresponding to the month in the third year comprising twenty-eight days, ground potential is applied to the conductor C4128. When the grounded wiper 4121 engages the twenty-eighth, thirtieth, thirty-third and thirty-fifth contacts in its associated contact bank respectively corresponding to the successive months in the third year comprising thirty days, ground potential is applied to the conductor C4130.

Finally, when the grounded wiper 4121 engages the thirty-seventh, thirty-ninth, forty-first, forty-third, forty-fourth, forty-sixth and forty-eighth contacts in its associated contact bank respectively corresponding to the successive months in the fourth year comprising thirty-one days, ground potential is applied to the conductor C4131. When the grounded wiper 4121 engages the thirty-eighth contact in its associated contact bank corresponding to the month in the fourth year comprising twenty-nine days, ground potential is applied to the conductor C4129. When the grounded wiper 4121 engages the fortieth, forty-second, forty-fifth and forty-seventh contacts in its associated contact bank respectively corresponding to the successive months of the fourth year comprising thirty days, ground potential is applied to the conductor C4130.

When the grounded wiper 4121 engages the forty-ninth contact in its associated contact bank, a circuit, including the contacts 4128, is completed for energizing the magnet M4127, thereby to cause the latter magnet to operate and restore under control of the self-interrupting contacts 4128, whereby the wipers of the month switch 4120 are driven an additional step in the counterclockwise direction back into engagement with their home contact positions.

In view of the foregoing explanation of the mode of operation of the month switch 4120, it will be understood that it operates continuously to mark the conductors C4128 to C4131, inclusive, in accordance with the number of days in the successive months throughout a four year period, whereby the number of days included in the month of February is appropriately marked, depending upon whether the year is an ordinary year or a leap year.

During the cycle of operation of the switch 4110, the wiper 4111 thereof engages the contacts thirty-four, thirty-five, thirty-six or thirty-seven terminating a corresponding one of the conductors C4128, C4129, C4130 or C4131 having ground potential thereon in accordance with the operation of the month switch 4120, whereby the above-mentioned circuit is completed for energizing the winding of the control relay R4140. When thus energized the control relay R4140 operates to complete, at its contacts 4142, a holding circuit for itself, including the grounded wiper 4112 of the day switch 4110 and the engaged contact in its associated contact bank. Also, the control relay R4140, at its contacts 4141, completes a circuit for energizing the magnet M4127, thereby to cause the latter magnet to operate and condition the wipers of the month switch 4120 to be driven one step in the counterclockwise direction. Finally, the control relay R4140, at its contacts 4143, completes a circuit including the grounded wiper 4112, the contacts 4142 and the contacts 4120, for energizing the magnet M4119, whereby the latter magnet operates intermittently in order to drive the wipers of the day switch 4110 step by step in the clockwise direction back into engagement with their first contact positions illustrated in the drawings. When the day switch 4110 is thus restored to normal the wiper 4112 reengages the first contact in its associated contact bank, whereby the previously traced holding circuit for the control relay R4140 is interrupted, thereby to cause the latter relay to restore. Upon restoring, the control relay R4140, at its contacts 4143, interrupts a further point in the previously traced circuits for energizing the magnet M4119 of the day switch 4110 and, at its contacts 4141, interrupts the previously traced circuit for energizing the magnet M4127 of the month switch 4120. The magnet M4127 now restores, thereby to drive the wipers of the month switch 4120 an additional step in the counterclockwise direction. At this time the day switch 4110 has been re-cycled and is in readiness to operate in accordance with the number of days in the month of the year, in the manner explained above, and the month switch 4120 occupies a position adapted to control the operation of the day switch 4110 in accordance with the number of days in the month of the year.

The grounded wipers 4117 and 4118 of the day switch 4110 continuously mark the WXYZ conductors in the associated group of WXYZ marking leads 4605 in accordance with the unit digit of the day of the month; while the grounded wipers 4113, 4114, 4115, and 4116 thereof continuously mark the WXYZ conductors in the associated group of WXYZ marking leads 4606 in accordance with the ten digit of the day of the month. Similarly, the grounded wipers 4125 and 4126 of the month switch 4120 continuously mark the WXYZ conductors in the associated group of WXYZ marking leads 4607 in accordance with the unit digit of the month of the year; while the wipers 4123 and 4124 thereof continuously mark the WXYZ conductors in the associated group of WXYZ marking leads 4608 in accordance with the ten digit of the month of the year.

As previously pointed out, the date and time unit 3900 operates continuously to mark the unit digit and the ten digit of the minute of the hour, the unit digit and the ten digit of the hour of the day, the unit digit and the ten digit of the day of the month, and the unit digit and the ten digit of the month of the year, taking care of the number of days in the month of February included in both ordinary and leap years. However, it is necessary initially to set the times and dates in the date and time unit 3900 and to correct the setting thereof in the event of failure of the master clock 3901 at any time. This may be accomplished by appropriately operating the minute correct key K3935, the hour correct key K4030, the day correct key K4040, and the month correct key K4130. More particularly, each time the minute correct key K3935 is operated and restored, a circuit is completed for energizing the magnet M3924, thereby to cause the latter magnet to operate and restore, whereby the wipers of the unit minute switch 3920 are advanced an additional step in the clockwise direction and the ten minute switch 4010 is appropriately controlled by the unit minute switch 3920, in the manner previously explained. Similarly, each time the hour correct key K4030 is operated and restored, a circuit for energizing the magnet M4026 is completed and then interrupted, thereby to cause the latter magnet to operate and restore, whereby the wipers of the hour switch 4020 are operated an additional step in the clockwise direction, and each time the day correct key K4040 is operated and restored, a circuit for energizing the magnet M4119 is completed, thereby to cause the latter magnet to operate and restore, whereby the wipers of the day switch 4110 are operated an additional step in the clockwise direction. Finally, each time the month correct key K4130 is operated and restored, a circuit for energizing the magnet M4127 is completed and then interrupted, thereby to cause the latter magnet to operate and restore, whereby the wipers of the month switch 4120 are operated an additional step in the clockwise direction.

In order to provide a checking arrangement to determine whether the master clock 3901 is operating accurately, the checking clock 4060 has been provided which is designed to open its contacts 4061 one second in every minute. When it is desired to test the speed of operation of the master clock 3901 the check key K4050 is actuated, whereupon a circuit is completed from ground by way of the contacts 4061, the contacts 4051, and the winding of the checking relay R4070, whereupon the latter relay operates and, at its contacts 4071, interrupts a point in the circuit for energizing the counting meter M3970. Also, upon actuation, at the contacts 4052, the key K4050 prepares a point in the circuit, including the contacts 3954, for energizing the counting meter M3960. Consequently, each time the minute relay R3950 is operated and restored under the control of the timer switch 3910, the relay R3940 and the master clock 3901, the counting meter M3960 is actuated. It will be recalled that the minute relay R3950 is operated once in each minute and, accordingly, the counting meter M3960 actuates its associated counting mechanism to register the number of times the master clock 3901 controls the minute relay R3950. The clock mechanism 4060 interrupts the contacts 4061 for one second in every minute, whereupon the checking relay R4070 momentarily restores and, at its contacts 4071, completes an obvious circuit for energizing the counting meter M3970. Thus, when the counting meter M3970 is actuated once each minute under control of the clock 4060 and the checking relay R4070, an accurate count is made of each time the checking relay R4070 restores to normal. Since the checking relay R4070 restores once each minute, the counting meter M3970 controls its associated counting mechanism to register the number of times the clock 4060 controls the checking relay R4070. Thus, if the minute relay R3950 and the checking relay R4070 are being accurately operated respectively by the master clock 3901 and the clock 4060, the readings on the counting meters M3960 and M3970 should correspond. However, if the master clock 3901 either slows down or speeds up, the reading on the meter mechanism M3960 will not correspond to the reading on the counting meter M3970, thus indicating that the master clock 3901 requires adjustment.

*Further operation of the printer controller*

Continuing now with the operation of the printer controller 4200, after all of the items of record information have been transferred thereto from the toll ticket repeater 800, the wipers of the storage register switch S4220 engage the twenty-fourth contacts in the associated contact banks. Although the last item of record information transferred to the printer controller 4200 is transferred when the wipers of the storage register switch S4220 engage the twentieth contacts in the associated contact banks, the wipers thereof are immediately advanced step by step over the twenty-first, twenty-second, twenty-third and twenty-fourth contacts under control of the pulse relay R4450, as previously explained. When the wiper 4222 of the storage register switch S4220 disengages the twenty-third contact in its associated contact bank, it interrupts the previously traced circuit for energizing the upper winding of the hold relay R4350 in multiple with the circuit for energizing the magnet SM4227 of the storage register switch S4220. When this circuit is interrupted the further operation of the pulse relay R4450 does not effect further operation of the storage register switch S4220. Also when the wiper 4222 engages the twenty-fourth contact in its associated contact bank, it completes a circuit for energizing the lower winding of the hold relay R4350, whereby the hold relay is retained in its operated position.

As previously explained, the date and time unit 3900 operates continuously to cause the date and time to be marked in the groups of WXYZ marking leads 4601 to 4608, inclusive. For convenience it may be assumed that the groups of WXYZ marking leads 4601 to 4608, inclusive, are marked by the date and time unit 3900 in accordance with the following items of record information, as indicated below:

| Group of WXYZ Marking Leads | Nature of Record Information |
|---|---|
| 4608, 4607 | The respective ten and unit digits of the month of the year, the respective digits "1" and "1" being registered. |
| 4606, 4605 | The respective ten and unit digits of the day of the month, the respective digits "2" and "9" being registered. |
| 4604, 4603 | The respective ten and unit digits of the hour of the day, the respective digits "1" and "1" being registered. |
| 4602, 4601 | The respective ten and unit digits of the minute of the hour, the respective digits "3" and "3" being registered. |

Considering now the operation of the ticket printer control switch P4510 to govern the toll ticket printer 5130, upon the first operation of the pulse relay R4460, at its contacts 4463 a circuit is completed for energizing the magnet PM4517, thereby to cause the latter magnet to operate and condition the wipers of the ticket printer control switch P4510 to be driven one step in the counterclockwise direction. Also, upon the first operation of the pulse relay R4460, at its contacts 4461 a circuit is completed for applying ground potential to the multiply connected wipers 4515 and 4516, thereby to complete a circuit, including the wiper 4516 and the engaged home contact in its associated contact bank, and the conductor C4255 extending to Fig. 42, for energizing the magnet CM4237, whereby the latter magnet operates and conditions the wipers 4231 to 4236, inclusive, of the ticket storage transfer switch C4230 to be driven one step in the counterclockwise direction.

Upon operating, the magnet PM4517 completes, at the contacts 4518, the previously mentioned path for applying ground potential to the multiple connected wipers 4511 and 4512, whereby the wiper 4512, engaging the home contact in its associated contact bank, applies ground potential to the mark conductor C4541 extending to Fig. 42. The application of ground potential to the mark conductor C4541 completes a path including the contacts WA1 and XA1 for applying ground potential to the first marking conductor in the group of marking leads 5101 extending to the toll ticket printer 5130, the relays WA and XA being operated at this time in a manner more fully described hereinafter. This application of ground potential to the first marking conductor in the group of marking leads 5101 completes a circuit, including the contacts 5134 of the set of switch springs S5133, for energizing the #1 printer magnet in the toll ticket printer 5130, whereby the latter magnet operates in order to cause the toll ticket printer 5130 to print the first digit "1" in the first line on a toll ticket. The first digit "1"

in the first line on the toll ticket corresponds to the ten digit "1" of the month of the year.

Before explaining the mode of operation of the WA, XA, YA and ZA, respectively associated with the wipers 4233, 4234, 4235, and 4236 of the ticket storage transfer switch C4230, the relay operation of the ticket printer control switch P4510 will be explained. Continuing now with the operation of the ticket printer control switch P4510, it is noted that the wiper 4512 first engages the home contact and then the first contact in its associated contact bank terminating the mark conductor C4541, thereby to cause the toll ticket printer 5130 to print the digits "1" and "1" in the first line on the toll ticket. The wiper 4512 then engages the second contact in its associated contact bank terminating the dash conductor C5108, thereby to cause the printer 5130 to print the dash (—) in the first line on the toll ticket following the second digit "1." The wiper 4512 then successively engages the third and fourth contacts in its associated contact bank terminating the mark conductor C4541, thereby to cause the printer to print the digits "2" and "9" in the first line on the toll ticket. The wiper 4512 then engages the fifth contact in the associated contact bank terminating the stroke conductor C5109, thereby to cause the toll ticket printer to print the stroke (/) in the first line on the toll ticket.

The wiper 4512 then successively engages the sixth and seventh contacts in its associated contact bank terminating the mark conductor C4541, thereby to cause the printer 5130 to print the digits "1" and "1" in the first line on the toll ticket. The wiper 4512 then engages the eighth contact in its associated contact bank terminating the period conductor C5110, thereby to cause the printer 5130 to print the period (.) in the first line of the toll ticket. The wiper 4512 then successively engages the ninth and tenth contacts in its associated contact bank terminating the mark conductor C4541, thereby to cause the printer 5130 to print the digits "3" and "3" in the first line on the toll ticket. The wiper 4512 then engages the eleventh contact in its associated contact bank terminating the shift conductor C5107, thereby to cause the printer to space and to shift the toll ticket, whereby the second line thereon may be printed. Accordingly the first line on the toll ticket appears as follows:

11—29/11.33

Thus the first line of the toll ticket indicates that the call was made in the eleventh month on the twenty-ninth day and that the call was terminated at the eleventh hour and the thirty-third minute.

The wiper 4512 then engages the twelfth contact in its associated contact bank which is not connected and thus does not cause operation of the toll ticket printer 5130. The wiper 4512 then successively engages the thirteenth and fourteenth contacts in its associated contact bank terminating the conductors C5112 and C5113, extending to the terminal block B5111, which are respectively jumpered to the eighth and fourth conductors in the group of marking leads 5101, thereby to cause the toll ticket printer 5130 to print the digits "8" and "4" in the second line on the toll ticket. These digits are permanently wired at the terminal block B5111 in accordance with the zone 84 of the calling subscriber substation. The wiper 4512 then engages the fifteenth contact in its associated contact bank terminating the space conductor C5106, thereby to cause the printer 5130 to space the toll ticket. The wiper 4512 then engages the sixteenth contact in its associated contact bank terminating the conductor C5114 extending to the terminal block B5111 which is jumpered to the fourth conductor in the group of marking leads 5101, thereby to cause the printer 5130 to print the digit "4" in the second line on the toll ticket, which digit is permanently wired at the terminal block B5111 in accordance with the digit "4" designating the calling exchange 4.

The wiper 4512 then engages the seventeenth contact in its associated contact bank terminating the dash conductor C5108, thereby to cause the toll ticket printer 5130 to print the dash (—) in the second line on the toll ticket. The wiper 4512 then successively engages the seventeenth, eighteenth, nineteenth and twentieth contacts in its associated contact bank terminating the mark conductor C4541, thereby to cause the toll ticket printer 5130 to print the digits "0," "0," "9" and "9" in the second line on the toll ticket. The wiper 4512 then engages the twenty-second contact in its associated contact bank terminating the shift conductor C5107, thereby to cause the printer to space and to shift the toll ticket, whereby the third line thereon may be printed. Accordingly, the second line on the toll ticket appears as follows:

84 4—0099

Thus the second line of the toll ticket indicates the zone 84 of the calling exchange 4 and the line terminal designation 0099 of the calling subscriber. Thus the directory number of the calling subscriber including the code digits 844 and the numerical digits 0099 are printed on the second line of the toll ticket.

The wiper 4512 then engages the twenty-third contact in its associated contact bank which is not connected and thus no operation occurs in the toll ticket printer 5130. The wiper 4512 then engages the twenty-fourth contact in its associated contact bank and the wiper 4511 next engages the twenty-fifth contact in its associated contact bank terminating the mark conductor C4541, thereby to cause the printer 5130 to print the digits "2" and "7" in the third line on the toll ticket. The wiper 4511 then engages the twenty-sixth contact in its associated contact bank terminating the space conductor C5106, thereby to cause the printer to space the toll ticket. The wiper 4511 then engages the twenty-seventh contact in its associated contact bank, which is connected by way of the contacts 4531 to the mark conductor C4541, thereby to cause the printer to print the digit "3" in the third line on the toll ticket.

The wiper 4511 then engages the twenty-eighth contact in its associated contact bank which is conected by the way of the contacts 4533 to the dash conductor C5108, thereby to cause the printer to print the dash (—) in the third line on the toll ticket. The wiper 4511 then successively engages the twenty-ninth, thirtieth, thirty-first and thirty-second contacts in its associated contact banks terminating the mark conductor C4541, thereby to cause the printer 5130 to print the digits "1," "2," "3" and "4" in the third line on the toll ticket. The wiper 4511 then engages the thirty-third contact in its associated contact bank terminating the shift conductor C5107, thereby to cause the printer to space and to shift the toll ticket whereby the fourth line thereon may be printed. Accordingly the third line on the toll ticket appears as follows:

27 3—1234

Thus the third line of the toll ticket indicates the zone 27 of the called exchange 3 and the line terminal designation 1234 of the called subscriber. Thus the directory number of the called subscriber including the code digits 273 and the numerical digits 1234 are printed on the third line of the toll ticket.

The wiper 4511 then engages the thirty-fourth contact in its associated contact bank which is not connected, and thus no operation occurs in the toll ticket printer 5130. The wiper 4511 then successively engages the thirty-fifth, thirty-sixth and thirty-seventh contacts in its associated contact bank terminating the mark conductor C4541, thereby to cause the toll ticket printer 5130 to space the toll ticket twice and then to print the digit "4" in the fourth line on the toll ticket. The wiper 4511 then engages the thirty-eighth contact in its associated contact bank terminating the stroke conductor C5109, thereby to cause the printer to print the stroke (/) in the fourth line on the toll ticket. The wiper 4511 then engages the thirty-ninth contact in its associated contact bank terminating the mark conductor C4541, thereby to cause the printer to print the digit "1" in the fourth line on the toll ticket. The wiper 4511 then engages the fortieth contact in its associated contact bank terminating the stroke conductor C5109, thereby to cause the printer to print the stroke (/) in the fourth line on the toll ticket. The wiper 4511 then engages the forty-first contact in its associated contact bank, which is connected by way of the contacts 4523 to the "F" conductor C5104, thereby to cause the printer to print the letter "F" in the fourth line on the toll ticket. The wiper 4511 then engages the forty-second contact in its associated contact bank terminating the shift conductor C5107, thereby to cause the printer to space and to shift the toll ticket, whereby the fifth line thereof may be printed. Accordingly, the fourth line on the toll ticket appears as follows:

4/1/F

Thus the fourth line of the toll ticket indicates that the time duration of the call is four minutes, that the rate factor applicable to the call is the rate "1," and that the class of service of the calling subscriber is that of a flat rate subscriber.

The wiper 4511 then engages the forty-third contact in its associated contact bank which is not connected. Thus no operation occurs in the toll ticket printer 5130. The wiper 4511 then successively engages the forty-fourth and forty-fifth contacts in its associated contact bank, which are respectively connected by way of the contacts 4551 and 4553, and the conductors C4961 and C4962 to the wipers 4941 and 4942 of the calculating switch A4940, and therefrom by way the engaged fourth contact in the fifth level in the respectively associated contact banks and the jumper 4951 to the respective sixth and tenth conductors in the group of marking leads 5101, thereby to cause the printer 5130 to print the digits "6" and "0" in the fifth line on the toll ticket. The wiper 4511 then engages the forty-sixth contact in its associated contact bank, which is connected by way of the contacts 4555 and the conductor C4963 to the wiper 4943 of the calculating switch A4940. The last-mentioned contact is not connected by the jumper 4951 to the conductors in the group of marking leads 5101 and, consequently, no operation occurs in the printer 5130.

The wiper 4511 then engages the forty-seventh contact in its associated contact bank terminating the space conductor C5106, thereby to cause the printer 5130 to space the toll ticket. The wiper 4511 then engages the forty-eighth contact in its associated contact bank, which is connected by way of the contacts 4521 to the "C" conductor C5102, thereby to cause the printer 5130 to print the letter "C" in the fifth line on the toll ticket. The wiper 4511 then engages the forty-ninth contact in its associated contact bank, which is not connected and thus no operation occurs in the toll ticket printer 5130. Accordingly, the fifth line on the toll ticket appears as follows:

60 C

Thus the fifth line of the toll ticket indicates that the cost of the call is sixty cents.

Figure 47:
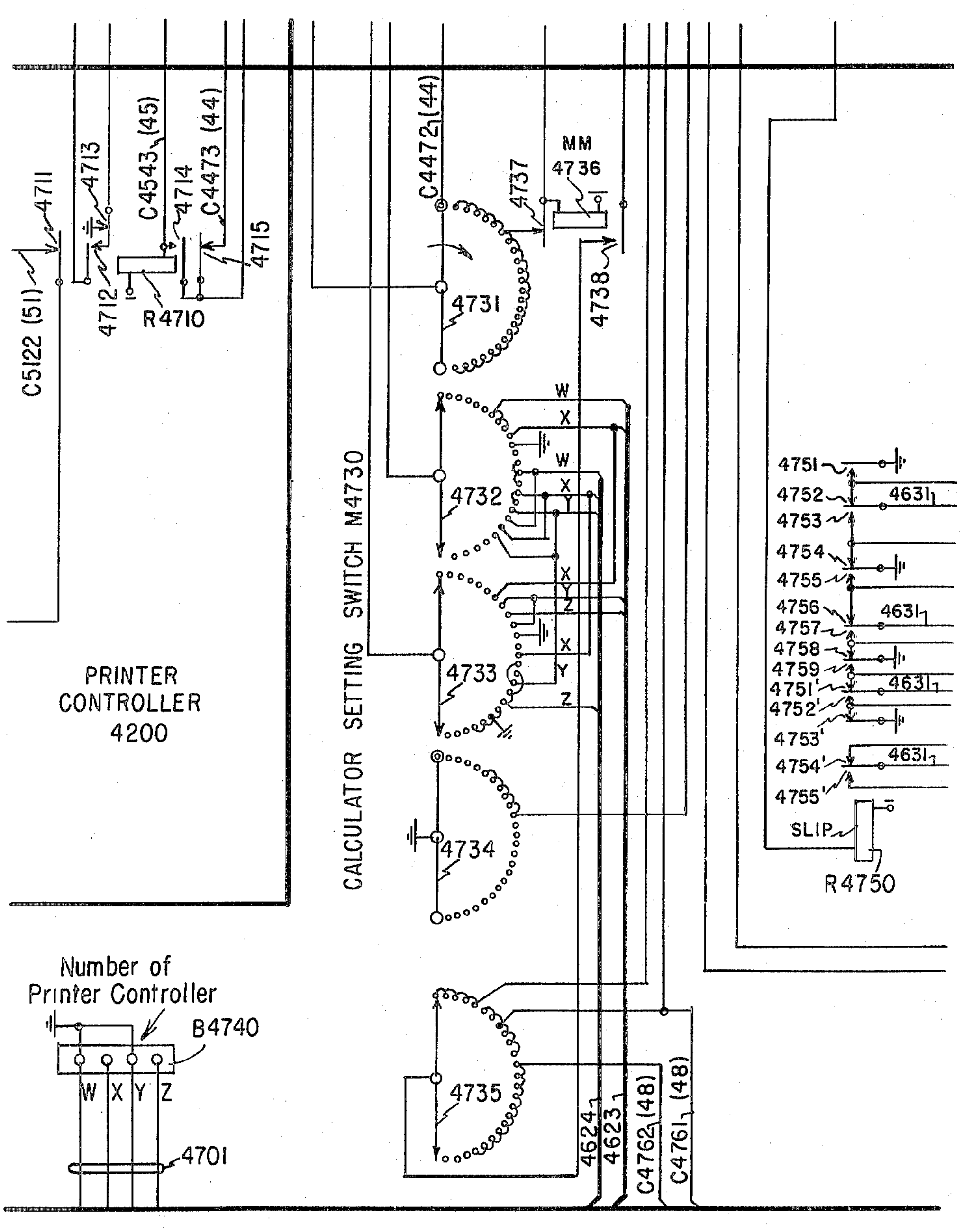

It is noted that when the wiper 4515 of the ticket printer control switch P4510 engages the forty-third contact in its associated contact bank, the pulse relay R4460 operates, a circuit including the contacts 4461, the conductor C4482, the wiper 4515 and the engaged forty-third contact in its associated contact bank, and the conductor C4543 extending to Fig. 47, for energizing the winding of the control relay R4710, thereby to cause the latter relay to operate. Upon operating, the control relay R4710, at its contacts 4714, completes a holding circuit for itself including the contacts 4325 and, at its contacts 4714, the previously traced circuit for energizing the pulse relay R4450 is interrupted, thereby positively to arrest further operation of the latter relay at this time. Also, the control relay R4710, at its contacts 4713, disconnects the ground potential for controlling the operation of the pulse relay R4460 and simultaneously therewith, at its contacts 4712, it provides a new control circuit for the pulse relay R4460, which includes the wiper 4222 of the storage register switch S4220 and the engaged twenty-fourth contact in its associated contact bank and ground potential at the contacts 4336. Accordingly, the pulse relay R4460 continues to operate intermittently. Finally, the control relay R4710, at its contact 4711, interrupts a further point in a path, traced hereinafter, for applying ground potential to the space conductor C5122 extending to the record printer 5140.

When the wiper 4515 engages and subsequently disengages the forty-ninth contact in its associated contact bank, and the pulse relay R4460 operates and restores, a circuit including the contacts 4461, the conductor C4482, the wiper 4515 and the engaged forty-ninth contact in its associated contact bank, and the conductor C4251, is completed for energizing the magnet SM4227 of the storage register switch S4220, thereby to cause the latter magnet to operate and restore. When the magnet SM4227 is thus operated and restored, the wiper 4222 thereof disengages the twenty-fourth contact in its associated contact bank, whereupon the previously traced circuit for intermittently operating the pulse relay R4460 is interrupted. In addition to the foregoing, when the wiper 4222 disengages the twenty-fourth contact in its associated contact bank, the printer controller 4200 is released, in a manner more fully explained hereinafter.

Considering now the operation of the marking relays WA, XA, YA and ZA, when the wipers 4233 to 4236, inclusive, of the ticket storage transfer switch C4230 engage the first contacts in their associated contact banks, the WXYZ conductors in the group of WXYZ marking leads 4608 extending to the date and time unit 3900 are operatively connected to the windings of the respective marking relays WA, XA, YA, and ZA in view of the fact that a code corresponding to the ten digit of the month of the year is marked in the group of WXYZ marking leads 4608. Since the digit "1" is marked on the WXYZ marking leads 4608, ground potential appears upon the W and X conductors thereof and causes the energization of the marking relays WA and XA. When thus energized the WA and XA relays operate to complete, at the contacts WA1 and XA1 a path of applying ground potential to the first conductor in the group of marking leads 5101, over a path which includes the grounded wiper 4512 of the ticket printer control switch P4510.

From the foregoing it will be understood that as the wipers of the ticket storage transfer switch C4230 are rotated step by step in the counterclockwise direction, they successively engage the contacts in their associated contact banks terminating respectively the WXYZ conductors in the groups of WXYZ marking leads 4608, 4607, 4606, 4605, 4604, 4603, 4602 and 4601, the various groups of WXYZ marking leads extending to the code storage devices S4625 to S4635, inclusive, and S4622 to S4624, inclusive, and finally they successively engage the contacts terminating the WXYZ conductors in the group of WXYZ marking leads 4801. The various combinations of operations of the relays WA, XA, YA and ZA complete marking paths between the mark conductor C4541 and the ten marking conductors in the group of marking leads 5101 extending to the toll ticket printer 5130, whereby the magnets corresponding to the marked leads 5101 are operated.

Further, it is noted that when there is no code digit marked in a given group of WXYZ marking leads selected by the wipers of the ticket storage transfer switch C4230, no ground potential appears upon the associated WXYZ conductors thereby to cause each of the marking relays WA, XA, YA and ZA to remain in its restored position. At this time a circuit path is completed for connecting the mark conductor C4541, by way of the contacts WA2, XA4, YA6 and ZA8, to the space conductor C5106 extending to the toll ticket printer 5130. Thus the toll ticket printer 5130 is actuated once to leave a space on the toll ticket and advance to its next position in order to print the succeeding character.

In order to cause the toll ticket printer 5130 to operate and print the information previously described upon the toll ticket, it is necessary for the different groups of WXYZ marking leads 4801 and 4601 to 4608, inclusive, and the different code storage devices S4622 to S4635, inclusive, to be connected to the various contacts in the banks associated with the wipers 4233 to 4236, inclusive, of the ticket storage transfer switch C4230 in a predetermined order and as indicated in the following schedule:

| Contact in Bank of Switch C4230 | WXYZ Marking Leads or Code Storage Device | Nature of Information |
|---|---|---|
| 1 | 4608 | The respective ten and unit digits of the month of the year. |
| 2 | 4607 | |
| 3 | 4606 | The respective ten and unit digits of the day of the month. |
| 4 | 4605 | |
| 5 | 4604 | The respective ten and unit digits of the hour of the day. |
| 6 | 4603 | |
| 7 | 4602 | The respective ten and unit digits of the minute of the hour. |
| 8 | 4601 | |
| 9 | S4625 | The respective first, second, third, and fourth digits of the numerical portion of the directory number of the calling subscriber substation. |
| 10 | S4626 | |
| 11 | S4627 | |
| 12 | S4628 | |
| 13 | S4629 | The respective first, second and third digits of the code portion of the directory number of the called subscriber substation. |
| 14 | S4630 | |
| 15 | S4631 | |
| 16 | S4632 | The respective first, second, third and fourth digits of the numerical portion of the directory number of the called subscriber substation. |
| 17 | S4633 | |
| 18 | S4634 | |
| 19 | S4635 | |
| 20 | S4622 | The respective hundred, ten, and unit digits of the time duration of the call. |
| 21 | S4623 | |
| 22 | S4624 | |
| 23 | 4801 | The rate factor digit applicable to the toll call. |

At this point it is again noted that when the pulse relay R4460 operates and restores while the wiper 4516 or 4515 of the ticket printer control switch P4510 engages a contact in the respectively associated contact bank terminating the multiply connected conductor C4255, the previously traced circuit for energizing the magnet CM4237 of the ticket storage transfer switch C4230 is completed and then interrupted, thereby to cause the magnet to drive the wipers one step in the counterclockwise direction; while each time the pulse relay R4460 operates and restores the previously traced circuit for energizing the magnet PM4517 is completed and interrupted, thereby to cause the latter magnet to drive the wipers of the ticket printer control switch P4510 one step in the counterclockwise direction. Accordingly, the wipers of the ticket printer control switch P4510 are driven one step in the counterclockwise direction each time the pulse relay R4460 operates and restores, while the wipers of the ticket storage transfer switch C4230 are driven one step in the counterclockwise direction only upon certain operations and restorations of the pulse relay R4460, as noted above.

Considering now the operation of the record storage transfer switch R4810 to govern the record printer 5140, upon the first operation of the pulse relay R4460, at its contacts 4464, a circuit is completed for energizing the magnet RM4816, thereby to cause the latter magnet to operate and condition the wipers 4811 to 4815, inclusive, to be driven one step downwardly, as illustrated. Also upon operating, the magnet RM4816 completes, at its contacts 4817, the previously mentioned path for applying ground potential to the mark conductor C4661. The application of the ground potential to the mark conductor C4661 completes a path including the contacts WB2, XB4, YB8, ZB12 and 4711 for applying ground potential to the space conductor C5122 extending to the record printer 5140, since the relays WB, XB, YB and ZB occupy their restored positions at this time. This application of ground potential to the space conductor C5122 completes a circuit for energizing the space magnet in the record printer 5140, whereby the latter magnet operates in order to cause the record printer 5140 to space the record sheet therein.

At this point it is again noted that the marking relays WB, XB, YB and ZB occupy their restored positions when the wipers of the record storage transfer switch R4810 engage the home contacts in their associated contact banks, due to the fact that ground potential does not appear upon the conductor C4481 extending to the printer link 5000; the last-mentioned condition prevailing in view of the fact that the toll ticket test relay R5090 in the printer link 5000 occupies its operated position at this time.

Before explaining the mode of operation of the WB, XB, YB and ZB relays respectively associated with the wipers 4811, 4812, 4813 and 4814 of the record storage transfer switch R4810, the general operation of the switch R4810 will be explained. Continuing now with the operation of the switch R4810, it is pointed out that when the wipers are in engagement with the home contacts in their associated contact banks, the operation of the magnet RM4816, at its contacts 4717, grounds the mark conductor C4661 and the space conductor C5122 in order to cause the record printer 5140 to space the record sheet, as previously explained. The wipers of the record storage transfer switch R4810 then successively engage the first and second contacts in the associated contact banks, whereby the grounded mark conductor C4661 is successively connected twice to the first marking conductor in the group of marking leads 5121, whereby the record printer 5140 prints the digits "1" and "1" on the record sheet.

The wipers of the switch R4810 then successively engage the third to the forty-fourth contacts, inclusive, in the associated contact banks, whereby the grounded mark conductor C4661 is successively connected to the various marking conductors in the group of marking leads 5121 in order to cause the record printer 5140 to print the remainder of the information in a single line on the record sheet. Finally, when the wipers of the record storage transfer switch R4810 engage the forty-fifth contacts in the associated contact banks, the grounded mark conductor C4661 is connected to the shift conductor C5123, whereby the record printer 5140 spaces and shifts the record sheet.

Considering now the operation of the marking relays WB, XB, YB and ZB, when the wipers 4811 to 4814, inclusive, engage the first contacts in the associated contact banks, the WXYZ conductors in the group of WXYZ marking leads 4608 extending to the date and time unit 3900 are operatively connected to the windings of the respective marking relays WB, XB, YB and ZB. In view of the fact that a code corresponding to the ten digit of the month of the year, the digit "1," is marked in the group of WXYZ marking leads 4608, ground potential appears upon the W and X conductors, whereupon obvious circuits respectively including the conductors C4662 and C4663 are completed for energizing the marking relays WB and XB. When thus energized the WB and XB relays operate to complete, at the respective contacts WB1 and XB1, a path for applying ground potential to the first conductor in the group of marking leads 5121 extending to the record printer 5140. This path includes the grounded mark conductor C4661, the contacts WB1, XB1, YB2 and ZB2, and the first conductor in the group of marking leads 5121.

From the foregoing it will be understood that as the wipers of the record storage transfer switch R4810 are moved step by step downwardly as illustrated, they successively engage contacts in the associated contact banks terminating the WXYZ conductors in the various groups of WXYZ marking leads 4608, 4607, 4606, 4605, 4604, 4603, 4602, 4601, 4611, 4612 and 4613; the various groups of WXYZ marking leads extending to the code storage devices S4625 to S4635, inclusive, and S4622 to S4624, inclusive; the WXYZ conductors in the group of WXYZ marking leads 4801; the various groups of WXYZ marking leads extending to the code storage devices ductors and the marking relays WB, XB, YB and ZB remain in their restored positions. At this time a path is completed for connecting the mark conductor C4661 to the space conductor C5122 extending to the record printer 5140 in the event the control relay R4710 has not operated at this time.

In order to cause the record printer 5140 to operate and print the information previously described upon the record sheet, it is necessary for the different groups of WXYZ marking leads 4601 to 4608, inclusive, 4611 to 4613, inclusive, 4701 and 4801, and S4622 to S4638, inclusive, as well as direct ground potential, to be connected to the various contacts in the contact banks associated with the wipers 4811 to 4814, inclusive, of the record storage transfer switch R4810 in a predetermined order and as indicated in the following schedule:

| Contact in Bank of Switch R4810 | Marking Leads Connected | Information Printed by the Record Printer 5140 |
|---|---|---|
| Home | Control conductor C4481 | If grounded a stroke (/) is printed; if not grounded the printer spaces once. |
| 1 | 4608 | The respective ten and unit digits of the month of the year. |
| 2 | 4607 | |
| 3 | Direct ground combination for making a dash (—) | A dash (—). |
| 4 | 4606 | The respective ten and unit digits of the day of the month. |
| 5 | 4605 | |
| 6 | Direct ground combination for making a stroke (/) | A stroked (/). |
| 7 | 4604 | The respective ten and unit digits of the hour of the day. |
| 8 | 4603 | |
| 9 | Direct ground combination for making a dash (—) | A dash (—). |
| 10 | 4602 | The respective ten and unit digits of the minute of the hour. |
| 11 | 4601 | |
| 12 | Direct ground combination for making a stroke (/) | A stroke (/). |
| 13 | 4611 | The respective first, second and third digits of the code portion of the directory number of the calling subscriber substation (permanently wired at the block B4640). |
| 14 | 4612 | |
| 15 | 4613 | |
| 16 | Direct ground combination for making a dash (—) | A dash (—). |
| 17 | S4625 | The respective first, second, third and fourth digits of the numerical portion of the directory number of the calling subscriber substation. |
| 18 | S4626 | |
| 19 | S4627 | |
| 20 | S4628 | |
| 21 | Direct ground combination for making a stroke (/) | A stroke (/). |
| 22 | S4629 | The respective first, second and third digits of the code portion of the directory number of the called subscriber substation. |
| 23 | S4630 | |
| 24 | S4631 | |
| 25 | Direct ground combination for making a dash (—) | A dash (—). |
| 26 | S4632 | The respective first, second and third digits of the code portion of the directory number of the called subscriber substation. |
| 27 | S4633 | |
| 28 | S4634 | |
| 29 | S4635 | |
| 30 | Direct ground combination for making a stroke (/) | A stroke (/). |
| 31 | S4622 | The respective hundred, ten, and unit digits of the time duration of the call. |
| 32 | S4623 | |
| 33 | S4624 | |
| 34 | Direct ground combination for making a stroke (/) | A stroke (/). |
| 35 | 4801 | The rate factor digit applicable to the call. |
| 36 | Direct ground combination for making a stroke (/) | A stroke (/). |
| 37 | Special service relay R3480 | Class of service of calling subscriber substation; of operated printer prints the digit "1" indicative of a flat rate; if not operated printer prints the digit "2" indicative of an extended rate. |
| 38 | Direct ground combination for making a stroke (/) | A stroke (/). |
| 39 | S4636 | The digit identifying the register translator 1700 utilized. |
| 40 | Direct ground combination for making a stroke (/) | A stroke (/). |
| 41 | S4637 | The digits identifying the toll ticket repeater 800 utilized. |
| 42 | S4638 | |
| 43 | Direct ground combination for making a stroke (/) | A stroke (/). |
| 44 | 4701 | The digit identifying the printer controller 4200 utilized (permanently wired at the block B4740). |
| 45 | Direct ground combination for making a shift | The printer 5140 operates to space and to shift the record sheet, whereby the next line thereon may be printed. |

S4636 to S4638, inclusive; and, finally, the WXYZ conductors in the group of WXYZ marking leads 4701. Accordingly the marking relays WB, XB, YB and ZB are operated in accordance with the code marked in the particular group of WXYZ marking leads. Also the wipers of the switch R4810 successively engage the contacts in the associated contact banks which are connected directly to ground potential, thereby to cause the marking relays, WB, XB, YB and ZB to operate in accordance with the particular grounded contacts engaged by the wipers. The various combinations of operations of the marking relays WB, XB, YB and ZB complete paths between the mark conductor C4661 and the ten marking conductors, the stroke conductor C5123, the dash conductor C5124, and the shift conductor C5123 in the group of marking leads 5121 extending to the record printer 5140.

Further, it is noted that when there is no code digit registered in a given group of WXYZ marking leads selected by the wipers of the switch R4810, no ground potential appears upon the associated WXYZ marking conductors and the marking relays WB, XB, YB and ZB More particularly, in the present example the printer controller 4200 operates in order to cause the record printer 5140 to operate and print the various items of record information on the associated record sheet as follows:

11—29/11—33/844—0099/273—1234/ 4/1/1/6/01/2

*Release of the printer controller*

As previously noted, after the ticket printer control switch P4510 has controlled the toll ticket printer 5130 in the manner previously explained, the wipers thereof are automatically driven in the counterclockwise direction back to their home contact positions, whereby the wipers of the storage register switch S4220 are driven an additional step in the clockwise direction to disengage the twenty-fourth contacts in their associated contact banks. When the latter operation occurs the ticket printer control switch P4510 is completely released. When the grounded wiper 4222 of the storage register switch S4220 disengages the twenty-fourth contact in its associated contact bank, the previously traced holding circuit for energizing the lower winding of the hold relay R4350 and the multiple circuit for energizing the pulse relay R4460 is interrupted, thereby to cause the hold relay R4350 to restore and to arrest further operation of the pulse relay R4460. Upon restoring, the hold relay R4350,at its contacts 4353, interrupts the previously traced holding circuit for energizing the lower winding of the busy relay R4320, whereupon the latter relay restores. Upon restoring the busy relay R4320, at its contacts 4324, interrupts the previously mentioned circuit for energizing the winding of the busy slave relay R4330, thereby to cause the latter relay to restore. The busy slave relay R4330, upon restoring, at its contacts 4338 interrupts the previously mentioned holding circuits for energizing the windings of the computation stop relay R4370, the special service relay R4380, and the two digit code relay R4390, in the event any one of the relays mentioned occupies its operated position, in order to cause the relays mentioned to restore. Also, the busy slave relay R4330, at its contacts 4335, interrupts the previously mentioned path for applying ground potential to the hold conductor C4339, thereby to cause the various operated WXYZ relays in the code storage devices S4621 to S4638, inclusive, to restore.

Further, the busy relay R4320, at its contacts 4325, interrupts the previously traced holding circuit for energizing the winding of the control relay R4710, thereby to cause the latter relay to restore. Further, the busy slave relay R4330, at its contacts 4331, interrupts the previously traced circuit for energizing the test relay R4430 in the printer controller 4200 in series with the test relay R5030 in the printer link 5000, thereby to cause the relays mentioned to restore. Further, the busy slave relay R4330, at its contacts 4334, completes a circuit including the wiper 4731 of the calculator setting switch M4730 and the engaged contact in its associated contact bank, and the contacts 4737, for energizing the winding of the release relay R4360 in series with the magnet MM4736. When this series circuit is completed the release relay R4360 operates to complete, at its contacts 4362, a path including the contacts 4321 for applying direct ground potential to the test conductor C4671 extending to the finder F4640, thereby to mark the printer controller 4200 as busy to the printer controller allotter 4600. Also the magnet MM4736 operates intermittently under control of the self-interrupting contacts 4737, thereby to drive the wipers of the calculator setting switch M4730 step by step in the clockwise direction back into engagement with their home contact positions.

When the calculator setting switch M4730 is thus released the wiper 4731 disengages the twenty-fourth contact in its associated contact bank, thereby to interrupt the above-mentioned circuit for energizing the magnet MM4736 and to complete, when its home contact is engaged, a circuit including the conductor C4472, the wiper 4822 of the calculator selector switch T4820 and the engaged contact in its associated contact bank, and the contacts 4830 for energizing the winding of the release relay R4360 in series with the magnet TM4829. When thus energized the magnet TM4829 operates intermittently, thereby to drive the wipers of the calculator selector switch T4820 step by step in the counterclockwise direction back into engagement with their home contact positions.

Figure 45:
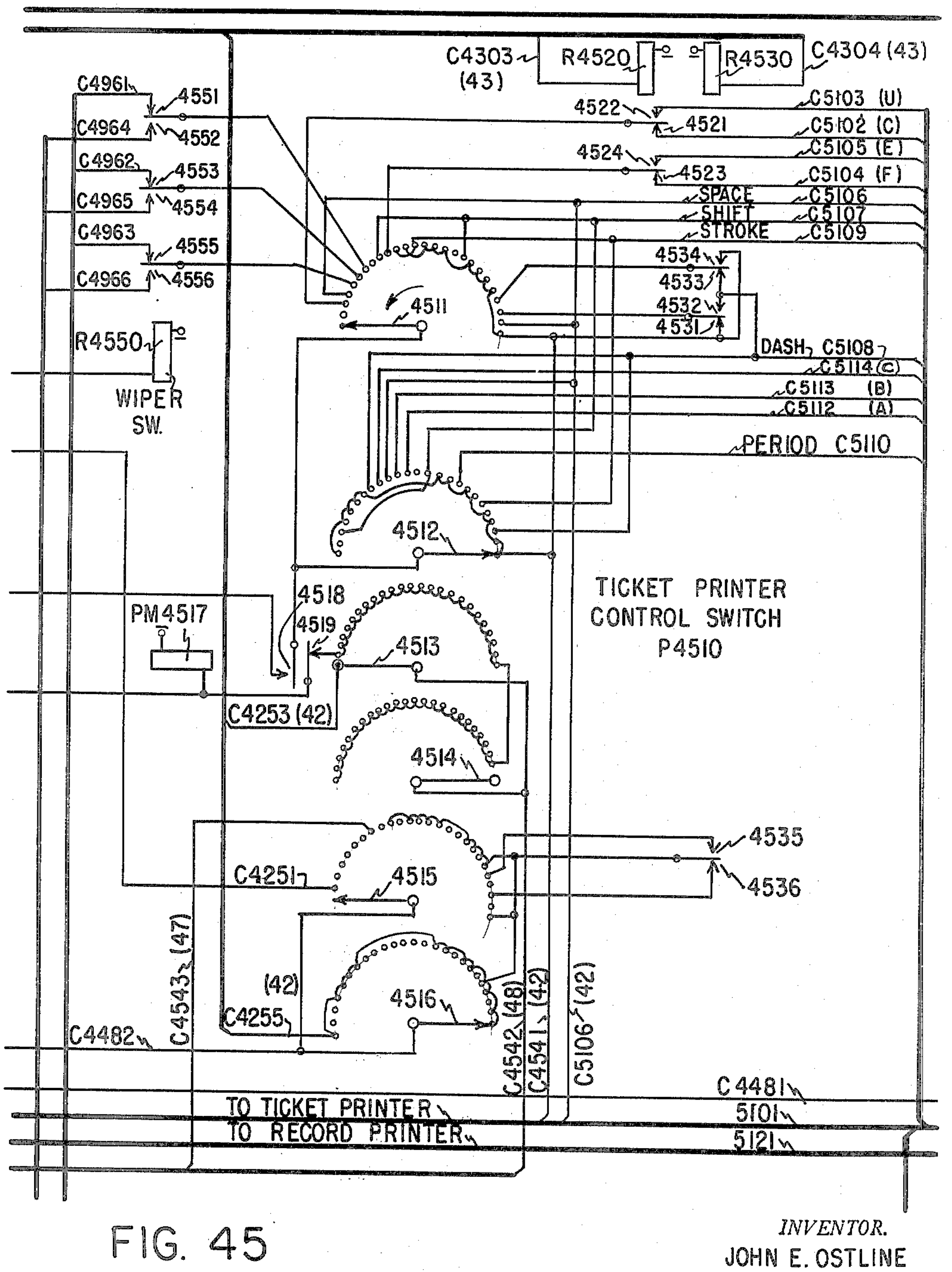

When the calculator selector switch T4820 is thus released the wiper 4822 disengages the eleventh or the twenty-fourth contact in its associated contact bank, thereby to interrupt the previously traced circuit for energizing the winding of the release relay R4360 in series with the magnet TM4829, and to complete a circuit when the home or twelfth contact in its associated contact bank is engaged, including the conductor C4542 extending to Fig. 45, the wiper 4513 or 4514 of the ticket printer control switch P4510 and the engaged contact in the respectively associated contact banks, and the contacts 4519 for energizing the magnet PM4517 in series with the release relay R4360. The above-traced circuit for energizing the magnet PM4517 in series with the release relay R4360 is completed in the event that the wiper 4513 does not engage its home contact position, for a purpose to be described hereinafter. Also when the calculator selector switch T4820 is thus released, the wiper 4821 thereof disengages the contact in its associated contact position included in the previously traced circuit for energizing the winding of the wiper switching relay R4550, thereby to cause the latter relay to restore in the event it has been operated.

When the above-traced circuit for the magnet PM4517 is completed, it operates intermittently under control of the self-interrupting contacts 4519, thereby to drive the wipers of the ticket printer control switch P4510 step by step in the counterclockwise direction back into engagement with their home contact positions.

When the printer ticket control switch P4510 is thus released the wiper 4513 thereof disengages the forty-ninth contact and engages the home contact in its associated contact bank, thereby to interrupt the previously traced circuit for energizing the magnet PM4517 and to complete a circuit, including the conductor C4253 extending to Fig. 42, the wiper 4221 of the storage register switch S4220 and the engaged contact in its associated contact bank, and the contacts 4228 for energizing the magnet SM4227 in series with the release relay R4260. This circuit, however, is only completed in the event that the wipers of the storage register switch S4220 have not been restored into engagement with their home contact positions. Thus the magnet SM4227 operates intermittently under control of the self-interrupting contacts 4228, thereby to drive the wipers of the storage register switch S4220 step by step in the clockwise direction back into engagement with their home contact positions.

Figure 48:
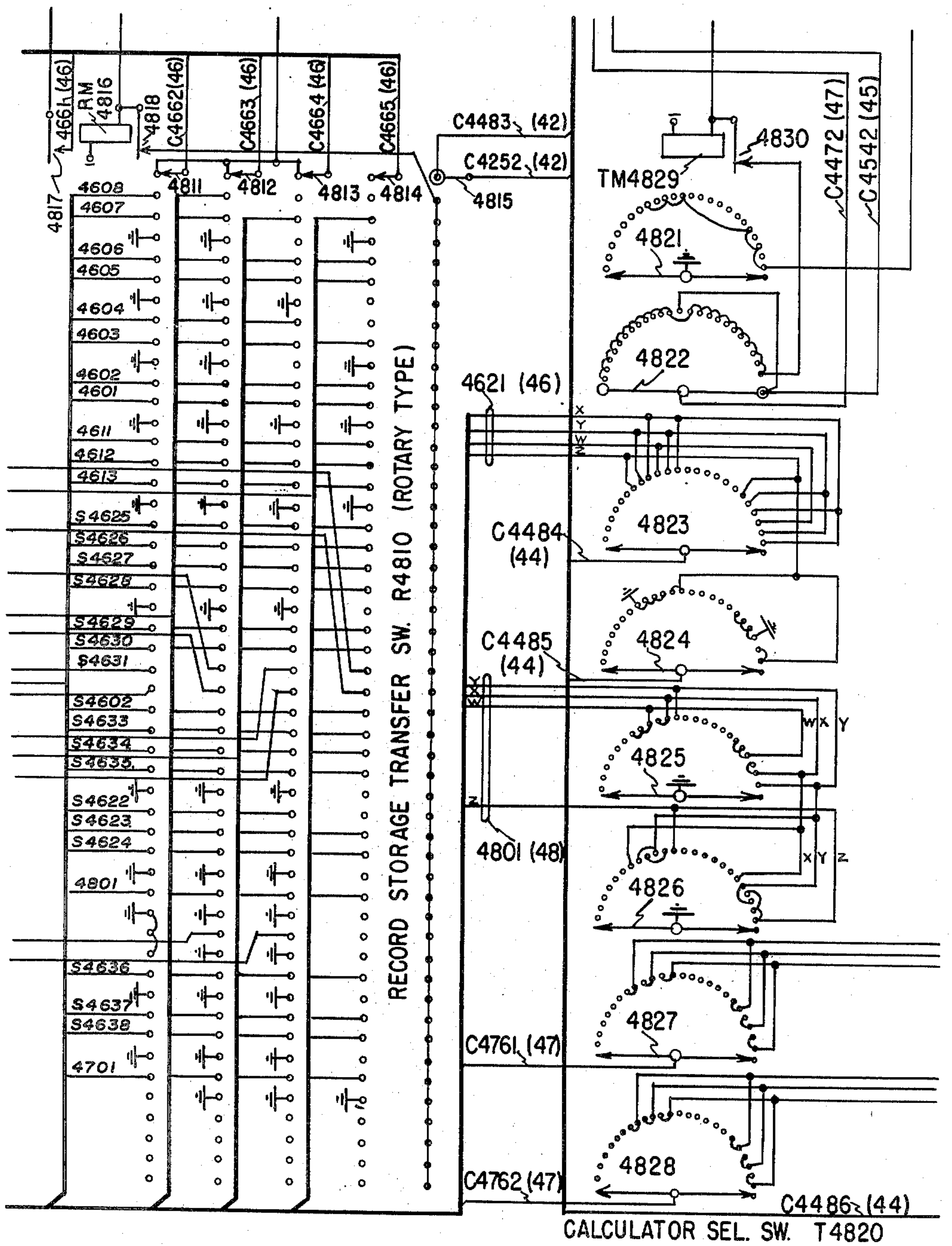
Figure 49:
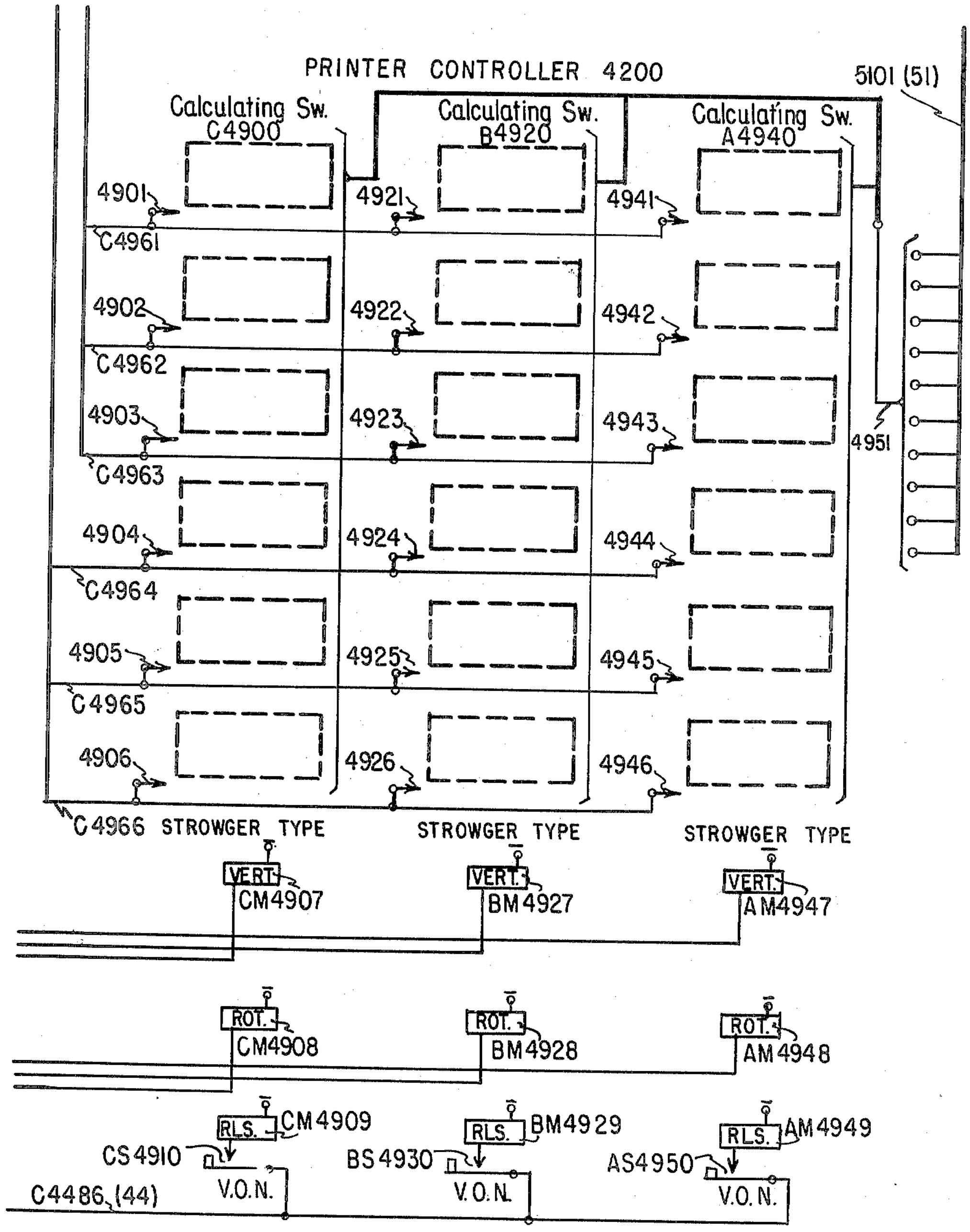

When the storage register switch S4220 is thus released the wiper 4221 thereof disengages the twenty-fourth contact and engages the home contact in its associated contact bank, thereby to interrupt the previously traced circuit for energizing the winding of the magnet SM4227 and to complete a circuit, including the conductor C4252 extending to Fig. 48, the wiper 4815 of the record storage transfer switch R4810 and the engaged contact in its associated contact bank, and the contacts 4818, for energizing the magnet RM4816 in series with the release relay R4360. The magnet RM4816 operates intermittently, under control of the self-interrupting contacts 4818, thereby to drive the wipers of the record storage transfer switch R4810 step by step downwardly, as illustrated, back into engagement with their home contact positions.

When the record storage transfer switch R4810 is thus released the wiper 4815 thereof disengages the forty-ninth contact and engages the home contact in its associated contact bank, thereby to interrupt the previously traced circuit for energizing the magnet RM4816 and to complete a circuit including the conductor C4483 extending to Fig. 42, the wiper 4231 of the ticket storage transfer switch C4230 and the engaged contact in its associated contact bank, and the contacts 4238, for energizing the magnet CM4237 in series with the release relay R4360. The magnet CM4237 operates intermittently, under control of the self-interrupting contacts 4238, thereby to drive the wipers of the ticket storage transfer switch C4230 step by step in the counterclockwise direction back into engagement with their home contact positions. When the ticket storage transfer switch C4230 is thus released the wiper 4231 disengages the twenty-fourth contact in its associated contact bank, thereby to interrupt the previously traced circuit for energizing the winding of the release relay R4360 in series with the magnet CM4237.

Also, as a result of the restoration of the busy slave relay R4330, in the manner previously described, at its contacts 4333, a circuit, including the conductor C4486 extending to Fig. 48 and the vertical off-normal springs AS4950, is completed for energizing the winding of the release relay R4360 in series with the release magnet AM4949. When thus energized the release magnet AM4949 operates to release the wipers of the calculating switch A4940 whereupon they are returned to their normal rotary and vertical positions. When the wipers of the calculating switch A4940 are thus released the vertical off-normal springs AS4950 are actuated, thereby to interrupt the previously traced circuit for energizing the winding of the release relay R4360 in series with the release magnet AM4949.

When the ticket storage transfer switch C4230 and the operated calculating switch A4940 are thus finally released, the previously traced circuits for energizing the winding of the release relay R4360 are interrupted, thereby to cause the latter relay to restore shortly thereafter since it is of the slow-to-release type. Upon restoring, the release relay R4360, at its contacts 4362, interrupts the previously traced path for applying direct ground potential to the test conductor C4671 extending to the finder F4640, thereby to remove the busy marking condition and to indicate to the printer controller allotter 4600 that the printer controller 4200 is idle. Also the release relay R4360, at its contacts 4361, completes the previously traced path for applying ground potential to the conductor C4672 extending to the finder F4640, thereby to indicate to the printer controller allotter 4600 that an idle printer controller is available in the associated group of printer controllers. At this time the printer controller 4200 is completely released and available for further use.

Also it is noted that the printer controller 4200 may be rendered busy by operating the busy key K4375, thereby to interrupt, at the contacts 4377, the previously traced circuit for applying ground potential to the conductor C4672 extending to the finder F4640, and to complete at the contacts 4376 a path for applying direct ground potential to the test conductor C4671 extending to the finder F4640. Thus if the exchange attendant desires to remove the printer controller 4200 from service, the busy key K4375 is actuated whereby the printer controller 4200 is marked as busy to the printer controller allotter 4600.

*Further operation of the printer link*

As previously explained, when the printer controller 4200, selected by the finder F5010, is released, the previously traced circuit for energizing the winding of the test relay R5030 in the printer link 5000 is interrupted in order to cause the latter relay to restore. Upon restoring, the test relay R5030, at its contacts 5032, completes a circuit including the contacts 5073 for energizing the winding of the release relay R5080, thereby to cause the latter relay to operate. Upon operating the release relay R5080, at its contacts 5081, interrupts a further point in the previously traced circuit for energizing the magnet FM5012 of the finder F5010 and, at its contacts 5082, completes a circuit, traced hereinafter, for energizing the winding of the magnet SM5024 of the control switch S5020. Also the release relay R5080, at its contacts 5084, completes a path for connecting the condenser 5035 in multiple with the condenser 5034 across the upper and lower windings of the pulse relay R5060, and at its contacts 5083 it completes a circuit, including the contacts 5062, for energizing the upper and lower windings of the pulse relay R5060 in multiple. When thus energized the pulse relay R5060 operates to interrupt, at its contacts 5062, its initial energizing circuit, whereby the upper and lower windings thereof are short-circuited in series through the multiple connected condensers 5034 and 5035 in order to cause the relay to restore shortly thereafter. Accordingly, the pulse relay R5060 operates and restores intermittently at a predetermined rate in accordance with the joint characteristics of the multiple connected condensers 5034 and 5035.

Each time the pulse relay R5060 operates and restores it completes and then interrupts, at its contacts 5061, a circuit including the contacts 5032 and 5082 for energizing the magnet SM5024, thereby to cause the latter magnet to operate and restore, whereby the wipers of the control switch S5020 are driven an additional step in the clockwise direction. Also, each time the pulse relay R5060 operates and restores it completes and then interrupts, at its contacts 5063, a circuit including the contacts 5044 for applying ground potential to the wiper 5023 of the control switch S5020.

The wipers of the control switch S5020 are driven step by step in the clockwise direction. Attention is directed to the fact that when the printer link 5000 initially operated to seize the printer controller 4200 the test relay R5030 was operated, whereupon a circuit was completed at its contacts 5033 for operating the hold relay R5070. The hold relay R5070, upon operating, at its contacts 5072 completed a self-interrupting circuit for the magnet SM5024, whereby the wipers of the control switch S5020 were advanced one step into engagement with the first contacts in their associated contact banks. When the wiper 5022 disengaged the home contact in its associated contact bank, the above-mentioned circuit for energizing the magnet SM5024 was interrupted, and when the wiper 5022 engaged the first contact in its associated contact bank, a holding circuit was completed for maintaining the hold relay R5070 in its operated position. Accordingly, when the wiper 5023 of the control switch S5020 is in engagement with the first, second, third, fourth and fifth contacts in its associated contact bank, ground potential is applied to the shift conductor C5107 extending to the toll ticket printer 5130 each time the pulse relay R5060 operates. Accordingly, the toll ticket printer 5130 operates to space and to shift, and then space four additional times the toll ticket.

The carriage of the toll ticket printer 5130 occupies its right-hand marginal stop position as viewed from the front of the machine, due to the first operation of the shift magnet, while the printing on the ribbon of paper stock from the paper roll carried by the machine is disposed entirely within the paper chute of the machine due to the five additional operations of the shift magnet, as previously mentioned. For a more detailed explanation of the toll ticket printer 5130 reference should be made to the above-mentioned Ostline Patent No. 2,360,789, granted October 17, 1944.

The grounded wiper 5023 of the control switch S5020 engages and then disengages the sixth contact in its associated contact bank, whereby ground potential is applied to the tab cut conductor C5093 extending to the toll ticket printer 5130 in order to cause the tabulating magnet therein to operate. Upon operating the tabulating magnet actuates a tabulating mechanism in the printer 5130, whereby a knife support carried by the carriage is secured against movement with respect to the carriage as the carriage of the machine is moved from its right-hand marginal stop position to its left-hand marginal stop position, whereby the relative movement between the carriage and the knife support of the paper cutting mechanism effects the cutting off of the end of the ribbon of paper stock from the supply roll upon which the printing occurs. The toll ticket thus produced slides down the paper chute of the machine due to the action of gravity and is received in a suitable receptacle disposed below the end of the paper chute. For a more detailed explanation of the foregoing operations of the toll ticket machine, reference is again made to the Ostline Patent No. 2,360,789.

The grounded wiper 5023 of the control switch S5020 then engages the seventh contact in its associated contact bank, but since this contact is not connected no action takes place at this time in the printer link 5000 or the toll ticket printer 5130. The grounded wiper 5023 then engages and disengages the eighth contact in its associated contact bank, thereby to complete and then interrupt a circuit for operating the toll ticket register R5065. The toll ticket register R5065 operates to register the fact that a toll ticket has been issued by the toll ticket printer 5130.

The grounded wiper 5023 then engages the ninth contact in its associated contact bank, whereby ground potential is again applied to the shift conductor C5107 extending to the toll ticket printer 5130 in order to cause the shift magnet therein to operate, whereby the end of the ribbon of paper stock from the supply roll of the machine is spaced one more space and the carriage of the machine is returned from its left-hand marginal stop position to its right-hand marginal stop position, as viewed from the front of the machine, whereupon the toll ticket printer 5130 is placed in readiness to print the first line of the next toll ticket.

The grounded wiper 5023 then engages and disengages the tenth contact in its associated contact bank, thereby to complete and then interrupt a circuit for energizing the magnet FM5012 of the finder F5010, in order to cause the latter magnet to operate and restore and thus drive the wiper 5011 an additional step in the clockwise direction and thus disengage the contact in its associated contact bank terminating the test conductor C4301 extending to the printer controller 4200. Also when the wiper 5022 of the control switch S5020 disengages the tenth contact and engages the eleventh contact in its associated contact bank, the previously traced holding circuit for energizing the hold relay R5070 is interrupted, thereby to cause the latter relay to restore. Upon restoring the hold relay R5070, at its contacts 5073, interrupts the previously traced circuit for energizing the winding of the release relay R5080, thereby to cause the latter relay to restore. Upon restoring, the release relay R5080, at its contacts 5083, interrupts the previously traced circuit for controlling the intermittent operation of the pulse relay R5060, thereby positively to arrest further operation of the latter relay at this time. Further, the hold relay R5070, at its contacts 5071, completes a circuit including the wiper 5021 and the engaged grounded eleventh contact in its associated contact bank, and the contacts 5025, for energizing the magnet SM5024, whereby the latter magnet operates and restores, under control of the self-interrupting contacts 5025, in order to drive the wipers of the control switch S5020 an additional step in the clockwise direction into engagement with the twelve contacts in the associated contact banks. When the wiper 5021 disengages the eleventh contact and engages the twelfth contact in its associated contact bank, the above-traced circuit for energizing the magnet SM5024 is interrupted, thereby positively to arrest further operation of the control switch S5020 at this time. Also when the wiper 5021 engages the twelfth contact in its associated contact bank a path is completed for applying battery potential, by way of the magnet SM5024, the contacts 5025 and 5071, and the winding of the start relay R5040, to the start conductor C4302 extending to the associated group of printer controllers. At this point it is noted that the control switch S5020 has in effect two home positions which are occupied when the wipers thereof engage either the home contact or the twelfth contact positions in the associated contact banks.

Further, upon restoring the hold relay R5070, at its contacts 5074, interrupts the previously traced holding circuit for energizing the winding of the toll ticket test relay R5090 in series with the toll ticket relay R5050 and the magnet M5132 of the toll ticket printer 5130, whereby the relays mentioned restore. Further, the hold relay R5070, at its contacts 5074, interrupts the previously traced circuit for energizing the winding of the record relay R5055, thereby to cause the latter relay to restore. When the toll ticket relay R5050 restores, at its contacts 5051 it interrupts the previously traced circuit for operating the motor 5131 of the toll ticket printer 5130 and, at its contacts 5052 it prepares the previously mentioned circuit for operating the toll ticket alarm A5098. At this point it is noted that in the event the carriage of the toll ticket printer 5130 has not been returned completely to its right-hand marginal stop position, or in the event there is an inadequate supply of paper stock upon the paper roll carried by the printer, the paper engaging rod 5136 does not engage the contacts of the set of switch springs S5133. Consequently when the magnet M5132 restores the contacts 5134 are disengaged and the contacts 5135 are engaged to complete a circuit including the conductor C5153 and the contacts 5052 for operating the toll ticket alarm A5098. The operation of the toll ticket alarm A5098 indicates to the exchange attendant or the supervisory operator either that the carriage of the toll ticket printer 5130 has failed to return completely to its right-hand marginal stop position or that there is an inadequate supply of paper stock upon the supply roll carried by the machine. However, if neither of the above-mentioned two conditions exists, a circuit is not completed for the toll ticket alarm A5098 and, at the contacts 5134, a circuit is prepared for subsequently operating in series the toll ticket test relay R5090, the toll ticket relay R5050, and the magnet M5132 when a printer link 5000 is again selected for use.

When the record relay R5055 restores, at its contact 5057 it interrupts the previously traced circuit for operating the motor 5141 of the record printer 5140 and, at its contacts 5056, it prepares the previously mentioned circuit for operating the record alarm A5099. At this point it is noted that in the event the carriage of the record printer 5140 fails to return to its right-hand marginal stop position at the conclusion of the last printing operation, the set of off-normal alarm springs S5142 thereof is actuated thereby to complete the circuit for operating the record alarm A5099 to indicate to the exchange attendant or the supervisory operator that the carriage of the record printer 5140 has failed to restore to its normal position upon the conclusion of the last record printing operation.

Finally, it is noted that in the event of power failure of the 110 volt A. C. source, the power alarm relay R5095 restores and, at its contacts 5096, completes an obvious circuit for operating the power alarm A5097 in order to indicate the condition mentioned to the exchange attendant. At this time the printer link 5000 is completely released and is in readiness to be used in conjunction with any calling one of the printer controllers 4200 etc. in the associated group.

*Operation of the record printer in the event of failure of the toll ticket printer*

As previously pointed out, in the event the carriage of the toll ticket printer 5130 fails to restore to its right-hand marginal stop position at the conclusion of the last printing operation thereof, or in the event there is inadequate paper stock on the supply roll carried thereby, the paper engaging rod 5136 is not engaged and the set of switch springs S5133 is actuated. In this event when the finder F5010 operates to seize the calling printer controller 4200 the start relay R5040 operates as previously explained. In this event the previously traced circuit for energizing the toll ticket test relay R5090 in series with the winding of the toll ticket relay R5050 and the magnet M5132 of the toll ticket printer 5130 is not completed, since the circuit therefore is opened at the contacts 5134 and the relays mentioned remain in their restored positions. The toll ticket relay R5050 does not initiate the operation of the motor 5131 and the toll ticket test relay R5090 prepares, at its contacts 5092, the previously traced path for applying ground potential to the conductor C4481 commonly extending to the printer controllers in the associated group. Subsequently when the finder F5010 selects the calling printer controller 4200, the test relay R5030 operates and causes the operation of the hold relay R5070. The hold relay R5070, at its contacts 5076, applies ground potential to the conductor C4481 extending to the printer controller 4200 and thus completes a multiple circuit including the contacts 4432, the respective wipers 4811, 4812 and 4813 of the record storage transfer switch R4810 and the engaged home contacts in the associated contact banks, and the respective conductors C4662, C4663, C4664 for respectively energizing the windings of the marking relays WB, XB and YB, whereby the relays mentioned operate. Upon operating the marking relays mentioned, at the contacts WB1, XB1 and YB1, complete a connection between the marking conductor C4661 and the stroke conductor C5125 extending to the record printer 5140.

When the magnet RM4816 of the record storage transfer switch R4810 first operates while the wipers thereof engage the home contacts in their associated contact banks, a circuit is completed at the contacts 4817 for applying ground potential to the mark conductor C4661, whereupon ground potential is applied to the stroke conductor C5125 and causes the record printer 5140 to operate and print a stroke (/) at the beginning of the line of the information to be subsequently printed on the associated record sheet.

More particularly, in the present example the printer controller 4200 operates in order to cause the record printer 5140 to print the various items of record information on the associated record sheet as follows:

/11—29/11—33/844—0099/273—1234/ 4/1/1/6/01/2

It will be observed that this line of printed information on the record sheet is identical to that printed in the line on the record sheet hereinbefore described, except that the stroke (/) precedes the printing on the record sheet in order to indicate that the toll ticket printer 5130 failed to operate in order to produce a toll ticket individual to the present call in conjunction with the printing of the information on the record sheet.

Subsequently when the record sheet is received in the Billing Department the appearance of the stroke (/) at the beginning of a line of printing thereon indicates that no toll ticket was produced by the toll ticket printer 5130 for the call corresponding to the line mentioned, whereupon the clerk makes a toll ticket for this call by the ordinary typing method.

The remainder of the operations of the printer controller 4200 and the printer link 5000, in conjunction with the call mentioned as well as the ultimate release thereof, are the same as those previously described.

*Toll calls from exchange 4 zone 84 to the exchange in zone 62*

Assuming that the call extending from the calling private subscriber substation TP to the primary selector 600 and the primary register 1200 is to be extended to a called subscriber substation in the exchange in zone 62, the subscriber at the substation TP proceeds to dial the directory number of the desired called subscriber substation. The directory number of the called subscriber substation, in the present example, comprises a code portion including the digits 62 identifying the called zone and exchange, and a numerical portion including four digits, such, for example, as the digits 1234 identifying the line terminal of a subscriber line extending to the desired called subscriber substation.

Accordingly the subscriber at substation TP proceeds to dial the first digit "6," thereby to cause the last-mentioned digit to be registered in the first code switch A1500 in the primary register 1200 in the manner previously explained. The wipers of the switch mechanism 700 in the primary selector 600 are operated to the sixth level in accordance with the first digit "6" and are then released at the conclusion of the last-mentioned digit in the manner previously explained. The wiper 1503 of the first code switch A1500 engages the sixth contact in its associated contact bank, whereby the previously traced circuit for energizing the winding of the translate relay R1270 is completed incident to the restoration of the dial slave relay R1310 shortly following the conclusion of the first digit "6," in the manner previously explained.

The calling subscriber at substation TP then proceeds to dial the second digit "2," thereby to cause the last-mentioned digit to be registered in the second code switch B1510. At the conclusion of the second digit "2" the wiper 1634 of the sequence switch S1630 is driven into engagement with the second contact in its associated contact bank, whereupon the previously traced circuit for energizing the winding of the start relay R1600 in the register translator allotter 1600 is completed in order to cause the register translator allotter 1600 to assign an idle register translator, such, for example, as the register translator 1700. When the register translator 1700 is thus assigned the finder F2290 operates to connect it to the primary register 1200. At this time the pulse relay R1460 operates to transmit the complement "5" of the first digit "6" to the register translator 1700, whereby the first digit "6" is effectively registered in the first code switch A2400 in the register translator 1700. Also, the pulse relay R1460 effects operation of the party switch N2620 in the register translator 1700 in accordance with the operated or restored positions of the party relays R1210, R1220 and R1230 in the primary register 1200, whereby there is registered in the party switch N2620 the position of the calling subscriber substation on the associated subscriber line in the event the calling subscriber substation is of the party type, as previously noted and as explained more fully hereinafter.

The calling subscriber at substation TP then proceeds to dial the third digit "1" and the fourth digit "2," which digits are respectively registered in the third code switch C1520 and the first numerical switch D1620 in the primary register 1200, whereby the pulse relay R1450 operates in order to transmit the respective complements "9," "0" and "9" of the second digit "2," the third digit "1," and the fourth digit "2," to the register translator 1700, which last-mentioned digits are respectively registered in the second code switch B2410, the third code switch C2500, and the first numerical switch D2510 in the register translator 1700, all in the manner previously explained.

The calling subscriber at substation TP then proceeds to dial the fifth digit "3" and the sixth digit "4," which digits are repeated directly by the auxiliary line relay R1420 in the primary register 1200 to the register translator 1700, and are respectively registered in the second numerical switch E2520 and the third numerical switch F2600.

Accordingly, at this time the first digit "6," the second digit "2," and the third digit "1" are respectively registered in the first code switch A2400, the second code switch B2410, and the third code switch C2500. The wiper 2405 of the first code switch A2400 engages the fifth contact in its associated contact bank, thereby to select the wiper 2336 of the composite code switch P2330, and the wipers of the composite code switch P2330 engage the tenth contact in the ninth level in the associated contact banks, in the manner previously explained. Also, at the conclusion of the registration of the third digit "1" in the third code switch C2500, the sequence relay R2720 operates in order to initiate the operation of the switch pulse relay R1830.

At this point it is noted that the first digit "6" and the second digit "2" respectively registered in the first code switch A2400 and the second code switch B2410 comprise the code portion of the directory number of the called subscriber substation in the exchange in zone 62, while the third digit "1" registered in the third code switch C2500 comprises the first digit of the numerical portion of the directory number of the called subscriber substation in the exchange in zone 62 rather than the third digit of the code portion of the directory number of a called subscriber substation, as explained hereinbefore. This situation is presented due to the fact that the code portion of the directory number of the called subscriber in the exchange in zone 62 comprises two digits instead of three digits. Thus it will be understood that the routing of the call as determined by the composite code switch P2330 from exchange 4 zone 84 to the exchange in zone 62 must, in fact, be determined by the first code digit "6," the second code digit "2" and the first numerical digit "1." More particularly, the tenth contact in the ninth level engaged by the wiper 2336 of the composite code switch P2330 is connected by way of the jumper 2351*b* to the ninth contact in the tenth level in the contact bank associated with the wiper 2318 of the rate and route switch R2310. Thus it will be understood that the operation of the switch pulse relay R1830 is effective to cause the wiper set of the rate and route switch R2310 to be operated to its ninth contact in the tenth level of the associated contact banks when the wiper 2336 of the composite code switch P2330 engages the tenth contact in the ninth level in its associated contact bank. Accordingly at this time the operating switch pulse relay R1830 causes the wiper set of the rate and route switch R2310 to be operated to its ninth contact in the tenth level of the associated contact banks, thereby to select the routing of the present call from exchange 4 zone 84 to the exchange in zone 62 via the toll tandem exchange, which routing requires the four routing digits "2," "1," "6" and "2."

Considering now the jumper arrangement among the contacts in the contact banks of the rate and route switch R2310, it is noted that the ninth contacts in the tenth level of the contact banks respectively associated with the wipers 2312, 2313, 2314, and 2315 are respectively connected by the jumpers 2388*b*, 2388*c*, 2388*d* and 2388*e* to the respective second, first, sixth and second marking conductors in the marking cable 2385. Also the ninth contacts in the tenth level in the contact bank associated with the wiper 2311 is jumpered by way of the jumper 2388*a* to the conductor C2388, thereby to prepare a circuit, traced hereinafter, for energizing the code send relay R1750. It is noted at this time that the code send relay R1750 is arranged to cause the last four of the six digits dialed by the calling subscriber, and registered in the third code switch C2500, the first numerical switch D2510, the second numerical switch E2520 and the third numerical switch F2600, to be re-sent without translation in order to control the setting up of the connection after the above-mentioned four routing digits "2," "1," "6" and "2" have been transmitted. Also the ninth contact in the tenth level of the contact bank associated with the wiper 2316 of the rate and route switch R2310 is connected by the jumper 2388*f* to the skip conductor C2382. Finally, the ninth contact in the tenth level of the contact bank associated with the wiper 2317 is connected by the jumper 2388*g* to the conductor C2397*c* in order to complete a circuit for the rate relay R1760', thereby to mark the X conductor in the associated WXYZ marking leads 2812 in accordance with the complementary rate digit "8" which is ultimately translated into the rate factor digit "3."

The operation of the rate and route switch R2310 described above, in response to the operation of the composite code switch P2330, takes place in an extremely short interval of time at the conclusion of the registration of the third digit "1," that is the first numerical digit of the called subscriber number, in the third code switch C2500. At this time the stop relay R1940 operates in order to effect operation of the switch cutoff relay R1820 and the consequent operation of the digit pulse start relay R1710. Upon operating the digit pulse start relay R1710 completes, at its contacts 1716, a circuit extending from ground by way of the conductor C1777, the wiper 2304 of the digit sequence switch T2300 and the home contact in its associated contact bank, the wiper 2311 of the rate and route switch R2310 and the engaged ninth contact in the tenth level of its associated contact bank, the jumper 2388*a*, and the conductor C2388, for energizing the code send relay R1750. The code send relay R1750 now operates and completes a locking circuit, at its contacts 1752, including ground potential at the contacts 1719 and, at its contacts 1754, it interrupts the previously traced connection between the conductor C1780 and the skip conductor C2382, for a purpose more fully explained hereinafter. Further, the code send relay R1750 completes, at its contacts 1753, a connection between the conductor C1779 and the skip conductor C2382 and, at its contacts 1751, completes the previously traced circuit for energizing the magnet TM2305 thereby to cause the latter magnet to operate and restore, whereby the wipers of the digit sequence switch T2300 are driven one step in the clockwise direction to disengage the home contacts and to engage the first contacts in the associated contact banks. Also the code send relay R1750, at its contact 1755, completes a path for applying ground potential to the Z conductor of the group of WXYZ marking leads 2815 extending to the storage transfer switch U2820. Finally, at its contacts 1756, the code send relay R1750 completes a circuit, including the conductor C1757 extending to Fig. 28, for energizing in series the right-hand and left-hand windings of the sequence relay R2760. In this connection it is noted that since the subscriber has dialed only six digits the sequence relay R2750 is in its operated position but the sequence relay R2760 was not operated since the seventh and final digit was not required in the present call. This relay, however, is now operated as a result of the operation of the code send relay R1750 in order to permit continued operation of the storage transfer switch U2820, in the same manner as if seven digits had been dialed by the calling subscriber.

The wiper 2304 of the digit sequence switch T2300 successively engages the first, second, third and fourth contacts in its associated contact bank, which respectively terminate the conductors extending to the wipers 2312, 2313, 2314 and 2315 of the rate and route switch R2310, whereby the sender switch S2830 is successively operated and controlled by the above-mentioned wipers in order to cause the first, second, third and fourth routing digits "2," "1," "6," and "2" respectively to be transmitted to the primary selector 600, in the manner previously explained. The wiper 2304 of the digit sequence switch T2300 then engages the fifth contact in its associated contact bank, whereupon ground potential applied to the conductor C1777 is extended by way of the wiper 2316 of the rate and route switch R2310 and the engaged ninth contact in the tenth level of its associated contact bank, the jumper 2388*f*, the skip conductor C2382, the contacts 2306, and the winding of the magnet TM2305, whereby the latter magnet operates and advances the wipers of the digit sequence switch T2300 into engagement with the sixth contacts in the associated contact banks. The wiper 2303 of the digit sequence switch T2300 then successively engages the sixth and seventh contacts in its associated contact bank respectively terminating the conductors C1782 and C1781 which are connected by way of the previously traced paths to the skip conductor C2382, whereby the magnet TM2305 is operated and restored twice in rapid succession in order to cause the wipers of the digit sequence switch T2300 to be driven into engagement with the eighth contacts in the associated contact banks. When the wiper 2303 engages the eighth contact terminating the conductor C1780 the magnet TM2305 is not immediately operated and restored in view of the fact that the operated code send relay R1750 has interrupted, at its contacts 1754, the previously traced connection between the conductor C1780 and the skip conductor C2382.

At this time the wiper 2304 engages the eighth contact in its associated contact bank terminating the conductor C2379 extending to the wiper 2504 of the third code switch C2500, whereby the sender switch S2830 is controlled in order to send the third digit "1" registered in the third code switch C2500 to the primary selector 600, as previously explained. Thus it will be understood that the operated code send relay R1750 causes the register translator 700 to skip the first and second digits "6" and "2" registered in the first and second code switches A2400 and B2410, and to send the third digit "1," comprising the first numerical digit of the called subscriber number, registered in the third code switch C2500. The wiper 2304 then successively engages the ninth, tenth and eleventh contacts in its associated contact banks respectively, terminating the conductors C2378, C2377 and C2376 respectively extending to the wiper 2514 of the first numerical switch D2510, the wiper 2524 of the second numerical switch E2520, and the wiper 2604 of the third numerical switch F2600, whereby the sender switch S2830 is controlled in order to send the fourth digit "2," the fifth digit "3" and the sixth digit "4," respectively registered in the above-mentioned first, second and third numerical switches to the primary selector 600, in the manner previously explained.

The grounded wiper 2303 then engages the twelfth contact in its associated contact bank terminating the conductor C1779, whereby ground potential is connected by way of the contacts 1753 of the operated code send relay R1750 to the skip conductor C2382 in order to cause the magnet TM2305 to operate and restore immediately in order to drive the wipers of the digit sequence switch T2300 into engagement with the thirteenth contacts in the associated contact banks, as previously explained. Thus it will be understood that the operated code send relay R1750 causes the register translator 1700 to skip the fourth numerical switch G2610 in which there is no digit registered in the present example. When the wiper 2303 engages the thirteenth contact terminating the conductor C2372, the previously traced alternative circuit for energizing the code pulse relay R1850 is prepared, and this circuit is subsequently completed when the wiper 2826 of the storage transfer switch U2820 engages the fifty-sixth contact in its associated contact bank for the purpose previously explained.

At the conclusion of the transmission of the first routing digit "2" from the register translator 1700 the digit stop relay R1910 operates, thereby to effect operation of the special service cutoff relay R1810. Subsequently the digit stop relay R1910 restores, thereby to effect operation of the detector start relay R1760 in order to effect operation of the detector 2900, all in the manner previously explained. After the operation of the detector 2900 is completed the detector release relay R2240 operates in order to cause intermittent operation of the code pulse relay R1850 in order to operate the storage transfer switch U2820 and thus transmit the items of record information from the register translator 1700 to the toll ticket repeater which has been seized by the primary selector 600 at this time. After all the items of record information have been transmitted the register translator 1700 is released, in the manner previously explained.

For the purpose of illustration it is assumed that the primary selector 600 responds to the first routing digit "2" to seize the toll ticket repeater 800, and that the toll ticket repeater 800 repeats the second routing digit "1" over the trunk 5301 to the toll selector 5300 which, in turn, seizes the toll line 5625 extending to the toll tandem exchange. The toll first selector 5608 in the toll tandem exchange is thus selected and the toll ticket repeater then repeats the third routing digit "6" and the fourth routing digit "2," whereby the toll first selector 5608 seizes the toll second selector 5612, and the latter selector seizes an idle selector 5613 in the exchange in zone 62 by way of the trunk line 5624. Finally, the toll ticket repeater 800 operates to repeat the four numerical digits "1," "2," "3" and "4" thereby to cause the selector 5613, the selector 5614, and the connector 5615 to be operated in a well known manner to seize the line terminal terminating the subscriber line extending to the called subscriber substation in zone 62.

Referring to Fig. 53, it will be recalled that when the toll selector 5300 responded to the digit "2" in a previously described call the normal post springs S5321 were not actuated and, as a result thereof, a circuit including the normal post springs S5321, the conductors C5305 and C5306 and the resistor 947 was completed in multiple with the lower winding of the answer relay R945. Thus, whenever the toll selector 5300 is operated to extend a connection via the second level of its associated contact banks to a relatively short line, such as 5626, the normal post springs S5321 are not actuated and consequently a short circuit is provided to limit the current flow through the answer relay R945 and thereby prevent false operation thereof over comparatively short lines. However, when the toll selector 5300 responds to the digit "1" to select via the first level of its associated contact banks a comparatively long line, such as 5625, extending to the toll tandem exchange the normal post springs S5321 are actuated in order to interrupt the current limiting short circuit for the answer relay R945 whereby it may be accurately controlled over relatively long lines.

As previously noted, the storage transfer switch U2820 in the register translator 1700 operates to transmit the items of record information registered in the register translator 1700 to the various code storage devices S1121 to S1135, inclusive, in the toll ticket repeater 800 in the manner previously explained. At this point it is noted that the digit "0" stored in the group of WXYZ marking leads 2815 is transferred by the storage transfer switch U2820 from the register translator 1700 and stored in the code storage device S1135 in the toll ticket repeater 800 in order to indicate that the called office code is a two digit code instead of a three digit code.

It will now be assumed that the connection is established between the calling subscriber substation TP in exchange 4 zone 84 and the called subscriber substation in the exchange in zone 62, and that the established connection is maintained for two minutes and then released by the calling subscriber in the manner previously explained. In this event the toll ticket repeater 800 operates in order to cause the printer controller allotter 4600 to allot an idle printer controller, such, for example, as the printer controller 4200, whereupon the finder F4610 operates to find and connect with the calling toll ticket repeater 800. When the printer and controller 4200 is thus connected to the toll ticket repeater 800, the storage transfer switch S1110 in the toll ticket repeater 800 and the storage register switch S4220 in the printer controller 4200 operate, whereby the various items of record information stored in the toll ticket repeater 800 are transferred to the printer controller 4200 and stored in the various code storage devices S4621 to S4638, inclusive, etc. More particularly, in the present example, when the wiper 4223 of the storage register switch S4220 engages the second contact in its associated contact bank, a circuit is completed for energizing the winding of the two digit code relay R4390, in view of the fact that the digit "0" is stored in the corresponding code storage device S1135 in the toll ticket repeater 800, as previously explained. When thus energized the two digit code relay R4390 operates and, at its contacts 4392, completes a locking circuit for itself from ground at the contacts 4338. Also, at its contacts 4393, relay R4390 completes an obvious circuit for energizing the winding of the slip relay R4750, thereby to cause the latter relay to operate and, at its contacts 4391, it completes a circuit including the conductor C4304 extending to Fig. 45 for energizing the two digit code slave relay R4530, thereby to cause the latter relay to operate.

When the two digit code slave relay R4530 operates, it slips the markings between certain of the control conductors and certain of the contacts in the contact banks associated with the wipers 4511 and 4515 of the ticket printer control switch P4510. More particularly, the two digit code slave relay R4530, at its contacts 4531, interrupts the normally completed connection between the twenty-seventh contact in the contact bank associated with the wiper 4511 and the mark conductor C4541; it completes, at its contacts 4532, a connection between the twenty-seventh contact in the contact bank associated with the wiper 4511 and the dash conductor C5108; it interrupts, at its contacts 4533, the normally completed connection between the twenty-eighth contact in the contact bank associated with the wiper 4511 and the dash conductor C5108; it completes, at its contacts 4534, a connection between the twenty-eighth contact in the contact bank associated with the wiper 4511 and the mark conductor C4541; it interrupts, at its contacts 4536, the normally completed connection between the twenty-seventh contact in the contact bank associated with the wiper 4515 and the conductor C4255; and it completes, at its contacts 4535, a connection between the twenty-ninth contact in the contact bank associated with the wiper 4515 and the conductor C4255.

When the slip relay R4750 operates, it transfers the WXYZ marking conductors in the group of WXYZ marking leads, connected to the code storage device S4631, from the twenty-fourth contacts in the contact banks associated with the wipers 4811 to 4814, inclusive, of the record storage transfer switch R4810 to the twenty-fifth contacts therein, and simultaneously therewith transfers ground potential marking from the twenty-fifth contacts to the twenty-fourth contacts therein. More particularly, the slip relay R4750, at its contacts 4751′, 4756′, 4754′ and 4752, interrupts the normally completed connections between the WXYZ conductors, in the group of marking leads extending to the code storage device S4631, and the twenty-fourth contacts in the contact banks of the record storage transfer switch R4810; at its contact 4752′, 4757, 4755′ and 4753 it completes connections between the above-mentioned marking conductors and the twenty-fifth contacts in the contact banks of the record storage transfer switch R4810; it interrupts, at its contacts 4753′, 4758 and 4754, the normally completed paths for applying ground potential to the twenty-fifth contacts in the contact banks respectively associated with the wipers 4811, 4812, and 4814 of the record storage transfer switch R4810; and it completes, at its contacts 4759, 4755 and 4751, alternative paths for applying ground potential to the twenty-fourth contacts in the contact banks respectively associated with the wipers 4811, 4812 and 4814 of the record storage transfer switch R4810.

Assuming now that the finder F5010 has operated to select the calling printer controller 4200, whereby the link 5000 is operatively connected to the printer controller 4200, the ticket printer control switch P4510 then operates in conjunction with the ticket storage transfer switch C4230 to control the marking relays WA, XA, YA and ZA in order to govern the operation of the toll ticket printer 5130 to produce a toll ticket, all in the manner previously explained. In this connection it is pointed out that the operated two digit code slave relay R4530 governs the ticket printer control switch P4510, whereby the information appearing in the third line of the toll ticket is printed as follows:

62—1234

Accordingly the ticket printer control switch P4510 is so controlled that the dash (—) always immediately precedes the first numerical digit of the directory number of the called subscriber substation regardless of whether the code portion of the directory number of the called subscriber substation comprises three digits or two digits.

The record storage transfer switch R4810 then operates to control the marking relays WB, XB, YB and ZB in order to govern the operation of the record printer 5140, whereby the next line is printed on the record sheet, all in the manner previously explained. In this connection it is pointed out that the operated slip relay R4750 governs the record storage transfer switch R4810, whereby the information appearing in the next line on the record sheet is printed as follows:

11—29/11—33/844—0099/62—1234/ 2/3/1/6/01/2

Accordingly the record storage transfer switch R4810 is so controlled that the dash (—) always immediately precedes the first numerical digit in the numerical portion of the directory number of the called subscriber substation and so that the dash (—) always immediately succeeds the last digit in the code portion of the directory number of the called subscriber substation, regardless of whether the code portion of the directory number comprises two digits or three digits. Thus in the case of a two digit code the dash following the code portion of the directory number and the succeeding four digits of the numerical portion of the directory number are moved one space to the left in order to prevent a space from appearing on the ticket between the second code digit and the dash.

Attention is also directed to the fact that when the rate and route switch R2310 in the register translator 1700 operated during the present call, the rate relay R1760′ operated to mark the WXYZ marking leads 2812 in accordance with the digit "8," and this complementary digit "8" of the rate factor digit "3" was subsequently transferred and registered in the code storage device S4621 in the printed controller 4200. Subsequently the calculator selector switch R4820 advanced its wipers into engagement with the fourth contacts in their associated contact banks, at which time the wiper 4823 thereof engaged the X conductor in the group of WXYZ marking leads 4621 individually associated with the code storage device S4621, whereupon the X conductor, marked in accordance with the registered digit "8," terminated further operation of the calculator selector switch T4820. When the wipers 4827 and 4823 of the calculator selector switch T4820 are in engagement with the fourth contact in their associated contact banks, the calculating switch B4920 is operated in accordance with the elapsed time of the conversation, in the same manner as has been previously described in connection with the operation of the calculating switch A4940. Also the wipers 4825 and 4826 of the calculator selector switch T4820 engage the fourth contacts in their associated contact banks and thus set up in code the rate factor digit "3" in the group of WXYZ leads 4801, whereby the rate factor digit "3" is printed on the toll ticket and the record sheet, in the manner previously explained.

The subsequent operation and release of the printer controller 4200 and the printer link 5000 are the same as those previously described.

In the foregoing description of operation of the extension of a connection from a calling subscriber in exchange 4 zone 84 to a called subscriber in the exchange in zone 62, it was assumed that the code portion of the directory number of the called subscriber comprised a two digit code and that the numerical portion of the subscriber's directory number comprised the usual four digit directory number. With this arrangement a connection could be extended to any one of 10,000 subscribers in the exchange in zone 62 by merely altering the combination of the four digit numerical portion of the directory number.

In certain areas it may be necessary during a conversion period, when the exchange numbering scheme for an entire area comprising a plurality of exchanges is operated on a mixed numbering scheme involving both six and seven digit directory numbers, to provide facilities in one of the smaller exchanges for extending connections to subscribers thereat having both six and seven digit numbers. Accordingly it will now be assumed that the exchange in zone 62 may be selected by dialing either the two digit code comprising the digits 62 or a three digit code comprising the digits 621. In either event the numerical portion of the called subscriber directory number will comprise the usual four numerical digits.

If the calling subscriber at substation TP in exchange 4 zone 84 dials a six digit number comprising a code portion including the digits 62 identifying the exchange in zone 62, and a numerical portion including four digits, such, for example, as the digits 1234 identifying the line terminal of the subscriber line extending to the called subscriber substation, the extension of the connection is completed in the same manner as has been described above. However, since the exchange in zone 62 is now assumed to be of the type which comprises both six and seven digit numbers, the operation of the register translator 1700 is altered so that it may distinguish between a code comprising only two digits and a code comprising three digits such codes identify the same called exchange.

Referring now to the register translator 1700, it will be recalled that the code digits "6" and "2" were respectively registered in the first code switch A2400 and the second code switch B2410. Also, the first digit "1" of the numerical portion of the called subscriber directory number was registered on the third code switch C2500, and that the second, third, and fourth digits "2," "3" and "4" of the numerical portion of the directory number were registered respectively in the first, second and third numerical switches D2510, E2520 and F2600. As a result of the registration of the digits "6," "2" and "1," as described above, the composite code switch P2330 advances its wipers into engagement with the tenth contact in the ninth level of the associated contact banks, whereupon a circuit was completed, including the wiper 2336 and the jumper **2351*b*, for causing the rate and route switch R2310** to advance its wipers into engagement with the ninth contact in the tenth level of the associated contact banks.

Since it has been assumed that the exchange in zone 62 includes both two and three digit codes, that is, six and seven digit called subscriber directory numbers, the jumper **2388*a* is disconnected from the conductor C2388 in order to prevent the operation of the code send relay R1750 at the present time, and instead the jumper 2388*a* is connected to the skip conductor C2382 in order to cause the digit sequence switch T2300 automatically to advance its wipers from the home contacts into engagement with the first contact in their associated contact banks. In addition the jumper 2388*f* is disconnected from the skip conductor C2382 and connected to the first marking conductors in the marking cable 2385. Furthermore, the jumper 2388*g* is disconnected from the conductor C2397*c* and connected to the conductor C2397*i*. Consequently, when the wiper 2317 of the rate and route switch R2310 engages the ninth contact in the tenth level of its associated contact bank, a circuit, including the resistor 2327, the wiper 2317, the jumper 2388*g* now connected to the conductor C2397*i*, the upper winding of the two and three digit code relay R1710′, and the upper winding of the rate relay R1760′, is completed, whereupon the above-mentioned relays are operated in series. The rate relay R1760′, upon operating, applies ground potential to the X conductor in the group of WXYZ marking leads 2812 in order to mark the latter leads in accordance with the complementary digit "8" of the rate factor digit "3." When the relay R1710′ operates, at its contacts 1711′ it completes a circuit, traced hereinafter, for operating the code send relay R1750 under control of the timer switch M2260**.

With the ninth contacts in the tenth levels of the contact banks of the rate and route switch R2310 connected in the manner described above, the subsequent operation of the digit pulse start relay R1710, at its contacts 1716, completes a circuit including the conductor C1777, the wiper 2304 and the engaged home contact in its associated contact bank, the wiper 2311, the jumper **2388*a* now connected between the ninth contact in the tenth level of the contact bank associated with the wiper 2311 and the skip conductor C2382, for operating the magnet TM2305, whereby the wipers of the digit sequence switch T2300 are advanced into engagement with the first contacts in their associated contact banks. The wiper 2304 then successively engages the first, second, third, fourth and fifth contacts in its associated contact bank, whereby the sender switch S2830 is successively operated and controlled by the respective wipers 2312, 2313, 2314, 2315 and 2316 of the rate and route switch R2310 in order to cause the first, second, third, fourth and fifth routing digits "2," "1," "6," "2" and "1" respectively to be transmitted to the primary selector 600, in the manner previously explained. Since the code send relays R1725, R1730, R1740 and R1750 are all in their restored positions at the present time, the wiper 2303 of the digit sequence switch R2300 successively engages the sixth, seventh and eighth contacts in its associated contact bank, whereby the conductors C2381, C2380 and C2379 extending respectively to the first, second and third code switches A2400, B2410 and C2500** are skipped in order to prevent transmission of routing digits corresponding to the digits registered in the above-mentioned code switches.

At this time the wiper 2304 engages the ninth contact in its associated contact bank terminating the conductor C2378 extending to the wiper 2514 of the first numerical switch D2510, whereby the sender switch S2830 is controlled in order to send the second numerical digit "2" registered in the first numerical switch D2510. The wiper 2304 then engages the tenth contact in its associated contact bank terminating the conductor C2377 extending to the wiper 2524 of the second numerical switch E2520, whereby the sender switch S2830 is controlled in order to send the third numerical digit "3" registered in the second numerical switch E2520. The wiper 2304 then engages the eleventh contact in its associated contact bank terminating the conductor C2376 extending to the wiper 2604 of the third numerical switch F2600. At the present time the wiper 2302 is also in engagement with the eleventh contact of its associated contact bank terminating the conductor C2366 extending to the contacts 2754 of the sequence relay R2750. It will be recalled that the sequence relay R2750 is operated as a result of the registration of the sixth dialed digit by the calling subscriber in the third numerical switch F2600. It will also be recalled that the sender switch S2830 cannot be controlled to transmit the digit registered in the third numerical switch F2600 until all of the information pertaining to the connection stored in the register translator 1700 has been transferred to the toll ticket repeater 800 by the storage transfer switch U2820.

It will be noted that at the conclusion of the transmission of the first routing digit from the register translator 1700, the digit stop relay R1910 operates to complete, at its contacts 1915, a circuit for energizing the winding of the special service cutoff relay R1810. The latter relay operates and, at its contacts 1812, prepares a circuit for the detector start relay R1760, which circuit is completed at the contacts 1916 when the digit stop relay R1910 subsequently restores to normal. The operation of the detector start relay R1760 causes the detector 2900 to identify the calling subscriber line, in the manner previously explained, and after the identification has been completed the detector release relay R2240 operates. In response to the operation of the detector release relay R2240, a circuit is completed at its contacts 2241 for controlling the intermittent operation of the code pulse relay R1850 in order to cause the storage transfer switch U2820 to transmit in code the information registered in the register translator 1700 to the toll ticket repeater 800. It should be noted that when the wiper 2826 of the storage transfer switch U2820 engages the forty-sixth contact in its associated contact bank, ground potential is applied to the conductor C2175 in order to cause the continued intermittent operation of the code pulse relay R1850 in the event that the sequence relay R2750 has been operated to indicate that the corresponding sixth digit dialed by the calling subscriber has been registered in the third numerical switch F2600. In the present example it will be assumed that the sixth digit has been registered and that the sequence relay R2750 has been operated in order to cause the storage transfer switch U2820 to transmit the registered digit to the toll ticket repeater 800. Accordingly the wiper 2826 is advanced into engagement with the fiftieth contact in its associated contact bank.

In the present example a six pull number has been dialed by the calling subscriber and, consequently, the sequence relay R2760 has not been operated and no digit is registered in the four numerical switch G2610. Accordingly, no ground potential is applied to the fiftieth contact engaged by the wiper 2826, and the code pulse relay R1850 is not controlled in the manner explained above. Thus with the register translator operated, in the manner explained above, the fourth numerical digit registered in the third numerical switch F2600 cannot be transmitted at the present time in order to control the final selection of the desired called subscriber line. Also, the storage transfer switch U2820 cannot be operated to control the last digit send relay R1720 to permit the transmission of the final switch setting digit. In order to cause the storage transfer switch U2820 to operate in the same manner as if a seventh digit had been dialed by the calling subscriber and registered in the fourth numerical switch G2610, the sequence relay R2760 is controlled by the timer switch M2260 in the manner described below.

Referring again to the operation of the timer switch M2260, it will be recalled that the operation thereof started in response to the operation of the switching relay R2280 shortly after the register translator 1700 was seized. The timer switch M2260 is controlled by ground impulses received over the conductor C891 at five second intervals and advances its wipers 2261 and 2262 one step in the clockwise direction every five seconds. When the wiper 2261 advances four steps to engage the fifth contact in its associated contact bank terminating the conductor C2273, ground potential is applied by way of the conductor C2273 extending to Fig. 17A, the contacts 1711′, the conductor C2775 extending to Fig. 27, the contacts 2765 of the sequence relay R2760, the conductor C2388 extending to Fig. 17A, and the winding of the code send relay R1750, to battery. From the foregoing it will be understood that in the event the calling subscriber has not dialed a seventh digit of a called number, thereby to register the same in the fourth numerical switch G2610 and cause the operation of the sequence relay R2760 within twenty seconds after the register translator 1700 is seized, the timer switch M2260 will, after an elapse of twenty seconds, cause the operation of the code send relay R1750 in order to indicate to the register translator 1700 that the calling subscriber has dialed a six digit directory number.

The code send relay R1750 operates when the above-traced circuit is completed and, at its contacts 1751, completes a locking circuit for itself including ground at the contacts 1719. At its contacts 1755 the relay R1750 applies ground potential to the Z conductor in the group of WXYZ marking leads 2815, whereby the digit "0" is subsequently transferred by the storage transfer switch U2820 from the register translator 1700 to the toll ticket repeater 800, in order to indicate that the called subscriber's directory number is a six digit number and comprises only two code digits. Furthermore, the code send relay R1750, at its contacts 1756, completes a circuit including the conductor C1757 extending to Fig. 28, for energizing the right-hand and left-hand windings of the sequence relay R2760. The sequence relay R2760 operates over this circuit and, at its contacts 2765, interrupts the initial energizing circuit for the code send relay R1750, but the latter relay remains in its operated position as a result of the above-traced locking circuit. As a further result of the operation of the sequence relay R2760, at its contacts 2764 it applies ground potential to the fiftieth contact engaged by the wiper 2826 of the storage transfer switch U2820, thereby to recomplete the previously traced circuit for intermittently operating the code pulse relay R1850. The intermittent operation of the code pulse relay R1850 causes the magnet UM2827 of the storage transfer switch U2820 to advance the wipers thereof step by step over the fiftieth contact to the fifty-fifth contacts, inclusive, whereby the information marked on the WXYZ marking leads 2811, 2815 and 2816, engaged by the wiper 2823, is transferred to the toll ticket repeater 800, in the manner previously explained. Since the WXYZ conductors in the group of WXYZ marking leads 2811 are not marked by the fourth numerical switch G2610, the storage device S1134 in the toll ticket repeater remains in its restored position at the present time. When the wiper 2823 disengages the fifty-fifth contact and engages the fifty-sixth contact in its associated contact bank, the previously traced circuit for energizing in series the mark relay R1860 and the last digit send relay R1720 is completed. The operation of the last digit send relay R1720 indicates that all of the information registered in the register translator 1700, which must be transferred to the toll ticket repeater 800 before the register translator 1700 can complete the connection, has been transferred, and that the sixth digit dialed by the calling subscriber may be transmitted by the register translator 1700 in order to select the line of the desired called subscriber.

Figure 27:
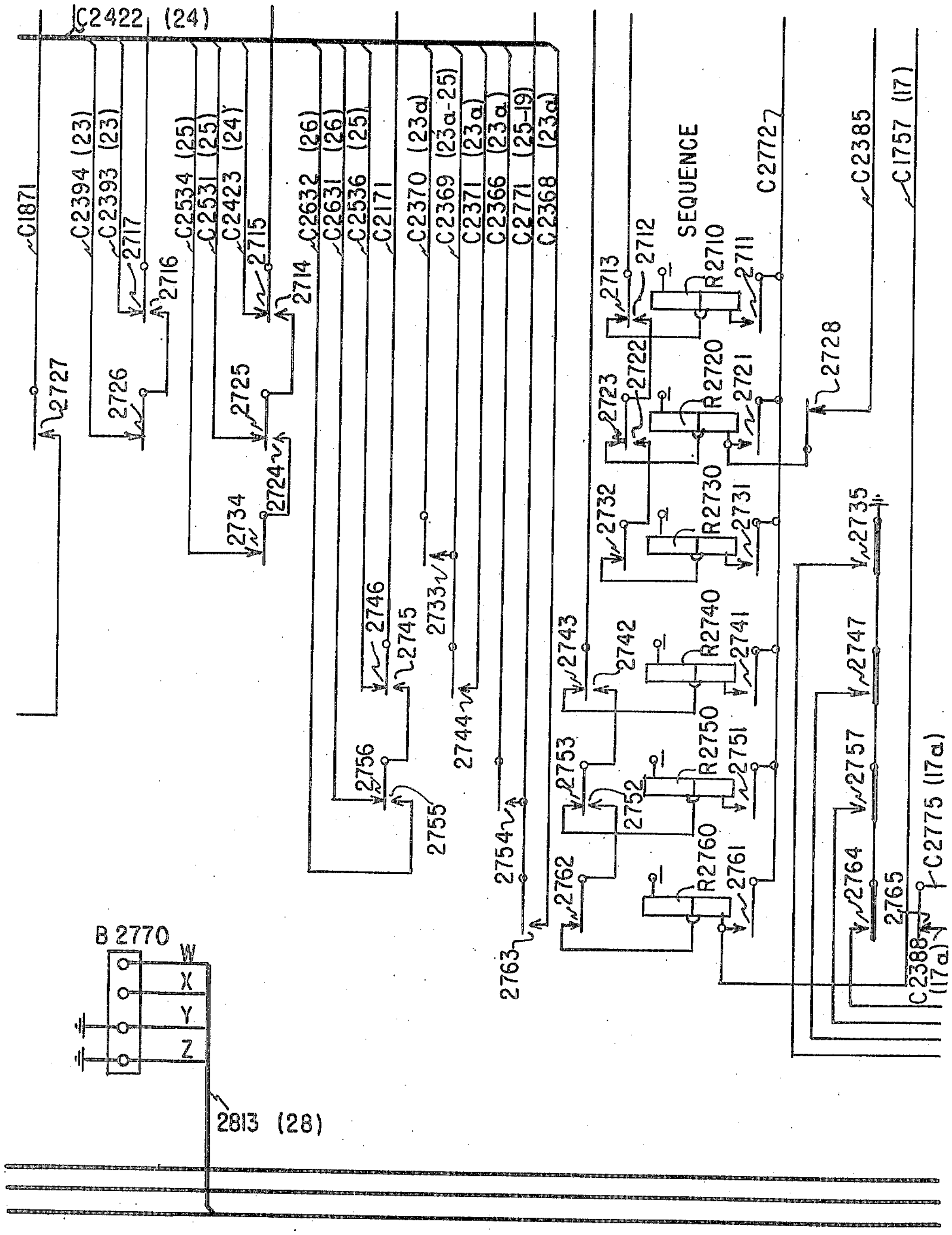

Accordingly, when the last digit send relay R1720 operates, at its contacts 1721 it completes a circuit which may be traced from ground by way of the contacts 1717 and 1721, the conductor C2771 extending to Fig. 27, the contacts 2754 of the sequence relay R2750, the conductor C2366 extending to Fig. 23A, the wiper 2302 and the engaged eleventh contact of the digit sequence switch T2300, the conductor C1778 extending to Fig. 17, the contacts 1914 and 2213, the winding of the digit spacer relay R1920, and the resistor 1925, to battery. Consequently as a result of the operation of the last digit send relay R1720, the sender switch S2830 transmits the fourth numerical digit registered in the third numerical switch F2600, thereby to cause the connector 5615 in the exchange in zone 62 to select the line of the desired called subscriber.

From the foregoing explanation of the operation of the register translator 1700 it will be understood that the first routing digit "2" controlled the primary selector 600 to select the toll ticket repeater 800; that the second routing digit "1" controlled the toll selector 5300 to select an idle trunk line 5625 terminating in the toll first selector 5608 in the toll tandem exchange; that the third routing digit "6" controlled the toll first selector 5608 to select the toll second selector 5612; that the fourth routing digit "2" controlled the toll second selector 5612 to select an idle trunk line 5624 terminating in the selector 5613 in the exchange in zone 62; that the fifth routing digit "1" controlled the selector 5613 to select the selector 5614; and that the second, third and fourth digits of the numerical portion of the called subscriber number registered in the first, second and third numerical switches D2510, E2520 and F2600 controlled the selector 5614 and the connector 5615 in order to complete the connection between the calling subscriber at substation TP in exchange 4 zone 84 and the desired called subscriber in the exchange in zone 62 having the six digit directory number 62–1234.

In the foregoing example it was assumed that a call was extended to a subscriber having a six pull directory number and that the exchange in zone 62 included the subscriber lines having both six and seven pull directory numbers. In order to understand the manner in which calls are extended to the exchange in zone 62 when a subscriber having a seven digit directory number is called, it will now be assumed that the calling subscriber dials the code digits 621 followed by the four numerical digits 5123.

Before continuing with the operation of the apparatus involved it is noted that the code digits 621 of a seven digit directory number are precisely the same as the two code digits "6" and "2" and the first numerical digit "1" which are the first three digits dialed when a call is extended to a subscriber line in zone 62 having a six digit directory number. Accordingly when the calling subscriber at substation TP dials the code digits 621 of a seven digit directory number, these digits are respectively registered in the first, second and third code switches A2400, B2410 and C2500 in the register translator 1700, in the same manner previously described. The four numerical digits 5123 comprising the numerical portion of the directory number of the called subscriber are registered respectively in the first, second, third and fourth numerical switches D2510, E2520, F2600 and G2610. As soon as the third code digit "1" is registered in the third code switch C2500, the composite code switch P2330 is operated so that the wipers thereof engage the tenth contact in the ninth level of the associated contact banks, in the same manner as has been described hereinbefore, and a circuit is completed including the wiper 2336 thereof and the jumper 2351*b* for causing the rate and route switch R2310 to advance its wipers into engagement with the ninth contacts in the tenth level of the associated contact banks. After the rate and route switch R2310 has been operated to engage the ninth contacts in the tenth level of the associated contact banks, the switch cutoff relay R1820 is operated and thereby causes the operation of the digit pulse start relay R1710, all in the manner previously described.

The jumpering arrangement among the contacts in the contact banks of the rate and route switch R2310 is connected in the same manner as explained above. It will be recalled that the ninth contact in the tenth level of the contact bank associated with the wiper 2311 is jumpered by way of the jumper 2388*a* to the skip conductor C2382 instead of to the conductor C2383 as is illustrated in the drawing. The corresponding contacts respectively associated with the wipers 2312, 2313, 2314 and 2315 are respectively connected by way of the jumpers 2388*b*, 2388*c*, 2388*d* and 2388*e* to the second, first, sixth and second marking conductors in the marking cable 2385. The contact associated with the wiper 2316 is connected to the second marking conductor in the marking cable 2385 instead of to the skip conductor C2382 as is illustrated in the drawings. Finally, the contact associated with the wiper 2317 is connected to the conductor C2397*i* by way of the jumper 2388*g* instead of to the conductor C2397*c* as is illustrated in the drawings. From the foregoing explanation of the manner in which the ninth contacts in the tenth level are jumpered by means of the jumpers 2388*a* and 2388*g*, inclusive, it should be understood that these jumpers are connected in precisely the same manner and perform the same operations of the register translator 1700 as has been described above in extending a call to a subscriber in the exchange in zone 62, which exchange includes both and six and seven digit directory numbers. Accordingly, the digit sequence switch T2300 operates in the manner previously described in order to cause the first, second, third, fourth and fifth routing digits "2," "1," "6," "2" and "1" respectively to be transmitted to the primary selector 600 under control of the sender switch S2830. The wiper 2304 of the sequence switch T2300 then successively engages the sixth, seventh and eighth contacts in its associated contact bank terminating the conductors C2381, C2380 and C2379 in order to skip the first, second and third code switches A2400, B2410 and C2500 and thus prevent the transmission of routing digits corresponding to the code digits registered in the above-mentioned code switches. The wiper 2304 then successively engages the ninth, tenth, eleventh and twelfth contacts in its associated contact bank terminating the conductors C2378, C2377, C2376 and C2375 extending respectively to the first, second, third and fourth numerical switches D2510, D2520, F2600 and G2610. Thus the numerical digits 5123 registered in the above-mentioned numerical switches are respectively transmitted by the sender switch S2830 to the primary selector 600.

Since the seven digits of the called subscriber directory number have all been registered in the register translator 1700, the sequence relays R2710, R2720, R2730, R2740, R2750 and R2760 are all in their operated positions. Attention is directed to the fact that when the sequence relay R2760 operates as a result of the registration of the seventh and final digit of a seven digit directory number, at its contacts 2765 it interrupts a point in the previously described circuit for operating the code send relay R1750 under control of the timer switch M2260 when a six digit directory number is dialed. Therefore, as soon as the subscriber dials the seventh digit it is registered in the fourth numerical switch G2610, and the sequence relay R2760 operates to prepare, at its contacts 2764, the circuit for causing the storage transfer switch U2820 to transfer the last digit to the code storage device S1134 in the toll ticket repeater 800. At the contacts 2765, the sequence relay R2760 interrupts a point in the previously described circuit for energizing the code send relay R1750 under control of the timer switch M2260. Thus, the timer, which functions when a six pull directory number is dialed to cause the operation of the code send relay R1750 twenty seconds after the register translater 1700 is selected, thereby to cause the operation of the sequence relay R2760, has no effect upon the code send relay R1750 and the sequence relay R2760 when a seven pull directory number is dialed.

After the storage transfer switch U2820 has transferred all the information registered in the register translator 1700 to the toll ticket repeater 800, the wiper 2823 of the storage transfer switch U2820 engages the fifty-fifth contact in its associated contact bank in order to complete the previously traced circuit for energizing the mark relay R1860 in series with the last digit send relay R1720. The last digit send relay R1720, at its contacts 1721, completes a circuit including the conductor C2771, the contacts 2754 of the sequence relay R2750, the conductor C2366 and the eleventh contact engaged by the wiper 2302 of the digit sequence switch T2300, and the conductor C1778, thereby to cause the sender switch S2830 to transmit the third numerical digit "2" registered in the third numerical switch F2600. Shortly, thereafter the wipers of the digit sequence switch T2300 are advanced one step into engagement with the twelfth contacts in their associated contact banks, whereupon the fourth numerical digit "3" registered in the fourth numerical switch G2610 is transmitted under control of the sender switch S2830. Thus it will be understood that the last digit send relay prevents the digit sequence switch T2300 and the sender switch S2830 from transmitting the last two digits of a seven digit called subscriber directory number until the storage transfer switch U2820 has transferred all of the information registered in the register translator 1700 to the toll ticket repeater 800.

It is noted that when the register translator 1700 transmits the first, second, third, fourth and fifth routing digits "2," "1," "6," "2" and "1," the primary selector 600, the toll selector 5300, the toll first selector 5608, the toll second selector 5612, and the selector 5613 operate in the same manner as has been described hereinbefore to extend the connection to the selector 5614 in the exchange in zone 62. Furthermore, when the register translator 1700 transmits routing digits corresponding to the numerical portion of the called subscriber directory number registered in the first, second, third and fourth numerical switches D2510, E2520, F2600 and G2610, which digits are respectively "5," "1," "2" and "3," they control the selector 5614, the selector 5636, and the connector 5637 to complete the connection to the called subscriber substation in the exchange in zone 62 having the seven digit directory number 621–5123. The restoration of the register translator 1700, after it has completed the control operations described above, the subsequent operation and release of the printer controller 4200 and the printer link 5000, and the manner in which the toll ticket printer 5130 and the record printer 5140 are operated and retored, are substantially the same as has been described in detail hereinbefore.

*Toll calls from a private subscriber substation rendered extended service*

The extension of a toll call from a private subscriber substation rendered extended service, such, for example, as the private subscriber substation TX, is initiated at the calling private subscriber substation TX and extended therefrom under control of the calling party thereat, in the manner previously explained. However, the apparatus in the register translator and in the printer controller operate in a slightly different manner, as explained more fully below.

Assume now that a call has been initiated at the calling substation TX, that the line switch 421 individual thereto has operated to seize the trunk 461 extending to the primary selector 441, and that the finder F442 individual to the primary selector 441 has seized the conductors extending to the primary register 1200, all on the manner previously explained. At this point it is noted that the line switch 421 is included in the second group having access to the second group of primary selectors, including the primary selector 441. Further, assuming that the call from the substation TX is to be extended to a called subscriber substation in exchange 2 zone 27, the subscriber at substation TX proceeds to dial the directory number of the called subscriber substation which comprises a code portion, inluding the digits 272 identifying the called zone and the exchange, and a numerical portion including four digits, such, for example, as the digits 1234 identifying the line terminal of the called subscriber line.

The first digit "2" dialed by the calling subscriber is registered in the first code switch A1500 in the primary register 1200, in the manner previously explained. The wiper set of the switch mechanism in the primary selector 441 is operated to its second vertical position in accordance with the first digit "2" and then is released at the conclusion of the last-mentioned digit, in the manner previously explained. The wiper 1503 of the first code switch A1500 engages the second contact in its associated contact bank, thereby to complete the previously traced circuit for operating the translate relay R1270 shortly following the conclusion of the first digit "2."

The calling subscriber at substantion TX then proceeds to dial the second digit "7," thereby to cause the last-mentioned digit to be registered in the second code switch B1510, whereupon the sequence switch S1630 advances its wipers into engagement with the second contacts in their associated contact banks, and thus completes a circuit for energizing the start relay R1600 in order to cause the register translator allotter 1600 to assign an idle register translator, such as the register translator 1700, to the primary register 1200. At this time the pulse relay R1460 in the primary register 1200 operates to transmit the complement "9" of the first digit "2" to the register translator 1700, whereby the first digit "2" is effectively registered in the first code switch A2400 in the register translator 1700. Also, the pulse relay R1460 effects operation of the party switch N2620 in the register translator 1700 in accordance with the operated or restored positions of the party relays R1210, R1220 and R1230 in the primary register 1200, whereby there is registered in the party switch N2620 the position of the calling subscriber substation on the associated subscriber line in the event the calling subscriber substation is of the party type.

The subscriber at the calling substation TX then proceeds to dial the third digit "2" and the fourth digit "1," which digits are respectively registered in the third code switch C1520 and the first numerical switch D1620, whereby the pulse relay R1460 transmits the respective complements "4," "9" and "10" of the second digit "7," the third digit "2," and the fourth digit "1" to the register translator 1700. The last-mentioned digits are respectively registered in the second code switch B2410, the third code switch C2500, and the first numerical switch D2510 in the register translator 1700. The calling subscriber at substation TX then proceeds to dial the fifth digit "2," the sixth digit "3" and the seventh digit "4," which are respectively registered in the second, third and fourth numerical switches E2520, F2600 and G2610 in the register translator 1700.

Accordingly, at this time the digits "2," "7" and "2" are respectively registered in the first, second and third code switches, the wiper 2405 engages the ninth contact in its associated bank thereby to select the wiper 2332 of the composite code switch P2330, and the wiper set of the composite code switch P2330 engages the ninth contact in the fourth level of the associated contact banks. At the conclusion of the registration of the third digit "2" in the third code switch C2500, the wipers of the rate and route switch R2310 are operated into engagement with the contacts in their associated contact banks, as determined by the connection of a jumper between the ninth contact in the fourth level engaged by the wiper 2332 of the composite code switch R2330 and the contact in the bank accessible to the wiper 2318 of the rate and route switch R2310. The manner in which the various bank contacts engaged by the wipers of the rate and route switch R2310 are jumpered to the various control conductors may be assumed to be the same as has been described hereinbefore when these wipers engaged the sixth contact in the fifth level of their associated contact banks. However, in the present call the routing digits "2," "2" and "2" are to be transmitted instead of the digits "2," "2" and "3" and, consequently, to accomplish this the jumper **2353*d* should be disconnected from the third marking conductor in the marking cable 2385** and connected to the second marking conductor therein.

Also, it is noted that when the register translator 1700 is connected to the primary register 1200, a circuit is completed for the special service relay R2040 in the register translator 1700. The last-mentioned circuit extends from ground by way of the strap 444 and the normally closed contacts of the cam springs in the primary selector 441 (the detailed wiring of the primary selector 441, which is not shown, is exactly the same as the primary selector 600 illustrated Figs. 6 and 7), the finder F442, the conductor C644 extending to Fig. 14, the contacts 1443, the conductor C1394 extending to Fig. 22, the wiper 2294 of the finder F2290, the conductor C1872, the contacts 1811 and 1713, and the upper winding of the special service relay R2040, to battery. When direct ground potential is applied to this series circuit of the special service relay R2040 operates. The operation of the special service relay R2040 is effected only when the register translator 1700 is connected by way of one of the primary registers to any one of the primary selectors in the second group, due to the provision of the direct connection of ground potential to the normally closed contacts of the cam springs in the last-mentioned primary selector. When a resistance ground potential is applied to this circuit, as is the case when the primary selector 600 is connected to the register translator 1700, the special service relay R2040 does not operate. As a result of the operation of the special service relay R2040, at its contacts 2041, it completes an obvious holding circuit for itself including the grounded conductor C2772 for energizing the lower winding thereof.

Also, the special service relay R2040 prepares, at its contacts 2043, a circuit traced hereinafter for short-circuiting the winding of the switch cut off relay R1820. Finally, the special service relay R2040 completes, at its contacts 2044, an obvious path for applying ground potential to Z conductor in the group of WXYZ marking leads 2814, whereby the digit "0" is subsequently stored in the code storage device S1130 in the toll ticket repeater 800.

The above-described operation of the rate and route switch R2310 takes place in an extremely short interval of time at the conclusion of the registration of the third digit "2" in the third code switch C2500. At this time the stop relay R1940 completes a circuit for operating the switch cut off relay R1820, and the latter relay, at its contacts 1821, completes the previously traced circuit for operating the digit pulse start relay R1710. Upon operating, the digit pulse start relay R1710 interrupts, at its contacts 1713, the above-traced circuit for operating the special service relay R2040, but the latter relay remains in its operated position as a result of the holding circuit for energizing the lower winding thereof. Also, the digit pulse start relay R1710 initiates the operation of the digit sequence switch T2300, whereby the digit sequence switch T2300 in cooperation with the sender switch S2830 causes the first, second and third routing digits "2," "2" and "2" and the four numerical digits "1," "2," "3" and "4" to be transmitted, all in the manner previously explained.

At the conclusion of the transmission of the first routing digit "2" the digit stop relay R1910 operates, thereby to effect operation of the special service cut off relay R1810. Subsequently the digit stop relay R1910 restores, thereby to effect operation of the detector start relay R1760, whereby the latter relay operates in order to cause the detector 2900 to identify the calling subscriber line terminal designations, all in the manner previously explained. After the operation of the detector 2900 is completed, the detector release relay R2240 operates, whereupon the code pulse relay R1850 controls the storage transfer switch U2820 in order to transmit the items of record information from the register translator 1700 to the toll ticket repeater 800 which has been seized by the primary selector 441 at this time. The manner in which the register translator 1700 transmits the items of record information to the toll ticket repeater 800, and the manner in which the register translator 1700 is subsequently released, is the same as has been previously described.

It is noted that when the register translator transmits the first routing digit "2" the primary selector 441 seizes the toll ticket repeater 800 and transmission of the second routing digit "2" to the toll ticket repeater 800 is repeated to the toll selector 5300, which selects the toll line, such as the toll line 5626, extending to the incoming second selector 5601 in exchange 2 zone 27. The third routing digit "2" is repeated by the toll ticket repeater 800 and causes the incoming second selector 5601 to select the selector 5602. Finally the first, second, third and fourth numerical digits "1," "2," "3" and "4" are repeated by the toll ticket repeater 800 in order to control the selector 5602, the selector 5603, and the connector 5604, and thereby complete the connection to the desired called subscriber.

As previously noted, the storage transfer switch U2820 in the register translator 1700 operates to transmit the items of record information registered in the various switches and code storage devices in the register translator 1700 to the various code storage devices S1121 to S1135, inclusive, in the toll ticket repeater 800. At this point it is noted that the digit "0" stored in the group of WXYZ marking leads 2814 is transferred by the storage transfer switch U2820 from the register translator 1700 and is stored in the code storage device S1130 in the toll ticket repeater 800.

It will now be assumed that the connection established between the calling private subscriber substation TX in exchange 4 zone 84 and the called subscriber substation in exchange 2 zone 27 is maintained for three minutes and then released under the control of the calling subscriber at substation TX, all in the manner previously explained. In this event the toll ticket repeater 800 operates in order to cause the printer controller allotter 4600 to allot an idle printer controller, such, for example, as the printer controller 4200, whereupon the finder F4210 operates to find the calling toll ticket repeater 800. When the printer controller 4200 is connected to the toll ticket repeater 800, the storage transfer switch S1110 in the toll ticket repeated 800 and the storage register switch S4220 in the printer 4200 operate in synchronism, whereby the various items of record information stored in the toll ticket repeater 800 are transferred to the printer controller 4200 and stored in the various code storage devices S4621 to S4638, inclusive. In the present example particular attention is directed to the fact that when the wiper 4223 of the storage register switch S4220 engages the first contact in its associated contact bank, the previously mentioned circuit for energizing the winding of the special service relay R4380 is completed in view of the fact that the digit "0" is stored in the corresponding code storage device S1130 in the toll ticket repeater 800, as previously explained. When thus energized the special service relay R4380 operates to complete, at its contacts 4382, a holding circuit, including the contacts 4338, for maintaining the relay R4380 in its operated position after its initial energizing circuit is interrupted. Also, the relay R4380 completes, at its contacts 4381, a circuit including the conductor C4303 extending to Fig. 45 for energizing the winding of the special service slave relay R4520, thereby to cause the latter relay to operate. At its contacts 4384, the relay R4380 interrupts the normally completed path for applying ground potential to the thirty-seventh contact in the contact bank of the record storage transfer switch R4810 associated with the wiper 4812 and, at its contacts 4383, it applies ground potential to the thirty-seventh contact in the contact bank associated with the wiper 4813. Finally, at its contacts 4385, the relay R4380 completes a circuit for connecting the home, first, second, third and fourth multiply connected contacts, in the contact bank associated with the wiper 4735 of the calculator setting switch M4730, to the conductor C4761.

Assuming now that the rate factor digit "3" is applicable to the call between the calling subscriber at substation TX in exchange 4 zone 84 and the called subscriber substation in exchange 2 zone 27, this rate factor digit "3" has been previously selected by the operation of the rate relay R1760′ under control of the rate and route switch R2310 in the register translator 1700. Furthermore, the complementary digit "8" of the rate factor digit "3" has been transmitted from the register translator 1700 and registered in the code storage device S1128 in the toll ticket repeater 800. Also, the complementary digit "8" has been transferred from the code storage device S1128 in the toll ticket repeater 800 and registered in the code storage device S4621 in the printer controller 4200.

The registration of the complementary digit "8" of the rate factor digit "3" in the code storage device S4621 is effective to control the operation of the calculator selector switch T4820, whereby the wipers of the latter switch are driven to engage the fourth contacts in the associated contact banks. Thus the wipers 4825 and 4826 mark the WXYZ marking leads 4801 in accordance with the rate factor digit "3," and the wipers 4827 and 4828 respectively select the vertical magnet BM4927 and the rotary magnet BM4928 of the calculating switch B4920, all in the manner previously explained. At this time the transfer relay R4440 operates in order to arrest further operation of the calculator selector switch T4820 and to initiate operation of the calculator setting switch M4730, in the manner previously explained. More particularly, the magnet MM4736 operates and restores ten times, thereby to drive the wipers of the calculator setting switch M4730 into engagement with the tenth contacts in the associated contact banks. When the wipers engage the tenth contacts in the associated contact banks the previously traced circuits for energizing the left-hand and right-hand windings of the stop relay R4420 are completed, thereby to arrest further operation of the calculator setting switch M4730 at this time, as previously explained. It is noted that the wipers 4732 and 4733 test the contacts in their associated contact banks for grounded WXYZ conductors in the associated group of WXYZ marking leads 4623 extending to the code storage device S4623, and, since no digit is registered therein, no markings occurred on the corresponding WXYZ marking leads and the wipers 4732 and 4733 do not encounter marking ground potentials until they engage the tenth contacts in their associated contact banks. In view of the foregoing explanation of the mode of operation of the calculator setting switch M4730, it will be understood that the magnet MM4736 operates ten times after the calculating switch B4920 is selected by the calculator selector switch T4820. Hence the ten operations and restorations of the magnet MM4736 are effective to cause ten corresponding operations and restorations of the vertical magnet BM4927, whereby the wipers 4921 to 4926 of the calculating switch B4920 are operated ten steps in the vertical direction away from their normal vertical positions.

Also, when the wiper 4821 of the calculator selector switch T4820 engages the fourth contact in its associated contact bank, no circuit is completed in the present example for the wiper switching relay R4550 and, consequently, only the wipers 4921 to 4923 of the calculator switch B4920 are effective to complete circuits by way of the normally closed contacts 4551, 4553 and 4555 of the wiper switching relay R4550.

Also, it is noted that when the stop relay R4420 operates, at its contacts 4422 it completes a circuit for operating the control relay R4410, whereby the rotary magnet BM4928 of the calculating switch B4920 is controlled to advance the wipers 4921 to 4926 step by step in the rotary direction in synchronism with the step by step advancement of the wipers of the calculator setting switch M4730, until the wipers 4732 and 4733 of the latter switch engage the contacts in their associated contact banks marked with ground potential by the code storage device S4624, in accordance with the unit minutes of the time duration of the connection. In the present example, the magnet MM4736 operates and restores three additional times in order to drive the wipers into engagement with the fourteenth contacts in the associated contact banks, whereupon a circuit for energizing the left-hand and right-hand windings of the stop relay R4420 is recompleted in view of the fact that the fourteenth contacts, engaged by the wipers 4732 and 4733, terminate the marked W and Z conductors in the group of WXYZ marking leads 4624 extending to the code storage device S4624 in which the unit time digit "3" is stored at this time, as previously explained. Hence, the magnet MM4736 operated and restored three times subsequent to the restoration of the control relay R4410, whereby the rotary magnet BM4928 was operated and restored three times in order to drive the wipers of the selected calculating switch B4920 three steps in the rotary direction into engagement with the third contacts in the tenth level of the associated contact banks. At this time the wipers 4921 to 4923, inclusive, engaged the third contact in the tenth level of their associated contact banks, whereby a charge for the present call calculated upon a unit or bulk basis is established. At this point it is noted that the lower portion or first five levels of the contact banks of the various calculating switches C4900, B4920 and A4940 are utilized for establishing charges for calls calculated upon a monetary basis in cents; whereas the upper portion or the second five levels of the contact banks of the calculating switches mentioned are utilized for establishing charge for calls calculated upon a unit or bulk basis.

When the special service slave relay R4520 operated at its contacts 4521, it interrupted the normally completed connection between the forty-eighth contact in the contact bank associaed with the wiper 4511 and the "C" conductor C5102; it completed at its contacts 4522 a connection between the forty-eighth contact in the contact bank associated with the wiper 4511 and the "U" conductor C5103; it interrupted at its contacts 4523 the normally completed connection between the forty-first contact in the contact bank associated with the wiper 4511 and the "F" conductor C5104; and it completed, at its contacts 4524, a connection between the forty-first contact and the contact bank associated with the wiper 4511 and the "E" conductor C5105.

It will now be assumed that the finder F5010 has operated to select the calling printer controller 4200, whereby the printer link 5000 is operatively connected to the printer controller 4200, in the manner previously explained. The ticket printer control switch P4510 then operates in conjunction with the ticket storage transfer switch C4230 to control the marking relays WA, XA, YA and ZA in order to govern the operation of the toll ticket 5130 whereby a toll ticket is produced, all in the manner previously explained. In this connection it s pointed out that the operated special service slave relay R4520 governs the ticket printer control switch P4510, whereby the information appearing in the fourth line on the toll ticket is printed as follows:

3/3/E and whereby the information appearing in line five on toll ticket is printed as follows:

9 U

Thus the toll ticket in the present example is printed as follows:

11—29/11.33
84 4—0901
27 2—1234
3/3/E
9 U

The record storage transfer switch R4810 then operates to control the marking relays WB, XB, YB and ZB in order to govern the operation of the record printer 5140, whereby the next line on the record sheet of the record printer 5140 is printed, all in the manner previously explained. In this connection it is pointed out that the operated special service relay R4380 governs the record storage transfer switch R4810, whereby the information appearing on the record sheet is printed as follows:

11—29/11—33/844—0901/272—1234/ 3/3/2/6/01/2

Accordingly, when a call is extended from a subscriber substation rendering flat rate service (the private subscriber substation TP, etc., and the party subscriber substations TS1, etc.) which is to be ticketed, the ticket printer control switch P4510 controls the toll ticket printer 5130 so that the letter "F" appears in the line four on the toll ticket and the letter "C" appears on line five of the toll ticket, and the cost of the call is calculated on a monetary basis; and the record storage transfer switch R4810 controls the record printer 5140 so that the numeral "1" appears in the line of printing preceding the identification of the register translator number, which has been illustrated to be the single digit "6." On the other hand, when a call is extended from a subscriber substation rendered extended service (the private subscriber substation TX, etc.) which is to be ticketed, the ticket printer control switch P4510 controls the toll ticket printer 5130 so that the letter "E" appears in line four on the toll ticket and the letter "U" appears in line five on the toll ticket, and the cost of the call is calculated on a unit basis as illustrated above; and the record storage transfer switch R4810 controls the record printer 5140 so that the numeral "2" appears in the line of printing proceeding the identification of the register translator number, which in the present case is the single digit "6" as illustrated above.

The subsequent operation and release of the printer controller 4200 and the printer link 5000 are the same as those previously described.

*Timing of a toll call in excess of fifty minutes*

Now assume that a toll call has been completed from any calling subscriber substation in exchange 4 zone 84 to a called subscriber substation in any exchange in any zone. For example, the above described toll call may be completed between the calling subscriber substation TX in exchange 4 zone 84 and the called subscriber substation in exchange 2 zone 27 and routed via the primary selector 441, the toll ticket repeated 800, the toll selector 5300, the incoming selector 5601, the selectors 5602 and 5603, and the connector 5604, all in the manner described above. When the called subscriber in exchange 2 zone 27 answers the call, the answer slave relay R940 in the toll ticket repeated 800 operates to initiate the conversational timing of the established connection, whereby the unit time switch U1010 times the unit minute digit of the established connection, while the ten and hundred time switch D1020 times both the ten minute digit and the hundred minute digit of the established connection, all in the manner previously explained. In the event the established connection persists for a time interval of fifty minutes or more, the grounded wiper 1025 of the ten and hundred time switch D1020 engages the fifth contact in its associated contact bank and the W relay in the code storage device S1031 is operated and locked to the grounded hold conductor C889, whereby the digit "7" is stored in the code storage device S1031.

It will now be assumed that the established connection is retained for one hundred and twenty-three minutes and is then released under the control of the calling subscriber at substation TX in the manner previously explained. In this event the toll ticket repeated 800 is associated with the printer controller 4200 and the storage transfer switch S1110 and the storage register switch S4220 operate, whereby the various items of record information stored in the toll ticket repeated 800 are transferred to the printer controller 4200 and stored in the various code storage devices S4621 to S4638, inclusive, etc. In the present example, when the wiper 4223 of the storage register switch S4220 engages the home contact in its associated contact bank the computation stop relay R4370 is operated in view of the fact that the digit "7" is stored in the corresponding code storage device S1031, as previously explained. The computation stop relay operates to complete, at its contacts 4371, an obvious holding circuit whereby the relay is retained in its operated position after its initial energizing circuit is interrupted. Also, the computation stop relay R4370 interrupts, at its contacts 4372, the previously traced circuit for energizing the magnet MM4736 of the calculator setting switch M4730 under control of the pulse relay R4450. Also in the present example, the special service relay R4380 is operated and, at its contacts 4385, prepares a circuit whereby the automatic advancement of the wiper 4735 of the calculator setting switch M4730 controls the vertical magnet of the selected calculating switch. However, since the computation stop relay has operated, at its contacts 4372 it interrupts a point in the stepping circuit for the magnet MM4736 and thus prevents the calculator setting switch M4730 from advancing its wipers at this time. Thus at this time further operation of the calculator setting switch M4730 is positively arrested and may not be controlled by the pulse relay R4450. Accordingly when the calculator selector switch T4820 operates in order to select the particular calculating switch B4920 in the manner previously explained, the selected calculating switch B4920 is not operated due to the fact that the calculator setting switch M4730 is prevented from being operated at this time because of the operated position of the computation stop relay R4370.

Also, in the present example the hundred digit "1," the ten digit "2," and the unit digit "3" of the time duration of the established connection respectively marked in the groups of WXYZ marking leads 1034, 1032 and 1033 by the ten and hundred time switch D1020 and the unit time switch U1010 in the toll ticket repeated 800, are transferred and stored in the respective code storage devices S4622, S4623 and S4624 in the printer controller 4200. It will now be assumed that the printer link 5000 is operatively connected to the printer controller 4200, in the manner previously explained. The ticket printer control switch P4510 then operates in conjunction with the ticket storage transfer switch C4230 to control the marking relays WA, XA, YA and ZA in order to govern the operation of the toll ticket printer 5130 whereby a toll ticket is produced, all in the manner previously explained. In this connection it is pointed out that the operated special service slave relay R4520 governs the ticket printer control switch P4510, whereby the information appearing in the fourth line on the toll ticket mentioned is printed as follows:

123/3/E

Thus the time duration of the conversation of "123" minutes, the rate factor digit "3," and the letter "E" indicating that the calling subscriber is entitled to extended service is printed on the fourth line of the toll ticket.

The operated special service slave relay R4520 in conjunction with the operated computation stop relay R4370 governs the ticket printer control switch P4510, whereby the information appearing in the fifth line on the toll ticket mentioned is printed as follows:

U

Thus it will be understood that in the fifth line on the toll ticket mentioned only the letter "C" or the letter "U" appears on the present example, respectively indicating that the cost of the call is to be calculated on a monetary basis or on a unit basis, together with the indication that the established connection persisted for a time duration in excess of fifty minutes, and since fifty minutes exceeds the calculating capacity of the calculating switches C4900, B4920 and A4940, the cost of the call cannot be automatically established. This toll ticket thus produced is ultimately received in the Billing Department wherein a clerk makes a manual calculation of the cost on the appropriate basis indicated to be assessed for the call and then prints the assessed charge on the toll ticket by the ordinary typing method.

The record storage transfer switch R4810 then operates to control the marking relays WB, XB, YB and ZB in order to govern the operation of the record printer 5140 whereby a line on the record sheet is printed, all in the manner previously explained. In the present example it is pointed out that the line of printing mentioned on the record sheet may appear as follows:

11—29/11—33/844—0901/272—1234/123/3/2/6/01/2

The subsequent operation and release of the printer controller 4200 and the printer link 5000 are the same as those previously described.

*Toll calls from a party line subscriber substation*

The extension of a toll call from a party subscriber substation, such, for example, as one of the party subscriber substations TS1, TS2, TS3 and TS4 connected to the party subscriber line 410 is initiated at the calling party subscriber substation and extended therefrom under control of the calling device thereat, in the manner previously explained. However, the apparatus in the primary register and in the register translator operates in a slightly different manner as explained more fully below.

Assume that a call has been initiated from one of the party subscriber substations TS1, TS2, TS3 or TS4; that the associated line switch 424 individual to the associated party subscriber line 410 has operated to seize the trunk 462 extending to the primary selector 600; and that the finder F610 has seized the conductors extending to the primary register 1200, all in the manner previously explained.

In the present example, in the event the call is initiated at the first party subscriber substation TS1, no ground impulses are transmitted from the calling party thereat over the line conductors of the line 410 incident to the dialing of each digit of a called number; in the event the call is initiated at the second party subscriber substation TS2, one ground impulse is transmitted from the cam springs 454 in the calling device thereat over the line conductors of the line 410 incident to the dialing of each digit of the called subscriber number; in the event the call is initiated at the third party subscriber substation TS3, two ground impulses are transmitted from the cam springs 456 in the calling device thereat over the line conductors of the line 410 incident to the dialing of each digit of a called subscriber number; and, finally, in the event the call is initiated at the fourth party subscriber; substation TS4, three ground impulses are transmitted from the cam springs 458 in the calling device thereat over the line conductors of the line 410 incident to the dialing of each digit of the called subscriber number.

By way of example it is pointed out that the calling device at the fourth party subscriber substation TS4 is operated to transmit by way of the set of cam springs 458 the first ground impulse over the line conductors of the line 410 while the set of impulse springs 457 is closed; then to transmit by way of the set of impulse springs 457 the first impulse of the digit of the called number over the line conductors of the line 410 while the set of cam springs 458 is open; then to transmit by way of the cam springs 458 the second ground impulse while the set of impulse springs 457 is closed; etc. The calling devices at the second party subscriber substation TS2 and at the third party subscriber substation TS3 are operative in a similar manner.

Now assuming that the call from the calling party subscriber substation TS1, TS2, TS3 or TS4 is to be extended to a called subscriber substation in exchange 2 zone 27, the subscriber at the calling party substation proceeds to dial the directory number of the desired called subscriber, which for the purpose of illustration will be assumed to be 272—1234. Accordingly, the subscriber at the calling party subscriber substation TS1, TS2, TS3 or TS4 proceeds to dial the first digit "2," thereby to cause the last-mentioned digit to be registered in the first code switch A1500 in the primary register 1200, in the manner previously explained. The wiper set of the switch mechanism 700 in the primary selector 600 is operated to its second vertical position in accordance with the first digit "2" and is then released at the conclusion of the last-mentioned digit, in the manner previously explained. The wiper 1503 of the first code switch A1500 engages the second contact in its associated contact bank, whereby the previously traced circuit for energizing the winding of the translate relay R1270 is completed incident to the restoration of the dial slave relay R1310, shortly following the conclusion of the first digit "2."

Also, at the conclusion of the first digit "2" the wiper 1634 of the sequence switch S1630 is driven into engagement with the first contact in its associated contact bank, whereby a circuit is prepared for subsequently operating the party relays R1210, R1220 and R1230 in accordance with the operation of the party line relay R1360.

The subscriber at the calling party subscriber substation then proceeds to dial the second digit "7," thereby to cause the last-mentioned digit to be registered in the second code switch B1510 under control of the auxiliary line relay R1420, in the manner previously explained. During the second digit "7," each time a ground impulse is transmitted over the line conductors of the line 410 and, consequently over the conductors C641 and C643 extending to the primary register 1200, the lower winding of the party line relay R1360 is energized directly across the 24 volt source of potential; while the upper winding of the party line relay R1360 is energized in series with the upper winding of the line relay R1370 across the 48 volt source of potential. Accordingly, it will be understood that each time ground potential is applied to the conductors C641 and C643, the circuits for energizing the upper and lower windings of the party line relay R1360 are in such a direction that the windings are effectively series aiding and thus cause the relay to be operated. Accordingly, it will be understood that each time ground potential is applied to the conductors C641 and C643 the circuits through the upper and lower windings of the party line relay R1360 are such that this relay, which is of the differential type, is operated whereas, when the loop circuit is completed in series with the upper and lower windings of the party line relay R1360, in the absence of a ground potential upon the conductors C641 and C643, the circuits through the upper and lower windings thereof are in opposition to each other and thus prevent the relay from operating. Each time ground potential is removed from the line conductors of the line 410, the previously traced circuit for energizing the winding of the line relay R1370 in series with the upper and lower windings of the party line relay R1360 is recompleted, whereby the upper and lower windings of the party line relay R1360 are again balanced causing the latter relay to restore to normal. The application of ground potential to the line conductors of the line 410 merely causes the operation of the party line relay R1360 without causing the restoration of the line relay R1370. Each time the loop circuit including the party line 410 is interrupted the line relay R1370 restores, in an obvious manner, and the party line relay R1360 remains restored inasmuch as the circuit for its upper and lower windings are interrupted. Accordingly, the line relay R1370 follows the loop impulses transmitted by the set of impulse springs in the calling device at the calling subscriber substation on the party line 410, and the party line relay R1360 follows the ground impulses transmitted by the set of cam springs in the calling device at the calling party substation on the party line 410.

During the dialing of the first digit of the called subscriber number, the line relay R1370 follows the loop pulses in order to control the auxiliary line relay R1420, and the latter relay controls the first code switch A1500 in order to register the digit therein. Also, during the dialing of the first digit, the ground impulses transmitted under control of the cam springs in the calling device at the calling subscriber substation control the party line relay R1360, in the manner described above, but since the wipers of the sequence switch S1630 are in engagement with the home contacts in their associated contact banks, a circuit is not completed at the present time including the contacts 1361 for controlling the party line relay R1210, R1220 or R1230. During the transmission of the second digit of the called subscriber number the line relay R1370, in cooperation with the auxiliary line relay R1420, causes the second digit of the called subscriber number to be registered in the second code switch B1510. The first time the party line relay R1360 operates and restores, near the end of the transmission of the second digit of the called subscriber number, it completes and then interrupts, at its contacts 1361, a circuit including the grounded conductor C1294, the wiper 1634 and the engaged first contact in its associated contact bank, the contacts 1361 and 1211, and the upper winding of the party relay R1210 to battery, whereby the latter relay operates partially to close only its contacts 1213. When the party line relay R1360 restores, at its contacts 1361, it interrupts the above-mentioned circuit for the upper winding of the party line relay R1210 whereupon a series circuit including the upper and lower windings thereof is completed by way of the contacts 1213 and 1411. When the above-traced series circuit including the upper and lower windings of the relay R1210 is completed, the relay fully operates to interrupt, at its contacts 1211, a further point in its initial energizing circuit, and, at its contacts 1212, it prepares a point in the circuit for energizing the upper winding of the party relay R1220. Finally, the party relay R1210 completes, at its contacts 1214, an obvious path for applying a marking ground potential to the conductor C1284 extending to the first code switch A1500.

In view of the foregoing explanation of the mode of operation of the party line relay R1360 in conjunction with the party relays R1210, R1220 and R1230, under control of the calling devices at the various party subscriber substations TS1, TS2, TS3 and TS4, it will be understood that, in the event the call is initiated by the first party subscriber substation TS1, none of the party relays R1210, R1220 and R1230 will be operated incident to the dialing of the second code digit "7" of the called subscriber number; in the event the call is initiated at the second party subscriber substation TS2, the party relay R1210 will be operated incident to the dialing of the second code digit "7"; in the event the call is initiated at the third party subscriber substation TS3, the party relays R1210 and R1220 will be operated incident to the dialing of the second code digit "7"; and, finally, in the event the call is initiated at the fourth party subscriber substation TS4, the three party relays R1210, R1220, R1230 will be operated incident to the dialing of the second code digit "7."

At the conclusion of the registration of the second code digit "7" in the second code switch B1510, the wipers of the sequence switch S1630 are driven to disengage the first contacts in the associated contact banks and to engage the second contacts therein, whereby the previously traced circuit, including the wiper 1634 of the sequence switch S1630 and the contacts 1361 of the party line relay R1360, is interrupted in order to prevent subsequent operation of the party line relay R1360 from effecting the party relays R1210, R1220 and R1230 during the dialing of the remaining digits of the called subscriber number. Thus, it will be understood that the operation of the party line relay R1360 to determine the position of the calling party subscriber substation on the calling party subscriber line 410 is effective to control the party relays R1210, R1220 and R1230 only during the dialing of the second code digit of a called subscriber number.

When the wipers of the sequence switch S1630 engage the second contacts in their associated contact banks, the previously traced circuit for energizing the start relay R1600 in the register translator allotter 1600 is completed in order to cause the latter relay to operate, whereupon the register translator allotter 1600 assigns an idle register translator, such, for example, as the register translator 1700. When the register translator 1700 is thus assigned, the finder F2290 operates to connect it to the primary register 1200. At this time the pulse relay R1460 in the primary register 1200 operates to transmit the complement "9" of the first digit "2" to the register translator 1700, whereby the first digit "2" is effectively registered in the first code switch A2400 in the register translator 1700. Also, the pulse relay R1460 effects operation of the party switch N2620 in the register translator 1700 in accordance with the operated or restored positions of the party relays R1210, R1220 and R1230 in the primary register 1200, whereby there is registered in the party switch N2620 the position of the calling subscriber substation on the associated party subscriber line 410. More particularly, when the wiper 1502 of the first code switch A1500 engages the eleventh, twelfth and thirteenth contacts in its associated contact bank, the previously traced path for applying direct ground potential to the impulse conductor C1391 is completed in the event the respective party relays R1210, R1220 and R1230 occupy their operated positions. The application of direct ground potential to the conductor C1391 completes the previously traced circuit for energizing in series the windings of the light code relay R2050 and the heavy code relay R2060, whereby both of the relays mentioned operate. Each time the heavy code relay R2060 operates and restores it completes and then interrupts, at its contacts 2661, the circuit for energizing the magnet NM2625 whereby the wipers of the party switch N2620 are driven additional steps in the counterclockwise direction. Thus it will be understood that in the event the call is initiated at the respective first, second, third and fourth party subscriber substations TS1, TS2, TS3 and TS4 on the party subscriber line 410, the party switch N2620 in the register translator 1700 will be controlled by the primary register 1200, in the manner explained above, whereby the wiper 2623 will respectively engage the first, second, third and fourth contacts in its associated contact bank respectively terminating the conductors C2641, C2642, C2643 and C2644. The latter conductors are adapted to be connected by way of the contacts of the storage relay R2850 to the respective hold conductors C3401, C3402, C3403 and C3404 extending to the detector 2900.

The subscriber at the calling party subscriber substation then proceeds to dial the third digit "2," the fourth digit "1," the fifth digit "2," the sixth digit "3," and the seventh digit "4," whereby the primary register 1200 operates to transmit the second digit "7," the third digit "2" and the fourth digit "1" registered therein to the register translator 1700, and to repeat the fifth digit "2," the sixth digit "3" and the seventh digit "4" directly to the register translator 1700 to be registered therein, all in the manner previously explained.

The operations of the register translator 1700 to register the seven digits mentioned, to control the primary selector 600, to operate the succeeding switch train, to transmit the various items of record information stored therein to the toll ticket repeated utilized, and to initiate operation of the detector 2900, are the same as those previously explained. For the purpose of illustration it will be assumed that the primary selector 600 operates to route the connection by way of the toll ticket repeater 800.

In view of the foregoing explanation of the mode of operation of the party switch N2620, it will be understood that when the detector 2900 is connected to the register translator 1700 ground potential will be applied to only one of the hold conductors C3401, C3402, C3403 and C3404. More particularly, in the event the call is initiated at the first subscriber substation TS1, ground potential will be applied to the hold conductor C3401 and the detector 2900 will operate in order to detect the directory number of the connector terminal having access to the first party subscriber substation TS1, the directory number of the terminal mentioned being 0100. In the event the call was initiated at the second party subscriber substation TS2, ground potential will be applied to the hold conductor C3402 and the detector 2900 will operate in order to detect the directory number of the connector terminal having access to the second party subscriber substation TS2, the directory number of the terminal mentioned being 0200. In the event the call was initiated at the third party subscriber substation TS3, ground potential will be applied to the hold conductor C3403 and the detector 2900 will operate in order to detect the directory number of the connector terminal having access to the third party subscriber substation TS3, the directory number of the terminal mentioned being 0300. In the event the call was initiated by the fourth party subscriber substation TS4, ground potential will be applied to the hold conductor C3404 and the detector 2900 will operate in order to detect the directory number of the connector terminal having access to the fourth party subscriber substation TS4, the directory number of the terminal mentioned being 0400.

The subsequent release of the register translator 1700 as well as the operation and subsequent release of the printer controller utilized and the printer link 5000, in conjunction with the toll ticket repeater 800 following the release of the established connection under control of the subscriber at the calling party subscriber substation, are the same as those previously described. In the present example the printer controller utilized, such, for example, as the printer controller 4200, governs the toll ticket printer 5130 in the event the present call was initiated at the calling party subscriber substation TS1 to produce a toll ticket as follows:

11—29/11.33
84 4—0100
27 2—1234
6/3/F
90 C

In the event the present call was initiated at the calling party subscriber substation TS4, the second line in the above illustrated toll ticket will appear as follows:

84 4—0400

Correspondingly, the printer controller 4200 governs the record printer 5140 to produce a line of printing on the record sheet, in the event the present call was initiated at the calling party subscriber substation TS1, as follows:

11—29/11—33/844—0100/272—1234/ 6/3/1/6/01/2

In the event the present call was initiated at the calling subscriber substation TS4, the directory number 0400 will be substituted in the above illustrated line on the record sheet for the directory number 0100 of the calling subscriber substation TS1.

*Toll calls to exchanges in adjacent zones*

In the extension of a toll call from an ordinary private subscriber substation, such, for example, as the private subscriber substation TP, from a party subscriber substation, such, for example, as the party subscriber substation TS1 in exchange 4 zone 84 to an exchange in the adjacent zone, such, for example, as exchange 2 zone 27, the selected primary selector 600, the selected primary register 1200, and the selected register translator 1700 all operate in the manner previously explained. More particularly, the toll call is routed from the primary selector 600 over an idle one of the toll ticket repeaters such, for example, as the toll ticket repeater 800, and is ultimately completed in exchange 2 zone 27. The various items of record information pertaining to this toll call are stored in the toll ticket repeater 800 and, incident to the release of the established connection under control of the calling subscriber, an idle printer controller, such, for example, as the printer controller 4200, is selected and utilized in conjunction with the printer link 5000 to govern the toll ticket printer 5130 and the record printer 5140, all in the manner previously explained. In other words, toll calls from a calling ordinary private subscriber substation TP or from a calling party subscriber substation TS to a called subscriber substation in exchange 2 zone 27, are ticketed with the cost of the call calculated and printed on a monetary basis.

On the other hand, as previously noted, a call initiated at a calling private subscriber substation rendered extended service, such, for example, as the private subscriber substation TX, is completed to a called subscriber substation in exchange 2 zone 27 in the manner previously explained, but in this event the cost of the call printed upon the toll ticket is calculated on a unit basis.

In the previously described extension of a call from the calling private subscriber substation TX rendered extended service to a called subscriber substation in exchange 2 zone 27, it was assumed that the cost of the call would be calculated on a unit basis, and it should be understood that a call completed between the calling private subscriber substation TX rendered extended service to a called subscriber substation in exchange 3 zone 27 will be calculated on the same basis. It may be desirable in some exchange areas to give private subscriber substations rendered extended service access to exchanges in adjacent zones without assessing a charge therefor. Accordingly, it will now be assumed that a call initiated by the calling private subscriber substation TX, is to be completed to a called subscriber substation in exchange 2 zone 27, and that such a call is a free call and that no toll ticket is to be produced.

The subscriber at the calling private subscriber substation TX proceeds to dial the directory number 272–1234 of a called subscriber substation in exchange 2 zone 27. The first and second digits "2" and "7" are registered in the first code switch A1500 and the second code switch B1510 in the primary register 1200, whereby the register translator allotter 1600 operates in order to assign an idle register translator, such, for example, as the register translator 1700, and the finder F2290 connects the register translator 1700 to the primary register 1200, all in the manner previously explained. The complements "9" and "4" of the first and second digits "2" and "7" registered in the primary register 1200 are transmitted to the register translator 1700; the third and fourth digits "2" and "1" are first respectively registered in the third code switch C1520 and in the first numerical switch D1620, and then the complements "9" and "0" thereof are transmitted to the register translator 1700; while the fifth digit "2," the sixth digit "3" and the seventh digit "4" are repeated directly by the primary register 1200 to the register translator 1700, all in the manner previously explained.

At this time in the register translator 1700 the seven digits mentioned are effectively registered in the various code and numerical switches and the wiper 2332 of the composite code switch P2330 is selected and engages the eight contact in the fourth level of its associated contact bank. Also, it is noted that when the register translator 1700 is connected to the primary register 1200 the previously traced circuit for energizing the upper winding of the special service relay R2040 is completed, whereby the latter relay operates as previously explained. Upon operating, the special service relay R2040 completes, at its contacts 2041, the previously traced holding circuit for its lower winding including the grounded hold conductor C2772; it prepares, at its contacts 2043, a point in a circuit, traced hereinafter, for short-circuiting the switch cut off relay R1820; and it completed, at its contacts 2044, the previously mentioned path for applying ground potential to the Z conductor of the WXYZ marking leads 2814, all in the manner previously explained.

After the third digit "2" has been registered in the third code switch C2500 the sequence relay R2720 operates; and after the first digit "2" has been registered in the first code switch A2400 the wipers of the party switch N2620 are operated away from their home positions. At this time the upper winding of the switch pulse relay R1830 is energized, thereby to cause the latter relay to operate intermittently. The intermittent operation of the switch pulse relay R1830 effects operation of the wiper set of the rate and route switch R2310 first in the vertical direction and then in the rotary direction under the joint control of the transfer relay R1930 and the composite code switch P2330 in the manner previously explained. For the purpose of illustration it will be assumed that the engaged eighth contact in the fourth level engaged by the grounded wiper 2332 of the composite code switch P2330 is connected by way of the jumper **2351*a* to the sixth contact in the fifth level in the contact bank associated with the wiper 2318 of the rate and route switch R2310. Consequently the wipers of the rate and route switch R2310** are driven five steps in the vertical direction away from their normal positions and are then driven six steps in the rotary direction away from their normal positions into engagement with the sixth contact in the fifth level of the associated contact banks.

At this time the wipers of the rate and route switch R2310 engage contacts in their associated contact banks in order to establish a route from exchange 4 zone 84 to exchange 2 zone 27, which route includes a toll ticket repeater whereby the present call would be ticketed as is the case when the subscriber at substation TP makes the same call. In the present example, the contacts engaged by the wipers 2311, 2315 and 2316 are jumpered in the manner illustrated in the drawings, and the contacts engaged by the wipers 2312, 2313 and 2314 are jumpered respectively to the second marking conductor in the marking cable 2385. Finally, the contact engaged by the wiper 2317 is jumpered by way of the jumper 2353*g* to the conductor C2397*g* instead of the conductor C2397*a*, whereby a circuit is completed for energizing the lower winding of the extended service free routing relay R1730′ and the upper winding of the rate relay R1740′. When this circuit is completed the two relays mentioned operate, the former to prepare, at its contacts 1731′, a circuit, traced hereinafter, for short-circuiting the switch cutoff relay R1820, and the latter relay, at its contacts 1741′, to apply ground potential to the Z conductor in the group of WXYZ marking leads 2812 in order to mark the latter conductors in accordance with the charge rate of a connection to a subscriber in exchange 2 zone 27. Consequently, at the conclusion of the rotary operation of the wipers of the rate and route switch R2310, the relays R1730′ and R1740′ are operated over a circuit including the wiper 2317, and the stop relay R1940 operates in the manner previously explained in order to terminate the rotary stepping of the wipers of the rate and route switch R2310. However, in the present example the stop relay R1940, upon operating, completes, at its contacts 1943, the previously mentioned path for short-circuiting the winding of the switch cutoff relay R1820; this path extends from ground by way of the contacts 1943, the winding of the switch cutoff relay R1820, the contacts 2043 of the operated special service relay R2040, the conductor C2391, and the contacts 1731′, to ground. At this point it is noted that the above traced path for short-circuiting the winding of the switch cutoff relay R1820 is completed due to the operation of the special service relay R2040, which relay occupies its operated position only when the call is initiated at a subscriber substation in exchange 4 zone 84 which is rendered extended service and includes a primary selector, for example the primary selector 441 in the second group, as previously explained.

Accordingly, in the present example the switch cutoff relay R1820 does not operate to arrest the operation of the switch pulse relay R1830. As a result thereof the switch pulse relay R1830 again operates and restores in order to complete again and then interrupt, as its contacts 1831, the previously traced circuit for energizing the rotary magnet RM2320, whereby the last-mentioned magnet again operates and restores in order to drive the wipers of the rate and route switch R2310 an additional step in the rotary direction into engagement with the seventh contacts in the fifth level of the associated contact banks. Accordingly in the present example, the switch pulse relay R1830 operates and restores once subsequent to the operation of the stop relay R1940, whereby there is completed and then interrupted, at its contacts 1832, a circuit including the contacts 2325 of the vertical off-normal switch springs RS2324, the conductor C2361 extending to Fig. 19, the contacts 1942 and 1832, and the lower winding of the detector cutout relay R1950. When thus energized the detector cutout relay R1950 operates to complete, at its contacts 1951, an obvious holding circuit including the contacts 2131 for maintaining the relay in its operated position over a circuit including its upper winding; and it prepares, at its contacts 1952, a point in the circuit including the conductors C2389 and C2372, for energizing the lower winding of the release relay R2210 after all of the routing digits have been transmitted by the register translator 1700. Subsequently when the grounded wiper 2303 of the digit sequence switch T2300 engages the thirteenth contact in its associated contact bank terminating the conductor C2372 the above-mentioned circuit, including the contacts 1952 and the conductor C2389, is completed for energizing the lower winding of the release relay R2210 in order to cause the latter relay to operate. Accordingly when the detector cutout relay R1950 operates it renders the release of the register translator 1700 under the direct control of the digit sequence switch T2300 independent of the operation of the storage transfer switch U2820. Also the detector cutout relay R1950, at its contacts 1953, interrupts a further point in the previously traced circuit for energizing the detector start relay R1760, thereby positively to prevent the operation of the latter relay and the consequent operation of the detector 2900. Finally the detector cutout relay R1950, at its contacts 1954, completes a connection between the conductors C2771 and C2369, thereby to render the operation of the digit sequence switch T2300, in advancing its wipers from the eleventh and twelfth contacts in its associated contact banks in order to transmit the last two digits from the register translator 1700, independent of the operation of the last digit send relay R1720. The last digit send relay R1720 may not be operated under control of the storage transfer switch U2820, in the manner previously explained, and the latter switch is not operated in the present example.

When the grounded wiper 2317 of the rate and route switch R2310 disengages the sixth contact in the fifth level in its associated contact bank the previously traced circuit for energizing the lower winding of the extended service free routing relay R1730′ in series with the upper winding of the rate relay R1740′ is interrupted, thereby to cause the latter relays to restore to normal. When the relay R1730′ restores, at its contacts 1731′, its interrupts a point in the previously traced circuit for short-circuiting the winding of the switch cutoff relay R1820, whereby the circuit including the contacts 1943 for energizing the relay R1820 is again completed. When thus energized the switch cutoff relay R1820 operates to interrupt, at its contacts 1822, the previously traced circuit for energizing the switch pulse relay R1830, thereby to arrest further operation of the latter relay and, consequently, further operation of the rate and route switch R2310.

At this time the wipers of the rate and route switch R2310 engage the seventh contacts in the fifth level of their associated contact banks, whereby a route is established from exchange 4 zone 84 to exchange 2 zone 27 which excludes a toll ticket repeater, such as the toll ticket repeater 800, and includes a toll selector repeater, such as the toll selector repeater 5200, as explained more fully below.

Also, upon operating, the switch cutoff relay R1820, at its contacts 1821, causes the operation of the digit pulse start relay R1710, in a manner previously explained, and the latter relay completes, at its contacts 1716, a circuit including the conductor C1777 whereby the wiper 2304 of the digit sequence switch T2300 successively applies ground potential to the conductors terminated in the contact bank thereof. In the present example it will be assumed that the seventh contacts in the fifth level of the contact banks associated with the wipers 2311 to 2317, inclusive, of the rate and route switch R2310, are connected in the same manner as the sixth contacts in the fifth levels, as illustrated in the drawings. However, since the connection in the present example is to be routed by way of the toll selector repeater 5200, the jumpers connected to the contacts in the banks engaged by the wipers 2312, 2313 and 2314 are respectively jumpered to the third, second and first marking conductors in the cable 2385. With the seventh contacts in the fifth levels engaged by the wipers of the rate and route switch R2310 jumpered in the manner explained above, the digit sequence switch T2300 causes the wiper 2304 thereof to successively engage the first, second, third, fourth and fifth contacts in its associated contact bank, whereby the first, second and third routing digits "3," "2" and "2" are transmitted from the register translator 1700 in the manner explained previously. When the wiper 2304 engages the sixth, seventh and eighth contacts the wiper 2304 is immediately driven above these contacts into engagement with the ninth contact in its associated contact bank. Consequently the digits registered in the first, second and third code switches A2400, B2410 and C2500 are not transmitted in order to route the call to the desired destination in the present example. The wiper 2304 then successively engages the ninth, tenth, eleventh and twelfth contacts in its associated contact bank, whereby the four numerical digits "1," "2," "3" and "4" are successively transmitted by the register translator 1700, in the manner previously explained. Accordingly, when the wipers of the digit sequence switch T2300 disengage the twelfth contacts in their associated contact banks, the routing digits required to extend the connection from the calling subscriber at substation TX in exchange 4 zone 84 to the desired called subscriber in exchange 2 zone 27 have been completely transmitted by the register translator 1700. When the wiper 2303 of the digit sequence switch T2300 engages the thirteenth contact in its associated contact bank, ground potential is extended by way of the conductor C2372 extending to Fig. 19, the contacts 1952 of the energized detector cutout relay R1950, the conductor C2389, and the lower winding of the release relay R2210 to battery. The ultimate release of the register translator 1700, as a result of the operation of the release relay R2210, and the release of the primary register 1200, are the same as those previously described.

In view of the foregoing explanation of the mode of operation of the register translator 1700, it will be understood that it operated as described above to transmit the three routing digits "3," "2" and "2" and the four numerical digits "1," "2," "3" and "4" all in impulse digit form over the conductor C1283 to the primary register 1200; and therefrom by way of the conductor C642 and the finder F442 to the primary selector 441, in the manner previously explained. The various items of record information stored in the register translator 1700 in code form are not transmitted over the conductor C1394 to the primary register 1200 in the present example, in view of the fact that the operated detector cutout relay R1950 positively prevents operation of the detector start relay R1760 and the consequent operation of the code pulse relay R1850.

The primary selector 441 responds to the first routing digit "3" in order to select the group of trunks, including the trunk 5201 extending to the group of toll selector repeaters, including the toll selector repeater 5200; and then operates automatically to select an idle trunk in the group mentioned, such, for example, as the trunk 5201 extending to the toll selector repeater 5200. The toll selector repeater 5200 responds to the second routing digit "2" in order to select the group of trunks, including the trunk 5626 extending to the group of incoming selectors including the incoming selector 5601 in exchange 2 zone 27. The toll selector repeater 5200 then operates automatically to select an idle trunk in the group mentioned, such, for example, as the trunk 5626 extending to the incoming second selector 5601. The toll selector repeater 5200 receives the third routing digit "2" and repeats the same to the incoming second selector 5601 whereupon the incoming second selector 5601 responds to the third routing digit "2" to select an idle selector, such as the selector 5602 in exchange 2 zone 27. The toll selector repeater 5200 then repeats the four numerical routing digits "1," "2," "3" and "4" over the trunk 5626 whereupon the selector 5602, the selector 5603 and the connector 5604 respond in a well known manner to select the line terminal of the subscriber extending to the called subscriber substation in exchange 2 zone 27, in accordance with conventional practice.

Referring now to the toll selector repeater 5200, attention is directed to the fact that the primary selector 441 responds to select the trunk 5201, and consequently the toll selector repeater 5200, it operates in the same manner as has been described hereinbefore in connection with the detailed description of the primary selector 600. Thus the second routing digit "2" is transmitted by the register translator 1700 over the conductors C1283 and C642 to the finder F442, and therefrom by way of the primary selector 441 over the conductor C5203 of the trunk 5201 to the lower winding of the line relay R5230. Accordingly the line relay R5230 is controlled over a circuit including only its lower winding at the present time. The first time the relay R5230 operates, at its contacts 5232, it completes an obvious circuit for energizing the winding of the release relay R5240, thereby to cause the latter relay to operate and, at its contacts 5231, it prepares a point in a circuit, traced hereinafter, for repeating impulses received by the toll selector repeater 5200 to the seized trunk line in order to control the subsequent switches enumerated above. Upon operating the release relay R5240, at its contacts 5242, applies ground potential by way of the contacts 5274 to the conductor C5204 in order to maintain the switch-through relay in the primary selector 441 in its operated position and, at its contacts 5243, it prepares a point in a circuit, traced hereinafter, for controlling the vertical magnet M5214. As a further result of the operation of the release relay R5240, at its contacts 5241 it opens a point in the incomplete circuit for the release magnet M5216, and, at its contacts 5244 it prepares a point in the circuit for subsequently controlling the lower winding of the control relay R5250. In response to the two pulses constituting the second routing digit "2" the line relay R5230 restores and reoperates twice, thereby to complete and then interrupt, at its contacts 5233, the circuit for controlling the vertical magnet M5214. Also each time the line relay R5230 completes the above-mentioned circuit for controlling the vertical magnet M5214, a parallel circuit is completed for energizing the winding of the slow-to-release series relay R5270. Due to its slow-to-release characteristics the relay R5270 remains in its operated position during the momentary interruptions of its circuit under control of the line relay R5230. Each time the vertical magnet M5214 is energized it operates to drive a wiper set of the switch mechanism 5210 one step in the vertical direction. When the wiper set is driven one step in the vertical direction the vertical off-normal springs S5217 and S5218 are actuated, the former to prepare a circuit, traced hereinafter, for energizing the winding of the step relay R5280, and the latter to prepare a circuit, traced hereinafter, for energizing the release magnet M5216.

When the series relay R5270 operated in response to the first restoration of the line relay R5230, at its contacts 5274 and 5273, it transferred the circuit for placing ground potential upon the conductor C5204 from the circuit, including the contacts 5242 and 5274, to the circuit including the contacts 5273. Furthermore, at its contacts 5271, the relay R5270 interrupts a point in the incomplete circuit for controlling the rotary magnet M5215 and, at its contacts 5272, a circuit is completed for short-circuiting the winding of the switch-through relay R5290. The latter circuit may be traced from ground by way of the contacts 5273, 5294, 5272 and 5285, the winding of the switch-through relay R5290, and ground at the contacts 5273. Thus during the vertical stepping of the wiper set of the switch mechanism 5210 the relay R5290 is prevented from operating. Also, at its contacts 5272, the relay R5270 completes a circuit for energizing the winding of the relay R5280 as soon as the vertical off-normal springs S5217 are actuated, which circuit may be traced from the grounded conductor C5204 by way of the contacts 5294 and 5272, the vertical off-normal springs S5217, and the winding of the step relay R5280, to battery. The step relay R5280 operates when this energizing circuit is completed and, at its contacts 5282, prepares a point in the circuit traced hereinafter for controlling the rotary magnet M5215; and at its contacts 5281 it simultaneously completes a locking circuit for itself by way of the contacts 5285 and the vertical off-normal springs S5217, and a shunting path for further short-circuiting the winding of the switch-through relay R5290.

At the conclusion of the single routing digit "2" transmitted to the line relay R5230, the wiper set of the switch mechanism 5210 occupies its second vertical position. The series relay R5270 subsequently restores to normal since the circuit therefor it now open at the contacts 5233 and, at its contacts 5274, it reapplies ground potential to the conductor C5204 over the circuit including the contacts 5242. Also, at its contacts 5271, the relay R5270 completes a circuit for energizing the rotary magnet M5215, which circuit may be traced from ground by way of the contacts 5274, 5242, 5294, 5271 and 5282, and the winding of the rotary magnet M5215, to battery. When thus energized the rotary magnet M5215 operates to drive the wiper set of the switch mechanism 5210 one step in the rotary direction and to interrupt, at the contacts 5285, the previously traced holding circuit for energizing the winding of the step relay R5280, thereby to cause the latter relay to restore. Upon restoring the step relay R5280 interrupts, at its contacts 5282, the previously traced circuit for energizing the rotary magnet M5215, thereby to cause the latter magnet to restore. Upon restoring the rotary magnet M5215 completes, at the contacts 5285, a connection between the test wiper 5213 and the winding of the step relay R5280. Also the wiper set of the switch mechanism 5210 engages the first contact in the second level of the associated contact banks; and further operation of the toll selector repeater 5200 is continued in the event the first trunk in the group, including the trunk 5626, is busy at this time. More particularly, ground potential appears upon the control conductor of the last-mentioned trunk in the event this trunk is busy. Assuming that the trunk mentioned is busy at this time, ground potential appearing on the control conductor thereof is applied to the test wiper 5213 and extended therefrom by way of the contacts 5292 and 5285, the vertical off-normal springs S5217, and the winding of the step relay R5280 to battery, thereby to cause the latter relay to reoperate. When the step relay R5280 is thus reoperated the previously traced circuit for operating the rotary magnet M5215 is recompleted in order tto drive the wiper set of the switch mechanism 5210 an additional step in the rotary direction, whereupon the wiper set engages the next trunk in the group mentioned.

Assuming that the trunk 5626 is the first idle trunk in the group, when the wiper set of the switch mechanism 5210 engages the contact set terminating the trunk 5626, no ground potential appears upon the control conductor thereof, and a circuit is then completed for energizing the winding of the switch-through relay R5290 in series with the winding of the step relay R5280. This circuit may be traced from the grounded conductor C5204 by way of the winding of the switch-through relay R5290, the contacts 5285, the vertical off-normal springs S5217, and the winding of the step relay R5280 to battery. When this circuit is completed the switch-through relay R5290 operates, but due to the resistance of the latter relay the step relay R5280 does not operate in series therewith. When thus operated the switch-through relay R5290 prepares, at its contacts 5293, a circuit whereby ground potential returned from the incoming second selector 5601 completes a holding circuit for maintaining the switch-through relay in its operated position and for retaining ground potential on the conductor C5204. Also, upon operating the switch-through relay R5290, at its contacts 5291, completes a loop circuit for energizing the line relay (not shown) in the incoming second selector 5601, thereby to seize the latter selector. This loop circuit includes the line conductor of the trunk 5626, the wipers 5211 and 5212 of the switch mechanism 5210, and the contacts 5231, 5251, and 5291. Also, at the contacts 5295, the switch-through relay R5290 interrupts a further point in the circuit for the vertical magnet M5214.

When the above-mentioned loop circuit is completed for the incoming second selector 5601, the latter selector is seized and prepared for further operation. When the third routing digit "2" is transmitted by the register translator 1700 to the line relay R5230 in the toll selector repeater 5200, the line relay responds in the manner previously described, thereby to interrupt, at its contacts 5231, the above-mentioned loop circuit for controlling the line relay (not shown) in the incoming second selector 5601. Thus the line relay R5230 repeats the impulses constituting the digit "2" to the incoming second selector 5601, thereby to cause the latter switch to operate and select an idle trunk extending to an idle selector, such as the selector 5602. The remaining numerical digits "1," "2," "3" and "4" transmitted by the register translator 1700 are also repeated by the line relay R5230 in the above-described manner, thereby to cause the selector 5602, the selector 5606, and the connector 5604 to complete the connection to the desired called subscriber in exchange 2 zone 27.

The release of this established connection between the calling private subscriber substation TX in exchange 4 zone 84 and the called subscriber substation in exchange 2 zone 27 is under control of the subscriber at the calling private subscriber substation TX and is effected in the manner previously explained. However, in the present example the call is not ticketed in view of the fact that the items of record information are not transmitted by the register translator 1700, and in view of the further fact that a toll ticket repeater, such as the toll ticket repeater 800, is not associated with the connection, as previously explained.

Referring again to the toll selector repeater 5200, attention is directed to the fact that when the register translator 1700 and the primary register 1200 have been released from the established connection a loop circuit including the calling subscriber line 401 is extended directly to the line conductors C5202 and C5203, thereby to complete a circuit for the line relay R5230 which includes both the upper and lower windings thereof. This latter circuit now includes the upper winding of the control relay R5250, the normally closed contacts of the cam springs S5219, the upper winding of the line relay R5230, the conductor C5202 extending to the primary selector 441 and therefrom to the line switch 421, the line conductor C402 of the line 401, and returning by way of the line conductor C403 of the line 401 over the above-traced path including the line switch 421, the primary selector 441, the conductor C5203, and the lower winding of the line relay R5230. Thus the line relay R5230 is now under the direct control of the calling subscriber at substation TX. The control relay R5250 operates when the circuit is completed for its upper winding and, at its contacts 5253, it completes an energizing circuit for its lower winding which includes ground at the contacts 5244. The relay R5250 is retained in its operated position over the latter circuit and, at its contacts 5252, it applies ground potential by way of the cam springs S5219 to the upper winding of the line relay R5230, thus short-circuiting the upper winding of the control relay R5250. Also, at its contacts 5251, the relay R5250 removes the short-circuit from across the impedance 5260 and thus bridges the holding impedance 5260 across the talking circuit including the above-mentioned wipers. Accordingly the holding impedance 5260 is switched into the circuit when the pulsing has been completed by the register translator 1700.

In this connection it is also to be noted that the series relay R5270 is retained in its operated position during the time each digit is repeated by the line relay R5230 and, at its contacts 5275, short-circuits the impedance 5275, and subsequent to the transmission of the last pulses of the last digit by the register translator 1700 it slowly restores to normal. At this time the impedance 5260 is connected across the talking contacts 5275 and when the relay R5270 restores it interrupts the loop circuit including the wipers 5211 and 5212. The impedance 5260, however, is retained in the circuit and thus eliminates any tendency of the relay R5270 to transmit an extra pulse via its contacts 5275.

Under certain operating conditions it may be advisable to include the toll selector repeater 5200 in a connection which is to be established under the direct control of the calling subscriber's dial in which case the line relay R5230 would initially be operated over a loop circuit including its upper and lower winding and the upper winding of the control relay R5250. The line relay R5230 and the control relay R5250 operate in series over this circuit, the former relay completing the operating circuit for the release relay R5240 and the latter completing a locking circuit for its lower winding from ground at the contacts 5244 of the now operated release relay R5240. Also, at its contacts 5252, the relay R5250 short-circuits its upper winding and, at its contacts 5251, it bridges the impedance 5260 across the talking conductors of the toll selector repeater 5200. Each time the line relay R5230 responds to a series of impulses of a digit the series relay R5270 is operated and is retained in its operated position for a short interval after the last impulse of the series is received. Consequently, at its contacts 5275, the relay R5270 short-circuits the impedance 5260 each time a series of impulses of a digit are repeated by the line relay R5230. With this arrangement the toll selector repeater 5200 operates in response to a first digit to select an idle trunk in the manner previously explained and thereafter it repeats the impulses of remaining digits received thereby over the selected trunk to control subsequent switches in the switch train. Thus the impedance 5260 is connected in the circuit, when the relay R5270 restores after each digit, in order to prevent the contacts 5275 thereof from falsely transmitting an additional impulse.

The release of the established connection between the calling subscriber substation TX and the called subscriber in exchange 2 zone 27 is primarily under control of the calling subscriber substation TX, and is effected when the latter subscriber replaces the receiver of the telephone instrument thereat upon its associated switchhook. When the calling subscriber replaces his receiver upon its associated switchhook the above traced loop circuit for the line relay R5230 is interrupted, thereby causing the latter relay to restore and thus interrupt the energizing circuit for the release relay R5240, which also restores. When the release relay R5240 restores, at its contacts 5241 it completes a circuit from ground by way of the contacts 5274 and 5241, the vertical off-normal springs S5218, and the winding of the release magnet M5216, to battery, whereupon the release magnet M5216 operates in a well known manner to cause the wipers of the switch mechanism 5210 to restore to their normal rotary and vertical positions. Also, at its contacts 5241, the release relay R5240 interrupts the above-traced holding circuit for the relay R5250, thereby to cause the latter relay to restore.

In the foregoing explanation of the mode of operation of the toll selector repeater 5200 it was assumed that there was an idle trunk in the group, including the trunk 5626, extending to exchange 2 zone 27; however, it may occur that there is no idle trunk in the group mentioned at this time. In this event the step relay R5280 and the rotary magnet M5215 interact in the manner previously explained whereby the wiper set of the switch mechanism 5110 is driven in a rotary direction eleven steps away from its normal position in order to engage the eleventh rotary step cam springs S5219 and S5220. When the cam springs S5220 are actuated, the lower winding of the control relay R5250 is energized whereby the latter relay operates and, at its contacts 5253, completes a locking circuit for its lower winding which is independent of the initial energizing circuit therefor. When the set of cam springs S5219 is actuated, the direct ground potential connected to the upper winding of the line relay R5230 by way of the contacts 5252, is substituted by the busy tone signal applied to the busy tone conductor. Consequently, when the register translator has transmitted all of the routing digits, the register translator 1700 and the primary register 1200 are disconnected, in the manner previously explained, and the toll selector repeater 5210 is driven in a rotary direction eleven steps away the busy tone signal is transmitted to the calling subscriber to indicate that the connection cannot be completed at the present time. The calling subscriber will then replace the receiver of the telephone instrument upon its associated switchhook, thereby to interrupt the previously traced loop circuit extending to the line relay R5230 of the toll selector repeater 5200, and thus cause the release of the switching apparatus involved in the connection, in the manner previously explained.

*Free calls*

From the foregoing description of the mode of operation of the toll ticketing system, it is noted that a ticket is printed for each connection, which ticket contains certain items of record information pertaining to the connection, including the directory numbers of the calling and called subscriber stations, the time duration of the connection and the cost thereof. This record is made only in the event the subscriber at the called substation has answered the call and the connection has been retained at least five seconds. If a called subscriber fails to answer a call or if the called line is busy when a connection is extended thereto, no record is printed and the apparatus involved in the connection is automatically restored to normal when the calling subscriber replaces his receiver upon the switchhook of the associated telephone instrument.

In accordance with established operating practice, connections which are completed between regular calling subscriber lines and called lines extending either to substations at the telephone company business offices or to substations of certain of the telephone company employees, may be completed without assessing a charge therefor. In the present system, calls extended to such lines are recorded in the same manner as all other calls but the individual tickets containing the recorded information for such calls are retained by the billing department of the telephone company and no charge is assessed against the calling subscriber. In view of the fact that all of the printed tickets contain the directory numbers of the calling and called substations involved in the completed connections and, since the billing department of the telephone company has a record of the directory numbers of the telephone company substations, the tickets which are printed in connection with such calls and which should not be assessed against the calling subscriber can easily be segregated from the tickets containing charges which should be assessed against the calling subscriber.

It has also been found that the operating telephone companies prefer to have a record of all calls extended to company substations, including calls which are not answered, are not completed because the called line is busy, or are extended to company lines which are not arranged to transmit the usual supervisory signals. The present system includes facilities for assigning a group of lines for telephone company use and for printing a ticket for each call extended to any substation in the assigned group of lines. More particularly, a ticket will be printed containing a record of the calling and called substation directory numbers on all calls completed to the lines included in the assigned group, including calls to busy lines, unanswered calls, calls which are answered with or without answering supervision, and calls which are abandoned.

It will now be assumed that the thousand lines in the five thousand group of lines in the exchange in zone 62 have been set aside for telephone company use and that the calling subscriber at substation TP in exchange 4, zone 84, has dialed the six digit directory number of one of the substations in this group of lines. More particularly, it will be assumed that the calling subscriber at substation TP has dialed the digits 62 identifying the exchange in zone 62, and the digits 5123, for example, identifying the line terminal of a line extending to a company substation.

Referring now to the register translator 1700, it will be recalled that the six digits of the directory number are respectively registered in the switches A2400, B2410, C2500, D2510, E2520 and F2600. As a result of the registration of the digits "6," "2," and "5," the composite code switch P2330 advances its wipers into engagement with the fifth contact in the ninth level of the associated contact banks, whereupon a circuit is completed for grounding the wiper 2336. It will now be assumed that a jumper, similar to the jumper 2351*b* is connected between the fifth contact in the ninth level of the bank contact engaged by the wiper 2336 and the fifth contact in the ninth level of the bank contact accessible to the wiper 2318 of the rate and route switch R2310. Consequently, the wipers of the rate and route switch 2310 are controlled, in the manner previously explained, to engage the fifth contacts in the ninth levels of their associated contact banks, thereby to select the routing of the present call from exchange 4, zone 84, to the exchange in zone 62 via the toll tandem exchange, which routing requires the four routing digits "2," "1," "6" and "2."

Considering now the jumper arrangement of the fifth contacts in the ninth level of the contact banks respectively associated with the wipers 2311 to 2317, inclusive, of the rate and route switch R2310. The contact engaged by the wiper 2311 is jumpered to the skip conductor C2382; the contacts engaged by the wipers 2312, 2313, 2314 and 2315 are respectively jumpered to the second, first, sixth and second marking conductors in the marking cable 2385; the contact engaged by the wiper 2316 is jumpered to the skip conductor C2382; and the contact engaged by the wiper 2317 is jumpered to the conductor C2397*j*, thereby to complete an energizing circuit including the lower winding of the two and three digit code relay R1710′, the winding of the free call relay R1720′ and the upper winding of the rate relay R1760′, whereupon the relays mentioned operate in series. The rate relay R1760′, upon operating, applied ground potential to the X conductor in the group of WXYZ marking leads 2812 in order to mark the latter leads in accordance with the complementary digit "8" of the rate factor digit "3." When the relay R1710 operates, at its contacts 1711′, it completes a circuit for operating the code send relay R1750 under control of the timer switch M2260, in the manner previously explained. When the free call relay R1720′ operates, at its contacts 1721′, it applies ground potential to the marking lead 2816 in order to control the toll ticket repeater to cause a record to be printed of the present call whether or not it is answered at the called subscriber station.

With the fifth contacts in the ninth levels of the rate and route switch connected in the manner described above, the routing digits "2," "1," "6" and "2," followed by the digits "5," "1," "2" and "3" respectively, registered in the switches C2500, D2510, E2520 and F2600 are transmitted by the register translator 1700 in the same manner as has been described hereinbefore. Also, the register translator 1700 transfers to the toll ticket repeater 800 all of the information registered in the register translator 1700 and is then released in the manner previously explained.

For the purpose of illustration, it is assumed that the primary selector 600 responds to the first routing digit "2" to seize the toll ticket repeater 800; that the toll selector 5300 responds to the second routing digit "2" to seize the toll line 5625 extending to the toll tandem exchange; that the toll first selector 5608 and the toll second selector 5612 respond to the third and fourth routing digits "6" and "2" to seize an idle selector 5613 in the exchange in zone 62; and that the four numerical digits "5," "1," "2" and "3" control the selector 5613 and an additional selector and connector (not shown) to seize the line terminal of the called line.

Referring now to the toll ticket repeater 800, it will be recalled that the register and timer switch R1100 operates in synchronism with the storage transfer switch U2820 in the register translator 1700 in order to transfer the items of record information registered in the register translator 1700 to the storage devices S1121 to S1135, inclusive, in the toll ticket repeater 800. Accordingly, when the wiper 2823 of the storage transfer switch U2820 engages the fifty-fifth contact in its associated contact bank terminating the grounded marking lead 2816, the mark relay R1860 operates and transmits a direct ground pulse to the step relay R920 and the code relay R910 in the toll ticket repeater 800. The wiper 1103 of the register and timer switch R1100 is now in engagement with the fifth contact in its associated contact bank terminating the conductor C887. When the step relay R910 operates, it completes a circuit which may be traced from ground by way of the contacts 911 and 934, the conductor C978 extending to Fig. 11, the wiper 1103 and the engaged fifth contact in its associated contact bank, the conductor C887, and the winding of the magnet SM1117, to battery. The magnet SM1117 operates when the above traced circuit is completed and subsequently restores when the wiper 1103 of the register and timer switch R1100 is advanced into engagement with the sixth contact in its associated contact bank. The magnet SM1117 consequently advances the wipers 1111 to 1116, inclusive, of the storage transfer switch S1110 one step in a counterclockwise direction from the home contact position into engagement with the first contact positions in their associated contact banks.

From the foregoing description of the mode of operation of the register translator 1700 in transferring the information registered therein to the toll ticket repeater 800, it is noted that the application of ground potential to the marking lead 2816 automatically controlled the storage transfer switch S1110 to advance its wipers into engagement with the first contacts in their associated contact banks. The toll ticket repeater 800 is thus conditioned to cause a ticket to be printed of the items of record information stored in the code storage devices S1121 to S1135, inclusive, as soon as it is released by the calling subscriber at substation TP. It may be well to mention at this time that the wipers of the storage transfer switch S1110 ordinarily are not advanced one step into engagement with the first contacts in the associated contact bank until the answer relay R945 and the answer slave relay R940 in the toll ticket repeater 800 are operated in response to the called subscriber answering the call. Consequently, if the answer relay R945 is not operated, the wipers of the storage transfer switch S1110 ordinarily remain in engagement with the home contacts of their associated contact banks and a ticket is not printed of the connection.

In the present example, the wipers of the storage transfer switch S1110 are advanced into engagement with the first contacts immediately after the items of record information are transferred to the storage devices C1121 to S1135, inclusive, and a record will be printed of the items stored therein when the toll ticket repeater 800 is released by the calling subscriber, in the manner previously explained, even though the answer relay R945, and the answer slave relay R940 are not operated.

Since the operation answer relay R945 and the answer slave relay R940 also control the operation of the register and timer switch R1100, the units time switch U1010, and the ten and hundred time switch D1020 to register the time duration of a particular connection, it will be apparent that the time duration of a connection will not be registered therein and a record thereof will not be printed on the associated ticket in the present example. If the present call is answered, however, the answer relay R945 and the answer slave relay R940 will be operated and the printed ticket will also include the time duration of the connection and the cost thereof in the same manner as has been previously described for connections extended via the toll ticketing repeaters and answered by the called subscriber.

In the event the present connection is extended to the called line, in the manner described above, and the answer relay R945 is not operated, either because the called line is busy when the connection is extended thereto or because the party has failed to answer the connection, the calling subscriber upon replacing his receiver upon the switchhook of the telephone instrument causes the release of the connection, in the manner previously explained. In the toll ticket repeater 800 the impulse relay R960 restores to normal when the calling subscriber releases the connection and interrupts the circuit for the hold relay R840, which also restores. The relay R840, upon restoring, at its contacts 842, completes the previously traced circuit for energizing the busy relay R810 thereby to cause the latter relay to operate and to complete, at its contacts 813, the previously traced circuit, including conductor C890, whereby an idle printer controller, such as, for example, the printer controller 4200, is associated with the toll ticket repeater 800, all in the manner previously explained. The operation of the printer controller 4200, the toll ticket repeater 800 and the recording apparatus is the same as has been described hereinbefore and it will be understood that a ticket is printed containing the items of record information pertaining to the connection including the directory numbers identifying the calling and the called lines. If the party on the called line answers the connection, the time duration of the connection and the cost of the call will also be printed on the ticket in the manner previously described.

If the call, in the present example, is extended to a called line which is not arranged to operate the answer relay R945 when the party thereon answers the connections, that is, a line which is not equipped to return answering supervision to the answer relay R945, the conversational connection between the calling and called subscriber will be completed but the toll ticket repeater 800 will not be controlled to register the time duration of the connection. The release of the connection will take place when the calling subscriber releases and a record of the items of record information pertaining to the connection will be printed on the associated ticket in the manner described, but the record of time duration of the conversation and the cost of the call will be omitted.

Accordingly, a ticket will be printed for each connection extended to any one of the thousand lines included in the five thousand group of lines identified by the two-digit code 62 whether or not the answer relay R945 is operated. If the answer relay R945 is not operated, the ticket will include the various items of record information including the directory numbers of the calling and called lines, and if the answer relay R945 is operated, the ticket will also include the time duration of the connection and the cost of the call.

*Interception of calls*

Now assume that a call has been initiated at any subscriber substation in exchange 4 zone 84, such, for example, as the private subscriber substation TP; that the line switch 423 has seized the trunk 462 extending to the primary selector 600; and that the finder F610 has seized the conductors individual to the primary register 1200. At this time the primary register 1200 is in readiness to receive the full complement of digits dialed at the calling private subscriber substation TP which is indicative of either a local call requiring no translation or a call requiring translation, as previously explained. Now assume that the subscriber dials several digits less than a full complement of digits, which indicate that the call must be translated by the register translator. When the first and second code digits are respectively registered in the first and second code switches A1500 and B1510 in the primary register 1200, the register translator allotter 1600 is controlled to assign an idle register translator such, for example, as the register translator 1700, whereupon the finder F2290 operates in order to connect the register translator 1700 to the primary register 1200. When thus connected the switching relay R2280 and the hold relay R2130 in the register translator 1700 operate, the switching relay R2280 causing operation of the timer relay R2270 every five seconds thereafter, whereby the wipers of the timer switch M2260 are advanced step by step in the counterclockwise direction one step every five seconds, all in the manner previously explained.

In the present example the complements of the first four digits registered in the primary register 1200 are transmitted and registered in the register translator 1700, and the fifth etc. digits are repeated directly by the primary register 1200 to the register translator 1700 for registration. However, in the present example, in view of the fact that less than a full complement of digits is registered in the register translator 1700, it cannot operate fully to transmit the necessary routing, code and numerical digits to effect the operation of the outgoing switch train to complete the desired connection. Accordingly, in the present example the register translator transmits the routing digit, the code digit or digits, and whatever numerical digits are registered therein, all in the manner previously explained. However, it is not released in view of the fact that the full complement of digits is not registered therein. Hence the register translator 1700 is retained in its operated position after it has transmitted all of the digits possible and is retained connected to the primary register 1200 for a time interval of thirty-five seconds determined by the timer switch M2260. The normal operation of the register translator 1700 requires only a fraction of the time interval mentioned; and, in the event the register translator 1700 is retained connected to the primary register 1200 for thirty-five seconds, the wiper 2261 of the timer switch M2260 engages the seventh contact in its associated contact bank terminating the conductor C2385 while the timer relay R2270 occupies its operated position. This application of ground potential to the conductor C2385 completes a circuit, including the contacts 2273 of the operated timer relay R2270, the contacts 1765 of the operated detector start relay R1760, the conductor C2392 extending to Fig. 23A, and the contacts 2326 of the vertical off-normal springs RS2324, for energizing the release magnet RM2322, whereby the latter magnet operates in order to cause the wipers of the rate and route switch R2310 to be returned to their normal rotary and vertical positions. When the rate and route switch R2310 is thus released the vertical off-normal springs RS2324 are actuated to interrupt, at the contacts 2326, the above-mentioned circuit for energizing the release magnet RM2322 and to interrupt, at the contacts 2325, the previously traced holding circuits for maintaining the transfer relay R1930 and the digit stop relay R1940 in their operated positions, whereupon the relays mentioned restore.

Upon restoring the stop relay R1940 interrupts, at its contacts 1943, the previously traced circuit for energizing the winding of the switch cutoff relay R1820, thereby to cause the latter relay to restore and effect the restoration of the digit pulse start relay R1710. Upon restoring, the digit pulse start relay R1710 interrupts, at its contacts 1718, the previously traced circuit for applying ground potential to the negative line wiper 702 of the switch mechanism 700 in the primary selector 600, thereby to effect the release of the switch train ahead of the switch mechanism 700 and the consequent release of the primary selector 600, all in the manner previously explained. Also, application of ground potential to the conductor C2385 extending to Fig. 23A, by the timer switch M2260, marks the first contact in the first level in the contact bank associated with the wiper 2318 of the rate and route switch R2310. Also, upon restoring, the digit pulse start relay R1710 completes, at its contacts 1712, a circuit including the conductor C1773, the contacts 2135, the conductor C2365, the wiper 2301 of the digit sequence switch T2300 and the engaged contact in its associated contact bank, and the contacts 2306 for energizing the magnet TM2305, whereby the latter magnet operates intermittently under control of the contacts 2306 to drive the wipers of the digit sequence switch T2300 step by step in the counterclockwise direction back into engagement with their home contact positions.

When the wiper 2303 of the digit sequence switch T2300 reengages the home contact in its associated contact bank, a circuit is recompleted for energizing the switch pulse relay R1830, whereupon the latter relay operates and restores intermittently. The intermittent operation of the switch pulse relay R1830 now causes the wipers of the rate and route switch R2310 to be driven into engagement with the first contact in the first level of their associated contact banks under control of the transfer relay R1930 and the stop relay R1940, all in the manner previously explained.

It is noted that the marking of the first contact in the first level in the contact bank associated with the wiper 2318, due to the operated position of the timer switch M2260, positively prevents reoperation of the rate and route switch R2310 under control of the composite code switch P2330. When the wipers of the rate and route switch R2310 engage the first contact in the first level in their associated contact banks, the routing digits "1," "1," "4" and "1" are set up to be transmitted by the register translator 1700, in the manner previously explained. Also upon operating, the stop relay R1940 effects operation of the switch cutoff relay R1820 and the consequent operation of the digit pulse start relay R1710, as previously noted. Upon operating, the digit pulse start relay R1710 effects operation of the detector cutout relay R1950, which relay, upon operating, prevents the operation of the detector start relay R1760 and the consequent operation of the detector 2900, in the manner previously explained. As a further result of the operation of the digit start pulse relay R1710 the digit sequence switch T2300 is sequentially operated, whereby the transmission of the routing digits "1," "1," "4" and "1" from the register translator 1700 to the primary selector 600 is effested, in the manner previously explained. The wiper 2304 of the digit sequence switch T2300 then engages the fifth contact in its associated contact bank, thereby to complete a circuit including the wiper 2316 and the engaged first contact in the first level of its associated contact bank which is jumpered to the conductor C2389 extending to Fig. 21, thereby to complete a circuit for energizing the lower winding of the release relay R2210. When thus energized the release relay R2210 operates in order to effect the release of the register translator 1700 and the consequent release of the primary register 1200, all in the manner previously explained.

The primary selector 600 responds to the first routing digit "1," thereby to select an idle trunk in the group including the trunk 509 extending to the special service selector 503. The special service selector 503 is of the drop-back type, as previously noted, and absorbs the second routing digit "1." The special service selector 503 then responds to the third digit "4" to select an idle trunk in the group, including the trunk 5400, extending to the intercepting operator's position, such, for example, as the trunk 5400 extending to the register translator intercepter trunk circuit 1 at the intercepting operator's position. When the connection is thus extended to the register translator intercepter circuit 1 the line relay R5410 thereat is operated and, at its contacts 5411, completes the energizing circuit for operating the release relay R5420. The latter relay, upon operating, at its contacts 5423 applies ground potential to the control conductor C5403, thereby to retain the special service selector 503 and the primary selector 600 in their operated position. Also, at its contacts 5421, the relay R5420 prepares a circuit for energizing the series relay R5440 in series with the magnet M5460 and, at its contacts 5424, it prepares a point in the circuit, traced hereinafter, for illuminating one of the signal lamps associated with the intercepting operator's position in order to indicate the type of call being received. In response to the last digit "1" transmitted by the register translator 1700, the line relay restores once and, at its contact 5412, completes the above-mentioned circuit for energizing the series relay R5440 in series with the magnet M5460. The relay R5440 being of the slow-to-release type remains in its operated position during the time pulses are being transmitted by the line relay R5410 to the magnet M5460. At its contacts 5441, the series relay R5440 interrupts a point in a circuit, traced hereinafter, for illuminating the above-mentioned signal lamps. In response to the momentary energization of the magnet M5460, the wiper 5461 is advanced one step into engagement with the first contact in its associated contact bank, whereupon a circuit is prepared for illuminating the signal lamp L5482. Shortly after the first pulse has been terminated the series relay R5440 restores to normal and, at its contacts 5441, completes a circuit from ground, the contacts 5424, 5432 and 5441, the wiper 5461 and the engaged first contact in its associated contact bank, the signal lamp L5482, the conductor C5514, and the upper winding of the signal control relay R5510, to battery. In parallel with the above-mentioned circuit for the relay R5510, a circuit is also completed by way of the contacts 5552 for illuminating the alarm lamp L5553. The illumination of the signal lamp L5482 indicates to the intercepting operator that the subscriber at the calling subscriber substation failed to dial a full complement of digits within the previously mentioned thirty-five second time interval after a register translator was seized.

The operator at the intercepting operator position answers the call by actuating the key K5492, thereby to bridge the telephone instrument 5494 across the line conductors C5401 and C5402. When the telephone instrument 5494 is bridged across the line conductors, a loop circuit is completed for energizing the answer relay R5450, whereupon the latter relay operates and, at its contacts 5451, completes an energizing circuit for the winding of the cutoff relay R5430 whereupon the latter relay operates. It may be well to mention at this time that when the magnet M5460 was operated to advance its wiper 5461 into engagement with the first contact in its associated contact bank, the off-normal springs S5425 were actuated to complete a circuit for transmitting ringing tone by way of the contacts 5431 and the conductor C5402 in order to indicate to the calling subscriber that a signal is being transmitted. As far as the calling subscriber is concerned the ringing tone signal indicates that the desired called subscriber is being signaled. When the cutoff relay R5430 operates, as mentioned above, at its contacts 5431 it disconnects the ringing tone signal from the conductor C5402; at its contacts 5432 it interrupts the previously traced circuit for illuminating the lamp L5482; and, at its contacts 5433, it completes a holding circuit for itself, whereby the relay R5430 is retained in its operated position under control of the calling subscriber as well as under control of the intercepting operator.

When the intercepting operator answers the call, she advises the subscriber at the calling private subscriber substation TP that he did not dial a full complement of digits identifying the directory number of a called subscriber substation and that he should release the present connection and again attempt the extension of the toll call. When the calling subscriber at substation TP replaces the receiver on the hook switch of his associated telephone instrument, the loop circuit for energizing the line relay R5410 is interrupted whereupon the latter relay restores to normal and interrupts the energizing circuit for the slow-to-release relay R5420. The latter relay subsequently restores to normal and, at its contacts 5422, completes a circuit from ground by way of the contacts 5412 and 5422, and the off-normal springs S5426, for energizing the winding of the release magnet M5470. It is noted at this time that the off-normal springs S5426 were actuated together with the off-normal springs S5425 when the wiper 5461 was driven one step in the counterclockwise direction by the operation of the magnet M5460. As a further result of the restoration of the release relay R5420, at its contacts 5423 it removes ground potential from the control conductor C5403, thereby to cause the special service selector 503 and the primary selector 600 to restore to normal in the manner previously explained. Also, at its contacts 5420, the relay R5420 interrupts a point in the holding circuit for the cutoff relay R5430. In response to the operation of the release magnet M5470 the wiper 5461 is automatically restored in a clockwise direction to its original starting position, thereby to actuate the off-normal springs S5425 and S5426. The latter off-normal spring interrupts the previously traced energizing circuit for the release magnet M5470 thereby to cause the magnet to restore. The intercepting operator may now disconnect her telephone instrument 5494 from the register translator intercepter circuit 1 by restoring the key K5492 to the normal position illustrated in the drawings. As a result thereof, the loop circuit for energizing the answer relay R5450 is interrupted, thereby to cause the latter relay to restore and interrupt, at its contacts 5451, the remaining holding circuit for the cutoff relay R5430. When the cutoff relay R5430 restores to normal the register translator intercepter circuit 1 is again available for further connections to the intercepting operator.

It will now be assumed that the calling subscriber at substation TP has dialed the full complement of the directory number of a called subscriber substation and that these digits have been properly registered in the register translator 1700 in the manner previously explained. When the digits mentioned are registered in the register translator 1700 the composite code switch R2330 and the rate and route switch R2310 are operated, as previously explained. The digit sequence switch T2300 is then controlled in order to begin the transmission of the routing digits established by the operated position of the rate and route switch R2310. After the first routing digit has been transmitted the digit stop relay R1910 operates in order to effect operation of the special service cutoff relay R1810; and shortly thereafter the digit stop relay R1910 restores in order to effect operation of the detector start relay R1760. Upon operating, the detector start relay R1760 initiates operation of the detector 2900, all in the manner previously explained. In the event the detector 2900 fails to detect the line terminal of the calling private subscriber substation TP after two cycles of operation thereof, and consequently two attempts to detect the calling line, ground potential is applied to the conductor C3301 extending to the register translator 1700, thereby to cause the operation of the detector failure relay R2250, all in the manner previously explained.

Upon operating, the detector failure relay R2250 completes, at its contacts 2252, the previously traced holding circuit, including the contacts 2137, to retain the relay in its operated position after the detector has been disconnected. Also, at its contacts 2251, the relay R2250 interrupts the previously traced circuit for energizing the detector test relay R2230 in series with the winding of the stop relay R3220 in the detector 2900, whereupon the relays mentioned restore. The restoration of the stop relay R3220 effects the release of the detector 2900, and the restoration of the detector test relay R2230 effects the restoration of the storage relay R2850, all in the manner previously explained. Also, upon operating, at its contacts 2253, the relay R2250 completes the previously traced circuit for energizing the release magnet RM2322, whereupon the latter magnet operates in order to restore the wipers of the rate and route switch R2310 to their normal rotary and vertical positions. When the rate and route switch R2310 is thus released, the vertical off-normal springs RS2324 are actuated, whereby the transfer relay R1930, the stop relay R1940, the switch cutoff relay R1820 and the digit pulse start relay R1710 all restore in the manner previously explained. When the digit pulse start relay R1710 restores it causes the wipers of the digit sequence switch T2300 to be returned automatically to their home contact positions and effects the release of the primary selector 600, in the manner previously explained. Also, the digit pulse start relay R1710 effects restoration of the detector start relay R1760 and the special service cutoff relay R1810. Upon restoring, the detector start relay R1760 recompletes, at its contacts 1764, the previously traced circuit for intermittently operating the switch pulse relay R1830. Further, upon operating, the detector failure relay R2250, at its contacts 2254, applies ground potential to the conductor C2383 which is terminated in the second contact in the first level in the contact bank associated with the wiper 2318 of the rate and route switch R2310.

The intermittent operation of the switch pulse relay R1830 causes the wipers of the rate and route switch R2310 to be driven into engagement with the second contacts in the first level in their associated contact banks in the manner previously explained. When the wipers of the rate and route switch R2310 engage the second contacts in the first level of their associated contact banks, the routing digits "1," "1," "4" and "2" are set up to be transmitted by the register translator 1700. When these routing digits have been transmitted as a result of the sequential step by step operation of the digit sequence switch T2300 in advancing its wiper 2304 over the first five contacts in its associated contact bank, a circuit is then completed including the wiper 2316 of the rate and route switch R2310 for operating the release relay R2210. When thus operated the release relay R2210 causes the release of the register translator 1700 and the consequent release of the primary register 1200 all in the manner previously explained.

The primary selector 600, the special service selector 503, and the register translator interceptor circuit 1, assuming these switches to be idle when the routing digits are transmitted by the register translator 1700, all operate in the manner previously explained. However, the final digit "2" transmitted by the register translator 1700 causes the magnet M5460 of the register translator interceptor circuit 1 to advance the wiper 5461 into engagement with the second contact in its associated contact bank, whereupon a circuit is completed for illuminating the lamp L5483, in the present example, and thus indicating to the intercepting operator that the present call has been intercepted due to the failure of the detector 2900 to detect the line terminal of the calling subscriber substation.

In the above description of the operation of the apparatus it was assumed that a calling subscriber entitled to make toll calls initiated the particular connection. However, this same type of operation may also be utilized in the event it is desired to deny a particular calling subscriber toll service. More particularly, if a calling subscriber is to be denied toll service, for example, the calling subscriber at substation TD, the identifying conductor S432, by means of which circuits are completed for the detector 2900 to identify the particular calling line, may be disconnected from the line 404 extending to the calling subscriber substation TD, thereby to prevent the detector from actually detecting the line terminal thereof. When the subscriber at substation TD now initiates a toll call in the manner just described, the detector 2900 cannot detect the calling line terminal inasmuch as the identifying conductor S432 is disconnected. The detector will make two attempts to identify the calling line and then cause the register translator to extend the calling line to the intercepting operator in the same manner as has been described above in connection with the operation of the apparatus as a result of a detector failure.

In either event the operator at the intercepting operator position will answer the call in the manner described hereinbefore and advise the subscriber at the calling private subscriber substation TP to release the present connection and again attempt to extend the toll call if the subscriber is entitled to such service or inform the subscriber at substation TP that he is not entitled to make toll calls if he is denied such service. The subsequent release of the connection is the same as has been described hereinbefore.

It will now be assumed that a call has been initiated by the private subscriber at substation TP and that he has dialed the directory number of a called subscriber substation having either a two or a three digit code which in fact does not identify any called zone or exchange. In other words the calling subscriber at substation TP has dialed a code of a non-assigned exchanged. When these digits are registered in the register translator 1700 in the manner previously explained, the composite code switch P2330 is operated in a vertical and rotary direction in accordance with the complements of the second and third code digits, and the particular wiper of the composite code switch P2330 is selected in accordance with the complement of the first code digit registered. Since the selection of the particular wiper of the composite code switch P2330, in conjunction with the particular vertical and rotary position thereof does not correspond to any assigned called office code, there is no marking by way of a jumper, such as the jumpers **2351*a* and 2351*b* between the contact in the contact bank engaged by the selected wiper of the composite code switch P2330 and a contact in the contact bank associated with the wiper 2318 of the rate and route switch R2310. In the present example the wipers of the rate and route switch R2310 are operated to engage the tenth contact in the tenth level of their associated contact banks under control of the transfer relay R1930 and the stop relay R1940, in view of the fact that no contact in the contact bank associated with the wiper 2318 is marked with ground potential, except the tenth contact in the tenth level in the contact bank mentioned. The digit sequence switch T2300 is then controlled in order to begin the transmission of the routing digits established by the operated position of the rate and route switch R2310**, in the manner previously explained.

When the wipers of the rate and route switch R2310 engage the tenth contact in the tenth level in their associated contact banks, the routing digits "1," "1," "4" and "3" are set up to be transmitted by the register translator 1700, in the manner previously explained. Also, upon operating the stop relay R1940 effects the operation of the switch cutoff relay R1820 and the consequent operation of the digit pulse start relay R1710, as previously noted. The digit pulse start relay R1710 effects operation of the digit sequence switch T2300 in the manner previously explained. When the wiper 2304 of the digit sequence switch T2300 is in engagement with the home contact in its associated contact bank, a circuit is completed by way of the wiper 2311 and the engaged tenth contact in its associated contact bank, the conductor C2390 extending to Fig. 17A, the contacts 1714, and the upper winding of the detector cutout relay R1950, to battery. The detector cutout relay R1950, upon operating, prevents the operation of the detector start relay R1760 and the consequent operation of the detector 2900 in the present example. The wiper 2304 of the digit sequence switch T2300 then successively engages the first, second, third and fourth contacts in its associated contact bank, thereby to cause the routing digits "1," "1," "4" and "3" to be transmitted by the register translator 1700. The wipers 2304 then engage the fifth contact in its associated contact bank, thereby to complete the previously traced circuit including the conductor C2389 for energizing the lower winding of the release relay R2210. When thus energized the release relay R2210 operates in order to effect the release of the register translator 1700 and the consequent release of the primary selector 1200, all in the manner previously explained.

The transmission of the routing digits "1," "1" and "4" by the register translator 1700 controls the primary selector 600 and the special service selector 503 to extend the connection to the register translator interceptor circuit 1, in the manner previously explained. When the final routing digit "3" is transmitted by the register translator 1700 the line relay R5410 in the register translator interceptor circuit 1 causes the magnet M5460 to advance the wiper 5461 into engagement with the third contact in its associated contact bank, whereupon the lamp L5484 is illuminated to indicate to the intercepting operator that the call extended to her position for interception is due to the fact that the calling subscriber at substation TP has dialed a directory number including a code portion of a non-assigned exchange and zone. The operator at the intercepting operator position answers the call in the manner previously described, and advises the calling subscriber at substation TP that he did not dial the directory number of a called subscriber substation as listed in the telephone directory.

The subsequent release of the primary selector 600, the special service selector 503, and the register translator interceptor circuit 1 is the same as has been described hereinbefore. Attention is directed to the fact that the calls which are intercepted in the manner described hereinbefore may be received over a second trunk, such as the trunk 5400, by the register translator interceptor circuit 2, which circuit is exactly the same as the illustrated register translator interceptor circuit 1, and may be answered by the operation of the key K5493.

*Operation of the supervisory apparatus*

Referring now to Fig. 55, it will be recalled that the signal control relay R5510 operated in series with the circuits for illuminating the lamp L5482, L5483 or L5484. At its contacts 5513, the relay R5510 completes a holding circuit for its lower winding. Also, upon operating, at its contacts 5512 the relay R5510 completes a circuit from ground by way of the contacts 5518, 5512 and 5526 for intermittently operating the control relay R5525. The rate at which the relay R5525 is intermittently operated is determined by the characteristics of the condenser 5528 included in the circuit for the lower winding thereof. The relay R5525 operates intermittently at a rather high rate of speed and, at its contacts 5527, periodically actuates the alarm A5564 in order to signal the intercepting operator. Thus if the intercepting operator is away from her position, or delays in answering the call received over the intercepting circuit, the audible signal intermittently transmitted by the alarm A5564 will call her attention to the fact that a call has been received at her position and that it should be answered.

Referring to the fuse alarm relay R5515, it is noted that if the fuse F5524 is blown, a circuit is completed from negative battery by way of the fuse alarm lamp L5523 and the upper winding of the fuse alarm relay R5515 to ground, thereby to cause the latter relay to operate and complete a holding circuit for itself, including its lower winding and the contacts 5516. As a further result of the operation of the relay R5515, at its contacts 5517 it completes the above-mentioned circuit for intermittently operating the control relay R5525 at a high rate of speed, in order intermittently to actuate the alarm A5568 in the manner described hereinbefore. Due to the illuminated condition of the lamp L5523, the intercepting operator or the exchange attendant, as the case may be, will be apprised of the fact that the fuse has been blown and that the necessary steps must be taken to replace it.

Referring now to the time pulse relays R5555 and R5560, it will be recalled that the data and time unit 3900 continuously transmits five second ground pulses over the conductor C891′, thereby to operate intermittently first the relay R5555 and then, in parallel therewith, the slow-to-operate relay R5560. Upon operating, the relay R5555 moves the weighted spring armature upward to close the contacts 5556 and 5557 and thus complete an energizing circuit for the slow-to-release relay R5550. Upon operating, the relay R5550 at its contacts 5551, completes a locking circuit for itself which includes the contacts 5557 or the contacts 5558. When the relay R5560 operates it interrupts, at its contacts 5561, the energizing circuit for the relay R5555. When the relay R5555 restores, the weighted armature thereon intermittently closes its contacts 5556, 5557 and 5558 thereby to maintain the relay R5550 in its operated position until the next five second pulse is received over the conductor C891′. Before the next five second pulse is received the relay R5560 restores and, at its contacts 5561, it again prepares the circuit for reoperating the relay R5555. When the next five second pulse is received the cycle of operation is repeated. In the event a five second pulse is not received, due to the failure of the date and time unit 3900, the relay R5555 is not periodically operated to maintain the weighted armature in a vibrating condition. Subsequently the weighted armature comes to rest and thereupon opens the circuit for the slow-to-release relay R5550. The relay R5550 subsequently restores and, at its contacts 5552, completes a circuit including the upper winding of the signal control relay R5510 for illuminating the lamp L5553, to indicate the failure of the date and time unit 3900 to transmit five second pulses over the conductor C891′. When the above-traced circuit for illuminating the lamp L5553 is completed, the signal control relay R5510 operates and completes, at its contacts 5512, the previously described circuit for intermittently operating the control relay R5525. The relay R5525 now intermittently operates at a relatively high rate of speed and thus actuates the alarm A5568 accordingly. The rapidity at which the alarm A5564 is actuated indicates that some fault has occurred which should be taken care of rather promptly, and the illuminated condition of the lamp L5553 indicates that the particular fault has occurred as the result of the failure of the date and time unit to transmit the five second pulses over the conductor C891′.

Referring now to the primary register 1200, it will be recalled that the thirty second timer 1330 actuates to cause the operation of the alarm relay R1320 in the event the test relay R1340 fails to operate upon the association of an idle register translator with the primary register 1200. In order to apprise the intercepting operator or exchange attendant of this fact, the alarm relay R1320, upon operating, at its contacts 1323, applies ground potential to the conductor C5514′ extending to Fig. 55 in order to illuminate the primary register alarm lamp L5562 in series with the energizing circuit for the upper winding of the alarm relay R5520. The illuminated condition of the lamp L5562 indicates that the primary register cannot be operated properly at the present time. The relay R5520, upon operating, at its contacts 5521 completes a circuit for energizing the lower winding thereof in parallel with the upper winding and, at its contacts 5522, it completes a circuit including the contacts 5534 for energizing the control relay R5535. The relay R5535 operates as a result of the above-traced energizing circuit and, at its contacts 5537, completes a holding circuit for itself which is independent of its original energizing circuit including the contacts 5534. At its contacts 5536, the relay R5535 completes a circuit, including the contacts 5531, for energizing the vibrating control relay R5445, whereupon the latter relay operates. As a further result of the operation of relay R5535 it causes its weighted armature to vibrate and thus intermittently completes an energizing circuit, at its contacts 5538, for the relay R5530. The weighted armature of the control relay R5535 ultimately comes to rest in engagement with its contacts 5538, whereupon an obvious circuit is completed for energizing the winding of the slow-to-operate relay R5530, which shortly thereafter also operates. Upon operating the relay R5530, at its contacts 5531, interrupts the previously traced circuit for energizing the vibrating control relay R5545 which now restores to normal. The relay R5545 causes its weighted armature to vibrate when the relay is initially operated and also when the relay is restored to normal. Consequently when the weighted armature of the relay R5545 comes to rest with the relay in its operated position, a circuit is completed, by way of contacts 5546 and 5547, for energizing the relay R5540. Upon operating the relay R5540, at its contacts 5542, completes a locking circuit for itself which is independent of its initial energizing circuit and consequently remains in its operated position until the weighted armature of the vibrating control relay R5545 subsequently comes to rest in the position illustrated in the drawings. Inasmuch as the relay R5540 is of the slow-to-release type, it subsequently restores to normal and completes, at its contacts 5541, a circuit for intermittently operating the control relay R5525. In the meantime the slow-to-operate relay R5530 has been operated and, at its contacts 5532, it prepared a point in the above-mentioned circuit for relay R5525, which circuit was completed at contacts 5541 upon the restoration of the relay R5540. Consequently it will be understood that the relay R5540 remains operated until the vibrating armature of the relay R5545 has come to rest in the position shown in the drawings. A circuit is now completed for operating the control relay R5525 which may be traced from ground by way of the contacts 5536, 5532, 5541 and 5526, and the upper winding of the control relay R5525, to battery. Due to the parallel circuit including the lower winding of the relay R5525 and the condensers 5528 and 5529, the relay R5525 intermittently operates at a slow rate of speed, which rate is determined by the characteristics of the condensers 5528 and 5529. The intermittent operation of the control relay R5525, at its contacts 5527, intermittently actuates the alarm A5564 at a rather slow rate of speed, in order to signal the intercepting operator or exchange attendant that a fault has occurred in the operation of the system, and the illuminated condition of the lamp L5562 indicates that the fault has occurred in the operation of the primary register utilized in a connection. The relatively slow rate of speed at which the alarm A5564 is actuated indicates that the particular fault in the operation of the apparatus is not of a serious nature. Thus the intercepting operator or exchange attendant can ascertain by the rate at which the alarm A5564 is actuated whether the fault is one which must be taken care of immediately or one that may be corrected after she has taken care of more urgent matters.

Referring now to the register translator allotter 1600, it will be recalled that when no register translator is available at the time the register translator allotter 1600 is operated, the wiper 1611 thereof applies ground potential to the conductor C1654 extending to Fig. 55, thereby to cause the all-register-translator-busy lamp L5571 to be illuminated in series with the energizing circuit for the upper winding of the alarm relay R5520. The relay R5520 is operated when the above-mentioned energizing circuit is completed and again causes the operation of the various relays in the supervisory apparatus in the manner described hereinbefore, whereby the alarm A5564 is intermittently actuated at a slow rate of speed to indicate the intercepting operator or the exchange attendant that a fault has occurred in the operation of the switching apparatus. The illuminated condition of the lamp L5571 together with the intermittent operation of the alarm A5564 indicates that the particular fault has occurred because a register translator is not available for the completion of a connection.

Referring now to the toll ticket repeater 800, it will be recalled that when the repeater was held for a longer period than is normally necessary to transfer the information stores therein to an associated printer controller, ground potential was applied to the conductor C5568 and caused the illumination of the busy lamp L815 to identify the particular toll ticket repeater involved. Ground potential applied to the conductor C5568 extending to Fig. 55 completes an energizing circuit for the upper winding of the toll ticket supervisory relay R5565, whereupon the latter relay operates and completes, at its contacts 5566, a circuit for energizing its lower winding in parallel with the upper winding thereof. Also, at its contacts 5567, the relay R5565 completes a circuit for illuminating the lamp L5563 in series with the circuit for energizing the upper winding of the alarm relay R5520. The illuminated condition of the lamp L5563 indicates to the intercepting operator or the exchange attendant that a toll ticket repeater has been held in its operated position. The operation of the alarm relay R5520 causes the ultimate intermittent actuation of the alarm A5564, at a slow rate of speed, in the same manner that has been described hereinbefore, in order to apprise the intercepting operator or the exchange attendant that a fault has occurred in the operation of the switching apparatus.

From the foregoing description of the mode of operation of the supervisory apparatus it will be understood that it provides the necessary alarm signals, whereby various faults occurring in the operation of the switching apparatus may be accurately identified and thus quickly corrected in order to avoid any unnecessary delay in reestablishing the normal operation of the exchange switching apparatus.

*Interception of a grounded subscriber line*

Referring now to the primary register 1200, it will be recalled that when a call is extended by a calling subscriber a loop circuit is ultimately completed for energizing the line relay R1370 in series with the upper and lower windings of the party line relay R1360. The latter relay, being of the differential type, does not operate when the above-mentioned energizing circuit is completed. Ordinarily if the ring side of a calling subscriber line, that is the side of the line which is connected to the conductor C641, is grounded, such a fault would be quickly ascertained by the exchange attendant inasmuch as the supervisory equipment normally associated with the line switch individual to such a calling line would be held in its operated position for long periods of time even though the subscriber on the associated line has not initiated a call. The supervisory apparatus associated with the line switch individual to such a calling subscriber line would give an alarm to the exchange attendant, which is conventional operating practice. However, if the tip side of a calling subscriber line, that is the side of the line connected to the conductor C643, is grounded, such a fault may remain for long periods of time without being discovered or corrected, since a ground potential connected to the tip side of the line is not fed to the exchange apparatus until the calling subscriber initiates a connection.

In the present example it will be assumed that such a fault has occurred and that a calling subscriber, whose tip side of the line is grounded, has extended a connection, in the manner described hereinbefore, to the primary register 1200. Consequently the conductor C643 is now grounded and an energizing circuit is completed for the lower winding of the party line relay R1360; simultaneously therewith a circuit was also completed from the grounded tip conductor of the calling subscriber line through the instrument at his substation and the conductor C641 for energizing the upper winding of the party line relay R1360 in series with the winding of the line relay R1370. The relay R1360 now operates inasmuch as the direction currents in the upper and lower windings thereof are in such a direction that the windings aid each other. Upon operating, at its contacts 1362, the relay R1360 prepares a point in the circuit for energizing the start relay R1240. The line relay R1370 also operates in series with the upper winding of relay R1360 and, at its contacts 1371, completes a circuit for operating the auxiliary line relay R1420, and the latter relay, at its contacts 1421, completes an operating circuit for the hold relay R1430, in the manner previously described. The relay R1430, upon operating, at its contacts 1434, completes a circuit for operating the lock relay R1410. At its contacts 1411, the relay R1410 applies ground potential by way of the contacts 1316, the conductor C1294, the wiper 1634 of the sequence switch S1630 and its engaged home contact, the conductor C1289 extending to Fig. 12, and the contacts 1362 and 1252, for energizing the winding of the start relay R1240. The relay R1240 operates when the above-traced energizing circuit is completed and, at its contacts 1243, it completes a locking circuit for itself which is independent of the contacts 1252 and 1362. It may be well to mention at this time that when the conductor C1289 was grounded a circuit was also completed for the dial tone relay R1250, but since this relay is of the slow-to-operate type the above-traced circuit for energizing the winding of the start relay R1240 is completed before the dial tone relay R1250 operates to interrupt the circuit at its contacts 1252.

As a further result of the operation of the start relay R1240, at its contacts 1241, it interrupts the circuit for applying dial tone to the calling line. At its contacts 1242, the relay R1240 completes a multiple circuit for retaining the auxiliary line relay R1420 in its operated position regardless of the fact that the calling subscriber may subsequently actuate his dialing mechanism in order intermittently to operate the line relay R1370. Thus the auxiliary line relay R1420 is prevented from repeating any of the impulses dialed by the calling subscriber. Also, at its contacts 1244, the relay R1240 applies a marking ground potential to one of the contacts in the bank of the finder switch **F1201*a*, for a purpose to be described hereinafter; and finally, at its contacts 1245, it applies ground potential by way of the contacts 1224′ and 1211′ for energizing the upper winding of the pulse relay R1210′. The pulse relay R1210′ intermittently operates at a rate of speed determined by the characteristics of the condenser 1213′ included in the discharge circuit for the lower winding of the relay R1210′. Each time the pulse relay R1210′ operates and restores it completes and then interrupts, at its contacts 1212′, a circuit for energizing the winding of the magnet FM1206*a*. Each time the magnet FM1206*a* operates and restores it drives the wipers 1202*a* to 1205*a*, inclusive, of the finder switch F1201*a* one step in the counterclockwise direction. Thus the wipers are advanced step by step over the contacts of their associated contact banks until the wiper 1205a engages the contact in its associated contact bank which is grounded over a circuit including the contacts 1244 of the operated start relay R1240. When the wiper 1205a engages the last-mentioned contact, a circuit is completed for energizing the winding of the stop relay R1220', thereby to cause the latter relay to operate and interrupt, at its contacts 1224', the previously mentioned circuit for intermittently operating the pulse relay R1210'. The relay R1210' now restores to normal and interrupts the circuit for causing the magnet FM1206a to advance the wipers of the finder switch F1201a** in the above-mentioned manner.

As a further result of the operation of the stop relay R1220', at its contacts 1221' it completes a circuit including the contacts 1231a of the answer key K1230a for illuminating the answer lamp L1236. At its contacts 1222' and 1223', the relay R1220' prepares a talking circuit which includes the conductors C641 and C643 connected to the calling subscriber line, whereby the intercepting operator may, by actuating the answer key K1230a, converse with the calling subscriber. Also, at the contacts 1223', the relay R1220' completes a circuit whereby a ringing tone signal is transmitted by way of the condenser 1235', the contacts 1233a of the answer key K1230a, the contacts 1223', the wiper 1203a and the conductor C643 in order to give the calling subscriber a ringing tone signal instead of the usual dial tone signal. When the intercepting operator receives a signal in the form of the illuminated lamp L1236, she actuates the answer key K1230a thereby to complete, at the contacts 1232a and 1234a, the above-mentioned talking circuit between the intercepting operator circuit 1240a and the calling subscriber. Also at the contacts 1233a the actuation of the answer key K1230a interrupts the above-traced circuit for transmitting ringing tone signal to the calling subscriber. Finally, at the contacts 1231a the above-traced circuit for illuminating the answer lamp L1236 is interrupted. The intercepting operator may now ascertain the directory number of the calling subscriber substation and inform the exchange attendant to test the particular calling line so that it may be subsequently cleared of the grounded condition which has been encountered on the tip conductor of the calling line mentioned. After the line has been placed on test the intercepting operator may restore the answer key K1230a to the position illustrated in the drawings and then momentarily actuate the release key K1250a in order to short-circuit the start relay R1240 and thus cause it to restore to normal. When the start relay R1240 restores, at its contacts 1244 it interrupts the circuit for energizing the stop relay R1220', thereby to cause the latter relay to restore and again place the grounded line intercepting circuit in condition to be again utilized.

*Conclusion*

From the foregoing it is apparent that an automatic telephone system is provided which comprises improved automatic recording apparatus operative to record, without the aid of an operator, given particulars of certain calls in the system for which special charges are made, regardless of whether the calls are originated at private or party subscriber substations; improved switching apparatus for setting up the calls and for collecting the items of record information to be recorded; improved intercepting apparatus wherein the intercepting operator is informed of the character of the call being intercepted; improved supervisory apparatus for informing the intercepting operator or the exchange attendant of the character of a fault occurring in the exchange switching apparatus; improved apparatus for selectively controlling the automatic recording apparatus, whereby both a toll ticket individual to a call and an appropriate entry upon a common record sheet are produced; and improved trucking arrangements whereby certain subscribers may extend toll calls to adjacent exchange areas on a free call basis wherein no toll charge is made for the connection.

The apparatus and circuit arrangements in the telephone system whereby the switching apparatus is controlled to time calls and calculate the cost of calls which are timed for a predetermined elapsed time interval and whereby a permanent record is produced of different classes of completed calls, as well as unanswered, busy, and abandoned calls extended to certain stations are claimed in the parent application Serial No. 649,583, filed February 23, 1946.

The apparatus and circuit arrangements in the telephone system whereby the route determining means controls the switching apparatus to route calls to a called exchange having subscriber lines identified by six and seven digit directory numbers, even though the first three digits of the six and seven digit numbers are identical, are claimed in a copending divisional application Serial No. 104,322, filed July 12, 1949.

The apparatus and circuit arrangements in the telephone system whereby the toll ticket repeater is selectively controlled in different manners in accordance with different operating conditions are claimed in a copending divisional application Serial No. 129,294, filed November 25, 1949.

The apparatus and circuit arrangements in the telephone system for testing the operating characteristics of the calling subscriber line detecting apparatus are claimed in the copending divisional application Serial No. 95,063, filed May 24, 1949, now Patent No. 2,535,513, granted December 26, 1950.

While one embodiment of the invention has been disclosed, it will be understood that various modifications may be made therein which are within the true spirit and scope of the invention.

I claim:

1. In a telephone system, a calling line, a called line, a register including first and second relays, means for connecting said calling line to said first and second relays, digit responsive means thereafter controllable over said calling line for completing a connection between said calling line and said called line, means normally causing said first relay to follow a plurality of the digits transmitted over said calling line and for preventing said second relay from operating incident to such transmission, means controlled in the event said calling line is falsely grounded for operating said first and second relays when said calling line is connected thereto, an operator position, and means controlled in response to the operation of said first and second relays for automatically completing a connection from said calling line to said operator position.

2. In a telephone system, a calling line provided with a subscriber station, a called line, a primary register accessible to said calling line, a plurality of secondary registers accessible to said primary register, switching apparatus selectively operative for completing a connection from said calling line to said called line, a supervisory position including a common alarm and a group of signalling devices, said group of signalling devices including individual signalling devices corresponding respectively to said primary register and said plurality of secondary registers, means controlled in response to the operation of any one of said signalling devices for operating said common alarm, means included in subscriber station and responsive to the initiation of a call thereat for connecting said calling line to said primary register and controllable thereafter for transmitting over said calling line to said primary register a plurality of digits identifying said called line, register means included in said primary register for registering a fixed number of said digits, means controlled in response jointly to the registration of said fixed number of digits in said primary register and to the busy condition of said plurality of secondary registers for operating at said supervisory position the one of said signalling devices corresponding to said plurality of secondary registers, whereby said common alarm operates at said supervisory position to indicate an alarm condition in the telephone system and said signalling device corresponding to said plurality of secondary registers operates to indicate an alarm condition in said plurality of secondary registers, means controlled in response jointly to the registration of said fixed number of digits in said primary register and to any one of said secondary registers being idle for selecting an idle one of said secondary registers and for thereafter connecting said one secondary register to said primary register, means in said primary register controlled in response to the connection thereto of said one secondary register for transmitting to said one secondary register said digits registered therein and for further transmitting to said one secondary register the remainder of the digits transmitted thereto over said calling line and controlled in response to any one of said secondary registers failing to complete a connection thereto within a predetermined period after the registration therein of said fixed number of digits for operating at said supervisory position the one of said signalling devices corresponding to said primary register, whereby said common alarm operates at said supervisory position to indicate an alarm condition in the telephone system and said signalling device corresponding to said primary register operates to indicate an alarm condition in said primary register, and means in said one secondary register controlled responsive to the digits transmitted thereto from said primary register for operating said switching apparatus to complete a connection from said calling line to said called line.

3. In a telephone system, a calling line provided with a subscriber station, a called line, a primary register accessible to said calling line, a plurality of secondary registers accessible to said primary register, switching apparatus selectively operative for completing a connection from said calling line to said called line, a timer unit for providing time markings and for registering the duration of connections completed by said switching apparatus, a supervisory position including a common alarm and a group of first signalling devices and a second signalling device, said group of first signalling devices including individual signalling devices corresponding respectively to said primary register and to said plurality of secondary registers and said second signalling device corresponding to said timer unit, means controlled in response to the operation of any one of said first signalling devices for operating said common alarm at a first frequency and controlled in response to the operation of said second signalling device for operating said common alarm at a second frequency, means included in said subscriber station and responsive to the initiation of a call thereat for connecting said calling line to said primary register and controllable thereafter for transmitting over said calling line to said primary register a plurality of digits identifying said called line, register means included in said primary register for registering a fixed number of said digits, means controlled in response jointly to the registration of said fixed number of digits in said primary register and to any one of said secondary registers being idle for selecting an idle one of said secondary registers and for thereafter connecting said one secondary register to said primary register and controlled in response jointly to the registration of said fixed number of digits in said primary register and to the busy condition of said plurality of secondary registers for operating at said supervisory position the one of said first signalling devices corresponding to said plurality of secondary registers, whereby said common alarm at said supervisory position operates at said first frequency to indicate an alarm condition in the primary register or the plurality of secondary registers and said operated first signalling device therein corresponding to said plurality of secondary registers signalling device indicates an alarm condition in said plurality of secondary registers, means in said primary register controlled in response to the connection thereto of said one secondary register for transmitting to said one secondary register said digits registered therein and for further transmitting to said one secondary register the remainder of the digits transmitted thereto over said calling line and controlled in response to any one of said secondary registers failing to complete a connection thereto within a predetermined period after the registration therein of said fixed number of digits for operating at said supervisory position the one of said first signalling devices corresponding to said primary register, whereby said common alarm at said supervisory position operates at said first frequency to indicate an alarm condition in the primary register or said plurality of secondary registers and said operated first signalling device therein corresponding to said primary register indicates an alarm condition in said primary register, means in said one secondary register controlled responsive to the digits transmitted thereto from said primary register for operating said switching apparatus to complete a connection from said calling line to said called line and for thereafter operating said timer unit to register the duration of said completed connection, and means controlled upon the failure of said timer unit to provide time markings for operating at said supervisory position said second signalling device whereby said common alarm at said supervisory position operates at said second frequency conjointly with said second signalling device to indicate an alarm condition in said timer unit.

4. In a telephone system including a calling line, a called line and switching apparatus controllable over said calling line for completing a connection from said calling line to said called line; the combination comprising, a timing register, an alarm apparatus, a clock device for applying spaced apart timing pulses to said timing register and to said alarm apparatus, register means included in said timing register responsive jointly to said completed connection and to said applied timing pulses for registering the duration of said completed connection, and means in said alarm apparatus responsive to the failure of said clock device to apply timing pulses thereto for rendering an alarm signal thereat.

5. In a telephone system including a calling line, a called line and switching apparatus controllable over said calling line for completing a connection from said calling line to said called line; the combination comprising, a timing register, an alarm apparatus, a clock device for applying spaced apart timing pulses to said timing register and to said alarm apparatus, register means included in said timing register responsive jointly to said completed connection and to said applied timing pulses for registering the duration of said completed connection, and an alarm device and an oscillator included in said alarm apparatus, said oscillator being operative in response to said applied timing pulses, means controlled by the operation of said oscillator for preventing operation of said alarm device and controlled by the failure of said oscillator to operate for operating said alarm device.

6. In a telephone system, a party line, a plurality of stations on said party line, a calling mechanism at any one of said stations responsive to the initiation of a call thereat for completing a connection between the conductors of said party line, said calling mechanism being controllable thereafter for interrupting and recompleting the connection between the conductors of said party line a variable number of times and for applying a fixed number of ground pulses to the conductors of said party line during the intervals that the connection therebetween is recompleted, a line relay, a party relay of the differential type having a first and a second winding, a source of power provided with a relatively high potential and a relatively low potential, a control circuit extending via the winding of said line relay and the first winding of said party relay and one line conductor of said party line and said calling mechanism and the other line conductor of said party line and the second winding of said party relay from said high potential to said low potential, whereby only said line relay is operated in response to the completion of a connection between the conductors of said party line and said operated line relay is restored in response to the interruption of a completed connection between the conductors of said party line and whereby both said line relay and said party relay are operated in response jointly to recompletion of the connection between the conductors of said party line and to the application of ground to said conductors, switching means normally controlled in response to the restoring of said line relay for extending a connection from said party line to a called line, station identifying means normally controlled in response to the operation of said party relay for identifying said one calling station on said party line, an intercept operator position, an intercept relay operable in response to the joint operation of said line and party relays for preventing the operation of said switching means and said station identifying means and for completing a connection between the calling party line and the intercept operator position, and a control relay energized in response to the operation of said line relay and operated a short time thereafter for preventing the operation of said intercept relay, whereby in response to the initiation of a call on said party line said control relay is operated and normally prevents the operation of said intercept relay and whereby in response jointly to a false ground on one conductor of said party line and to the initiation of a call on said party line said intercept relay is operated prior to the operation of said control relay so that said calling line is connected to said intercept operator position.

7. In a telephone system including switching apparatus operative to set up telephone connections between calling lines and called lines and including a plurality of register senders each of which is operative to be controlled from any calling line in order to control said switching apparatus to complete a connection between any calling line and any desired called line and including a plurality of rotary switches each having a set of wipers for connecting any calling line to any one of said register senders; the combination comprising a test conductor for each of said register senders accessible to a first wiper of each of said wiper sets, means controlled in response to a call on a calling line for controlling one of said rotary switches to select an idle one of said register senders over the associated wiper set, means in said selected register sender for applying a busy marking potential to the associated test conductor to mark said selected register sender busy to all other rotary switches and to complete a holding circuit including said test conductor and said first wiper to retain said calling line connected to said selected register sender during the time said selected register sender is controlled from said calling line and said selected register sender controls said switching apparatus to complete a connection to a desired called line, means in said selected register sender controlled in response to said completion of said connection for initiating release of said selected register sender, a relay associated with said one rotary switch and controlled over a second wiper of said associated wiper set by said last-mentioned means for disconnecting said calling line from said selected register sender and for connecting said calling line to said called line over said completed connection, means controlled by said relay for interrupting said holding circuit including said first wiper, and means in said selected register sender for continuously maintaining said busy marking on said test conductor from the time said register sender is selected and until said selected register sender is fully released, whereby a register sender continuously marks itself busy after selection and until it is fully restored to normal and conditioned to be reselected for another call.

8. In a telephone system including switching apparatus operative to set up telephone connections between calling and called lines and including a plurality of registers each of which is operative to control said switching apparatus to complete a connection between a calling line and a called line; the combination comprising a plurality of rotary switches having access to said plurality of registers over a set of wipers individual to each of said rotary switches, said rotary switches operated in response to a call on a calling line to select idle ones of said registers and for connecting said selected idle register to the associated calling line over certain of said wipers of the associated set of wipers, means in said selected idle register for marking said selected register busy to all other rotary switches having access thereto and for holding said one rotary switch connected to said selected register over a first wiper of said wiper set, means in said connected register controlled from said connected calling line for controlling said switching apparatus over circuits including certain other wipers of said rotary switch wiper set to complete a connection from said connected calling line to a called one of said lines, means in said selected register operated in response to said completion thereby of said connection for initiating release of said register, means associated with said connected rotary switch and controlled by said last-mentioned means over still another wiper of said wiper set for disconnecting said register from said calling line and said completed connection, and means in said selected register for continuously maintaining said busy marking from the time it is selected until it is completely released and independently of said disconnection of said register from said calling line.

9. In a telephone system including, a plurality of subscriber lines, switching apparatus progressively operative for completing a connection between a calling one of said subscriber lines and a called one of said subscriber lines, a calling subscriber line identifier, and a register sender accessible to any calling one of said subscriber lines and controllable thereover for registering therein a called subscriber line number and for operating said switching apparatus to extend a connection therefrom towards said called subscriber line and for thereafter operating said calling subscriber line identifier and registering therein the identified calling subscriber line number; the combination comprising a supervisory station, a trunk accessible to said switching apparatus and terminated at said supervisory station, a fault switch associated with said supervisory station and having a plurality of switch positions and controllable over said trunk to any one of its switch positions, means in said register sender controllable in response to a first fault resulting from the registration therein of an incomplete called subscriber line number and controllable in response to a second fault resulting from the registration therein of an unassigned subscriber line number and controllable in response to a third fault resulting from the failure of said calling subscriber line identifier to identify the calling subscriber line for controlling said switching apparatus in order to connect said register sender to said trunk and for operating thereover said fault switch to a first switch position responsive to said first fault and to a second switch position responsive to said second fault and to a third switch position responsive to a said third fault, and means at said supervisory station associated with each switch position of said fault switch and controlled in response to operation of said fault switch to any one of said switch positions at said supervisory station for indicating a fault condition in said register sender and the particular nature of said fault condition therein.

10. In a telephone system including, a plurality of subscriber lines, switching apparatus progressively operative for completing a connection between a calling one of said subscriber lines, a calling subscriber line identifier, and a register sender accessible to any calling one of said subscriber lines and controllable thereover for registering therein a called subscriber line member and for operating said switching apparatus to extend a connection therefrom towards said called subscriber line and for thereafter operating said calling subscriber line identifier and registering therein the identified calling subscriber line number; the combination comprising, a supervisory station, a trunk accessible to said switching apparatus and terminated at said supervisory station, a fault switch associated with said supervisory station and having a plurality of switch positions and controllable over said trunk to any one of its switch positions, said register sender being subject to a plurality of unstanderd operating conditions, means in said register sender controllable in response to any one of said unstandard operating conditions for controlling said switching apparatus in order to connect said register sender to said trunk and for operating thereover said fault switch to the switch position corresponding to said one unstandard operating condition, and means at said supervisory station associated with each switch position of said fault switch and controlled in response to the operation of said fault switch to any one of said switch positions for indicating at said supervisory station an unstandard condition in said register sender and the particular nature of the unstandard condition therein.

11. The telephone system as set forth in claim 10, wherein said combination includes further means in said register sender responsive to the connection of said trunk thereto and to the operation of said fault switch to any one of said switch positions for extending a connection from said calling line over said trunk to said supervisory station, and means at said supervisory station responsive to the extension of said connection thereto for transmitting a signal to said calling line to simulate the signalling of a called line and for thereafter completing said connection thereto from said calling line and for terminating the transmission of said signal.

12. In a telephone system including switching apparatus operative to set up telephone connections between calling and called lines and including a register sender controllable from a calling line to register a called number line and to operate said switching apparatus to complete a connection between said calling line and said called line; the combination comprising an operator position, a trunk terminated at said position and accessible to said switching apparatus, a switch individual to said trunk, means in said register sender operated in response to the first false registration of an incomplete called line number or in response to a second false registration of an unassigned called number for automatically controlling said switching apparatus to select said trunk and for thereafter transmitting a first or a second signal over said trunk indicative respectively of said first or said second false registration in said register sender, and means associated with said trunk operated in accordance with said first or said second signal for selectively positioning said switch to indicate to the operator at said position the particular first or second false registration in said register sender.

13. In a telephone system including, a plurality of subscriber lines, switching apparatus progressively operative for completing a connection between a calling one of said subscriber lines and a called one of said subscriber lines, a calling subscriber line identifier, and a register sender accessible to any calling one of said subscriber lines and controllable thereover for registering therein a called subscriber line number and for operating said switching apparatus to extend a connection therefrom towards said called subscriber line and for thereafter operating said calling subscriber line identifier and registering therein the identified calling subscriber line number; the combination comprising, a supervisory station, a trunk accessible to said switching apparatus and terminated at said supervisory station, a fault switch associated with said supervisory station and having a plurality of switch positions and controllable over said trunk to any one of its switch positions, said register sender being subject to a plurality of unstandard operating conditions, and means in said register sender controlled in response to any one of said unstandard operating conditions therein for preventing further operation of said switching apparatus in extending the connection towards said called subscriber line and for extending a connection therefrom to said trunk and for thereafter operating over said trunk said fault switch to a switch position corresponding to said one unstandard operating condition in order to indicate at said supervisory station an unstandard operating condition in said register sender and the particular nature of said unstandard operating condition.

14. The telephone system including the combination as set forth in claim 13, wherein said means in said register sender controlled in response to any one of said unstandard operating conditions therein releases the portion of said switching apparatus operated in extending the connection towards said called line and thereafter reoperates said switching apparatus to extend a connection from said register sender to said trunk.

15. In a telephone system including, a plurality of subscriber lines, switching apparatus progressively operative for completing a connection between a calling one of said subscriber lines and a called one of said subscriber lines, a calling subscriber line identifier, and a register sender accessible to any calling one of said subscriber lines and controllable thereover for registering therein a called subscriber line number and for operating said switching apparatus to extend a connection therefrom towards said called subscriber line and for thereafter operating said calling subscriber line identifier and registering therein the identified calling subscriber line number; the combination comprising, a supervisory station, a trunk accessible to said switching apparatus and terminated at said supervisory station, a fault switch associated with said supervisory station and having a plurality of switch positions and controllable over said trunk to any one of its switch positions, a plurality of signalling devices corresponding to the switch positions of said fault switch and a common alarm included at said supervisory station, said register sender being subject to a plurality of unstandard operating conditions, means in said register sender controlled in response to any one of said unstandard operating conditions therein for preventing further operation of said switching apparatus in extending the connection toward said called subscriber line and for extending a connection therefrom to said trunk and for thereafter operating said fault switch to a switch position corresponding to said one unstandard operating condition, and means responsive to the operation of said fault switch to said switch position for operating said common alarm to indicate an unstandard operating condition in said register sender and for operating said corresponding signalling device to indicate the particular nature of said one unstandard operating condition.

16. In a telephone system including switching apparatus operative to set up telephone connections between calling and called lines and a register sender controllable from a calling line to register a called ine number and to operate a route mechanism to a first setting in accordance with said registered number so that said register sender is controlled by said first setting of said route mechanism to operate said switching apparatus to set up a connection from said calling line to said called line, and including an identifier normally operated to register the number of said calling line; the combination comprising, an operator position, a plurality of trunks terminated at said position and accessible to said switching apparatus, means in said register sender controlled in response to the failure of said identifier to register a calling line number for operating said route mechanism to a second setting, means in said register sender controlled in response to the registration therein of a number of a non-existing called line for operating said route mechanism to a third setting, whereby said register sender is controlled by said second setting or said third setting of said route mechanism to operate said switching apparatus to set up a connection from said calling line to one of said trunks, and stepping means individual to said one trunk and selectively operated in accordance with said respective second or third settings of said route mechanism for indicating to the operator at said position the particular second or third setting of said route mechanism.

17. A telephone system as set forth in claim 16, wherein said route mechanism in said second setting or in said third setting transmits different signals over said trunk to selectively operate said stepping means to indicate the particular fault corresponding to the particular second setting or particular third setting of said route mechanism.

18. A telephone system as set forth in claim 17, wherein said stepping means has access to a plurality of indicating lamps at said operator position and by said selective operation thereof illuminates the particular indicating lamp corresponding to the particular setting of said route mechanism.

19. In a telephone system a calling line, a called line, a plurality of trunk circuits, switching apparatus for setting up a connection from said calling line over any one of said trunk circuits to said called line, means controlled incident to the setting up of said connection for collecting certain items of record information pertaining thereto, said one trunk circuit including a plurality of item registers and means controlled in response to the setting up of said connection thereover for storing said items of record information in said item registers, a record item storage device, and means included in said one trunk circuit controlled responsive to the termination of said connection for transferring the items of record information stores in said item registers to said record item storage device, and means controlled by said last mentioned means in said one trunk circuit for individually indicating that items of record information are stored in one of said trunk circuits and for further individually indicating the one of said trunk circuits in which said items of record information are stored.

20. In a telephone system, a calling line, a called line, a plurality of trunk circuits, switching apparatus for setting up a connection from said calling line over any one of said trunk circuits to said called line, means controlled incident to the setting up of said connection for collecting certain items of record information pertaining thereto, said one trunk circuit including a plurality of item registers and means controlled in response to the setting up of said connection thereover for storing said items of record information in said item registers, a record item storage device, means included in said one trunk circuit controlled responsive to the termination of said connection for transferring the items of record information registered in said item registers to said record item storage device, a first signalling device, a plurality of second signalling devices, and means controlled by said last mentioned means in said one trunk circuit for operating said first signalling device to indicate that said items of record information are stored in one of said trunk circuits and for operating the one of said second signalling devices corresponding to said one trunk circuit for indicating that said items of record information are stored in said one trunk circuit.

21. In a telephone system, a calling line, a called line, a plurality of trunk circuits, switching apparatus for setting up a connection from said calling line over any one of said trunk circuits to said called line, means controlled incident to the setting up of said connection for collecting certain items of record information pertaining thereto, said one trunk circuit including a plurality of item registers and means controlled in response to the setting up of said connection thereover for storing each of said items of record information in a one of said item registers, a supervisory station including a plurality of first signalling devices corresponding to the equipment in the telephone system including the plurality of trunk circuits in which unstandard operating conditions may occur and an alarm and a plurality of second signalling devices corresponding to said trunk circuits and means responsive to the operation for a predetermined period of any one of said first signalling devices for thereafter operating said alarm, a record item storage device, and means included in said one trunk circuit controlled responsive jointly to the termination of said connection and to the stored condition of said items of record information in said item registers thereof for operating the one of said first signalling devices corresponding to the plurality of trunk circuits and the one of said second signalling devices corresponding to said one trunk circuit and for normally transferring within said predetermined period after the termination of said connection the items of record information stored in said item registers therefrom to said record item storage device so that upon completion of the transfer of the items of record information to said record item storage device said operated first signalling device and second signalling device are restored to normal, whereby upon failure of said last mentioned means to cause the items of record information to be transferred from said item registers within said predetermined period said operated first signalling device and second signalling device are maintained operated so that said alarm operates to indicate an unstandard operating condition in the telephone system and said operated one of the first signalling device indicates that said unstandard operating condition is in one of said trunk circuits and said operated one of the second signalling devices indicates the one of said trunk circuits in which said unstandard operating condition exists.

References Cited in the file of this patent

UNITED STATES PATENTS

| | | |
|---|---|---|
| 1,531,046 | Temple | Mar. 24, 1925 |
| 1,831,399 | Stevens | Nov. 10, 1931 |
| 1,862,549 | Raymond | June 14, 1932 |
| 1,899,112 | Saunders | Feb. 28, 1933 |
| 2,183,649 | Kahn | Dec. 19, 1939 |
| 2,183,656 | Ostline | Dec. 19, 1939 |
| 2,362,425 | Wiese | Nov. 7, 1944 |
| 2,385,715 | Lomax et al. | Sept. 25, 1945 |
| 2,409,063 | Ostline | Oct. 8, 1946 |
| 2,437,118 | Ostline | Mar. 2, 1948 |
| 2,447,533 | Retallack | Aug. 24, 1948 |
| 2,522,000 | Shepherd | Sept. 12, 1950 |
| 2,535,509 | Ostline | Dec. 26, 1950 |
| 2,580,757 | Germanton | Jan. 1, 1952 |

FOREIGN PATENTS

| | | |
|---|---|---|
| 565,665 | Great Britain | Nov. 21, 1944 |